US006866092B1

(12) United States Patent
Molivadas

(10) Patent No.: US 6,866,092 B1
(45) Date of Patent: Mar. 15, 2005

(54) TWO-PHASE HEAT-TRANSFER SYSTEMS

(76) Inventor: Stephen Molivadas, 5403 Greystone St., Chevy Chase, MD (US) 20185

(*) Notice: Subject to any disclaimer, the term of this patent is extended or adjusted under 35 U.S.C. 154(b) by 0 days.

(21) Appl. No.: 08/112,204

(22) Filed: Aug. 26, 1993

Related U.S. Application Data

(63) Continuation-in-part of application No. PCT/US92/01654, filed on Mar. 11, 1992, and a continuation-in-part of application No. 07/696,853, filed on May 7, 1991, now abandoned, which is a continuation-in-part of application No. 07/400,738, filed on Aug. 30, 1989, now Pat. No. 5,333,677, and a continuation-in-part of application No. 06/815,642, filed on Jan. 2, 1986, now abandoned, which is a continuation-in-part of application No. 06/374,707, filed on May 4, 1982, now abandoned, and a continuation-in-part of application No. 06/362,148, filed on Mar. 26, 1982, now abandoned, and a continuation-in-part of application No. 06/361,784, filed on Mar. 25, 1982, now abandoned, and a continuation-in-part of application No. 06/355,520, filed on Mar. 5, 1982, now abandoned, and a continuation-in-part of application No. 06/235,980, filed on Feb. 19, 1981, now abandoned.

(51) Int. Cl.[7] .......................... F01P 3/22; F28D 15/00; F28F 27/00

(52) U.S. Cl. .......................... 165/104.21; 123/41.21; 123/41.2; 123/41.25; 123/41.26; 165/47; 165/104.27; 165/104.32; 165/272

(58) Field of Search .......................... 123/41.21, 41.2, 123/41.25, 41.26, 41.04, 41.5, 41.31, 41.33, 563; 165/32, 47, 104.27, 104.32, 39, 41, 272; 237/65, 67, 12.3 B; 336/57; 126/419, 433

(56) References Cited

U.S. PATENT DOCUMENTS 2,083,611 A * 6/1937 Marshall .................. 165/39
2,292,946 A * 8/1942 Karig .................. 123/41.04
2,711,882 A * 6/1955 Narbutovskih
2,961,476 A * 11/1960 Maslin et al. .......... 165/104.27
3,076,479 A * 2/1963 Ottung .................. 123/41.5
3,095,012 A * 6/1963 McShane .............. 165/104.32
3,168,080 A * 2/1965 Latterner et al.
3,229,456 A * 1/1966 Gratzmuller ............ 123/41.31
3,272,258 A * 9/1966 Bourguard .............. 165/259
3,306,350 A * 2/1967 Beurtheret .............. 165/11.1
3,371,298 A * 2/1968 Narbut
4,211,207 A * 7/1980 Molivadas
4,340,030 A * 7/1982 Molivadas
4,358,929 A * 11/1982 Molivadas
4,367,699 A * 1/1983 Evans .................. 123/41.33
4,563,983 A * 1/1986 Hayashi et al. ............ 123/563
4,581,477 A * 4/1986 Harumoto et al.
4,584,971 A * 4/1986 Neitz et al.

(List continued on next page.)

FOREIGN PATENT DOCUMENTS

| | | | |
|---|---|---|---|
| DE | 3809136 | * 10/1988 | 237/12.3 B |
| FR | 2482906 | * 11/1981 | 180/68.4 |
| JP | 0092641 | * 9/1974 | 165/104.27 |
| JP | 0131876 | * 10/1979 | 165/104.27 |
| JP | 0135950 | * 10/1981 | 165/104.27 |
| JP | 0195891 | * 8/1991 | 165/104.27 |

*Primary Examiner*—John K. Ford

(57) ABSTRACT

Various techniques are disclosed for improving airtight two-phase heat-transfer systems employing a fluid to transfer heat from a heat source to a heat sink while circulating around a fluid circuit, the maximum temperature of the heat sink not exceeding the maximum temperature of the heat source. The properties of those improved systems include (a) maintaining, while the systems are inactive, their internal pressure at a pressure above the saturated-vapor pressure of their heat-transfer fluid; and (b) cooling their internal evaporator surfaces with liquid jets. FIG. 43 illustrates the particular case where a heat-transfer system of the invention is used to cool a piston engine (500) by rejecting, with a condenser (508), heat to the ambient air; and where the system includes a heat-transfer fluid pump (10) and means (401–407) for achieving the former property.

44 Claims, 51 Drawing Sheets

U.S. PATENT DOCUMENTS 4,598,687 A * 7/1986 Hayashi ...................... 123/563
4,605,163 A * 8/1986 Hayashi ................. 237/12.3 B
4,605,164 A * 8/1986 Hayashi et al. ........ 237/12.3 B
4,607,245 A * 8/1986 Kuroda et al.
4,632,178 A * 12/1986 Hirano .................. 165/104.27
4,648,356 A * 3/1987 Hayashi
4,648,357 A * 3/1987 Hayashi
4,667,626 A * 5/1987 Hayashi et al. ............... 165/41
4,766,852 A * 8/1988 Hirano et al.
4,768,484 A * 9/1988 Scarselletta
4,788,943 A * 12/1988 Hayashi
4,932,365 A * 6/1990 Marschall et al.
4,979,472 A * 12/1990 Pöhlmann
5,333,677 A * 8/1994 Molivadas

* cited by examiner

FIG.43C
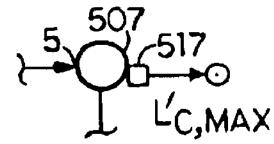
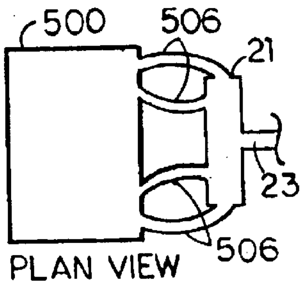
FIG.43A
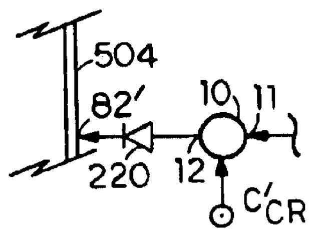
FIG.43B
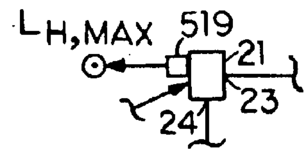
FIG.43D
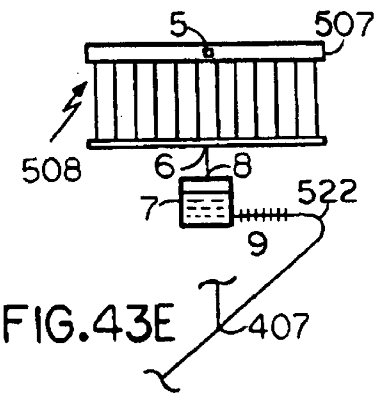
FIG.43E
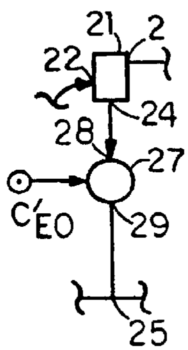
FIG.43F
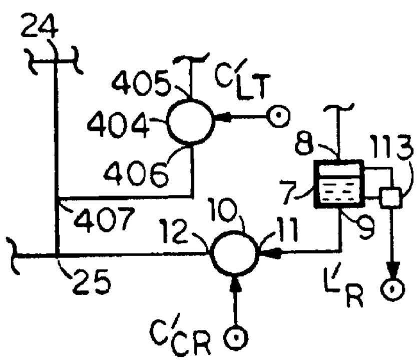
FIG.43G
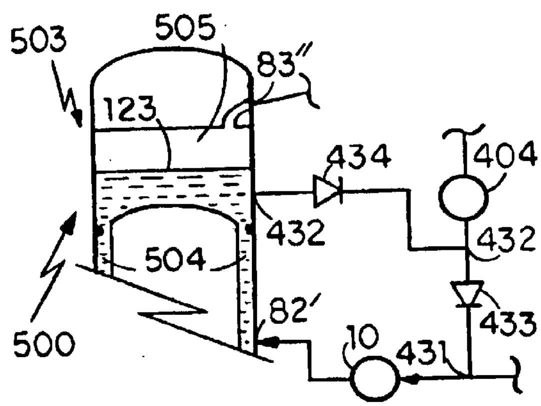
FIG.43H
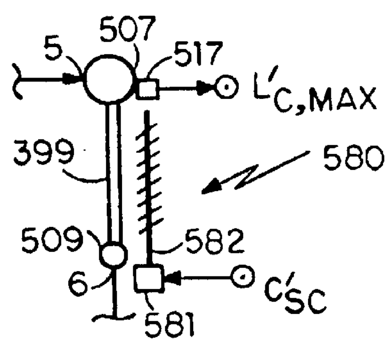
FIG.43I FIG. 105
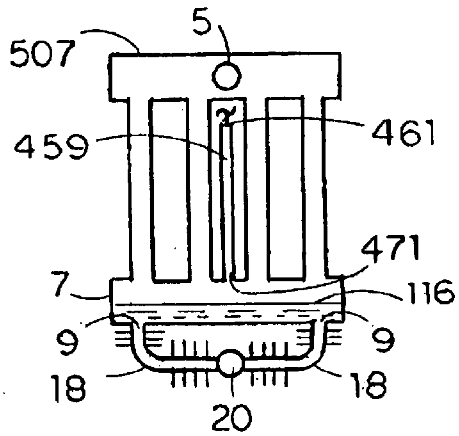
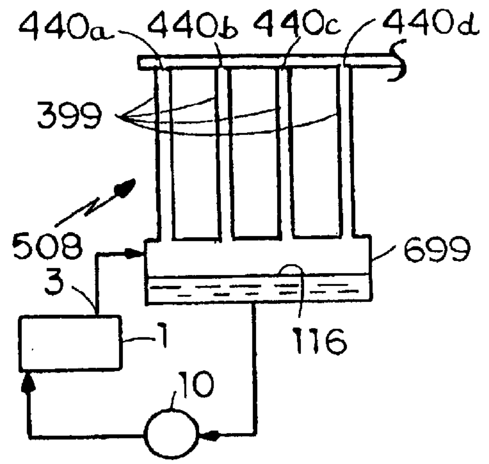
FIG. 107
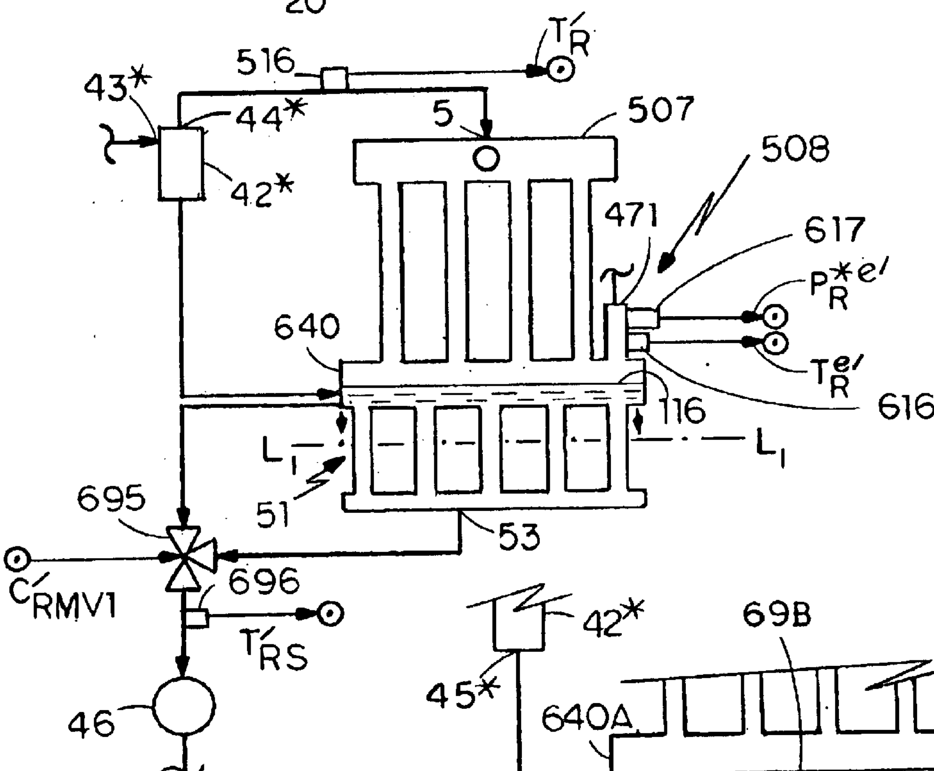
FIG. 106
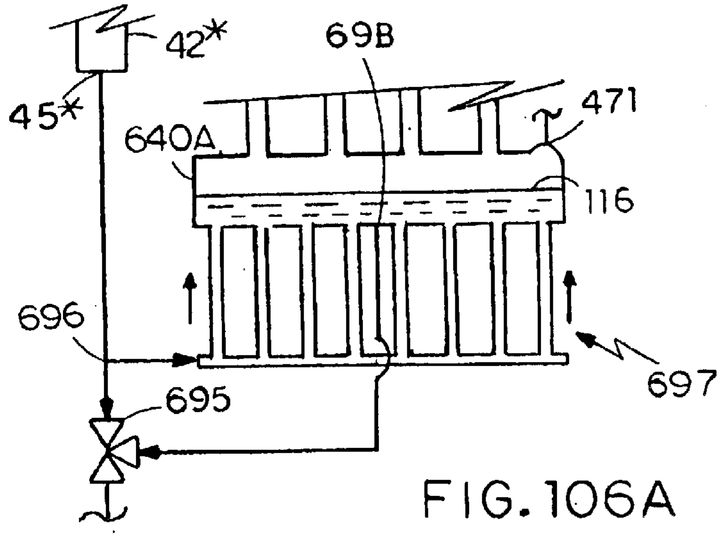
FIG. 106A

TWO-PHASE HEAT-TRANSFER SYSTEMS

CROSS-REFERENCES TO RELATED APPLICATIONS

The present application is a continuation-in-part of my PCT patent application Ser. No. 92/01654, filed Mar. 11, 1992, titled AIRTIGHT TWO-PHASE HEAT-TRANSFER SYSTEMS, and of my application Ser. No. 07/400,738, filed Aug. 30, 1989, now U.S. Pat. No. 5,333,677 titled EVACUATED TWO-PHASE HEAT-TRANSFER SYSTEMS; the cited PCT application being a continuation-in part of my application Ser. No. 07/400,738, filed Aug. 30, 1989, now U.S. Pat. No. 5,333,677 titled EVACUATED TWO-PHASE HEAT-TRANSFER SYSTEMS and of my then-pending application Ser. No. 07/696,853, filed May 7, 1991, now abandoned titled TWO-PHASE HEAT-TRANSFER SYSTEMS; the last-cited patent application being a continuation-in-part of my application Ser. No. 07/400,738, filed Aug. 30, 1989, now U.S. Pat. No. 5,333,677 titled EVACUATED TWO-PHASE HEAT-TRANSFER SYSTEMS and of my then-pending application Ser. No. 06/815, 642, filed Jan. 2, 1986, now abandoned titled TWO-PHASE HEAT-TRANSFER SYSTEMS; the first of the two last-cited patent applications being a continuation-in-part of the second of the two last-cited patent applications; and the second of the two last-cited patent applications being a continuation-in-part of five following then-pending applications:

(a) Ser. No. 06/374,707, filed May 4, 1982, now abandoned titled TWO-PHASE HEAT-TRANSFER SYSTEMS, (b) Ser. No. 06/362,148, filed Mar. 26, 1982, now abandoned titled VAPOR-GENERATING SYSTEMS, (c) Ser. No. 06/361,784, filed Mar. 25, 1982, now abandoned titled POWER SYSTEMS, (d) Ser. No. 06/355,520, filed Mar. 5, 1982, now abandoned priority date Jul. 7, 1980 (namely filing date of PCT/US80/0089), titled SOLAR TWO-PHASE HEAT-TRANSFER SYSTEMS, and (e) Ser. No. 06/235,980, filed Feb. 19, 1981, now abandoned titled FORCED REFRIGERANT CIRCULATION SOLAR HEATING SYSTEMS.

The first four of the five last-cited applications were continuations-in-part or divisional applications of then co-pending applications (1) Ser. No. 252,206, filed Apr. 8, 1981, titled FORCED REFRIGERANT-CIRCULATION SOLAR HEATING SYSTEMS, (2) Ser. No. 252,205, filed Apr. 8, 1981, titled TWO-PHASE SOLAR HEATING SYSTEMS, (3) Ser. No. 144,275, filed Apr. 28, 1980, titled SOLAR POWER SYSTEM, now U.S. Pat. No. 4,358,929, and (4) Ser. No. 902,950, filed May 5, 1978, titled SOLAR HEATING SYSTEM, now U.S. Pat. No. 4,340,030.

The last two patent applications were continuations-in-part of then Ser. No. 457,271, filed Apr. 2, 1974, titled HEATING AND COOLING SYSTEMS, now U.S. Pat. No. 4,211,207; and application Ser. No. 235,980, filed Feb. 19, 1981, was a divisional application of then-pending application Ser. No. 902,950, and was filed for the purpose of provoking an interference with Bottum U.S. Pat. No. 4,220, 138, filed Jan. 24, 1978.

I. TECHNICAL FIELD

The general technical field of the present invention pertains to systems that include one or more fluid circuits for transferring heat from one or more heat sources to one or more heat sinks with a heat-transfer fluid circulating around the one or more fluid circuits; a heat sink—to which heat is released by the heat-transfer fluid—having, at an instant in time, a maximum temperature below the maximum temperature of the heat source from which the released heat is absorbed at that instant in time. Such heat-transfer systems—which by the foregoing description exclude heat pumps—can be grouped into two general categories:

(a) single-phase heat-transfer systems having only fluid circuits whose heat-transfer fluid remains in the same phase (liquid or vapor phase) throughout a circulation cycle; and (b) two-phase heat-transfer systems, having at least one fluid circuit whose heat-transfer fluid changes—at least under some operating conditions—at least in part from its liquid phase to its vapor phase and from its vapor phase back to its liquid phase during a circulation cycle.

I shall hereinafter use the term 'heat-transfer system' to refer collectively to both single-phase and two-phase heat-transfer systems, and the term 'refrigerant' to refer to the heat-transfer fluid of the latter systems.

The specific technical field of the present invention pertains to two-phase heat-transfer systems. Such systems include, in addition to a heat-transfer fluid, hereinafter named a refrigerant, an evaporator and a condenser. The evaporator has one or more refrigerant passages in which the refrigerant absorbs heat from a heat source, at least in part, by changing from its liquid to its vapor phase. The condenser has one or more refrigerant passages in which the refrigerant releases heat to a heat sink, at least in part, by changing back from its vapor phase to its liquid phase at pressures which, at an instant in time, do not exceed the lowest pressure at which the refrigerant changes phase in the one or more evaporator refrigerant passages at that instant in time. Two-phase heat-transfer systems also include means for transferring refrigerant vapor from the evaporator refrigerant passages to the condenser refrigerant passages, and means for transferring liquid refrigerant from the condenser refrigerant passages to the evaporator refrigerant passages. The two just-cited means, and the evaporator and condenser refrigerant passages, form a circuit around which the refrigerant circulates while the refrigerant alternates between its liquid and its vapor phases. I shall refer to such a circuit as a 'refrigerant principal circuit'.

Two-phase heat-transfer systems may have one or more refrigerant principal circuits with the same or different kinds of refrigerant, and each of these refrigerant principal circuits may have associated with it one or more refrigerant auxiliary circuits in the sense that they share a refrigerant-circuit segment with each refrigerant principal circuit. Refrigerant auxiliary circuits differ from refrigerant principal circuits in that (a) the former circuits may include evaporator or condenser refrigerant passages, but not both; and in that (b) only liquid refrigerant circulates around those circuits.

The invention disclosed in the present document pertains exclusively to airtight two-phase heat-transfer systems, namely to two-phase heat-transfer systems which, in the absence of a failure, do not ingest air while they are active or while they are inactive.

II. BACKGROUND ART

Many potentially important applications exist for two-phase heat-transfer systems whose refrigerant has, while they are not operating, saturated-vapor pressures substantially below ambient atmospheric pressure. However, prior-art embodiments of such two-phase heat-transfer systems have often been unable to compete successfully with single-phase heat-transfer systems. This is in particular true in the case of internal-combustion-engine prior-art two-phase cooling systems which have so far never been mass-produced, and have been used only in a few concept-demonstration vehicles and in a few ground installations.

I assert that a principal reason for the fact recited in the immediately preceding sentence is that most prior-art internal-combustion-engine two-phase cooling systems ingest air each time they are deactivated and their refrigerant approaches ambient air temperatures. I also assert that the prior-art describes no generally useful techniques for eliminating air ingestion from internal-combustion-engine cooling systems without (a) constraining operating pressures to be essentially equal to the current atmospheric pressure or to differ from the current atmospheric pressure by a constant amount; or without (b) using expensive glandless valves, and hermetically-sealed pumps, and requiring unacceptably-thick refrigerant-passage walls; and, in the case of internal-combustion engines with separate cylinder blocks and cylinder heads, without also using impractical cylinder-head gaskets.

The handicaps of prior-art internal-combustion-engine airtight two-phase cooling systems recited above under (a) and (b) apply also to many other airtight two-phase heat-transfer systems, whose refrigerant has, while they are not operating, saturated-vapor pressures substantially below ambient atmospheric pressure. Nevertheless, the prior art discloses no techniques for maintaining the internal pressure of inactive airtight two-phase heat-transfer systems above their refrigerant saturated-vapor pressure without imposing at least one of the constraints recited above under (a) and (b).

In addition to the handicaps recited above under (a) and (b), prior-art airtight two-phase heat-transfer systems in general, and internal-combustion-engine airtight two-phase cooling a systems in particular, have several additional major handicaps which must be eliminated before airtight two-phase heat-transfer systems can realize their full potential. The nature of those additional handicaps will become apparent whilst reading this DESCRIPTION.

Non-airtight two-phase heat-transfer systems do not have some of the handicaps of prior-art airtight two-phase heat-transfer systems. However, the air ingested by non-airtight systems has often been a sufficient handicap for them to be unable to compete successfully with single-phase heat-transfer systems. A prominent example where this has happened are steam building-heating systems which have been superseded by hot-water building-heating systems primarily because of the unacceptable rate of corrosion caused by air ingestion.

III. DISCLOSURE OF INVENTION

A. Definitions

1. General Remarks

Terms between single quotation marks are defined in this DESCRIPTION. Some of those terms are defined in section III,A,2 under the heading PRELIMINARY DEFINITIONS, and others are defined elsewhere in this DESCRIPTION.

2. Preliminary Definitions

Certain terms used in describing and claiming the invention disclosed in the present document shall have the following meaning:

1. The term 'refrigerant' is used to denote a fluid employed—under at least some operating conditions—to absorb heat, at least in part by changing from a liquid to a vapor and to release the absorbed heat at least in part by changing from a vapor back to a liquid. A refrigerant is said to 'absorb latent heat' when the refrigerant changes from a liquid to a vapor and to 'release latent heat' when the refrigerant changes from a vapor to a liquid; and a refrigerant is said to 'absorb sensible heat' when the refrigerant's (sensible) temperature rises while the refrigerant remains in one of the refrigerant's two phases (namely while the refrigerant remains in either its liquid phase or in its vapor phase) and to 'release sensible heat' when the refrigerant's (sensible) temperature falls while the refrigerant remains in one of the refrigerant's two phases. I intend the last four terms in quotation marks to apply to refrigerants which are a non-azeotropic mixture of single-component fluids as well as to refrigerants which are single-component fluids or an azeotropic mixture of single-component fluids. I shall often herein refer for brevity to fluids which are a non-azeotropic mixture of single-component fluids as 'non-azeotropic fluids'. I shall also often refer herein to single-component fluids, and to fluids which are an azeotropic mixture of single-component fluids, collectively as 'azeotropic-like fluids', where the word 'like' indicates that, in contrast to non-azeotropic fluids, both single-component and azeotropic fluids boil at only one temperature while subjected to a given constant pressure. It follows from my definition of the term 'refrigerant' that the term 'refrigerant' is used herein to denote the function of a heat-transfer fluid and not the nature of a heat-transfer fluid; and is not used herein to restrict the kinds of heat-transfer fluid employed in the systems of the present invention to a particular class of fluids such as fluids more volatile than $H_2O$, and especially not to exclude water as for example in U.S. Pat. No. 4,120,289 (Bottum), 17 Oct. 1978, and U.S. Pat. No. 4,220,138 (Bottum), 02 Sep. 1980. Liquid refrigerant is said to 'evaporate' when it is changing from a liquid to a vapor, and refrigerant vapor is said to 'condense' when it is changing from a vapor to a liquid. And refrigerant is said to absorb heat by evaporation when refrigerant absorbs heat while changing from a liquid to a vapor, and to release eat by condensation when refrigerant releases heat while changing from a vapor to a liquid.

2. The term 'evaporator' denotes means for transmitting heat from a heat source to a refrigerant and for evaporating liquid refrigerant; the evaporator having one or more surfaces which are the bounds of one or more enclosed spaces, named by me refrigerant passages, where refrigerant absorbs heat from the heat source at least in part by changing from a liquid to a vapor.

3. The term 'preheater' denotes means for transmitting heat from a heat source to a refrigerant and for heating, namely increasing the (sensible) temperature of, liquid refrigerant; the preheater having one or more surfaces which are the bounds of one or more enclosed spaces, named by me refrigerant passages, where refrigerant absorbs heat from the heat source solely while the refrigerant is in the refrigerant's liquid phase.

4. The term 'superheater' denotes means for transmitting heat from a heat source to a refrigerant and for heating, namely increasing the (sensible) temperature of, refrigerant vapor; the superheater having one or more surfaces which are the bounds of one or more enclosed spaces, named by me refrigerant passages, where refrigerant absorbs heat from the heat source solely while the refrigerant is in the refrigerant's vapor phase.

5. The term 'condenser' denotes means for transmitting heat from a refrigerant to a heat sink and for condensing refrigerant vapor; the condenser having one or more surfaces which are the bounds of one or more enclosed spaces, named by me refrigerant passages, where refrigerant releases heat to the heat sink at least in part by changing from a vapor to a liquid.

6. The term 'subcooler' denotes means for transmitting heat from a refrigerant to a heat sink and for cooling, namely decreasing the (sensible) temperature of, liquid refrigerant; the subcooler having one or more surfaces which are the bounds of one or more enclosed spaces, named by me refrigerant passages, where refrigerant releases heat to the heat sink solely while the refrigerant is in the refrigerant's liquid phase.

7. The term 'desuperheater' denotes means for transmitting heat from a refrigerant to a heat sink and for cooling, namely decreasing the (sensible) temperature of, refrigerant vapor; the desuperheater having one or more surfaces which are the bounds of one or more enclosed spaces, named by me refrigerant passages, where refrigerant releases heat to the heat sink solely while the refrigerant is in the refrigerant's vapor phase.

8. The term 'hot heat exchanger' denotes a member of the family consisting of all evaporators, preheaters, and superheaters.

9. The term 'cold heat exchanger' denotes a member of the family consisting of all condensers, subcoolers, and desuperheaters.

10. The term 'heat exchanger' denotes any heat exchanger; including any member of the family consisting of all hot heat exchangers, and all cold heat exchangers, as defined in definitions (8) and (9). I note that no restriction is imposed on the nature of the heat source of the hot heat exchangers defined under (2), (3), (4), and (8) in this section III, A, or on the nature of the heat sink of the cold heat exchangers, defined under (5), (6), (7), and (9), in this selfsame section; and it therefore follows—in contrast to the definition of the term 'heat exchanger' found in the art—that the heat exchangers cited hereinafter in this DESCRIPTION may—except where otherwise stated—include heat exchangers for transmitting heat from a solid to a fluid, and from a fluid to a solid, and are not restricted to heat exchangers for transmitting heat from a fluid to another fluid. A heat exchanger has a fluid inlet, and in particular a refrigerant inlet, consisting of a set of one or more inlet ports and a fluid outlet, and in particular a refrigerant outlet, consisting of a set of one or more outlet ports.

11. The term 'principal heat exchanger' denotes a heat exchanger whose purpose is to transfer heat from a heat source of a two-phase heat-transfer system to one of the system's one or more refrigerants, or to transfer heat from a refrigerant of a two-phase heat-transfer system to one of the system's one or more heat sinks. A principal heat exchanger may be a hot heat exchanger, and in particular an evaporator, a preheater, or a superheater; or it may be a cold heat exchanger, and in particular a condenser, a subcooler, or a desuperheater. In this DESCRIPTION and in the CLAIMS, the terms 'evaporator', 'preheater', 'superheater', 'condenser', 'subcooler', and 'desuperheater', refer, for brevity, to principal heat exchangers, except where the qualifier 'accessory' is explicitly stated or obviously implied.

12. The term 'accessory heat exchanger' in general, and the terms 'accessory evaporator', 'accessory condenser', 'accessory subcooler', etc. in particular, denote heat exchangers used for accessory functions. Examples of such accessory heat exchangers are the accessory condensers used to assist in removing refrigerant vapor from a refrigerant-vapor and non-condensable gas mixture, and which, to this end, transfer heat from the mixture to a heat sink, and accessory heat exchangers used to transfer heat from an inert gas to a heat sink and from a heat source to an inert gas.

13. The term 'separating surfaces' denotes any set of surfaces (including surfaces forming a centrifugal separator) for separating the liquid and vapor phases of wet refrigerant vapor flowing over the set of surfaces. Separating surfaces may be an integral part of the refrigerant passages of an evaporator.

14. The term 'separator' denotes means for separating the liquid and vapor phases of wet 2 refrigerant vapor; the separator having a vessel, named 'separator vessel', for storing, whenever appropriate, liquid refrigerant. A separator may include separating surfaces (often referred to as baffles) to help separate the liquid and the vapor phases of wet refrigerant vapor in the separator.

15. The term '2-port separator' denotes a separator having a first set of one or more ports through which usually wet refrigerant vapor enters the separator and liquid refrigerant exits the separator; and a separate second set of one or more ports through which refrigerant vapor exits the separator, the refrigerant vapor exiting the separator usually being drier than the refrigerant vapor entering the separator.

16. The term '3-port separator' denotes a separator having a first set of one or more ports through which usually wet refrigerant vapor enters the separator; a separate second set of one or more ports through which refrigerant vapor exits the separator, the refrigerant vapor exiting the separator usually being drier than the refrigerant vapor entering the separator; and a separate third set of one or more ports through which liquid refrigerant usually exits the separator but may also enter the separator.

17. The term '3*-port separator' denotes a separator having a first set of one or more ports through which usually wet refrigerant vapor enters the separator and through which liquid refrigerant exits the separator; a separate second set of one or more ports through which refrigerant vapor exits the separator, the refrigerant vapor exiting the separator usually being drier than the refrigerant vapor entering the separator; and a separate third set of one or more ports through which liquid refrigerant enters the separator.

18. The term '4-port separator' denotes a separator having a first set of one or more ports through which usually wet refrigerant vapor enters the separator; a separate second set of one or more ports through which refrigerant vapor exits the separator, the refrigerant vapor exiting the separator usually being drier than the refrigerant vapor entering the separator; a separate third set of one or more ports through which liquid refrigerant exits the separator; and a separate fourth set of one or more ports through which liquid refrigerant enters the separator.

19. The term 'separating assembly' denotes means for separating the liquid and vapor phases of wet refrigerant vapor that does not include a vessel for storing liquid refrigerant. A separating assembly may be an integral part of a separator.

20. The term '2-port separating assembly' denotes a separating assembly having a first set of one or more ports through which usually wet refrigerant vapor enters the assembly and liquid refrigerant exits the assembly, and a separate second set of one or more ports through which refrigerant vapor exits the assembly, the refrigerant vapor exiting the assembly usually being drier than the refrigerant vapor entering the assembly. A 2-port separating assembly almost always includes separating surfaces.

21. The term '3-port separating assembly' denotes a separating assembly having a first set of one or more ports through which usually wet refrigerant vapor enters the assembly; a separate second set of one or more ports through which refrigerant vapor exits the assembly, the refrigerant vapor exiting the assembly usually being drier than the refrigerant vapor entering the assembly; and a separate third set of one or more ports through which liquid refrigerant exits the assembly. A 3-port separating assembly may include no separating surfaces other than the internal surfaces of the assembly's refrigerant passages, and may, for example, merely be a shallow V-tube having the first set of one or more ports essentially at the top of one of the two arms of the vee, the second set of one or more ports essentially at the top of the other arm of the vee, and the third set of one or more a ports essentially at the bottom of the vee.

22. The term 'separating device' in this DESCRIPTION, and synonymously the term 'separating means' in the CLAIMS, denotes means for separating the liquid and vapor phases of wet refrigerant vapor. A separating device or means may be (1) a separator which includes a distinguishable separating assembly, (2) a separator which has no distinguishable separating assembly, or (3) a separating assembly.

23. The term 'refrigerant-circuit' denotes a fluid circuit around which, whenever appropriate, a refrigerant circulates.

24. The term 'refrigerant line' denotes a conduit for transferring refrigerant between components such as heat exchangers, separators, separating assemblies, refrigerant valves, refrigerant pumps, and receivers (see definition 41).

25. The term 'refrigerant-circuit segment' denotes a part of a refrigerant circuit. A refrigerant-circuit segment may include several refrigerant lines connected in parallel, or the refrigerant passages of several similar, or several dissimilar, components, connected in parallel. These components include refrigerant valves (see definition 29), heat exchangers, separators, refrigerant pumps (see definition 33), and receivers (see definition 41).

26. The term 'refrigerant space' denotes an enclosed space containing essentially only refrigerant. The term 'refrigerant space' subsumes the space inside a refrigerant line, and the space inside a refrigerant passage of a heat exchanger, a refrigerant pump, or a refrigerant valve.

27. The term 'refrigerant enclosure' denotes a structure delineating the bounds of a set of one or more fluidly-connected refrigerant spaces containing in essence only refrigerant.

28. The term 'valve' denotes a device by which the flow of a fluid, in its liquid or in its vapor phase, can be started, stopped, or regulated, by any known means capable of exerting a force on the particular fluid in the valve's one or more fluid passages. Examples of such a force include a mechanical, a magneto-hydrodynamic, an electro-dynamic, an electro-osmotic, and a capillary, force. Where the force is a mechanical force, the flow of the fluid through the valve's one or more fluid passages is started, stopped, or regulated, by a movable mechanical part which respectively opens, shuts, or partially obstructs, the valve's one or more fluid passages. The term 'valve', where the force is a mechanical force, includes an actuator for controlling the position of the movable mechanical part.

29. The term 'refrigerant valve' denotes a valve where the fluid whose flow is controlled by the valve is a refrigerant in its liquid or in its vapor phase, and where the one or more fluid passages are refrigerant passages.

30. The term 'pump' denotes a device for generating an increase in fluid pressure causing a fluid to flow in a desired direction. A pump has one or more fluid passages through which the fluid flows while the pump is active. A pump may be driven by any known means capable of exerting a force on the particular fluid in the pump's one or more fluid passages. Examples of such a force include a mechanical, a pneumatic, an hydraulic, a magneto-hydrodynamic, an electro-dynamic, an electro-osmotic, and a capillary, force. Where (1) means used to drive a pump is used exclusively to drive the pump and the pump is not driven by any other means, the term 'pump' includes the pump-driving means; and where (2) means used to drive a pump is also used for another purpose, or is merely an alternative means for driving a pump, the term 'pump' excludes the one or more pump-driving means. An example of the case recited under (1) in the present definition is an electric motor used to drive a pump where the electric motor is used exclusively to drive the pump; an example of the former of the two cases recited under (2) in the present definition is an engine used to drive a vehicle which is also used to drive a pump; and an example of the latter of the two cases recited under (2) in the present definition is a pump driven by an engine used to drive a vehicle and alternatively by an electric motor.

31. The term 'inherent capacity', where the subject is a pump, denotes the fluid mass-flow rate induced by the pump, through the pump's one or more fluid passages under the action of the device or means driving the pump, for a given fluid pressure at the point where a fluid enters the pump's one or more fluid passages and for a given fluid-pressure rise in the pump's one or more fluid passages. The inherent capacity of a pump may, for a given fluid density, be essentially constant, or the inherent capacity of a pump may, for a given fluid density, be varied by the device driving the pump. In the particular case where the pump exerts a mechanical force on the fluid flowing through its one or more fluid passages, the pump's inherent capacity can be varied, for example, by one or more of the three techniques known as pump-speed control, pump-vane control, and on-off control. The fluid mass-flow rate delivered, under the earlier-cited fluid-pressure conditions in this definition, at a given point by a pump with a constant inherent capacity, or with a variable inherent capacity, may be modified by using a flow-control valve in series with the pump, or a flow-control valve in parallel with the pump. I shall refer to the latter valve as a 'pump-recirculation valve'. (Pump-recirculation valves may be an integral part of a pump.)

32. The term 'effective capacity' where the subject is a pump, denotes the fluid mass-flow rate delivered by a pump at a given fluid-circuit segment cross-section after the inherent capacity of the pump has been modified by the pump's recirculation valve or by a flow-control valve upstream from the given segment. The flow-control valve is, depending on the type of pump, located upstream from or downstream from the pump.

33. The term 'refrigerant pump' denotes a pump causing liquid refrigerant to flow through a refrigerant-circuit segment in a desired direction. A refrigerant pump has one or more refrigerant passages through which liquid refrigerant flows while the refrigerant pump is active.

34. The term 'refrigerant principal circuit' denotes a refrigerant circuit which includes the one or more refrigerant passages of an evaporator, and the one or more refrigerant passages of a condenser, (where the evaporator and the condenser are principal heat exchangers).

35. The term 'refrigerant auxiliary circuit' denotes a refrigerant circuit, other than a refrigerant principal circuit. A refrigerant auxiliary circuit may include the one or more refrigerant passages of an evaporator and no condenser refrigerant passages; or the one or more refrigerant passages of a condenser and no evaporator refrigerant passages; or no evaporator or condenser refrigerant passages. Refrigerant circulating around an auxiliary refrigerant circuit remains in the same fluid phase during a circulation cycle; whereas refrigerant circulating around a refrigerant principal circuit changes—during each circulation cycle—at least in part, under most operating conditions, from the refrigerant's liquid phase to the refrigerant's vapor phase and from the refrigerant's vapor phase back to the refrigerant's liquid phase.

36. The term 'forced refrigerant-circulation principal circuit', or more briefly, 'FRC principal circuit', denotes a refrigerant principal circuit around which a refrigerant circulates continuously or intermittently, primarily under the forced action of a refrigerant pump, while the refrigerant is transferring heat from a heat source to a heat sink.

37. The term 'natural refrigerant-circulation principal circuit', or more briefly, 'NRC principal circuit', denotes a refrigerant auxiliary circuit around which a refrigerant circulates usually continuously, solely under the combined action of gravity and of the heat supplied by a heat source, while the refrigerant is transferring heat from the heat source to a heat sink.

38. The term 'forced refrigerant-circulation auxiliary circuit', or more briefly, 'FRC auxiliary circuit', denotes a refrigerant circuit around which a refrigerant circulates continuously or intermittently, primarily under the forced action of a pump, while the refrigerant is transferring heat from a heat source to a heat sink.

39. The term 'natural refrigerant-circulation auxiliary circuit', or more briefly, 'NRC auxiliary circuit', denotes a refrigerant auxiliary circuit around which a refrigerant circulates usually continuously, solely under the combined action of gravity and of heat supplied by a heat source, while the refrigerant is transferring heat from the heat source to a heat sink.

40. The term 'refrigerant principal configuration', or more briefly 'principal configuration', denotes a material structure for transferring heat from one or more heat sources to one or more heat sinks; the configuration comprising (a) a refrigerant;
(b) one or more refrigerant circuits having one and only one refrigerant principal circuit;
(c) one or more hot principal heat exchangers and one or more cold principal heat exchangers, each having one or more refrigerant passages which are a part of at least one of the one or more refrigerant circuits, the hot principal heat exchangers including an evaporator and the cold principal heat exchangers including a condenser; and
(d) one or more additional components—such as separating devices, refrigerant valves, refrigerant pumps, and receivers (see definition 41)—having one or more spaces or passages which are a part of the one or more refrigerant circuits, the one or more additional components excluding refrigerant-vapor expanders performing work and refrigerant-vapor compressors.

I emphasize that the term 'refrigerant principal configuration', or more briefly 'principal configuration' as used in this DESCRIPTION and in the CLAIMS denotes a material structure and is an abbreviation c, for the more cumbersome term 'refrigerant-principal-configuration structure'. I shall refer to the heat source from which the refrigerant in (the one or more refrigerant passages of) a hot heat exchanger of a principal configuration absorbs heat as the hot heat exchanger's heat source; and to the heat sink to which the refrigerant in (the one or more refrigerant passages of) a cold heat exchanger releases heat as the cold heat exchanger's heat sink. I note that the heat source of a hot heat exchanger of a principal configuration may be the refrigerant of another principal configuration; and I note that the heat sink of a cold heat exchanger of a principal configuration may also be the refrigerant of another principal configuration.

41. The term 'liquid-refrigerant receiver', or more briefly 'receiver', denotes a vessel for storing, whenever appropriate, liquid refrigerant, provided the vessel is not a part of a separator.

42. The term '1-port receiver', or equivalently 'surge-type receiver', denotes a receiver having a single set of one or more ports through which liquid refrigerant enters and exits the receiver.

43. The term '2-port receiver', or equivalently 'feed-through receiver', denotes a receiver having a first set of one or more ports through which refrigerant condensate enters the receiver, and a second set of one or more ports through which liquid refrigerant, stored in the receiver, exits the receiver.

44. The term 'refrigerant-vapor transfer means' denotes means, including one or more distinguishable refrigerant spaces, for transferring refrigerant vapor exiting a principal configuration's one or more evaporator refrigerant passages to the principal configuration's one or more condenser refrigerant passages. In particular, the term 'refrigerant-vapor transfer means' may, for example, (1) merely consist of a single refrigerant line, not excluding an essentially zero-length refrigerant line such as a port; or (2) may include space inside a separating device occupied by refrigerant vapor, one or more refrigerant lines for transferring refrigerant vapor exiting the one or more evaporator refrigerant passages to the separating device, and one or more refrigerant lines for transferring refrigerant vapor from the separating device to the one or more condenser refrigerant passages; the one or more refrigerant lines not excluding refrigerant lines forming a manifold.

45. The term 'liquid-refrigerant principal transfer means' denotes means, including one or more distinguishable refrigerant spaces, for transferring liquid refrigerant exiting a principal configuration's one or more condenser refrigerant passages to the principal configuration's one or more evaporator refrigerant spaces. In particular, the term 'liquid-refrigerant principal transfer means' may, for example, (1) merely consist of a single refrigerant line; (2) may include a refrigerant line and the one or more refrigerant passages of a refrigerant pump and/or the one or more refrigerant passages of a refrigerant valve; or (3) may include a receiver not excluding a 1-port receiver, the one or more refrigerant passages of a refrigerant pump, a refrigerant line for transferring liquid refrigerant from the receiver to the one or more refrigerant-pump refrigerant passages, one or more refrigerant lines for transferring liquid refrigerant exiting one or more condenser refrigerant passages to the receiver, and one or more refrigerant passages for transferring liquid refrigerant from the one or more refrigerant-pump refrigerant passages to the one or more evaporator refrigerant passages; the last-cited one or more refrigerant lines not excluding & refrigerant lines forming a manifold.

46. The term 'liquid-refrigerant auxiliary transfer means' denotes means for transferring liquid refrigerant, the means including one or more distinguishable refrigerant spaces which (1) are a part of a refrigerant principal configuration, but which (2) are not a part of a liquid-refrigerant principal transfer means. An important example of a liquid-refrigerant auxiliary transfer means is means for transferring liquid refrigerant from the separating device of a principal configuration to one or more points of the configuration's refrigerant principal circuit. Such a liquid-refrigerant auxiliary transfer means may, for instance, consist of (1) merely a single refrigerant line; (2) several refrigerant lines forming a manifold; or (3) the one or more refrigerant passages of an evaporator-overfeed pump, a refrigerant line for transferring liquid refrigerant from the separating device to the one or more refrigerant passages of the evaporator-overfeed pump, and one or more refrigerant lines for transferring liquid refrigerant from the one or more refrigerant passages of the evaporator-overfeed pump to one or more evaporator refrigerant passages, the one or more refrigerant lines not excluding refrigerant lines forming a manifold.

47. The term 'type 1 evaporator refrigerant auxiliary circuit' denotes, in a principal configuration having several refrigerant circuits, a refrigerant auxiliary circuit which includes the one or more refrigerant passages of the configuration's evaporator; and which excludes (a) the one or more refrigerant passages of the configuration's condenser, and (b) the one or more refrigerant-pump refrigerant passages which are a part of the configuration's refrigerant principal circuit.

48. The term 'type 2 evaporator refrigerant auxiliary circuit' denotes, in a principal configuration with several refrigerant circuits, a refrigerant auxiliary circuit which includes the one or more refrigerant passages of the configuration's evaporator and the one or more refrigerant-pump refrigerant passages which are a part of the configuration's refrigerant principal circuit; and which excludes the one or more refrigerant passages of the configuration's condenser.

49. The term 'evaporator refrigerant auxiliary circuit' denotes a member of the family of all refrigerant auxiliary circuits consisting of type 1 evaporator refrigerant auxiliary circuits and type 2 evaporator refrigerant auxiliary circuits.

50. The term 'type 1 separator' denotes all 3-port and 4-port separators having two sets of ports which are a part of a type 1 evaporator refrigerant auxiliary circuit.

51. The term 'type 2 separator' denotes all 3-port and 4-port separators having two sets of ports which are a part of a type 2 evaporator refrigerant auxiliary circuit.

52. The term 'type 1' separator' denotes all 2-port and 3*-port separators having no set of ports which is a part of an evaporator refrigerant auxiliary circuit.

53. The term 'type 1 separating assembly' denotes a 3-port separating assembly having two sets of ports which are a part of a type 1 evaporator refrigerant auxiliary circuit.

54. The term 'type 2 separating assembly' denotes a 3-port separating assembly having two CD sets of ports which are a part of a type 2 evaporator refrigerant auxiliary circuit.

55. The term 'type 1' separating assembly' denotes a 2-port separating assembly having no set of ports which is a part of an evaporator refrigerant auxiliary circuit.

56. The term 'type 1 separating device or means' denotes a type 1 separator or a type 1 separating assembly.

57. The term 'type 2 separating device or means' denotes a type 2 separator or a type 2 separating assembly.

58. The term 'type 1' separating device or means' denotes a type 1' separator or a type 1' separating assembly.

59. The term 'subcooler refrigerant auxiliary circuit' denotes a refrigerant auxiliary circuit which includes (1) the one or more refrigerant passages of a subcooler of a principal configuration, and (2) the one or more refrigerant passages of a refrigerant pump of the configuration; and which excludes (1) the one or more refrigerant passages of the configuration's evaporator, and (2) the one or more refrigerant passages of the configuration's condenser.

60. The term 'condensate-return pump', or more briefly 'CR pump', denotes a refrigerant pump having one or more refrigerant passages which are a part of a refrigerant principal circuit and of no other refrigerant circuit.

61. The term 'evaporator-overfeed pump', or more briefly 'EO pump', denotes a refrigerant pump having one or more refrigerant passages which are a part of a type 1 evaporator refrigerant auxiliary circuit and of no other refrigerant circuit.

62. The term 'dual-return pump', or more briefly 'DR pump', denotes a refrigerant pump having one or more refrigerant passages which are a part of a refrigerant principal circuit and of a type 2 evaporator refrigerant auxiliary circuit belonging to the same principal configuration as the refrigerant principal circuit, and which are a part of no other refrigerant circuit.

63. The term 'subcooler-circulation pump', or more briefly 'SC pump', denotes a refrigerant pump having one or more refrigerant passages which are a part of a subcooler refrigerant auxiliary circuit and of no other refrigerant circuit.

64. The term 'hybrid-flow pump', or more briefly 'HF pump', denotes a refrigerant pump having one or more refrigerant passages which are a part of a refrigerant principal circuit and of a subcooler refrigerant auxiliary circuit belonging to the same principal configuration as the refrigerant principal circuit, and which are a part of no other refrigerant circuit.

65. The term 'principal-circulation pump', or more briefly 'PC pump', denotes a refrigerant pump having one or more refrigerant passages which are a part of a refrigerant principal circuit. The one or more refrigerant passages of a principal-circulation pump may, for example, be (1) a part of no other refrigerant circuit, as in the case of a condensate-return pump; (2) also a part of a type 2 evaporator refrigerant auxiliary circuit of the same principal configuration, as in the case of a dual-return pump; or (3) also a part of a certain type of subcooler refrigerant auxiliary circuit of the same principal configuration, as in the case of a hybrid-flow pump.

66. The term 'liquid-refrigerant reservoir', or more briefly 'LR reservoir', denotes a vessel for storing liquid refrigerant, the vessel not being a part of a principal configuration.

67. The term 'liquid-refrigerant ancillary transfer means', or more briefly 'ancillary transfer means', denotes means for transferring liquid refrigerant from an LR reservoir to a principal configuration and for transferring liquid refrigerant from the principal configuration to the LR reservoir. An ancillary transfer means usually includes one or more refrigerant lines, and may also include the one or more refrigerant passages of one or more refrigerant pumps, and/or the one or more refrigerant passages of a refrigerant valve. However, an ancillary transfer means may sometimes merely be a port through which liquid refrigerant, in the LR reservoir, flows into the principal configuration's one or more refrigerant circuits, and through which liquid refrigerant, in the principal configuration's one or more refrigerant circuits, flows into the LR reservoir.

68. The term 'liquid-transfer pump', or more briefly 'LT pump', denotes a refrigerant pump having one or more refrigerant passages which are a part of an ancillary transfer means and of no other liquid-refrigerant transfer means.

69. The term 'refrigerant ancillary configuration', or more briefly 'ancillary configuration', denotes a material structure for storing liquid refrigerant and for transferring liquid refrigerant between the ancillary configuration's LR reservoir and a principal configuration; the ancillary configuration comprising the LR reservoir and an ancillary transfer means, and no principal heat exchanger.

70. The term 'refrigerant configuration' denotes a material structure consisting in essence of a single principal configuration and one or more ancillary configurations, and having only one refrigerant enclosure.

71. The term 'airtight refrigerant configuration' denotes a refrigerant configuration having a refrigerant enclosure (a) from which essentially all air has been removed;

(b) from which, after the enclosure has been charged with the correct amount of refrigerant mass, essentially no refrigerant escapes (except in the case of failure); and (c) into which, after the enclosure has been charged with the correct amount of refrigerant mass, essentially no air enters (except in the case of failure) either because (1) the refrigerant's pressure at each point of the enclosure always stays above the current pressure of air outside the enclosure at the selfsame point, or because (2) the refrigerant enclosure is made of airtight components joined together so that essentially no air can enter the enclosure even at a point where the refrigerant's pressure (inside the enclosure) is below the current pressure of air outside the enclosure at the selfsame point.

The qualifier 'essentially', used under (a) in the present definition, signifies that the amount of air remaining in the refrigerant enclosure—after the action recited under (a)—is small enough not to affect adversely significantly the heat-transfer effectiveness of, or the refrigerant in, the airtight refrigerant configuration. {Essentially all air may be removed from the refrigerant enclosure by using any known means, including a vacuum pump or a scavenging gas (which may be the refrigerant's vapor.)} The qualifier 'essentially', used under (b) in the present definition, signifies that the rates at which refrigerant escapes—including during occasional purges of non-condensable gases—from the refrigerant enclosure are low enough for no make-up refrigerant to be needed for typically several years (after the time at which the refrigerant enclosure was charged with refrigerant). And the qualifier 'essentially', used under (c) in the present definition, signifies the rates at which air enters the refrigerant enclosure are low enough for the resulting increase in the mass of air contained in it not to affect adversely significantly the heat-transfer effectiveness of, or the refrigerant in, the airtight refrigerant configuration for typically several years.

72. The term 'inert gas' denotes a gas which does not react chemically in a significantly adverse manner with the refrigerant employed, or with the internal surfaces of the walls of an airtight enclosed space within which the refrigerant and the inert gas are contained, during the operating life of the equipment having the airtight enclosed space. Consequently, the term 'inert gas', used in this DESCRIPTION and in the CLAIMS, not only denotes gases usually referred to as inert (such as the noble gases); but also denotes gases such as hydrogen and $CO_2$, or gases such as multi-element gases containing hydrogen and $CO_2$, where they do not react chemically in a significantly adverse manner with the refrigerant, or with the internal surfaces of the walls of an airtight enclosed space within which the refrigerant and the inert gas are contained, during the operating life of the equipment having the airtight enclosed space. In particular, the term 'inert gas' includes a gas containing a significant amount of oxygen at the time the gas is inserted in an enclosed space—made immediately thereafter airtight—even where the walls of the enclosed space include one or more metals; provided (1) the refrigerant's heat-transfer properties are essentially unaffected, and provided (2) the one or more metals have essentially not been corroded, by the time essentially all the inserted oxygen has been absorbed by the one or more metals. Thus air may—depending on the refrigerant employed, and on the surfaces with which the refrigerant is in direct contact—be an inert gas. The term 'inert gas' also denotes a gas which does not condense over the entire range of operating and environmental conditions experienced by airtight configurations (see definition 86) containing an inert gas.

73. The term 'inert-gas reservoir', or more briefly 'IG reservoir', denotes a vessel for storing inert gas; but may contain refrigerant vapor mixed primarily with the inert gas, and may even contain liquid refrigerant.

74. The term 'gas-transfer valve', or more briefly 'GT valve', denotes a valve where the fluid whose flow is controlled by the valve is an inert gas, and where the one or more fluid passages are inert-gas passages interconnecting two spaces containing inert gas.

75. The term 'gas-transfer pump', or more briefly 'GT pump', denotes a pump for causing inert gas to flow in a desired direction. A GT pump has one or more inert-gas passages through which inert gas flows while the GT pump is active.

76. The term 'condensate-type refrigerant-vapor trap' denotes means for removing refrigerant vapor from a fluid which is a mixture of inert gas and refrigerant vapor, the means including means for condensing at least a portion of the refrigerant vapor mixed with the inert gas. A condensate-type refrigerant-vapor trap has a first set of one or more ports through which the inert-gas and refrigerant-vapor enters the trap, and a separate second set of one or more ports through which inert gas, or inert gas and refrigerant vapor, exit the trap. Where inert gas and refrigerant vapor exit a condensate-type refrigerant-vapor trap the mass-flow rate at which refrigerant vapor exits the trap is, under most operating conditions, lower than the mass-flow rate at which refrigerant vapor enters the trap. A condensate-type refrigerant-vapor trap may also have a separate third set of one or more ports through which liquid refrigerant exits the trap. In condensate-type refrigerant-vapor traps having no third set of ports, liquid refrigerant, generated in the traps, exit the traps through their first set of one or more ports.

77. The term 'inert-gas line' denotes a conduit for transferring inert gas, or a mixture of inert gas and refrigerant vapor, between the components of an airtight configuration. An inert-gas line may at times also contain a small amount of liquid refrigerant.

78. The term 'inert-gas transfer means', or more briefly 'IG transfer means', denotes means for transferring inert gas from an IG reservoir to a principal configuration's one or more refrigerant circuits. An IG transfer means usually includes one or more inert-gas lines; and may also (1) include the one or more inert-gas passages of one or more GT pumps, and/or the one or more inert-gas passages of one or more gas-transfer valves; and/or (2) the one or more inert-gas passages of a condensate-type refrigerant-vapor trap.

79. The term 'inert-gas configuration', or more briefly 'IG configuration', denotes a material structure for storing inert gas, and for controlling the transfer of inert gas between the IG configuration and the one or more refrigerant circuits of a principal configuration. An IG configuration includes an IG reservoir, and active means for causing said inert-gas transfer. The inert gas may, in at least a part of an IG configuration, be mixed with refrigerant vapor.

80. The term 'inert-gas passive configuration', or more briefly 'IGP configuration', denotes a material structure for storing inert gas and for transferring inert gas between the IGP configuration and the one or more refrigerant circuits of a principal configuration, the IGP configuration including no active means for causing said inert-gas transfer. Consequently, the IG transfer means of an IGP configuration includes no GT-pump inert-gas passages and no GT-valve inert-gas passages. However, an IGP configuration may include one or more valves which perform a different function from that of a GT valve. Examples of non-GT valves are charging, purging, and pressure-relief valves.

81. The term 'refrigerant & inert-gas space' or more briefly 'R&IG space', denotes an enclosed space containing essentially only refrigerant and inert gas.

82. The term 'refrigerant & inert-gas enclosure', or more briefly 'R&IG enclosure', denotes a structure determining the bounds of a set of fluidly-connected R&IG spaces containing collectively in essence only refrigerant and inert gas.

83. The term 'refrigerant & inert-gas configuration', or more briefly 'R&IG configuration', denotes a material structure consisting in essence of (a) a single principal configuration and one or more IG configurations, or of (b) a single principal configuration, one or more IG configurations, and one or more ancillary configurations;

and having only one R&IG enclosure.

84. The term 'refrigerant and inert-gas passive configuration', or more briefly 'R&IGP configuration' denotes a material structure consisting in essence of (a) a single principal configuration and one or more IGP configurations, or of (b) a single principal configuration, one or more IGP configurations, and one or more ancillary id configurations;

and having only one R&IG enclosure.

85. The modifier 'airtight' (1) in the term 'airtight refrigerant & inert-gas configuration', or ore briefly 'airtight R&IG configuration', or (2) in the term 'airtight refrigerant and inert-gas passive configuration', or more briefly 'airtight R&IGP configuration', denotes respectively an R&IG configuration, or an R&IGP configuration, having an R&IG enclosure (a) from which, after the enclosure has been charged with the correct amounts of refrigerant and inert gas, essentially no refrigerant or inert gas escapes (except in the case of failure); and (b) into which, after the enclosure has been charged with the correct amount of refrigerant mass, essentially no air enters (except in the case of failure) either because (1) the total pressure of the refrigerant and the inert gas, at each point of the enclosure, always stays above the current pressure of the air outside the enclosure at the selfsame point, or because (2) the R&IG enclosure is made of components joined together so that essentially no air can enter the enclosure even at a point where the total pressure of the refrigerant and the inert gas (inside the enclosure) is below the current pressure of air outside the enclosure at the selfsame point.

The qualifier 'essentially', used under (a) in the present definition, signifies that the rates at which refrigerant, or inert gas, escapes—including during occasional purges of non-condensable gases—from the refrigerant enclosure are low enough for no make-up refrigerant and no make-up inert gas to be needed for typically several years (after the time at which the refrigerant enclosure was charged with refrigerant and inert gas). And the qualifier 'essentially', used under (b) in the present definition, signifies the rates at which air enters the refrigerant enclosure are low enough for the resulting increase in the mass of air contained in it not to affect adversely significantly the heat-transfer effectiveness, the refrigerant, or the inert gas, in the R&IG enclosure for typically several years.

86. The term 'airtight configuration' denotes an airtight refrigerant configuration, an airtight R&IG configuration, or an airtight R&IGP configuration.

87. The term 'supplementary-configuration means' in the CLAIMS denotes a refrigerant ancillary configuration, an IG configuration, or an IGP configuration.

88. The term 'inside', where the subject is an airtight refrigerant configuration, is an abbreviation for the phrase 'inside the refrigerant enclosure of the airtight refrigerant configuration'. The term 'inside', where the subject is an airtight R&IG configuration, is an abbreviation for the phrase 'inside the R&IG enclosure of the airtight R&IG configuration'. The term 'inside', where the subject is an airtight R&IGP configuration, is an abbreviation for the phrase 'inside the R&IGP enclosure of the airtight R&IGP configuration'. Lastly, the term 'inside', where the subject is an airtight configuration, is an abbreviation for, as applicable, the phrases 'inside the airtight refrigerant configuration', 'inside the airtight R&IG configuration', or 'inside the airtight R&IGP configuration'.

89. The term 'total pressure', where the subject is an airtight configuration, a principal configuration, a refrigerant ancillary configuration, an IG configuration, or an IGP configuration, denotes the sum of the partial refrigerant pressure and the partial inert-gas pressure inside one of the five last-cited configurations.

90. The term 'airtight two-phase heat-transfer system' denotes a system which includes an airtight configuration.

91. The term 'supercharger' denotes any device employed to increase the pressure, and hence the density, of the combustion or intake air supplied to an internal combustion engine. In particular, the term 'supercharger' includes a mechanically-driven supercharger, and an exhaust-gas-driven supercharger, usually referred to as a 'turbocharger'.

92. The term 'hot fluid' denotes a heat source of an airtight configuration, or more specifically a heat source of an airtight configuration's principal configuration. A hot fluid may be a liquid, a gas, or a fluid which changes from its vapor to its liquid phase while it releases heat. In the last of the just-cited three cases the hot fluid may, in particular, be the refrigerant of another airtight configuration. A hot fluid of an airtight configuration transmits heat to the airtight configuration's refrigerant through one or more of the three modes of heat transfer known in the art as conduction heat transfer, convection heat transfer, and radiation heat transfer.

93. The term 'cold fluid' denotes a heat sink of an airtight configuration, or more specifically of a heat sink of the airtight configuration's principal configuration. A cold fluid may be a liquid, a gas, or a fluid which changes from its liquid to its vapor phase while it absorbs heat. In the last of the just-cited three cases the cold fluid may, in particular, be the refrigerant of another airtight configuration. The refrigerant of an airtight configuration transmits heat to a cold fluid of the airtight configuration through one or more of the three modes of heat transfer known in the art as conduction heat transfer, convection heat transfer, and radiation heat transfer.

94. The terms 'hot-fluid valve' and 'cold-fluid valve' denote a valve where the fluid whose flow is controlled by the valve is respectively a hot fluid and a cold fluid, in either their liquid or their vapor phase, and where the one or more fluid passages are respectively hot-fluid passages and cold-fluid passages.

95. The terms 'hot-fluid pump' and 'cold-fluid pump' denote a pump for causing respectively a hot fluid and a cold fluid—in either their liquid or their vapor phase—to flow in a desired direction. The device has one or more fluid passages through which the hot or cold fluid flows while the device is active.

96. The term 'motor' denotes any means for generating mechanical power irrespectively of the source of energy transformed by the motor into mechanical power. Thus, for example, the term 'motor' subsumes an internal-combustion engine and an electric motor.

97. The term 'signal' denotes any means—including electrical, pneumatic, and hydraulic means—for transmitting information about a thing, and in particular information relating to the current value of a parameter characterizing the state of the thing; or for transmitting information about a required action to be performed by an active device—and in particular about the action to be performed by a refrigerant pump or by a refrigerant valve.

98. The term 'transducer' denotes any means for transforming a parameter characterizing state of a thing—and in particular of a refrigerant—into a signal representing the current value the thing's characterizing parameter.

99. The term 'control unit' denotes a unit which receives signals from transducers and, on the basis of instructions stored in the unit, generates signals controlling the activities of one or more controllable elements such as pumps and valves. A control unit is usually a microcontroller, with a self-checking capability, having a microprocessor, a read-only memory for storing preselected instructions, a random-access memory for storing signals received by the control unit, and analog and/or digital input-output units for receiving signals from transducers and for supplying signals to one or more controllable elements and to system-status indicators. I distinguish between (1) a principal control unit, referred to in this DESCRIPTION as a 'central control unit', or more briefly as a 'CCU', because it corresponds to the central control units of the systems disclosed in my co-pending U.S. patent application Ser. No. 400,738, filed 30 Aug. 1989, and (2) a 'minimum-pressure-maintenance control unit', or more briefly an 'MPMCU', used only to control a system of the invention while the system's principal configuration is inactive.

100. The term 'active', where used to indicate the state of a principal configuration, denotes that refrigerant is circulating at a significant rate around at least one of the principal configuration's refrigerant circuits.

101. The term 'inactive', where used to indicate the state of a principal configuration, denotes that refrigerant is circulating at a significant rate around none of the principal configuration's one or more refrigerant circuits.

102. The term 'void fraction', where the subject is a point along and inside a refrigerant line or a refrigerant passage, denotes the proportion of space occupied by refrigerant vapor at said point, the void fraction being zero where no refrigerant vapor is present and unity where no liquid refrigerant is present.

103. The term 'flooded', where the subject is a point on the one or more refrigerant-side heat-transfer surfaces of the condenser of a principal configuration, denotes, (a) where the one or more refrigerant-side heat-transfer surfaces are the one or more internal surfaces—including extended internal surfaces—of a tube or duct, that the void fraction in the tube or duct is zero in the immediate neighborhood of the point; and (b) where the one or more refrigerant-side heat-transfer surfaces are the one or more external surfaces—including extended external surfaces—of a tube or duct, that the one or more external surfaces of the tube or duct are immersed in liquid refrigerant in the immediate neighborhood of the point.

104. The term 'pre-prescribed', where used to qualify the way in which something occurs, denotes that way has been specified during the design of a system of the invention. And the term 'certain pre-prescribed', where used to qualify operating conditions of a system of the invention, denotes the operating conditions have been specified during the design of the system.

105. The term 'characterizing parameter' denotes a parameter providing information about the state of a thing; and in particular the state of (1) an airtight configuration; (2) a heat source of an airtight configuration; (3) the equipment in which the heat source is located; (4) a heat sink of an airtight configuration; (5) the equipment in which the heat sink is located; or (6) the environment of an airtight configuration, where the term 'environment' is defined in definition (112). Where an airtight configuration is a refrigerant configuration, the state of an airtight configuration includes the state of the airtight configuration's structure and the state of the airtight configuration's refrigerant; and where an airtight configuration is an R&IG configuration, the state of the airtight configuration includes the state of the airtight configuration's refrigerant, and the state of the airtight configuration's inert gas. (A characterizing parameter may merely be the position of a manually-operated on-off switch.)

106. The term 'preselected' where used to qualify the value of a parameter characterizing the state of a thing, or to specify an operating condition, or a range of operating conditions, denotes that the value of the parameter, the operating condition, or the range of operating conditions, respectively, has been specified during the design of a system of the invention. The preselected value of a characterizing parameter—where not otherwise stated or obvious from the context—may be (1) a single value, (2) a value below a preselected upper limit, (3) a value above a preselected lower limit, or (4) a value between a preselected upper limit and a preselected lower limit. A preselected single value, a preselected upper limit, or a preselected lower limit, may (1) be fixed, (2) have a range of manually selectable fixed values, or (3) change with time in a pre-prescribed way as a function of one or more preselected characterizing parameters.

107. The term 'preselected range of operating conditions', and the term 'preselected range of environmental conditions', where the subject is an airtight configuration, denote respectively the entire range of operating conditions under which the airtight configuration is designed to function and the entire range of environmental conditions under which the airtight configuration has a specified property; the preselected range of operating conditions and environmental conditions being specified, during the airtight configuration's design, in terms of preselected ranges for the values of one or more preselected characterizing parameters.

108. The term 'steady-state conditions', where the subject is an airtight configuration, denotes operating conditions under which all characterizing parameters affecting refrigerant flow, and where applicable inert-gas flow, in the airtight configuration, change at a negligible rate compared to the slowest response rate of the airtight configuration's one or more refrigerant circuits, and where applicable inert-gas circuits.

109. The term 'transient conditions', or more briefly 'transient', where the subject is an airtight configuration, denotes operating conditions under which at least one characterizing parameter affecting refrigerant flow, and where applicable inert-gas flow, changes at a faster rate than the slowest response rate of the airtight configuration's one or more refrigerant circuits, and where applicable inert-gas circuits.

110. Each of the two terms 'upstream' and 'downstream' denotes the relative location of two points, or of two components, with respect to the direction of flow of, as applicable, a refrigerant, an inert gas, a hot fluid, or a cold fluid. The last-cited two terms apply to the case where, as applicable, the refrigerant, the hot fluid, or the cold fluid, flows in only one direction under steady-state conditions, and refer to the direction of flow of respectively the refrigerant, the hot fluid, or the cold fluid, under those conditions.

111. The term 'amount of liquid' denotes the volume occupied by a liquid.

112. The term 'heating load' denotes the rate at which heat is transmitted from a heat source to a refrigerant. (A heat source may be a refrigerant.)

113. The term 'cooling load' denotes the rate at which heat is transmitted from a refrigerant. (A heat sink may be a refrigerant.)

114. The term 'environment', where the subject is an airtight configuration, denotes the one or more contiguous and/or remote material substances which surround an airtight configuration, and which collectively determine the temperature to which the airtight configuration's refrigerant tends while the refrigerant's circulation is zero around all of the one or more refrigerant circuits of the airtight configuration's principal configuration. For example, in most applications where an airtight configuration is located inside a building, the airtight configuration's environment is the air inside that building in direct contact with the airtight configuration; and the walls, ceiling, and floor, with which the airtight configuration exchanges heat. And, in the case where the airtight configuration is located in an open space, the airtight configuration's environment is the air in direct contact with the airtight configuration; and the bodies, including celestial bodies, outside the airtight configuration with which the airtight configuration exchanges heat.

115. The term 'controllable element' in this DESCRIPTION, and synonymously the term 'controllable means' in the CLAIMS, denotes an active device which can be controlled by a signal. Examples of controllable elements or means are refrigerant pumps and valves, hot-fluid pumps and valves, cold-fluid pumps and valves, controllers of electric motors or of the burners of a boiler, and electrical switches for starting and stopping internal-combustion engines. A controllable element or means may be a part of a system of the invention, or of another system with which a system of the invention interacts. In either of the two cases cited in the immediately-preceding sentence, a controllable element or means (1) may be controlled exclusively by a system of the invention or only in part by a system of the invention, or (2) may not be controlled by a system of the invention even though it is a part of a system of the invention. The signal cited in this definition 113 includes a signal generated by a transducer which is an integral part of the controllable element or means, as for example in the case where the controllable element is a thermostat.

116. The term 'system-controllable element' in the DESCRIPTION, and synonymously the term 'system-controllable means' in the CLAIMS, denotes a controllable element or means which is controlled at least in part by the system. A system-controllable element or means may be a part of a system of the invention, or of another system with which the system of the invention interacts. Where in this DESCRIPTION it is obvious that a controllable element is a system-controllable element I shall simply refer to a system-controllable element as a 'controllable element'. Examples of cases where a controllable element is obviously a system-controllable element include the cases where a controllable element is described as being controlled, or is shown in the FIGURES as being controlled, by a signal supplied by a central control unit, or by a minimum-pressure-maintenance control unit, of the system.

117. In the context of a system of the invention, (1) the term 'control mode' denotes a set of one or more preselected rules for controlling one or more system-controllable elements or means, the set of one or more preselected rules including a single rule for controlling each system-controllable element or means in a pre-prescribed way as a function of one or more preselected characterizing parameters; (2) the expression 'has several control modes' denotes the system includes means for executing each of the several control modes; and (3) the expression 'is in a control mode' denotes the system is executing a control mode. 'A preselected rule' may be an instruction stored in a control unit; or may be, as for example in the case of a thermostat, a rule inherent in the design of a system-controllable element or means. In the context of a system of the invention having several control modes and in the context of a recited system action, the expression 'in at least one of several control modes' denotes the system executes the recited action in at least one of the system's one or more control modes. The term 'control mode' may include a set of one or more rules requiring none of the one or more system-controllable elements or means to be controlled by the system.

118. In the context of a system of the invention (1) the term 'transition rule' denotes a set of one or more preselected rules for changing from one of the system's several control modes to another of the system's several control modes; and (2) the expression 'has several transition rules' denotes the system includes means for executing each of the several transition rules. The term 'transition rule' may include a set of one or more preselected rules for changing (1) from a control mode where none of the the one or more system-controllable elements or means is controlled by the system to another control mode where at least one of the one or more system-controllable elements or means is controlled by the system; and (2) from a control mode where at least one of the one or more system-controllable elements or means is controlled by the system to a control mode where none of the system-controllable elements or means is controlled by the system.

119. The term 'system-control means', in the CLAIMS, denotes the devices employed to control the system-controllable elements or means of a system of the invention, and subsumes, where applicable, a central control unit, a minimum-pressure-maintenance control unit, one or more transducers, and the means used to control the one or more system-controllable elements or means of the system. Where a system-controllable element or means of a system of the invention is controlled by a transducer and an actuator which are an integral part of the system-controllable element or means, the transducer and the actuator of the system-controllable means are a part of the system-control means of the system to which the system-controllable means belongs. An example of a system-controllable element or means having its own transducer and actuator is a thermostatically-controlled valve.

120. The term 'and/or' denotes, as applicable, that two or more material things referred to may be, or may not be, located in the selfsame structure; or that two or more events, or two or more actions, referred to may occur, or may not occur, simultaneously.

121. The term 'major paragraph' denotes text in this DESCRIPTION between a heading and a horizontal line consisting of dashes, or text between two horizontal lines consisting of dashes.

122. The term 'minor paragraph' denotes in this DESCRIPTION a subparagraph within a major paragraph.

123. The term 'one or more airtight refrigerant circuits' denotes a set of one or more refrigerant circuits which ingest essentially no ambient air after they have been charged with refrigerant.

124. The phrase 'an airtight configuration having an enclosure' denotes that an airtight configuration has a refrigerant enclosure (see definition 27) or an R&IG enclosure (see definition 82).

125. The phrases 'inside an airtight configuration' and 'inside the airtight configuration' are abbreviations for respectively the phrases 'inside the enclosure of an airtight configuration' and 'inside the enclosure of the airtight configuration'.

126. The term 'refrigerant-circuit configuration' is in essence synonymous with the term 'refrigerant principal configuration'. The only difference between the last two terms is that the former term is used where a system of the invention has no supplementary-configuration means (see definition 87) fluidly connected to a refrigerant-circuit configuration, whereas the latter term is used to denote a refrigerant-circuit configuration of a system of the invention fluidly connected to supplementary-configuration means.

127. The term 'evacuated refrigerant-circuit configuration' denotes a refrigerant-circuit configuration having a refrigerant enclosure (a) from which essentially all air has been removed;

(b) from which, after the enclosure has been charged with the appropriate amount of refrigerant mass, essentially no refrigerant escapes (except in the case of failure); and (c) into which, after the enclosure has been charged with the appropriate amount of refrigerant mass, essentially no air enters (except in the case of failure) either because (1) the pressure of the refrigerant in the enclosure always stays above ambient atmospheric pressure, or because (2) the enclosure is made of airtight components joined together so that essentially no air can enter into the enclosure even when the pressure of the refrigerant in the enclosure is below ambient atmospheric pressure.

The term 'evacuated refrigerant circuit' may, where desired, be used to emphasize that a refrigerant circuit belongs to an evacuated refrigerant-circuit configuration. The qualifier 'essentially' used under (a) above in the present definition signifies that the amount of air remaining in the enclosure of an evacuated refrigerant-circuit configuration, after "essentially all air is removed", is small enough for the remaining air not to affect adversely significantly the performance of the evacuated refrigerant-circuit configuration. Essentially all air may be removed from the enclosure of a refrigerant-circuit configuration by using any known method and means. For example, air may be removed by a vacuum pump or by flushing air out of the enclosure with a gas. The qualifier 'essentially' used under (b) above in the present definition signifies that the rates at which refrigerant escapes—including during occasional purges of non-condensable gases—from the enclosure of a correctly constructed evacuated refrigerant-circuit configuration are low enough for self-regulation to be achieved, without the need for make-up refrigerant, for typically several years after the time at which the enclosure was charged with an appropriate amount of refrigerant mass. And the qualifier 'essentially' used under (c) above in the present definition signifies that the rates at which air enters the enclosure of a correctly constructed evacuated refrigerant-circuit configuration are low enough for the resulting increase in the amount of air contained in the enclosure not to affect adversely significantly the performance of the configuration for typically several years after the time at which the enclosure was charged with an appropriate amount of refrigerant mass.

128. The term 'evacuated configuration' denotes an airtight refrigerant configuration, or an evacuated refrigerant-circuit configuration.

129. The term 'active', where used to indicate the state of an evacuated configuration, denotes that refrigerant is circulating at a significant rate around at least one of the evacuated configuration's refrigerant circuits.

130. The term 'inactive', where used to indicate the state of an evacuated configuration, denotes that refrigerant is circulating at a significant rate around none of the evacuated configuration's one or more refrigerant circuits.

B. General Purposes of the Invention

A first general purpose of the invention is to devise airtight configurations (see definitions) and control techniques for endowing airtight two-phase heat-transfer systems with a property named 'minimum-pressure maintenance'. This property ensures, broadly speaking, that the pressure inside an entire airtight configuration, or inside a part of an airtight configuration, is maintained at or above a preselected minimum pressure, higher than the refrigerant's lowest saturated-vapor pressure while the airtight configuration's principal configuration is inactive and while the airtight configuration is in thermal equilibrium with its environment. For example, in the case where an airtight configuration's lowest thermal equilibrium temperature with its environment is 0° C. while it is inactive, and where the configuration's refrigerant is water, the refrigerant's lowest saturated-vapor pressure is 0.61 kPa, and the preselected minimum pressure would be higher than 0.61 kPa. (0.61 kPa is the saturated-vapor pressure of water corresponding to 0° C.) I distinguish, as explained in section III,D, between 'complete minimum-pressure maintenance' and 'partial minimum-pressure maintenance'.

A second general purpose of the invention is to devise airtight configurations and control techniques for endowing airtight configurations with one or more of the properties named 'freeze protection', 'self regulation', 'refrigerant-controlled heat release', 'gas-controlled heat release', 'refrigerant-controlled heat absorption', and 'evaporator liquid-refrigerant injection'; and to devise evacuated configurations and control techniques for endowing evacuated configurations with the property named 'evaporator liquid-refrigerant injection'.

Other important purposes of the invention will be disclosed later in this DESCRIPTION.

The eight properties cited in this section III,B are disclosed and discussed in sections III,D to III,H. I note that the three properties named 'complete minimum-pressure maintenance', 'partial minimum-pressure maintenance', and 'freeze protection', pertain to airtight configurations while their principal configuration is inactive. The other five of the eight properties cited in this section pertain to airtight configurations while their principal configuration is active.

C. Scope of the Invention

The invention disclosed in this DESCRIPTION covers two-phase heat-transfer systems that include an airtight configuration, or an evacuated configuration, and associated control system for transferring heat from one or more heat sources to one or more heat sinks and for achieving at least one of the eight properties cited in section III,B. The term 'two-phase heat-transfer systems includes 'two-phase heat-transfer heating systems' and 'two-phase heat-transfer cooling systems' where the qualifiers 'heating' and 'cooling' indicate the primary purpose of a two-phase heat-transfer system. I shall, in this DESCRIPTION, use the terms 'two-phase heating systems' and 'two-phase cooling systems' as abbreviations for respectively the terms 'two-phase heat-transfer heating systems' and 'two-phase heat-transfer cooling systems'. It follows that the two last-cited abbreviations do not include heat pumps and refrigerators.

The airtight configurations used in systems of the invention are combinations of (a) a principal configuration and an ancillary configuration, and no IG or IGP configuration {see definitions (40), (69), (79), and (80)};
(b) a principal configuration, an ancillary configuration, and an IG or an IGP configuration; or
(c) a principal configuration and an IG or an IGP configuration, and no ancillary configuration.

I shall refer to the combination specified under (a) (in the immediately-preceding minor paragraph) as a 'type A combination'; to the combination specified under (b) as a 'type B combination'; and to the combination specified under (c) as a 'type C combination'.

All airtight configurations of the invention have, by definition, only a single principal configuration. However type A combinations may have one or more ancillary configurations; type B combinations may have one or more ancillary configurations and one or more IG or IGP configurations; and type C combinations may have one or more IG or IGP configurations.

Many systems of the invention, in addition to including one or more airtight configurations, also include the parts of other material structures cooperating with the airtight configurations to achieve at least one or more of the eight properties recited in section III,B. Those parts include control units and components (including their associated supporting structures) cooperating with the one or more airtight configurations. Examples of such cooperative components include equipment generating certain heat sources, such as the burners of boilers, hot-fluid pumps such as the burners' blowers, and cold-fluid pumps such as the fans of fan-coil units and the radiators of internal-combustion-engines.

An airtight configuration of the invention, or an evacuated configuration of the invention, has one or more hot heat exchangers and one or more cold heat exchangers. I shall refer to the heat source from which the refrigerant in (the one or more refrigerant passages of) a hot heat exchanger absorbs heat as the 'hot heat exchanger's heat source'; and, where the heat exchanger is an evaporator, a preheater, or a superheater, I shall refer to the heat source as the 'evaporator's heat source', as the 'preheater's heat source', or as the 'superheater's heat source', respectively. And I shall refer to the heat sink to which the refrigerant in (the one or more refrigerant passages of) a cold heat exchanger releases heat as the 'cold heat exchanger's heat sink'; and where the heat exchanger is a condenser, a subcooler, or a desuperheater, I shall refer to the heat sink as the 'condenser's heat sink', as the 'subcooler's heat sink', or as the 'desuperheater's heat sink', respectively. The hot heat exchangers of an airtight configuration of the invention may have the same heat source or different heat sources; and similarly the cold heat exchangers of an airtight configuration of the invention may have the same heat sink or different heat sinks.

All hot heat exchangers of an airtight configuration of the invention have, by definition, one or more refrigerant passages wherein the refrigerant absorbs heat, released by the hot heat exchanger's heat source, while the airtight configuration to which the hot heat exchanger belongs has an active principal configuration. And all cold heat exchangers of an airtight configuration have one or more refrigerant passages wherein the refrigerant releases heat, absorbed by the cold heat exchanger's heat sink, while the airtight configuration to which the cold heat exchanger belongs has an active principal configuration.

In applications where the heat source of a hot heat exchanger is a hot fluid which is at least in part in direct contact with the walls of the hot heat exchanger's (one or more) refrigerant passages, the hot heat exchanger usually has one or more surfaces which bound one or more enclosed spaces or one or more open spaces, named 'fluid ways', to which the hot fluid—while the airtight configuration to which the hot heat exchanger belongs is active—releases heat absorbed by refrigerant in the hot heat exchanger's refrigerant passages. Similarly, in applications where the heat sink of a cold heat exchanger is a cold fluid which is at least in part in direct contact with the walls of the cold heat exchanger's (one or more) refrigerant passages, the cold heat exchanger usually has one or more surfaces which bound one or more enclosed spaces or one or more open spaces, named 'fluid ways', from which the cold fluid—while the airtight configuration to which the cold heat exchanger belongs is active—absorbs heat released by refrigerant in the cold heat exchanger's refrigerant passages. Examples of enclosed spaces, in the sense intended by me, are the space inside a tube or inside a rectangular duct; the space inside an annulus formed by concentric tubes; the space between the internal surface(s) of an open or a closed cylinder and the external surfaces of several interconnected tubes inside the cylinder; and the space between the internal surface(s) of an open or a closed rectangular duct and the external surfaces of several rectangular ducts inside the rectangular duct. And examples of open spaces, in the sense intended by me, are the space inside a building or the space inside a room of a building, the space outside a building, the space inside a water reservoir, and the space occupied by a lake.

A heat source of a hot heat exchanger of an airtight configuration of the invention is always also a heat source of the airtight configuration, or more specifically of the airtight configuration's principal configuration; and a heat sink of a cold heat exchanger of the airtight configuration is always also a heat sink of the airtight configuration, or more specifically of the airtight configuration's principal configuration. Thus the set of one or more heat sources of an airtight configuration of the invention, or equivalently of the airtight configuration's principal configuration, is the set of the one or more heat sources of the airtight configuration's one or more hot heat exchangers; and the set of one or more heat sinks of the airtight configuration, or equivalently of the airtight configuration's principal configuration, is the set of the one or more heat sinks of the airtight configuration's one or more cold heat exchangers.

The heat source of a hot heat exchanger may be a material substance remote from the hot heat exchanger. Examples of remote heat sources are the sun, flames, and high-temperature metal slabs and rods not in contact with the refrigerant passages of the hot heat exchanger. The heat source may also be a material substance at least in part contiguous to, or in the fluid ways of, a hot heat exchanger. Examples of the latter heat source include (a) material substances with a finite thermal capacity which release heat without changing phase, such as (1) the combustion gas of a fossil fuel, including the combustion gas of an internal combustion engine and the combustion gas of a boiler or a furnace, (2) the gas generated during an exothermic industrial process in a furnace, (3) the flue gas of a steam boiler, hot water boiler, or a hot air furnace, (4) the exhaust gas of a gas turbine, (5) the fluid (gas or liquid) used in an industrial process, and (6) a solid being cooled;
(b) material substances with a finite thermal capacity which release heat at least in part while changing phase, such as (1) the working fluid in a steam engine's condenser, and (2) a salt used to store heat;
(c) a nuclear fuel generating heat by fission or fusion;
(d) electrical and electronic equipment such as (1) electric heating elements, (2) the windings of an electric motor or of an electric generator, (3) electronic equipment, and (4) transformers;
(e) infrared and photovoltaic arrays and radio-active isotope generators;
(f) material substances having a quasi-infinite thermal capacity, such as the earth's atmosphere, the sea, a large lake, a large water reservoir, or a large geothermal heat source.

The heat sink of a cold heat exchanger may be, for example, a material substance, such as an extra-terrestrial body or a terrestrial body (such as the wall of a room) remote from the system: or it may be a material substance, at least in part, contiguous to or in the fluid ways of the cold heat exchanger. Examples of the latter heat sink include (a) material substances with a finite thermal capacity which absorb heat without changing phase, such as
  (1) the fossil fuel or combustion air supplied to a boiler, a furnace or a gas turbine,
  (2) hot water or hot air supplied to an industrial process or used to heat a building,
  (3) material, used in an industrial process, which is undergoing an endothermic reaction,
  (4) a solid being heated;
(b) material substances with a finite thermal capacity which absorb heat at least in part while changing phase, such as
  (1) water in a steam boiler,
  (2) a salt used to store heat,
  (3) $H_2O$ coming out of solution in the generator of a lithium-bromide refrigeration absorption system;
(c) material substances having a quasi-infinite thermal capacity, such as the earth's atmosphere, the sea, a large lake, or a large water reservoir.

Heat may be transmitted from a hot heat exchanger's heat source to refrigerant in the hot heat exchanger, and from refrigerant in a cold heat exchanger to the cold heat exchanger's heat sink, by radiation, convection, or conduction, or by a combination of any two, or of all three, of the foregoing heat-transmittal mechanisms. For example, in the case where the heat source is the sun and the one or more refrigerant passages of a hot heat exchanger are made of glass transparent to thermal radiation, heat is transmitted from the heat source to the refrigerant in the hot heat exchanger essentially only by radiation; and, in the case where the heat source is the flame and combustion gas in a fired steam boiler (having refrigerant passages exposed to radiation from the flame), heat is transmitted from the heat source to the refrigerant in the boiler by radiation, convection, and conduction.

Airtight configurations, or evacuated configurations, of the invention not only include configurations employing a refrigerant whose refrigerant pressure is below ambient atmospheric pressure while they are inactive, but also configurations employing a refrigerant whose pressure stays below ambient atmospheric pressure while they are active. In particular, airtight refrigerant configurations of the invention include airtight refrigerant configurations, employing $H_2O$ as their refrigerant, that operate exclusively at subatmospheric pressures. Such configurations, in contrast to non-airtight refrigerant configurations employing $H_2O$ as their refrigerant, need no vacuum pump to operate at subatmospheric pressures.

The refrigerant used in an airtight configuration, or an evacuated configuration, of the invention may be, in principle, any fluid whose liquid and vapor phases can coexist over the entire range of operating refrigerant evaporation temperatures of interest in the particular application considered. The phrase 'any fluid' is intended to include not only single-component fluids, and (multi-component) azeotropic fluids, which evaporate at a single (sensible) temperature at a given pressure, but also (multi-component) non-azeotropic fluids which evaporate over a range of temperatures at a given pressure.

Examples of single-component or azeotropic refrigerants which are in principle suitable for the systems of the present invention include refrigerants suitable for heat pipes, tube thermo-siphons, loop thermosiphons, and heat pumps.

A partial list of single-component and azeotropic refrigerants which have been considered for, or used in, heat pipes and heat pumps is given respectively in P. D. Dunn and D. A. Reay, 'Heat Pipes', 2nd Edition, published 1969 by Pergamon Press (London), see page 293; and 'Thermodynamic Properties of Refrigerants', published 1969 by ASHRAE (New York), see Table of Contents. And a partial list of non-azeotropic, non-aqueous refrigerants which have been considered for heat pumps is given in a paper by Prof. Thore Bentsson and Dr. Hans Schnitzer, 'Some Technical Aspects on Nonazeotropic Mixtures as Working Fluids', presented in September 1984 at the International Symposium on 'The Large Scale Applications of Heat Pumps' organized and sponsored by BHRA, The Fluid Engineering Centre, Cranfield, Bedford, England. In addition to the fluids listed in the papers cited in this minor paragraph, a number of non-azeotropic aqueous refrigerants are in principle suitable for the systems of the present invention. These include aqueous solutions of glycol, ethanol, methanol, or acetone. Some of the foregoing azeotropic-like refrigerants—such as chlorofluorocarbons—are no longer acceptable, but I envisage the evacuated configurations of the invention employing acceptable substitutes such as Isceon 69S.

In practice, the usefulness of a refrigerant for a given application is limited by a number A of constraints. For example, the refrigerant evaporation pressures, and the refrigerant saturated-vapor specific volumes, corresponding to the refrigerant evaporation and condensation temperatures of interest must not be unacceptably high; the refrigerant must not decompose chemically at the highest temperatures which may occur while the system, in which the refrigerant is employed, is active or is inactive; and the cost of the system's refrigerant must not be unacceptably high.

The materials from which the inside surfaces of the walls of the refrigerant passages of an airtight configuration, or an evacuated configuration, of the invention are made must be compatible with their refrigerant. And, where heat-exchanger refrigerant passages of the configuration come into direct contact with a heat source or a heat sink, the materials from which the outside surfaces of the walls of these refrigerant passages are made must also be compatible with the heat source or the heat sink. The term 'compatible' is used herein to indicate that the materials from which refrigerant passages are made have no unacceptable adverse effect on the refrigerant, the heat source, or the heat sink; and also, conversely, to indicate that the refrigerant, the heat source, or the heat sink, have no unacceptable adverse effect on the materials from which the walls of refrigerant passages are made.

A system of the invention having several airtight configurations may use (a) the same kind of refrigerant in all the system's airtight configurations, or (b) different kinds of refrigerants in each of the system's airtight configurations;

and may have (a) the same set of one or more heat sources, or the same set of one or more heat sinks, or both, for all the system's airtight configurations, or (b) different sets of one or more heat sources, or different sets of one or more heat sinks, or both, for each of the system's airtight configurations.

Furthermore, a heat source of an airtight configuration of a system of the invention may be the refrigerant of another airtight configuration of the same system; and a heat sink of an airtight configuration of a system of the invention may be the refrigerant of another airtight configuration of the same system.

The systems of the invention may be used in a land vehicle, a surface vehicle, a submerged vehicle, or an airborne vehicle—as well as in a fixed ground installation—provided these systems are not required to operate efficiently whilst the vehicle in which they are installed is undergoing a steady-state acceleration having a substantial component normal to the local gravitational field or a substantial component parallel and opposite to this field. What constitutes a 'substantial' component depends on the particular system considered, but a component, to be substantial, might often have to be as large as 0.5 g, 0.75 g, or even larger.

Systems of the invention comprise systems having a heat source controlled in part or entirely by them as well as a heat source not controlled by them. The equipment associated with the former heat source is usually a part of a system of the invention; whereas the equipment associated with the latter heat source is usually not a part of a system of the invention. Examples of heat sources which are controlled by, and which—together with their associated equipment—are entirely a part of, a system of the invention comprise finite thermal-capacity heat sources such as the combustion gases of a steam boiler of the invention used to heat buildings or to supply heat to industrial processes. And examples of heat sources which are not controlled by a system of the invention include (a) finite thermal-capacity heat sources such as the combustion gases inside the cylinders of an internal-combustion engine or the combustion gases of a conventional steam boiler, and such as the exhaust gases of a gas turbine or a blast furnace, or the flue gases of a conventional steam boiler; and (b) quasi-infinite thermal-capacity heat sources such as the sun and the sea.

I note that, in the particular case where a system of the invention is used to cool an internal combustion engine, the engine's coolant passages (which constitute the system's evaporator) are a part of the system, although the entire engine is not a part of the system.

Systems of the invention also comprise systems having a heat sink controlled by them as well as heat sinks not controlled by them. The former heat sink—and its associated equipment—is usually a part of a system of the invention; whereas the latter heat sink—and most or all of its associated equipment—is not a part of a system of the invention.

D. Minimum-pressure Maintenance

1. General Remarks

Minimum-pressure maintenance may, as mentioned in section III,B, be complete or partial. The qualifier 'complete' denotes that the internal pressure inside an entire airtight configuration always stays at or above a preselected minimum pressure; and the qualifier 'partial' denotes that the internal pressure inside only a part of an airtight configuration always stays at or above a preselected minimum pressure. The latter property is useful where only a part of an airtight configuration would be subjected to an unacceptably high net external pressure, or would ingest air, if its internal pressure fell substantially below a preselected minimum pressure. Examples of such a part are an air-cooled condenser which would be subjected to unacceptably high crushing pressures, or a refrigerant pump with mechanical seals through which air would be ingested, if the internal pressure of those parts fell substantially below a preselected minimum pressure above the lowest refrigerant saturated-vapor pressure inside an airtight configuration while the configuration is inactive.

2. Type A Combinations

Complete minimum-pressure maintenance is achieved with type A combinations by (a) filling completely their principal configuration with liquid refrigerant, supplied by its associated ancillary configuration, just before, at the time, or soon after, the principal configuration becomes inactive, (b) keeping their principal configuration filled completely with liquid refrigerant, at an internal pressure no less than a preselected minimum pressure, while the principal configuration remains inactive, and (c) transferring back to the ancillary configuration excess liquid refrigerant just before, at the time, or soon after, the principal configuration becomes active.

The phrase 'excess liquid refrigerant' refers to the amount of liquid refrigerant in the principal configuration in excess of the appropriate amount of liquid refrigerant for achieving preselected requirements, including freeze protection, preselected specific self-regulation conditions, preselected heat-release control conditions, or preselected heat-absorption control conditions.

Partial minimum-pressure maintenance is achieved with type A combinations by (a) isolating with two or more closed refrigerant valves one or more refrigerant-circuit segments of their principal configuration just before, at the time, or soon after, the principal configuration becomes inactive;

(b) filling completely the one or more refrigerant-circuit isolated segments with liquid refrigerant, and keeping them filled with liquid refrigerant at an internal pressure no less than a preselected minimum pressure while the principal configuration remains inactive; and (c) opening the one or more refrigerant valves just before, at the time, or soon after, the principal configuration becomes active and removing the amount of liquid refrigerant in the principal configuration in excess of the appropriate amount of liquid refrigerant for achieving, as applicable, preselected specific self-regulation conditions, preselected heat-release conditions, or preselected heat-absorption conditions.

3. Type B and C Combinations

Complete minimum-pressure maintenance is achieved with type B and C combinations by (a) inserting in their principal configuration (essentially) inert gas, supplied by its associated IG or IGP configuration, just before, at the time, or soon after, the principal configuration becomes inactive, (b) keeping enough inert gas in the principal configuration to ensure the configuration's internal pressure does not fall below a preselected minimum pressure while the configuration remains inactive, and (c) transferring back to the IG or to the IGP configuration essentially all or a part of the inert gas in the principal configuration just before, at the time, or soon after, the principal configuration becomes active.

Partial minimum-pressure maintenance is achieved with type C combinations by (a) isolating with two or more closed refrigerant valves one or more refrigerant-circuit segments of their principal configuration just before, at the time, or soon after, the principal configuration becomes inactive;

(b) inserting enough inert gas in the one or more isolated refrigerant-circuit segments to ensure the one or more segments' internal refrigerant pressure does not fall below a preselected minimum pressure while the configuration remains inactive; and (c) transferring back to the IG or to the IGP configuration essentially all the inert gas in the principal configuration just before, at the time, or soon after, the principal configuration becomes active.

Inert-gas transfer between a principal and an IG configuration is controlled primarily by one or more controllable elements of the IG configuration; whereas inert-gas transfer between a principal and an IGP configuration is controlled primarily by the total pressure in the one or more refrigerant circuits of the principal configuration.

Partial minimum-pressure maintenance is achieved in type B combinations either in the way it is achieved in type A combinations or in the way it is achieved in type C combinations.

E. Freeze Protection

The purpose of freeze protection is to prevent liquid refrigerant freezing in the principal configuration of an airtight configuration while the entire principal configuration, or while one or more parts of the principal configuration, are exposed to refrigerant subfreezing temperatures.

Freeze protection with a type A or with a type B combination is achieved in essence by (a) using an LR reservoir large enough to store all liquid refrigerant that is located inside the combination's principal configuration, and that could be exposed to refrigerant subfreezing temperatures while the principal configuration is inactive;

(b) ensuring the LR reservoir is located in a space whose temperature exceeds the refrigerant's freezing temperature;

(c) removing from the principal configuration all liquid refrigerant that could be exposed to refrigerant subfreezing temperatures when or soon after the principal configuration becomes inactive and storing the liquid refrigerant removed in the LR reservoir;

(d) preventing, while the principal configuration is inactive, an amount of liquid refrigerant, large enough to cause damage, returning—by gravity, or by diffusion and condensation, or both—from the LR reservoir to the principal configuration; and by (e) transferring from the LR reservoir to the principal configuration, when or soon after the principal configuration becomes active, an amount of liquid refrigerant that ensures the principal configuration contains the appropriate amount of refrigerant mass for the desired operating mode and the prevailing operating conditions.

I note that the kind of freeze-protection method just outlined differs considerably from the freeze-protection method recited in section III,F of my co-pending U.S. patent application Ser. No. 400,738, filed 30 Aug. 1989: the former method stores liquid refrigerant that could be exposed to subfreezing temperatures outside the principal configuration whereas the latter method stores liquid refrigerant that could thus be exposed inside the principal configuration.

F. Self Regulation

1. General Remarks

Techniques, named 'self-regulation techniques' have been devised by me to ensure, broadly speaking, that a principal configuration transfers heat—under pre-prescribed operating conditions—efficiently over the entire range of those operating conditions. I have named the property achieved by using self-regulation techniques 'self regulation'.

Self regulation of a principal configuration is achieved by (a) correctly configuring and sizing the configuration, (b) controlling correctly, where applicable, the configuration's one or more refrigerant pumps and also, where applicable, the configuration's one or more refrigerant valves, and by (c) charging the configuration with an appropriate amount of refrigerant mass.

The self-regulation techniques devised by me for achieving self regulation, with the principal configuration of an airtight configuration, take advantage of the fact that—in contrast to principal configurations of non-airtight principal configurations such as those used in conventional steam-heating systems—no need exists (a) to provide and control the supply of make-up refrigerant to ensure the principal configuration remains charged with an appropriate amount of refrigerant mass, and (b) to provide control techniques for coping with the presence—especially immediately following activation (start-up)—of a significant amount of air in the refrigerant circuits of principal configurations belonging to non-airtight configurations.

Self regulation of a principal configuration is defined precisely in terms of a preselected set of 'specific self-regulation conditions' formulated for a particular heat-transfer application. However, these specific conditions always satisfy collectively, in the case of a principal configuration with an FRC principal circuit, four conditions, named 'universal self-regulation conditions', which do not depend on the particular application considered. Only the first three of the four universal self-regulation conditions apply to a principal configuration with an NRC principal circuit. The four universal self-regulation conditions are discussed next.

2. Universal Self-regulation Conditions

The four universal self-regulation conditions require—for a pre-prescribed set of operating conditions—the refrigerant flow, in a principal configuration with a principal refrigerant pump, to be controlled so that, with the principal configuration charged with an appropriate amount of refrigerant mass, (A) the amount of liquid refrigerant, in the one or more refrigerant passages of the configuration's evaporator, is large enough to preclude refrigerant vapor, exiting the one or more evaporator refrigerant passages, being superheated by an amount exceeding a preselected superheat upper limit which can be chosen to be in essence equal to zero;

(B) refrigerant vapor, entering the one or more refrigerant passages of the configuration's condenser, has a quality above or equal to a preselected lower limit which may be chosen in essence equal to unity;

(C) the amount of liquid refrigerant, backing-up into the one or more condenser refrigerant passages, is small enough to preclude the area of the one or more condenser refrigerant-side heat-transfer surfaces, flooded by the backing-up liquid refrigerant, exceeding a preselected flood upper limit which may be chosen equal to zero, and (D) the configuration's principal-circulation pump has an available net positive suction head high enough to preclude it cavitating significantly.

I note that the term 'essentially dry' in the second self-regulation condition denotes that the amount of liquid refrigerant entering the condenser's refrigerant passages is not large enough to degrade the condenser's performance significantly, but does not preclude the amount of liquid refrigerant in the refrigerant vapor being detectable by known means. I also note that the third self-regulation condition is in essence equivalent to requiring that the amount of liquid refrigerant backing-up into the one or more condenser refrigerant passages be small enough to preclude liquid refrigerant, exiting the one or more condenser refrigerant passages, being subcooled—as a result of the liquid refrigerant back-up—by an amount exceeding a preselected subcool upper limit which may be chosen in essence equal to zero.

I shall refer individually to the four universal self-regulation conditions just recited as 'self-regulation conditions (A), (B), (C), and (D)', respectively. And I shall say that a principal configuration with an FRC principal circuit 'achieves self regulation', or alternatively 'is in its self-regulation mode', when the four self-regulation conditions are satisfied irrespectively of whether all preselected specific self-regulation conditions for that configuration are satisfied. And I shall further say that an airtight configuration 'achieves self regulation' or alternatively 'is in its self-regulation mode' if the airtight configuration's principal configuration achieves self regulation or is in its self-regulation mode; and that an airtight configuration satisfies a particular self-regulation condition when the airtight configuration's principal configuration satisfies that particular condition.

The foregoing four conditions, irrespectively of the specific self-regulation conditions selected for a particular heat-transfer application, can be achieved without using a refrigerant-vapor throttling valve; thereby allowing—for the entire pre-prescribed operating conditions—the absolute value of the difference between (a) the pressure of the refrigerant exiting the one or more refrigerant passages of the evaporator, and (b) the pressure of the refrigerant entering the one or more refrigerant passages of the condenser, to be maintained below a pre-selected upper limit having a finite value, including an arbitrarily small finite value. (The absolute value of the last-cited pressure difference can be maintained below an arbitrarily small finite value by using, for the passages through which refrigerant vapor is transferred from the evaporator to the condenser, cross-sectional areas large enough for the total friction-induced pressure drop in these passages to be maintained below that arbitrarily small finite value.)

I note that self-regulation conditions (A) to (C) can be achieved by principal configurations, having an FRC principal circuit, with far fewer spatial constraints than by principal configurations having an NRC principal circuit. In particular, the former configurations can satisfy self-regulation conditions (A) to (C) with their condenser below as well as above, or at the same height as, their evaporator; whereas the latter configurations cannot satisfy self-regulation conditions (A) to (C) with their condenser below their evaporator, and this makes the latter systems unsuitable for many important applications.

I also note that a principal configuration having an FRC principal circuit, may often be preferable to a principal configuration having an NRC principal circuit even in applications where the configuration's condenser may be, or is required to be, placed above the configuration's evaporator. Examples of such applications include applications where the condenser of a principal configuration with an NRC principal circuit would have to be placed at an unacceptably-great height—say at a height of over ten meters—above the evaporator of the principal configuration to allow the net refrigerant static head in the NRC principal circuit to overcome the total friction-induced pressure drop around this circuit. (The total friction-induced pressure drop around an NRC principal circuit may be high because the refrigerant mass-flow rate per unit refrigerant passageway cross-sectional area is high in the evaporator refrigerant passages, or in the condenser refrigerant passages, or in both, because of system requirements.)

3. Specific Self-regulation Conditions

Each specific self-regulation condition is expressed in terms of a preselected quantity, named a 'self-regulation quantity', and a preselected constraint on the current value of that quantity. This constraint may be expressed in any one of the following four ways:

(a) a desired value of the current value of the self-regulation quantity, (b) a desired upper limit and a desired lower limit within which the current value is required to stay, (c) a desired upper limit below which the current value is required to stay, or (d) a desired lower limit above which the current value is required to stay.

The self-regulation quantities chosen for a set of specific self-regulation conditions may, even in the absence of a refrigerant auxiliary circuit, include (a) the amount $Q^*_1$ by which refrigerant vapor is superheated at a preselected location, along the principal configuration's refrigerant-vapor transfer means; or (b) the amount $Q^*_2$ by which liquid refrigerant is subcooled at a preselected location, along the principal configuration's liquid-refrigerant principal transfer means; or (c) both the specific self-regulation conditions just recited under (a) and (b).

In the case where a principal configuration has an evaporator refrigerant auxiliary circuit, the self-regulation quantities, chosen from a set of specific self-regulation conditions, may also include the ratio $Q^*_3$ of refrigerant mass-flow rate through the one or more refrigerant passages of the configuration's evaporator to refrigerant mass-flow rate through the one or more refrigerant passages of the configuration's condenser. And, in the case where, for example, the principal configuration also has a subcooler refrigerant auxiliary circuit, the self-regulation quantities chosen for a set of specific self-regulation conditions may further include the ratio $Q^*_4$ of refrigerant mass-flow rate through the one or more refrigerant passages of the configuration's subcooler to refrigerant mass-flow rate through the one or more refrigerant passages of the configuration's condenser. In the former of the last two cases an EO pump would usually be employed, and the specific self-regulation conditions would almost always include a condition requiring the EO pump not to cavitate significantly under pre-prescribed operating conditions. In the latter of the last two cases, an SC pump is used and the specific self-regulation conditions would almost always include a condition requiring the SC pump not to cavitate significantly under pre-prescribed operating conditions.

The foregoing four specific self-regulation quantities are intended to be only illustrative examples of self-regulation quantities and not to constitute an exhaustive list of these quantities.

The pre-selected specific self-regulation quantity may be (a) a function of one or more 'internal characterizing parameters', namely of one or more of several parameters characterizing an airtight configuration's state;

(b) a function of one or more 'external characterizing parameters', namely of one or more of several parameters characterizing an airtight configuration's one or more heat sources, and where applicable associated equipment; an airtight configuration's one or more heat sinks, and where applicable associated equipment; or an airtight configuration's environment; or (c) a function of both one or more internal characterizing parameters and one or more external characterizing parameters.

And the desired value of, or the desired limits or limit for, a self-regulation quantity may have a preselected fixed value, or may have a value which changes in a pre-prescribed way as a function of one or more preselected characterizing parameters (which need not include the characterizing parameters in terms of which the self-regulation quantity is expressed).

Internal characterizing parameters are those characterizing the state of a thing which is a part of an airtight configuration. This thing is usually the airtight configuration's enclosure or the airtight configuration's refrigerant. Examples of parameters characterizing an airtight configuration's enclosure are its temperature at a location of the enclosure. And examples of parameters characterizing the state of the refrigerant are (a) a measure of (the height of) the level (with respect to a reference level) of the refrigerant liquid-vapor interface surface in the configuration's receiver or in the configuration's separator; and, where identifiable, in the configuration's evaporator or the configuration's condenser;

(b) a measure of refrigerant flow rate at a location in the configuration; and (c) a measure of the refrigerant pressure or refrigerant temperature at a location inside the configuration, or a measure of the change in refrigerant pressure or refrigerant temperature between two separate locations inside the configuration.

External characterizing parameters are those characterizing the state of a thing which is not a part of an airtight configuration. Examples of things which are not a part of an airtight configuration are a heat source, a heat sink, and ambient air, of the configuration. In applications where a heat source is a fluid, referred to henceforth as a 'hot fluid', and a heat sink is also a fluid, referred to henceforth as a 'cold fluid', examples of parameters characterizing the hot fluid and the cold fluid are:

(a) a measure of the flow rate, temperature, or pressure, of the hot fluid or of the cold fluid at a given location, or equivalently at a given point; and (b) a measure in the change of the flow rate, temperature or pressure, of the hot fluid or of the cold fluid between two different locations, or equivalently between two different points.

The measures of internal or of external characterizing parameters recited in the immediately-preceding two minor paragraphs may be direct measures or indirect measures. Examples of indirect measures are:

(a) The evaporation temperature of an azeotropic-like refrigerant in an airtight configuration is—under steady-state conditions—an indirect measure of the condensation temperature in the airtight configuration in cases where the refrigerant's saturated-vapor temperature drop in the configuration's refrigerant-vapor transfer means is negligible.

(b) The (total) refrigerant mass-flow rate through the evaporator refrigerant passages of an airtight configuration, with no evaporator refrigerant auxiliary circuit, is—under steady-state conditions—an indirect measure of the (total) refrigerant mass-flow rate through the condenser refrigerant passages of the configuration.

(c) The speed of a low-slip positive-displacement pump is an indirect measure of the volumetric-flow rate of the liquid flowing through the pump and an indirect measure—albeit sometimes a less accurate one—of the mass-flow rate of the liquid flowing through the pump.

Most techniques used for satisfying a set of specific self-regulation conditions consist in essence in (a) specifying (1) the characterizing parameters in terms of which the self-regulation quantity is to be expressed, (2) the functional relationship between the specified characterizing parameters and the self-regulation quantity, and (3) the desired value, or the desired limit or limits, as applicable, chosen to constrain the values assumed by the self-regulation quantity; and in (b) providing means for (1) determining the current values of the preselected characterizing parameters, (2) computing the current value of the specified self-regulation quantity in terms of the current values of the preselected characterizing parameters in accordance with the pre-prescribed functional relationship, (3) storing the desired value, or the desired limit or limits, under (a)(3) above (in this minor paragraph) and comparing the current value of the self-regulation quantity with the desired value, or the desired limits or limit, under (a)(3) above; and for (4) controlling the refrigerant flow so that—within the bounds imposed by internal and external constraints—the current value of the self-regulation quantity tends toward the desired value for this quantity, or tends to assume a current value within the range of current values allowed by the desired limits or limit.

The choice of a set of specific self-regulation conditions for a particular heat-transfer application depends greatly, but not solely, (a) on pertinent facts about the refrigerant being considered for the application; and (b) on pertinent facts about the one or more heat sources and the one or more heat sinks involved in the application.

For instance, for the purpose of choosing liquid-refrigerant subcooling requirements for a specific set of self-regulation conditions, pertinent facts about the refrigerant include whether the refrigerant is an azeotropic-like or a non-azeotropic fluid (see definition 1); and pertinent facts about the one or more heat sources and the one or more heat sinks include which of the following five cases apply:

case (A): a heat source which releases heat while being at a spatially substantially-uniform temperature and a heat sink which absorbs heat while being at a spatially substantially-uniform temperature, the spatially substantially-uniform temperature of the heat sink being, at any given instant in time, below the spatially substantially-uniform temperature of the heat source;

case (B): a heat source which releases heat while being at a spatially substantially-uniform temperature and a heat sink which absorbs heat while undergoing a significant rise in temperature, the highest temperature of the heat sink being, at any given instant in time below the spatially substantially-uniform temperature of the heat source;

case (C): a heat source which releases heat while undergoing a significant drop in temperature and a heat sink which absorbs heat while being at a spatially substantially-uniform temperature, the spatially substantially-uniform temperature of the heat sink being, at any given instant in time, below the lowest temperature of the heat source;

case (D): a heat source which releases heat while undergoing a significant drop in temperature and a heat sink which absorbs heat while undergoing a significant rise in temperature, the highest temperature of the heat sink being, at any given instant in time, below the lowest temperature of the heat source; and case (E): a heat source which releases heat while undergoing a significant drop in temperature and a heat sink which absorbs heat while undergoing a significant rise in temperature, the highest temperature of the heat sink being, at any given instant in time, above the lowest temperature of the heat source and below the highest temperature of the heat source.

Examples of spatially substantially-uniform temperature heat sources are a fluid which releases heat while undergoing a change in phase with no significant pressure drop, and a metal slab being cooled. Examples of a spatially substantially-uniform heat sink are a fluid which absorbs heat while undergoing a change in phase with no significant pressure drop, and a water reservoir, with no significant temperature gradient, within which a cold heat exchanger is immersed. Examples of heat sources which release heat while undergoing a substantial drop in temperature, and of heat sinks which absorb heat while undergoing a substantial rise in temperature, are fluids which respectively release and absorb heat without changing phase at low mass-flow rates.

G. Heat-release Control

1. Preliminary Remarks

The rate at which radiant energy is transmitted from a high-temperature refrigerant in cold heat exchanger to remote substances, such as the walls or floors of a building or extraterrestrial bodies, can be changed by a shutter opaque to thermal radiation. This shutter is used to intercept partly, or even totally, thermal radiant energy emitted by the refrigerant itself or by the cold heat exchanger's heat-transfer surfaces. In the former case, the cold heat-exchanger heat-transfer surfaces are transparent to thermal radiant energy and, in the latter case, those heat-transfer surfaces are made of heat-conducting material.

The rate at which heat is transmitted from a refrigerant in a cold heat exchanger to a contiguous cold fluid can be changed by cold-fluid valves (including dampers or shutters), and/or by cold-fluid pumps. Where the cold fluid absorbs heat without changing phase, the two last-cited devices are used to change the cold fluid's mass-flow rate. And, where the cold fluid absorbs heat by changing from a liquid to a vapor, those two devices are used to change the amount of liquid cold fluid in direct contact with the cold heat exchanger's external heat-transfer surfaces.

I shall hereinafter use the term 'externally-controlled heat release', or more briefly the term 'EC heat release', to denote the methods of heat-release control outlined in the immediately-preceding two minor paragraphs. (The qualifier 'externally-controlled' refers to the fact that the means used to achieve heat-release control are not a part of an airtight configuration.) The techniques for controlling shutters opaque to thermal radiation, and cold-fluid valves (including dampers or shutters) and pumps, are well known. They shall therefore not be discussed in this DESCRIPTION.

The rate at which a refrigerant in a cold heat exchanger releases heat to remote substances or to a contiguous cold fluid can—where a cold heat exchanger is a condenser—also be changed by controlling the amount of liquid refrigerant in the condenser's refrigerant passages. I shall hereinafter use the term 'refrigerant-controlled heat release', or more briefly 'RC heat release', to denote heat-release control achieved by changing the amount of liquid refrigerant in the condenser refrigerant passages of a principal configuration.

I note that RC heat release is an operating mode of an airtight configuration, and is achieved by controlling the refrigerant of an airtight configuration in a way which differs from the way it would be controlled to achieve self regulation. By contrast, EC heat release is not an operating mode of an airtight configuration and is not achieved by controlling the refrigerant of an airtight configuration. Consequently, self regulation and RC heat release are two mutually exclusive operating modes of a two-phase heat-transfer system; whereas self regulation and EC heat release are not mutually exclusive operating modes of a two-phase heat-transfer system, and can therefore coexist. Furthermore, RC heat release and EC heat release are also not mutually exclusive operating modes of a two-phase heat-transfer system, and can therefore also coexist.

The rate at which a refrigerant in a cold heat exchanger releases heat to remote substances, or to a contiguous fluid, can—where the cold heat exchanger is a condenser—alternatively be changed by controlling the amount of inert-gas mass in the condenser's refrigerant passages. I shall hereinafter use the term 'gas-controlled heat release', or more briefly 'GC heat release' to denote heat-release control achieved by changing the amount of inert-gas mass in the condenser refrigerant passages of a principal configuration.

I note that GC heat-release, in contrast to RC heat release, can coexist with self regulation; and that GC heat release, like RC heat release, can coexist with EC heat release.

2. Refrigerant-controlled Heat Release

The purpose of RC heat release is usually to control the rate at which refrigerant releases heat in the condenser refrigerant passages of a principal configuration at a preselected refrigerant pressure or equivalently, in the case of an azeotropic-like refrigerant, at a preselected refrigerant saturated-vapor temperature. The preselected refrigerant pressure may be fixed or may change in a pre-prescribed way.

RC heat release is achieved with type A, or with type B, combinations by controlling the amount of liquid refrigerant in the one or more condenser refrigerant passages of their principal configuration in pre-prescribed ways, which fall into three general categories.

The first general category of RC heat-release techniques achieve heat-release control by satisfying self-regulation condition (B) and violating self-regulation condition (C); namely by supplying a condenser's refrigerant passages with essentially dry refrigerant, and by increasing the amount of liquid refrigerant, backing-up into those passages, above that allowed by self-regulation condition (C).

The second general category of RC heat-release techniques achieve heat-release control by violating self-regulation condition (B) and satisfying self-regulation condition (C); namely by supplying wet refrigerant vapor to a condenser's refrigerant passages whilst not allowing liquid refrigerant to back-up into those passages by an amount exceeding that allowed by self-regulation condition (C).

The third general category of RC heat-release techniques achieve heat-release control by violating self-regulation conditions (B) and (C).

In the particular case where a condenser is a split condenser including several component condensers (see section V,B,12), liquid refrigerant can be inserted into, and extracted from, component condensers independently by using several ancillary configurations or even by using a single ancillary configuration.

3. Gas-controlled Heat Release

Broadly speaking, the purpose of GC heat release is the same as that as RC heat release. However, where GC heat release is used, the preselected pressure at which the rate of heat release is controlled is usually the total pressure of the refrigerant and inert gas. (This total pressure is of course essentially equal to the refrigerant pressure at a point, inside an airtight configuration, where the partial pressure of the inert gas is negligible.)

GC heat-release is achieved with type B, or with type C, combinations having an IG configuration by transferring inert gas from their IG reservoir to their condenser's refrigerant passages, and from their condenser's refrigerant passages to their IG reservoir, in a pre-prescribed way. Inert gas can be inserted into, or extracted from, those passages through the condenser's refrigerant inlet, through the condenser's refrigerant outlet, or through one or more ports along the condenser's refrigerant passages.

In the particular case where a condenser is a split condenser including several component condensers, inert gas can be inserted into, or extracted from, component condensers independently by using several IG configurations, or even by using only a single IG configuration.

H. Heat-absorption Control

1. Preliminary Remarks

The rate at which radiant thermal energy is transmitted from a remote high-temperature material substance, such as a flame or the sun, to a refrigerant in a hot heat exchanger can be changed by a shutter opaque to thermal radiation. This shutter is used to intercept partly, or even totally, thermal radiant-energy absorbed by the refrigerant itself or by the hot heat exchanger's heat-transfer surfaces. In the former case, the hot heat exchanger heat-transfer surfaces are transparent to thermal radiation and, in the latter case, those heat-transfer surfaces are made of heat-conducting material.

The rate at which heat is transmitted from a hot fluid to a contiguous refrigerant in a hot heat exchanger can be changed by hot-fluid valves (including dampers or shutters), and/or by hot-fluid pumps. Where the hot fluid releases heat without changing phase, the two last-cited devices are used to change the hot fluid's mass-flow rate. And, where the hot fluid releases heat by changing from a vapor to a liquid, those two devices are used to change the amount of liquid hot fluid in direct contact with the hot heat exchanger's external heat-transfer surfaces.

I shall hereinafter use the term 'externally-controlled heat absorption', or more briefly the term 'EC heat absorption', to denote methods of heat absorption control outlined in the immediately-preceding two minor paragraphs.

The rate at which a refrigerant in a hot heat exchanger absorbs heat from a remote substance, or from a contiguous hot fluid, can—where the hot heat exchanger is an evaporator—also be changed by controlling the amount of liquid refrigerant in, and/or the refrigerant mass-flow rate through, the evaporator's refrigerant passages. I shall hereinafter use the term 'refrigerant-controlled heat absorption', or more briefly the term 'RC heat absorption', to denote heat-absorption control recited in the immediately-preceding sentence.

I note that RC heat absorption—like RC heat release—is an operating mode of an airtight configuration, and is achieved by controlling the refrigerant of an airtight configuration in a way which differs from the way it would be controlled to achieve self regulation. By contrast, EC heat absorption—also like EC heat release—is not achieved by controlling the refrigerant of an airtight configuration. Consequently, self regulation and RC heat absorption—like self regulation and RC heat release—are two mutually-exclusive operating modes of a two-phase heat-transfer system; whereas self regulation and EC heat absorption—also like self regulation and EC heat release—are not mutually-exclusive operating modes of a two-phase heat-transfer system, and can therefore coexist. Furthermore, RC heat absorption and EC heat absorption are not mutually-exclusive operating modes of a two-phase heat-transfer system, and can therefore also coexist.

2. Refrigerant-controlled Heat Absorption

The purpose of RC heat absorption is usually to control the rate at which refrigerant absorbs heat in all, or in a part of, the evaporator refrigerant passages of a principal configuration at a preselected refrigerant saturated-vapor pressure or equivalently, in the case of an azeotropic-like refrigerant, at a preselected refrigerant saturated-vapor temperature. The preselected refrigerant pressure may be fixed or may change in a pre-prescribed way.

RC heat absorption is achieved with type A, or with type B, configurations by controlling the amount of liquid refrigerant in the one or more evaporator refrigerant passages of their principal configuration in pre-prescribed ways. Pre-prescribed ways for achieving heat absorption often violate self-regulation condition (A); namely they decrease the amount of liquid refrigerant in the evaporator refrigerant passages below that allowed by self-regulation condition (A).

In the particular case where an evaporator is a split evaporator including several component evaporators (see section V,B,12), liquid refrigerant can be inserted into, and extracted from, component evaporators independently by using several ancillary configurations, or even by using only a single ancillary configuration.

I. Evaporator Liquid-refrigerant Injection

The purpose of liquid-refrigerant injection is to achieve at least one of several objectives. These objectives include (1) preventing refrigerant vapor being trapped in one or more parts of the evaporator refrigerant passages of a system of the invention, thereby eliminating potential hot spots; (2) increasing the refrigerant's heat-transfer coefficients in the system's evaporator refrigerant passages; and (3) increasing the refrigerant's critical flux in those passages.

To achieve one or more of the foregoing several objectives, the systems of the invention use liquid-refrigerant injectors, or more briefly LR injectors, to inject liquid refrigerant into the system's evaporator refrigerant passages. LR injectors are usually passive devices having one or more orifices whose total cross-sectional area is smaller than the cross-sectional area of the inlet through which liquid refrigerant is supplied to them. LR injectors achieve their objectives by one or more of several techniques. These techniques include (1) promoting turbulence in evaporator refrigerant passages; (2) distributing liquid refrigerant in preselected vapor spaces inside evaporator refrigerant passages; and (3) distributing liquid refrigerant over preselected internal surfaces of those passages.

IV. BRIEF DESCRIPTION OF DRAWINGS

FIGS. 1 to 23, and FIGS. 1A, 5A, 7A, 8A, 9A, 9B, 10A, 12A, 14A, 16A, and 16B, show diagrammatically typical refrigerant principal configurations used by the invention.

FIGS. 27 to 35; FIGS. 27A to 34A; and FIGS. 27B, 31B, 32B, 27C, and 32C; show diagrammatically typical refrigerant ancillary configurations used by the invention.

FIGS. 36 to 41; FIGS. 36A to 41A; FIGS. 36B to 40B; FIGS. 36C to 40C; FIGS. 36D to 39D; and FIGS. 38E, 39E, 39F, and 40G; show diagrammatically typical inert-gas configurations used by the invention.

FIGS. 43, 46, 49, 51, 52, 54, and 56; FIGS. 43A to 43M; FIGS. 46A to 46G; and FIGS. 51A and 56A; show diagrammatically typical type A combinations of the invention.

FIGS. 44, 45, 47, 48, 50, 53, 55, 58, and 59, show diagrammatically control units used with typical type A combinations.

FIGS. 57, 57A, 60, 61, 62, 63, 62A, 62B, 63A, 63B, 63C, and 63D, show diagrammatically typical type C combinations of the invention.

Figures 57, 57A, 57B, 57C:
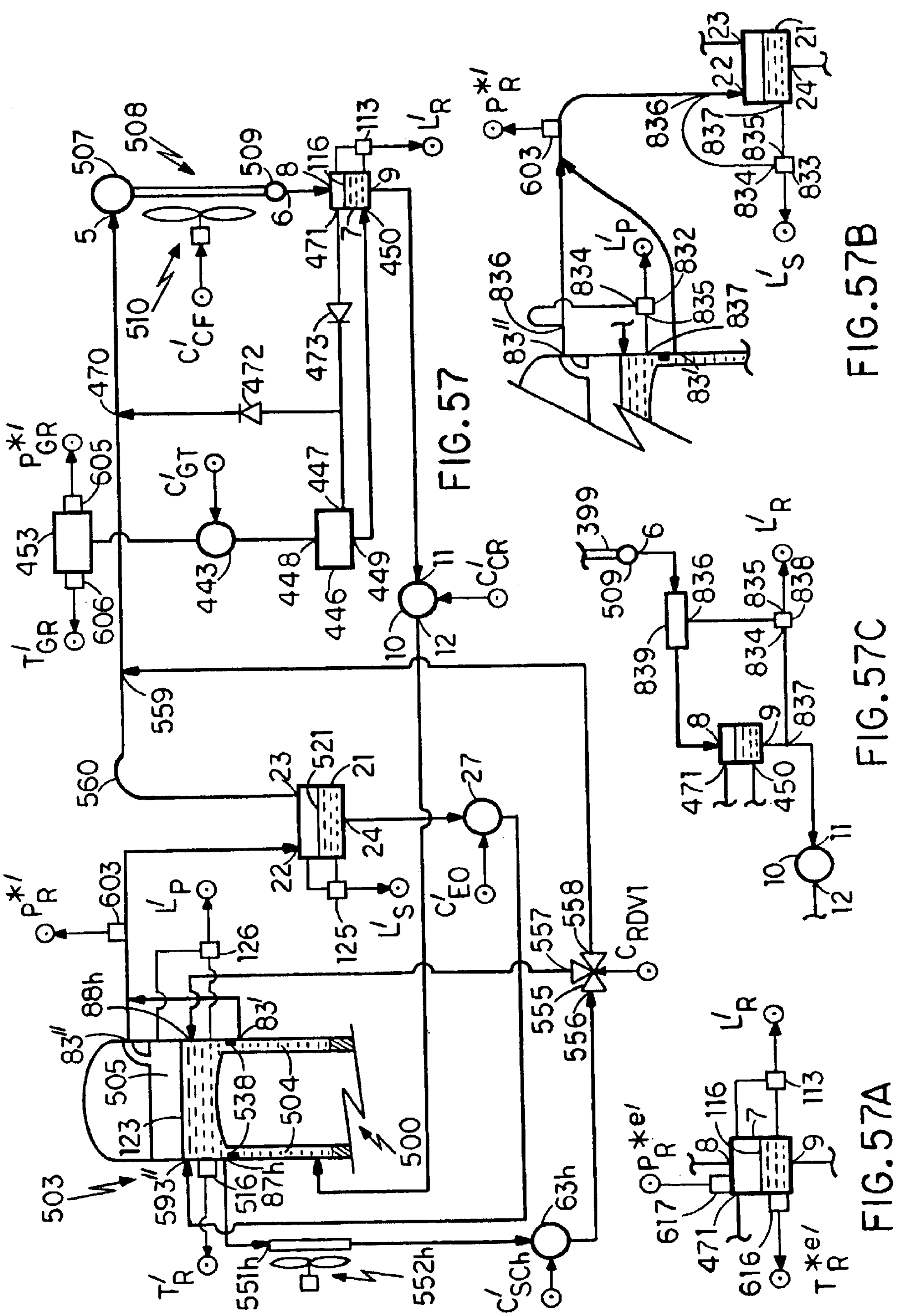
Figure 58:
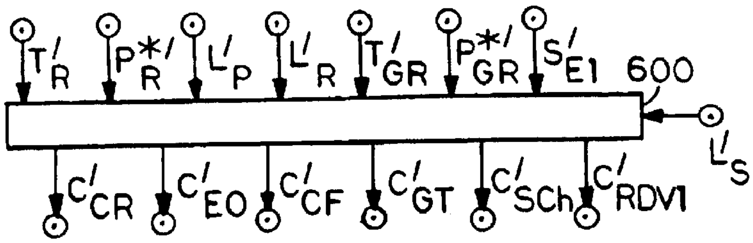
Figure 59:
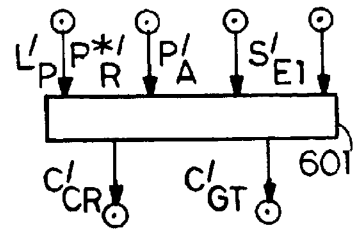

FIGS. 58 and 59 show diagrammatically control units used with the type C combination shown in FIG. 57.

FIGS. 64 to 73 show diagrammatically typical locations and shapes of evaporator liquid-refrigerant injectors of the invention.

FIG. 74 and FIGS. 74A to 74G show diagrammatically type A and type C combinations with overflow evaporators of the invention.

Figure 75:
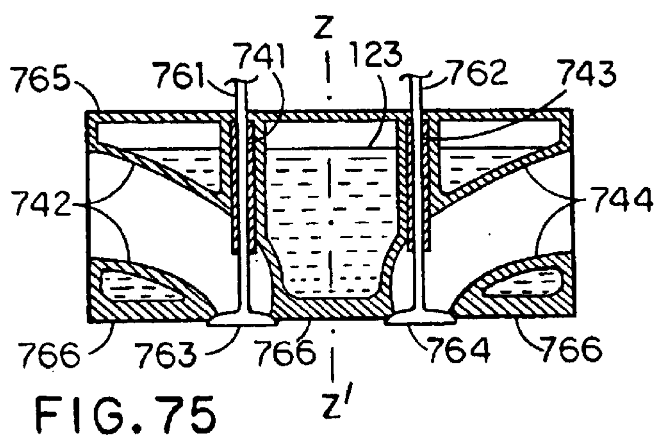
Figure 76:
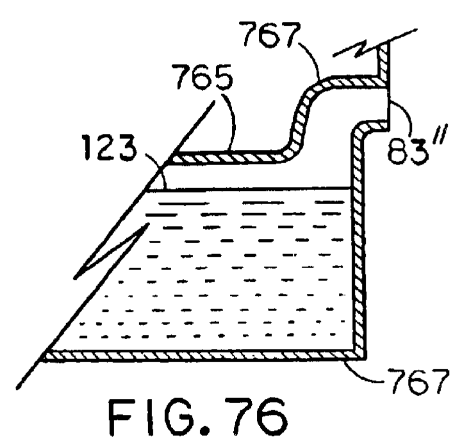
Figure 77:
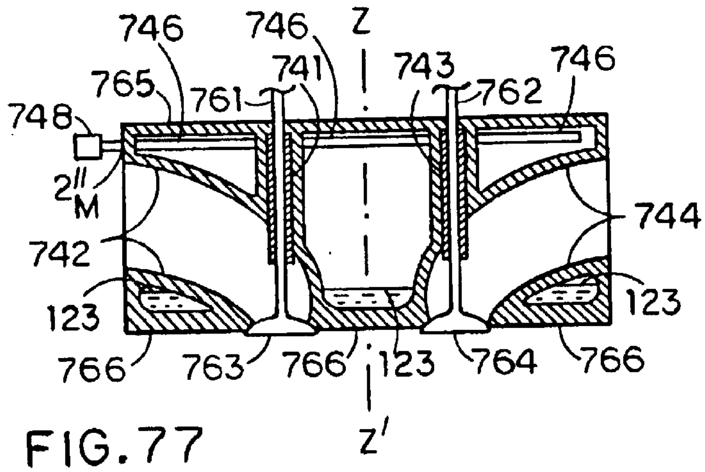
Figure 78:
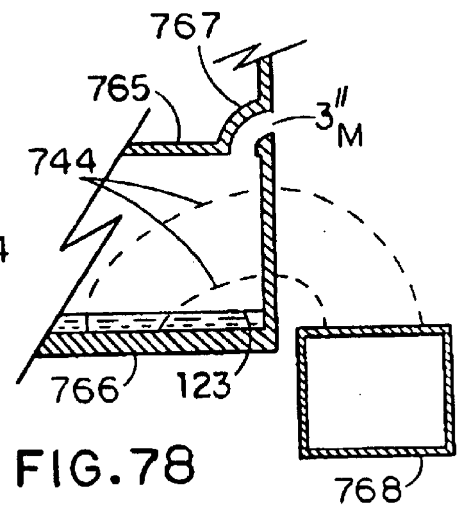
Figure 79:
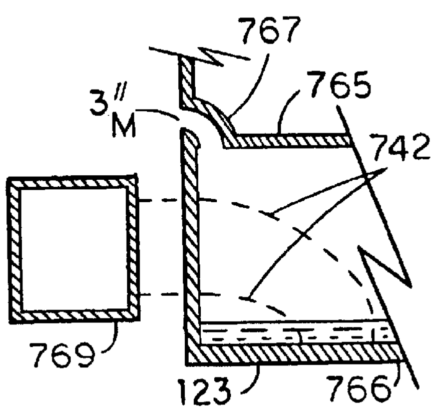

FIGS. 75 and 76 show that pool evaporators are impractical for all piston engines with twin overhead camshafts and cross-flow intake-exhaust ports; and FIGS. 77 to 79 show that, by contrast, mixed evaporators of the invention are practical for such engines provided they are in-line engines and mounted on platforms subjected to small tilts.

Figure 80:
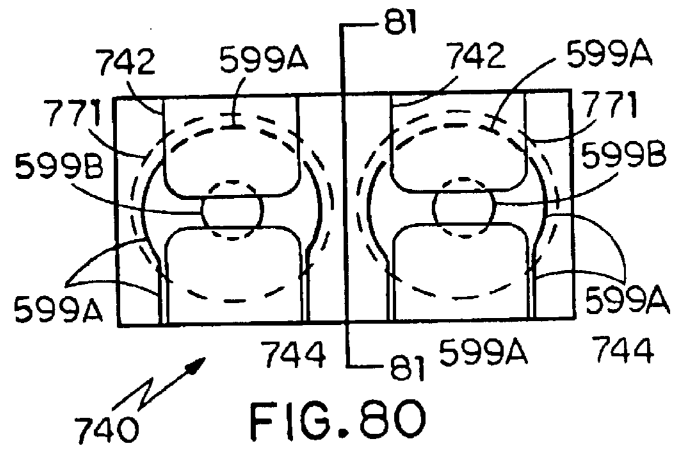
Figure 81:
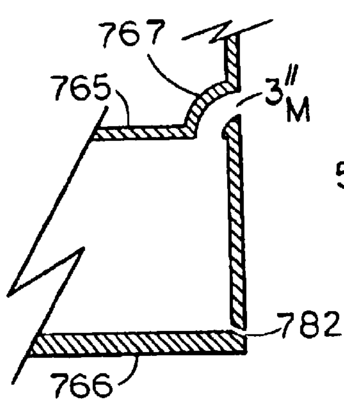
Figure 82:
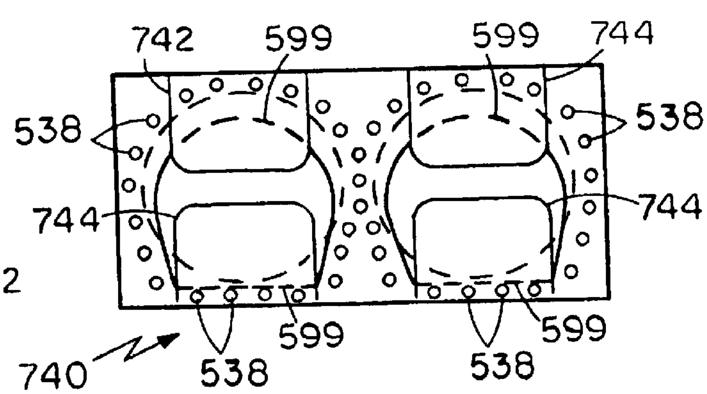

FIGS. 80 and 82 show diagrammatically typical locations of the weirs of mixed evaporators, and FIG. 81 shows cross-section 81—81 in FIG. 80.

FIG. 83 and FIGS. 83A to 83D show diagrammatically typical techniques of the invention for achieving remote-control led liquid-refrigerant pulsed injection.

Figures 83, 83A:
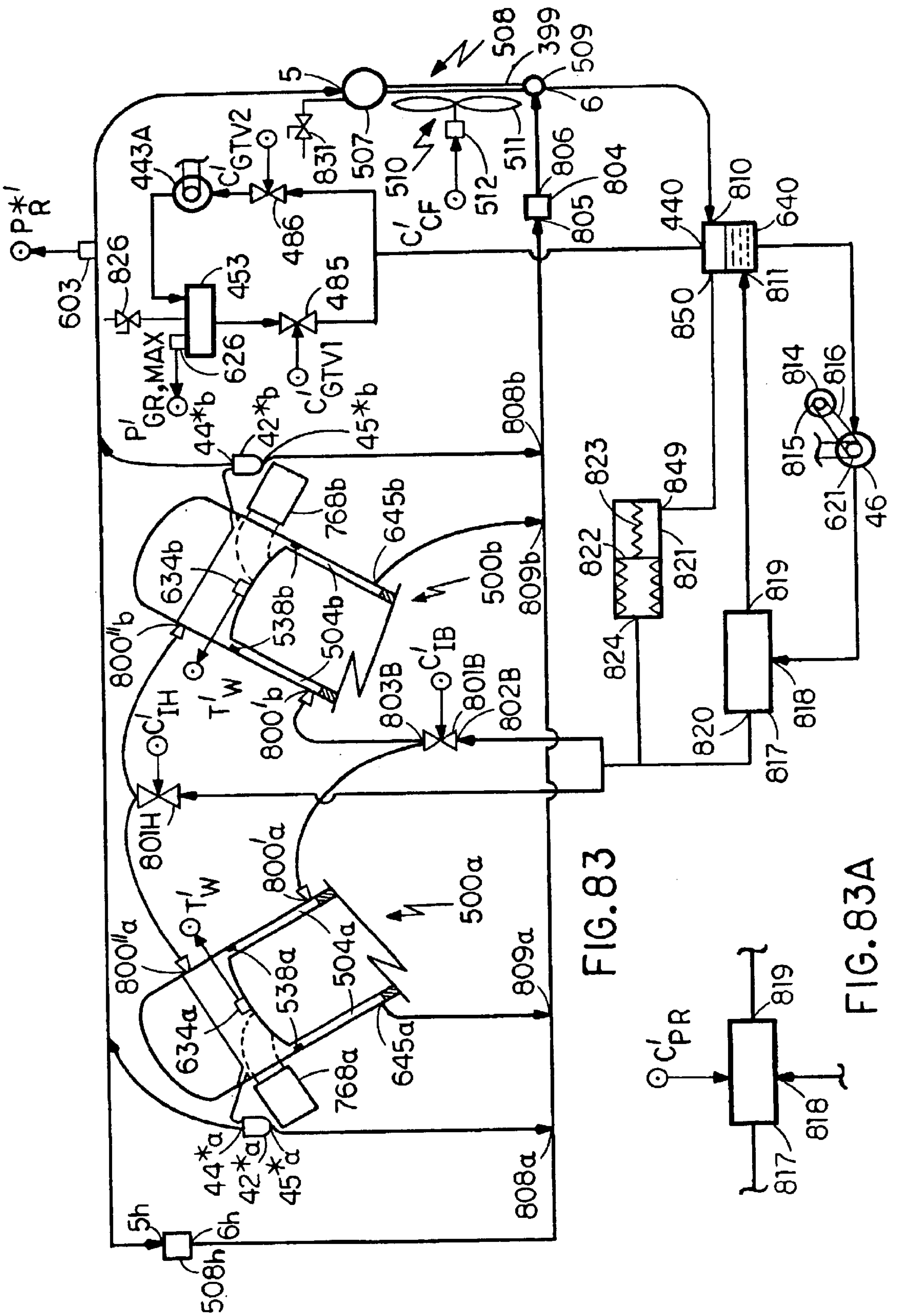
Figure 83B:
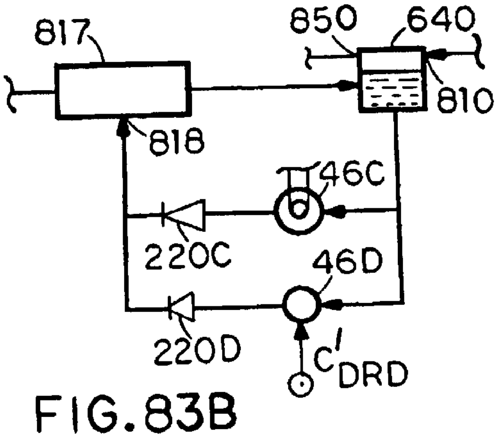
Figure 83C:
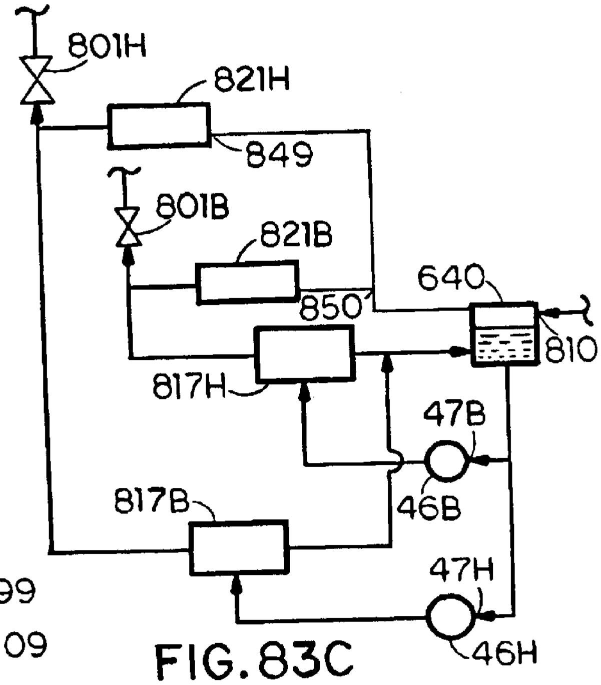
Figure 83D:
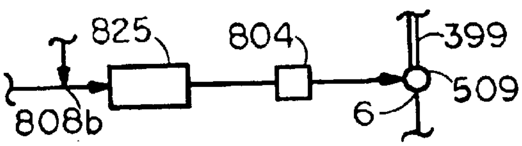
Figure 83E:
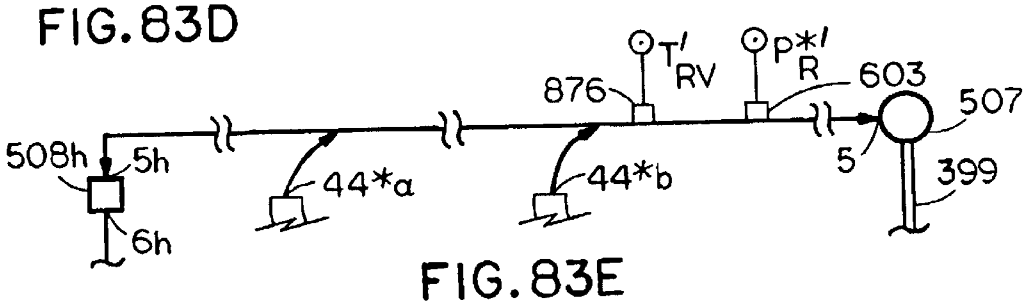
Figure 89:
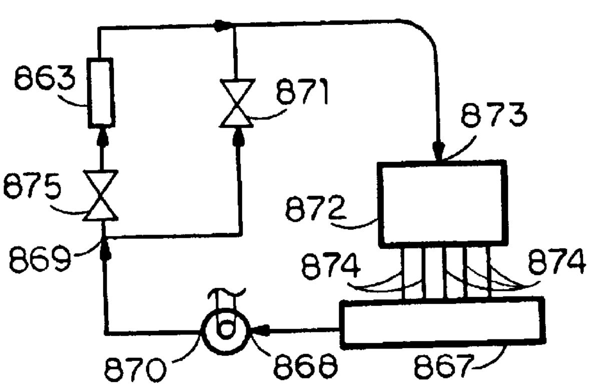

FIGS. 84 to 88 show diagrammatically typical separating assemblies of the invention and typical interconnections between those assemblies and other components of an airtight configuration of the invention;

FIG. 89 shows diagrammatically the interconnections between a heat exchanger of a separating assembly of the engine cooled by an airtight configuration of the invention and that airtight configuration; and FIG. 83E shows diagrammatically a control technique which can be used when the heat exchanger is being employed as an oil cooler. FIGS. 43N, 46H, 57B, and 57C, show diagrammatically typical connections of pressure transducers with airtight configurations of the invention where the pressure transducers are used as liquid-level transducers.

FIGS. 90 to 94 show diagrammatically coolant passages of engines having cylinders with various orientations.

Figure 95:
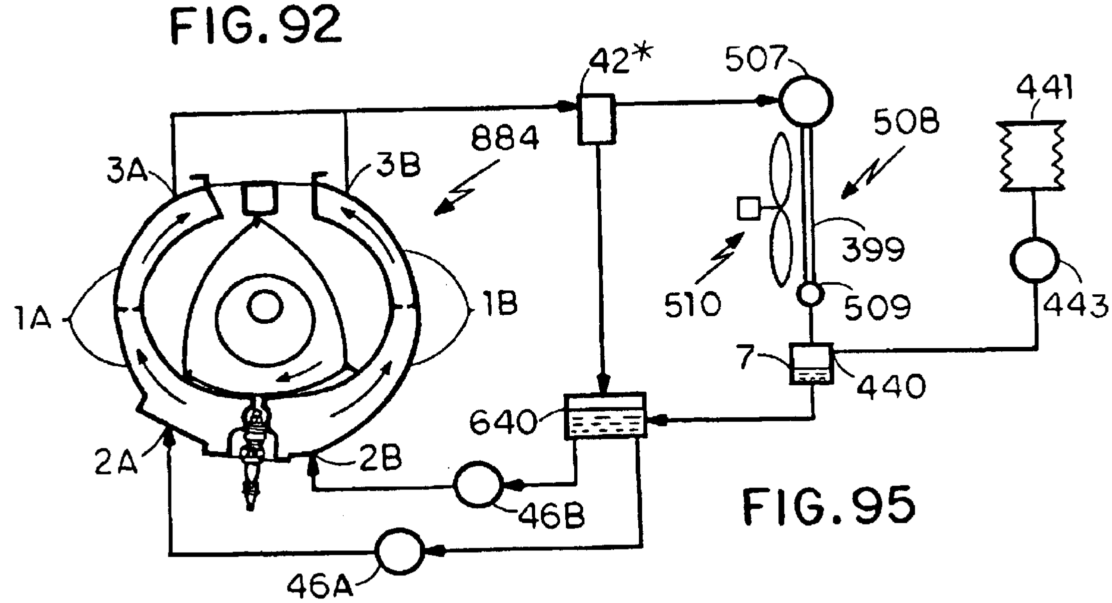
Figure 96:
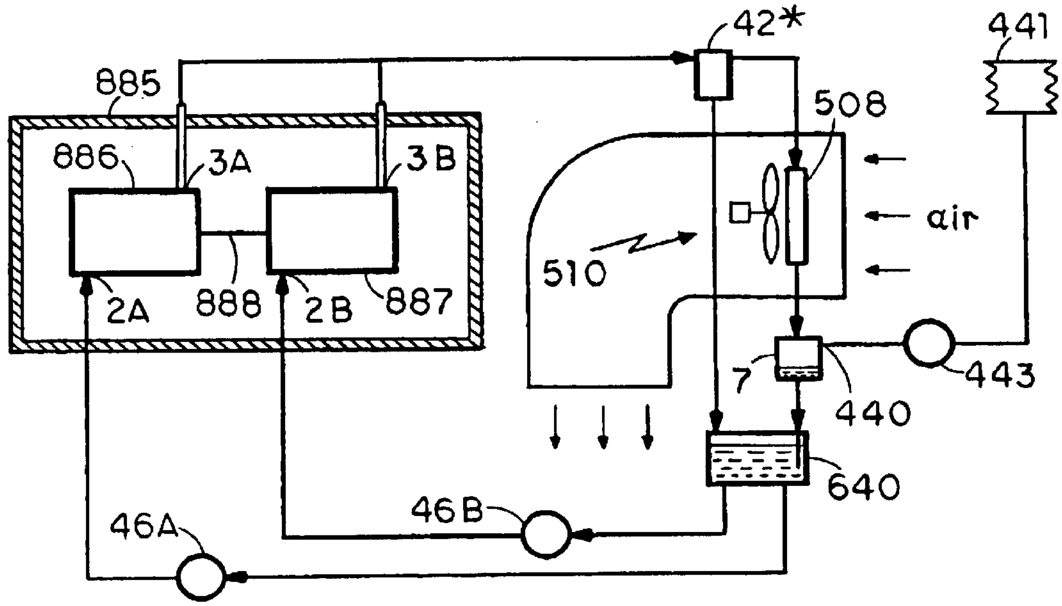
Figure 97:
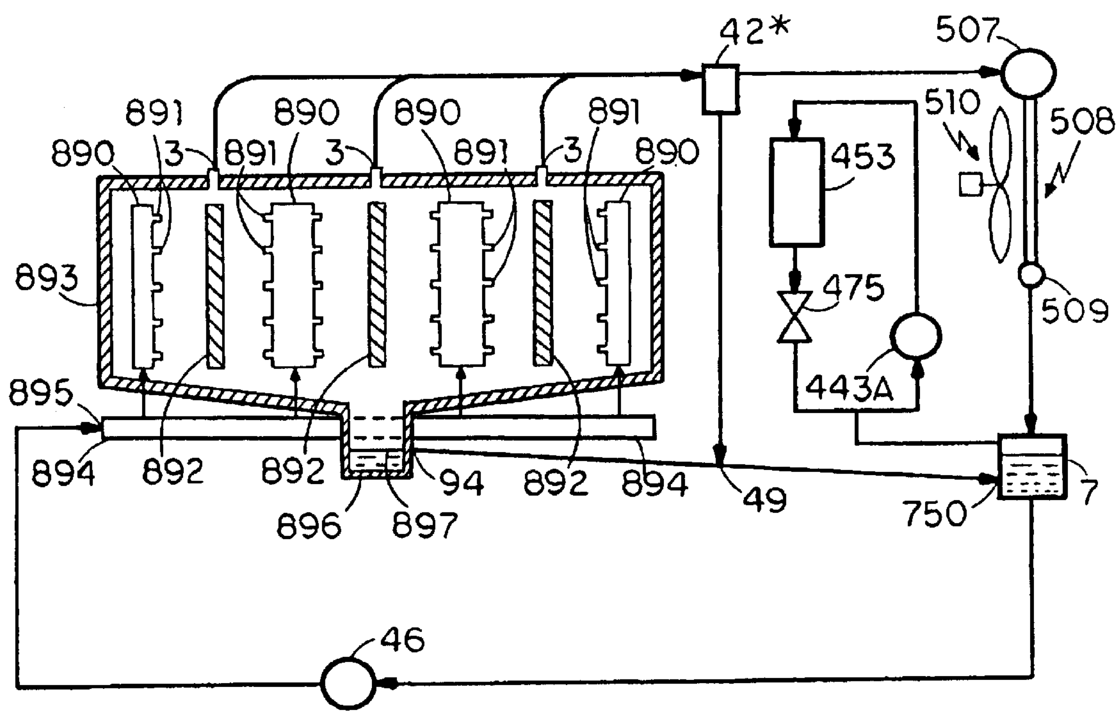
Figure 98:
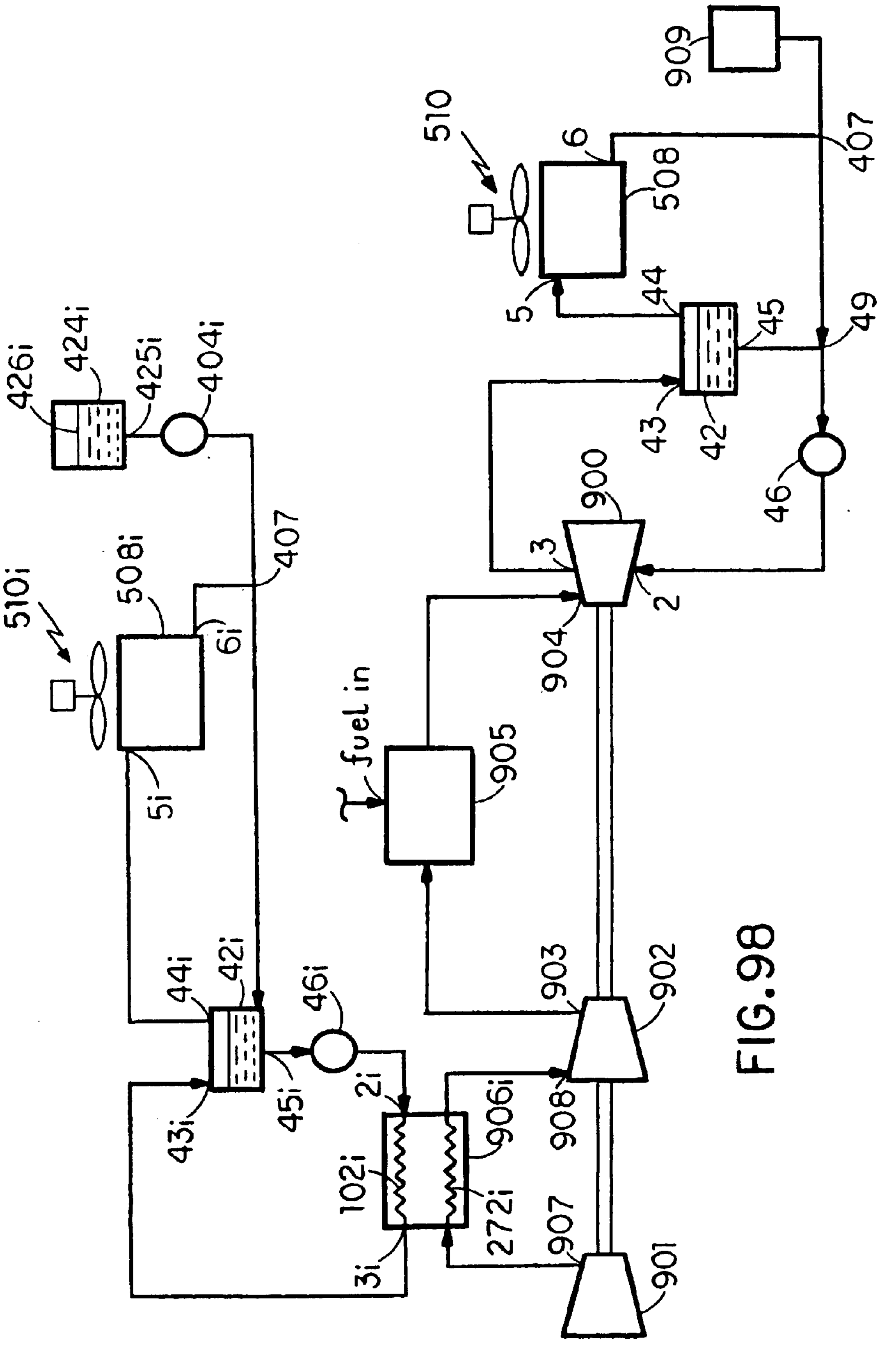

FIGS. 95, 96, and 97, show diagrammatically type C combinations of the invention used to cool respectively a Wankel engine, an electric motor and generator set, and electronic components; and FIG. 98 shows diagrammatically a first type A combination used to cool a gas turbine's expander and a second type A combination used to cool compressed air between the turbine's first-stage and second-stage compressors.

Figure 102A:
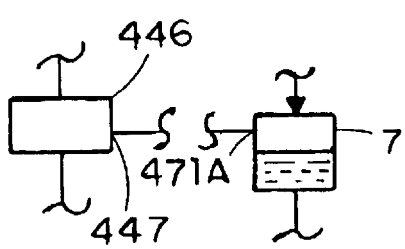
Figure 99:
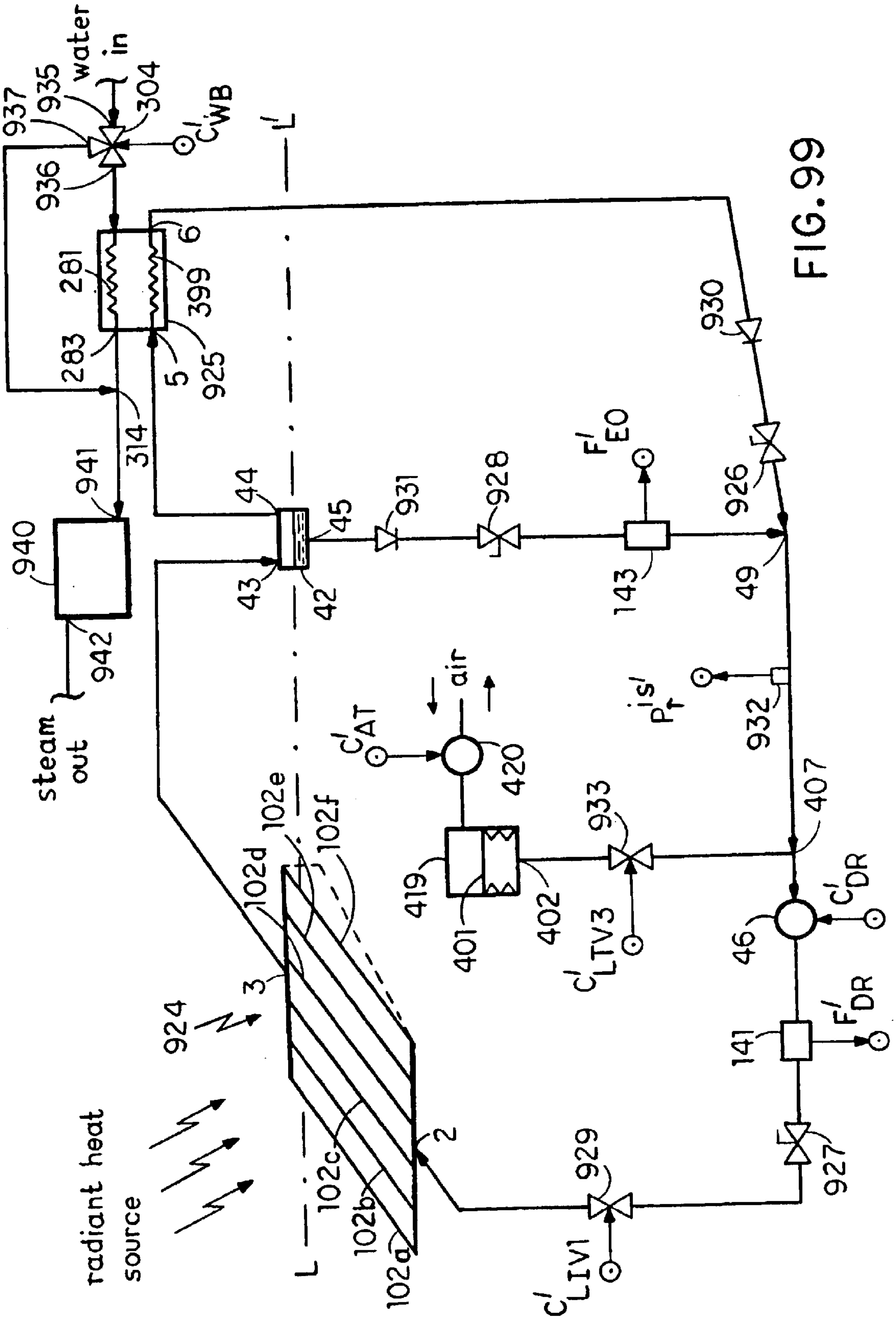
Figure 100:
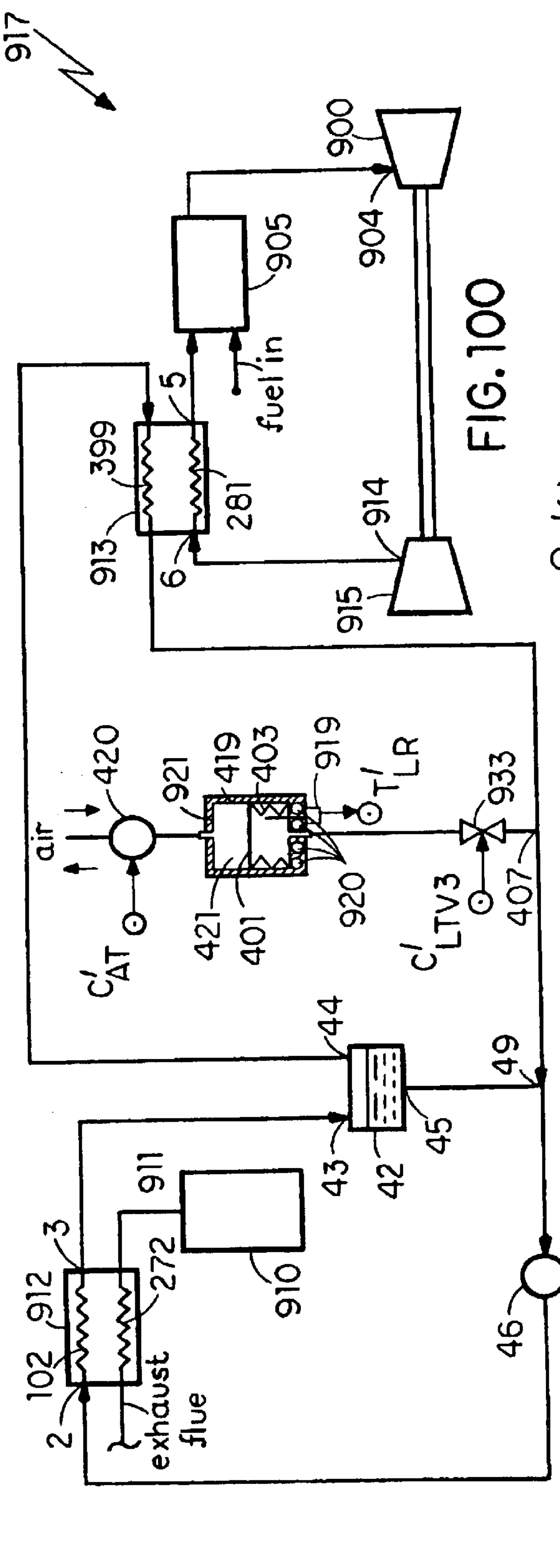
Figure 101:
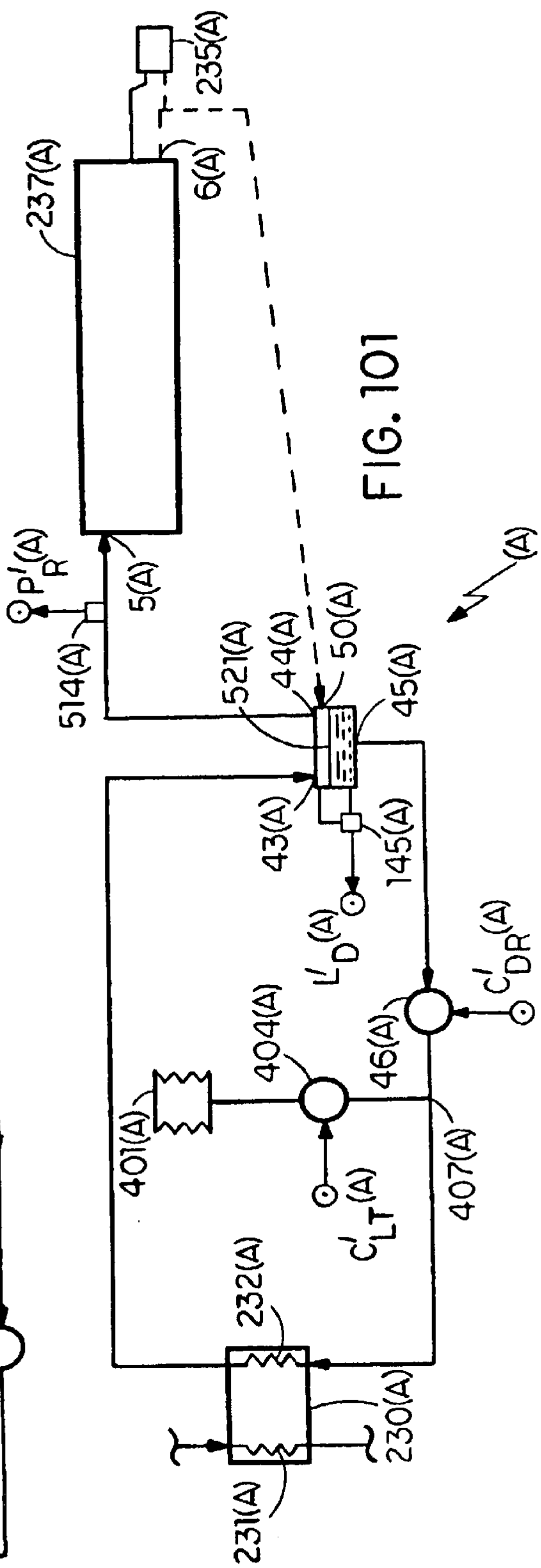
Figure 102:
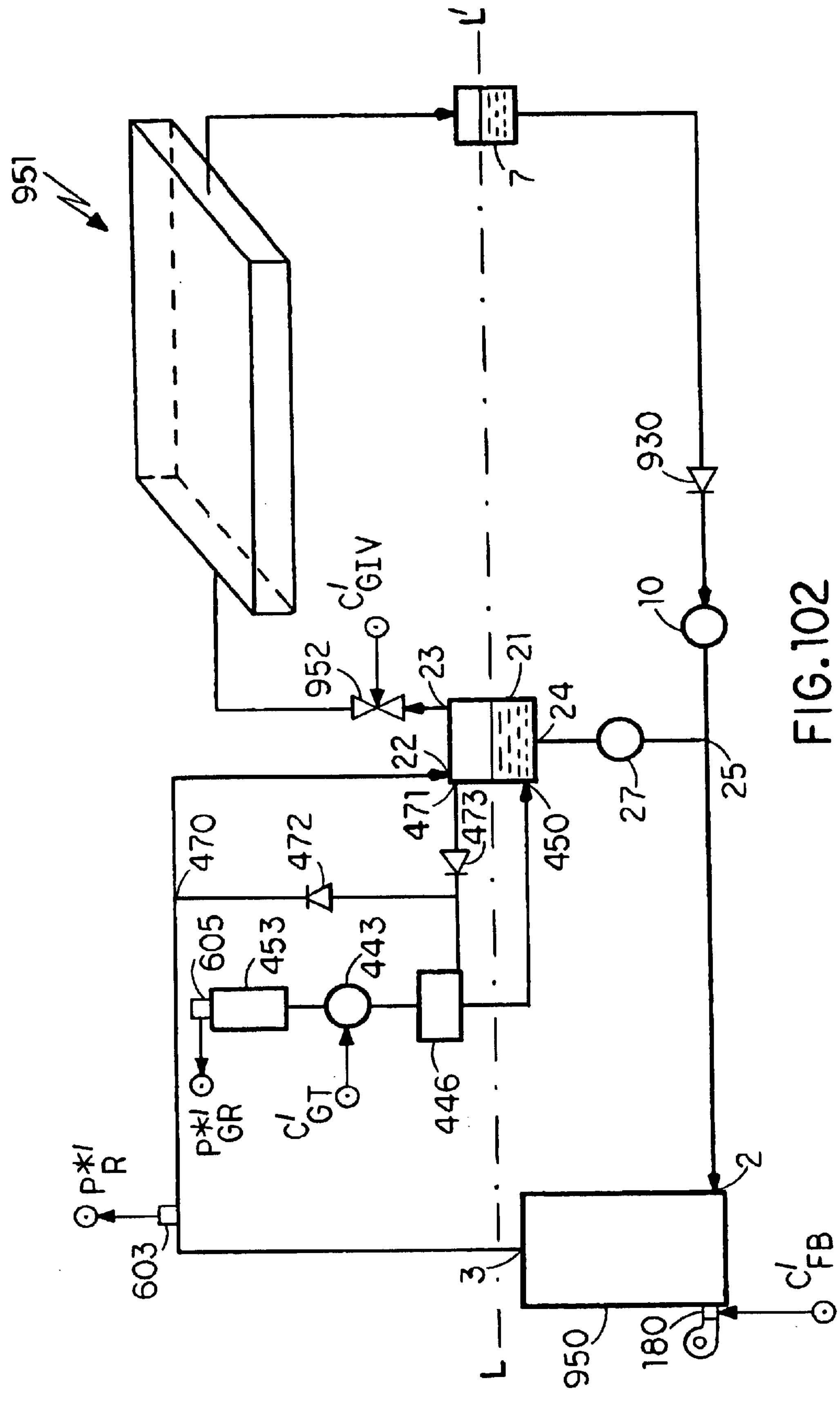
Figure 103:
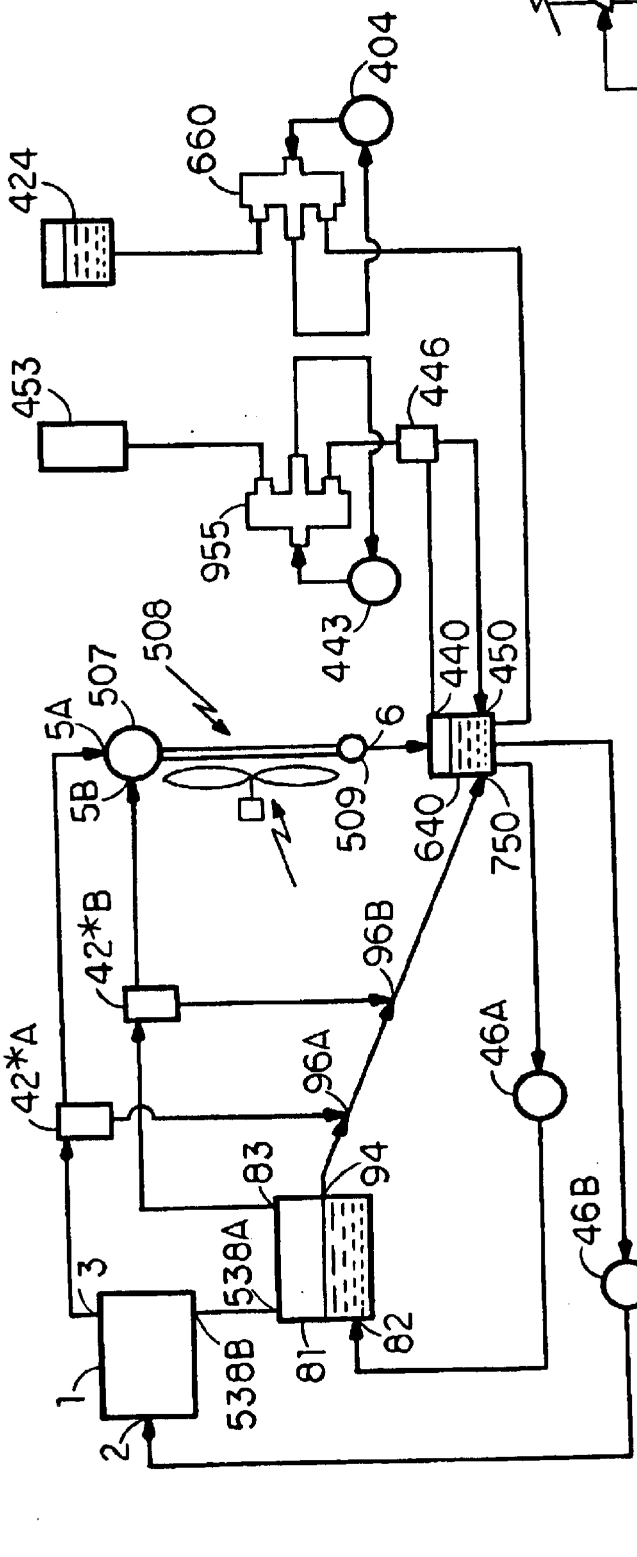

FIG. 99 shows diagrammatically a type A combination used to generate steam with heat recovered from radiant energy;

FIG. 100 shows diagrammatically a type A combination used to heat compressed air before it enters a gas turbine's expander with heat recovered from high-temperature waste gases;

FIG. 101 shows diagrammatically a type A combination used to heat a compartmentalized air space;

FIGS. 102 and 102A show diagrammatically a type C combination used to heat an industrial process with heat generated by the combustion of a fuel; and FIG. 103 shows diagrammatically a type B combination.

Figure 104:
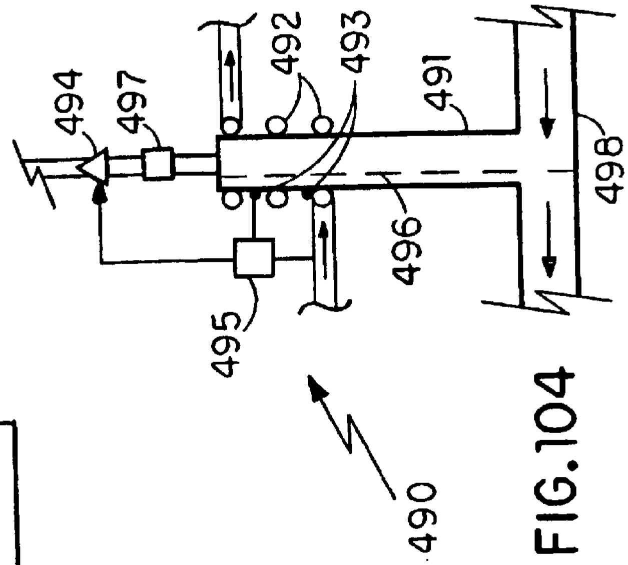

FIG. 104 shows diagrammatically a device, disclosed by others, which is used with certain airtight configurations of the invention.

Figure 110:
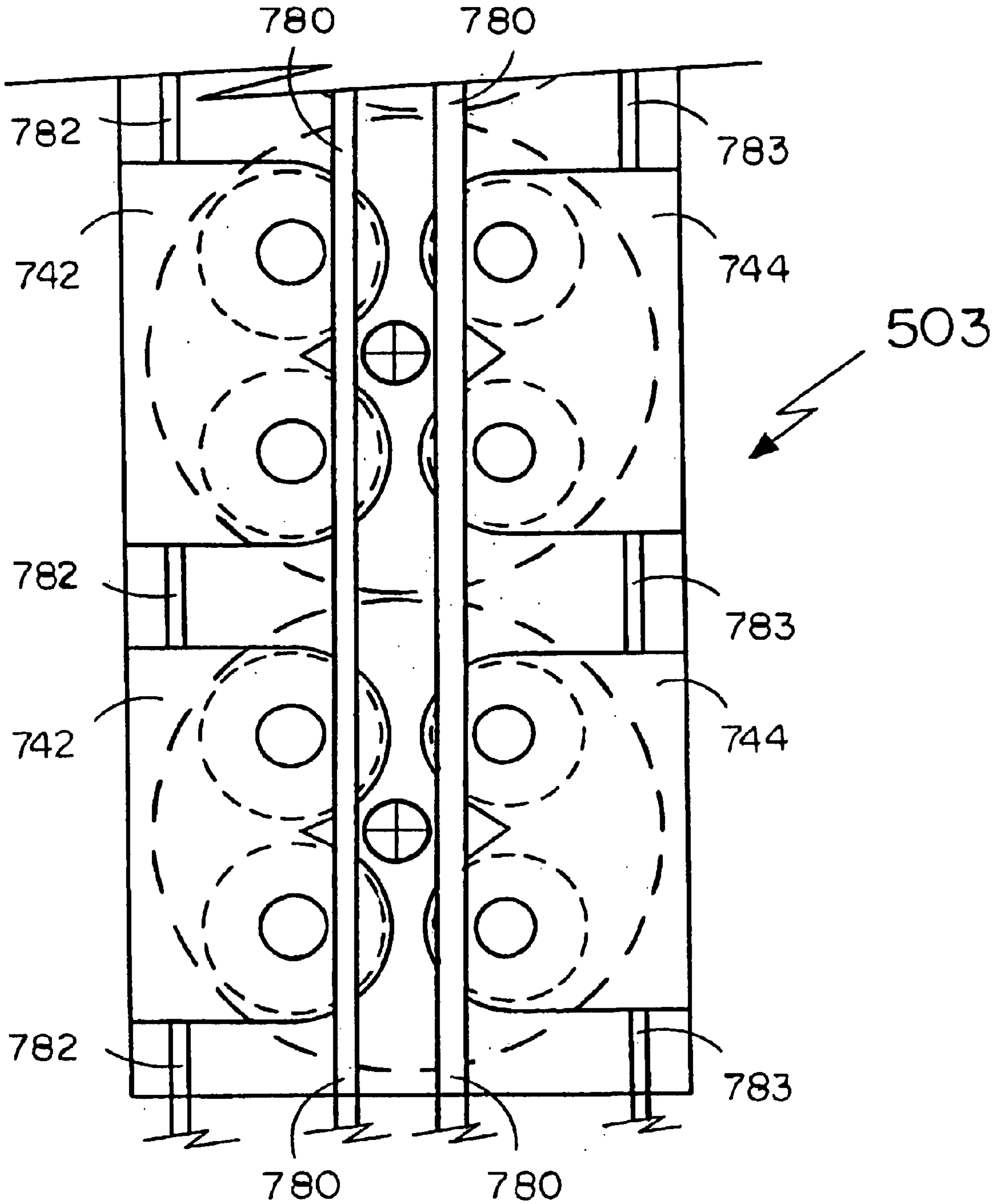
Figure 111:
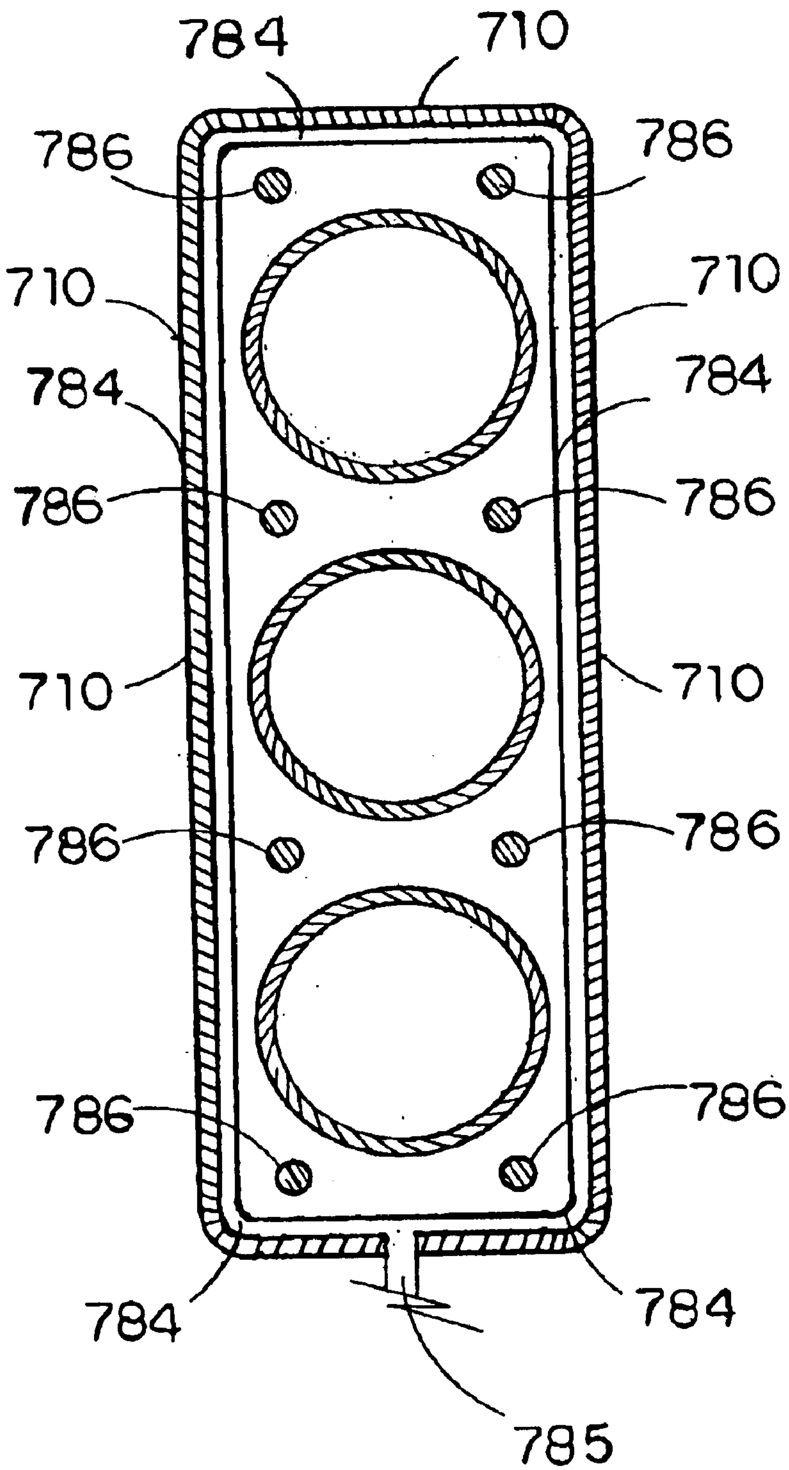
Figure 112:
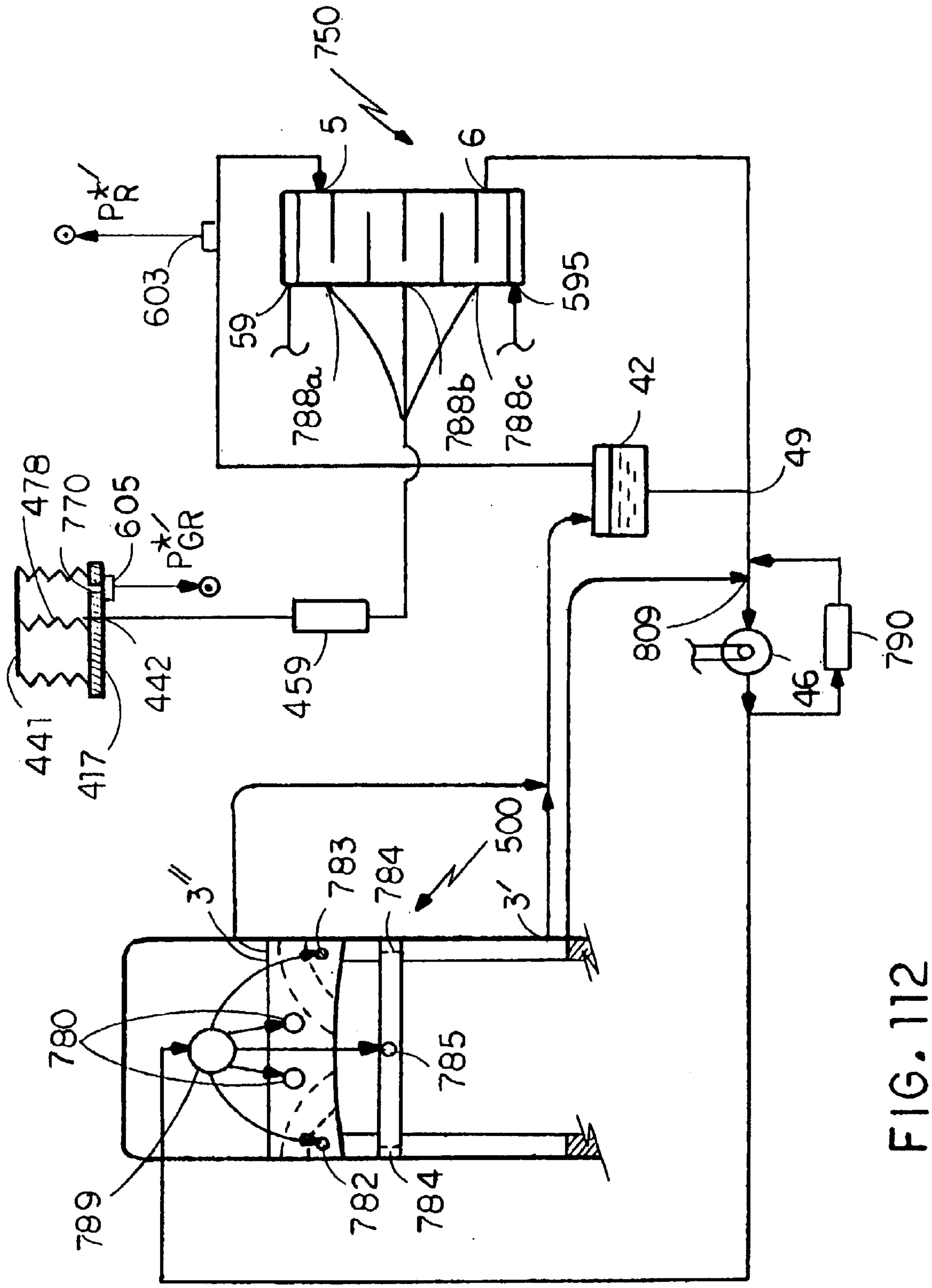
Figure 112A:
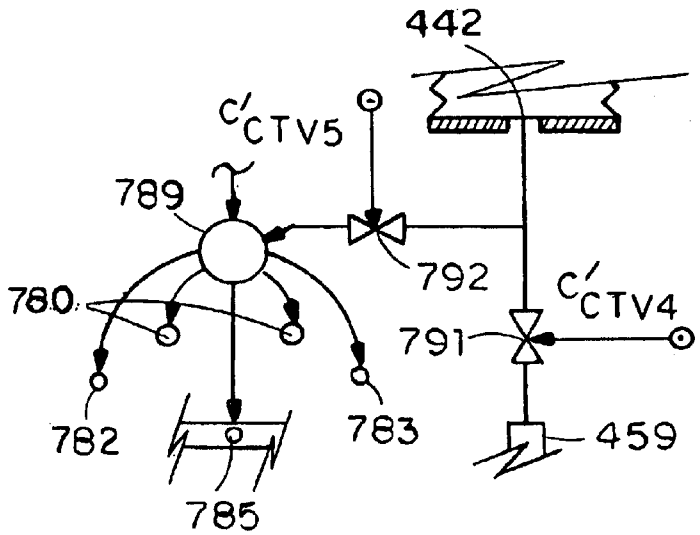
Figure 112B:
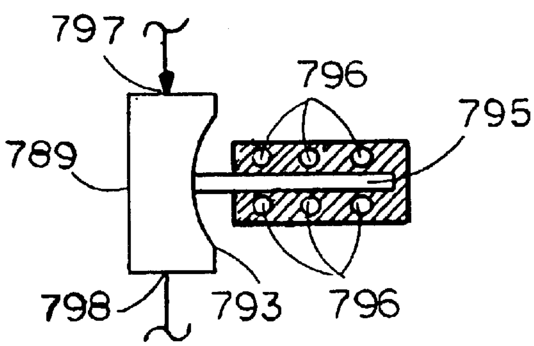
Figure 113:
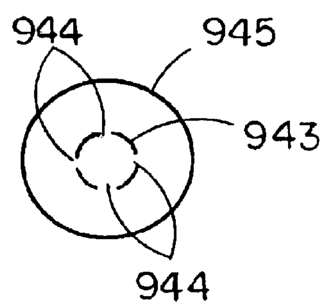
Figure 114:
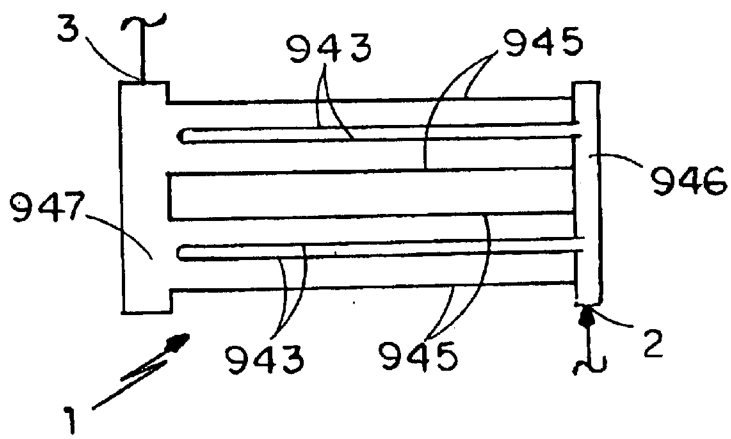
Figure 115:
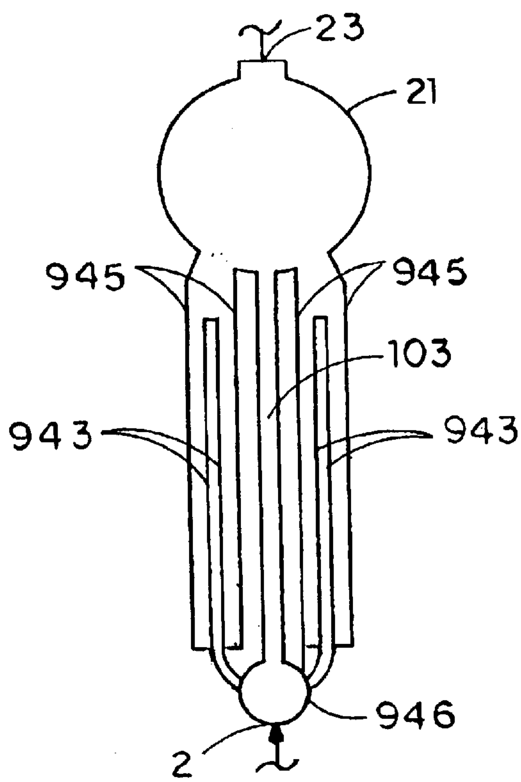
Figure 116:
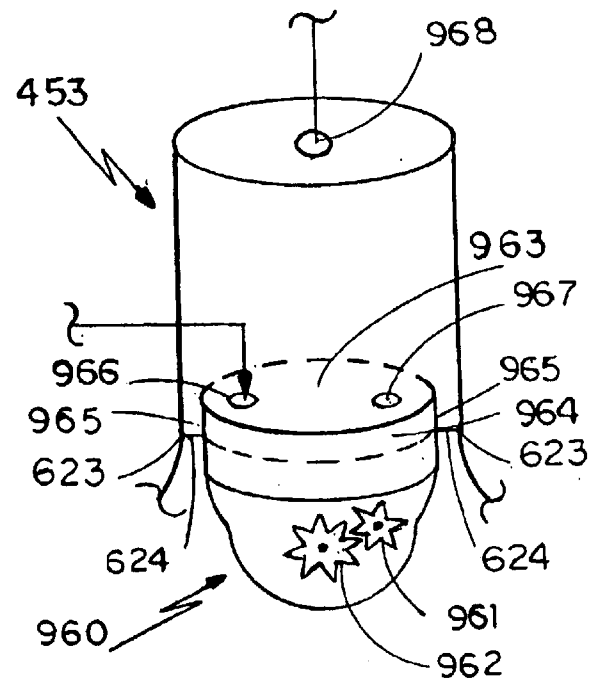
Figure 117:
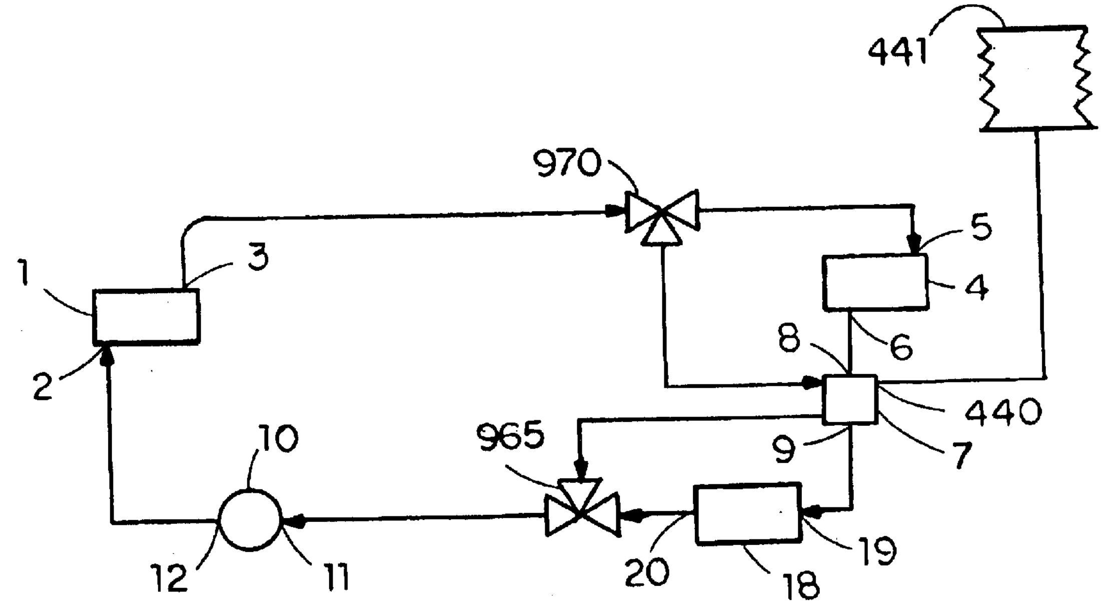

FIGS. 105 to 109 show diagrammatically ways of combining two or more components of an airtight configuration;

FIGS. 110 to 112 show diagrammatically locations of liquid-refrigerant injectors in the case of a particular engine block;

FIG. 112A shows diagrammatically controllable valves employed to control the flow of inert gas used to push liquid refrigerant into an evaporator;

FIG. 112B shows diagrammatically means for causing liquid refrigerant exiting an injector orifice to be broken into droplets;

FIG. 113 shows diagrammatically the cross-section of an evaporated refrigerant circular passage containing a concentric (circular) passage injector and FIGS. 114 to 115 show diagrammatically two evaporators using concentric refrigerant passages and liquid-refrigerant injectors;

FIG. 116 shows diagrammatically the cylinder of a GT pump in direct physical and thermal contact with an IG reservoir; and FIG. 117 shows diagrammatically a diverter valve for by-passing refrigerant around a condenser's refrigerant passages.

The symbol '⊙' used in certain FIGURES denotes that the signal represented by a letter with one or more superscripts which include a 'dash', and with one or more subscripts, is transmitted (1) from a transducer to a control unit, where the arrow associated with the signal points toward the signal, and (2) from a control unit to a control table element or means—such as a pump or a valve—where the arrow associated with the signal points away from the symbol. And a first of the two symbols inside the block representing a heat exchanger, represents the one or more refrigerant passages of the heat exchanger; and a second of the two symbols inside the block representing a heat exchanger, represents the one or more fluid ways of the heat exchanger.

Several numerals occur often in the FIGURES. Elements designated by certain of those numerals are listed for convenience below.

| Numeral | Item |
|---|---|
| 1 | generic non-pool evaporator |
| 4 | generic condenser |
| 7 | 2-port condensate receiver |
| 10 | condensate-return pump |
| 13 | 1-port condensate receiver |
| 21 | type 1 separator |
| 21* | type 1 separating assembly |
| 27 | evaporator-overfeed pump |
| 42 | type 2 separator |
| 42* | type 2 separating assembly |
| 46 | dual-return pump |
| 63 | subcooler-circulation pump |
| 81 | generic pool evaporator |
| 113 | condensate-receiver proportional liquid-level transducer |
| 125 | separator proportional liquid-level transducer |
| 126 | pool-evaporator proportional liquid-level transducer |
| 400 | refrigerant principal configuration |
| 401 | variable-volume liquid refrigerant reservoir |
| 404 | liquid-refrigerant transfer pump |
| 420 | air-transfer pump |
| 424 | fixed volume liquid-refrigerant reservoir |
| 435 | bidirectional liquid-transfer valve in parallel with a liquid-refrigerant-transfer pump |
| 436 | bidirectional liquid-transfer valve in series with a liquid-refrigerant-transfer pump |
| 441 | variable-volume inert-gas reservoir |
| 443 | gas-transfer pump |
| 446 | condensate-type refrigerant-vapor trap |
| 453 | fixed-volume inert-gas reservoir |
| 475 | bidirectional gas-transfer valve in parallel with a gas-transfer pump |
| 476 | bidirectional gas-transfer valve in series with a gas-transfer pump |
| 477 | bidirectional drain valve in parallel with a gas-transfer pump |
| 485 | proportional two-way gas-transfer valve |
| 486 | on-off gas-transfer valve |
| 500 | piston engine |
| 502 | cylinder block |
| 503 | cylinder head |
| 504 | cylinder-block coolant (refrigerant) passages |
| 505 | cylinder-head coolant (refrigerant) passages |
| 508 | air-cooled condenser |
| 510 | condenser fan |
| 514 | proportional refrigerant absolute-pressure transducer |
| 516 | proportional refrigerant-temperature transducer |
| 531 | liquid-refrigerant injectors |
| 551 | air-cooled subcooler |
| 552 | subcooler fan |
| 561 | air-heated evaporator |
| 562 | intake-air temperature transducer |
| 594 | water-cooled condenser |
| 603, 617 | principal-configuration proportional absolute-pressure transducer |
| 604 | two-step engine-wall temperature transducer |
| 605 | inert-gas reservoir proportional absolute-pressure transducer |
| 606 | inert-gas reservoir gas-temperature transducer |
| 621 | pulley-and-clutch |
| 634 | proportional engine-wall temperature transducer |
| 640 | dual-return receiver |

V. BEST MODES FOR CARRYING OUT THE INVENTION

A. General Remarks

The optimal number and kind of airtight configurations used in a system of the invention, the desired properties of those configurations, and the particular refrigerant—and where applicable inert-gas—control techniques employed to achieve those properties, depend on the particular heat-transfer application considered. It follows that the best mode for carrying out the invention, namely the preferred embodiment of a system of the invention, depends on the particular heat-transfer application considered.

In this part (part V) of this DESCRIPTION I first describe principal, ancillary, and IG, configurations suitable for various preferred embodiments of the invention, and then give examples of those embodiments in the context, for specificity, of a particular category of applications. Each of these embodiments is expected to be a preferred embodiment for some specific useful application. The statements made about the principal configurations of airtight configurations apply to the refrigerant-circuit configurations of evacuated configurations.

All principal configurations include only one refrigerant principal circuit. A refrigerant principal circuit includes, by definition, the one or more refrigerant passages of an evaporator, the one or more refrigerant passages of a condenser, means for transferring refrigerant vapor exiting the one or more refrigerant passages of an evaporator to the one or more refrigerant passages of a condenser, and means for transferring liquid refrigerant exiting the one or more refrigerant passages of a condenser to the one or more refrigerant passages of an evaporator. The refrigerant-vapor transfer means may transfer in part, or even over its entire length, only liquid refrigerant under certain special operating conditions. And the principal configuration may also include refrigerant auxiliary circuits around which only liquid refrigerant circulates.

Almost all principal configurations of preferred embodiments of the invention can be divided into twelve groups designated by roman numerals I to XII. In grouping principal configurations of the invention, I distinguish between (a) evaporators in which a readily identifiable, essentially-horizontal, refrigerant liquid-vapor undulating interface surface (albeit possibly segmented) exists, and in which pool boiling prevails, for at least most of their operating time during their operating life; and (b) evaporators in which no readily identifiable, essentially horizontal, refrigerant liquid-vapor undulating interface surface exists, and in which forced-convection boiling and two-phase flow prevails, for at least most of their operating time during their operating life.

I shall hereinafter refer to the former kind of evaporators as 'pool evaporators', or more briefly as 'P evaporators'; and to the latter kind of evaporators as 'non-pool evaporators', or more briefly as 'NP evaporators'.

Most P evaporators have a single-level liquid-vapor interface surface while they are active as well as while they are inactive. However, P evaporators also include evaporators which have a multi-level liquid-vapor interface surface while they are active. Electrode-type electric steam boilers are examples of P evaporators having a two-level liquid-vapor interface surface while they are active.

I note that, by definition, group I to VI configurations have NP evaporators and group VII to XII configurations have P evaporators. I also note that NP and P evaporators may have a single, or may have several, bottom, top, or multi-level refrigerant inlet ports, and/or several bottom, top, or multi-level refrigerant outlet ports.

I further note that, in classifying principal configurations belonging to a given group, I distinguish between configurations having a preheater and those having no preheater, and between configurations having a superheater and those having no superheater, only if the principal configurations have an evaporator refrigerant auxiliary circuit. I therefore, for simplicity, show no preheater and no superheater in FIGURES used in classifying principal configurations and having no evaporator refrigerant auxiliary circuit.

Examples of known P evaporators are, in the steam-generating industry, fire-tube steam boilers, cast-iron steam boilers, resistance-type electric steam boilers, and electrode-type electric steam generators; and, in the refrigeration industry, flooded shell-and-tube coolers and flooded evaporators. And examples of known NP evaporators are, in the steam-generating industry, water-tube steam boilers and coil-type steam boilers; and in the refrigeration industry, direct-expansion air-cooled evaporators, direct-expansion shell-and-tube coolers, direct-expansion shell-and-coil coolers, tube-in-tube coolers, plate coolers, and Baudelot coolers.

By contrast with evaporators, I shall not distinguish, in grouping principal configurations, between condensers in which (a) a readily identifiable, essentially horizontal, refrigerant liquid-vapor interface surface exists, and condensers in which (b) no readily identifiable liquid-vapor interface surface exists.

Examples of known condensers include shell-and-tube condensers, shell-and-coil condensers, tube-in-tube condensers, coil condensers, and evaporative condensers; and may include a section or zone in which liquid refrigerant is subcooled, although subcoolers are usually employed where liquid refrigerant is to be subcooled by a large amount, say over 10° C.

I note that certain condensers, such as shell-and-tube condensers, in which refrigerant flows through the space between the shell and the tubes, can be used for storing liquid refrigerant without flooding or submerging even part of the condensers' heat transfer surfaces, and can therefore also perform the function of a 2-port or feed-through receiver, one of the ports of the 2-port receiver being the condensers' horizontal cross-section just below their lowest heat-transfer surface. Thus the receiver (of a principal configuration) may be an integral part of a condenser. I also note that, in classifying principal configurations belonging to the same group, I do not distinguish between principal configurations having a desuperheater and those having no desuperheater. I therefore, for simplicity, show no desuperheater in the FIGURES used in grouping principal configurations.

B. Principal Configurations

1. Group I Configurations

The key distinctive characteristic of group I configurations, compared to other groups of configurations with an NP evaporator, is that they have no auxiliary circuit.

I distinguish between group I configurations having a refrigerant pump and those that have no refrigerant pump; and designate the former subgroup of configurations by the symbol $I_F$ and the latter subgroup of configurations by the symbol $I_N$, where the subscripts 'F' and 'N' stand, respectively, for forced refrigerant circulation and natural refrigerant circulation. I also distinguish between group I configurations having a subcooler and group I configurations having no subcooler. However, I do not distinguish between group I configurations having a preheater and those having no preheater (or between group I configurations having a superheater and those having no superheater).

I use a superscript to indicate the absence or the presence of a subcooler. Thus the symbols $I_F^o$ and $I_N^o$ designate classes of group I configurations with no subcooler and the symbols $I_F^s$ and $I_N^s$ designate classes of group I configurations with a subcooler.

Figure 1:
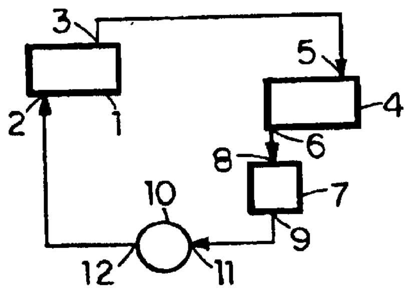
Figure 1A:
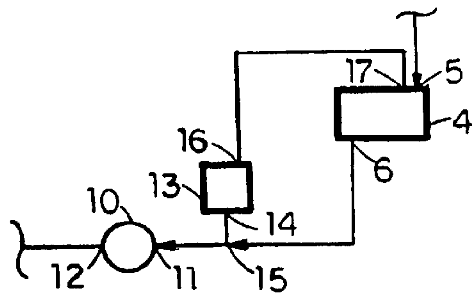

A class $I_F^o$ configuration, with a 2-port or feed-through receiver, is shown in FIG. 1. NP evaporator 1, hereinafter referred to as evaporator 1, has a refrigerant inlet 2 and a refrigerant outlet 3; condenser 4 has a refrigerant inlet 5 and a refrigerant outlet 6; 2-port condensate receiver 7 has an inlet 8 and an outlet 9; refrigerant pump 10 has an inlet 11 and an outlet 12; and refrigerant circulates around refrigerant principal circuit 2-3-5-6-8-9-11-12-2 primarily under the a 10. A class $I_F^o$ configuration may have a 1-port receiver instead of a 2-port receiver as shown in FIG. 1A, where surge-type receiver 13 has a common inlet and outlet 14 connected to refrigerant line 6-11 at a point 15, and where line 16-17 is merely a pressure equalization line. Class $I_N^o$ configurations read on FIGS. 1 and 1A provided obvious elevation constraints are satisfied. (The constraints, where no receiver is used, require in essence evaporator 1 to be at least no higher than condenser 4; and, where a receiver is used, require in essence evaporator 1 to be at least no higher than, as applicable, receiver 7 or receiver 13.)

Figure 2:
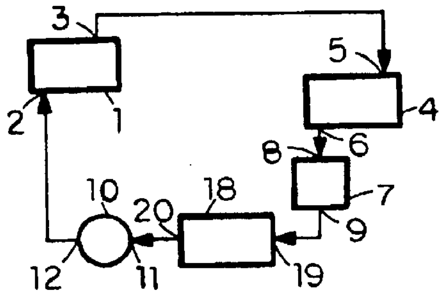

A class $I_F^s$ configuration with a 2-port receiver is shown in FIG. 2. A class $I_F^s$ configuration differs from a class $I_F^o$ configuration by the addition of subcooler 18 having a refrigerant inlet 19 and a refrigerant outlet 20 connected to receiver outlet 9 and refrigerant pump inlet 11, respectively, as shown in FIG. 2. I note that the position of pump 10 and subcooler 18 around the refrigerant principal circuit can be interchanged so that refrigerant inlet 19 of subcooler 18 is connected to refrigerant pump outlet 12, refrigerant outlet 20 of subcooler 18 is connected to evaporator inlet 2, and refrigerant pump inlet 11 is connected to receiver outlet 9. Liquid refrigerant subcooled in subcooler 18 is preheated, before being evaporated, in the refrigerant passages of evaporator 1. Class $I_N^s$ configurations read on FIG. 2 provided obvious elevation constraints are satisfied.

2. Group II Configurations

The key distinctive characteristic of group II configurations, compared to other groups of configurations with an NP evaporator, is that they have a separator and a single refrigerant auxiliary circuit of the kind named a type 1 evaporator refrigerant auxiliary circuit, (and therefore, in particular, have no subcooler refrigerant auxiliary circuit). Group II configurations may have no refrigerant pump, a CR pump, an EO pump, or both a CR pump and an EO pump.

I distinguish between group II configurations having a refrigerant pump, and those that have no refrigerant pump and are designated by the symbol $II_{NN}$. (In the symbol $II_{NN}$, the first subscript indicates natural refrigerant circulation around the refrigerant principal circuit, and the second subscript indicates natural refrigerant circulation around their evaporator refrigerant auxiliary circuit.)

I use the symbol $II_{FN}$ to designate the subgroup of group II configurations in which the refrigerant circulates around their refrigerant principal circuit primarily under the forced action of a CR pump, and around their evaporator refrigerant auxiliary circuit solely under the combined natural action of gravity and heat absorbed from the evaporator's heat source. I also use the symbol $II_{FF}$ to designate the subgroup of group II configurations in which their refrigerant circulates around the refrigerant principal circuit primarily under the forced action of a CR pump, and around their evaporator refrigerant auxiliary circuit primarily under the forced action of an EO pump. I further use the symbol $II_{NF}$ to designate the subgroup of group II configurations in which the refrigerant circulates around the refrigerant principal circuit solely under the combined natural action of gravity and heat absorbed from a heat source, and around the refrigerant auxiliary circuit primarily under the forced action of an EO pump.

I use a first superscript to indicate the absence or the presence of a subcooler; a second superscript to indicate the presence or absence of a superheater; and a third superscript to indicate the absence or presence of a preheater. In the case of the first superscript, a 'o' (zero), an 's', an 's'', and an 's"', indicate that group II configurations, designated by the symbols with these superscripts, have respectively (a) no subcooler;

(b) a subcooler which has one or more refrigerant passages that are a part of the refrigerant principal circuit and not a part of the evaporator refrigerant auxiliary circuit;

(c) a subcooler which has one or more refrigerant passages that are a part of the evaporator refrigerant principal circuit and not a part of the refrigerant principal circuit; and (d) a first subcooler which has one or more refrigerant passages that are a part of the refrigerant principal circuit and not a part of the evaporator refrigerant auxiliary circuit, and a second subcooler which has one or more refrigerant passages that are a part of the evaporator refrigerant auxiliary circuit and not a part of the evaporator refrigerant principal circuit.

In the case of the second superscript, a 'o' (zero) and an 's' indicate that group II configurations, designated by symbols with these superscripts, have no superheater, and have a superheater, respectively. And in the case of the third superscript, a 'o' (zero), a 'p', a 'p'', and a 'p"', indicate that group II configurations, designated by symbols with these superscripts, have respectively (a) no preheater;

(b) a preheater having one or more refrigerant passages that are a part of the refrigerant principal circuit and not a part of the evaporator refrigerant auxiliary circuit;

(c) a preheater having one or more refrigerant passages that are a part of the evaporator refrigerant principal circuit and not a part of the refrigerant principal circuit; and (d) a first preheater having one or more refrigerant passages that are a part of the refrigerant principal circuit and not a part of the evaporator refrigerant auxiliary circuit, and a second preheater having one or more refrigerant passages that are a part of the evaporator refrigerant auxiliary circuit and not a part of the refrigerant principal circuit.

Thus each of the four configuration subgroups $II_{NN}$, $II_{FN}$, $II_{FF}$, and $II_{NF}$ consists of fourteen classes of configurations, each of which is designated by fourteen combinations of superscripts, namely by combinations ooo, soo, s'oo, s"oo, sop, s'op', s"op", oso, sso, s'so, s"so, ssp, s'sp, s"sp"; and thus configuration subgroups $II_{NN}$, $II_{FN}$, $II_{FF}$, and $II_{NF}$, consist of fifty-six classes. I note that all of the foregoing fifty-six classes may have a 3-port separator, but that only those with no EO pump can have a 4-port separator.

Figure 3:
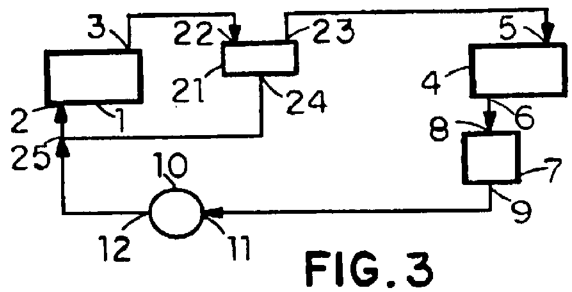
Figure 4:
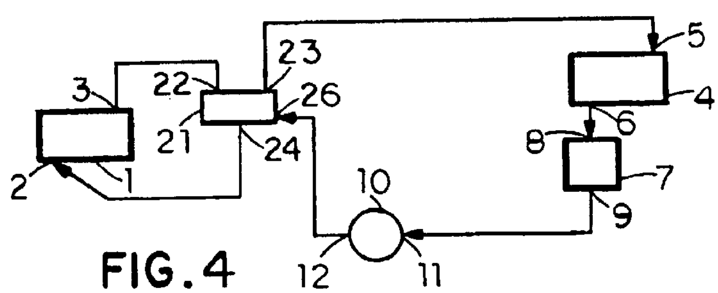
Figure 5:
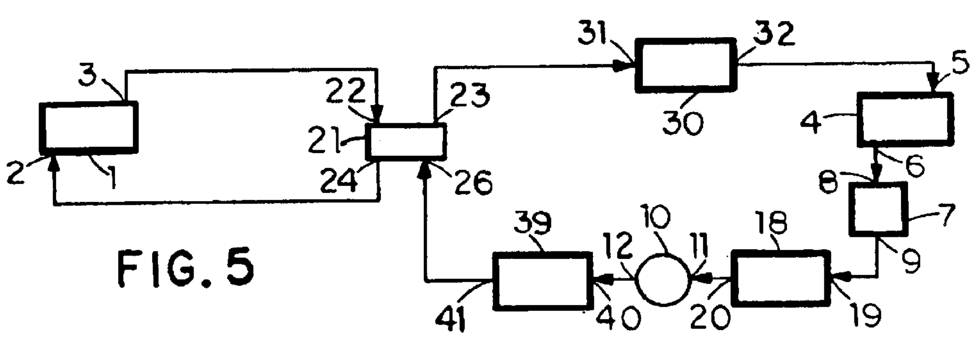
Figure 3A:
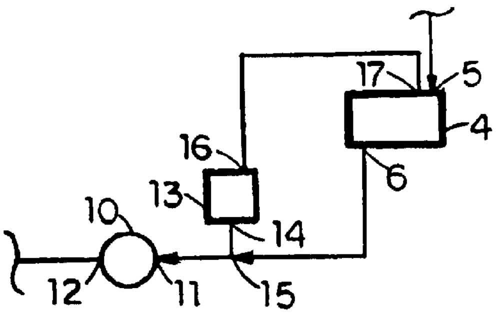
Figure 4A:
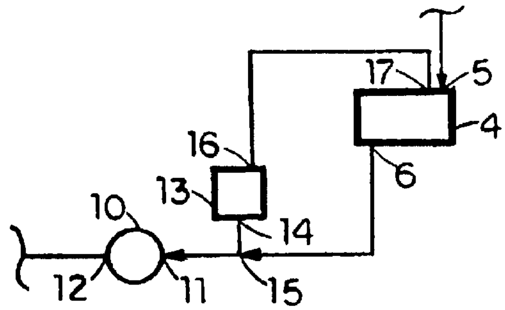

A class $II_{FN}^{ooo}$ configuration with a 3-port (type 1) separator and a 2-port receiver is shown in FIG. 3. Type 1 separator 21 has a vapor inlet 22 connected to evaporator refrigerant outlet 3, vapor outlet 23 connected to condenser refrigerant inlet 5, and liquid port 24 connected to node or mergence point 25 at some point along refrigerant line 12-2. Refrigerant circulates around the refrigerant principal circuit 2-3-22-23-5-6-8-9-11-12-25-2 primarily around the evaporator refrigerant auxiliary circuit 2-3-22-24-25-2 solely under the combined action of gravity and heat absorbed from a heat source (not shown). A class $II_{FN}^{ooo}$ configuration with a 4-port (type 1) separator is shown in FIG. 4. In this case, separator 21 has a liquid inlet 26—in addition to vapor inlet 22, vapor outlet 23, and liquid port 24—and refrigerant-pump outlet 12 is connected to liquid inlet 26 instead of to a point along refrigerant line 12-2 as shown in FIG. 3. Whereas the evaporator refrigerant auxiliary circuit in the case of a 4-port separator is—except for the absence of node 25—the same as that for a 3-port separator, the refrigerant principal circuit in the case of a 4-port separator also includes liquid inlet 26 and liquid port 24 so that refrigerant flows (under steady state conditions) primarily under the action of pump 10 around refrigerant principal circuit 2-3-22-23-5-6-8-9-11-12-26-24-2. A class $II_{FN}^{ooo}$ configuration with 3-pot separator and a 1-port receiver is shown in FIG. 3A, and a class $II_{FN}^{ooo}$ configuration with a 4-port separator and a 1-port receiver is shown in FIG. 4A. A class $II_{FN}^{ssp}$ configuration with a 4-port separator is shown in FIG. 5. Class $II_{FN}^{ooo}$ configurations read on FIGS. 3A, 4A, 5, and 6, provided obvious elevation constraints are satisfied.

Figure 6:
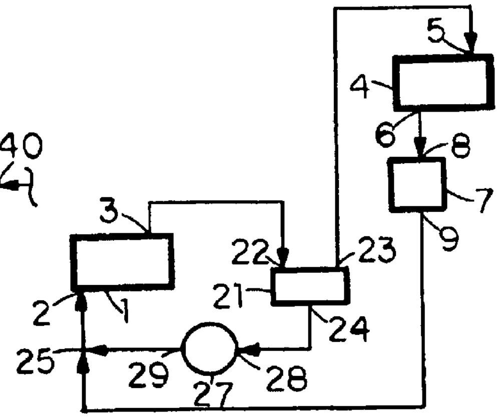

A class $II_{NF}^{ooo}$ configuration with a 3-port separator and a 2-port receiver is shown in FIG. 6. This configuration differs from that shown in FIG. 3 by the absence of CR pump 10 and the addition of EO pump 27. The absence of CR pump 10 requires, for operability, that condenser 4 not be below evaporator 1, whereas the condenser of subgroup $II_{FN}$ and $II_{FF}$ configurations can be either above or below their evaporator. Furthermore, the presence of pump 27 imposes additional constraints on the relative elevations of the condenser and the evaporator of subgroup $II_{NF}$ configurations. Class $II_{NF}^{ooo}$ configurations read on FIG. 6.

Figure 7:
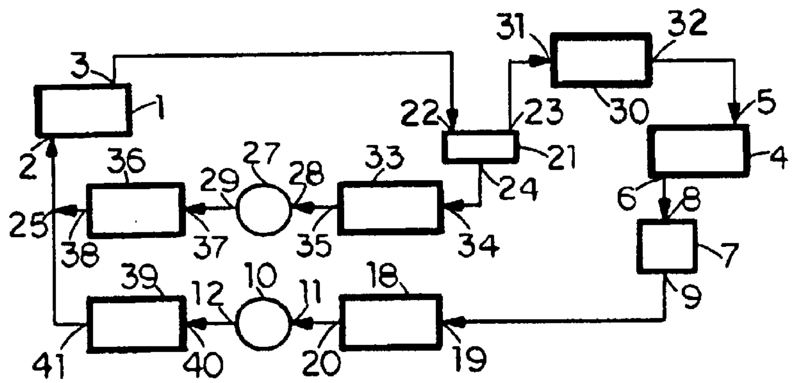

A class $II_{FF}^{s"sp"}$ configuration with a 2-port receiver is shown in FIG. 7. Class $II_{FF}^{s"sp"}$ configurations differ from class $II_{FN}^{ooo}$ configurations with a 3-port separator by the addition, in the manner shown in FIG. 7, of (a) EO pump 27 having an inlet 28, and an outlet 29;

(b) subcooler 18 having a refrigerant inlet 19 and a refrigerant outlet 20;

(c) superheater 30 having a refrigerant inlet 31 and a refrigerant outlet 32;

(d) subcooler 33 having a refrigerant inlet 34 and a refrigerant outlet 35;

(e) preheater 36 having a refrigerant inlet 37 and a refrigerant outlet 38, and (f) preheater 39 having a refrigerant inlet 40 and a refrigerant outlet 41.

Class $II_{NN}^{s"sp"}$ configurations read on FIG. 7 provided obvious elevation constraints are satisfied.

I note that, in the refrigerant-circuit configuration shown in FIG. 7, refrigerant flows through subcoolers 18 and 33 before flowing through CR pump 10 and EO pump 27, respectively. However, group II configurations with subcoolers include refrigerant-circuit configurations in which the positions of a subcooler and a refrigerant pump along a refrigerant-circuit segment are interchanged; and, as a result of this, refrigerant flows through the subcooler after flowing through the refrigerant pump instead of flowing through the subcooler before flowing through the refrigerant pump.

3. Group III Configurations

The key distinctive characteristic of group III configurations, compared to other groups of configuration with an NP evaporator, is that they have a separator and a single refrigerant auxiliary circuit of the kind named a type 2 evaporator refrigerant auxiliary circuit, (and therefore, in particular, have no subcooler refrigerant auxiliary circuit). Group III configurations have a DR pump only, or a DR pump and a CR pump.

I use the symbol $III_{FN}$ to designate group III configurations having no CR pump, and the symbol $III_{FF}$ to designate group III configurations having a CR pump.

I distinguish between four classes of subgroup $III_{FN}$ configurations, and use the symbols $III_{FN}^{oo}$, $III_{FN}^{so}$, $III_{FN}^{os}$, and $III_{FN}^{ss}$, to designate these four classes. In the last four symbols, the subscript F is used to indicate that refrigerant circulates around both the refrigerant principal circuit, and around the evaporator refrigerant auxiliary circuit, under the forced action of a DR pump; and the first and second superscripts are used to indicate the absence or presence of a subcooler and a superheater, respectively. I also distinguish between type 2 separators used in group III configurations and type 1 separators used in group II configurations because the former separators perform a significantly different function from the latter; and can, in particular, also perform the function of a receiver. However, I do not distinguish between subgroup $III_{FN}$ configurations having a preheater and those having no preheater.

Figure 8:
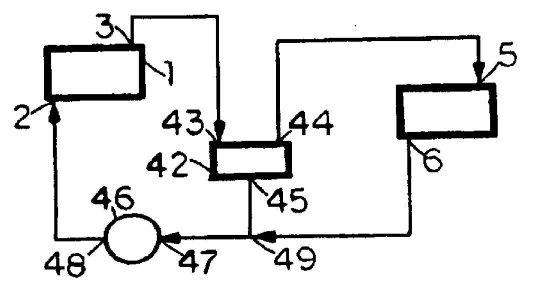
Figure 8A:
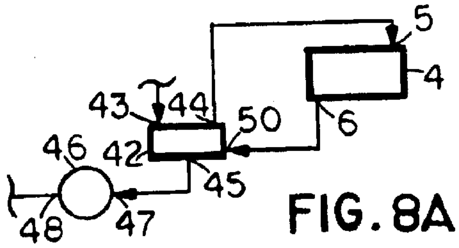

A class $III_{FN}^{ooo}$ configuration with a 3-port (type 2) separator and no separate receiver is shown in FIG. 8. Type 2 separator 42 has a vapor inlet 43 connected to evaporator refrigerant outlet 3, a vapor outlet 44 connected to condenser refrigerant inlet 5, and a liquid outlet 45. DR pump 46 has an inlet 47 connected to condenser refrigerant outlet 6 and an outlet 48 connected to evaporator refrigerant inlet 2; and separator liquid outlet 45 is connected to refrigerant line 6-47 at point 49. Refrigerant circulates around refrigerant principal circuit 2-3-43-44-5-6-49-47 around evaporator refrigerant auxiliary circuit 2-3-43-45-49-47-48-2, primarily under the force action of DR pump 46. A class $III_{FN}^{ooo}$ configuration with a 4-port separator having a liquid inlet 50 is shown in FIG. 8A.

Figure 9:
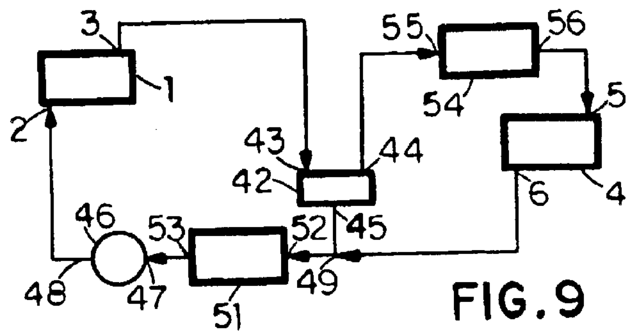

A class $III_{FN}^{ss}$ configuration with a 3-port separator and no separate receiver is shown in FIG. 9. A class $III_{FN}^{ss}$ configuration differs from a class $III_{FN}^{oo}$ configuration by the addition of subcooler 51, with refrigerant inlet 52 and refrigerant outlet 53, and of superheater 54 with refrigerant inlet 55 and refrigerant outlet 56. A class $III_{FN}^{oo}$ configuration is obtained by deleting in FIG. 9 superheater 54; and a class $III_{FN}^{oo}$ configuration is obtained by deleting in FIG. 9 subcooler 51.

I note that, in the class $III_{FN}^{ss}$ configuration shown in FIG. 9, the refrigerant flows through subcooler 51 before flowing through pump 46. However, class $III_{FN}^{ss}$ configurations, as well as class $III_{FN}^{so}$ configurations, also include configurations in which the positions, around the refrigerant principal circuit, of DR pump 46 and subcooler 51 are interchanged so that DR pump 46 is located between node or mergence point 49 and subcooler 51, and so that subcooler refrigerant outlet 53 is connected to evaporator refrigerant inlet 2. I also note that, although no receiver has been shown in FIGS. 8, 8A, and 9, subgroup $III_{FN}$ configurations may also sometimes have either a 1-port receiver or a 2-port receiver.

Figure 9A:
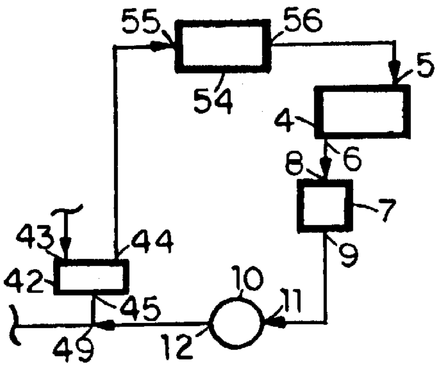

A class $III_{FF}^{ss}$ configuration with a 3-port separator and a receiver is shown in FIG. 9A. Class $III_{FF}^{so}$ configurations are obtained from FIGS. 9 and 9A by deleting superheater 54; class $III_{FF}^{os}$ configurations are obtained from the two last-cited FIGURES by deleting subcooler 51; and class $III_{FF}^{oo}$ configurations are obtained from the two last-cited FIGURES by deleting subcooler 51 and superheater 54.

4. Group IV Configurations

The key distinctive characteristic of group IV configurations, compared to other groups of configurations with an NP evaporator, is that they have a single refrigerant auxiliary circuit of the kind named a subcooler refrigerant auxiliary circuit which, by definition, always includes the one or more refrigerant passages of a subcooler, and the one or more refrigerant passages of a pump, and which may also include the one or more refrigerant passages of a preheater; but which always excludes the one or more refrigerant passages of an evaporator, and the one or more refrigerant passages of a condenser. Broadly speaking, group IV configurations are combinations of a group I configuration with a subcooler refrigerant auxiliary circuit.

I use the symbols $IV_{FF}$, $IV_{FF*}$, $IV_{F*F}$, and $IV_{NF}$, where the subscript '$_{F*}$' denotes the presence of an HF pump, to designate subgroups of group IV configurations with respectively (a) a CR pump and an SC pump,
(b) a CR pump and an HF pump,
(c) an HF pump and an SC pump, and
(d) an SC pump and no CR or HF pump.

I use a superscript to indicate the absence or presence of a subcooler, other than a subcooler having one or more refrigerant passages that are a part of the subcooler refrigerant auxiliary circuit: a 'o' (zero) and an 's' indicate respectively the absence and presence of such a subcooler.

Figure 10:
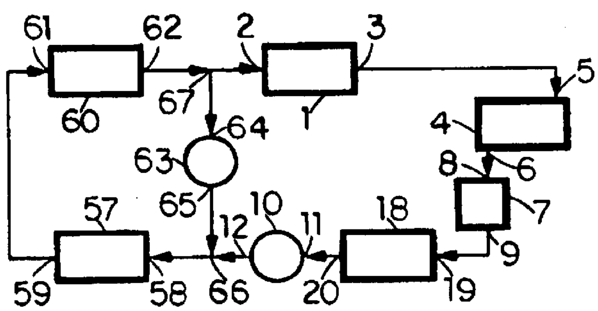

A class $IV_{FF}^{s}$ configuration with a 2-port receiver is shown in FIG. 10. Subcooler 57 has a refrigerant inlet 58 and a refrigerant outlet 59; preheater 60 has a refrigerant inlet 61 and a refrigerant outlet 62; and refrigerant circulates, under the forced action of SC pump 63, around subcooler refrigerant auxiliary circuit 66-58-59-61-62-67-64-65-66, where 64 and 65 are the inlet and outlet, respectively, of SC pump 63, and where node 66 is located along the refrigerant line connecting CR pump outlet 12 to subcooler refrigerant inlet 58, and where node 67 is located along the refrigerant line connecting preheater refrigerant outlet 62 to evaporator refrigerant inlet 2. A class $IV_{FF}^{s}$ configuration can be looked at as a class $I_{F}^{s}$ configuration to which has been added a subcooler refrigerant auxiliary circuit whose subcooler and preheater refrigerant passages are a part of the configuration's refrigerant principal circuit.

A class $IV_{FF}^{o}$ configuration is obtained by deleting subcooler 18 from a class $IV_{FF}^{s}$ configuration; and class $IV_{NF}^{s}$ and $IV_{NF}^{o}$ configurations are obtained by deleting SC pump 63 from respectively class $IV_{FF}^{s}$ and $IV_{FF}^{o}$ configurations.

Figure 10A:
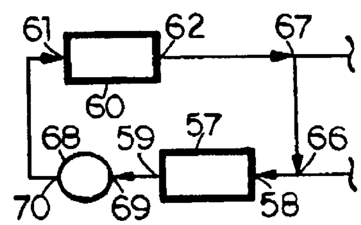
Figure 11:
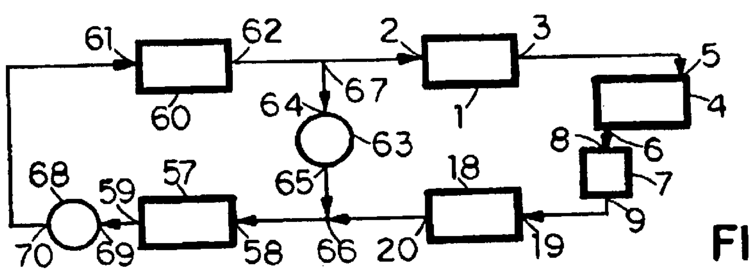

A subgroup $IV_{FF*}$ configuration differs from a subgroup $IV_{FF}$ configuration in that SC pump 63 is replaced, in the manner shown in FIG. 10A, by HF pump 68 having an inlet 69 and an outlet 70; and a subgroup $IV_{F*F}$ configuration differs from a subgroup $IV_{FF}$ configuration in that CR pump 10 is replaced, in the manner shown in FIG. 11, by HF pump 68.

Subgroup $IV_{NF}$ configurations are obtained by deleting CR pump 10 from sub-group $IV_{FF}$ configurations. Refrigerant outlet 6 of condenser 4 must be no lower than refrigerant inlet 2 of evaporator 1 in all group IV configurations having no CR pump. This is a necessary and not a sufficient requirement for operability. (In fact, the requirements for operability on the height of outlet 6 are more complex in group IV configurations with no CR pump than in group II configurations with no CR pump and no EO pump.)

Examples of group IV configurations having a subcooler refrigerant auxiliary circuit with no preheater refrigerant passages are obtained by deleting preheater 60 in FIGS. 10, 10A, and 11.

5. Group V Configurations

The key distinctive characteristic of group V configurations, compared to other groups of configurations with an NP evaporator, is that they have, in addition to a subcooler refrigerant auxiliary circuit, a type 1 evaporator refrigerant auxiliary circuit. Broadly speaking, group V configurations are combinations of group II configurations with a subcooler refrigerant auxiliary circuit which may include the one or more refrigerant passages of a preheater.

I distinguish between group V configurations with a subcooler refrigerant auxiliary circuit having a subcooler whose refrigerant passages are a part of the configurations' refrigerant principal circuit (as well as of the subcooler refrigerant auxiliary circuit) and group V configurations with a subcooler refrigerant auxiliary circuit having a subcooler whose refrigerant passages are not a part of the configurations' refrigerant principal circuit. I shall refer to the former subcooler refrigerant auxiliary circuit as an 'interactive-type subcooler refrigerant auxiliary circuit', or more briefly as an 'I-type subcooler refrigerant auxiliary circuit'; and to the latter subcooler refrigerant auxiliary circuit as a 'non-interactive-type subcooler refrigerant auxiliary circuit', or more briefly as a 'NI-type subcooler refrigerant auxiliary circuit'. Group V configurations with an I-type subcooler refrigerant auxiliary circuit have a 3-port (type 1) separator and group V configurations with an NI-type subcooler refrigerant auxiliary circuit have either a 5-port (type 1) or a 6-port (type 1) separator.

I use a first superscript to indicate the absence or presence of a subcooler, other than a subcooler having one or more refrigerant passages that are a part of the subcooler refrigerant auxiliary circuit; a second superscript to indicate the absence or presence of a superheater; and a third superscript to indicate the presence or absence of a preheater other than a preheater having one or more refrigerant passages that are a part of the subcooler refrigerant auxiliary circuit. In the case of the first superscript, a 'o' (zero), an 's', an 's'', and an 's"', indicate that group V configurations, designated by the symbols with these superscripts, have respectively (a) no subcooler other than a subcooler having one or more refrigerant passages that are a part of the subcooler refrigerant auxiliary circuit,
(b) a subcooler having one or more refrigerant passages that are a part of the refrigerant principal circuit and of no other refrigerant circuit,
(c) a subcooler having one or more refrigerant passages that are a part of the evaporator refrigerant auxiliary circuit and of no other refrigerant circuit, and
(d) a first subcooler having one or more refrigerant passages that are a part of the refrigerant principal circuit and of no other refrigerant circuit, and a second subcooler having one or more refrigerant passages that are a part of the evaporator refrigerant auxiliary circuit and no other refrigerant circuit.

In the case of the second superscript, I use the superscript 'o' (zero) and 's' to indicate that group V configurations, designated by symbols with these superscripts have no superheater, and have a superheater, respectively. And in the case of the third superscript, I use a 'o' (zero), a 'p', a 'p'', and a 'p"', to indicate that group V configurations with these superscripts, have respectively (a) no preheater other than a preheater having one or more refrigerant passages that are a part of the subcooler refrigerant auxiliary circuit;
(b) a preheater having one or more refrigerant passages that are a part of the refrigerant principal circuit and of no other refrigerant circuit;
(c) a preheater having one or more refrigerant passages that are a part of the evaporator refrigerant auxiliary circuit and of no other refrigerant circuit; and
(d) a first preheater having one or more refrigerant passages that are a part of the refrigerant principal circuit and of no other refrigerant circuit, and a second preheater having one or more refrigerant passages that are a part of the evaporator refrigerant auxiliary circuit and of no other refrigerant circuit.

In the case of group V configurations with an I-type subcooler refrigerant auxiliary circuit, I use the symbols $V_{FF}$, $V_{FF*}$, $V_{F*F}$, and $V_{NF}$, to designate subgroups of group V configurations with respectively (a) a CR pump and an SC pump,
(b) a CR pump and an HF pump,
(c) an HF pump and an SC pump, and
(d) an SC pump and no CR or HF pump.

Each of the foregoing four subgroups of group V configurations may have no EO pump or may have an EO pump. I designate subgroup $V_{FF}$, $V_{FF*}$, $V_{F*F}$, and $V_{NF}$, configurations with no EO pump by the symbols $V_{FFN}$, $V_{FF*N}$, $V_{F*FN}$, and $V_{NFN}$, respectively; and subgroup $V_{FF}$, $V_{FF*}$, $V_{F*F}$, and $V_{NF}$, configurations with an EO pump by the symbols $V_{FFF}$, $V_{FF*F}$, $V_{F*FF}$, and $V_{NFF}$, respectively.

Figure 12A:
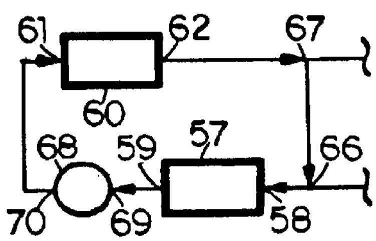
Figure 12:
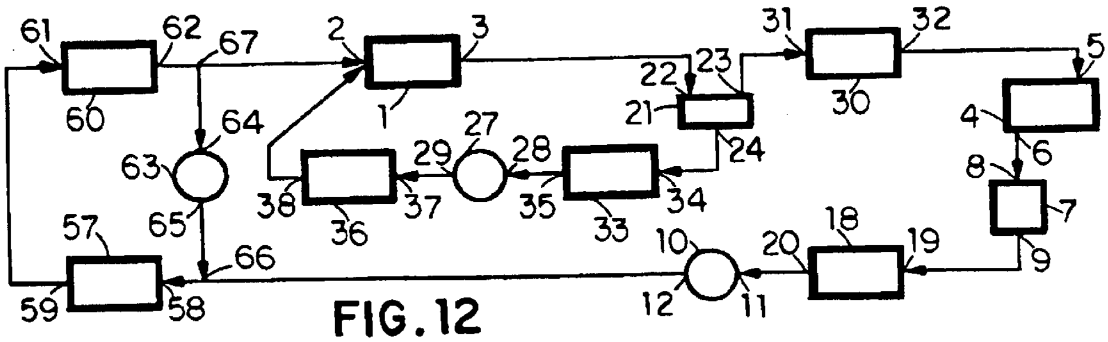

A class $V_{FFF}^{s''sp'}$ configuration with an I-type subcooler refrigerant auxiliary circuit and with a 2-port receiver is shown in FIG. 12. A class $V_{FFF}^{s''sp'}$ configuration with an I-type subcooler auxiliary refrigerant circuit can be looked at as a class $II_{FF}^{s''sp}$ configuration with a 3-port (type 1) separator to which has been added a subcooler refrigerant auxiliary circuit whose subcooler and preheater refrigerant passages are a part of the configuration's refrigerant principal circuit.

Figure 13:
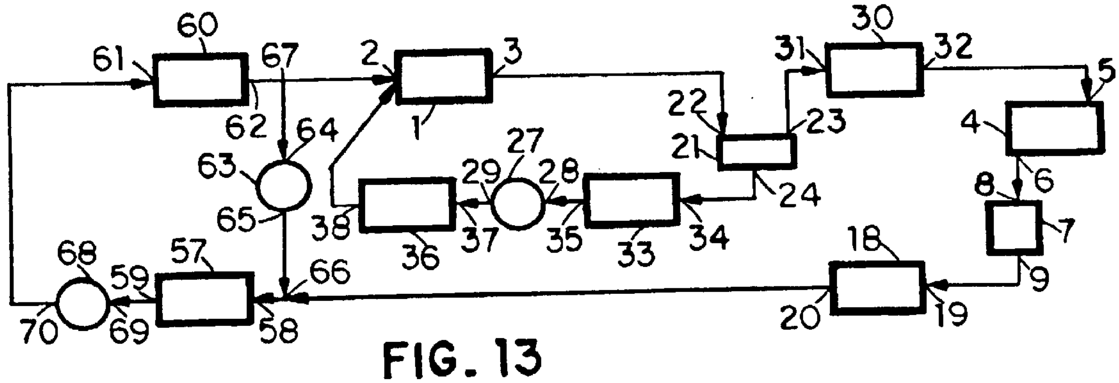

A class $V_{FF*F}^{s''sp'}$ configuration differs from a class $V_{FFF}^{s''sp'}$ configuration in that SC pump 63 is replaced, in the manner shown in FIG. 12A, by HF pump 68; and a class $V_{F*FF}^{s''sp'}$ configuration differs from a class $V_{FFF}^{s''sp'}$ configuration in that CR pump 10 is replaced, in the manner shown in FIG. 13, by HF pump 68. And, in general, sub-subgroup $V_{FF*F}$ configurations differ from sub-subgroup $V_{FFF}$ configurations in the same way as (class) $V_{FF*F}^{s''sp'}$ configurations differ from (class) $V_{FFF}^{s''sp'}$configurations; and sub-subgroup $V_{F*FF}$ configurations differ from sub-subgroup $V_{FFF}$ configurations in the same way as (class) $V_{F*FF}^{s''sp'}$ configurations differ from (class) $V_{FFF}^{s''sp'}$ configurations.

Sub-subgroup $V_{FFN}$, $V_{FF*N}$, and $V_{F*FN}$, configurations are obtained by deleting EO pump 27 from subgroup $V_{FFF}$, $V_{FF*F}$, and $V_{F*FF}$, configurations, respectively; subgroup $V_{NFF}$ and $V_{NF*F}$ configurations are obtained by deleting CR pump 10 from subgroup $V_{FFF}$ and $V_{FF*F}$ configurations, respectively; and subgroup $V_{NFN}$ configurations are obtained by deleting EO pump 27 from subgroup $V_{NFF}$ configurations. (Refrigerant outlet 6 of condenser 4 must be no lower than refrigerant inlet 2 of evaporator 1 in all group V configurations that do not have a CR pump or an HF pump.)

Examples of group V configurations having an I-type subcooler refrigerant auxiliary circuit with no preheater refrigerant passages are obtained by deleting preheater 60 in FIGS. 12, 12A, and 13.

In the case of group V configurations with an NI-type subcooler refrigerant auxiliary circuit, I use the symbols $V_{FF}$ and $V_{NF}$ to designate subgroups of group V configurations with a CR pump, and no CR pump, respectively; the symbols $V_{FFF}$ and $V_{FFN}$ to designate subgroups of subgroup $V_{FF}$ configurations with an EO pump, and no EO pump, respectively; and the symbols $V_{NFF}$ and $V_{NFN}$ to designate subgroups of subgroup $V_{NF}$ configurations with an EO pump, and no EO pump, respectively.

Figure 5A:
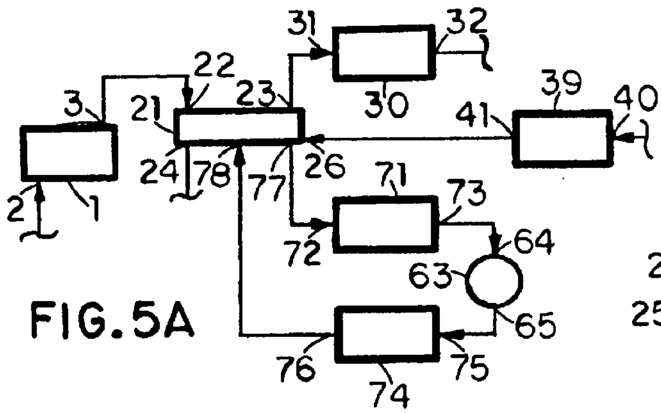
Figure 7A:
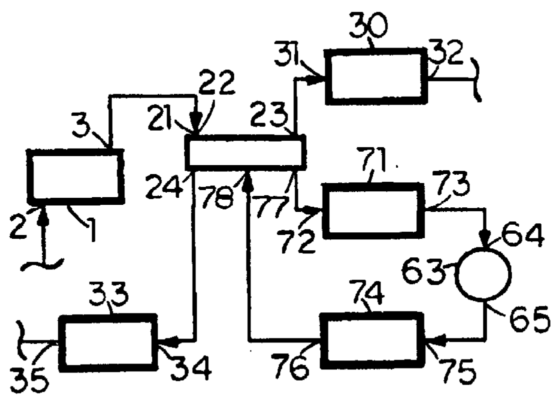

A class $V_{FFN}^{ssp}$ configuration with an NI-type subcooler refrigerant auxiliary circuit, a 6-port (type 1) separator, and a 2-port receiver, is shown in FIG. 5A, and a class $V_{FFF}^{s''sp''}$ configuration with an I-type refrigerant auxiliary circuit, a 5-port (type 1) separator, and a 2-port receiver, is shown in FIG. 7A. The former group V configuration can be looked at as a class $II_{FN}^{ssp}$ configuration in which the 4-port separator has been replaced by a 6-port separator and to which an NI-type subcooler refrigerant auxiliary circuit has been added; and the latter group V configuration can be looked at as a class $II_{FF}^{s"sp"}$ configuration in which the 3-port separator has been replaced by a 5-port separator and to which an NI-type subcooler refrigerant auxiliary circuit has been added. The subcooler refrigerant auxiliary circuit in FIGS. 5A and 7A includes subcooler 71, having a refrigerant inlet 72 and a refrigerant outlet 73; a preheater 74, having a refrigerant inlet 75 and a refrigerant outlet 76; and SC pump 63, which controls the circulation of liquid refrigerant around subcooler refrigerant auxiliary circuit 77-72-73-64-65-75-76-78 where 77 and 78 are respectively a liquid outlet and a liquid inlet of type 1 separator 21. 1 note that the positions of SC pump 63 and subcooler 71 around the NI-type subcooler refrigerant auxiliary circuit can be interchanged.

Examples of group V configurations having an NI-type subcooler refrigerant auxiliary circuit with no preheater are obtained by deleting preheater 74 in FIGS. 5A and 7A.

6. Group VI Configurations

The key distinctive characteristic of group VI configurations, compared to other groups of configurations with an NP evaporator, is that they have, in addition to a subcooler refrigerant auxiliary circuit, a type 2 evaporator refrigerant auxiliary circuit. Broadly speaking, group VI configurations are combinations of group III configurations with a subcooler refrigerant auxiliary circuit.

I distinguish—as in the case of group V configurations—between group VI configurations with an I-type subcooler refrigerant auxiliary circuit and group VI configurations with an NI-type subcooler refrigerant auxiliary circuit. Group VI configurations with an I-type subcooler refrigerant auxiliary circuit may—unlike group V configurations with an l-type subcooler refrigerant auxiliary circuit—have a 4-port (type 2) separator as well as a 3-port (type 2) separator; and group VI configurations with an NI-type subcooler refrigerant auxiliary circuit may—like group V configurations with an NI-type subcooler refrigerant auxiliary circuit—have either a 5-port (type 2) separator or a 6-port (type 2) separator. However, the differences between group VI configurations with 3-port and 4-port separators, and between group VI configurations with 5-port and 6-port separators, are only minor; and therefore only 3-port separator and 5-port separator group VI configurations are shown. (4-port separator group VI configurations and 6-port separator group VI configurations can be deduced easily respectively from the three 3-port separator group VI configurations shown (see FIGS. 14, 14A, and 15) and from the one 5-port group VI configuration shown (see FIG. 9A) by comparing FIG. 8A with FIG. 8.)

In the case of group VI configurations with an I-type subcooler refrigerant auxiliary circuit, I use the symbol $VI_{FF}$ to designate group VI configurations with a DR pump and an SC pump; the symbol $VI_{FF*}$ to designate the subgroup of group VI configurations with a DR pump and an HF pump, and the symbol $VI_{F*F}$ to designate the subgroup of group VI configurations with an HF pump and an SC pump. I use a first superscript to indicate the absence or presence of a subcooler, other than a subcooler having one or more refrigerant passages that are a part of the subcooler refrigerant auxiliary circuit; and a second superscript to indicate the absence or presence of a superheater. In the case of the first superscript, a 'o' (zero), and an 's' indicate that group VI configurations, designated by the symbols with these superscripts, have respectively (a) no subcooler other than a subcooler having one or more refrigerant passages that are a part of the subcooler refrigerant auxiliary circuit, and (b) a subcooler having one or more refrigerant passages that are a part of the refrigerant principal circuit and not of the subcooler refrigerant auxiliary circuit.

In the case of the second superscript, a 'o' (zero) and an 's' indicate that group VI configurations, designated by symbols with these superscripts, have no superheater, and have a superheater, respectively.

Figure 14A:
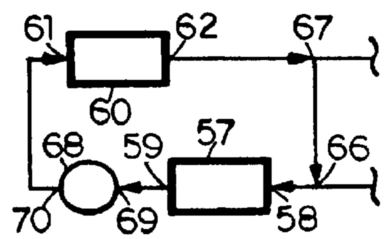
Figure 29A:
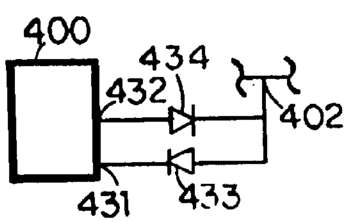
Figure 30A:
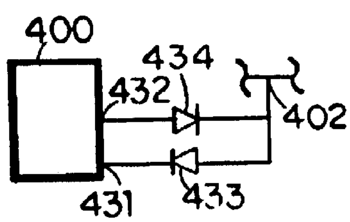
Figure 31B:
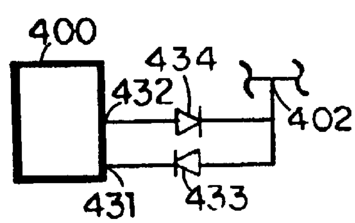
Figure 14:
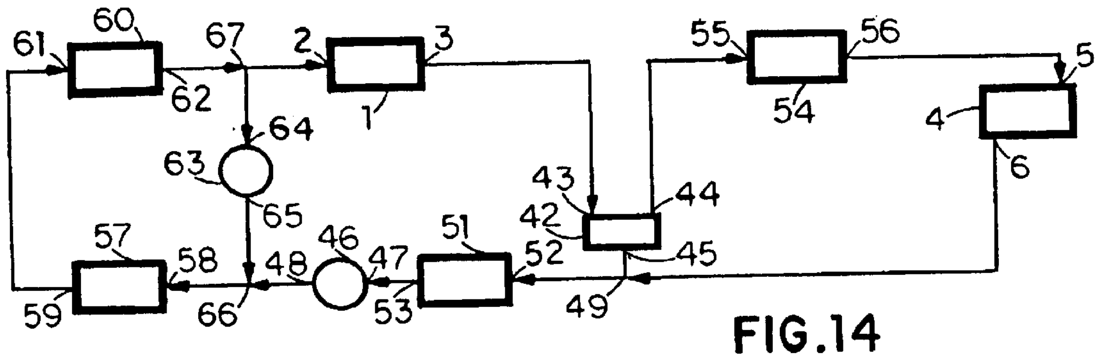

A class $V_{FF}^{ss}$ configuration with a 3-port separator and a 2-port receiver is shown in FIG. 14. A class $VI_{FF}^{ss}$ configuration can be looked at as a class $III_{F}^{ss}$ configuration to which has been added a subcooler refrigerant auxiliary circuit whose subcooler and preheater passages are a part of the configuration's refrigerant principal circuit.

Figure 15:
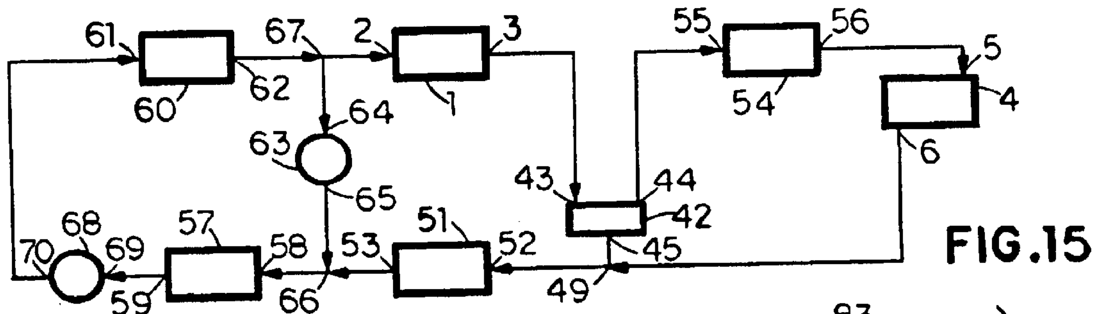

A class $VI_{FF*}^{ss}$ configuration differs from a class $VI_{FF}^{ss}$ configuration in that SC pump 63 is replaced, in the manner shown in FIG. 14A, by HF pump 68; and a class $VI_{F*F}^{ss}$ configuration differs from a class $VI_{FF}^{ss}$ configuration in that DR pump 46 is replaced, in the manner shown in FIG. 15, by HF pump 68. And, in general, subgroup $VI_{FF*}$ configurations differ from subgroup $VI_{FF}$ configurations in the same way as class $VI_{FF*}^{ss}$ configurations differ from class $VI_{FF}^{ss}$ configurations; and subgroup $VI_{F*F}$ configurations differ from subgroup $VI_{FF}$ configurations in the same way as class $VI_{F*F}^{ss}$ configurations differ from class $VI_{FF}^{ss}$ configurations.

Subgroup $VI_{NF}$ configurations are obtained by deleting DR pump 46 from subgroup $VI_{FF}$ configurations.

Examples of group VI configurations having an I-type subcooling refrigerant auxiliary circuit with no preheater refrigerant passages are obtained by deleting preheater 60 from FIGS. 14, 14A, and 15.

In the case of group VI configurations with an NI-type subcooler refrigerant auxiliary circuit, there exist only subgroup $VI_{FF}$ configurations.

Figure 9B:
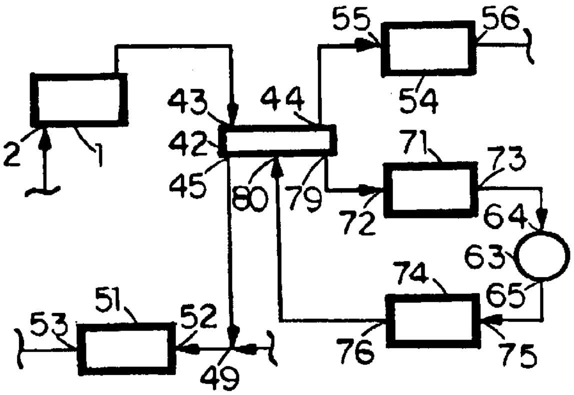

A class $VI_{FF}^{ss}$ configuration with an NI-type subcooler refrigerant auxiliary circuit and a 5-port separator is shown in FIG. 9B. This configuration can be looked at as a class $III_{FF}^{ss}$ configuration in which the 3-port separator has been replaced by a 5-port separator and to which NI-type subcooler refrigerant auxiliary circuit 79-72-73-64-65-75-76-80 has been added, where numerals 79 and 80 designate respectively a liquid-refrigerant outlet and a liquid-refrigerant inlet of separator 42.

Examples of group VI configurations having an NI-type subcooler refrigerant auxiliary circuit with no preheater refrigerant passages are obtained by deleting preheater 74 in FIGS. 5A and 7A.

7. Group VII and VIII Configurations

Figure 16:
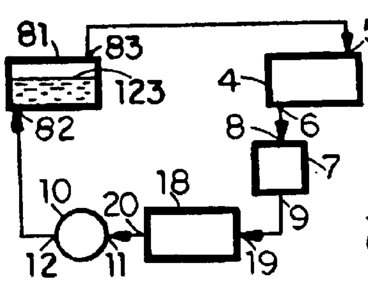
Figure 16A:
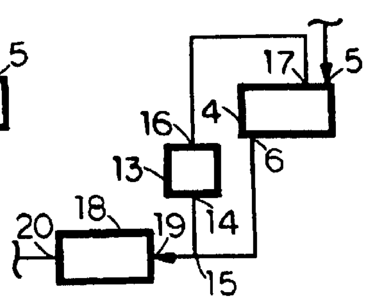
Figure 16B:
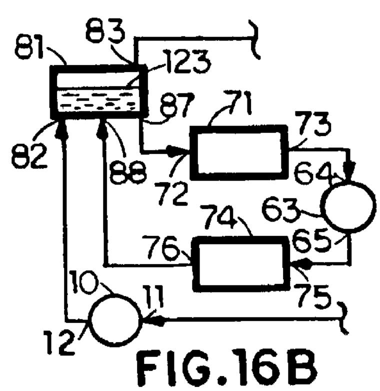

Group VII and VIII configurations are derived from respectively group I to VI configurations by replacing the NP evaporator in the latter configurations by a P evaporator. Thus, for example, a class $VII_{F}^{s}$ configuration is a class $I_{F}^{s}$ configuration in which NP evaporator 1 has been replaced by P evaporator 81 (see FIGS. 16 and 16A), and a class $X_{FF}^{s}$ configuration is a class $IV_{FF}^{s}$ configuration in which NP evaporator 1 has been replaced by P evaporator 81 (see FIG. 16B). Numeral 123 designates the refrigerant liquid-vapor interface inside a P evaporator.

8. Group II*, III*, V*, VI*, VIII*, IX*, XI*, and XII*, Configurations

Group II*, V*, VIII*, and XI*, configurations are, by definition, principal configurations derived from respectively group II, V, VIII, and XI, configurations by replacing type 1 separator 21 by type 1 separating assembly 21*; and group III*, VI*, IX*, and XII*, configurations are, by definition, principal configurations derived from respectively group III, VI, IX, and XII, configurations by replacing type 2 separator 42 by type 2 separating assembly 42*, and by adding a receiver whenever the four last-cited groups have no receiver and a receiver is required. (A receiver is usually required unless condenser 4 can also perform the function of a receiver. An example of such a condenser is a shell-and-tube condenser with refrigerant outside its tubes.) Thus, for example, a class $VIII^*{}_{FN}{}^{ooo}$ configuration is a class $VIII_{FN}{}^{ooo}$ configuration in which separator 21 has been replaced by separating assembly 21* (see FIG. 17); and a class $IX^*{}_{FN}{}^{oo}$ configuration is a class $IX_{FN}{}^{oo}$ configuration in which separator 42 has been replaced by separating assembly 42* (see FIG. 18), and to which—where the class $IX_{FN}{}^{oo}$ configuration has no receiver—a receiver has been added. (The receiver may be a 1-port or a 2-port receiver.)

However, whereas in symbols designating classes belonging to group III, VI, IX, and XII, configurations, the first superscript is either a 'o' (zero) or an 's'; in symbols designating classes belonging to group III*, VI*, IX*, and XII*, configurations the first superscript can, in addition to a 'o' or an 's', also be an 's′', an 's″', or an 's‴'. A 'o' indicates classes belonging to group III* and IX* configurations having no subcooler; and classes belonging to group VI* and XII* configurations having no subcooler other than a subcooler whose one or more refrigerant passages are a part of the configurations' subcooler refrigerant auxiliary circuit. An 's' indicates classes belonging to group III* and IX* configurations having a subcooler whose one or more refrigerant passages are a part of the configurations' principal refrigerant circuit and evaporator refrigerant auxiliary circuit, and of no other refrigerant circuit; and classes belonging to group VI* and XII* configurations having a subcooler whose one or more refrigerant passages are a part of the configurations' principal refrigerant circuit and evaporator refrigerant auxiliary circuit, and of no other refrigerant circuit other than a subcooler whose one or more refrigerant passages are a part of the configurations' subcooler refrigerant auxiliary circuit. An 's′' indicates classes belonging to group III* and IX* configurations having a subcooler whose one or more refrigerant passages are part of the configurations' one or more evaporator refrigerant auxiliary circuits and of no other refrigerant circuit; and classes belonging to group VI* and XII* configurations having a subcooler whose one or more refrigerant passages are part of the configurations' one or more evaporator refrigerant auxiliary circuits, and of no other refrigerant circuit other than a subcooler whose one or more refrigerant passages are a part of the configurations' subcooler refrigerant auxiliary circuit. An 's″' indicates classes belonging to group III* and IX* configurations having a first subcooler whose one or more refrigerant passages are part of the configurations' refrigerant principal circuit and of the configurations' evaporator refrigerant auxiliary circuit; and a second subcooler whose one or more refrigerant passages are part of the evaporator refrigerant auxiliary circuit, and of no other refrigerant circuit; and classes belonging to group VI* and XII configurations having a first subcooler whose one or more refrigerant passages are part of the configurations' refrigerant principal circuit and of the configurations' evaporator refrigerant auxiliary circuit; and a second subcooler whose one or more refrigerant passages are part of the evaporator refrigerant auxiliary circuit, and of no other refrigerant circuit other than a subcooler whose one or more refrigerant passages are a part of the configurations' subcooler refrigerant auxiliary circuit. And an 's‴' indicates classes belonging to group III* and IX* configurations having a subcooler whose one or more refrigerant passages are part of the refrigerant principal circuit, and of no other refrigerant circuit; and classes belonging to group VI* and XII* configurations having a subcooler whose one or more refrigerant passages are part of the refrigerant principal circuit, and of no other refrigerant circuit other than a subcooler whose one or more refrigerant passages are a part of the configurations' subcooler refrigerant auxiliary circuit.

9. General Remarks on Principal Configurations

Figure 17:
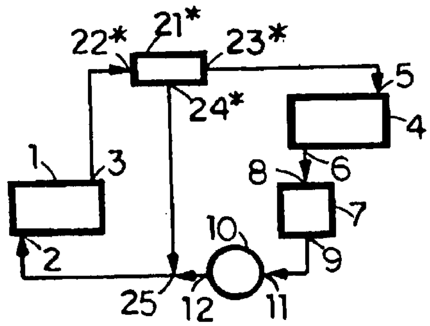
Figure 18:
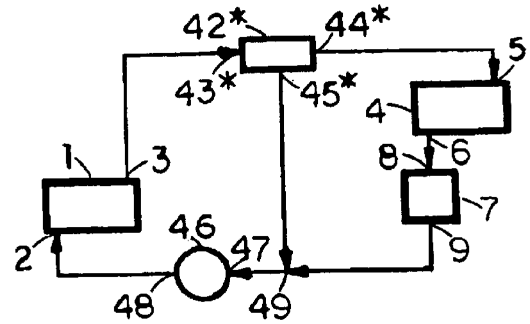

In FIGS. 1 to 15, and in FIGS. 17 and 18, refrigerant inlet 2 represents a set of one or more points or ports through which liquid enters NP evaporator 1, and refrigerant outlet 3 represents a set of one or more points or ports through which refrigerant vapor exits evaporator 1. Similarly, in FIGS. 16, 16A, and 16B, refrigerant inlet 82 represents a set of one or more points or ports through which liquid refrigerant enters P evaporator 81 and refrigerant outlet 83 represents a set of one or more points or ports through which refrigerant vapor exits evaporator 81. I note that the ports of an evaporator refrigerant inlet may not be at the same level, and that the ports of an evaporator refrigerant outlet may not be at the same level. I also note that the set of ports of an evaporator refrigerant inlet may be higher or lower than, or on the same level as, the set of ports of an evaporator refrigerant outlet.

10. Specialized Configurations

The present invention includes, in addition to the groups of principal configurations discussed in section V, several specialized groups of principal configurations which may be preferred for certain special applications.

Figure 19:
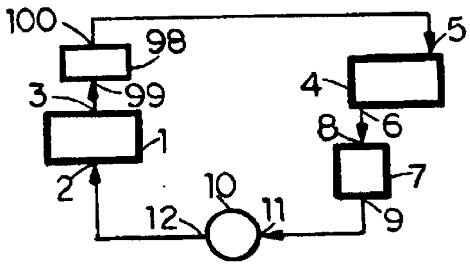

A first specialized group of principal configurations consists of principal configurations having a type 1' separator. The principal configuration shown in FIG. 19 is an example of configurations having a type 1' separator designated by numeral 98 and having a vapor inlet port 99 and a vapor outlet port 100.

Figure 20:
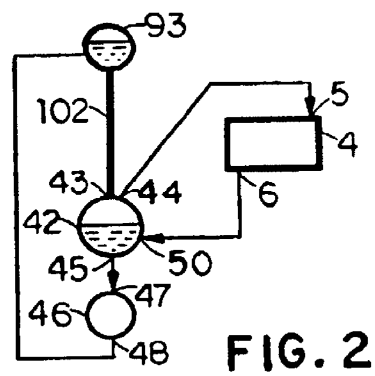

A second group of specialized principal configurations consists of principal configurations having an upper special header through which liquid refrigerant is distributed to the one or more refrigerant passages of their evaporator, the special header being, under most operating conditions, filled only partially with liquid refrigerant. The principal configuration shown in FIG. 20 is an example of a principal configuration having such a special header. The principal configuration shown in FIG. 20, where numeral 93 designates the special header, can be viewed as a class $III_{FN}{}^{oo}$ configuration with a refrigerant inlet above its refrigerant outlet, which has been modified by replacing its upper liquid header by special header 93.

Figure 21:
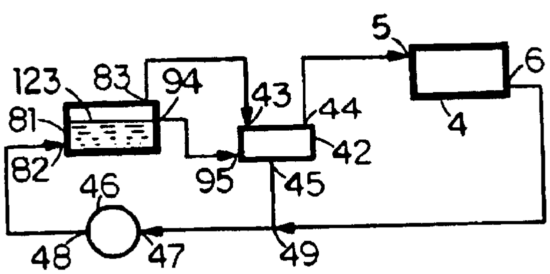
Figure 22:
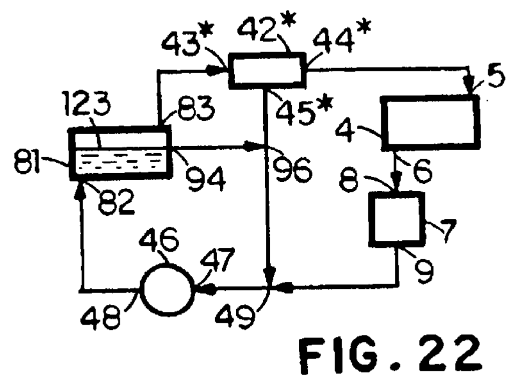
Figure 23:
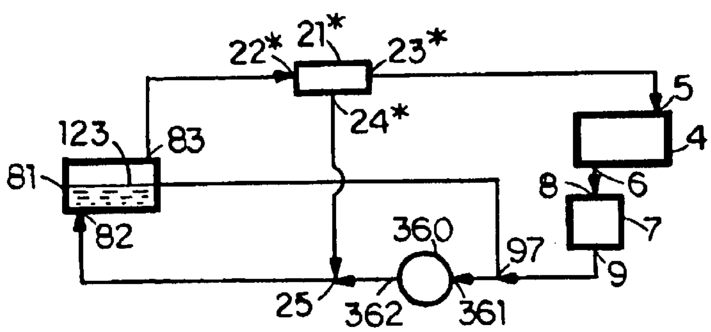

A third specialized group of principal configurations consists of principal configurations having a liquid-refrigerant auxiliary transfer means for transferring by gravity liquid refrigerant in a pool evaporator to the liquid-refrigerant principal transfer-means segment upstream from the principal configuration's refrigerant principal pump. Three examples of such specialized configurations are shown in FIGS. 21 to 23. The principal configuration shown in FIG. 21 can be viewed as a class $III^*{}_{FN}{}^{oo}$ configuration to which liquid-refrigerant line 94-95 has been added, thereby providing means for transferring by gravity liquid refrigerant in evaporator 1 to the configuration's liquid-refrigerant principal transfer-means segment upstream from DR pump 46. The principal configuration in FIG. 22 can be viewed as a class $III^*{}_{FN}{}^{oo}$ configuration to which liquid-refrigerant line 94-96 has been added, thereby again providing means for transferring by gravity liquid refrigerant to the configuration's liquid-refrigerant principal transfer-means segment upstream from DR pump 46. And the principal configuration shown in FIG. 23 can be viewed as a class $II^{*}{}_{FN}^{ooo}$ configuration to which liquid-refrigerant line 94-97 has been added, thereby providing means for transferring liquid-refrigerant to the configuration's liquid-refrigerant principal transfer-means segment upstream from refrigerant principal pump 360 having an inlet 361 and an outlet 362. (I note that, after the addition of refrigerant line 94-97, the principal pump of the class $II^{*}{}_{FN}^{ooo}$ configuration is neither a CR pump nor a DR pump.) I shall refer to a P evaporator having (liquid-refrigerant) overflow outlet 94 as an 'overflow P evaporator' to distinguish it from a 'non-overflow P evaporator' having no such overflow outlet. I would mention that I distinguish between an evaporator overflow outlet and an evaporator drain outlet. The former outlet controls, under most operating conditions, the level of liquid refrigerant in a P evaporator; whereas the latter outlet does not.

11. Integral Evaporator-separator Combinations

The principal configurations of the invention include configurations in which a type 1 or a type 1' separator is physically an integral part of an NP evaporator. Any integral evaporator-separator combination, employed in conventional (namely in airtight) steam generators and in refrigeration equipment, can also be employed in the airtight configurations of the invention—provided the evaporator-separator combination used is constructed with materials and joining techniques compatible with the refrigerant employed and suitable for airtight configurations. Examples of evaporator-separator combinations range from an evaporator-separator combination having a single evaporator refrigerant passage, and a separator whose separator vessel is a small sphere, to an evaporator-separator combination having, like the so-called four-drum Stirling-type boilers, hundreds of refrigerant passages. I give here just enough examples of evaporator-separator combinations to show how they fit into the principal configurations. I use in these examples a class $II_{FN}^{ooo}$ configuration with a 2-port receiver and certain principal configurations with a type 1' separator; but other—although not all—principal configurations with a type 1, or a type 1', separator could also have been used.

Figure 24:
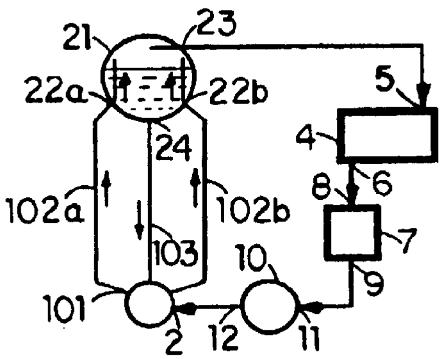
FIG. 24 and FIGS. 24A to 24E show diagrammatically typical integral evaporator-separator combinations used by the invention.
Figure 24A:
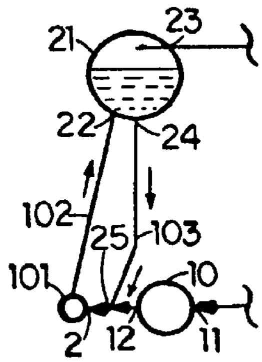
Figure 24B:
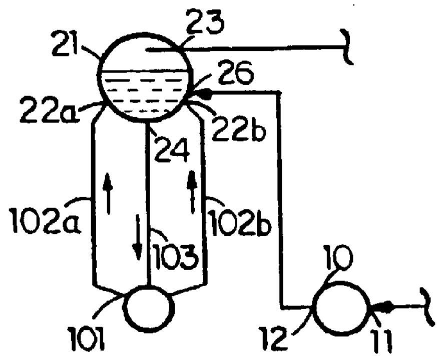
Figure 24C:
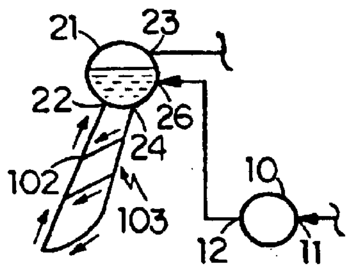
Figure 24D:
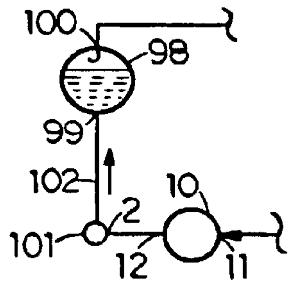
Figure 24E:
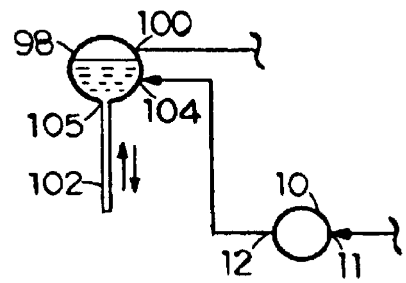

The integral evaporator-separator combination shown in FIGS. 24 and 24A, in FIGS. 24B and 24C, in FIG. 24D, and in FIG. 24E, have respectively a 3-port type 1 separator, a 4-port type 1 separator, a 2-port type 1' separator, and a 3*-port type 1' separator; the type 1 separators being designated by numeral 21 and the type 1' separators by numeral 98, both types having a cylindrical separator vessel whose axis is normal to the paper. Four of the foregoing six combinations also have a liquid header, designated by numeral 101, the axis of the liquid header being also normal to the paper. All six combinations have several evaporator refrigerant passages designated by numeral 102; and four evaporator-separator combinations have a type 1 evaporator refrigerant auxiliary circuit having a liquid-refrigerant-return segment consisting of one or more refrigerant lines designated collectively by numeral 103.

In FIGS. 24 and 24B, alphanumeric symbols 102*a* and 102*b* designate respectively the left-hand and right-hand banks (in planes normal to the paper) of the evaporator's refrigerant passages, and alphanumeric symbols 22*a* and 22*b* designate respectively the left-hand and right-hand rows of separator-vessel ports (in planes normal to the paper) corresponding to vapor inlet 22 of a type 1 separator. In FIGS. 24A and 24C to 24E, numeral 102 designates a single bank of evaporator refrigerant passages. In FIGS. 24A and 24C, numeral 22 designates a single row of separator-vessel ports corresponding to vapor inlet 22. In FIG. 24A numeral 103 designates a single liquid-refrigerant return line, and numeral 24 designates a single separator-vessel port, and, in FIGS. 24, 24B and 24C, numeral 103 designates a single bank of liquid-refrigerant return lines and numeral 24 designates a single row of separator-vessel ports corresponding to liquid outlet 24 of a type 1 separator, each member of the bank of liquid-refrigerant return lines including, in the case of FIG. 24C, the set of refrigerant lines shown. In FIG. 24D, numeral 99 designates a row of separator-vessel ports corresponding to vapor inlet 99 in FIG. 19. Finally, in FIG. 24E, numeral 104 designates the liquid inlet of the 3*-port type 1' separator shown, numeral 105 designates a row of separator-vessel inlet-outlet ports through which liquid refrigerant exits separator 98 and through which refrigerant vapor enters separator 98, and numeral 100 designates, as in FIG. 24D, a separator-vessel outlet port through which refrigerant vapor exits separator 98. (Evaporator refrigerant passages 102 in FIG. 24E must be large enough to allow so-called 'sewer flow' to occur.)

12. Component Heat Exchangers, Component Heat Sources, and Component Heat Sinks

Each of the heat exchangers represented by a rectangle in the FIGURES may be a 'unitary heat exchanger' consisting, by definition, of a single unit; or may be a 'split heat exchanger' that includes, by definition, several separate and physically-distinct heat-exchanger units I shall hereinafter refer to as 'component heat exchangers'. Component heat exchangers of the same split heat exchanger may have their refrigerant passages connected in series, in parallel, or both in series and in parallel; the refrigerant passages of all component heat exchangers of a given split heat exchanger constituting the split heat exchanger's refrigerant passages. In the particular case where a heat exchanger is a hot heat exchanger, a cold heat exchanger, an evaporator, a preheater, a superheater, a condenser, a subcooler, and a desuperheater, I shall refer to the heat exchanger's component heat exchangers respectively as 'component hot heat exchangers', 'component cold heat exchangers', 'component evaporators', 'component preheaters', 'component superheaters', 'component condensers', 'component subcoolers', and 'component desuperheaters'.

A heat source of a given split hot heat exchanger may be either a 'unitary heat source', consisting, by definition, of a single not readily-divisible heat source; or may be a split heat source consisting of several readily-distinguishable component heat sources. A unitary hot heat exchanger has almost always a unitary heat source, but a split hot heat exchanger may have either a unitary heat source or a split heat source. In the former case all the component heat exchangers of the split hot heat exchanger have the selfsame heat source, whereas in the latter case at least two of the component heat exchangers of a split hot heat exchanger have readily-distinguishable component heat sources of the split heat source. Similarly, a heat sink of a given split cold heat exchanger may be either a 'unitary heat sink', consisting, by definition, of a single not readily-divisible heat sink; or may be a split heat sink consisting of several readily-distinguishable component heat sinks. A unitary cold heat exchanger has almost always a unitary heat sink, but a split cold heat exchanger may have either a unitary heat sink or a split heat sink. In the former case all the component heat exchangers of the split cold heat exchanger have the selfsame heat sink, whereas in the latter case at least two of the component heat exchangers of a split cold heat exchanger have readily-distinguishable component heat sources of the split heat sink.

I note that in certain embodiments of the invention the selfsame heat exchanger is under certain operating conditions a hot heat exchanger, and is under certain other operating conditions a cold heat exchanger.

13. Compoment Seperating Devices, Component Receivers, Component Refrigerant Pumps, and Component Refrigerant Valves Briefly—as in the case of heat exchangers—separating devices, receivers, refrigerant pumps, refrigerant valves, and other elements of airtight configurations, may be a 'unitary element' consisting, by definition, of a single unit; or may be a 'split element' that includes, by definition, several separate and physically-distinct units I shall hereinafter refer to, in general, as 'component elements' and for example specifically as 'component separating devices', 'component receivers', 'component refrigerant pumps', and 'component refrigerant valves'. In particular, a refrigerant principal circuit, or a refrigerant auxiliary circuit, may include one or more refrigerant-circuit segments with several sets of parallel branches. Each branch of a set of parallel branches may, for example, include a component preheater, a component NP evaporator, and a component separating device; and another set of parallel branches may include a component condenser, a component receiver, and a component subcooler. Furthermore, a refrigerant principal circuit, or a refrigerant auxiliary circuit of a principal configuration may have sub-branches merging into branches which in turn merge into a single refrigerant-circuit segment. Thus, for example, a single principal configuration may—as in a system reduced to actual practice by S. Molivadas—have sixteen parallel branches, each of which contains four component NP evaporators, connected in series to four parallel branches, each of which contains a component separating device and more specifically a component separator; and four parallel branches, each of which contains a component condenser.

14. Split Refrigerant Principal Configurations

All the principal configurations discussed so far have a single evaporator and a single condenser, either of which may be a unitary or a split heat exchanger. I shall refer to the foregoing principal configurations as 'unitary principal configurations'. In certain applications, the refrigerant principal circuit of a principal configuration may consist of several branches which have either (1) a common component evaporator and different condensers, or (2) a common component condenser and different evaporators. I shall refer to the last-cited principal configurations as 'split principal configurations'. Examples of split principal configurations are given later in this DESCRIPTION.

The branches of a spiit principal configuration have the selfsame refrigerant and a common refrigerant principal-circuit segment. However, each of these branches can often be thought of conceptually as belonging to distinct principal configurations which can be grouped and classified in the same way as unitary principal configurations.

15. Subatmospheric Airtight Configurations

I use the term 'subatmospheric airtight configurations' to denote airtight configurations whose refrigerant pressure always stays—except in the case of a failure—below ambient atmospheric pressure while they are active and while they are inactive.

I note that prior-art so-called vapor, vacuum, and variable-vacuum, steam systems have non-airtight configurations. Consequently, their configurations, while inactive, ingest air until their refrigerant pressure reaches ambient atmospheric pressure, and therefore this pressure does not always stay below ambient atmospheric pressure. Furthermore, all of the foregoing three prior-art systems are operated at positive as well as negative gauge pressures; typically at positive gauge pressures up to 5 psig (0.345 bar gauge) in the case of vacuum and variable-vacuum systems. It follows that the refrigerant-circuits (water-steam circuits) of the three prior-art systems cited above must use components designed to withstand internal working pressures as well as external working pressures, and to meet the requirements of applicable pressure-vessel and pressure-piping codes.

By contrast, airtight configurations having aqueous solutions as their refrigerant, and maximum heat-sink temperatures substantially below (say at least 15° C. below) the refrigerant's saturated-vapor temperature at ambient atmospheric pressure, can be operated so that their refrigerant pressure always stays below ambient atmospheric pressure. It follows that the refrigerant circuits of such configurations can be equipped with one or more pressure-relief devices that release refrigerant (into the ambient air) when their refrigerant exceeds only slightly ambient atmospheric pressure (because, for example, of a system malfunction).

Subatmospheric airtight configurations—namely airtight configurations whose refrigerant pressure always stays below ambient atmospheric pressure—are not restricted to a particular kind of refrigerant, and may use any azeotropic-like or non-azeotropic refrigerant. Neither are subatmospheric airtight configurations restricted to transferring heat to heat sinks at temperatures below the boiling point of their refrigerant at ambient atmospheric pressures. For example, a subatmospheric airtight configuration whose refrigerant is lithium can transfer heat to heat sinks well above 1000° C. even at ambient atmospheric pressures at sea level.

Figure 25:
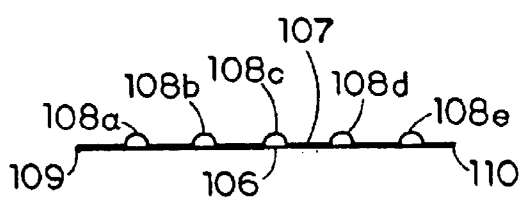
FIGS. 25 and 26 show diagrammatically a typical heat exchanger of subatmospheric airtight configurations of the invention.
Figure 26:
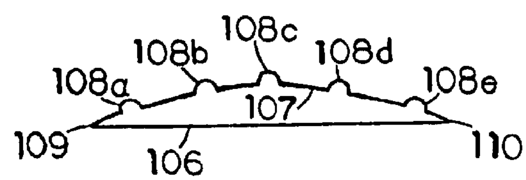

The refrigerant passages of subatmospheric airtight configurations need not be capable of withstanding net internal pressures. This allows heat exchangers to be made with techniques which greatly reduce their cost, and which make them immune to damage by frozen refrigerants that, like $H_2O$, expand when they change from their liquid to their solid phase. For example, a heat exchanger can be made of two flat or tubular sheets of material—such as copper, copper-plated steel, or aluminum—joined together only around their perimeter by, for instance, brazing or welding. One or both sheets have corrugations, waffle-like patterns, or hybrid patterns, that form, when the two sheets are held against each other, a panel having refrigerant passages connected to a refrigerant inlet, and to a refrigerant outlet, located at opposite ends of the two sheets' common perimeter. FIGS. 25 and 26 show a cross-section of two sheets of thermally-conducting material. The two sheets are designated by the numerals 106 and 107. Sheet 106 is a flat sheet whereas sheet 107 is embossed, or is stamped, to form parallel channels over at least a part of its surface. The cross-sections of the last-cited channels are designated by numerals 108*a* to 108*e* in FIGS. 25 and 26. Sheets 106 and 107 are joined together only around their perimeter. (Points 109 and 110 in FIGS. 25 and 26 represent two sides of that perimeter). Consequently, when the pressure exerted by a fluid or by a solid, located between sheets 106 and 107, exceeds the ambient atmospheric 5 pressure of a fluid surrounding sheets 106 and 107, these two sheets will move apart as shown in FIG. 26. However, when the pressure exerted by a fluid located between sheets 106 and 107 is less than the pressure of the surrounding fluid, the surrounding fluid will press sheets 106 and 107 together. In this second case, channels 108*a* to 108*e* form, as shown in FIG. 25, separate and distinct fluid passages. Fluid passages formed in the manner just described can be used as refrigerant passages of any one of the six kinds of heat exchangers cited in definitions (2) to (7) in part III,A of this DESCRIPTION, provided the pressure of the surrounding fluid exceeds the refrigerant pressure inside channels 108*a* to 108*e* while the principal configuration of the airtight configuration containing those channels is active.

16. Principal-configuration Controllable Elements

'Principal-configuration controllable elements', referred to in the CLAIMS as 'principal-configuration controllable means', are, by definition, elements of a principal configuration controlled by the two-phase heat-transfer system to which the principal configuration belongs. Principal-configuration controllable elements include refrigerant pumps and refrigerant valves.

The control of controllable elements of an airtight configuration, and in particular of a principal configuration, of the invention may be two-step, multi-step, or proportional: usually two-step or proportional in the case of unidirectional controllable pumps, and usually three-step or proportional in the case of bidirectional controllable pumps such as certain refrigerant pumps, certain hot-fluid pumps and cold-fluid pumps, and certain other fluid pumps. I shall say that a set of one or more system-controllable elements is controlled so that the characterizing parameter controlled by the set stays close to, or tends to, a preselected value where the preselected value is a single value. Proportional control can be achieved by using a modulated analog signal or by using a modulated pulsed signal.

C. Ancillary Configurations

1. Liquid-refrigerant Reservoirs

The liquid-refrigerant (LR) reservoirs used in type A or in type B combinations can be any known kind of suitable fixed-volume reservoir, or any known kind of suitable variable-volume reservoir having an internal volume which can be changed by the two-phase heat-transfer system to which the variable-volume reservoir belongs. The word 'suitable' in the immediately preceding sentence denotes properties such as compatibility with the liquid refrigerant stored in an LR reservoir, and the ability to withstand the range of refrigerant pressures and temperatures over which the LR reservoir is to be used.

Examples of variable-volume reservoirs are (1) structures, such as bellows-type and bladder-type devices, and (2) combinations of a deformable and a rigid structure, such as a rigid cylinder with for instance a cylindrical or a spheroidal shape, which together form a space within which liquid refrigerant is stored. I shall refer to the former reservoirs as 'type 1 variable-volume reservoirs' and to the latter reservoirs as 'type 2 variable-volume reservoirs', but I shall designate all variable-volume LR reservoirs by the same numeral.

In the case cited under (1) in the immediately-preceding minor paragraph, an external rigid structure may have to be used to constrain lateral and/or longitudinal motions of the variable-volume reservoir. Whether or not such an external frame is necessary depends on (1) the material or materials from which the reservoir is made, and (2) the tilts and accelerations to which it will be subjected. In type $II_R$ ancillary configurations (see section V,C,2,b,ii), the rigid structure mentioned in the immediately-preceding sentence may be provided by the mechanism used to provide the external mechanical force; and in type $III_R$ ancillary configurations (see section V,C,2,b,iii), the rigid structure may be provided by a rigid container in which the deformable structure is partly or entirely enclosed.

2. Types of Ancillary Configurations a. Definitions of Type $I_R$ to $VI_R$ Configurations Most of the (refrigerant) ancillary configurations which can be used in type A and type B combinations (of the invention) can be grouped into six general types:

(a) type $I_R$ configurations which have a variable-volume reservoir, and which employ a (refrigerant) liquid-transfer pump, or more briefly an LT pump, to change the amount of liquid refrigerant stored in the reservoir;
(b) type $II_R$ configurations which have a variable-volume reservoir, and which employ a mechanism to change the reservoir's internal volume—by exerting an external mechanical force on the reservoir—and thereby change the amount of liquid refrigerant stored in the reservoir;
(c) type $III_R$ configurations which have a variable-volume reservoir, and which employ a fluid, outside the reservoir, to change the reservoir's internal volume—by exerting an external pressure on the reservoir—and thereby change the amount of liquid refrigerant in the reservoir;
(d) type $IV_R$ configurations which have a fixed-volume (LR) reservoir, containing a fixed amount of inert gas in direct contact with liquid refrigerant in the reservoir, and which employ an LT pump to change the amount of liquid refrigerant in the reservoir;
(e) type $V_R$ configurations which have a fixed-volume reservoir, containing a fixed amount of inert gas in direct contact with liquid refrigerant in the reservoir, and which employ external means to change the temperature of the inert gas contained in the reservoir, and thereby change the amount of liquid refrigerant in the reservoir; and
(f) type $VI_R$ configurations which have a fixed-volume reservoir, containing a variable amount of inert gas in direct contact with liquid refrigerant in the reservoir, and which employ an inert-gas configuration to change the amount of inert gas in the reservoir, and thereby change the amount of liquid refrigerant in the reservoir.

b. Typical Type $I_R$ to $VI_R$ Configurations i. Type $I_R$ Configurations

Figure 27:
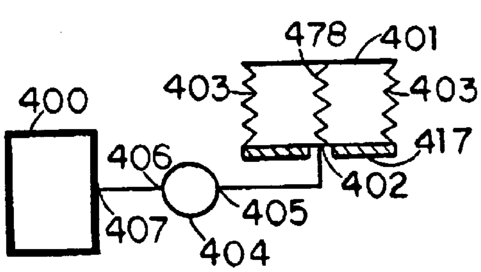

FIG. 27 shows typical components employed in a type $I_R$ configuration. In FIG. 27, numeral 400 denotes a principal configuration; and numeral 401 designates a variable-volume LR reservoir having an inlet-outlet refrigerant port 402 (through which liquid refrigerant can flow in either direction). The variable-volume LR reservoir is attached to fixed structure 417.

The LR reservoir shown is a type 1 bellows-type reservoir with a flexible corrugated cylindrical wall 403, but the LR reservoir could, as mentioned earlier, be any kind of variable-volume reservoir.

Numeral 404 (in FIG. 27) designates an LT pump having inlet-outlet ports 405 and 406, and numeral 407 designates an inlet-outlet port or node at which liquid refrigerant in the ancillary configuration merges with refrigerant in the principal configuration—usually with liquid refrigerant in the principal configuration's refrigerant principal circuit. Pump 404 is a bidirectional pump capable of inducing liquid-refrigerant flow from port 405 toward port 402, or liquid-refrigerant flow from port 406 toward port 407. Port 407 can be located at any point of the principal configuration at which the refrigerant void fraction is essentially zero at the time liquid refrigerant is being transferred from the principal configuration to the ancillary configuration. Pump 404 would in most applications be a positive-displacement pump.

In the particular case where (a) the LR reservoir's corrugated cylindrical wall offers a resistance which is small compared to the pressure $p_R$ of the liquid refrigerant in reservoir 401 and to the pressure $p_A$ of the reservoir's ambient fluid, which is usually the earth's atmosphere, and where
(b) the relevant friction-induced refrigerant-pressure drops and gravity-induced pressure on the refrigerant are also small compared to both $p_R$ and $p_A$, the pressure head which must be produced by pump 404 is approximately equal to the difference ($p_R$–$p_A$) In the foregoing particular case, the maximum pressure head which must be produced by pump 404 can often be reduced by using a spring 478 to equalize the head which must be produced by pump 404 in the two directions of refrigerant flow induced by it. For example, if the ambient fluid is the atmosphere at sea level, the value of $p_A$ will be about one atmosphere, and if the normal operating value of $p_R$ is two atmospheres, a spring exerting a pressure of one-half atmosphere on reservoir 401, in the same direction as $p_A$, will reduce the maximum required pressure head of pump 404 from one atmosphere to one-half atmosphere.

ii. Type $II_R$ Configurations

Figure 28:
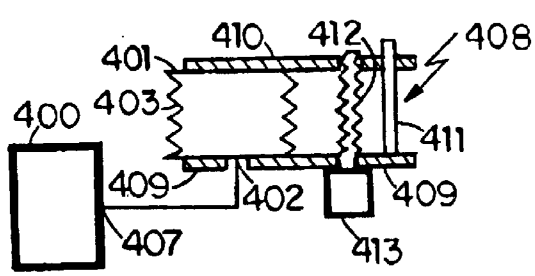

FIG. 28 shows an example of a rudimentary mechanism for exerting an external mechanical force on a type 1 variable-volume reservoir. In this rudimentary example, vise 408—comprising fixed jaw 409, movable jaw 410, slide 411, and screw 412—is driven by reversible electric motor 413. Jaws 409 and 410 are bonded to respectively the lower and upper walls of reservoir 401. This bonding allows vise 408 to exert a bidirectional force capable of increasing and decreasing the internal volume of reservoir 401. A type $II_R$ configuration usually has a single reversible electric motor, but it may also have instead two non-reversible electric motors.

The foregoing rudimentary vise-type mechanism may be optimal in the case where the maximum absolute value of the difference ($p_R$–$p_A$) is a fraction of a bar and the diameter of the reservoir 401 is only a couple of centimeters. However, in cases where the maximum value of the last-cited pressure difference, or the last-cited diameter, is substantially larger, a pair of screws on opposite sides of the bellows, in a plane containing the bellows' center line, would usually be preferred. These two screws would be driven through gears, by a single motor.

Figure 29:
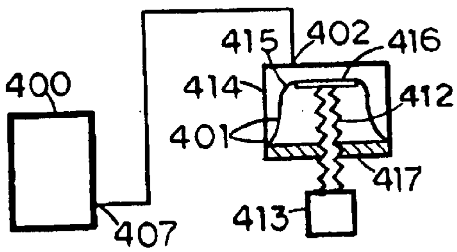

In the case of a type 2 variable-volume reservoir, the position of the deformable device could be controlled by a motor driving a single screw as shown in FIG. 29. In FIG. 29, variable-volume reservoir 401 has a rigid structure, designated by numeral 414, and a deformable structure designated by numeral 415. Plate 416 is bonded to deformable structure 415 and is moved up and down, without rotating, by screw 412 and by motor 413. Motor 413 moves up and down with screw 412, but its case is prevented from rotating by keys (not shown). A spring (not shown) between plate 416 and fixed structure 417 may be used where desirable. (The last-cited spring could be concentric with screw 412.)

Figure 30:
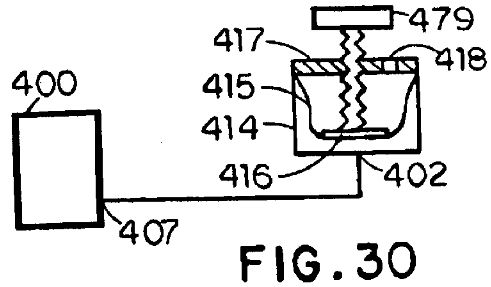

Screw 412 may be turned manually, instead of by an electric motor or other non-manually controlled device. FIG. 30 illustrates the particular case where screw 412 is turned manually using handwheel 479. Air-permeable device 418 in FIGS. 29 and 30 allows air to enter and exit the space between fixed structure 417 and deformable structure 415.

iii. Type $III_R$ Configurations

Figure 31:
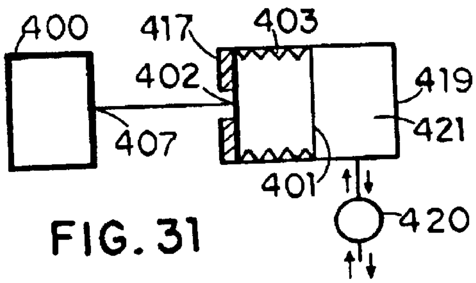

FIG. 31 illustrates the case where the fluid is compressed air and reservoir 401 is a type 1 variable-volume reservoir having a flexible corrugated wall 403. In FIG. 31, reservoir 401 is located in rigid closed cylinder 419. One of the ends of reservoir 401 is bonded to one of the ends of cylinder 419, but wall 403 can slide inside cylinder 419. Air-transfer pump 420 changes the internal volume of reservoir 401 by varying the pressure of the air in space 421.

Figure 31A:
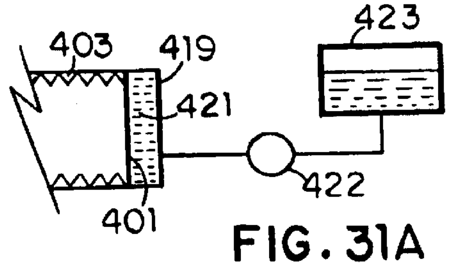

FIG. 31A illustrates the case where the fluid outside the reservoir is a hydraulic fluid. In FIG. 31A, hydraulic pump 422 varies the mass of hydraulic fluid in space 421 by transferring hydraulic fluid between space 421 and hydraulic-fluid reservoir 423 which may, but need not, be at atmospheric pressure.

iv. Type $IV_R$ Configurations

Figure 32A:
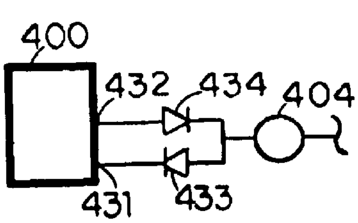
Figure 34A:
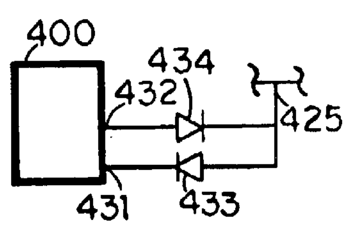
Figure 32:
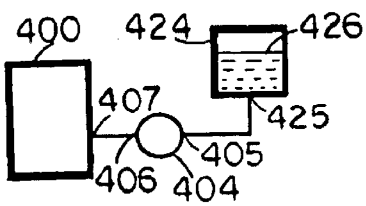

FIG. 32 shows a type $IV_R$ ancillary configuration. In FIG. 32, numeral 424 designates a fixed-volume LR reservoir having a liquid-refrigerant inlet-outlet port 425, and numeral 426 designates the quasi-horizontal interface surface, inside reservoir 424, between liquid refrigerant on the one hand and inert gas mixed with refrigerant vapor on the other hand. The fixed mass of inert gas, inserted permanently in reservoir 424, allows LT pump 404 to vary substantially the amount of liquid refrigerant in reservoir 424.

v. Type $V_R$ Configurations

Figure 33:
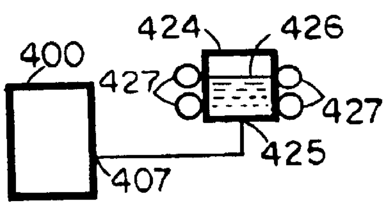

FIG. 33 shows a type $V_R$ ancillary configuration in the particular case where the temperature of the inert gas inside reservoir 424 is changed by, for example, circulating a liquid in coil 427, and by varying the temperature of the liquid being circulated.

vi. Type $VI_R$ Configurations

Figure 34:
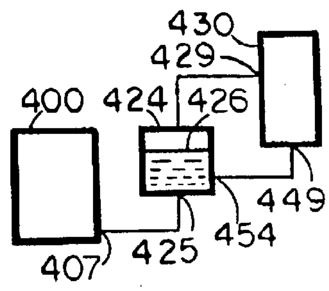

FIG. 34 shows a type $V_R$ configuration in which the amount of inert gas in reservoir 424 is varied by inserting inert gas in, and extracting inert gas from, reservoir 424 through inert-gas pipe 428-429 connected, at point 429, to inert-gas (IG) configuration 430. (Line 449-454 is a liquid-refrigerant line for returning liquid refrigerant removed from inert gas in IG configuration 430.)

c. Alternative Type $I_R$ To $VI_R$ Ancillary Configurations

One of several alternative forms of each of the type $I_R$ to $VI_R$ ancillary configurations shown in FIGS. 27 to 34, and 31A, may be preferable in certain applications. I mention next a few typical examples.

Figure 27A:
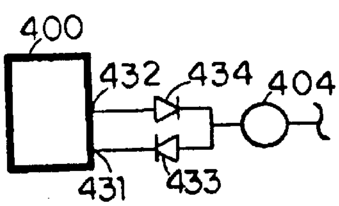
Figure 28A:
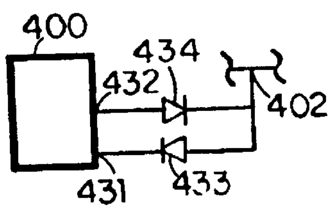
Figure 33A:
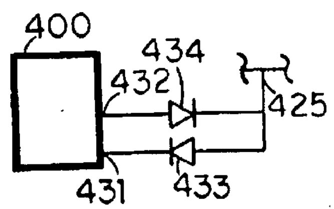

In certain applications it may be desirable for port 407—where liquid refrigerant in the ancillary configuration merges with liquid refrigerant in the principal configuration—to be replaced (see, for example, FIGS. 27A and 32A; FIGS. 28A, 29A, 30A, and 31B; and FIGS. 33A, and 34A) by inlet 431 where liquid refrigerant, in the ancillary configuration, exits the ancillary configuration and enters the principal configuration, and by outlet 432 where refrigerant, in the principal configuration, exits the principal configuration and enters the ancillary configuration. In the eight last-cited FIGURES, numerals 433 and 434 designate unidirectional (one-way) valves. I shall hereinafter refer collectively to ancillary configurations with a common inlet-outlet port as 'one-port ancillary configurations' and to ancillary configurations with separate and distinct inlet and outlet ports as 'two-port ancillary configurations'.

An example of applications where two-port ancillary configurations may be desirable are those where the preferred refrigerant is a non-azeotropic fluid such as an aqueous glycol solution. The reasons for which two-port ancillary configurations may be desirable, where the last-cited solutions are employed as a refrigerant, are given in section V,F,2.

Figure 27B:
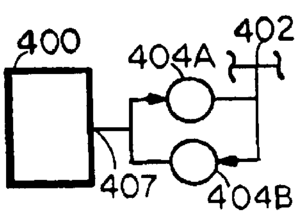
Figure 27C:
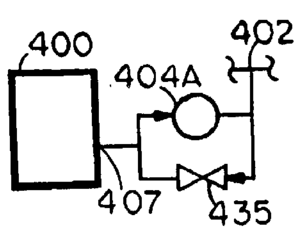
Figure 32B:
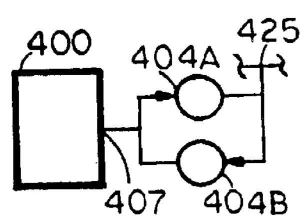

Bidirectional LT pumps, air-transfer pumps, and hydraulic pumps, may be unavailable, or may be too costly, for the particular requirements of certain applications. Where this is true, two unidirectional LT pumps, air-transfer pumps, or hydraulic pumps, as applicable, can obviously be employed instead of a single bidirectional LT pump, air-transfer pump, or hydraulic pump, respectively. FIGS. 27B and 32B illustrate the particular case where a bidirectional LT pump has been replaced by two unidirectional LT pumps, namely the particular case where bidirectional LT pump 404 has been replaced by unidirectional LT pumps 404A and 404B.

A first alternative to employing two unidirectional LT pumps, air-transfer pumps, or hydraulic pumps (where a bidirectional LT pump, air-transfer pump, or hydraulic pump, is not available or is too costly) is to employ a single unidirectional LT pump, air-transfer pump, or hydraulic pump, in parallel with a bidirectional (two-way) valve. This alternative is shown, for the particular case of a refrigerant pump and a variable-volume LR reservoir, in FIG. 27C, where numeral 435 designates a refrigerant bidirectional (two-way) liquid-transfer valve, or more briefly a bidirectional LT valve, in parallel with a unidirectional LT pump. (Valve 435 can, for example, be a motorized valve.) In cases where a bidirectional LT valve is employed with variable-volume LR reservoir 401, a spring—like internal spring 478 (see FIG. 27)—may often have to be used to contract or to expand reservoir 401, and thus help to ensure liquid refrigerant flows from reservoir 401 lo the principal configuration, or vice versa, when valve 435 is open. Alternatively, for example, a gas, located for instance between double flexible LR reservoir walls 437, (see FIG. 35) could be used to perform the function of a spring. A unidirectional LT pump and a bidirectional LT valve can be used with a type $I_R$, or with a type $IV_R$, configuration; a unidirectional air-transfer pump and a bidirectional air-transfer valve can be used with a type $III_R$ configuration employing compressed air; and a unidirectional hydraulic pump and a bidirectional hydraulic-fluid valve can be used with a type $II_R$ configuration employing an hydraulic fluid.

A second alternative to employing two unidirectional LT pumps, air-transfer pumps, or hydraulic pumps, is to use known means for reversing the direction of flow induced by a unidirectional LT pump, between two points. Examples of such means are described in section V,N of my co-pending U.S. patent application Ser. No. 400,738, filed 30 Aug. 1989.

Figure 32C:
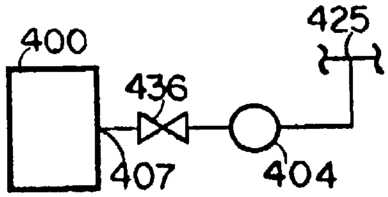
Figure 35:
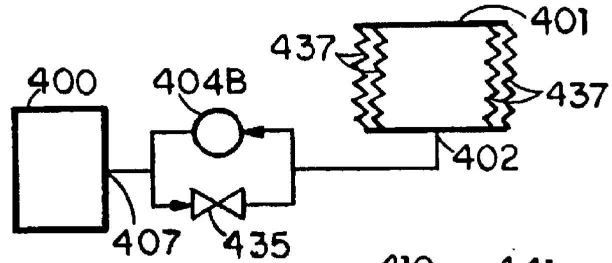

In cases where liquid refrigerant leaks through bidirectional LT pump 404, unidirectional LT pump 404A, or unidirectional LT pump 404B, while it is not running, a bidirectional LT valve can be used in series with any one of the three last-cited pumps to eliminate, or to help reduce, the rate at which refrigerant leaks through each of those pumps while it is not running. Bidirectional valves can be used for a similar purpose, in series with an air-transfer pump or a hydraulic pump. The particular case where a bidirectional LT valve is used in series with a bidirectional LT pump is shown in FIG. 32C for the case where the LR reservoir is a fixed-volume reservoir. Numeral 436 in FIG. 32C designates a bidirectional LT valve in series with a unidirectional LT pump. (Valve 436 is open while pump 404 is running and is closed while pump 404 is not running, and could be a solenoid valve.)

D. Inert-gas Configurations

1. Inert-gas Reservoirs

The inert-gas (IG) reservoirs used in type B and in type C combinations (of the invention) can be any kind of suitable fixed-volume reservoir, or any kind of suitable variable-volume reservoir having an internal volume which can be changed by the two-phase heat-transfer system to which the variable-volume reservoir belongs. The word 'suitable', in the immediately-preceding sentence, denotes properties such as compatibility with the inert gas and with the refrigerant (which may be contained in the inert gas), and the ability to withstand the range of inert-gas pressures and temperatures over which an IG reservoir is to be used.

Variable-volume IG reservoirs may, like variable-volume LR reservoirs, be divided into type 1 variable-volume reservoirs and into type 2 variable-volume reservoirs.

2. Types of Inert-gas Configurations a. Definitions of Type $I_G$ to $V_G$ Configurations Most of the inert-gas (IG) configurations which can be used in type B and type C combinations can be grouped into five general types:

(a) type $I_G$ configurations which have a variable-volume (IG) reservoir, and which employ a (inert-) gas-transfer pump, or more briefly a GT pump, to change the mass of inert gas in the variable-volume reservoir;

(b) type $II_G$ configurations which have a variable-volume reservoir, and which employ a mechanism to change the reservoir's internal volume—by exerting an external force on the reservoir—and thereby change the mass of inert gas in the reservoir;

(c) type $III_G$ configurations which have a variable-volume reservoir, and which employ a fluid, outside the reservoir, to change the reservoir's internal volume—by exerting an external force on the reservoir—and thereby change the mass of inert gas in the reservoir;

(d) type $IV_G$ configurations which have a fixed-volume reservoir, and which employ a GT pump to change the mass of inert gas in the reservoir; and (e) type $V_G$ configurations which have a fixed-volume reservoir and which employ means to change the temperature of the inert gas in the reservoir, and thereby change the mass of inert gas in the reservoir.

The five types of IG configurations listed under (a) to (e) in this section V,D,2 are usually employed to insert inert gas in, and to extract inert gas from, a principal configuration, but can also be used to insert inert gas in, and to extract inert gas from, an LR reservoir. The foregoing five types of IG configurations are described in section V,D,2,b.

b. Typical Type $I_G$ to $V_G$ Configurations i. Type $I_G$ Configurations

Figure 36:
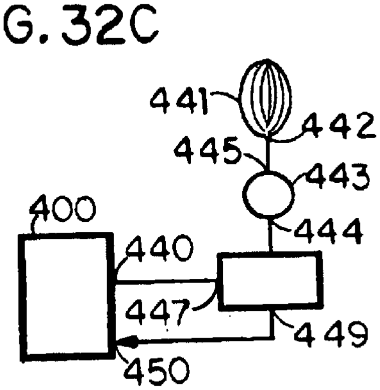

FIG. 36 shows a type $I_G$ configuration where numeral 400 designates a principal configuration; where numeral 440 designates a port, at a point of the principal configuration where the (refrigerant) void fraction is high, through which inert gas flows in both directions; and where numeral 441 designates a variable-volume IG reservoir, containing usually essentially only an inert gas, which has an inlet-outlet inert-gas port 442 (through which inert gas can flow in either direction). Reservoir 441 can—as in the case of a variable-volume LR reservoir—be a type 1 or a type 2 variable-volume reservoir. (A bladder-type type 1 variable-volume reservoir is shown, as an example, in FIG. 36.)

GT pump 443 is a bidirectional GT pump having ports 444 and 445 through which it can induce inert-gas flow either from port 444 to port 445 or from port 445 to port 444. Alternatively, a unidirectional GT pump can be used together with means for reversing the direction of inert-gas flow between ports 444 and 445.

When GT pump 443 induces inert gas to flow from port 440 toward port 442, it will at times be mixed with a small amount of refrigerant vapor. Condensate-type refrigerant-vapor trap 446, having inlet-outlet gas port 447, and inlet-outlet gas port 448, is used to help ensure no significant amount of refrigerant vapor enters GT pump 443 and reservoir 441. To this end, trap 446 includes means for cooling, and thereby condensing, refrigerant vapor contained in inert gas. Liquid refrigerant, generated by condensation in trap 446, is returned by gravity from liquid outlet 449 of trap 446 to principal-configuration inlet 450.

ii. Type $II_G$ Configurations

Figure 37:
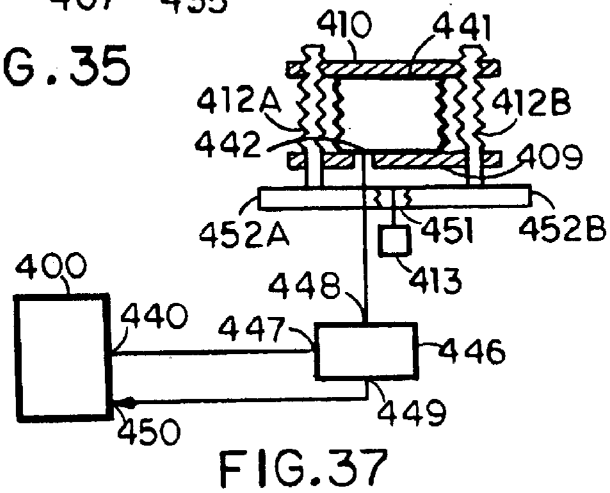

FIG. 37 shows a type $II_G$ configuration where a mechanism is used instead of GT pump 443. (A bellows-type type 1 variable-volume reservoir is shown, as an example, in FIG. 37.) 35 The mechanism shown, as an example, is a vise-type mechanism including (1) reversible electric motor 413, which drives screws 412A and 412B through pinion 451 and through gear wheels 452A and 452B; and (2) fixed jaw 409 and movable jaw 410. A type $II_G$ configuration usually has a single reversible electric motor, but may also have two non-reversible electric motors. The mechanism shown in FIG. 37 could be controlled manually if motor 413 were replaced with, for example, a handwheel.

iii. Type $III_G$ Configurations

Figure 38:
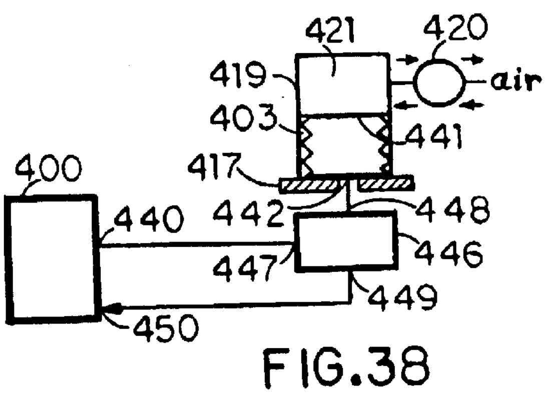

FIG. 38 shows a type $III_G$ configuration where the fluid, outside the reservoir, is air. The bellows-type type 1 variable-volume reservoir shown, as an example, is located in rigid closed cylinder 419. One of the ends of reservoir 441 is bonded to one of the ends of cylinder 419, but corrugated wall 403 can slide inside cylinder 419. Air-transfer pump 420 changes the internal volume of reservoir 441 by varying the mass of the air in space 421.

Figure 38A:
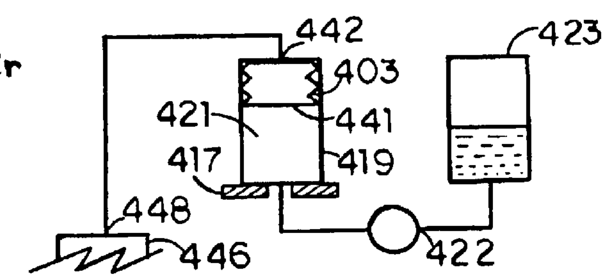

FIG. 38A shows a type $III_G$ configuration where the fluid, outside the reservoir, is a hydraulic fluid. In FIG. 38A, hydraulic pump 422 varies the mass of hydraulic fluid in space 421 by transferring hydraulic fluid between space 421 and hydraulic-fluid reservoir 423 which may be, but need not be, at atmospheric pressure.

iv. Type $IV_G$ Configurations

Figure 39:
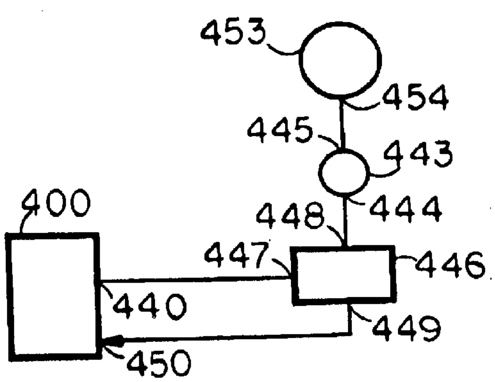

FIG. 39 shows a type $IV_G$ configuration. In FIG. 39, numeral 453 designates a fixed-volume IG reservoir having an inlet-outlet port 454. (A spherical type 1 reservoir is shown as an example.) GT pump 443 is used to transfer inert gas between principal configuration 400 and reservoir 453.

v. Type $V_G$ Configurations

Figure 40:
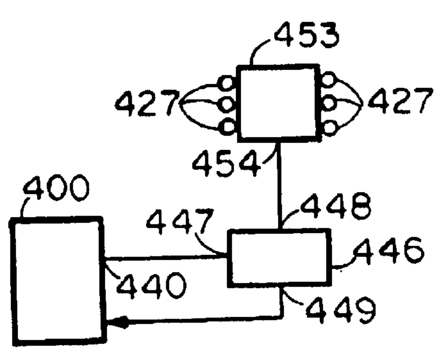

FIG. 40 shows a type $V_G$ configuration where the temperature of the inert gas in reservoir 453 is changed, for example, by circulating a liquid in coil 427, and by varying the temperature of the liquid being circulated.

c. Alternative Type $I_G$ to $V_G$ Inert-gas Configurations

One of several alternative forms of each of the type $I_G$ to $V_G$ configurations shown in FIGS. 36 to 40, and in FIG. 38A, may be preferable in certain applications. I mention next a few typical examples.

In certain applications it may be desirable for port 440 to be replaced by inlet 470 (see, for example, FIGS. 36A to 40A) where inert gas in the IG configuration enters the principal configuration, and by outlet 471 where inert gas in the principal configuration exits the principal configuration and enters the IG configuration. In FIGS. 36A, 37A, 38B, 39A, and 40A, numerals 472 and 473 designate unidirectional valves. I shall hereinafter refer collectively to inert-gas configurations with a common inlet-outlet port as 'one-port inert-gas configurations' and to inert-gas configurations with separate and distinct inlet and outlet ports as 'two-port inert-gas configurations'.

Figure 36A:
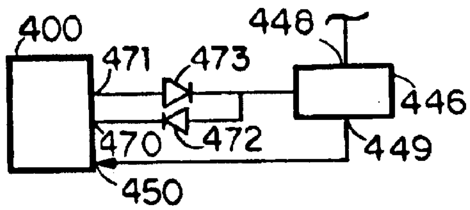
Figure 36B:
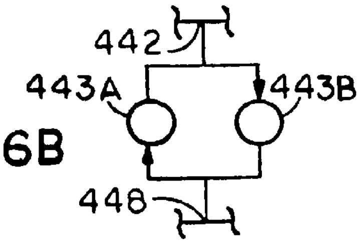
Figure 36C:
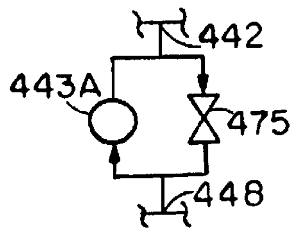
Figure 39B:
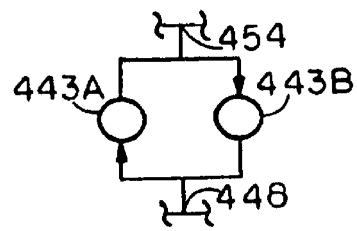

In certain applications bidirectional GT pumps, air-transfer pumps, and hydraulic pumps, may be unavailable, or may be too costly, for the particular requirements of those applications. Where this is true, two unidirectional GT pumps, air-transfer pumps, or hydraulic pumps, as applicable, can obviously be employed instead of a single bidirectional GT pump, air-transfer pump, or hydraulic pump, respectively. FIGS. 36B and 39B illustrate the particular case where a bidirectional GT pump has been replaced by two unidirectional GT pumps, namely the particular case where GT pump 443 has been replaced by unidirectional GT pumps 443A and 443B.

A first alternative to employing two unidirectional GT pumps, air-transfer pumps, or hydraulic pumps (where a bidirectional GT pump, air-transfer pump, or hydraulic pump, is not available or is too costly) is to employ a single unidirectional GT pump, air-transfer pump, or hydraulic pump, in parallel with a bidirectional (two-way) gas-transfer valve, or more briefly a bidirectional GT valve. This alternative is shown, for the particular case of a GT pump and a fixed-volume IG reservoir, in FIG. 36C, where numeral 475 designates a bidirectional GT valve in parallel with a unidirectional GT pump. (Valve 475 can, for example, be a motorized valve.) A unidirectional GT pump and a bidirectional GT valve can be used with a type $I_G$, or with a type $IV_G$, configuration; a unidirectional air-transfer pump and a bidirectional air-transfer valve can be used with a type $III_G$ configuration employing compressed air; and a unidirectional hydraulic pump and a bidirectional hydraulic-fluid valve can be used with a type $III_G$ configuration employing an hydraulic fluid.

A second alternative to employing two unidirectional GT pumps, air-transfer pumps, or hydraulic pumps, is to use known means for reversing the direction of flow, induced by a unidirectional GT pump, between two points.

Figure 39C:
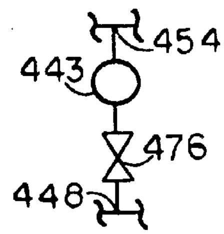

In cases where inert gas leaks through bidirectional GT pump 443, unidirectional GT pump 404A, or unidirectional GT pump 404B, while it is not running, a bidirectional GT valve can be used in series with any one of the three last-cited pumps to eliminate, or to help reduce, the rate at which inert gas leaks through each of those pumps while it is not running. The particular case where a bidirectional GT valve is used in series with a bidirectional GT pump is shown in FIG. 39C for the case where the IG reservoir is a fixed-volume reservoir. Numeral 476 in FIG. 39C designates a bidirectional GT valve in series with a bidirectional GT pump. (Valve 476 is open while pump 443 is running and is closed while pump 443 is not running.)

Figure 39D:
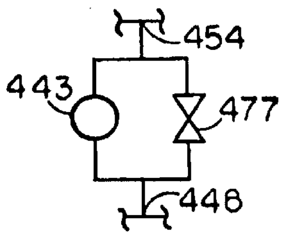

In cases where inert gas entering an IG reservoir contains some refrigerant vapor, condensed refrigerant vapor, accumulating in the IG reservoir, can be removed by providing a bidirectional drain valve, in parallel with a GT pump. FIG. 39D shows the particular case where bidirectional drain valve 477 is used in parallel with bidirectional GT pump 443, and where the IG reservoir is a fixed-volume reservoir. Valve 477 is opened occasionally to allow liquid refrigerant accumulating in reservoir 453 to drain back into principal configuration 400. (Valves 476 and 477, in contrast to valve 475, would usually be two-step valves.)

3. Condensate-type Refrigerant-vapor Traps

The complexity of the condensate-type refrigerant-vapor traps employed in inert-gas configurations depends on the particular application in which they are being used.

The condensate-type refrigerant-vapor trap shown in FIGS. 36D, 37B, 38C, 39E, and 40B includes trap accessory condenser 456 having inlet-outlet gas ports 457 and 458, trap accessory condenser 459 having inlet-outlet gas ports 460 and 461, and liquid-refrigerant diverter 462, or more briefly LR diverter 462, having inlet-outlet gas ports 463 and 464, and liquid outlet 465. Condensers 456 and 459 are used to reduce the mass-flow rate at which refrigerant vapor enters, as applicable, variable-volume IG reservoir 441, or fixed-volume IG reservoir 453.

Most of the refrigerant vapor—where present—in inert gas entering condenser 456 is condensed in condenser 456. The resulting liquid refrigerant is entrained by the inert gas in which the liquid refrigerant is contained toward LR diverter 462, where the entrained liquid refrigerant is diverted to liquid outlet 465. Inert gas, entering LR diverter 462 at 463, exits at 464. Residual refrigerant vapor, in inert gas exiting at 464, is condensed in condenser 459 and the resulting liquid refrigerant is returned by gravity in gas line 460-464 which has a cross-sectional area large enough for liquid refrigerant and gas to flow in opposite directions.

Condensers 456 and 459 may, for example, be air-cooled condensers, water-cooled condensers, or (liquid) refrigerant-cooled condensers. In the first case, condensers 456 and 459 may merely be a finned tube; and, in the second and third cases, condensers 456 and 459 may merely be a tube with a coil, wrapped around the tube, carrying a cold fluid, and LR diverter 462 may, for example, be a small vessel or a tee, whose ports are inlet-outlet gas ports 463 and 464, and liquid outlet 465.

Condensers 456 and 459, and LR diverter 462, may be combined into a single unit. A first example of a single-unit condensate-type refrigerant-vapor trap is shown in FIGS. 36E, 37C, 38D, 39F, and 40C, for the case where condensers 456 and 459 are finned tubes and LR diverter 462 is a tee. And a second example of a single-unit condensate-type refrigerant-vapor trap is shown in FIGS. 36F, 37D, 38E, 39G, and 40D, for the case where condenser 456 and LR diverter 462 (in FIGS. 36D, 37B, 38C, 39E, and 40B) consist in essence of vessel 480, with three ports, having coil 481 wrapped around it; and where condenser 459 is a tube having coil 482 wrapped around it. In the former five FIGURES numerals 466 and 467 designate the fins of respectively condensers 456 and 459; and, in the latter five FIGURES numerals 481 and 482 designate the coils of, respectively, condensers 456 and 459.

I note that condenser 456 is often not necessary, and that, in this case, a principal configuration's receiver may replace LR diverter 462. Where a receiver is used also as a diverter, condenser 456, inert-gas lines 440-447-457 and 458-463, and liquid-refrigerant line 449-450, are eliminated.

4. Inert-gas Special Configurations and Inert-gas Passive Configurations

Inert-gas (IG) special configurations differ from IG configurations essentially only in that they transfer inert gas between the LR reservoir of a type $VI_R$ ancillary configuration and an IG reservoir instead of between a principal configuration and an IG reservoir. Liquid refrigerant exiting trap 446 at outlet 449 is returned by gravity either (a) to a point of the ancillary configuration, for example—as shown in FIG. 34—to point 454 of fixed-volume LR reservoir 424.

Figure 41:
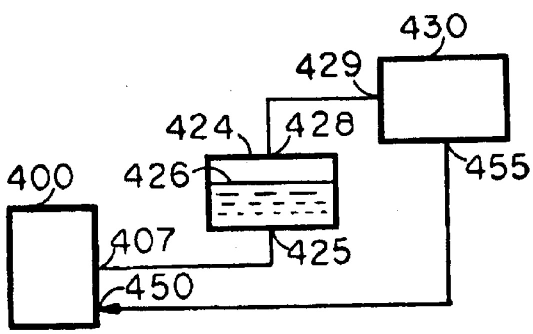

(b) to point 450 of the principal configuration, as shown in FIG. 41.

Points 429 and 455 in FIGS. 34 and 41 may coincide with points 447 and 449, respectively, of trap 446. (In the case where point 455 coincides with point 449, liquid-refrigerant line 455-450 in FIG. 41 corresponds to liquid-refrigerant line 449-450 in FIGS. 36 to 40.)

Inert-gas passive (IGP) configurations can, like IG configurations, be one-port configurations or two-port configurations. An IGP configuration can, also like an IG configuration, have a condensate-type refrigerant-vapor trap.

E. Non-Condensable Gas Removal

I mentioned in section V,P of my U.S. patent application Ser. No. 400,738, filed 30 Aug. 1989, the need to remove a non-condensable gas, and in particular hydrogen, which may be generated inside the refrigerant passages of an airtight refrigerant configuration or of an evacuated refrigerant-circuit configuration. And I mentioned the use of membranes permeable to a non-condensable gas, but not permeable to the airtight configuration's refrigerant, as a means for getting rid of a non-condensable gas. Another means for getting rid of a particular non-condensable gas is to use, at one or more locations inside an airtight refrigerant configuration, a solid or a liquid, not miscible with the refrigerant, which will absorb that non-condensable gas; for example, to use hydrazine to absorb hydrogen. Still another means for getting rid of a non-condensable gas is to use a non-condensable-gas trap similar to that described on page 48 of NASA Technical Briefs, December 1990.

Figure 42:
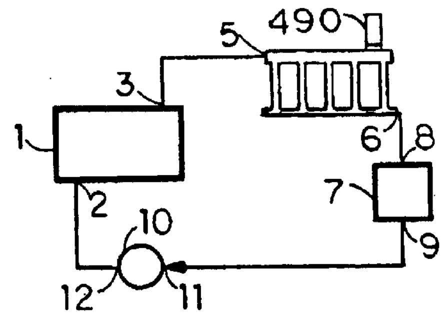

In FIG. 42, non-condensable-gas trap 490 is represented merely by the trap's tube, and is located in the vapor header of condenser 4, but could be located in a refrigerant line where the (refrigerant) void fraction is high; or in a receiver, or a separator, at a point where the void fraction is high. Also tube 491 of trap 490 need not be vertical, and can even be horizontal if it includes a wick. The refrigerant-circuit configuration shown in FIG. 42 is a class $I_F^o$ principal configuration, but trap 490 can be used, where required, with any other principal configuration of a type A combination, or with any refrigerant-circuit configuration of an evacuated configuration.

The immediately-following text in this minor paragraph is an excerpt from page 48 cited in the first minor paragraph of this section V,E. "The trap . . . includes a tube of stainless steel or other poorly thermally conductive material . . . attached to a tap on top of the main vapor line where the vapor flows toward the condenser. Subcooled liquid from the outlet of the condenser cools the upper end of the tube below the vapor temperature. A small fraction of the flow in the main vapor line enters the trap and travels to the upper end. There, the vapor condenses, and the liquid is returned to the main line by gravity. (In the absence of gravity, it could be returned by the capillary action of a wick.) Non-condensable gas . . . entrained in the upward flow of vapor accumulates gradually, thereby increasing the effective thermal conductance of the upper end of the trap and decreasing the temperature $T_1$ measured by a thermocouple near the upper end. When $T_1$ decreases to a preset differential above $T_2$, the temperature of the incoming coolant, a solenoid valve at the upper end opens momentarily to vent the noncondensable gas."

In FIG. 104, numeral 492 designates a coil through which flows the fluid, referred to as 'the coolant' in the preceding quotation, employed to condense the refrigerant in the trap; numeral 493 designates a pair of transducers for determining the temperature differential between two points of the trap; numeral 494 designates a solenoid valve; numeral 495 designates a control unit which receives the signals generated by transducers 493, and which controls valve 494. Numeral 496 designates a wick; numeral 497 designates an optional manual valve; and numeral 498 designates a segment of a refrigerant space of a principal configuration where the void fraction is high and through which refrigerant vapor flows in the direction indicated by the arrows.

The trap shown on page 48 of the cited NASA document uses, as mentioned in the above quotation, subcooled refrigerant to condense refrigerant vapor in the trap. However, cold water can be used, instead of subcooled refrigerant. (The qualifier 'cold', in the immediately-preceding sentence, indicates that water, flowing in the last-cited coil, is substantially colder than refrigerant entering the trap.) Alternatively, in certain applications, where air surrounding the trap is cold enough, coil 492 in FIG. 104 can be replaced merely by fins in thermal contact with the trap.

I note that the only significant difference between non-condensable gas traps and the condensate-type refrigerant-vapor traps discussed in this DESCRIPTION is that the former traps include a unidirectional device for causing and controlling the discharge of gas into an airtight configuration's, or into an evacuated configuration's, surroundings; whereas the latter traps include no such device.

f. Type A Combinations for Piston-engine Cooling and Intercooling Systems

1. Preliminary Remarks

I discuss in this section V,F applications where the properties complete minimum-pressure maintenance and self regulation are required, and where refrigerant-controlled heat release, or more briefly RC heat-release, is usually also required.

Piston-engine cooling applications provide good examples of applications where a heat source (1) requires the evaporator refrigerant passages of a principal configuration to have sharp bends and non-uniform cross-sections; (2) subjects those passages to spatially highly non-uniform heat fluxes; and (3) has temperatures far above the maximum-permissible temperatures for those passages and the refrigerant in them.

By contrast, piston-engine intercooling systems provide good examples of applications where a heat source (1) does not require the evaporator refrigerant passages of a principal configuration to have sharp bends and non-uniform cross-sections; (2) does not subject those passages to spatially highly non-uniform heat fluxes; and (3) has no temperatures above the maximum-permissible temperatures for those passages and the refrigerant in them.

In sections V,F,2 and V,F,3 I describe type A combinations, and their associated control techniques, for the case where the combinations' condenser is an air-cooled condenser. The most prominent examples of piston-engine cooling and intercooling systems with air-cooled condensers are probably those installed in automobiles and trucks. However, piston-engine cooling and intercooling systems with air-cooled condensers are also suitable for other automotive vehicles such as locomotives, for certain industrial fixed installations, and for certain passenger and cargo planes.

In section V,F,4 I describe type A combinations, and their associated control techniques, for the case where the combinations' condenser is a water-cooled condenser. The most prominent examples of piston-engine cooling systems with water-cooled condensers are probably those installed in ships and motor boats, and those installed in industrial fixed installations adjacent to a large body of water such as the sea.

Because all the type A combinations discussed in this section V,F have no partial minimum-pressure maintenance, I shall for brevity refer in this section V,F to complete minimum-pressure maintenance simply as 'minimum-pressure maintenance'. This property, as mentioned in section III,D, is achieved in type A combinations by filling completely their principal configuration with liquid refrigerant.

Figure 43:
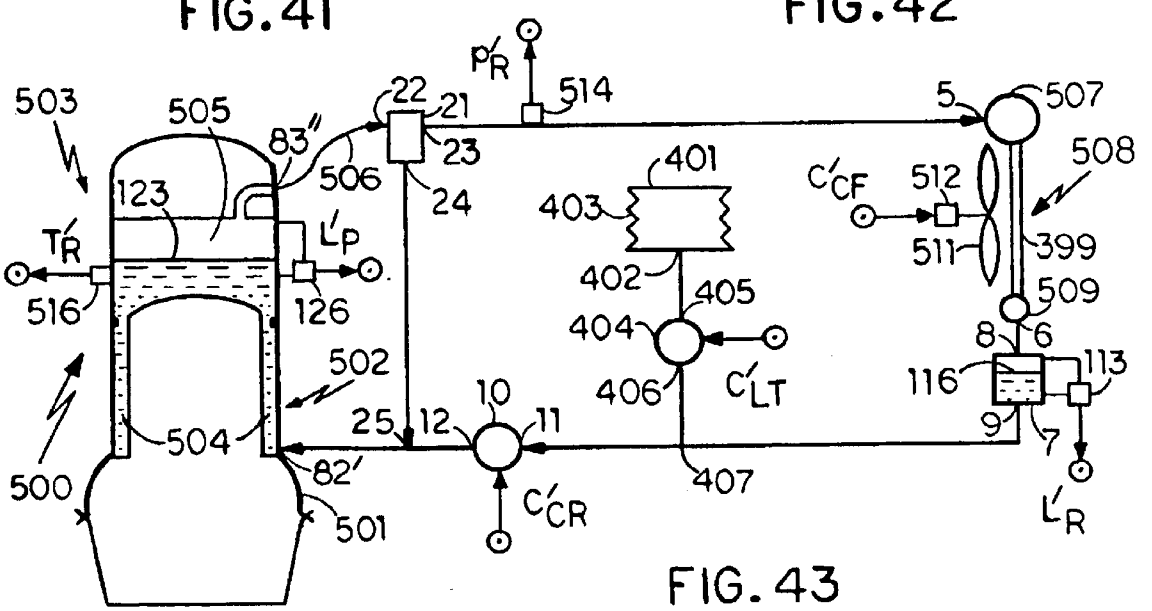
Figure 37A:
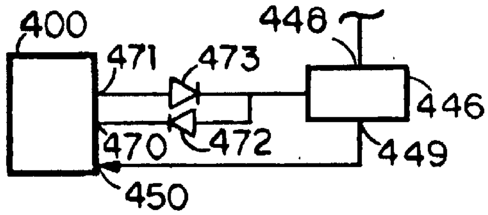
Figure 37B:
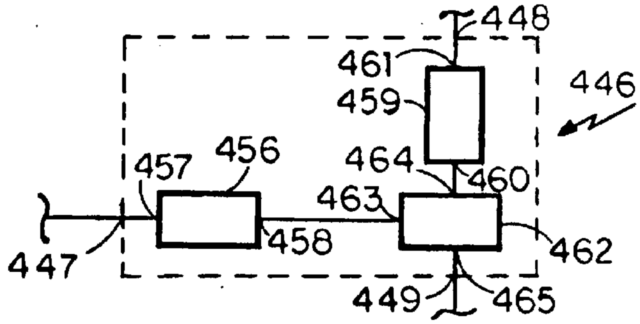
Figure 37C:
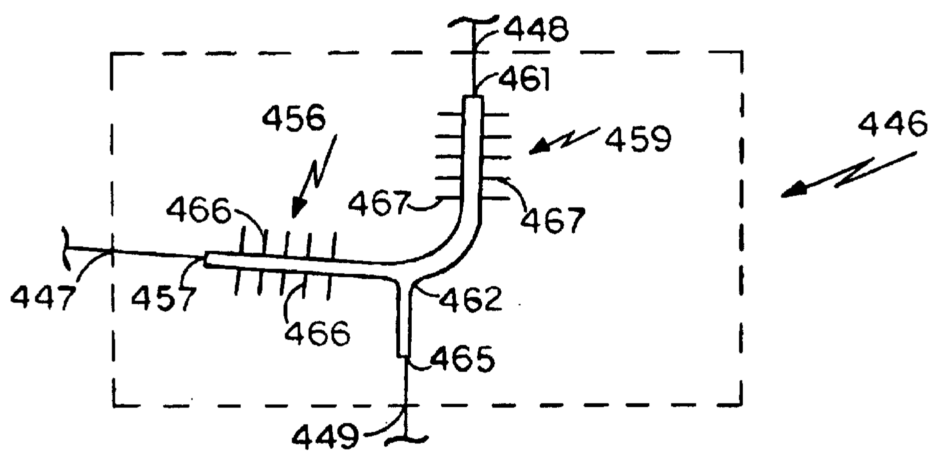
Figure 38B:
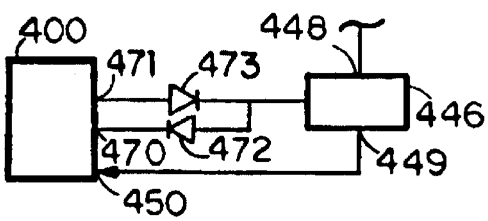
Figure 38C:
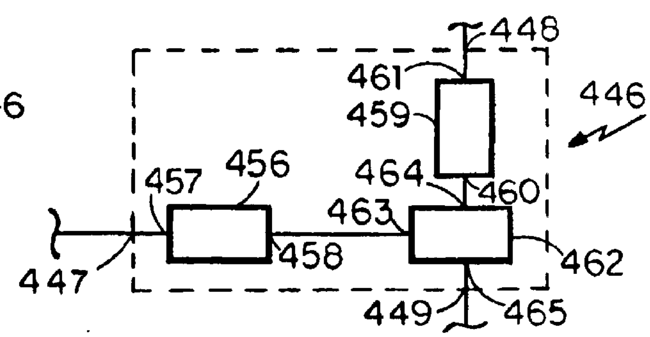
Figure 37D:
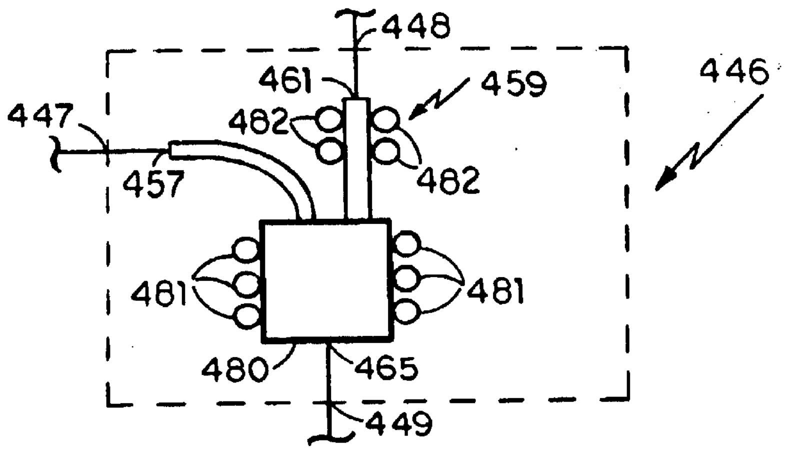
Figure 38E:
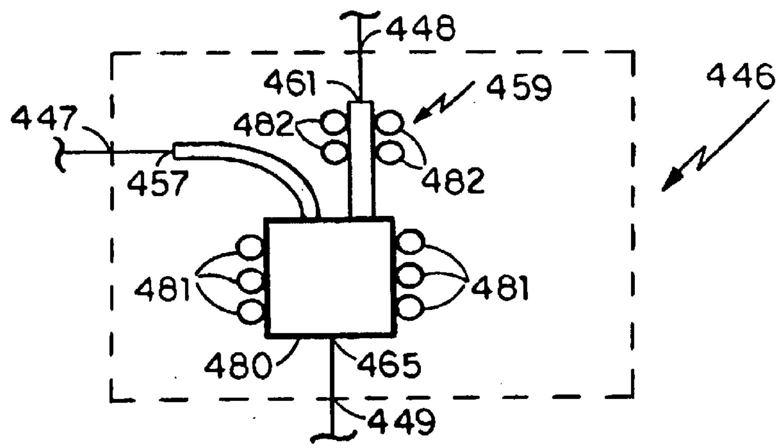
Figure 39G:
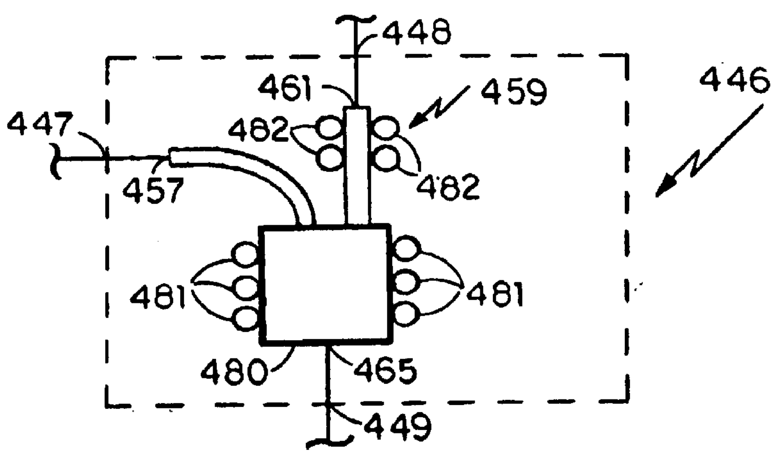
Figure 46H:
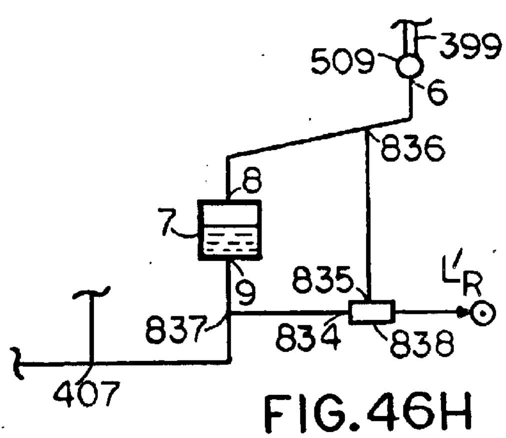
Figure 38D:
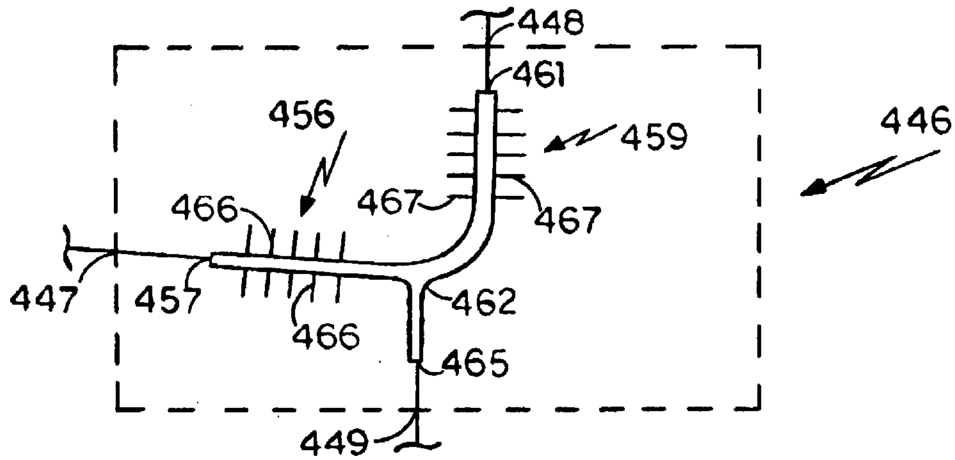
Figure 39A:
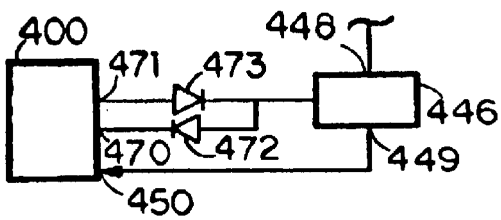
Figure 39E:
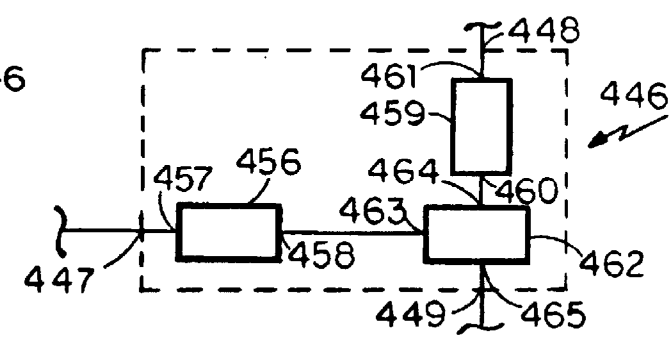
Figure 39F:
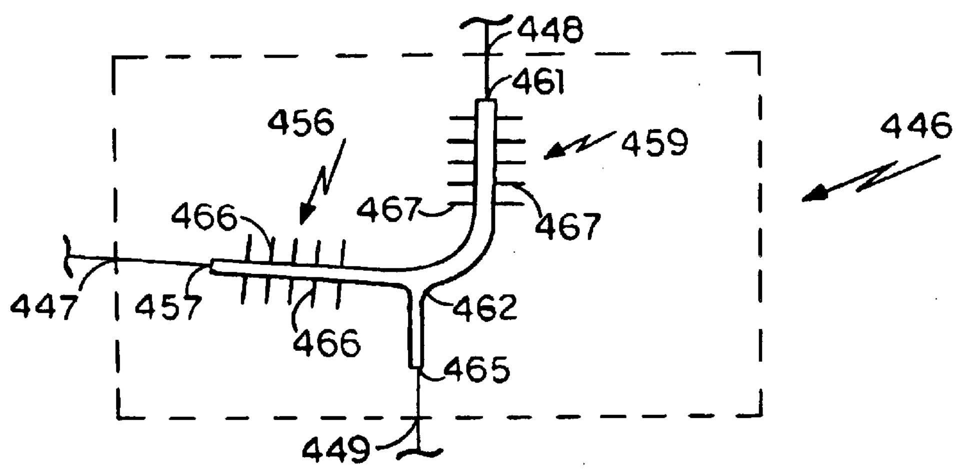
Figure 40A:
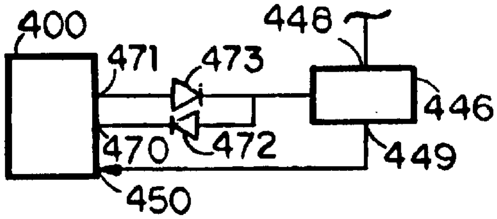
Figure 40B:
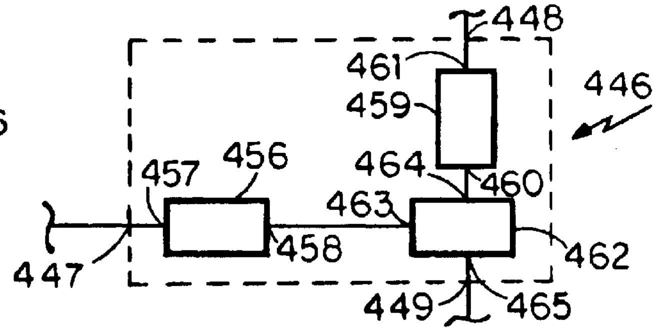
Figure 40C:
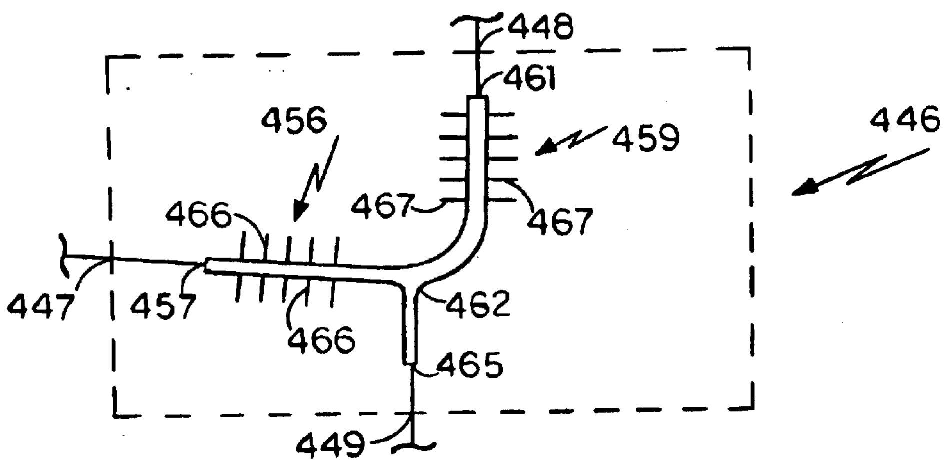
Figure 40D:
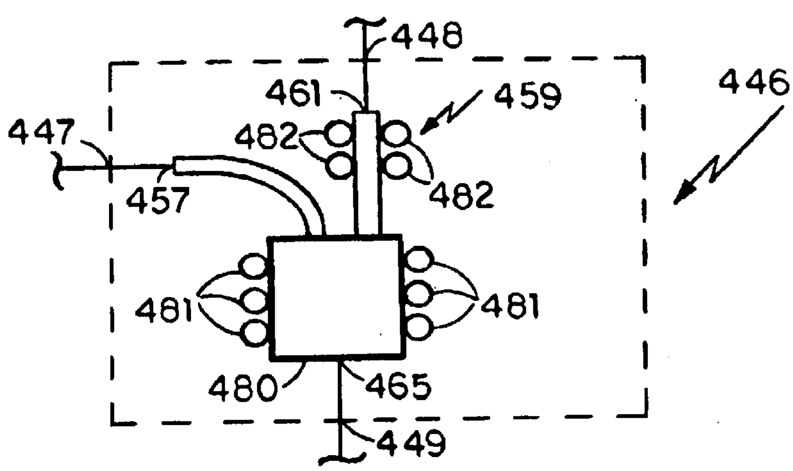
Figure 43J:
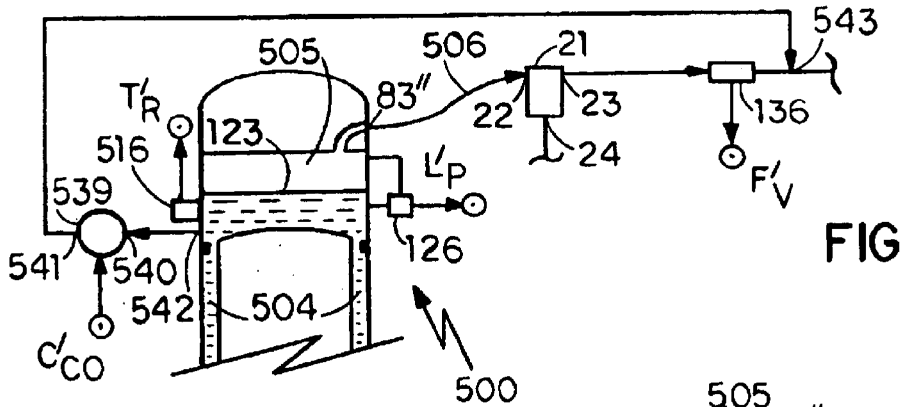
Figure 43K:
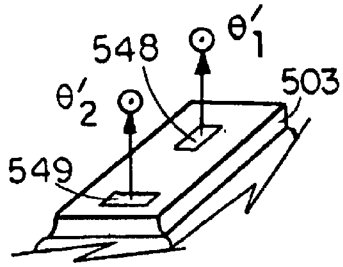
Figure 44:
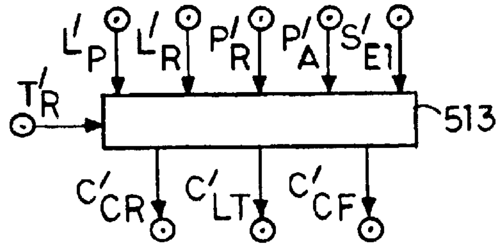
Figure 45:
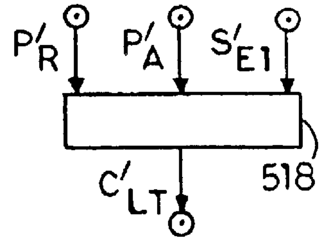

2. Cooling Systems with an Air-cooled Condenser a. Cooling Systems with a Pool Evaporator i. Refrigerant Configuration and Control System FIGS. 43 to 45 show a system used to cool piston engine 500 having crankcase 501, cylinder block 502, and cylinder-head 503. I assume engine 500 is an in-line engine with 4 cylinders and is transversely-mounted on an automotive vehicle. (However, the limitations 'in-line', '4 cylinders', 'transversely-mounted', and 'automotive vehicle', are made for specificity only, and do not affect the inventive elements disclosed in this section V,F,2,a.) Engine 500 has (1) in its cylinder block, a set of interconnecting, or of non-interconnecting, refrigerant passages represented symbolically by spaces designated by numeral 504; and (2) in the cylinder head, a set of interconnecting, or of non-interconnecting, refrigerant passages represented symbolically by the space designated by numeral 505. (Space 505 includes the space in cylinder head 503 below as well as above usually-segmented liquid-vapor interface surface 123 represented symbolically by a continuous line.) Refrigerant passages 504 are the engine's 'cylinder-block coolant passages', refrigerant passages 505 are the engine's 'cylinder-head coolant passages', and refrigerant passages 504 and 505 are collectively the 'engine's coolant passages'. The engine-cooling system shown in FIGS. 43 to 45 has a refrigerant configuration which is a combination of a type $I_R$ ancillary configuration with a class $VIII_{FN}^{ooo}$ principal configuration whose pool-evaporator refrigerant passages are the engine's coolant passages. The evaporator has a refrigerant inlet 82' having usually one, two, or four, ports and a refrigerant outlet 83", having four ports (but which may also, for example, have only one port or only two ports). Refrigerant circulating in the principal configuration is assumed, in this section V,F,2,a, to be cooled primarily by an air-cooled condenser.

Refrigerant vapor, generated in the evaporator and exiting at 83", is transferred from the evaporator to type 1 separator 21 by vapor manifold 506, having four refrigerant vapor lines (see FIG. 43A). Separator 21 has a vapor inlet 22, which has four ports. Alternatively, for example, inlet 22 may have a single port. In this second case, the four vapor-lines of manifold 506 merge into a single vapor line connected to that single port. Under most operating conditions, essentially dry refrigerant vapor exits separator 21 at 23 and enters upper header 507 of air-cooled condenser 508 at 5. (I use the numeral 5 to designate the refrigerant inlet of any condenser.) Refrigerant vapor entering header 507 flows through several condenser refrigerant passages 399 and condensed refrigerant vapor, generated in passages 399, exits lower header 509 of condenser 508 at 6 and enters 2-port condensate receiver 7 at inlet 8. (I use the numeral 6 to designate the refrigerant outlet of any condenser.) Liquid refrigerant, accumulating in receiver 7, exits at outlet 9, enters inlet 11 of CR pump 10, exits outlet 12 of CR pump 10, and enters at 82' the evaporator formed by the coolant passages of engine 500. Liquid refrigerant, separated from refrigerant vapor in separator 21, exits at liquid outlet 24 and, after by-passing refrigerant passages 399 of condenser 508, merges at 25 with liquid refrigerant exiting pump 10 at 12. Under most operating conditions, liquid refrigerant in those coolant passages forms liquid-vapor interface surface 123. Interface surface 123 may consist of several separate and distinct segments.

The class $VIII_{FN}^{ooo}$ principal configuration described in the immediately preceding two minor paragraphs has a refrigerant principal circuit 82'-83"-22-23-5-6-8-9-407-11-12-25-82' and a type 1 evaporator refrigerant auxiliary circuit 82'-83"-22-24-25-82'. The refrigerant configuration shown in FIG. 43 is a combination of that principal configuration with a type $I_R$ ancillary configuration. This configuration includes variable-volume reservoir 401 having inlet-outlet port 402, reversible LT pump 404 having inlet-outlet ports 405 and 406, and liquid-refrigerant ancillary transfer means 402–405–406–407, where numeral 407 denotes a port or node where refrigerant in the ancillary configuration merges with refrigerant in the principal configuration.

The cooling system shown in FIGS. 43 to 45 also includes condenser fan 510, having a propeller 511 and an electric motor 512, and the control system described next.

The control system includes central control unit 513 (see FIG. 44), or more briefly CCU 513, which, on the basis of signals received from several transducers and preselected instructions stored in CCU 513, controls pump 10, pump 404, and fan 510. The particular transducers used by the system in FIG. 43 are (a) proportional liquid-level transducer 126 which generates a signal $L'_P$ providing a measure of the current value of the level $L_P$ of liquid-vapor interface surface 123 in the cylinder-head coolant passages of engine 500;

(b) proportional liquid-level transducer 113 which generates a signal $L'_R$ providing a measure of the current value of the level $L_R$ of liquid-vapor interface surface 116 in receiver 7;

(c) proportional refrigerant absolute-pressure transducer 514 which generates a signal $p'_R$ providing a measure of the current value of the refrigerant pressure $p_R$ at a preselected location in the principal configuration;

(d) proportional refrigerant-temperature transducer 516 which generates a signal $T'_R$ providing a measure of the current value of the refrigerant temperature $T_R$ at a preselected location in the principal configuration;

(e) a two-step (on-off) first engine-status transducer (not shown) which generates a signal $S'_{E1}$ indicating whether engine 500 is running or not running; and (f) a proportional absolute-pressure transducer (not shown) which generates a signal $p'_A$ providing a measure of the current value of the ambient atmospheric pressure $p_A$.

The signals generated by the six last-listed transducers are supplied to CCU 513 which computes, on the basis of preselected instructions stored in CCU 513, see FIG. 44, the control quantities $C_{CR}$, $C_{LT}$, and $C_{CF}$, and generates the signals $C'_{CR}$, $C'_{LT}$, and $C'_{CF}$, supplied respectively to CR pump 10, LT pump 404, and to condenser fan 510.

The control system also includes Minimum-Pressure Maintenance Control Unit 518, or more briefly MPMCU 518, see FIG. 45. This unit operates only while engine 500 in FIG. 43, which I shall hereinafter in this section V,F,2,a refer to as 'the engine', is not running. MPMCU 518 is supplied, as shown in FIG. 45, only with signals $p'_R$, $p'_A$, and $S'_{E1}$, and computes, on the basis of preselected instructions stored in it, control quantity $C_{LT}$ while the engine is not running (as indicated by signal $S'_{E1}$). MPMCU 518 would usually be physically an integral part of a cooling system's CCU, but is shown as a separate and distinct unit for clarity in describing the system's operation. Furthermore, CCU 513 and MPMCU 518 would usually be a part of the engine's management system.

ii. Unsafe and Safe States

I shall say that a piston-engine cooling system is in an 'unsafe state', when running the engine being cooled by the system is unsafe in the sense that the engine could be damaged, by inadequate cooling, if it started running, or if it continued running. And I shall say that a piston-engine cooling system is in a 'safe state' when running the engine being cooled by the system is safe in the sense that the engine would not be damaged by inadequate cooling if it started running, or if it continued running. More precisely, I shall say that the system is in an unsafe state when any one of the following four relations is true:

$$L_P<L_{P,SAFE};\ L_R<L_{R,SAFE};\ p_R>p_{R,SAFE};\ \text{and } T_R>T_{R,SAFE}; \qquad (1), (2), (3), (4)$$

and that the system is in a safe state when all of the following four relations are true:

$$L_P\geqq L_{P,SAFE};\ L_R\geqq L_{R,SAFE};\ p_R\leqq p_{R,SAFE};\ \text{and } T_R\leqq T_{R,SAFE}. \qquad (5), (6), (7), (8)$$

Symbols $L_C$, $L_R$, $L_P$, $p_R$, and $T_R$, were defined earlier in this section V,F,2,a. The remaining symbols in the last eight relations are defined next: the symbol $L_{P,SAFE}$ denotes the minimum value of $L_P$ at which the engine should be allowed to run; the symbol $L_{R,SAFE}$ denotes the minimum value of $L_R$ for which the cooling system's refrigerant pump does not cavitate significantly; and symbols $p_{R,SAFE}$ and $T_{R,SAFE}$ denote the maximum values of $p_R$ and $T_R$, respectively, at which the engine should be allowed to run. (Although condition (6) would not damage the engine directly, it would usually do so indirectly in the sense that it would soon cause the value of $L_P$ to fall below $L_{P,SAFE}$.)

iii. Typical Operating Method

I now outline a typical method of operating the system shown in FIGS. 43 to 45. I shall hereinafter, in this section V,F,2,a,iii, refer to the system shown in FIGS. 43 to 45 as 'the system'.

I start at an instant in time when the engine being cooled by the system is not running and is started, say, by an operator manually. When the engine is started, CCU 513 and all its associated transducers and controllable elements are energized, if they are not already energized.

CCU 513, as soon as it is energized, and subsequently at frequent preselected periodic time intervals while it remains energized, performs a system safety check to determine whether the system is in a safe state. If it is not, an audible and/or visual warning signal is generated to indicate that the system is in an unsafe state, and the engine, after being stopped by the operator, is inhibited from being started. If the unsafe state has occurred because $p_R$ or $T_R$, or both, have exceeded their safe values, CCU 513 runs fan 510 at its maximum capacity until their safe values are no longer exceeded, and then de-energizes itself automatically. Thereafter MPMCU 518, which is always energized while the system is in a safe state, remains energized and controls LT pump 404 in the same way as in control mode 0. (See next major paragraph.) If the system has become unsafe because of an insufficient refrigerant charge, MPMCU 518 will de-energize itself automatically. (The refrigerant charge is insufficient when relation (1) or (2) is satisfied.)

I shall describe the operation of systems of the Invention, while they are in their safe state, in terms of 'control modes' and 'transition rules' between control modes (see definitions 115 and 116 in section III,A). In FIG. 43, the system-controllable elements are CR pump 10, LT pump 404, and condenser fan 510, and are, as a set, controlled differently in each of four different control modes while the system shown in FIGS. 43 to 45 is in a safe state.

A first mode, mode 0, of the four different control modes, is used to achieve minimum-pressure maintenance.

A second control mode, mode 1, is used, in the case of a non-azeotropic refrigerant, to achieve quasi-uniform refrigerant-component concentrations after the refrigerant temperature $T_R$ falls below a preselected temperature $T_{R,MIN}$, which is (1) lower than the refrigerant's lowest saturated-vapor temperature, while the system's principal configuration is active, and which is (2) higher than the freezing temperature of the refrigerant-component with the highest freezing temperature. The elapsed time $\Delta t$, from the instant at which $T_R$ falls below $T_{R,MIN}$, is determined by a clock, usually a software clock incorporated in CCU 513. This clock is stopped and reset after a preselected time interval unless the engine is running or starts running. If the engine was stopped and starts running before $\Delta t$ is equal to the preselected time interval, the clock is stopped and reset at the instant the engine starts running.

A third control mode, mode 2, is used to achieve refrigerant-controlled heat release, or more briefly RC heat release, which is the particular form of Internally-controlled heat release, or more briefly IC heat release, used in type A combinations.

A fourth control mode, mode 3, is used to achieve self regulation and, whenever required, also to achieve simultaneously EC heat release. The particular EC heat-release technique used by the system employs a fan (fan 510).

In mode 0, pump 10 and fan 510 do not run; and MPMCU 518 ensures pump 404 is controlled so that $p_R$ tends to $p_{RD}{}^o$, where $p_{RD}{}^o$ is a preselected desired current value for $p_R$ while the system is in mode 0.

In mode 1 (used only where the refrigerant is a non-azeotropic refrigerant), CCU 513 ensures: (1) pump 10 runs at a preselected effective capacity, usually near or equal to the pump's full effective capacity; (2) pump 404 is controlled so that $p_R$ tends to $p_{RD}$, where $p_{RD}$ is a preselected desired current value for $p_R$ while the system is in modes 1 to 3; and (3) fan 510 does not run.

In mode 2, CCU 513 ensures: (1) pump 10 is controlled so that $L_P$ tends to $L_{PD}$, where $L_{PD}$ is a preselected desired current value for $L_P$ high enough for all high heat-flux zones of the cylinder-head coolant passages to be covered with liquid refrigerant when the value of $L_P$ is close to $L_{PD}$, and low enough for refrigerant vapor exiting separator 21 at 23 to be essentially dry; (2) pump 404 is controlled so that $p_R$ tends to $p_{RD}$; and (3) fan 510 does not run.

In mode 3, CCU 513 ensures: (1) pump 10 is controlled so that $p_R$ tends to $p_{RD}$; (2) pump 404 is controlled so that $L_R$ tends to $L_{RD}$; and (3) fan 510 is controlled so that $p_R$ tends to $p_{RD}$.

The preselected desired current value $p_{RD}{}^o$, $p_{RD}$, or $L_{PD}$, (of respectively $p_R$, $p_R$, or $L_P$) may be a constant, or may be a value which changes in a pre-prescribed way as a function of one or more preselected characterizing parameters.

In the case of $p_{RD}{}^o$, a typical preselected characterizing parameter is the ambient atmospheric pressure $p_A$, and a typical pre-prescribed way is the relation $$p_{RD}{}^o = p_A + \Delta^o p, \tag{9}$$

where $\Delta^o p$ is usually, but not necessarily, a fixed quantity. In the case of $p_R$, typical preselected characterizing parameters and typical pre-prescribed ways are discussed in section V,H. And, in the case of $L_P$, the desired current value $L_{PD}$ is usually a constant unless the condenser overfeed techniques described in section V,F,2,d are used, or unless the vehicle-tilt compensating techniques described in section V,F,2,f are used.

In the case of a non-azeotropic refrigerant, the transition rules between modes 0, 1, 2, and 3 are (where 'eng.' is an abbreviation for 'engine'):

| | | | |
|---|---|---|---|
| (a) | 0 to 1: no transition | (g) | 1 to 0: eng. not running and clock stops running |
| (b) | 0 to 2: eng. starts running | (h) | 2 to 0: no transition |
| (c) | 0 to 3: no transition | (i) | 3 to 0: no transition |
| (d) | 1 to 2: eng. starts running and $T_R \geqq T_{R,MIN}$ | (j) | 2 to 1: $T_R < T_{R,MIN}$ |
| (e) | 1 to 3: no transition | (k) | 3 to 1: no transition |
| (f) | 2 to 3: $L_R < L_{R,MAX} - \Delta L_R$, where $\Delta L_R > 0$ | (l) | 3 to 2: $p_R < p_{RD} - \Delta p_R$, where $\Delta p_R > 0$ |

In rule (I), the value of $\Delta p_R$ must be chosen large enough for the value of $(p_{RD} - \Delta p_R)$ to be smaller than the value of $p_R$ at which CCU 513 stops fan 510 running while the system is in mode 3.

In the case of an azeotropic-like refrigerant, mode 1 is eliminated and therefore transitions 0 to 1, 1 to 2, 2 to 1, and 1 to 0, are eliminated and the transition rule under (h) is changed to:

(h') modes 2 to 0: eng. not running and $T_R < T_{R,MIN}$.

I note that, when the engine is started, the system may be in control mode 1, 2, or 3; but not in control mode 0 since, with the postulated transition rules, the system cannot be in control I mode 0 while the engine is running.

iv. Comments on Refrigerant Configuration and Control System

In this section V,F,2,a,iv I make miscellaneous comments on the refrigerant configuration and control system described in section V,F,2,a,i.

Where CR pump 10 is a high-slip positive displacement pump or a centrifugal pump, it is usually highly desirable, particularly in the case of two-step (on-off) control, to use unidirectional (one-way) valve 220, as shown in FIG. 43B, to prevent liquid refrigerant flowing from the engine's coolant passages toward receiver 7 through pump 10 while pump 10 is not running.

Liquid refrigerant, exiting separator 21 at 24, can be returned to one or more points of refrigerant passages 504 or to one or more points of refrigerant passages 505, instead of to point outside the engine's refrigerant passages 504 and 505.

Proportional liquid-level transducer 113 can be used for three-step control, namely for controlling pump 404 so that it induces an essentially constant positive flow rate, an essentially constant negative flow rate, or no flow rate. If only three-step control of pump 404 is acceptable, a possibly less expensive three-step liquid-level transducer could be used provided the dead zones between steps are large enough to prevent unacceptably-fast cycling of pump 404. Similarly, a two-level (on-off) liquid-level transducer could be used to control two-step (on-off) operation of pump 10. (Three-step and two-step control of respectively pumps 404 and 10 has—among other disadvantages—the disadvantage of making it impracticable to control $L_R$ in mode 3, and $L_P$ in modes 2 and 3, as accurately as with proportional control.)

Although not essential, the control system may also include two-step liquid-level transducer 517 (see FIG. 43C) which generates a signal $L'_{C,MAX}$ indicating whether the current value $L_C$ of the refrigerant liquid-vapor interface surface, in air-cooled condenser 508, exceeds or does not exceed a preselected fixed value $L_{C,MAX}$ corresponding to a level near the bottom of header 507. One of the purposes for which transducer 517 could be used is mentioned later in the last major paragraph of this section V,F,2,a,iv.

Also, although not essential, the control system may further include two-step liquid-level transducer 519 (see FIG. 43D) which generates a signal $L'_{H,MAX}$ indicating whether liquid refrigerant has reached the highest point of the system's principal configuration. The information provided by transducer 519 can be used for several purposes, including (a) confirming liquid refrigerant has reached the last-cited highest point before CCU 513 changes the system's control mode from mode 2 to mode 1, thereby increasing system reliability; and (b) assisting in charging the system with refrigerant correctly, and in determining whether the system still has, at a point in time after it has been charged with refrigerant, a sufficient amount of liquid-refrigerant volume to fill the system's principal configuration completely.

Transducer 519 is located in separator 21 in FIG. 43D because the highest point inside the principal configuration shown in FIG. 43D is in separator 21.

Finally, in several applications, MPMCU 518 is not required. In this case, mode 0 denotes that the system is in a safe state and that the system's CCU is de-energized. The value of $p_R$ while CCU 513 is de-energized may, for example, be chosen equal to the value of $p_{RD}$ at the instant $T_R$ falls below $T_{R,MIN}$.

v. Other Refrigerant Configurations and Control Systems.

It should be clear, from the teachings so far in this DESCRIPTION, that the class $VIII_{FN}^{ooo}$ principal configuration shown in FIG. 43 is only one of many kinds of principal configurations with a pool evaporator and an air-cooled condenser which may be preferred for cooling a particular piston engine. Other kinds of preferred principal configurations, in the case of type A combinations, may, for certain piston-engine cooling applications, include class $VIII_{FN}^{soo}$, $VIII_{FF}^{ooo}$, $VIII_{FN}^{soo}$ $VIII^*{}_{FN}^{ooo}$, and $VIII^*{}_{FN}^{soo}$, configurations; and, see section V,F,2,g, also class $XI_{NN}^{oo}$, $XI_{NN}^{so}$, $XI_{FN}^{oo}$, $XI_{FN}^{so}$, $XI_{FF}^{oo}$, $XI_{FF}^{so}$, $XI^*{}_{FN}^{oo}$, and $XI^*{}_{FN}^{so}$, configurations, and the specialized configurations shown in FIGS. 21, 22, and 23. (In refrigerant configurations with a subcooler the subcooler would be located ahead of pump 10, or of pump 46, as applicable.)

I would explain that principal configurations with a subcooler are, in some installations, desirable, or even necessary, to increase the amount of subcool of liquid refrigerant exiting, as applicable, receiver 7, and/or separator 42*, while the system is in control mode 3—to increase, for example, the net positive suction head available, as applicable, to pump 10 or to pump 46. The subcooler used may merely be a quasi-horizontal section of a refrigerant line which is located roughly in the same plane as refrigerant passages 399, and which is exposed to ram air and/or to the airflow induced by fan 510. An example of such a refrigerant line, in the case of a class $VIII_{FN}^{soo}$ configuration, is finned refrigerant-line segment 9-522 shown in FIG. 43E.

I would also explain that in some installations having a principal configuration with a type 1 separator, a refrigerant pump may be desirable, or may be necessary, to return liquid refrigerant from the separator to the configuration's pool evaporator. Examples of installations where this is necessary are those where the desired location of separator 21 results in the level of the refrigerant liquid-vapor interface surface in it being below the level of the refrigerant liquid-vapor interface surface in refrigerant passages 505. FIG. 43F shows a class $VIII_{FF}^{ooo}$ principal configuration where EO pump 27 is the refrigerant pump used to return liquid refrigerant exiting separator 21 to mergence point 25. Examples of techniques for controlling pump 27 include techniques for controlling it as a function of the level of liquid refrigerant in separator 21.

I would further explain that the control-mode rules of CR pump 10 and LT pump 404 can be reversed in control modes 2 and 3 if node 407, where the principal and the ancillary configuration join, were for example located (see FIG. 43G) on refrigerant line 24-25. In particular, in mode 2, pump 10 can be used to control the value of $p_R$ and pump 404 can be used to control the value of $L_P$.

It should also be clear from the teachings so far in this DESCRIPTION that a type $II_R$, type $III_R$, type $IV_R$, type $V_R$, or type $VI_R$, ancillary configuration could have been used instead of the type $I_R$ ancillary configuration shown in FIG. 43. With types $II_R$ to $VI_R$ configurations, the same control modes and transition rules as those described in section V,F,2,a,iii would apply, except that the controllable element (pump 404) of a type $I_R$ configuration would be replaced by the controllable element of one of the other five types of ancillary configurations; namely, for example, by motor 413 in the case of a type $II_R$ configuration and, as applicable, by handwheel 479, by air-transfer pump 420, or by hydraulic pump 422, in the case of a type $III_R$ configuration.

Type $I_R$ to $VI_R$ two-port ancillary configurations are often desirable where the refrigerant employed is a two-component non-azeotropic fluid. A typical example of the locations of inlet 431 and outlet 432 are shown in FIG. 43H for the case where a type $I_R$ configuration is used, and where the refrigerant's component with the lower freezing temperature also has the higher evaporation temperature. (See section V,F,2,d,i.)

A damper or shutter with a controllable aperture upstream from an air-cooled condenser (with respect to the direction of airflow through the condenser) can be used to regulate the volumetric airflow of air through the condenser, and thereby control the rate at which the condenser releases heat to the air surrounding the condenser. I shall refer in this DESCRIPTION to this last-cited kind of heat-release control as 'shutter-controlled heat-release', or more briefly 'SC heat-release'. SC heat release can be used with a system of the invention having an air-cooled condenser instead of, or in addition to, RC heat release. SC heat release is a particular form of externally-controlled passive heat release, or more briefly EC passive heat release.

I choose the refrigerant configuration shown in FIG. 43 1 to describe a typical way of achieving SC heat release instead of, or in addition to, RC heat release. In FIG. 43I, numerals 580, 581, and 582, designate respectively condenser shutter 580 controlled by electric motor 581 via control link 582. Where SC heat release is used instead of RC heat release, the shutter aperture is changed so that, for example, the refrigerant pressure, at a preselected location in the principal configuration, tends toward a preselected value. In the particular case of the refrigerant configuration shown in FIG. 43I, mode 2 is replaced by mode 2(s) during which the system's CCU (not shown) ensures (1) pump 10 is controlled so that $L_P$ tends to $L_{PD}$; (2) pump 404 is controlled so that $L_R$ tends to $L_{RD}$; (3) fan 510 does not run; and (4) shutter motor 581 is controlled by signal $C'_{SC}$, supplied by the system's CCU (not shown), so that $p_R$ tends to $p_{RD}$.

Where SC heat release is used, in addition to RC heat release, mode 2 is replaced by modes $\mathbf{2}_A$(s) and $\mathbf{4}_B$(s). In mode $\mathbf{2}_A$(s), the system's CCU (not shown) ensures (1) pump 10 is controlled so that $L_P$ tends to $L_{PD}$; (2) pump 404 is controlled so that $p_R$ tends to $p_{RD}$; (3) fan 510 does not run; and (4) motor 581 is controlled so that $T_R$ tends to a preselected value $T_{RD}$ higher than $T_{R,MIN}$. And, in mode $\mathbf{2}_B$(s), the system's CCU ensures (1) pump 10 is controlled so that $L_P$ tends to $L_{PD}$; (2) pump 404 is controlled so that $p_R$ tends to $p_{RD}$; (3) fan 510 does not run; and (4) shutter 580 is (completely) open.

The transition rules between modes $\mathbf{2}_A$(s) and $\mathbf{2}_B$(s) are (a) $\mathbf{2}_A$(S) to $\mathbf{2}_B$(s): $L_C \geqq L_{C,MAX}$ (b) $\mathbf{2}_B$(S) to $\mathbf{2}_A$(s): $L_C < L_{C,MAX}$ and are based on information provided by transducer 517; and the transition rules, given in section V,F,2,a,iii between mode 2 and the other control modes are replaced by (a) 0 to $2_A$(s): eng. starts running (b) 0 to $2_B$(s): no transition (c) 1 to $2_A$(s): eng. starts running and $T_R \geqq T_{R,MIN}$ (d) 1 to $2_B$(s): no transition (e) $2_A$(s) to 3: no transition (f) $2_B$(s) to 3: $L_R < L_{R,MAX} - \Delta L_R$, where $\Delta L_R > 0$ (g) $2_A$(s) to 0: no transition with a non-azeotropic refrigerant
$2_A$(s) to 0: $T_R < T_{R,MIN}$ with an azeotropic-like refrigerant (h) 3 to $2_A$(s): no transition (i) 3 to $2_B$(s): $p_R < p_{RD} - \Delta p_R$, where $\Delta p_R > 0$.

b. Cooling Systems with a Non-pool Evaporator i. Preliminary Remarks

The evaporator in FIG. 43 is a pool evaporator, or more briefly a P evaporator, because, under most operating conditions, a liquid-vapor interface surface (surface 123) is located in the evaporator or, more specifically, in refrigerant passages 505 of the cylinder head of engine 500 shown in FIG. 43. In the case of a wide-angle V-engine, say a 90° V-engine, surface 123 would essentially be non-existent, and therefore a conventional P evaporator would be impracticable. And, even in the case of a 60° V-engine, the area of interface surface 123 would usually be undesirably small even if the engine's cylinder-head coolant passages are shaped in the way shown in U.S. Pat. No. 4,656,974 (Hayashi). Furthermore, locating a liquid-vapor interface surface inside refrigerant passages 505 is often highly undesirable, even in the case of an in-line engine, where the engine is installed in a vehicle. This is particularly true with engines installed in cross-country vehicles, ships, and motor-boats, and with long engines installed in trucks. The absence of a liquid-vapor interface surface inside an engine's cylinder-head coolant passages allows those passages to be smaller. That absence eliminates the need, in the case of the examples cited in the immediately-preceding sentence, to divide the cylinder-head coolant passages of a multi-cylinder engine into several compartments, and to control the liquid-refrigerant level in each compartment independently. (See, for example, U.S. Pat. No. 4,584,971 (Neitz et al).)

I have therefore devised two-phase engine-cooling systems with no liquid-vapor interface surface in refrigerant passages 505; namely I have devised engine-cooling systems having a non-pool evaporator, or more briefly an NP evaporator. I next give examples of such cooling systems for the case of a V-engine, but similar systems can also be used with an in-line engine, an engine with opposed cylinders, or a radial engine.

ii. First Refrigerant Configuration, Control System, and Operating Method

Figure 46:
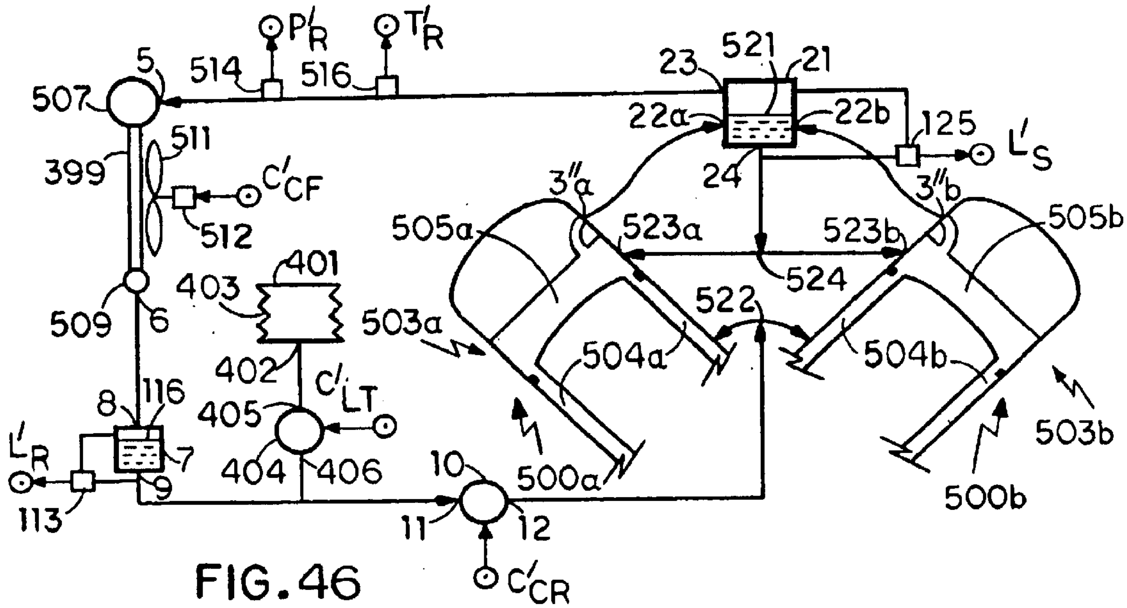

The cooling system shown in FIGS. 46, 47, and 45, has a class $II_{FN}^{ooo}$ configuration in which refrigerant exiting the configuration's two NP component evaporators is supplied to separator 21 at a level below the level of liquid-vapor interface surface 521. One of these two component evaporators is formed by the coolant passages of a first bank of cylinders designated by the alphanumeric symbol 500*a* and the other of the two component evaporators is formed by the coolant passages of a second bank of cylinders designated by the alphanumeric symbol 500*b*. In FIG. 46, alphanumeric symbols with the letter 'a' designate things associated with cylinder bank 500*a* and alphanumeric symbols with the letter 'b' designate things associated with cylinder bank 500*b*. The relative position of air-cooled condenser 508, with respect to the two banks of cylinders shown in FIG. 46, is usually appropriate for a transversely-mounted engine. A longitudinally-mounted engine would usually have air-cooled condenser 508 mounted so that refrigerant line 5-23 and the horizontal segment of refrigerant line 9-407-11-12-522 would, if they were straight lines, be roughly parallel to the axis of the crankshaft (not shown) of engine 500 shown in FIG. 46.

Liquid refrigerant, after flowing through node 522, enters at 530'*a* the NP component evaporator formed by the coolant passages of cylinder bank 500*a*, and very low-quality refrigerant vapor exits at 3"*a*; and liquid refrigerant enters at 530'*b* the NP component evaporator, formed by the coolant passages of cylinder bank 500*b*, and very low-quality refrigerant vapor exits at 3"*b*. Substantially dry refrigerant vapor exits separator 21 at 23 and liquid refrigerant in separator 21 exits at 24 and is returned to refrigerant passages 505*a* and 505*b* at points 523"*a* and 523"*b*, respectively, after flowing through node 524. Each of the alphanumeric symbols 530'*a*, 530'*b*, 3"*a*, 3"*b*, 523"*a*, and 523"*b*, designates a set of ports. The number of ports in each set need not be the same and can range from one to several ports. In the latter case, the number of ports in each set would typically be equal to the number of cylinders in a bank of cylinders, or to a multiple or submultiple of the number of cylinders in a bank of cylinders.

The location of vapor inlets 22*a* and 22*b* of separator 21 below liquid-vapor interface surface 521 helps ensure the refrigerant vapor quality is always low enough to assure potential hot spots in cylinder-head refrigerant passages 505*a* and 505*b* are always essentially wetted everywhere with liquid refrigerant without locating separator 21 at heights unacceptable—even in a fixed ground installation—to get the required evaporator overfeed. (See section V,F,2, b,iii.) The cross-sectional area of interface surface 521 is large enough to ensure the velocity of refrigerant vapor passing through that interface surface is small enough for refrigerant vapor exiting separator vapor outlet 23 to be substantially dry without using, in separator 21, separating surfaces that would cause an unacceptably high pressure drop, for example a pressure drop in excess of say 0.01 bar in the case of an aqueous glycol solution at a pressure of one bar.

Figure 47:
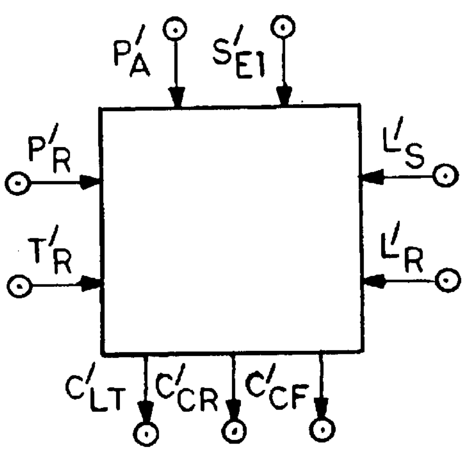

Relations (1) to (8) in section V,F,2,a,ii can also be used to determine whether the cooling system shown in FIGS. 46, 47, and 45, is in an unsafe state or in a safe state, and the typical operating method described in section V,F,2,a,iii can also be used to describe the operation of the last-cited system, provided the symbols $L_P$ and $L_{PD}$ are replaced by the symbols $L_S$ and $L_{SD}$ (defined below), and provided numeral 123 is replaced by numeral 521. In FIG. 46, proportional liquid-level transducer 125 generates signal $L'_S$ providing a measure of the level $L_S$ of liquid-vapor interface surface 521, and CCU 525 (see FIG. 47) controls pump 10 so that $L_S$ tends to $L_{SD}$, where $L_{SD}$ is the preselected desired current value of $L_S$.

The refrigerant configuration shown in FIG. 46—although preferred for certain installations—has, for many installations, at least two handicaps compared to alternative refrigerant configurations having a forced-circulation evaporator refrigerant auxiliary circuit. Firstly, refrigerant lines 3"*a*-22*a* and 3"*b*-22*b* must have a large-enough cross-sectional area to allow 'sewer flow', namely to allow liquid refrigerant and refrigerant vapor to flow in opposite directions; and secondly, separator 21 must be located above refrigerant outlets 3"*a* and 3"*b*.

iii. Second Refrigerant Configuration, Control System, and Operating Method

Figure 48:
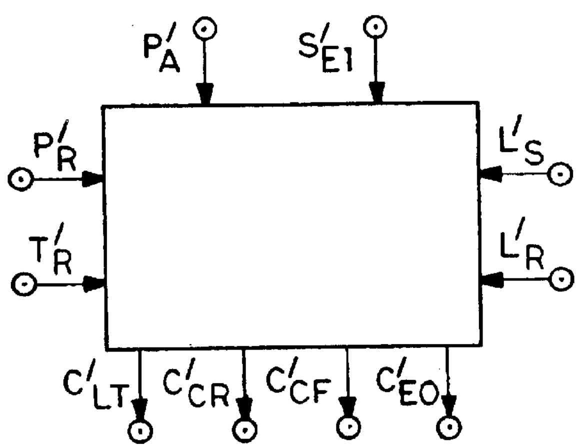

The engine-cooling system shown in FIGS. 46A, 48, and 45 differs from the system shown in FIGS. 46, 47, and 45, in that it has EO pump 27 and therefore has a class $II_{FF}^{ooo}$ principal configuration; and in that refrigerant exiting the configuration's two component evaporators is supplied to separator 21 at a level above, instead of below, liquid-vapor interface surface 521. CCU 526 shown in FIG. 48, and MPMCU 518 shown in FIG. 45, are used to control the refrigerant configuration shown in FIG. 46A. The amount of evaporator overfeed generated by EO pump 27 must be high enough for the maximum value $q_{EV,MAX}$ of the quality $q_{EV}$ of refrigerant vapor exiting the two component evaporators to be low enough to ensure the hottest spots of the surfaces of the walls of refrigerant passages 505*a* and 505*b* are essentially everywhere in direct contact with liquid refrigerant. To this end, the maximum permissible value of $q_{EV,MAX}$ may be as low as 0.15 or even lower, and liquid refrigerant may have to be returned from separator 21 to several locations of the coolant passages of each bank of cylinders. Furthermore, in the case where the refrigerant is, like an aqueous glycol solution, a non-azeotropic fluid, the last-cited control technique must satisfy an additional condition: the amount of overfeed generated by EO pump 27 must be high enough to ensure, and the locations for supplying the overfeed generated by that pump must be placed so that, the refrigerant's liquid phase in the coolant passages of the engine shown in FIG. 46 is mixed sufficiently for that phase to be in quasi-thermal equilibrium throughout those passages. To this end, the maximum-permissible value of $q_{EV,MAX}$ may also be as low as 0.15 or even lower, and liquid refrigerant may have to be supplied to several locations of the coolant passages of cylinder bank 500*a* and of cylinder bank 500*b*.

Figure 46A:
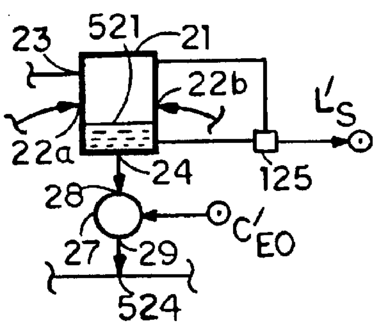

The system shown in FIGS. 46A, 47, and 45, can be operated by using similar control modes, and the selfsame transition rules, as those described in section V,F,2,a,iii. I shall refer to the control modes used to operate the system shown in the three last-cited FIGURES as control modes 0', 1', 2', and 3'. In these control modes, CR pump 10, LT pump 404, and condenser fan 510, are operated in the same way as in control modes 0, 1, 2, and 3, respectively. However, the former four control modes differ from the latter four control modes in that they include rules for operating EO pump 27. These rules are (1) in mode 0' pump 27 does not run; (2) in mode 1' pump 27 runs at or near maximum capacity; and (3) in modes 2' and 3' pump 27 is controlled in the way discussed next. The transition rules between modes 0', 1', 2', and 3', can be identical to those between modes 0, 1, 2, and 3, in section V,F,2,a,iii.

Pump 27 can be controlled by any technique which, explicitly or implicitly, maintains the value of $q_{EV}$ at or below a preselected value $q_{EV,MAX}$ low enough to prevent burn-out. This can, for example, be accomplished by controlling pump 27 so that the value of $q_{EV}$ tends toward a desired preselected value $q_{EV,D}$ which may be fixed, or which may change in a pre-prescribed way as a function of one or more preselected characterizing parameters.

Because, under steady-state conditions $$q_{EV} = \frac{\mathring{m}_C}{\mathring{m}_E} = \frac{\mathring{m}_C}{\mathring{m}_C + \mathring{m}_{EO}} = \frac{1}{1 + (\mathring{m}_{EO} / \mathring{m}_C)}, \tag{10}$$

where $\dot{m}_C$ is the refrigerant mass-flow rate induced by pump 10, where $\dot{m}_{EO}$ is the refrigerant mass-flow rate induced by pump 27, and where $\dot{m}_E$ is the refrigerant mass-flow rate exiting at 3"*a* and 3"*b*, it follows that the quality $q_{EV}$ of refrigerant vapor exiting the component evaporators, formed by the coolant passages of cylinder banks 500*a* and 500*b*, is—under steady-state conditions—a single-valued function of the evaporator-overfeed ratio $$r_{EO} = \frac{\mathring{m}_{EO}}{\mathring{m}_C} = \frac{\mathring{m}_{EO}}{\mathring{m}_E - \mathring{m}_{EO}}. \tag{11}$$

Consequently, the desired preselected value $q_{EV,D}$ can be obtained by controlling $r_{EO}$ or, almost equivalently, by controlling the ratio of the volumetric-flow rates $F_{CR}$ and $F_{EO}$ induced respectively by pumps 10 and 27. Techniques for controlling the ratio of $F_{CR}$ and $F_{EO}$ are disclosed in section V,B,3,e of my co-pending U.S. patent application Ser. No.400,738, filed 30 Aug. 1989. (Where pumps 10 and 27 are low-slip positive displacement pumps driven by stepping motors, or by pulse-width controlled motors, CCU 526 can use the signals generated by it, to control those motors, as a measure of the volumetric flow rates $F_{CR}$ and $F_{EO}$ induced respectively by pumps 10 and 27. Consequently no flow-rate transducers are necessary to obtain a measure of $F_{CR}$ and a measure of $F_{EO}$.) The foregoing techniques for controlling the ratio $F_{EO}$ over $F_{CR}$, and thus almost equivalently the value of $r_{EO}$, are used whenever pump 10 is running. However, pump 10 may not always run while the engine shown in FIG. 46A is running, and consequently the just-cited techniques for controlling the value of $r_{EO}$ must be supplemented with a technique for ensuring $q_{EV}$ does not exceed $q_{EV,MAX}$ while pump 10 is not running. To this end, pump 27 is controlled, in modes 2' and 3', in for example the way described in the immediately-following minor paragraph.

Whenever the engine-cooling system shown in FIGS. 46A, 47, and 45, is in mode 2', or in mode 3', CCU 526 inquires whether pump 10 is running. If pump 10 is running, CCU 526 controls the value of $F_{EO}$ so that it is equal to the current value of $F_{CR}$ multiplied by $r_{EO,D}$, where $r_{EO,D}$ is the desired value of $r_{EO}$. And, if pump 10 is not running, CCU 526 sets the value of $F_{EO}$ equal to the product of $F_{CR,1}$ and $r_{EO,D}$, where $F_{CR,1}$ is a finite value of $F_{CR}$ which, for example, may be the value of $F_{CR}$ at which pump 10 starts running while the system is in mode 2' or in mode 3'. The value $r_{EO,D}$ of $r_{EO}$ is chosen so that $$r_{EO,D} > \frac{1}{q_{EV,\mathrm{MAX}}} - 1 \tag{12}$$

iv. Other Refrigerant Configurations and Control Systems

Figure 46B:
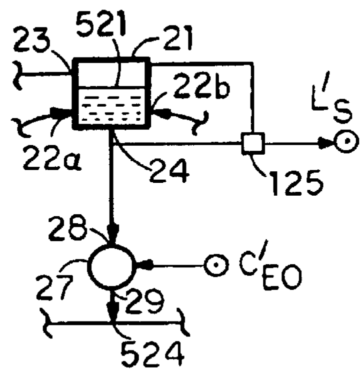

It should be clear, from the teachings so far in this DESCRIPTION, that the class $II_{FN}^{ooo}$ principal configuration shown in FIG. 46, and the class $II_{FF}^{ooo}$ configurations shown in FIGS. 46A and 46B are only three of many kinds of principal configurations with an NP evaporator which may be preferred for cooling a particular piston engine. Other kinds of preferred principal configurations, in the case of type A combinations, include class $II_{FN}^{soo}$, $II_{FF}^{soo}$, $II^*_{FN}{}^{ooo}$, $II^*FN^{soo}$, $III^*_{FN}{}^{oo}$, $III^*_{FNso}$, $III^*_{FF}{}^{oo}$, and $III^*_{FF}{}^{so}$, configurations. (In refrigerant-circuit configurations with a subcooler, the subcooler would be located ahead of pump 10, or of pump 46, as applicable, and would—as in the case of configurations with a P evaporator—be merely a rudimentary subcooler.) I note that subgroup $III_{FN}$ configurations are generally included in preferred configurations only where their condenser is higher than their evaporator.

All suitable principal configurations for piston-engine cooling systems with an NP evaporator must have sewer flow, or a substantial evaporator-overfeed ratio, or both. This is achieved in the case of subgroup $II_{FN}$ and $II_{FF}$ configurations in the way described in respectively sections V,F,2,b,ii and V,F,2,b,iii. I note that an alternative version of the class $II_{FF}^{ooo}$ principal configuration shown in FIG. 46A would be the principal configuration shown in FIG. 46B where EO pump 27 has been added to the principal configuration shown in FIG. 46.

A substantial evaporator-overfeed ratio can also be obtained by operating the DR pump of subgroup $III_{FF}$ and $III^*_{FF}$ configurations like the EO pump of a subgroup $II_{FF}$ configuration; namely by operating DR pump 46 so that the volumetric-flow rate $F_{DR}$ induced by it varies in a pre-prescribed way as a function of the volumetric-flow rate $F_{CR}$ induced by CR pump 10.

The EO and DR pump control techniques described so far in this section V,F,2,b may often be unsatisfactory because of unacceptably large differences between the current value of $\dot{m}_C$ and the current value of $\dot{m}_V$ during transients, where $\dot{m}_V$ is the mass-flow rate of essentially-dry refrigerant vapor in the principal configuration's refrigerant-vapor transfer means. In cases where such unacceptably large differences would occur, the EO and DR pump control techniques described so far can (a) be supplemented by techniques described in section V,H,4; or (b) be replaced (1) by the alternative control techniques also described in section V,H,4, or (2) by the dual flow-rate control technique described in the immediately-following major paragraph.

The last-cited control technique—which can, with obvious changes, be used with either an EO or a DR pump—is described in this major paragraph using as an example a system, hereinafter referred to in this major paragraph as 'the system', consisting of the class $III^*_{FN}{}^{oo}$ principal configuration, and the type $IV_R$ ancillary configuration, shown in FIG. 49; CCU 527 shown in FIG. 50; and MPMCU 518 shown in FIG. 45.

Figure 49:
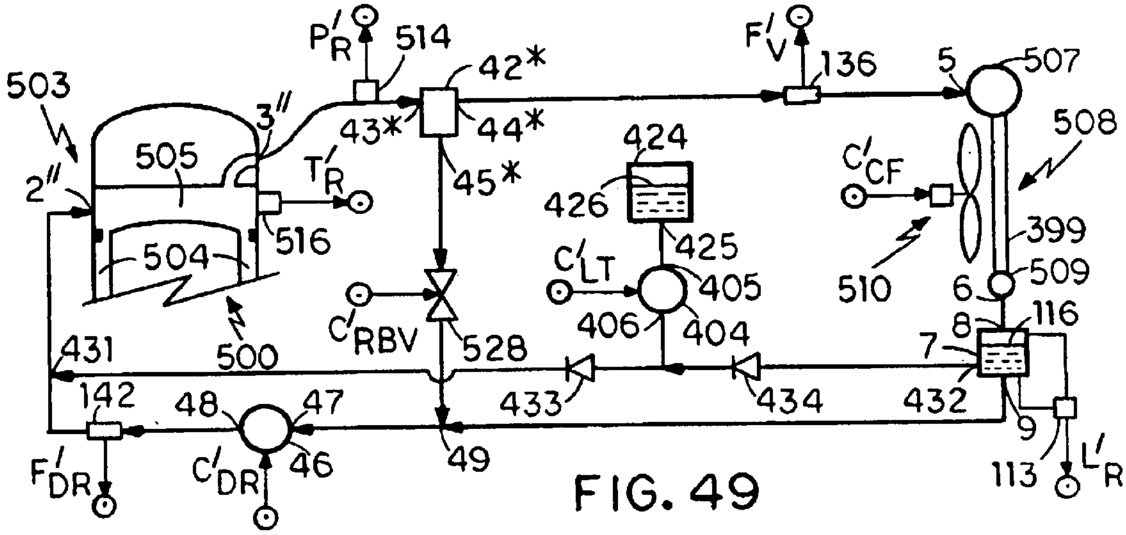
Figure 50:
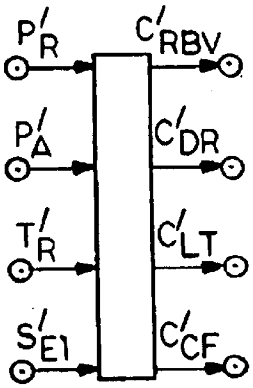

The particular dual flow-rate control technique employed by the refrigerant configuration shown in FIG. 49 (1) uses refrigerant vapor-flow transducer 136 to generate a signal $F'_V$ providing a measure of the current value of the refrigerant-vapor volumetric-flow rate $F_V$ in the refrigerant configuration's refrigerant-vapor transfer means, and (2) uses liquid-refrigerant flow transducer 142 to generate a signal $F'_{DR}$ providing a measure of the current value of the liquid-refrigerant volumetric-flow rate $F_{DR}$ induced by DR pump 46. CCU 527

(a) computes the refrigerant-vapor mass-flow rate $\dot{m}_V$, corresponding to $F_V$, where $\dot{m}_V$ provides—under steady-state conditions—an accurate measure of $(\dot{m}_E - \dot{m}_{EO})$;

(b) computes the liquid-refrigerant mass-flow rate $\dot{m}_{DR}$ corresponding to $F_{DR}$; and (c) generates a signal $C'_{DR}$ which controls DR pump 46 so that it induces a (liquid) volumetric-flow rate $F_{DR}$ large enough to ensure the current value of $r_{EO}$ is large enough for the current value of $q_{EV}$ not to exceed $q_{EV,MAX}$.

In FIG. 49, numeral 528 designates a bidirectional (two-way) refrigerant-blocking valve having one or more refrigerant passages which are a part of a type 2 evaporator refrigerant auxiliary circuit and of no other refrigerant circuit. Valve 528 is controlled by signal $C'_{RBV}$.

The system has, like all systems of the invention discussed so far, four control modes (in the case of a non-azeotropic refrigerant) which I refer to, in general, as modes 0, 1, 2, and 3. (I use dashes, as in section V,F,2,b,iii, only where I need to distinguish between different versions of those control modes.) Briefly, to recapitulate, modes 0, 1, 2, and 3, designate modes I shall refer to respectively as a minimum-pressure-maintenance mode; a mixing mode; an RC heat-release mode; and a combined self-regulation and EC heat-release mode. (The term 'mixing mode' refers to the action of mixing the components of a non-azeotropic refrigerant to achieve a more spatially-uniform concentration of its components.) The system has four controllable elements: DR pump 46, LT pump 404, condenser fan 510, and refrigerant bidirectional valve 528.

In mode 0, pump 46 and fan 510 do not run; valve 528 is open; and MPMCU 518 ensures pump 404 is controlled so that $p_R$ tends to $p_{RD}{}^o$.

In mode 1, CCU 527 ensures (1) pump 46 runs at a preselected capacity, usually near or equal to the pump's full capacity; (2) pump 404 is controlled so that $p_R$ tends to $p_{RD}$; (3) fan 510 does not run; and (4) valve 528 is closed.

In mode 2, CCU 527 ensures (1) pump 46 is controlled so that $q_{EV}$ does not exceed $q_{EV,MAX}$; (2) pump 404 is controlled so that $p_R$ tends to $p_{RD}$; (3) fan 510 does not run; and (4) valve 528 is open.

In mode 3, CCU 527 ensures (1) pump 46 is controlled so that $q_{EV}$ does not exceed $q_{EV,MAX}$; (2) pump 404 is controlled so that $L_R$ tends to $L_{RD}$; (3) fan 510 is controlled so that $p_R$ tends to $p_{RD}$; and (4) valve 528 is open.

The transition rules between the four modes recited in this major paragraph can be identical to those given in section V,F,2,a,iii.

I note that there is no identifiable liquid level in separating assembly 42*. Therefore, CCU 527 determines whether the refrigerant-circuit configuration shown in FIG. 49 is in a safe, or in an unsafe, state solely on the basis of relations (2), (3), (4), (6), (7), and (8).

I also note that the location of the inlet and outlet of the two-port ancillary configuration shown in FIG. 49 is correct for a two-component non-azeotropic refrigerant's component whose component with the lower freezing temperature also has the lower evaporation temperature. (See section V,F,2,d.)

I further note that, where the signal $C'_{DR}$ used to control DR pump 46 provides a sufficiently accurate measure of $F_{DR}$, transducer 142 can be eliminated.

It should be clear from the teachings so far in this DESCRIPTION that a type $II_R$, type $III_R$, type $IV_R$, or type $VI_R$, ancillary configuration can be used instead of the type $I_R$ ancillary configuration shown in FIGS. 46, 46A, 46B, and 49.

Shutter-controlled heat release can be used with a cooling system of the invention having an NP evaporator in the same way as with a cooling system of the invention having a P evaporator.

c. Location of Evaporator Refrigerant Inlets and Outlets

Everywhere in this DESCRIPTION I distinguish between NP-evaporator liquid-refrigerant inlets and P-evaporator liquid-refrigerant inlets, and between NP-evaporator refrigerant-vapor outlets and P-evaporator refrigerant-vapor outlets. And I also everywhere in this DESCRIPTION distinguish, where applicable, between cylinder-block evaporator (liquid-refrigerant) inlets and (refrigerant-) vapor outlets on the one hand, and cylinder-head evaporator (liquid-refrigerant) inlets and (refrigerant-) vapor outlets on the other hand, by adding to numerals designating cylinder-block evaporator inlets and vapor outlets a single-dash superscript, and by adding to numerals designating cylinder-head evaporator inlets and vapor outlets a double-dash superscript. I further distinguish in this section V,F (and I have already done this in FIGS. 46, 49, and 51A), and in section V,G, between different kinds of cylinder-block and cylinder-head inlets in the way described next, where the abbreviation NPE denotes an NP evaporator and the abbreviation PE denotes a P evaporator.

| Numeral | | |
|---|---|---|
| NPE | PE | Inlet Designated |
| 2 | 82: | Inlet through which liquid refrigerant, exiting a principal configuration's (principal) condenser, and exiting the principal configuration's separating device, enters the principal configuration's evaporator |
| 523 | 593: | Inlet through which essentially only liquid refrigerant exiting a principal configuration's separating device enters the principal configuration's evaporator |
| 530 | 550: | Inlet through which essentially only liquid refrigerant exiting a principal configuration's (principal) condenser enters the principal configuration's evaporator |

An evaporator liquid-refrigerant inlet, or an evaporator refrigerant-vapor outlet, may consist of one or more ports. In the case where that inlet, or that outlet, consists of several ports, the several ports may be located at the same level or at different levels.

I stated in section V,F,2,b,iii that liquid refrigerant may have to be supplied to several locations in the coolant passages of a bank of cylinders. This is true not only with the class $II_{FF}^{ooo}$ principal configuration discussed in the last-cited section, but also with any principal configuration. Preferred locations depend not only on the orientation of a piston engine's bank of cylinders but also on design details such as the precise configuration of cylinder-block and cylinder-head coolant passages. Liquid refrigerant can be delivered to these passages by nozzles to increase the velocity with which liquid refrigerant is injected into them, thereby generating turbulence and eliminating hot spots. I shall refer to the last-cited nozzles as 'liquid-refrigerant injection nozzles' or more briefly as 'LR injection nozzles'. I use numeral 531 to designate a set of one or more LR injection nozzles.

Figure 51:
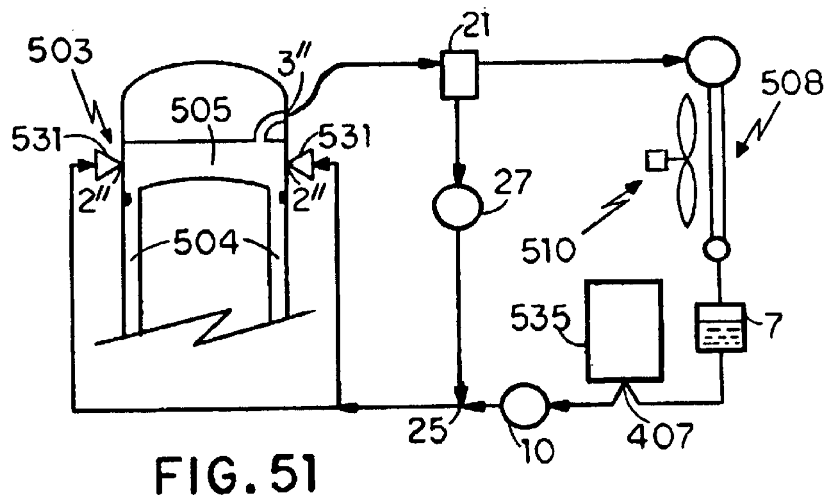
Figure 51A:
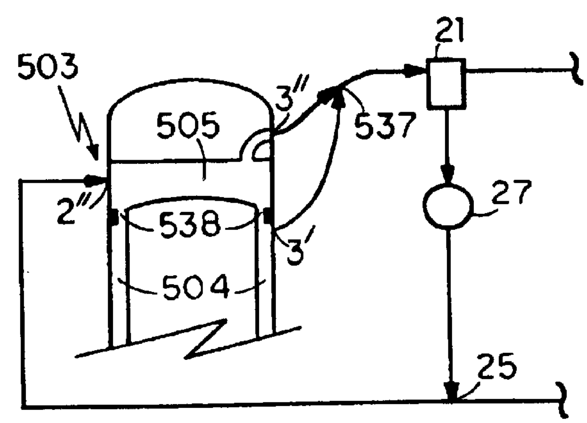

A typical example of LR injection-nozzle locations is given in FIG. 51 for the particular case of engine 500 with a single bank of cylinders, a class $II_{FF}^{ooo}$ principal configuration, and a liquid-refrigerant inlet 2" having a set of ports consisting of two subsets of ports on opposite sides of the engine's cylinder-head. Numeral 535 designates an ancillary configuration (of any type).

In the typical example shown in FIG. 51, the number of ports—and associated LR injection nozzles—in each subset of ports would typically be equal to the number of cylinders in the bank of cylinders, or to a multiple or a submultiple of the number of cylinders in the bank of cylinders. In the particular case where the number of ports, in each subset of ports, is equal to, or larger than, the number of cylinders in the bank of cylinders, refrigerant passages 505 can be subdivided—to help balance refrigerant flows in a cylinder bank's cylinder heads—into a set of several separate and distinct refrigerant passages. The number of these separate and distinct refrigerant passages, where used, can be equal to, or a multiple of, or a submultiple of, the number of cylinders in a cylinder bank, but must not exceed the number of ports in each subset of ports.

Turbulence promoters in the form of fins inside an engine's coolant passages, and/or in the form of grooves in the internal surfaces of those passages, are used by the invention, where desirable, to promote or to enhance turbulent refrigerant flow inside the engine's coolant passages.

The typical example shown in FIG. 51 assumes that refrigerant passages 504 (in the cylinder-block coolant passages) and refrigerant passages 505 (in the cylinder-head coolant passages) are interconnected through several ports (not shown), and that (refrigerant) sewer flow occurs in refrigerant passages 504. Sewer flow, in passages 504, may in many cases require the ports interconnecting passages 504 and 505 to be unacceptably large. In such cases, refrigerant-vapor transfer-means segment 3'-537 (consisting of one or more refrigerant lines) can be used (see FIG. 51A) to by-pass refrigerant vapor, generated in passages 504, around interconnecting ports 538.

d. Supplementary Control Techniques for Non-azeotropic Refrigerants i. General Remarks The refrigerants envisaged by me for piston-engine cooling and intercooling systems exposed to subfreezing water temperatures include azeotropic-like and non-azeotropic refrigerants. The former refrigerants include ethanol, methanol, acetone, HCFCs, and HFCs; and the latter include aqueous glycol, ethanol, methanol, and acetone, solutions.

Most of the non-azeotropic refrigerants I have in mind are—like the four last-cited solutions—two-component non-azeotropic refrigerants. I shall therefore, in this section V,F,2,d, consider only two-component non-azeotropic refrigerants. However, the techniques described in this same section also apply to non-azeotropic refrigerants with more than two components.

In the particular case of a two-component non-azeotropic refrigerant, the spatial distribution of the concentration of one of its components at a given point automatically determines the spatial distribution of the concentration of its other component at that point. I therefore need to consider the spatial distribution of the concentration of only one component.

Let c(x,y,z) be the concentration, at a point (x,y,z) of the liquid phase of the refrigerant's component with the higher evaporation (boiling) temperature (at a given pressure); let c be the concentration of the liquid phase of that component when its concentration is spatially uniform throughout a refrigerant-circuit configuration; and let $\bar{c}_E$(x,y,z), or more briefly $\bar{c}_E$, be the mean value of the concentration of the liquid phase of that component in the configurations evaporator. Then, while a principal configuration is active, the value of $\bar{c}_E$ will in general exceed the value of c, and consequently the mean value $\bar{T}_{RS,E}$ (of the refrigerant's saturated-vapor temperature $T_{RS}$ in a configuration's evaporator) will exceed the value of the refrigerant's saturated-vapor temperature $T_{RS,O}$ corresponding to the value of c. The difference ($\bar{T}_{RS,E}-T_{RS,O}$), if substantial, is undesirable, and I have therefore devised supplementary control techniques for reducing it. I distinguish between two-component non-azeotropic refrigerants, which I shall refer to as 'group H refrigerants', whose component with the lower freezing temperature has—as in aqueous glycol solutions—the higher evaporation temperature; and other two-component non-azeotropic refrigerants, which I shall refer to as 'group L refrigerants', whose component with the lower freezing temperature has—as in ethanol, methanol, and acetone, solutions—the lower evaporation temperature. I also note that the foregoing supplementary control techniques are essentially, but not necessarily exactly, the same for both group H and group L refrigerants.

ii. Cooling Systems with no Evaporator Refrigerant Auxiliary Circuit

In the just-cited case, the value of $\bar{c}_E$–c) depends, for a given refrigerant and a given evaporator-overfeed ratio $r_{EO}$, on the value of the ratio $$r_M \equiv \frac{M_E}{M_L}, \tag{13}$$

and decreases as $r_M$ increases. In relation (13), $M_E$ is the mass of liquid refrigerant in the evaporator and $M_L$ is the mass of liquid refrigerant in the principal configuration outside the evaporator.

The value of $(\bar{c}_E - c)$, and the corresponding value of $\bar{T}_{RS,E}$ (at a given refrigerant pressure), may be acceptable, for certain two-component non-azeotropic refrigerants, for values of $r_M$ as low as unity—even where the evaporator-overfeed ratio is high. Examples of such two-component refrigerants are those which—like aqueous ethanol solutions—have component evaporation temperatures which do not differ greatly. (The boiling temperature at standard pressure of water and ethanol are respectively 100° C. and 77.7° C., and therefore differ by only 22.3° C.) By contrast, the value of $\bar{c}_E$, and the corresponding value of $\bar{T}_{RS,E}$, may not be acceptable for certain other two-component non-azeotropic refrigerants, even for values of $r_M$ as high as 3 or even higher—even where the evaporator-overfeed ratio is high. Examples of such two-component non-azeotropic fluids are ethylene glycol solutions and propylene glycol solutions. (The evaporation temperature, at standard pressure, of the former solution is 198° C. and of the latter solution is 187° C., and therefore these two temperatures differ from the boiling temperature of water by 98° C. and 87° C., respectively.) I consider as an example, in greater detail, a spatially uniform concentration of ethylene glycol equal to 0.5. Then, when $r_M$ is equal to unity, the value of $(\bar{c}_c - c)$ is, with a high value of $r_{EO}$ (say over 10), about 0.34, which at one atmosphere corresponds to a value of $\bar{c}_E$ of about 0.84 and to a value of $\bar{T}_{RS,E}$ of about 127° C. This temperature corresponds to an often undesirably-high rise in temperature above the boiling temperature of water at standard atmospheric pressure. With a design I have in mind, I expect the value of $r_M$ to be as high as 7 while some piston-engine cooling systems of the invention are in mode 3. This value corresponds, for c equal to 0.5, to a value of $\bar{c}_E$ equal to about 0.57, and to values of $\bar{T}_{RS,E}$ of about 109° C. and 105° C. at respectively one atmosphere and 0.8 atmosphere. This is usually acceptable. By contrast, when the system is in mode 2 and the system's condenser is almost completely filled with liquid refrigerant, the value of $r_M$ may approach unity and $\bar{T}_{RS,E}$ may approach 127° C. at one atmosphere, which is usually undesirable. I have therefore devised the techniques disclosed next to reduce, where necessary, the value of $\bar{c}_E$ and $\bar{T}_{RS,E}$ while the system is in mode 2. (These techniques can also be used for the same purpose in mode 3 at the expense of a larger condenser.)

All the techniques devised by me for reducing the concentration $\bar{c}_E$ and the temperature $\bar{T}_{RS,E}$ are based on the fact that, for a given value of $r_M$, the value of $\bar{c}_E$ decreases as the value of the ratio $q_{CV}$ decreases, where $$q_{CV} = \frac{\mathring{m}_V}{\mathring{m}_V + \mathring{m}_L} = \frac{1}{1 + (\mathring{m}_L / \mathring{m}_V)} = \frac{1}{1 + r_{CO}}; \tag{14}$$

where $q_{CV}$, $\dot{m}_V$, and $\dot{m}_L$, are respectively the quality of refrigerant vapor, the mass-flow rate of dry refrigerant vapor, and the mass-flow rate of liquid refrigerant, entering condenser 508 at refrigerant inlet 5; and where $$r_{CO} = \frac{\mathring{m}_L}{\mathring{m}_V} \tag{15}$$

is a ratio I shall refer to as the 'condenser-overfeed ratio'.

The purpose of separator 21 is to ensure the value of $\dot{m}_L$ is essentially zero in mode 3. However, the purpose of operating the engine-cooling system in mode 2 is to decrease condenser effectiveness. This was achieved with the techniques described in sections V,F,2,b, and V,F,2,c, by backing-up liquid refrigerant in condenser refrigerant passages 399. Because condenser effectiveness decreases as $r_{CO}$ increases, the same result can be achieved by causing liquid refrigerant to enter passages 399 through condenser refrigerant inlet 5 instead of through condenser refrigerant outlet 6. This second way of decreasing condenser effectiveness decreases the value of $\bar{c}_E$ for a given value of $r_M$, thereby also decreasing the value of $\bar{T}_E$ for a given value of $p_R$. The value of $\dot{m}_L$ can be made to have a substantial value with several techniques.

The first set of techniques for achieving a required value of $r_M$ includes using a liquid-level independent-control technique to raise the level $L_P$ of interface surface 123 sufficiently for, as applicable, separator 21, separating assembly 21*, or separating assembly 42*, to become ineffective and cause wet refrigerant, instead of essentially dry refrigerant, to be supplied to air-cooled condenser 508. To this end, the value $L_{PD3}$ of $L_{PD}$ in mode 3 would still be chosen low enough for separator 21, separating assembly 21*, or separating assembly 42*, to supply essentially dry refrigerant to condenser refrigerant passages 399, but the value $L_{PD2}$ of $L_{PD}$ in mode 2 would be chosen high enough to cause separator 21, separating assembly 21*, or separating assembly 42*, to become sufficiently ineffective for the ratio $r_{CO}$ to tend toward a value high enough to prevent the value of $\bar{c}_E$, or of $\bar{T}_{RS,E}$, exceeding a preselected maximum value. A measure of $\bar{c}_E$ can be obtained by measuring the value of $c_E$ inside refrigerant passages 505 at a point below interface surface 123, and a measure of $\bar{T}_{RS,E}$ can be obtained by measuring the refrigerant temperature $T_R$ also at a point in refrigerant passages 505 below that interface surface. Then, for example, in the case of the subgroup $VIII_{FN}$, $VIII_{FF}$, $II_{FN}$ and $II_{FF}$, configurations shown in respectively FIGS. 43, 43E, 46, and 46A or 46B, CR pump 10 could, for instance, be controlled so that $$T_R - T_{RS,O} \leqq \epsilon_{RS}, \tag{16}$$

where the value of $T_{RS,O}$, as a function of the values of $T_R$ and c, can be computed for a given refrigerant and stored in a system's CCU; where $\epsilon_{RS}$ is a preselected positive quantity equal to a few degrees Celsius; and where LT pump 404 would usually be controlled so that $p_R$ tends to $p_{RD}$.

The second set of techniques for achieving a required value of $\dot{m}_L$ includes by-passing, as applicable, separator 21, separating assembly 21*, or separating assembly 42*, with a liquid-refrigerant line connecting directly liquid refrigerant in refrigerant passages 504, or refrigerant passages 505, at a point below interface surface 123, to a point of refrigerant-vapor line 23-5, or to a point of condenser header 507; and to cause liquid refrigerant to flow in that liquid-refrigerant line when the engine-cooling system is in mode 2. This can be done in several ways. One of these ways is shown in FIG. 43I for the case of a principal configuration having a type 1 separator. In FIG. 43I, condenser-overfeed pump 539, or more briefly CO pump 539, having an inlet 540 and an outlet 541, and liquid-refrigerant lines 542-540 and 541-543, are used to transfer liquid refrigerant from refrigerant passages 505 to refrigerant-vapor line 23-5 (or to header 507), after by-passing separator 21. CO pump 539 is used to control the rate $\dot{m}_L$ by inducing a volumetric-flow rate $F_{CO}$. While the engine-cooling system is in mode 2, LT pump 404 is controlled so that $L_R$ tends so $L_{RD}$, CR pump 10 is controlled so that $L_P$ tends to $L_{PD}$, and CO pump 539 can again be controlled so that relation (16) is satisfied. Alternatively, CO pump 539 can be controlled so that $$r_{CO} \geqq r_{CO,MIN} \tag{17}$$

where $r_{CO,MIN}$ is a precomputed quantity, not necessarily fixed, stored in the cooling system's CCU (not shown). (For example, $r_{CO,MIN}$ may be a function of $p_R$.) To this end, the cooling system's CCU determines the current value of $\dot{m}_V$ from a signal $F'_V$ generated by refrigerant vapor-flow transducer 136, and the cooling system's CCU generates a signal $C'_{CO}$ which controls pump 539 so that $$\dot{m}_L \geqq \dot{m}_V \cdot r_{CO,MIN} \tag{18}$$

iii. Cooling Systems with an Evaporator Refrigerant Auxiliary Circuit

In the just-cited case, the values of $(\bar{c}_{EA}-c)$ and $(\bar{T}_{RS,EA}-T_{RS,O})$ depend, for a given refrigerant and a given evaporator-overfeed ratio $r_{E,O}$, on the value of the ratio $$r_{MA} \equiv \frac{M_{EA}}{M_{LA}} \tag{19}$$

and decrease as $r_{MA}$ increases. In the expression $(\bar{c}_{EA}-c)$, the quantity $\bar{c}_{EA}$ is the mean value of the concentration $c_{EA}$, in a principal configuration's evaporator refrigerant auxiliary circuit, of the liquid phase of the refrigerant's component with the higher evaporation temperature in the expression $(\bar{T}_{RS,EA}-T_{RS,O})$; the quantity $\bar{T}_{RS,EA}$ is the mean value of the refrigerant saturated-vapor temperature $T_{RS}$ in the principal configuration's evaporator refrigerant auxiliary circuit; and in relation (19), $M_{EA}$ is the mass of liquid refrigerant in the evaporator refrigerant auxiliary circuit, and $M_{LA}$ is the mass of liquid refrigerant in the principal configuration outside that auxiliary circuit.

The ratio $r_{MA}$ is—like the ratio $r_M$—expected usually to be sufficiently high while the engine-cooling system is in mode 3, but not high enough while the system is in mode 2, and I have therefore devised several sets of techniques, similar to those devised for the case of cooling systems with P evaporators, to reduce, where necessary, the values of $\bar{c}_{EA}$ and $\bar{T}_{RS,EA}$ while engine-cooling systems with an NP evaporator are in mode 2. I next describe only essential differences between the two sets of techniques.

The essential difference between the first set of supplementary control techniques devised for engine-cooling systems with a P evaporator and the first set of supplementary control techniques devised for engine-cooling systems with an NP evaporator, is that in the former systems the effectiveness of, as applicable, separator 21, separating assembly 21*, or separating assembly 42*, is reduced indirectly by raising the level of liquid refrigerant in their P evaporator; whereas in the latter systems the effectiveness of separator 21 is reduced directly by raising the level of liquid refrigerant in their separator.

Figure 46C:
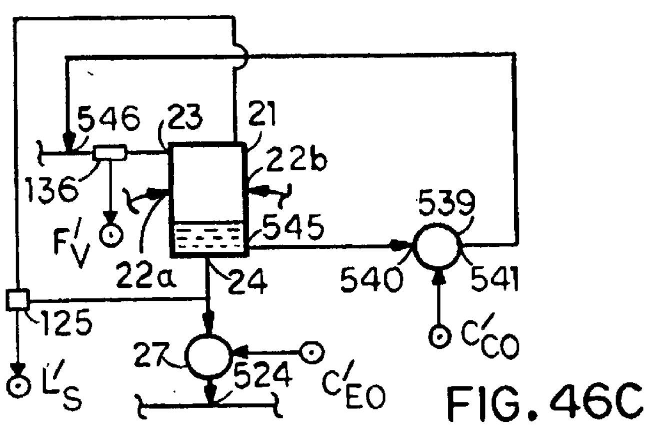

The essential difference, between the second set of supplementary control techniques devised for engine-cooling systems with a P evaporator and the second set of supplementary control techniques devised for engine-cooling systems with an NP evaporator, is that in the former systems liquid refrigerant is transferred to a point of refrigerant (vapor) line 23-5, or of condenser header 507, from the evaporator; whereas in the latter systems liquid refrigerant is transferred to that line, or to that header, from—as applicable—separator 21, liquid-refrigerant line 24-25, refrigerant line 21*-25, or refrigerant line 45*-49. FIG. 46C shows, for the case of a principal configuration with a type 1 separator, CO pump 539, and refrigerant lines 545-540 and 541-546, used to transfer liquid from point 545 of separator 21 to point 546 of refrigerant line 23-5.

e. Location of Inlet and Outlet Ports of Two-port Ancillary Configurations

The supplementary control techniques disclosed in section V,F,2,d are, as mentioned in that section, essentially the same for group H and group L refrigerants. However, the control techniques, for helping ensure the concentration of the components of a two-component non-azeotropic refrigerant are spatially quasi-uniform throughout a cooling system's configuration before it cools down, depend in part on whether the refrigerant is a group H or a group L refrigerant. The reason for this is that (a) in the case of a P evaporator, the concentration of the component of the refrigerant with the lower freezing temperature, which I shall refer to as the freeze-proof component, will be high in the evaporator and low outside the evaporator where a group H refrigerant is employed; whereas that concentration will be low in the evaporator and high outside the evaporator where a group L refrigerant is employed; and similarly (b) in the case of an NP evaporator (with a substantial amount of overfeed), the concentration of the freeze-proof component will be high in the evaporator refrigerant auxiliary circuit and low outside that circuit where a group H refrigerant is employed; whereas that concentration will be low in the evaporator refrigerant auxiliary circuit and high outside that circuit where a group L refrigerant is employed.

It follows that a two-port ancillary configuration should preferably usually be connected to the principal configuration associated with it, so that (a) with a group H refrigerant, the ancillary configuration extracts liquid refrigerant from all appropriate point of the principal configuration's evaporator refrigerant auxiliary circuit and inserts liquid refrigerant at an appropriate point of the principal configuration outside that circuit; and so that (b) with a group L refrigerant, the ancillary configuration extracts liquid refrigerant from an appropriate point of the principal configuration outside the evaporator refrigerant auxiliary circuit and inserts liquid refrigerant at an appropriate point inside that circuit.

The former of the two cases just cited under (a) and (b) is shown, for example, in FIG. 43H; and the latter of these same two cases is shown, for example, in FIG. 49.

It also follows that a one-port ancillary configuration should preferably usually be connected, to the principal configuration associated with it, so that (a) with a group H refrigerant, the ancillary configuration extracts liquid refrigerant from an appropriate point of the principal configuration's evaporator refrigerant auxiliary circuit; and so that (b) with a group L refrigerant, the ancillary configuration extracts liquid refrigerant at an appropriate point of the principal configuration outside the evaporator refrigerant auxiliary circuit.

The former of the two cases just cited under (a) and (b) is shown, for example, in FIG. 43G; and the latter of these same two cases is shown, for example, in FIGS. 43 and 46.

f. Vehicle-tilt Compensating Techniques i. Preliminary Remarks

Piston-engine cooling systems having an NP evaporator can be designed so that their performance is not affected adversely during large tilts, with respect to a local horizontal plane, of the vehicle on which they are installed. For example, such cooling systems can be made immune to tilts of up to at least 30 degrees, in any direction, where, as applicable, their separator has, or their receiver is, in the absence of tilt, a vertical cylindrical vessel with a length-to-diameter ratio of, say, no less than 2. By contrast, the performance of cooling systems having a P evaporator, a shallow separator, or a shallow receiver, may be affected adversely by tilts of 15 degrees or less. I use the term 'shallow' to denote, in the case of a vertical cylindrical vessel, a length to diameter ratio of less than one.

In the case of automobiles designed for road-only service, and in the case of ships, tilts exceeding, say, 15 degrees are, while the engine is running, unusual for long time intervals, but may occur for short time intervals. For such short time intervals (say less than one minute), I have devised the vehicle-tilt compensating techniques, described in the next two subsections of this section V,F,2,f, for two-phase engine-cooling systems with a P evaporator, an NP evaporator and a shallow separator, or with a shallow receiver.

ii. Cooling Systems with a Pool Evaporator

The vehicle-tilt compensating techniques devised for cooling systems with a P evaporator are based on the premise that whereas potential hot spots of the walls of cylinder-head passages 505 must remain immersed continuously in liquid refrigerant, a temporary degradation in cooling-system performance is acceptable if it causes the temperature of liquid refrigerant in passages 505 to rise temporarily by only a few degrees Celsius. The last-cited techniques are disclosed using the refrigerant configuration shown in FIG. 43.

I assume, for specificity only, that the one or more cylinder axes of the engine being cooled are vertical when the vehicle on which the engine is mounted is placed on a horizontal surface, and that therefore the angle θ of the cylinder axes, with respect to the normal to interface surface 123 (see FIG. 43), is equal to the vehicle tilt angle with respect to a local horizontal plane. And I use the letter φ to designate the azimuth angle of the vertical plane, containing the angle θ, with respect to a vertical plane fixed to the engine.

The value $L_{P,MIN}$ of $L_P$ at which potential hot spots of the walls of refrigerant passages 505 remain just immersed in liquid refrigerant is a function of 0 which, in general, is in turn a function of φ or, in symbols $$L_{P,\,MIN}=L_{P,MIN}\,\{\theta(\phi)\} \tag{20}$$

Relation (20) is stored in the engine-cooling system's CCU. This CCU uses relation (20) to compute a current value $L_{PD}$ high enough for $L_P$ to stay above $L_{P,MIN}$, and then generates a signal $L'_P$ which controls CR pump 10 so that $L_P$ tends to $L_{PD}$.

This action will ensure the potential hot spots cited earlier remain immersed in liquid refrigerant at the expense of a degradation in cooling-system performance whenever the level of interface surface 123 rises sufficiently for separator 21 to be unable to deliver essentially dry refrigerant vapor to condenser 508.

Suitable tilt transducers include two inclinometers at right angles to each other in a plane, fixed to the engine, which is horizontal when the engine's cylinder axes are vertical. Typical examples of inclinometers are LVDT-type transducers. Inclinometers 548 and 549 (see FIG. 43K which is a perspective view of cylinder-head 503 shown in FIG. 43) generate signals $\theta'_1$ and $\theta'_2$, respectively, providing measures of their inclinations with respect to a local horizontal plane.

Figure 46D:
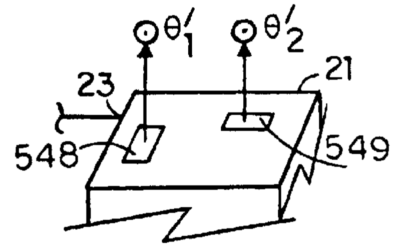

In cases where tilt in only one vertical plane is of interest only one inclinometer is used. The signal generated by it could, in some applications, only be a two-step, or at most a three-step signal.

iii. Cooling Systems with a Non-pool Evaporator and Shallow (Type 1) Separator Having Vapor Inlets Below Liquid Level The vehicle-tilt compensating techniques devised for cooling systems with an NP evaporator and with a shallow separator, and in particular with a shallow type 1 separator, having a set of one or more vapor inlets below interface surface 521, are similar to those devised for cooling systems having a P evaporator. Namely, the techniques devised to ensure the potential hot spots of the walls of a P evaporator remain immersed in liquid refrigerant during vehicle tilts are used to ensure the last-cited separator's set of vapor ports remains covered by liquid refrigerant during those tilts. The only essential difference is that signals $\theta'_1$ and $\theta'_2$ provide measures of the inclination, with respect to a local horizontal plane, of separator 21, and not of the inclination of a bank of cylinders which may, as in the case of a V engine, have a different inclination from another bank of cylinders of the same engine. FIG. 46D shows transducers 548 and 549 mounted oil separator 21.

g. Cabin-heating

Cabin heating, when desired, can be performed by using one or more refrigerant circuits which are an integral part of the refrigerant configuration used to cool an internal-combustion piston engine. This can be done in several ways which can be divided into two sets: ways which use single-phase heat-transfer and ways which use two-phase heat-transfer.

In the former case, the class $VIII_{FN}^{ooo}$ configuration shown in FIG. 43, the class $VIII_{FF}^{ooo}$ configuration shown in FIG. 43F, the class $II_{FN}^{ooo}$ principal configuration shown in FIG. 46, and the class $II_{FF}^{ooo}$ configuration shown in FIG. 46A or in FIG. 46B, become respectively class $XI_{FN}^{ooo}$, class $XI_{FF}^{ooo}$, class $V_{FN}^{ooo}$, and class $V_{FF}^{ooo}$, configurations with a non-interactive-type subcooler refrigerant auxiliary circuit, or more briefly an NI-type subcooler refrigerant auxiliary circuit. And, in the latter case, the refrigerant configurations shown in FIGS. 43, 43F, 46, 46A, and 46B, become split principal configurations with two branches sharing the same evaporator, but having different condensers.

In the cabin-heating refrigerant circuits described next, I shall use alphanumeric symbols to denote components and points. The numeral in these symbols, where already used in this DESCRIPTION, designates the same kind of component as, or the corresponding point to, respectively the component, or the point, already designated by that numeral in this DESCRIPTION; and the letter 'h' in those alphanumeric symbols signifies that those symbols designate a component or a point belonging either exclusively or primarily to a cabin-heating circuit.

Figure 43L:
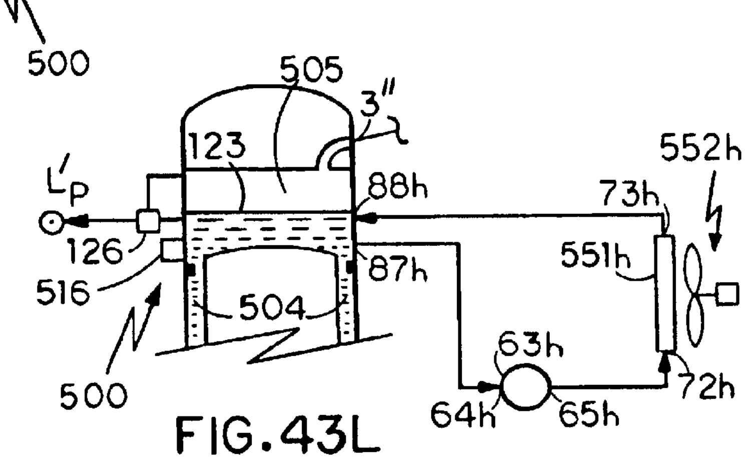

An example of a cabin-heating circuit employing an NI subcooler refrigerant auxiliary circuit is shown in FIG. 43L for the case where an engine-cooling system has a P evaporator. In this figure, liquid refrigerant exits cylinder-head refrigerant passages 505 at 87*h*, enters SC pump 63*h* at 64h and exits at 65*h*, enters cabin-heating air-cooled subcooler 551*h* at 72*h* and exits at 73*h*, and is returned to the refrigerant passages 505 at 88*h*. Because an NI subcooler auxiliary circuit is, by definition, a single-phase circuit, it can, together with associated subcooler fan 552*h*, be operated in any one of the known ways used with cabin-heating systems employing, as their heat-transfer fluid, the coolant of a piston-engine single-phase cooling system.

Figure 46E:
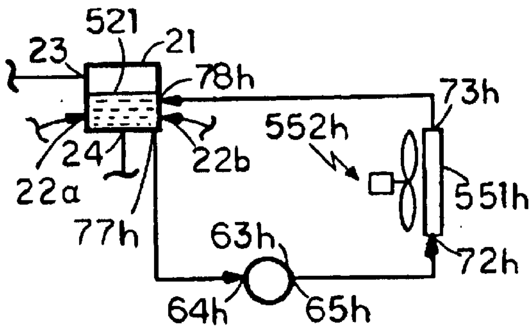

An example of a cabin-heating circuit employing an NI subcooler refrigerant auxiliary circuit is shown in FIG. 46E for the case where an engine-cooling system has an NP evaporator. The subcooler refrigerant auxiliary circuit is the same as that shown in FIG. 43L; except that point 771*h* at which liquid refrigerant enters the circuit, and point 78*h* at which liquid refrigerant exits the circuit, are points of separator 21 instead of points of refrigerant passages 505.

I note that the subcooler refrigerant auxiliary circuit shown in FIG. 46E could also have been added to separator 21 in FIG. 46A or in FIG. 46B.

Figure 46F:
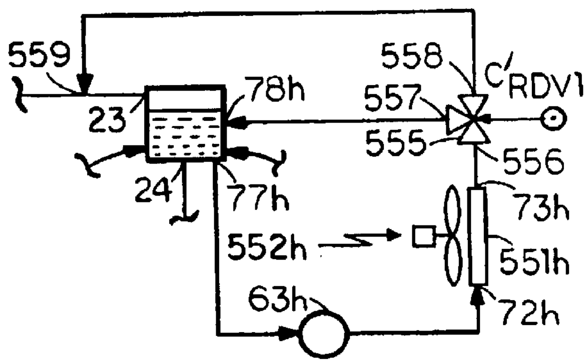

I also note that SC pump 63*h* can also be used to perform the function of a CO pump. To this end, outlet 73*h* of subcooler 551*h* is connected, whenever required, to a point of the refrigerant principal circuit between, as applicable, separator vapor outlet 23, separator vapor outlet 44, separating-assembly vapor outlet 23*, or separating-assembly vapor outlet 44*, on the one hand; and condenser refrigerant passages 399 on the other hand. FIG. 46F shows a way of doing this using the class $II_{FN}^{ooo}$ principal configuration shown in FIG. 46 as an example. In FIG. 46F, numeral 555 designates a (three-way) liquid-refrigerant diverter valve having an inlet 556, outlet 557, and outlet 558. Valve 555 is controlled by signal $C'_{RDV1}$, generated by the configuration's CCU (not shown) so that the valve supplies, as required, liquid refrigerant to outlet 557 or to outlet 558. Outlet 558 is connected to point 559 of refrigerant-vapor line 23-5 by liquid-refrigerant line 558-559.

Figure 43M:
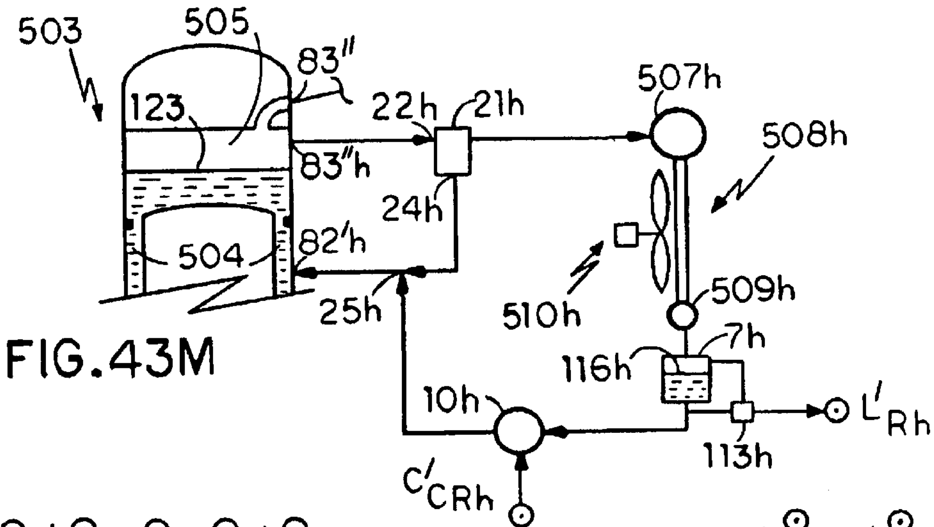

An example of one or more cabin-heating circuits which are a branch of a split principal configuration, with two parallel branches sharing the selfsame P evaporator, is shown in FIG. 43M. The cabin-heating branch of the split principal configuration shown in FIG. 43M can be thought of as belonging conceptually to a class $VIII_{FN}^{ooo}$ (principal) configuration which includes separator 21*h*, condenser 508*h*, and CR pump 10h. Because the cabin-heating branch of the split principal configuration has a type 1 separator, pump 10h can, while the cabin-heating branch is active, be controlled as a two-step, as well as a continuous, function of the level $L_{Rh}$ of liquid-vapor interface surface 116*h* in receiver 7*h*. In the former case, the engine-cooling system's CCU uses signal $L'_{Rh}$ supplied by liquid-level transducer 113*h* to generate a signal $C'_{CRh}$ which (a) starts pump 10*h* running whenever $L_{Rh}$ rises above a first preselected level $L_{Rh2}$ and keeps pump 10*h* running while $L_{Rh}$ stays at or above a second preselected level $L_{Rh1}$ lower than $L_{Rh2}$; and (b) stops pump 10*h* running whenever $L_{Rh}$ falls below $L_{Rh1}$ and keeps pump 10*h* not running while $L_{Rh}$ stays at or below $L_{Rh1}$.

And, in the latter case, CCU 513 generates a signal $C'_{CRh}$ which—in addition to the actions recited under (a) and (b) in this paragraph—

(c) changes, while pump 10*h* is running, the pump's effective capacity $F_{CRh}$ so that $F_{CRh}$ increases when $L_{Rh}$ increases and, conversely, so that $F_{CRh}$ decreases when $L_{Rh}$ decreases.

The cabin-heating heat-transfer circuit may be activated and deactivated manually or automatically by a thermostat which senses cabin temperature and is set to a desired preselected temperature.

Figure 46G:
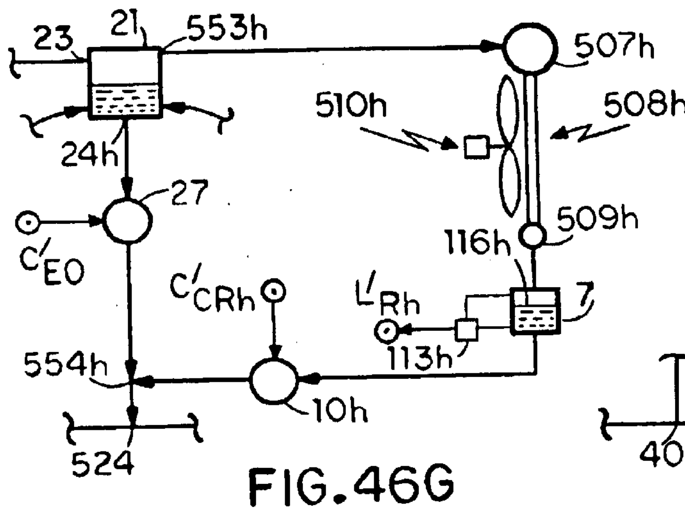
Figure 43N:
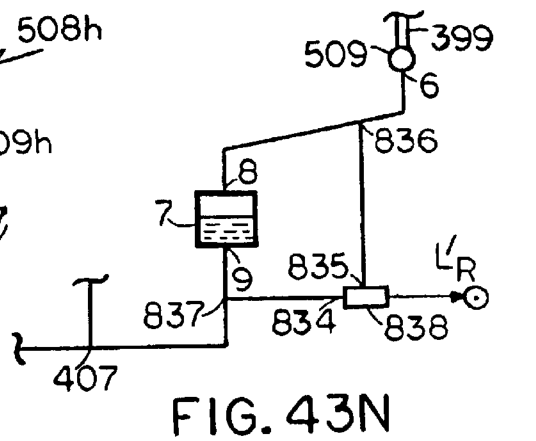

An example of one or more cabin-heating circuits, which are a branch of a split principal configuration with two parallel branches sharing the selfsame NP evaporator and the selfsame separator, is shown in FIG. 46G. The cabin-heating branch of the split principal configuration shown in FIG. 46G can be thought of as a class $I_F^{o}$ configuration. Because the refrigerant vapor supplied by separator 21 at 553*h* is essentially dry, CR pump 10*h* (in FIG. 46G) can be controlled effectively as a function of $L_R$ by a signal $C'_{CRh}$, supplied by the engine-cooling system's CCU. This CCU would then control pump 10*h* in the way described under (a), (b), and (c), in the immediately-preceding minor paragraph.

I note that a cabin-heating branch, using two-phase heat transfer, could use other refrigerant circuits; and, in particular, (1) refrigerant circuits with a constant-capacity DR pump, or (2) a natural refrigerant-circulation circuit, with a refrigerant valve, where interface surface 116*h* is above interface surface 521.

3. Intercooling Systems with an Air-cooled Condenser a. General Remarks

Certain internal-combustion piston engines use a supercharger, which may be either a mechanically-driven supercharger or a turbocharger. The efficiency and shaft power of such engines can be, and has been, increased by intercooling; namely by cooling the compressed air discharged by a supercharger before it is supplied to the engine's one or more combustion chambers.

Intercoolers of the present invention may, like prior-art intercoolers, be independent of (namely separate and distinct from) a piston-engine's cooling system, or be an integral part of a piston-engine's cooling system. Independent intercoolers are generally preferred because they can be used to lower the air delivered, by a piston-engine's supercharger to the engine's cylinders, below the temperature of the engine's coolant. However, intercoolers which are an integral part of a piston-engine's cooling system, in the sense that they share the system's condenser, are within the scope of the invention disclosed in this DESCRIPTION. Such intercoolers would be a branch of a split principal configuration with two branches sharing the radiator (condenser) of the engine being intercooled.

At this time (1991), an aqueous ethylene glycol solution is the generally preferred refrigerant for single-phase piston-engine cooling systems exposed to temperatures below zero degrees Celsius; and is one of the preferred refrigerants for two-phase piston-engine cooling systems exposed to such temperatures. By contrast, the generally preferred refrigerant for cooling compressed air discharged by the supercharger of a piston engine is often not an aqueous ethylene (or an aqueous propylene) glycol solution. The reason for this is that it is often desirable to cool the air discharged by such a supercharger down to at least 60° C. with a refrigerant that boils, at acceptable absolute pressures, down to at least 55° C. Minimum acceptable refrigerant absolute pressures for intercooling are considerably lower than those for piston-engine cooling primarily because of the absence of cylinder-head gaskets. Nevertheless, I expect the cost of an intercooler to start rising rapidly as the minimum pressure, to which the system's principal configuration is subjected, falls below about 0.5 bar. The temperature at which an aqueous 50% ethylene or propylene glycol solution starts to boil exceeds 70° C. at even 0.3 bar. Consequently, refrigerants with lower boiling points than those of aqueous ethylene and propylene glycol solutions may be preferable for independent intercoolers.

Suitable refrigerants in freezing climates for independent intercoolers with a minimum-pressure-maintenance capability include ethanol, methanol, acetone, and their aqueous solutions.

The purpose of an intercooler is to maintain the temperature $T_I^i$ of air exiting the intercooler and supplied to the engine's cylinders, at a preselected desired temperature $T_{ID}^i$; where $T_{ID}^i$ may have a fixed value or may have a value which varies in a pre-prescribed way as a function of one or more preselected parameters which include ambient air temperature, ambient air pressure, supercharger-output air temperature, supercharger-output air pressure, and parameters characterizing the state of the engine.

Where no minimum-pressure-maintenance and no refrigerant-controlled heat-release capabilities are required, several of the refrigerant-circuit configurations and control techniques disclosed in my co-pending U.S. patent application Ser. No. 400,738, filed 30 Aug. 1989, can be used for piston-engine intercoolers.

I would mention that, particularly where a non-azeotropic refrigerant is used, it is sometimes desirable to confirm that the intercooler's principal configuration is filled completely with liquid refrigerant. Several methods can be used to do this. A first of those several methods is to use a two-step liquid-level transducer at the highest point of the principal configuration, and to determine whether liquid refrigerant has reached that transducer, but this first method is impracticable for intercoolers subjected to substantial tilts. A second of those several methods, which is also applicable to intercoolers subjected to substantial tilts, is to use an absolute-pressure transducer to obtain a measure of refrigerant pressure, and a refrigerant-temperature transducer in the same neighborhood to obtain a measure of refrigerant (sensible) temperature; to compute the refrigerant saturated-vapor temperature corresponding to the measured refrigerant pressure; to compare the measured refrigerant sensible temperature and the computed refrigerant saturated-vapor temperature; and to use the fact that the latter temperature exceeds the former temperature by a preselected amount as confirmation that the principal configuration is completely filled with liquid refrigerant.

Preferred intercoolers of the invention usually have NP evaporators. I note that a substantial evaporator-overfeed ratio is not needed to prevent hot spots in the evaporator refrigerant passages of an intercooler; and is usually also not needed to prevent, in the case of a non-azeotropic refrigerant, a refrigerant saturated-vapor temperature rise in those passages. The reason for this is that such a temperature rise usually has no adverse effect comparable to that which would be caused by it if it occurred in a piston-engine's coolant passages. Consequently, preferred principal configurations for piston-engine intercoolers of the invention need not include means for overfeeding their evaporator. Therefore, in principle, any group I to III, VII to IX, II*, III*, VIII*, or IX*, configuration, usually with a refrigerant principal pump, and no preheater, superheater, or desuperheater, might be a preferred principal configuration.

b. A Fast-response Intercooler

I shall describe typical ways of operating an independent fast-response intercooler using (a) a type A combination employing, as an example (see FIG. 52), a class $II_{FN}^{ooo}$ principal configuration, a type $I_R$ ancillary configuration, and a non-azeotropic refrigerant; and (b) CCU 563 (see FIG. 53), and MPMCU 518 (see FIG. 45).

Figure 52:
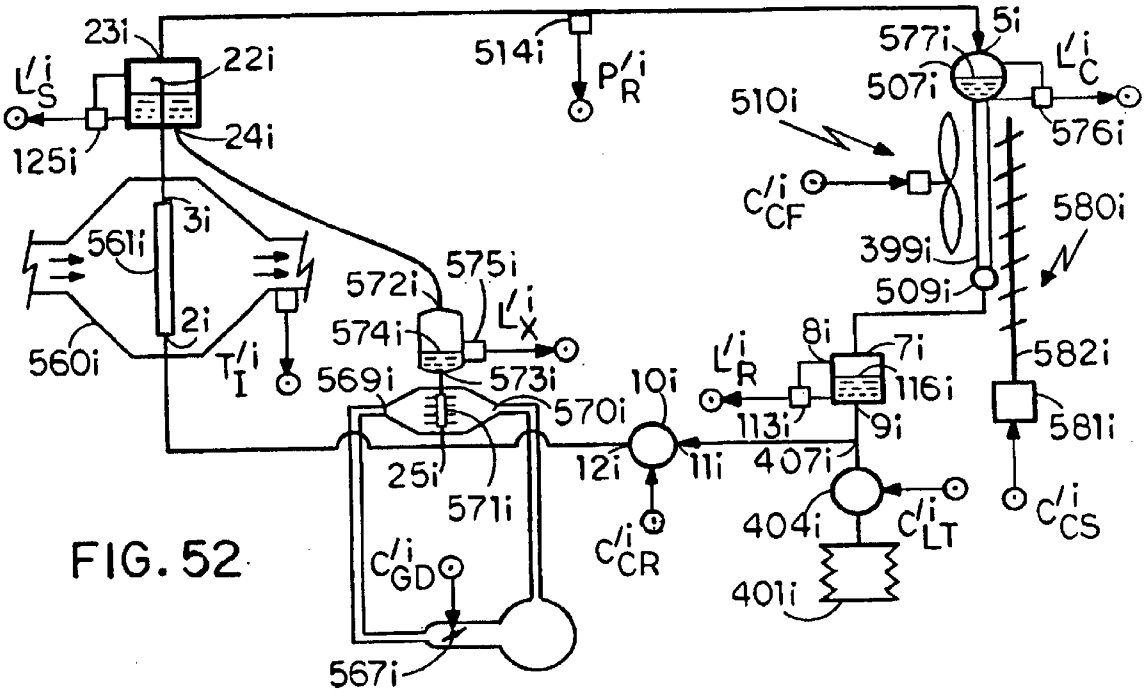

The numeral in the alphanumeric symbols used in FIG. 52 indicates the type of component, or the nature of the point, designated by those symbols, and the letter 'i' in those symbols indicates that the component or the point designated pertains to an intercooler. In particular, symbol **560*i* in FIG. 52 designates a section of a piston engine's air-intake conduit in which the intercooler's evaporator is located. That section is located downstream—with respect to the direction of air flow—from the engine's supercharger and upstream from the engine's air-intake manifold. Symbol 561*i* designates the intercooler's air-heated evaporator, and symbol 562*i* designates an air-intake temperature transducer which generates a signal $T'^i_I$ providing a measure of the temperature of the intake air after it has passed through evaporator 561*i*. Each numeral in FIG. 52, where it has been used earlier in this DESCRIPTION, designates the same component or the same point as that designated by the same numeral earlier. Thus, the numeral 2 in symbol 2*i* designates the refrigerant inlet of an NP evaporator and 508 in symbol 508*i* designates an air-cooled condenser. Similarly, each symbol representing a signal, or a quantity corresponding to that signal, designates the same signal or the same quantity as that designated by the same symbol where it has been used earlier in this DESCRIPTION without the superscript 'i'. The superscript 'i' in those symbols indicates that the signal, or the quantity, designated pertains to an intercooler. Thus, for example, the symbol $p'_R$ in the symbol $p'^i_R$ designates a signal generated by transducer 514*i*** providing a measure of the current value of the refrigerant pressure $p_R^i$ at a preselected location of an intercooler's principal configuration.

I note that the rise in the intake-air temperature entering an intercooler's evaporator can be very rapid just after the supercharger starts operating, and therefore that the intercooler—if it were completely filled with liquid refrigerant while the engine is running and the supercharger is not running—would often not be able to reach mode 3 fast enough to maintain $T_I^i$ at its preselected desired value $T_{ID}^i$ unless, as applicable, pump 404, motor 413, air-transfer pump 420, or hydraulic pump 422, is unacceptably large. Consequently, the invention includes, where desirable, means for preventing the refrigerant pressure of an intercooler using a type A (or incidentally also a type B) combination from falling below a preselected minimum value—while the engine is running and the supercharger is not running—without requiring the combination's principal configuration to be filled completely with liquid refrigerant. To this end, I use heat available in the engine's exhaust. (I could alternatively use an electric heating element. This, however, would consume a substantial amount of utilizable power whereas using exhaust-gas heat does not.)

Many piston engines have means for heating their intake air with their exhaust gases during cold weather. Instead of using the exhaust gases of a piston engine to heat its intake air directly, I use those gases to heat its intake air indirectly through the engine's intercooler by heating a refrigerant-circuit segment of its principal configuration. I can thus achieve minimum-pressure maintenance with a principal configuration only filled partially with liquid refrigerant while, at the same time, transferring heat to the engine's intake air through the intercooler's principal configuration.

FIG. 52 shows the particular case where the refrigerant-circuit segment healed by the engine's exhaust gases, which I shall refer to as the heated segment, is a segment of liquid-refrigerant auxiliary transfer means **24*i*–25*i*. In FIG. 52, exhaust gas from pipe 565 is drawn off at 566*i*, at a rate controlled by exhaust-gas damper 567*i*, and returned to pipe 565 at a point 568*i*, downstream from point 566*i*, after passing through segment 569*i*–570*i* containing heated segment 571*i***.

In FIG. 52, refrigerant-circuit segment **572*i*–573*i* is a segment of liquid-refrigerant auxiliary transfer means 24*i*–25*i* with a sufficiently large cross-sectional area for the level $L_X$ of refrigerant liquid-vapor interface surface 574*i* in that segment to be detectable by three-step liquid-level transducer 575***i*. Transducer 575*i* generates a signal $L'^i_X$ indicating whether $L_X^i$ is between two preselected fixed levels in segment 592*i*–573*i*. The preselected desired value $L_{XD}^i$ of $L_X^i$, is any value between those fixed levels. A proportional liquid-level transducer, can be used instead of a three-step liquid-level transducer.) The segment of transfer means 24*i*–25*i* between enlarged segment 572*i* and separator port 24*i* has a cross-sectional area sized for sewer flow.

In FIG. 52, numeral 576*i* designates a three-step liquid-level transducer indicating whether the level $L_C^i$ of refrigerant liquid-vapor interface surface 577*i* in condenser 508*i* is within two preselected fixed levels in condenser header 507*i*. The preselected desired value $L_{CD}^i$ of $L_C^i$ is any value between those two fixed levels. A proportional liquid-level transducer, can be used instead of a two-step liquid-level transducer.)

I now describe a first typical control technique for reducing the response time of the heat-transfer rate of an intercooler of the invention, immediately after the supercharger (with which the intercooler is associated) starts running, by utilizing heat from the engine's exhaust gases. To this end, while the engine is running and the supercharger is not running, I use heat from the engine's exhaust gases to allow minimum-pressure maintenance to be achieved with no liquid-refrigerant in refrigerant-vapor transfer-means segment 23*i*-5*i*, and with the value of $L_C^i$ equal to $L_{CD}^i$. This ensures the intercooler (1) can start releasing heat, without significant delay, when the supercharger starts running (provided the engine has been running for a few seconds, or at most for a few tens of seconds, before the supercharger starts running); and (2) can change to mode 3 much faster than it could if the refrigerant circuits of the intercooler's principal configuration were filled completely with liquid refrigerant.

Figure 53:
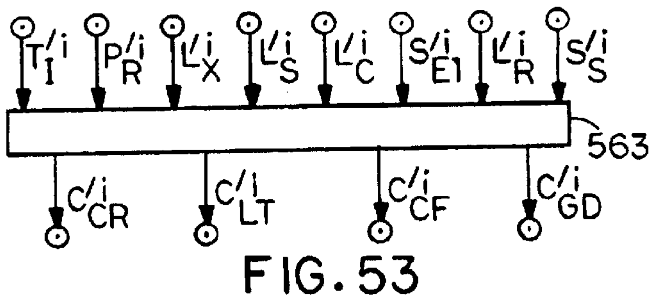
Figure 55:
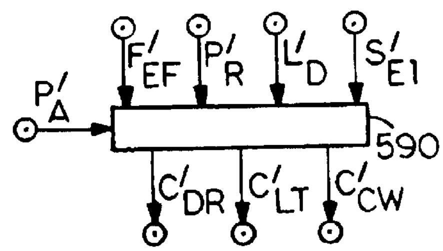

I shall, in this section V,F,3,b, refer (1) to the intercooler shown in FIGS. 52, 53, and 45, as 'the intercooler'; (2) to the supercharger discharging the compressed air cooled by the intercooler as 'the supercharger'; and (3) to the engine driving the supercharger as 'the engine'.

The intercooler has five control modes: control modes $\mathbf{0}_E$, $\mathbf{0}_S$, 1, 2, and 3. Control modes 1, 2, and 3, designate—as in the case of engine-cooling systems—respectively a mixing mode (used only with non-azeotropic refrigerants); an RC heat-release mode; and a combined self-regulation and EC heat-release mode, where the EC heat-release mode is a fan-controlled heat-release mode. Control mode $\mathbf{0}_E$ designates a minimum-pressure-maintenance mode during which the engine (with the intercooler) is not running, and corresponds to control mode 0 in the case of an engine-cooling system; and control mode $\mathbf{0}_S$ designates a combined minimum-pressure-maintenance mode during which the engine is running and the engine's supercharger is not running, and is a combined minimum-pressure-maintenance and fast-response-separation mode. CCU 563*i* (shown in FIG. 53) is energized only in modes $\mathbf{0}_S$, 1, 2, and 3.

The first typical control technique does not use intercooler shutter 580*i*; and thus has only four system-controllable elements: CR pump 10*i*, LT pump 404*i*, fan 510*i*, and damper 567*i*.

In mode $\mathbf{0}_E$, pump 10*i* and fan 510*i* do not run; damper 567*i* is in a preselected position (say closed, open, or half open); and MPMCU 564*i* controls pump 404*i* so that $p_R^i$ tends to $p_{RD}^{oi}$ where $p_{RD}^{oi}$ is a preselected value of $p_R^i$. (CCU 563*i* places damper 567*i* in that preselected position at the instant in time when it is de-energized.)

In mode $\mathbf{0}_S$, CCU 563*i* ensures (1) pump 10*i* is controlled so that the level $L_X^i$ tends to $L_{XD}^i$; (2) pump 404*i* is controlled so that a refrigerant liquid-vapor interface surface forms in header 507*i* and thereafter has a level which tends to $L_{CD}^i$ (while the intercooler is in mode $\mathbf{0}_S$); (3) fan 510*i* does not run; and (4) damper 567*i* is controlled so that $T_I^i$ tends to $T_{ID}^i$.

In mode 1 (used only with a non-azeotropic refrigerant), CCU 563*i* ensures (1) pump runs at a preselected capacity, usually near or equal to the pump's full capacity; (2) pump 404*i* is controlled so that $p_R^i$ tends to $p_{RD}^{oi}$, (3) fan 510*i* does not run; and (4) damper 567*i* is closed.

In mode 2, CCU 563*i* ensures (1) pump 10*i* is controlled so that $L_S^i$ tends to $L_{SD}^i$; (2) pump 404*i* is controlled so that $T_I^i$ tends to $T_{ID}^i$; (3) fan 510*i* does not run; and (4) damper 567*i* is closed.

In mode 3, CCU 563*i* ensures (1) pump 10*i* is controlled so that $L_S^i$ tends to $L_{SD}^i$; (2) pump 404*i* is controlled so that $L_R^i$ tends to $L_{RD}^i$; (3) fan 510*i* is controlled so that $p_R^i$ tends to $p_{RD}^{oi}$; and (4) damper 567*i* is closed.

The transition rules between the last-cited five modes are:

| | | |
|---|---|---|
| (a) | $0_E$ to $0_S$ | : engine starts running and supercharger does not start running |
| (b) | $0_E$ to 1 | : no transition |
| (c) | $0_E$ to 2 | : engine and supercharger start running |
| (d) | $0_E$ to 3 | : no transition |
| (e) | $0_S$ to 1 | : no transition |
| (f) | $0_S$ to 2 | : supercharger starts running (while engine is running) |
| (g) | $0_S$ to 3 | : no transition |
| (h) | 1 to 2, or to 3 | : no transition |
| (i) | 2 to 3 | : $L_R^i < L_{R,MAX}^i - \Delta L_{MAX}^i$ |
| (j) | $0_S$ to $0_E$ | : engine stops running (and supercharger stops running) |
| (k) | 1 to $0_E$ | : engine not running and clock stops running |
| (l) | 2 or 3, to $0_E$ | : no transition |
| (m) | 1 to $0_S$ | : no transition |
| (n) | 2 to $0_S$ | : supercharger stops running while engine is running |
| (o) | 3 to $0_S$ | : no transition |
| (p) | 3 to 1, or to 2 | : no transition |
| (q) | 3 to 2 | : $T_I^i < T_{IO}^i - \Delta T_I^i$, where $\Delta T_I^i > 0$ |

In transition rules (a), (c), and (f), small delays between the event specified and the corresponding transition may be desirable and can be preselected. For example, a small delay may be desirable in transition rule (a) between the time the engine starts and the cited transition occurs to allow the exhaust gases, after a cold start, to be hot enough to ensure the refrigerant pressure does not momentarily fall below its minimum-permissible value.

I note that while the intercooler is in mode 2, the refrigerant pressure might, in very cold climates and under certain operating conditions, fall below its minimum-permissible value. If such an occurrence is possible, an additional control mode can be added during which damper 567*i* is partially opened to allow exhaust gases to supplement heat supplied by the intake air entering evaporator 561*i*, and thereby ensure the refrigerant's pressure does not fall below its minimum-permissible value.

I now describe a second typical control technique for reducing the response time of the intercooler. The second typical control technique allows the intercooler to achieve, after a given small time interval (say a few seconds) after the supercharger starts running, a much larger heat-transfer rate than that achievable with the first typical control technique after the same time interval. To this end, I use the engine's exhaust gases to allow the refrigerant liquid-vapor interface surface, upstream from CR pump 10*i*, to be located in receiver 7, instead of in condenser header 507*i*, while the intercooler is in mode 05. Whenever required, or whenever desirable, the invention (see for example FIG. 52) includes the use of controllable condenser-shutter **580*i*, driven by shutter-control motor 581*i*, through control arm 582*i*, to regulate the rate at which ram air flows past condenser refrigerant passages 399*i* and, whenever required, to ensure that rate is essentially zero. Motor 581*i* is controlled by signal $C'^{i}_{CS}$ supplied by the intercooler's CCU (not shown). Shutter 580*i* is required whenever the intercooler's heat-transfer rate, while the engine is running and the supercharger is not running, is too high for the current value of $T_I^i$ to stay close to $T_{ID}^i$. And shutter 580*i* may be desirable, even if heat from the engine's exhaust gases is sufficient to keep $T_I^i$ close to $T_{ID}^i$, to reduce the size of heated segment 571*i*, or to allow pump 10*i***, as applicable, to run at a lower speed or to cycle on-and-off at a lower rate.

To implement the intercooler second typical control technique, I need only (a) to add, in each of the control modes $\mathbf{0}_E$, 1, 2, and 3, recited in the immediately-preceding major paragraph, the rule for controlling shutter **580*i*; namely in modes $\mathbf{0}_E$ and 1 the shutter is in a preselected position (closed, open, or half-open), and in modes 2 and 3 the shutter is open; and (b) to change mode $\mathbf{0}_S$ to mode $\mathbf{0}'_S$ in which CCU 563 ensures (1) pump 10*i* is controlled as in mode $\mathbf{0}_S$; (2) pump 404*i* is controlled so that $L_R$ tends to $L_{RD}$; (3) fan 510*i* does not run; (4) damper 567*i* is controlled in the same way as in mode $\mathbf{0}_S$; and (5) shutter 580*i*** is closed.

The CCU for implementing the second typical control technique differs in essence from CCU 563 only in that it also generates a signal $C'^{i}_{CS}$ for controlling shutter motor **581*i*; and the MPMCU for implementing that technique is the same as MPMCU 518**.

4. Cooling Systems with a Water-cooled Condenser a. General Remarks

A first principal difference, in piston-engine cooling applications, between type A combinations having a water-cooled condenser and type A combinations having an air-cooled condenser is that (a) the rate at which the former combinations release heat can, where required, be controlled by changing the flow rate of the water used to cool their condenser; whereas the rate at which the latter combinations release heat obviously cannot be thus controlled since their condenser is cooled by air and not by water; and that (b) 'water-controlled heat release', which is a particular form of EC heat release, is usually sufficient to control the rate at which heat is released by a water-cooled condenser.

It follows that, for piston-engine cooling applications, preferred embodiments of type A combinations with a water-cooled condenser usually employ, instead of control mode 2, a control mode I shall refer to as control mode $2_0$, whose primary purpose is to ensure $p_R$ does not fall below PR,MN between the time the engine starts running and the time the system is in mode 3. The modifier 'usually' has been employed to allow for the special case where it may be desirable to use RC heat release instead of, or in addition to, water-controlled heat release. RC heat release may be desirable, or even required, in the particular case where it is not practicable to achieve a negligible minimum heat-release rate by, for example, (1) removing the cooling water from the cooling-system's condenser; (2) stopping the condenser's cooling-water circulation pump in the case of active EC heat release; or (3) stopping the cooling water flowing through the condenser with a valve, in the case of passive EC heat release.

A second principal difference, in piston-engine cooling applications, between type A combinations with a water-cooled condenser and type A combinations with an air-cooled condenser is that the former combinations are often installed in a building or on a ship and that consequently their refrigerant is usually never exposed to water-freezing temperatures, whereas the refrigerant of the latter combinations is in most applications exposed, at some time, to such temperatures. It follows that, for piston-engine cooling installations, the preferred refrigerant for type A combinations with a water-cooled condenser is often water (with, where required, passivation and anti-corrosion additives). Exceptions include installations in motor boats with no permanent heated engine room.

Because of the facts mentioned in the two immediately-preceding minor paragraphs. I shall limit my discussion of type A combinations with a water-cooled condenser to combinations having no freeze-protection capability (even where their refrigerant is water) and no RC heat-release capability.

b. Refrigerant Configuration and Control System

Figure 54:
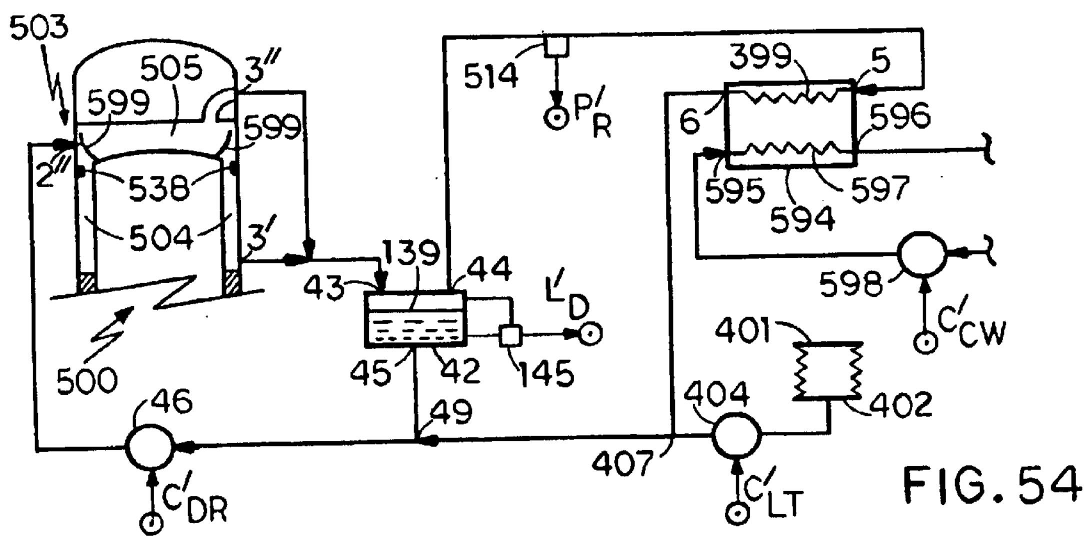

FIG. 54 shows a refrigerant configuration which may be a preferred configuration in the case where piston engine 500 is an in-line engine with a vertical bank of cylinders installed on a platform subjected to at most small tilts. The refrigerant configuration shown in FIG. 54 employs water as its refrigerant; and has in essence a class $\mathrm{III}_{FN}^{ooo}$ configuration with liquid-refrigerant inlet 2" in refrigerant passages 505, and with refrigerant-vapor outlets 3" and 3' in refrigerant passages 505 and 504, respectively. The techniques which can be used for implementing control mode 1 in the case where the refrigerant is a non-azeotropic fluid should be obvious in view of the earlier teachings in this DESCRIPTION.

Liquid refrigerant entering at 2" is supplied to refrigerant passages 505 inside one or more spaces bounded by one or more weirs 599. In the particular case where inlet 2", consists of a number of ports equal to the number of cylinders of engine 500 in FIG. 54, weirs 599 may divide the space bounded by them into a number of spaces equal to the number of cylinders. The purpose of weirs 599 is to ensure the high heat-flux zones of refrigerant passages 505 remain immersed in liquid refrigerant while the rate at which liquid refrigerant flows through inlet 2" is higher than the rate at which liquid, within the space bounded by weirs 599, evaporates. (Liquid refrigerant spilling over weirs 599, and not evaporated in refrigerant passages 505, enters refrigerant passages 504 through ports 538, and is evaporated in passages 504 whenever the current refrigerant-side temperatures of the walls of passages 504 are higher than the saturated-vapor temperature of the refrigerant in passages 504.) The rate at which liquid refrigerant is supplied at inlet 2" is chosen high enough to ensure that refrigerant vapor exiting at outlets 3" and 3' is wet.

I said in the first minor paragraph of this section V,F,4,b that the refrigerant configuration shown in FIG. 54 has "in essence a class $\mathrm{III}_{FN}^{oo}$ configuration". I used the qualifier "in essence" in the phrase within quotation marks to allow for the fact that, although the evaporator formed by the coolant passages of the piston engine shown in FIG. 54 is primarily an NP evaporator, weirs 599 provide that evaporator with a liquid-vapor interface surface in a part of refrigerant passages 505.

The refrigerant configuration shown in FIG. 54 has a water-cooled condenser 594 having refrigerant inlet 5, refrigerant outlet 6, cooling-water inlet 595, cooling-water outlet 596, refrigerant passages 399, and cooling-water passages 597. The flow-rate of cooling water through passages 597 is controlled by cold-water (or cooling-water)

pump 598, or more briefly by CW pump 598, which is supplied with cooling water from a source of water (not shown). Cooling water exiting condenser 594 at 596 is disposed of at an acceptable location. An example, in the case of a piston-engine cooling system in a ship, of a suitable source of water is sea water (after, where required, it has been treated) and a suitable location for disposing water exiling condenser 594 is the sea.

c. Unsafe and Safe States

I shall say that the system to which the refrigerant configuration shown in FIG. 54 belongs is in an unsafe state when either of relations (3) and (4) is true, and that that system is in a safe state when relations (7) and (8) are true.

d. Typical Operating Method

I now outline a typical method of operating a system having the refrigerant configuration shown it) FIG. 54. I shall hereafter, in this section V,F,4,d, refer to the system having the last-cited refrigerant configuration as 'the system'.

The system-controllable elements of the system are DR pump 46, LT pump 404, and 'cold-water pump' 598. (Pump 598 is a particular kind of cold-fluid pump.) The system has three control modes: modes 0, $\mathbf{2}_0$, and 3, where—as in sections V,F,2 and V,F,3—mode 0 is a minimum-pressure-maintenance mode while the engine is not running; where mode $\mathbf{2}_0$ is in essence a minimum-pressure-maintenance mode while the engine is running; and where mode 3 is a combined self-regulation and EC heat-release mode. The particular EC heat-release technique employed uses CW pump 598. The system includes CCU 590 shown in FIG. 55 and MPMCU 518 shown in FIG. 45.

In mode 0, pump 46 and pump 598 do not run and MPMCU 518 ensures pump 404 is control led so that $p_R$ tends to $p_{RD}{}^o$.

In mode $\mathbf{2}_0$, CCU 590 ensures (1) pump 46 is controlled in a pre-prescribed way as a function of the engine's fuel mass-flow rate $\dot{m}_F$, or almost equivalently as a function of the engine's fuel volumetric-flow rate $F_F$; (2) pump 404 is controlled so that $p_R$ tends to $p_{RD}{}^o$; and (3) pump 598 does not run. (The sensor providing a measure of the fuel-flow rate is not shown.)

In mode 3, CCU 590 ensures (1) pump 46 is controlled in a pre-prescribed way as a function of the current value of the engine fuel-flow rate $F_F$; (2) pump 404 is controlled so that the level $L_D$ of liquid-vapor interface surface 139, as indicated by signal $L'_D$ generated by liquid-level transducer 145, tends to a preselected, usually fixed, value $L_{DD}$; and (3) pump 598 is controlled so that $p_R$ tends to $p_{RD}$.

The transition rules between modes 0, $\mathbf{2}_0$, and 3, are:

| | | | | | |
|---|---|---|---|---|---|
| (a) | 0 to $2_0$ | : eng. starts running | (d) | $2_O$ to 0 | : eng. stops running |
| (b) | 0 to 3 | : no transition | (e) | 3 to 0 | : no transition |
| (c) | $2_0$ to 3 | : $p_R > p_{RD}{}^O + \Delta p_{R1}$ | (f) | 3 to $2_O$ | : $p_R < p_{RD}{}^O + \Delta p_{R2}$ |

In the foregoing transition $\Delta p_{R1}$ and $\Delta p_{R2}$ are small positive quantities, and $\Delta p_{R1}$ is larger than $\Delta p_{R2}$.

Refrigerant-pump control as a function of fuel-flow rate is discussed in section V,H.

e. Other Refrigerant Configurations and Control Systems

Any of the other refrigerant configurations and control systems described or mentioned in section V,F,2 can also be used with piston engines cooled by a system of the invention using a type A combination and a water-cooled condenser. The preferred refrigerant configuration and control system depends on the details of the particular application of interest.

5. Elimination of Minimum-pressure-maintenance Control Unit a. Preliminary Remarks In discussing minimum-pressure-maintenance with type A combinations having no MPMCU, I distinguish between combinations having (1) a type $I_R$, or a type $III_R$, configuration; and (2) a type $II_R$, a type $IV_R$, or a type $V_R$, configuration. Combinations having no MPMCU and a type $I_R$, or a type $III_R$ configuration often can, while their principal configuration is inactive, maintain the current value $(p_R-p_A)$ at a preselected value accurately over a wide range of environmental temperatures. By contrast, type A combinations having no MPMCU and a type $II_R$, a type $IV_H$, or a type $V_R$, configuration usually cannot do so.

In a system of the invention with a type A combination and no MPMCU, control mode 0 is eliminated and is replaced by a control mode $\mathbf{0}_0$ in which by definition none of the controllable elements of the type A combination, and in particular of its ancillary configuration, are controlled by the system.

I next give two examples of operating methods where an MPMCU is not employed, and where control mode 0 is replaced by control mode $\mathbf{0}_0$. The first example is a type A combination having a type $I_R$ configuration with a spring. The second example is a type A combination having a type $III_R$ configuration which can maintain the value of $(p_R-p_A)$ between a preselected upper limit and a preselected lower limit while the combination is inactive. (If the AT pump used allows air to flow through it at a sufficient rate while it is not running, a type $III_R$ configuration could be used to make the value of $(p_R-p_A)$ equal to zero while the combination is inactive.)

b. Example with a Type $I_R$ Ancillary Configuration

Figure 56:
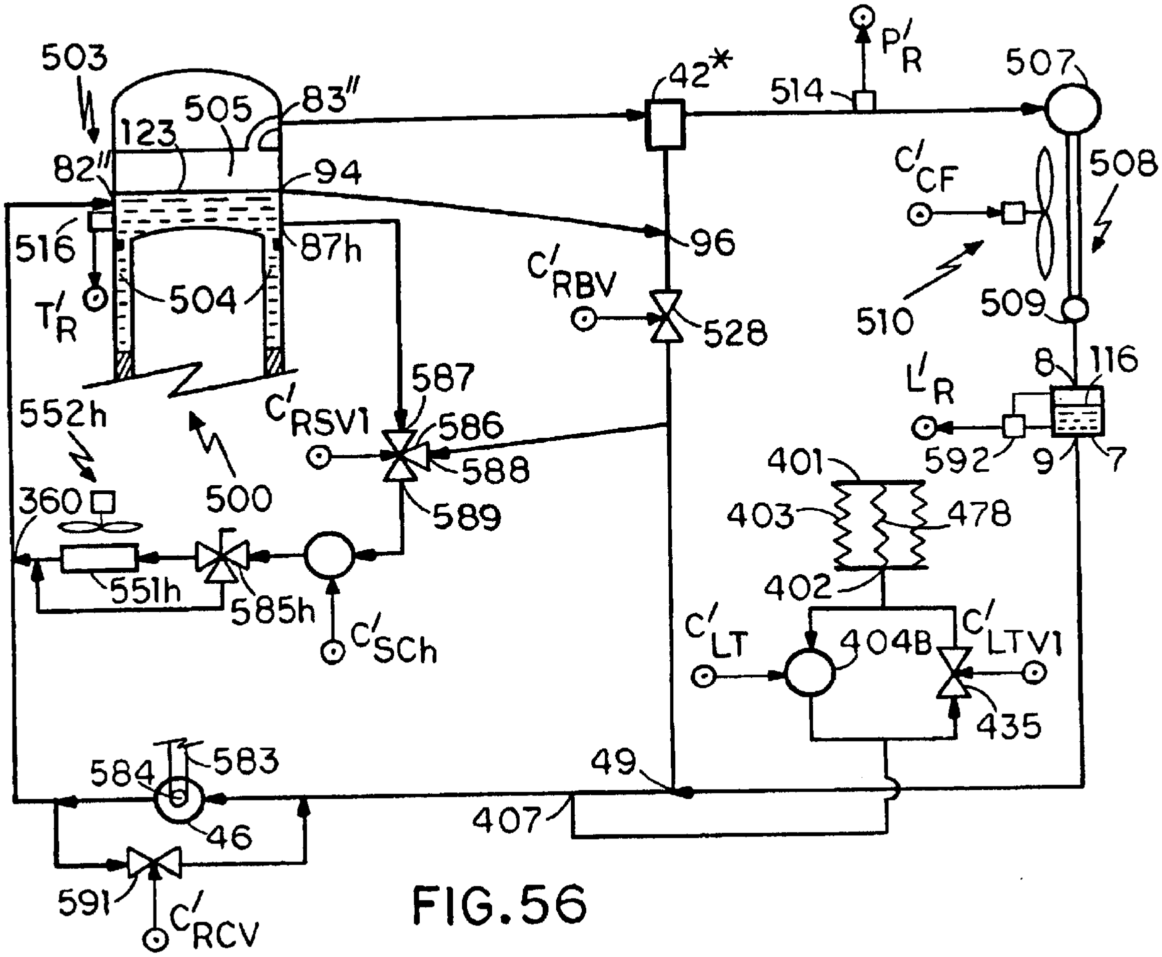

The principal configuration employed in the first example, see FIG. 56, is in essence the specialized principal configuration shown in FIG. 22 to which a subcooler refrigerant auxiliary circuit has been added. DR pump 46 is driven by engine 500 shown in FIG. 56, being cooled through belt 583 and pulley 584. The location of node 407 is suitable for an H-group refrigerant.

I assume, for specificity only, that, in mode $\mathbf{0}_0$, the minimum-permissible refrigerant pressure is the current ambient atmospheric pressure. I choose a spring (spring 478) which exerts a contracting force large enough to offset the expanding force exerted by corrugated cylindrical wall 403, and thus ensure the refrigerant pressure does not fall below ambient atmospheric pressure while the system's principal configuration is inactive. Clearly spring 478 can alternatively be chosen to exert a force which results in a preselected non-zero (positive or negative) current value of $(p_R-p_A)$ while the principal configuration is inactive.

The system having the refrigerant configuration shown in FIG. 56 has the following six control modes, namely modes $\mathbf{0}_{0A}$, $\mathbf{0}_{0B}$, $\mathbf{1}_A$, $\mathbf{1}_B$, 2, and 3.

Mode $\mathbf{0}_{0A}$ is a minimum-pressure-maintenance mode while engine 500 is not running, and corresponds to mode $\mathbf{0}_0$. And mode $\mathbf{0}_{0B}$ is a minimum-pressure-maintenance mode while engine 500 is running but cold, and the effective capacity of pump 46 is zero although the engine is running. The purpose of mode $\mathbf{0}_{0B}$ is to accelerate engine warm-up while $T_R$ is lower than $T_{R,MIN}$.

Mode $\mathbf{1}_A$ is used to achieve the same purpose as mode 1, namely to mix the components of a non-azeotropic refrigerant so that the concentrations of their liquid phases are approximately spatially uniform. And mode $\mathbf{1}_B$, which I name 'the dry-up-prevention mode', is used to continue cooling the engine, after it stops running; while $T_R$ is at or above $T_{R,MIN}$.

Modes 2 and 3 have the same purposes as those recited in section V,G,2,a,iii.

Three-step liquid-level transducer 592 generates a signal $L'_R$ indicating whether $L_R$ has risen above an upper limit $L_{R,MAX}$ or fallen below a lower limit $L_{R,MIN}$. (A proportional liquid-level transducer, or two two-level liquid-level transducers can be used instead of transducer 592.) Refrigerant-selector valve 585*h* and cabin-heating subcooler fan 552*h* are controlled manually by an operator or automatically by the cabin climate-control system. Cabin-heating SC pump 63*h* is controlled by the system's CCU only during modes $\mathbf{1}_A$ and $\mathbf{1}_B$; and then only in the sense that the system's CCU causes pump 63*h* to run while the system is in any one of those two modes it if is not running (because the cabin-heating system has been turned off). Refrigerant-selector valve 586 has an inlet 587, an inlet 588, and an outlet 589; and is in position 1 in modes $\mathbf{1}_A$ and $\mathbf{1}_B$, and in position 2 in all other modes, where position 1 causes liquid refrigerant to enter valve 586 through inlet 587 and where position 2 causes liquid refrigerant to enter valve 586 through inlet 588. Refrigerant-blocking valve 528 is closed only in mode $\mathbf{1}_A$ and bidirectional two-step (on-off) recirculation-control valve 591 is open only in mode $\mathbf{0}_{0B}$. (I note that valve 528, instead of being controlled by the system's CCU, could be a thermostatically-control led valve which closes when $T_R<T_{R,MIN}$, and which opens when $T_R>(T_{R,MIN}+\Delta T_R)$, where $\Delta T_R$ is a small positive quantity.) The system's CCU controls pump 63*h*, valve 586, valve 528, and valve 591, with signals $C'_{SCH}$, $C'_{RSV1}$, $C'_{RBV}$, and $C'_{RCV}$, respectively. The remaining system-controllable elements of the refrigerant configuration shown in FIG. 56 are condenser fan 510, LT pump 404*b*, and LT valve 435, and are controlled as described next by signals $C'_{CF}$, $C'_{LT}$, and $C'_{LTV1}$, respectively.

In mode $\mathbf{0}_{0A}$, no system-controllable elements are controlled. In mode $\mathbf{0}_{0B}$, (1) pump 404B and valve 435 are controlled only in certain applications where this is desirable, so that $P_R$ tends to $p_{RD}^{\circ}$, and (2) fan 510 does not run. In mode $\mathbf{1}_A$, (1) pump 404B and valve 435 are controlled so that $p_R$ tends to $p_{RD}^{\circ}$, and (2) fan 510 does not run. In mode $\mathbf{1}_B$, (1) pump 404B and valve 435 are controlled so that $p_R$ tends to $p_{RD}^{\circ}$, and (2) fan 510 runs at a preselected effective capacity, namely usually at a preselected speed. In mode 2, (1) pump 404B and valve 435 are controlled so that $p_R$ tends to $p_{RD}$, and (2) fan 510 does not run. And in mode 3, pump 404B and valve 435 are controlled so that $L_R$ stays close to $L_{RD}$, and (2) fan 510 is controlled so that $p_R$ tends to $p_{RD}$.

| | | |
|---|---|---|
| (a) | $0_{OA}$ to $0_{OB}$ | : engine starts running |
| (b) | $0_{OA}$ to $1_A$, $1_B$, 2, or 3 | : no transition |
| (c) | $0_{OB}$ to $1_A$ or $1_B$ | : no transition |
| (d) | $0_{OB}$ to 2 | : $T_R \geqq T_{R,MIN}$ |
| (e) | $0_{OB}$ to 3 | : no transition |
| (f) | $1_A$ to $1_B$, 2, or 3 | : no transition |
| (g) | $1_B$ to 2 or 3 | : no transition |
| (h) | 2 to 3 | : $L_R < L_{R,MIN}$ |
| (i) | $0_{OB}$ to $0_{OA}$ | : engine stops running |
| (j) | $1_A$ to $0_{OA}$ | : engine not running and clock stops running |
| (k) | $1_B$, 2, or 3 to $0_{OA}$ | : no transition |
| (l) | $1_A$ to $0_{OB}$ | : engine starts running |
| (m) | $1_B$, 2 or 3 to $0_{OB}$ | : no transition |
| (n) | $1_B$ to $1_A$ | : $T_R < T_{R,MIN}$ |
| (o) | 2 or 3 to $1_A$ | : no transition |
| (p) | 2 to $1_B$ | : engine stops running |
| (q) | 3 to $1_B$ | : no transition |
| (r) | 3 to 2 | : $p_R < p_{RD} - \Delta p_R$, where $\Delta p_R > 0$ |

Where an engine is a multicylinder engine installed on a platform which subjects it to substantial tilts in its longitudinal direction, the engine should usually have separate and distinct cylinder-head coolant passages for each cylinder. For example, an in-line engine with 4 cylinders should usually have four sets of separate and distinct cylinder-head coolant passages, four liquid-refrigerant inlet ports, four liquid-refrigerant outlet (overflow) ports, and four refrigerant-vapor outlet ports.

c. Example with a Type $III_R$ Ancillary Configuration

Figure 56A:
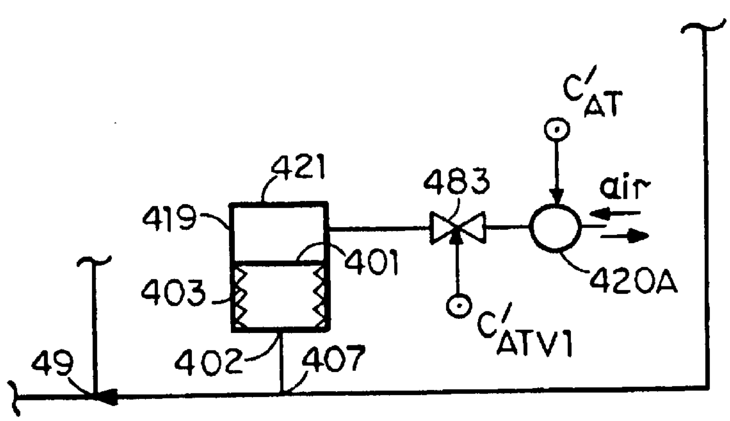

I use as an example the refrigerant configuration shown in FIG. 56A, and I assume, for specificity only that, in mode $\mathbf{0}_{0A}$ the minimum-permissible and maximum-permissible refrigerant pressures are 1.1 bar and 1.9 bar, respectively.

The type $III_R$ configuration used has a high-slip unidirectional air-transfer pump 420A and leakproof two-step bidirectional air valve 483 in series with it. Pump 420A, while not running, allows air to leak through it in the reverse direction at a high-enough rate for it (1) not to have to be bidirectional or (2) not to need a bidirectional valve in parallel with it to allow air to exit space 421 at a fast-enough rate to control $p_R$ in mode 2 and to control $L_R$ in mode 3. Valve 483 is leakproof in the sense that it does not allow air from space 421 to leak through it, while it is closed and pump 420A is not running, for pressures across it up to, say, one bar. The CCU of the refrigerant configuration shown in FIG. 56A, before deactivating itself and changing to mode $\mathbf{0}_0$, controls pump 420A with signal $C'_{AT}$ so that $p_R$ tends to 1.5 bar and, when $p_R$ reaches that value, stops pumps 420A running, closes valve 483 with signal $C'_{ATV1}$, and deactivates itself. This should, at least in temperate quasi-arctic climates, ensure $p_R$ stays between 1.1 and 1.9 bar when the configuration shown in FIG. 56A is in mode $\mathbf{0}_{0A}$ and stays at the same altitude.

An alternative refrigerant configuration to that shown in FIG. 56A would have a spring located in space 421 instead of valve 483. If a spring were located in space 421, it could be used, like spring 478 in FIG. 56, to offset the force exerted by corrugated cylindrical wall 403. Where the value of $p_R$ is allowed to fall below $p_A$ by an amount corresponding to the force exerted by wall 403, no spring need be used to offset that force. This last statement is of course also true in the case of the refrigerant configuration shown in FIG. 56. Clearly, a spring located in space 421 in FIG. 56A can alternatively be chosen so that the current value of $(p_R-p_A)$ has a preselected (positive or negative) non-zero current value while the principal configuration shown in FIG. 56A is inactive.

d. Other Ancillary Configurations

The inert gas in the $L_R$ reservoir of a type A combination having a type $IV_R$, or a type $V_R$, ancillary configuration has essentially a constant volume in mode $\mathbf{0}_0$. Consequently the pressure of that inert gas will, in that mode, change its value as a function of ambient temperature $T_A$; and therefore so will the current value of $p_R$. Also, the value of the pressure of the inert gas in the LR reservoir is essentially unaffected by changes in ambient atmospheric pressure $p_A$. It follows that, in applications where substantial changes in $T_A$ and/or in $p_A$ occur, the resulting changes in the current value of $(p_R-p_A)$ may be unacceptable. In such applications an MPMCU would have to be used with type A combinations having a type $IV_R$, or a type $V_R$, ancillary configuration.

I note that the invention includes modified type $I_R$, $II_R$, and $III_R$, ancillary configurations which—although they have a variable-volume reservoir—contain an inert gas (like ancillary configurations with a fixed volume).

G. Type C Combinations for Piston-engine Cooling and Intercooling Systems

1. Preliminary Remarks

I discuss in this section V,G applications where the properties complete minimum-pressure maintenance and self regulation are required, and where gas-controlled heat release, or more briefly GC heat release, is usually also required.

In sections V,G,2 and V,G,3 I describe type C combinations, and their associated control techniques, for the case where the combinations' condenser is an air-cooled condenser. And, in section V,G,4 I describe type C combinations, and their associated control techniques, for the case where the combinations' condenser is a water-cooled condenser.

Because all the type A combinations discussed in this section V,G have no partial minimum-pressure maintenance, I shall refer for brevity, in this section V,G, to complete minimum-pressure maintenance simply as 'minimum-pressure maintenance'. This property, as mentioned in section III,D, is achieved in type C combinations by inserting an inert gas in their principal configuration.

2. Cooling Systems with an Air-cooled Condenser a. Cooling Systems with a Pool Evaporator i. First Refrigerant & Inert-gas Configuration, Control System, and Operating Method FIGS. 57 to 59 show a system used to cool piston engine 500, hereinafter referred to respectively as 'the system' and 'the engine' in this section V,G,2,a. The refrigerant & inert-gas configuration, or more briefly the R&IG configuration, shown in FIG. 57 has a class $XI_{FF}^{ooo}$ principal configuration and a type $IV_G$ configuration having a fixed-volume IG reservoir designated by numeral 453, a GT pump designated by numeral 443, and a condensate-type refrigerant-vapor trap designated by numeral 446. (Although I have shown a two-port IG configuration, I do not intend to imply that a two-port IG configuration must be used.)

The R&IG configuration shown in FIG. 57 is charged with an appropriate amount of refrigerant mass $M_R$ and an appropriate mass of inert gas $M_G$. (The term 'inert gas' includes air {see definition 72.}) I denote the current amount of inert-gas mass stored in an IG reservoir by the symbol $M_{GR}$; and the maximum amount of inert-gas mass that can be stored in an IG reservoir by the symbol $M_{GR,MAX}$, where $M_{GR,MAX}$ is approximately equal to $M_G$. And I also denote the current value of the internal volume of a variable-volume IG reservoir, or the fixed volume of an IG reservoir, by $V_{GR}$; and the maximum internal volume of a variable-volume IG reservoir by $V_{GR,MAX}$. I further denote the current total pressure in an IG reservoir by $p^*_{GR}$, and the design maximum operating pressure in an IG reservoir by $p^*_{GR,MAX}$.

The control system includes CCU 600 and MPMCU 601 shown respectively in FIGS. 58 and 59. CCU 600, on the basis of signals from transducers, and of preselected instructions stored in CCU 600, generates signals used to control CR pump 10, EO pump 27, GT pump 443, condenser fan 510, SC pump 63*h*, and refrigerant liquid-diverter valve 555 having an inlet 556 and outlets 557 and 558. And MPMCU 601, on the basis of signals from transducers and preselected instructions stored in MPMCU 601, generates signals used to control CR pump 10 and GT pump 443 when they are not being controlled by CCU 600. EO pump 27 is used primarily because separator 21 is below the level of surface 123.

Proportional absolute-pressure transducer 603 performs a different function from that performed by absolute-pressure transducer 514 in type A combinations; and it is for this reason that I have designated the former transducer by a different numeral from that used to designate the latter transducer. More specifically, transducer 603 generates a signal $p^{*\prime}_R$ which provides, at a preselected location in the principal configuration of an R&IG configuration, (1) a measure of the total pressure $p^*_R$ in the principal configuration, which is in general the current value of the sum of the partial refrigerant pressure and the partial inert-gas pressure; and which is in particular (2) a measure of the current value of the refrigerant pressure $p_R$ in the absence of inert gas or a measure of the current value of the inert-gas pressure $p_G$ in the absence of refrigerant.

Proportional absolute-pressure transducer 605 generates a signal $p^{*\prime}_{GR}$ providing a measure of the current value of the total pressure $p^*_{GR}$ in reservoir 453, and proportional gas-temperature transducer 606 generates a signal $T'_{GR}$ providing a measure of the current value of the inert-gas temperature $T_{GR}$ in reservoir 453.

The terms 'unsafe state' and 'safe state', in the case of engine-cooling systems using type C combinations, have the same meanings as those given in section V,F,2,ii. However, the set of conditions indicating whether an engine-cooling system using a type C combination is in an unsafe state, or in a safe state, are different, Namely, I shall say that the last-cited system is in an unsafe state, while the engine is running and hot, when one of the following four relations is true:

$$L_P<L_{P,SAFE};\ L_R<L_{R,SAFE};\ p^*_R>p^*_{R,SAFE};\ \text{and } T_R>T_{R,SAFE}; \quad (1), (2), (3^*), (4)$$

and I shall say that the last-cited system is in a safe state, while the engine is running and hot, if all of the following four relations are true:

$$L_P\geqq L_{P,SAFE};\ L_R\geqq L_{R,SAFE};\ p^*_R\leqq p^*_{R,SAFE};\ \text{and } T_R\leqq T_{R,SAFE}. \quad (5), (6), (7^*), (8)$$

An engine is, by definition, hot when the current value of $T_R$ exceeds $T_{R,MIN}$, as defined earlier.

I now outline a typical method of operating the system shown in FIGS. 57 to 59. I shall hereinafter, in this section V,G,2,a,i, refer to the system shown in FIGS. 57 to 59 as 'the system'.

I start at an instant in time when the engine being cooled by the system is not running and is started, say, by an operator manually. When the engine is started, CCU 600 and all its associated transducers and controllable elements are energized, if they are not already energized.

CCU 600, as soon as it is energized, and subsequently at frequent preselected periodic time intervals while it remains energized, performs a system safety check to determine whether the system is in a safe state. If it is not, an audible and/or visual warning signal is generated to indicate that the system is in an unsafe state, and the engine, after being stopped by the operator, is inhibited from being started. If the unsafe state has occurred because $p_R$ or $T_R$, or both, have exceeded their safe values, CCU 600 runs fan 510 at its maximum capacity until their safe values are no longer exceeded, and then de-energizes itself automatically. MPMCU 601, which is always energized while the system is in a safe state, remains energized and controls LT pump 404 in the same way as in control mode 0*. (See next major paragraph.) If the system has become unsafe because of an insufficient refrigerant charge, MPMCU 601 will de-energize itself automatically. (The refrigerant charge is insufficient when relation (1) or (2) is satisfied.)

I shall describe the operation of systems of the invention with a type C combination, while they are in their safe state, in terms of control modes and transition rules. In FIG. 57, the system-controllable elements are CR pump 10, EO pump 27, GT pump 443, air-condenser fan 510, liquid-refrigerant diverter valve 555, and SC pump 63*h*, controlled respectively by signals $C'_{CR}$, $C'_{EO}$, $C'_{GT}$, $C'_{CF}$, $C'_{RDV1}$, and $C'_{SCH}$. The last-cited six controllable elements are, as a set, controlled differently in control modes 0*, 1*, 2*, and 3*, which roughly correspond respectively to control modes 0, 1, 2, and 3, used with type A combinations. Namely, mode 0* is a minimum-pressure-maintenance mode, mode 1* is a mixing mode (used only with a non-azeotropic refrigerant), mode 2* is a gas-controlled heat-release mode, and mode 3* is a combined self-regulation and EC heat-release mode. However, minimum-pressure maintenance in mode 0* is achieved by using an inert gas instead of liquid refrigerant; mixing refrigerant components in mode 1* is achieved by circulating liquid refrigerant around a refrigerant auxiliary circuit, and not around the refrigerant principal circuit; and heat-release control in mode 2* is achieved by using inert gas instead of liquid refrigerant, and by achieving self regulation, and mode 2* is consequently in fact a combined self-regulation and gas-controlled heat-release mode. Mode 3*, like mode 3, is used to achieve self regulation and, whenever required, also to achieve EC heat release. CCU 600 controls (cabin-heating) SC pump 63*h* only when the system is in mode 1*. At all other times, pump 63*h* is controlled by the engine operator or automatically by the cabin-heating system.

In mode 0*, pump 27 and fan 510 do not run, and diverter valve 555 is in position 1, namely by definition valve 555 is in a position which causes liquid refrigerant entering at inlet 556 to exit at outlet 557; and MPMCU 601 controls pump 10 so that $L_P$ tends to $L_{PD}$, and controls pump 443 so that $p^*_R$ tends to $p^*_{RD}{}^o$, where $p^*_{RD}{}^o$ is the preselected desired current value for $p^*_R$ while the system is in mode 0*.

In mode 1*, CCU 600 ensures (1) pump 10 is controlled so that $L_P$ tends to $L_{PD}$; (2) pump 27 is controlled so that $L_S$ tends to $L_{SD}$; (3) pump 443 is controlled so that $p^*_R$ tends to $p^*_{RD}$, where $p^*_{RD}$ is a preselected desired current value for $p^*_R$ while the system is in modes 1* to 3*; (4) fan 510 does not run; and (5) valve 555 is in position 2, namely by definition valve 555 is in a position which causes liquid refrigerant entering at inlet 556 to exit at outlet 558; and (6) pump 63*h* runs at or near its maximum capacity.

In mode 2*, CCU 600 ensures (1) pump 10 is controlled so that $L_P$ tends to $L_{PD}$; (2) pump 27 is controlled so that $L_S$ tends to $L_{SD}$; (3) pump 443 is controlled so that $p^*_R$ tends to $p^*_{RD}$; (4) fan 510 does not run; and (5) valve 555 is in position 1.

In mode 3*, CCU 600 ensures (1) pump 10 is controlled so that $L_P$ tends to $L_{PD}$; (2) pump 27 is controlled so that $L_P$ tends to $L_{PD}$; (3) pump 443 is control led so that $p^*_{GR}$ tends to $p^*_{GR,3}$, where $p^*_{GR.3}$ is a preselected value of $p^*_{GR}$ discussed in the immediately-following major paragraph; (4) fan 510 is controlled so that $p^*_R$ tends to $p^*_{RD}$; and (5) valve 555 is in position 1.

The transition rules between the last four modes are (where 'eng.' is an abbreviation for 'engine'):

| | |
|---|---|
| (a) 0* to 1*: no transition | (h) 2* to 0*: no transition |
| (b) 0* to 2*: eng. starts running and $T_R \geqq T_{R,MIN}$ | (i) 3* to 0*: no transition |
| (c) 0* to 3*: no transition | (j) 2* to 1*: $t_R < T_{R,MIN}$ |
| (d) 1* to 2*: eng. starts running | (k) 3* to 1*: no transition |
| (e) 1* to 3*: no transition | (l) 3* to 2*: $p^*_R < p^*_{RD} - \Delta p^*_{R2}$ |
| (f) 2* to 3*: $p^*_{GR} = p^*_{GR,3}$ and $p^*_R > p^*_{RD} + \Delta p^*_{R1}$ | |
| (g) 1* to 0*: eng. not running and clock stops running | |

In rule (f), $\Delta p^*_{R1}$ is a finite positive quantity; and, in rule (I), $\Delta p^*_{R2}$ is a finite positive quantity large enough for the value ($p^*_R - \Delta p^*_{R2}$) not to be larger than the value of $p^*_R$ at which CCU 600 stops fan 510 running while the system is in mode 3*. The clock mentioned in rule (g) is used in the way described in the third minor paragraph of the second major paragraph of section V,F,2,a,iii.

In general, the preselected value $p^*_{GR,3}$ may be a fixed value, or a value which changes in a pre-prescribed way as a function of $p^*_{GR}$ and $T_{GR}$.

In the former case, proportional absolute-pressure transducer 605 can be replaced by a two-step pressure transducer indicating whether $p^*_{GR}$ is close to $p^*_{GR,MAX}$, transducer 606 can be eliminated, and the value of $p^*_{GR,MAX}$ is typically chosen equal to the design maximum operating value $p^*_{GR,MAX}$ of $p^*_{GR}$.

In the latter case signal $T'_{GR}$, generated by transducer 606, is used to compute the value $p^*_{GR,3}$ of $p^*_{GR}$ at which the principal configuration contains essentially no inert gas at a preselected typical value of $T_R$ when the system is in mode 3*. Assuming reservoir 453 contains essentially only inert gas, the value of $p^*_{GR,3}$ can be computed, as a function of $T_{GR}$, by using van der Waal's equation. Where the values of $p^*_{GR,3}$ are low enough, the equation of state of a perfect gas can be used instead of van der Waal's equation. In either case, the preselected function for computing $p^*_{GR,3}$ is stored in CCU 600.

Where condensate-type refrigerant-vapor trap 446 is not used, or allows a significant amount of refrigerant vapor to enter and condense in reservoir 453, the preselected function for computing $p^*_{GR,3}$ can be chosen so that it takes into account the effect of the presence of liquid refrigerant in reservoir 453. To this end, the independent variables of the last-cited function would also include $p^*_{GR}$ and $L_{GR}$, where $L_{GR}$ is the current level of liquid refrigerant in reservoir 453. The current value of $L_{GR}$ can be obtained by using a proportional liquid-level transducer (not shown). I note that the value of $p^*_{GR}$, in addition to the value of $T_{GR}$, is needed to compute the solubility of the inert gas in the liquid refrigerant in reservoir 453 because that solubility affects the value of $p^*_{GR,3}$.

An alternative to using transition rule (f), in this section V,G,2,a,i, is to use the transition rule given next:

$$(f')\ 2^* \text{ to } 3^*: T^e_{RS} = T^{*e}_{RS} \text{ and } p^*_R > p^*_{RD} + \Delta p^*_{R1},$$

where $T^*_{RS}{}^\theta$ is a measure of the actual current value of the refrigerant's saturated-vapor temperature at a location near outlet 471 where inert gas exits the principal configuration, and where $T^*_{RS}{}^\theta$ is a measure of the saturated-vapor temperature the refrigerant would have H its pressure at outlet 471 were equal to the current value $p^*_R{}^\theta$ of the total pressure in the principal configuration near outlet 471. The value of $T_{RS}{}^\theta$ is lower than that of $T^*_{RS}{}^\theta$ when inert gas is present at outlet 471 and becomes equal to $T^*_{RS}{}^\theta$ when no inert gas is present at outlet 471. The current value of $T_{RS}{}^\theta$ can be obtained by locating proportional temperature transducer 616 at outlet 471, as shown in FIG. 57A, generating a signal $T_R{}^{\theta'}$. Alternatively, refrigerant-temperature transducer 516 may provide an adequate measure of $T_{RS}{}^\theta$. The current value of $T^*_{RS}{}^\theta$ can be obtained by locating proportional absolute-pressure transducer 617 at outlet 471, as shown in FIG. 57A, generating a signal $p^*_R{}^{\theta'}$. Transducer 617 need not necessarily be a second proportional absolute-pressure transducer. It could be merely transducer 603 relocated at outlet 471. Alternatively, transducer 603, as originally located—or relocated in refrigerant-vapor transfer-means segment 21-5—may provide an adequate measure of $p^*_R{}^\theta$. In the case of a non-azeotropic refrigerant, the value of $T^*_{RS}{}^\theta$ depends on the concentrations of its components. These concentrations can often be predicted as a function of $p*_{RS}^{\theta}$ for a given refrigerant when the concentrations of its components are known. For example, it is known that, near atmospheric pressure, the concentration of ethylene glycol having a mean spatial concentration of 50% in an aqueous solution, has a concentration of between 3% and 4% in the solution's vapor. And this allows $T*_{RS}^{\theta}$ to be computed by the system's CCU quite accurately when the current value of $p*_{R}^{\theta}$ is near one atmosphere.

ii. Comments on First Refrigerant & Inert-gas Circuit Configuration, Control System, and Operating Method Pump 443 would not need to run in mode 3* if no inert gas leaked through pump 443 toward the principal configuration while pump 443 is not running and $p*_{GR}$ is equal to $p*_{GR,MAX}$. The control-mode rule for pump 443 in mode 3* assumes pump 443 is not leakproof when $p*_{GR}$ is equal to $p*_{GR,MAX}$, and assumes pump 443 will have to run occasionally, or even continuously (at a very low flow rate), to maintain $p*_{GR}$ close to $p*_{GR,MAX}$ while the system shown in FIGS. 57 to 59 is in mode 3*.

CR pump 10 is controlled in mode 0* (namely while the engine is not running and cold) so that $L_P$ stays close to $L_{PD}$ to ensure liquid refrigerant covers the engine's high heat-flux zones by the time they need to be cooled. Controlling pump 10 in mode 0* would be unnecessary if (1) pump 10 were a zero-slip positive displacement pump (or had in series with it a unidirectional valve (see FIG. 43B) which is leakproof in its no-flow direction); or if (2) pump 10 had a large-enough capacity to cover the engine's high heat-flux zones by the time they need to be cooled.

GT pump 443 is controlled in mode 0* so that $p*_R$ stays close to $$p*_{RD}{}^{o}=p_A+\Delta *^{o}p, \qquad (9')$$

(where $\Delta *^{o}p$ is usually a fixed quantity) for the following two reasons: firstly, to compensate for inert-gas leaking through pump 443 while it is not running, and secondly to compensate for changes in ambient-air temperature and pressure. Controlling pump 443 would be unnecessary if (1) it were a zero-slip positive displacement pump (or had in series with it a unidirectional valve (see FIG. 39C) which is leakproof in its no-flow direction); and if (2) compensating for changes in ambient-air temperature, or in ambient-air pressure, were unnecessary. (The ambient-air pressure may change not only because of changes in atmospheric pressure at a given altitude, but also because of changes in altitude. Substantial changes in altitude may occur even while the engine is not running because, for example, the engine is installed in an automobile being shipped by air, or by train or other land-based vehicle over a mountain.)

Compensating for changes in ambient-air temperature is unnecessary if, when the engine; stops running, the value of $p*_R$ is chosen high enough for the current value of $p*_R$, at the design lowest ambient-air temperature, not to fall below the minimum permissible value for $p*_R$. And compensating for changes in ambient-air pressure is unnecessary if, at the design lowest ambient-air pressure, the system does not ingest air and is not damaged by crushing pressures.

Pump 63*h*, except during mode 1*, is not controlled by the system, but is controlled manually, or automatically, by a thermostat (located in the passenger cabin in the case of a passenger automobile). If control of pump 63*h* in mode 1* by CCU 600 is not acceptable, an additional refrigerant pump, or a refrigerant valve, and an associated refrigerant-circuit segment, would have to be added where the system employs a non-azeotropic refrigerant to achieve refrigerant-component mixing.

I note that for liquid refrigerant to circulate around refrigerant auxiliary circuit 87*h*-556-558-559-5-6-8-9-11-12-550' in mode 1*, point 560 must be higher than point 5. I also note that, where the R&IG configuration shown in FIG. 57 is installed with condenser 508 high enough with respect to the engine, for no liquid refrigerant to be contained in it in mode 0*, liquid refrigerant exiting valve 555 at 558 in mode 1* could be supplied to condenser liquid header 509, or perhaps even to receiver 7 instead of to point 559.

iii. Second Refrigerant & Inert-gas Configuration, Control System, and Operating Method The specialized principal configurations shown in FIGS. 21 to 23 may often be preferred in ground installations and perhaps in small vehicles subjected to small tilts. The last-cited principal configurations are preferably used with an engine-driven pump; and, in the case of ground installations where pressurized air is available, perhaps alternatively with an air-driven pump. I next describe a typical system of the invention, hereinafter referred to as 'the system' in this section V,G,2,b,iii, which has the principal configuration shown in FIG. 60, a CCU (not shown), and no MPMCU.

The system employs water as its refrigerant, and drives for example an electric generator, installed in a heated building; except for condenser 508, fan 510, air-transfer pump 420, IG variable-volume reservoir 441, and rigid closed cylinder 419' containing reservoir 441. Cylinder 419' is located preferably in the shade and may have a finned outer surface. (Fins may often not be necessary.) Cylinder 419' differs from cylinder 419 in FIG. 38 as follows. Firstly, space 421' communicates with the atmosphere through air-permeable device 608. Secondly, air-transfer pump 420 inserts air into, and extracts air from, cylindrical space 610 formed between the corrugated walls 403 of reservoir 441 and the cylindrical surface of cylinder 419'. And thirdly, the upper side 611 of reservoir 441 extends past walls 403 and is in sliding airtight contact with the cylindrical surface of cylinder 419'.

The system also includes (1) proportional absolute-pressure transducer 603; (2) two-step engine-wall temperature transducer 604 which generates a signal $T'_{W,MAX}$ indicating whether the current engine-wall temperature at a critical high heat-flux zone is close to its design maximum operating value; (3) IG reservoir contact switch 612 which generates a signal $V'_{GR,MAX}$ indicating whether the current value of internal volume $V_{GR}$ of reservoir 441 is at, or close to, its maximum value $V_{GR,MAX}$; (4) two-step liquid-level transducer 613 which generates a signal $L'_{RD}$ used to indicate whether the liquid refrigerant level, while the principal configuration is inactive, is close to a preselected level $L_0L'_0$; (5) spring 614 capable of exerting, whilst fully extended, a force corresponding to a pressure at least equal to the maximum value of $p*_R{}^{o}$; and (6) pressure-relief valve 615 set at a value high enough fully to compress spring 614. Transducer 604 may, for example, consist of one or more bimetallic temperature switches. In the case where several bimetallic switches are used, the number of bimetallic switches in multi-cylinder engines would be equal to, or a submultiple of, the number of cylinders. The purpose of receiver 7, which may not be needed, is (1) to keep the liquid refrigerant level substantially below the building's roof, while the system's principal configuration is inactive, and (2) to prevent liquid refrigerant backing-up into separating assembly 42*.

Figure 60:
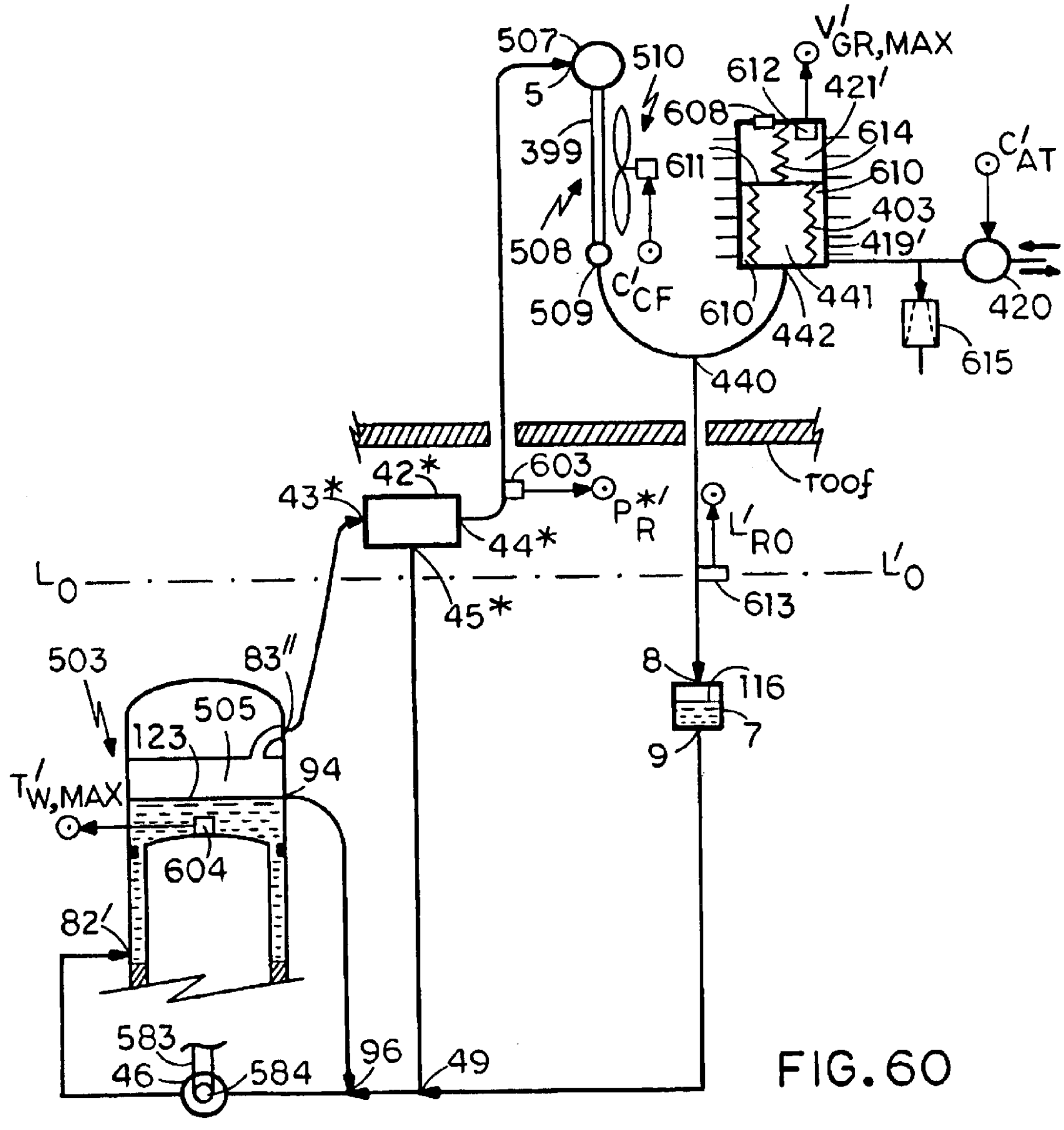

The system is charged with liquid refrigerant until transducer 613 indicates the level of liquid-refrigerant is close to $L_0L'_0$, where the level $L_0L'_0$ is chosen so that the amount of refrigerant mass $M_R$ in the R&IG configuration shown in FIG. 60 is sufficient to ensure—under all operating conditions—that the amount of liquid refrigerant in that configuration is sufficient for refrigerant liquid-vapor interface 123 in refrigerant passages 505 to reach the level of outlet 94; while, at the same time, the refrigerant liquid-vapor interface surfaces in refrigerant circuit segment 8-9-49 and in refrigerant line **45*-49 are at a level (1) high enough for pump 46 not to cavitate significantly, and (2) low enough for liquid refrigerant not to back-up into separating assembly 42*. I note that level $L_0L'_0$ need not be above point 8, but must be above point 94**. The system is also charged with an amount of inert gas mass $M_G$ sufficient for the value of $p^*_R{}^o$ not to fall below the current ambient atmospheric pressure over the entire range of expected ambient atmospheric pressures at the location where the building is installed, and over the entire range of expected temperatures in that building. While the R&IG configuration is being charged, spring 614 ensures $V_{GR}$ has its design minimum value. Typical acceptable relative elevations (not to scale) of points 94, 45, 8, and 9, are shown in FIG. 60.

The system has three control modes: modes 0*$_0$, 2*, and 3*, where mode 0*$_0$ is, by definition, a minimum-pressure-maintenance mode in which the system controls none of its controllable elements.

In mode 2*, the system's CCU ensures (1) pump 420 is controlled so that $p^*_R$ tends to $p^*_{RD}$; and (2) fan 510 does not run. And, in mode 3*, (1) pump 420 is controlled so that $V_{GR}$ stays close to $V_{GR,MAX}$; and (2) fan 510 is controlled so that $p^*_R$ tends to $p^*_{RD}$. The preselected desired value $p^*_{RD}$ for $p^*_R$ may be fixed, or may change in a pre-prescribed way as a function of one or more characterizing parameters. A typical characterizing parameter, when the engine cooled by the system drives an electric generator, is the mechanical load to which the generator subjects the engine.

The transition rules between modes 0*$_O$, 2*, and 3*, are

| | | |
|---|---|---|
| (a) | $0^*_O$ to $2^*$ | : engine starts running |
| (b) | $0^*_O$ to $3^*$ | : no transition |
| (c) | $2^*$ to $3^*$ | : $V_{GR} = V_{GR,MAX}$ and $T_W > T_{WD,MAX}$ |
| (d) | $2^*$ to $0^*_O$ | : engine stops running and $T_W < T_{WD}$ |
| (e) | $3^*$ to $0^*_O$ | : no transition |
| (f) | $3^*$ to $2^*$ | : $T_W \leqq T_{WD,MAX} - \Delta T_W$; |

where $T_{W0}$ is low enough to prevent liquid refrigerant being evaporated, and where $\Delta T_W$ is a small positive value.

I note that transducer 604 can be eliminated if transition rules (c), (d), and (f) are replaced respectively by transition rules

| | |
|---|---|
| (c') $2^*$ to $3^*$ | : $V_{GR} = V_{GR,MAX}$ and $p^*_R > p^*_{RD} + \Delta p^*_{R1}$ |
| (d') $2^*$ to $0^*_O$ | : $T_R < T_{R,MIN}$ |
| (f') $3^*$ to $2^*$ | : $p^*_R < p^*_{RD} - \Delta p^*_{R2}$ |

where $\Delta p^*_{R1}$, and $\Delta p^*_{R2}$ have fixed positive values, and where the value of $T_R$ is provided by a refrigerant temperature transducer which need only be a two-step transducer.

I also note that if points 45* and 8 are high enough above interface surface 123, pump 46 can be eliminated.

iv. Other Refrigerant & Inert-gas Configurations and Control Systems

It should be clear from the teachings so far in this DESCRIPTION, and from my pending U.S. patent application Ser. No. 400,738, filed 30 Aug. 1989, that the class $XI_{FF}{}^{ooo}$ principal configurations shown in FIGS. 57 and 60 are only two of many kinds of principal configurations with a pool evaporator and an air-cooled condenser which may be preferred for cooling a piston engine. Other kinds of preferred principal configurations, in the case of type C combinations, include class and $VIII_{NN}{}^{ooo}$, $VIII_{FN}{}^{ooo}$, $VIII_{FN}{}^{soo}$, $VIII_{FF}{}^{soo}$, $VIII_{FF}{}^{s'oo}$, $VIII_{FF}{}^{s''oo}$, $VIII^*_{FN}{}^{ooo}$, $VIII^*_{FN}{}^{soo}$, $IX_{FN}{}^{oo}$, $IX_{FN}{}^{so}$, $XI_{FF}{}^{so}$, $XI_{FF}{}^{s'o}$, $XI_{FF}{}^{s''oo}$, $XI^*_{FN}{}^{oo}$, and $XI^*_{FN}{}^{so}$, configurations. (In refrigerant configurations with a subcooler, the subcooler would be located upstream from pump 10, pump 46, or pump 27, as applicable.) Other kinds of preferred principal configurations also include the specialized principal configurations shown in FIGS. 21 and 23.

I would explain that principal configurations with a subcooler are desirable, or even necessary, in certain installations to increase—while the system is in mode 3*—the amount of subcool of liquid refrigerant exiting, as applicable, receiver 7, separator 21 or 42, or separating assembly 21* or 42*; and thus increase the net positive suction head available, as applicable, to pump 10, to pump 46, or to pump 27. The subcooler used may merely be a finned quasi-horizontal refrigerant-line segment located roughly in the same plane as refrigerant passages 399, and exposed to ram air and/or to the airflow induced by fan 510. An example of such a finned segment, in the case of a class $VIII_{FN}{}^{ooo}$ configuration, is segment 9-522 shown in FIG. 43E.

It should also be clear from the teachings so far in this DESCRIPTION that type $II_G$, $IV_G$, and $V_G$, IG configurations can also be used with type C combinations and may be preferred IG configurations in certain installations.

It should further be clear from the foregoing teachings that a shutter can be used upstream from a condenser of a type C combination, as well as upstream from a condenser of a type A combination, to control the rate at which the condenser releases heat. The shutter, if desirable, can be made of thermally-insulating material to accelerate engine warm-up in cold climates. How shutter-control led heat release can be accomplished with type C combinations should be clear in view of the earlier discussion in this DESCRIPTION of shutter-control led heat release with type A combinations.

b. Cooling Systems with a Non-pool Evaporator i. Preliminary Remarks

Type C combinations, in common with type A combinations, are suitable for a much wider range of piston-engine cooling applications when they have an NP evaporator instead of a P evaporator because they can be used with any cylinder orientation and impose much less stringent constraints on the tilts of the platform on which they are installed.

ii. Refrigerant & Inert-gas Configuration and Control System

Figure 61:
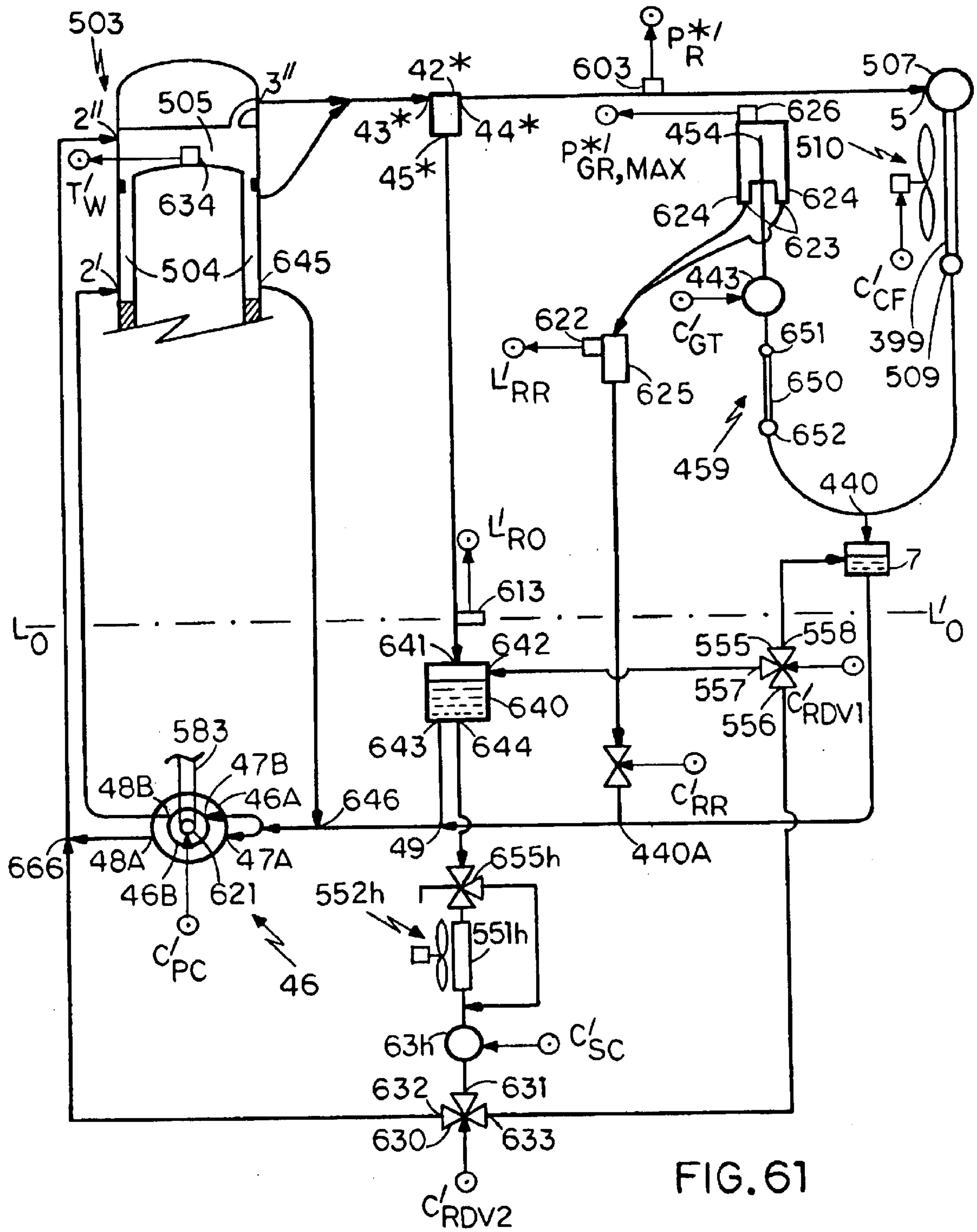

The first system chosen as an example has the class $III_{FN}{}^{oo}$ principal configuration and the type $IV_G$ ancillary configuration, shown in FIG. 61, and a CCU (not shown) but no MPMCU. I shall hereinafter, in sections V,G,2,b,ii to V,G,2,b,iv, refer to the cooling system having the R&IG configuration shown in FIG. 61 as 'the system', and to the engine cooled by it as 'the engine'. DR pump 46 includes component DR pumps 46A and 46B driven by a belt through common pulley-and-clutch 621, and through a common shaft (not shown) at right angles to the sheet on which FIG. 61 is drawn. Pump 46A has a refrigerant inlet 47A and a refrigerant outlet 48A; and pump 46B has a refrigerant inlet 47B and a refrigerant outlet 48B.

The system has the following transducers: (1) two-step liquid-level transducer 613; (2) two-step liquid-level transducer 622; (3) proportional absolute-pressure transducer 603; (4) proportional engine-wall temperature transducer 634; and (5) two-step absolute-pressure transducer 626. The signals generated by the foregoing five transducers are supplied to the system's CCU.

Signal $L'_{R0}$, generated by transducer 613, is used to indicate whether the system is charged with a correct amount of liquid refrigerant. (To this end, transducer 613 is located at level $L_0L'_0$, where $L_0L'_0$ is the correct liquid-refrigerant level while the system's principal configuration is inactive.) Signal $L'_{RR}$, generated by transducer 622, is used to indicate whether liquid refrigerant—draining out of fixed-volume IG reservoir 453 through one or more ports 623 at the bottom of the cylindrical part 624 of reservoir 453—has reached in vessel 625 a preselected release level $L_{RR}$ determined by the location of transducer 622. Signal $p^{*\prime}_{GR,MAX}$, generated by transducer 626, indicates $p^*_{GR}$ has reached its design maximum operating value $p^*_{GR,MAX}$. And signals $p^{*\prime}_R$ and $T'_W$, generated by transducers 603 and 634, respectively, are used by the system's CCU to generate signals $C'_{PC}$, $C'_{GT}$, $C'_{CF}$, $C'_{RDV1}$, $C'_{RDV2}$, $C'_{RR}$, and $C'_{SC}$, used to control respectively DR-pump clutch 621, GT pump 443, condenser fan 510, liquid-refrigerant diverter valve 555, liquid-refrigerant diverter valve 630 having an inlet 631 and outlets 632 and 633, liquid-refrigerant release (drain) valve 487, and SC pump 63*h*.

The class $XI^{*oooo}_{FN}$ principal configuration shown in FIG. 61 differs from the group XI* configurations mentioned in section V,B,8 in that it has (1) in addition to receiver 7, dual-return receiver 640, namely a receiver which is supplied with non-evaporated refrigerant as well as with liquid refrigerant generated by the condensation of evaporated refrigerant (in condenser 508); and in that it has (2) liquid-refrigerant drain line 645-646 which is used to ensure no liquid refrigerant accumulates, particularly during a cold start, in refrigerant passages 504 and 505. The particular dual-return receiver shown in FIG. 61 has a first liquid-refrigerant inlet 641, a second liquid-refrigerant inlet 642, a first liquid refrigerant outlet 643, and a second liquid-refrigerant outlet 644;

The type IV IG configuration shown in FIG. 61 has a condensate-type refrigerant-vapor trap consisting only of accessory condenser 459 having inert-gas passages 650 and headers 651 and 652. Residual refrigerant vapor exiting condenser 459 and accumulating in reservoir 453 is returned, as mentioned earlier, to principal-configuration point 440A (which could have been chosen to coincide with point 440).

The system's R&IG configuration is first charged with liquid refrigerant until transducer 613 generates signal $L'_{R0}$ indicating the refrigerant liquid level in refrigerant-vapor line 44-5 has reached level $L_0L'_0$; and is then charged with inert gas until the R&IG configuration's internal pressure $p^*_R$, reaches a preselected value $p^*_R{}^o$, where the preselected value $p^*_R{}^o$ may be different for different R&IG-configuration mean temperatures. Valve 477 is kept open by say a manual override, while the system's R&IG configuration is being charged with refrigerant and subsequently with inert gas.

iii. Unsafe and Safe States

I shall say that the system is in an unsafe state when relation (3') or (4) is satisfied, and that the system is in a safe state when relations (3') and (4) are satisfied.

iv. Typical Operating Method

The system, while in a safe state, has six control modes, namely modes $\mathbf{0}^*_{0A}$, $\mathbf{0}^*_{0B}$, $\mathbf{1}^*_A$, $\mathbf{1}^*_B$, 2*, and 3*.

Mode $\mathbf{0}^*_{0A}$ is a minimum-pressure-maintenance mode while the engine is not running and corresponds to control mode $\mathbf{0}^*_0$ in section V,G,2,a,iii. And mode $\mathbf{0}^*_{0B}$ is a minimum-pressure-maintenance mode while the engine is running but cold, and the effective capacity of pump 46 is zero although the engine is running. The purpose of mode $\mathbf{0}^*_{0B}$ is to accelerate engine warm-up, while $T_W$ is below a preselected value $T_{WD1}$ by supplying no liquid refrigerant to the engine's coolant passages while the value of $T_W$ is less than $T_{TWD1}$. $T_{WD1}$ is a preselected value of $T_W$ substantially lower than the maximum permissible value $T_{W,MAX}$ of $T_W$, and higher than the value $T_{RS}{}^o$, of the saturated-vapor temperature $T_{RS}$, corresponding to $p^*_{RD}{}^o$. ($T_{WD1}$ may, for example, be 120° C.).

Mode $\mathbf{1}^*_A$ is used to achieve the same purpose as control mode 1*, namely is used to mix the components of a non-azeotropic refrigerant so that the concentrations of their liquid phases are approximately spatially uniform. However, the particular R&IG configuration shown in FIG. 61 will achieve the last-cited purpose only in the case of a group H refrigerant. Mode $\mathbf{1}^*_B$, which I name 'the dry-up-prevention mode', is used to continue supplying liquid refrigerant to the system's evaporator, and thus to continue cooling the engine, while $T_W$ is at or above $T_{WD2}$, after the engine stops running. $T_{WD2}$ is usually less than the minimum value $T_{RS,MIN}$ of the refrigerant saturated-vapor temperature $T_{RS}$ at which the system is designed to operate and can often be chosen equal to $T_{WD1}$. And modes 2* and 3* have the same purposes as those recited in section V,G,2,a,iii.

Liquid-refrigerant diverter valve 655*h* and cabin-heating fan 552*h* are controlled manually or automatically by the cabin climate-control system. Valve 477 is operated in the same way in all modes where the system's CCU is energized, namely in all modes except mode $\mathbf{0}^*_{0A}$. And the clutch of pulley-and-clutch 621 is engaged in all control modes except mode $\mathbf{0}^*_{0B}$. The remaining system-controllable elements are controlled as described next.

In mode $\mathbf{0}^*_{0A}$, no system-controlleable elements are controlled.

In mode $\mathbf{0}^*_{0B}$, (1) pump 443 is controlled so that $p^*_R$ tends to $p^*_{RD}{}^o$; (2) fan 510 does not run; (3) valve 555 is in position 1, namely liquid refrigerant entering at 556 exits at 557; and (4) valve 630 is in position 1, namely liquid refrigerant entering at 631 exits at 633.

In mode $\mathbf{1}^*_A$, (1) pump 443 is controlled so that $p^*_R$ tends to $p^*_{RD}{}^o$; (2) fan 510 does not run; (3) valve 555 is in position 2, namely liquid refrigerant entering at 556 exits at 558; and (4) valve 630 is in position 1.

In mode $\mathbf{1}^*_B$ (1) pump 443 is controlled so that $p^*_R$ tends to $p^*_{RD}{}^o$; (2) fan 510 runs at a preselected effective capacity, or at a preselected speed; (3) valve 555 is in position 1; and (4) valve 630 is in position 2, namely liquid refrigerant entering at 631 exits at 632.

In mode 2*, (1) pump 443 is control led so that $T_W$ tends to $T_{WD}$; (2) fan 510 does not run; (3) valve 555 is in position 1; and (4) valve 630 is in position 2.

In mode 3*, pump 443 is controlled so that $p^*_{GR}$ stays close to $p^*_{GR,MAX}$; (2) fan 510 is controlled to that $T_W$ tends to $T_{WD}$; (3) valve 555 is in position 1; and (4) valve 630 is in position 2.

The transition rules between control modes are:

| | | |
|---|---|---|
| (a) | $0^*_{OA}$ to $0^*_{OB}$ | : engine starts running |
| (b) | $0^*_{OA}$ to $1^*_A$, $1^*_B$, $2^*$, or $3^*$ | : no transition |

-continued

| | | |
|---|---|---|
| (c) | $0^*_{OB}$ to $1^*_A$ or $1^*_B$ | : no transition |
| (d) | $0^*_{OB}$ to $2^*$ | : $T_W > T_{WD,1}$ |
| (e) | $0^*_{OB}$ to $3^*$ | : no transition |
| (f) | $1^*_A$ to $1^*_B$, $2^*$, or $3^*$ | : no transition |
| (g) | $1^*_B$ to $2^*$ or $3^*$ | : no transition |
| (h) | $2^*$ to $3^*$ | : $p^*_{GR} = p^*_{GR,MAX}$ and $T_W = T_{WD} + \Delta T_{W1}$ |
| (i) | $0^*_{OB}$ to $0^*_{OA}$ | : engine stops running |
| (j) | $1^*_A$ to $0^*_{OA}$ | : engine not running and clock stops running |
| (k) | $1^*_B$, $2^*$, or $3^*$ to $0^*_{OA}$ | : no transition |
| (l) | $1^*_A$ to $0^*_{OB}$ | : engine starts running |
| (m) | $1^*_B$, $2^*$ or $3^*$ to $0^*_{OB}$ | : no transition |
| (n) | $1^*_B$ to $1^*_A$ | : $T_W < T_{WD,2}$ |
| (o) | $2^*$ or $3^*$ to $1^*_A$ | : no transition |
| (p) | $2^*$ to $1^*_B$ | : engine stops running |
| (q) | $3^*$ to $1^*_B$ | : no transition |
| (r) | $3^*$ to $2^*$ | : $T_W < T_{WD} - \Delta T_{W2}$ |

In transitions (e) and (r), $\Delta T_{W1}$ and $\Delta T_{W2}$, respectively, are small positive values.

I note that the value of $T_{W1}$, and the current value of $T_W$ in modes 2* and 3*, must be high enough to ensure $p^*_R$ does not fall below its minimum-permissible value $p^*_{R,MIN}$ even during transients. If the last-cited constraint is not practicable, or is not desirable, the CCU, whenever $p^*_R$ falls below $(p^*_{R,MIN}+\epsilon_P)$ where $\epsilon_P$ is a small positive quantity, causes the control signal $C'_{GT}$ to control pump 443 so as to maintain (the value of) $p^*_R$ at or above $p^*_{R,MIN}$ until $p^*_R$ exceeds, say, $(p^*_{R,MIN}+2\ \epsilon_P)$. The action described in the immediately-preceding sentence amounts to using two new modes $\mathbf{2}^*_0$ and $\mathbf{3}^*_0$ with the following transition rules:

| | | |
|---|---|---|
| (s) | $2^*$ to $2^*_O$, or $3^*$ to $3^*_O$ | : $p^*_R < p^*_{R,MIN} - \epsilon_P$ |
| (t) | $2^*_O$ to $2^*$, or $3^*_O$ to $3^*$ | : $p^*_R > p^*_{R,MIN} + \epsilon_P$ |
| (u) | no transitions between $2^*_O$, or between $3^*_O$, and any other control mode. | |

(u) no transitions between $\mathbf{2}^*_0$, or between $\mathbf{3}^*_0$, and any other control mode.

Where condenser 510, receiver 7, and dual-return receiver 640, are mounted high enough above refrigerant passages 504 and 505 to ensure a,high-enough liquid-refrigerant flow-rate at 2' and 2" to prevent hot spots occurring without using pumps 46H and 46B, these pumps can, in principle, be eliminated. Whether or not the resulting R&IG configuration is a preferred configuration depends on the details of the application of interest. Examples of applications where it would be practicable to mount condenser 510, receiver 7, and dual-return receiver 640, above refrigerant passages 504 and 505 to achieve high-enough flow-rates at 2' and 2" include installations in certain trucks.

v. Other Refrigerant & Inert-gas Configurations and Control Systems

Depending on the application considered, other principal configurations which may be preferred include class $II_{FN}^{ooo}$, $II_{FN}^{soo}$, $II_{FF}^{ooo}$, $II_{FF}^{soo}$, $II_{FF}^{s'oo}$, $II_{FF}^{s"oo}$, $II^*_{FN}{}^{ooo}$, $II^*_{FN}{}^{soo}$, $III_{FN}^{so}$, $III_{FF}^{oo}$, $III_{FF}^{so}$, $III^*_{FN}{}^{oo}$, and $III^*_{FN}{}^{soo}$, configurations, and other preferred IG configurations include type $I_G$, $II_G$, and $V_G$, configurations.

3. Intercooling Systems with an Air-cooled Condenser a. General Remarks

The remarks made about piston-engine intercoolers in section V,F,3,a apply also to intercoolers whose airtight configurations are type C combinations with the exception of the remarks made in the third major paragraph of section V,F,3,a.

In the case where minimum-pressure maintenance, gas-controlled heat release, and a co fast-response capability are required, and where a non-azeotropic fluid is employed, the operation of an intercooler using a type C combination with an air-cooled condenser can be described in terms of control modes $o^*_E$, $\mathbf{0}^*_S$, 1*, 2*, and 3*, where control modes $\mathbf{0}^*_E$ and $\mathbf{0}^*_S$ correspond to control modes $\mathbf{0}_E$ and $\mathbf{0}_S$, respectively, of a fast-response intercooler having a class A combination.

b. A First Fast-response Intercooler

Figure 62:
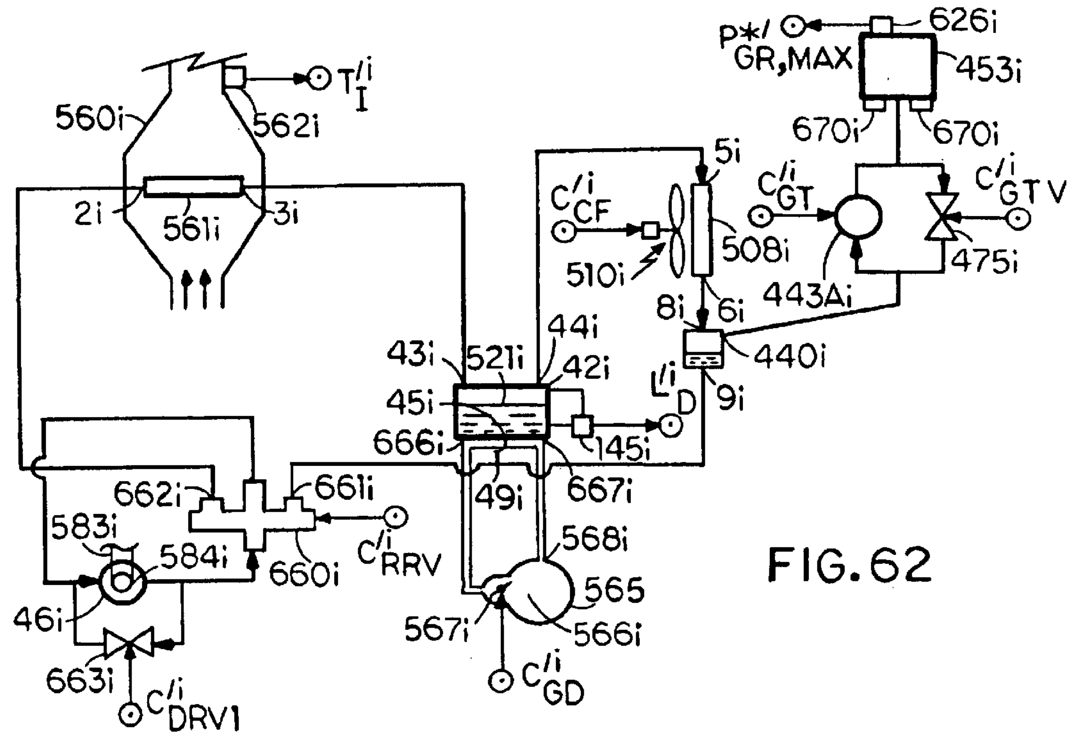

I describe in this section V,G,3,b the operation of an intercooler having, see FIG. 62, (1) a class $III_{FN}^{oo}$ principal configuration, (2) a type $IV_G$ IG configuration, (3) an azeotropic-like refrigerant, and (4) minimum-pressure-maintenance, gas-control led heat-release, and fast-response, capabilities.

I shall, in this section V,G,3,b, refer to the intercooling system comprising the R&IG configuration shown in FIG. 62, its associated CCU (not shown), and its MPMCU (not shown), as 'the intercooler'; to the supercharger (not shown) whose air discharge the intercooler is used to cool as 'the supercharger'; and to the piston engine (not shown) whose intake air the supercharger compresses as 'the engine'. And I shall—as in the case of intercoolers employing type A combinations—add the letter 'i' to a numeral already used to designate a component, a point, or a signal, of a piston-engine cooling system, to designate respectively the same kind of component, point, or signal, of an intercooler.

Four-way slide-type refrigerant-flow reversing valve **660*i*, having inlet-outlet ports 661*i* and 662*i*, is used to reverse the direction of the liquid-refrigerant flow rate induced, in refrigerant-circuit segment 49*i*-661*i*-662*i*-2*i*, by engine-driven DR pump 46*i*; and proportionally-controllable DR-pump recirculation valve 663*i* is used to control the effective capacity of pump 46*i* when liquid refrigerant flows from port 662*i* to port 661 i. Unidirectional GT pump 443**A*i*, and bidirectional (two-way) GT valve **475*i*, are used to control the transfer of inert gas (and associated refrigerant vapor) between the principal and the inert-gas configurations shown in FIG. 62, and are both designed to handle inert gas containing refrigerant vapor. IG reservoir 453*i* is in thermal contact with heat source 670*i* whose temperature is high enough to ensure the refrigerant in reservoir 453*i*** is only in its vapor phase while the engine is hot. This heat source could be the engine's cylinder block or cylinder head. It could also be a refrigerant passage, a separator, or a receiver of the engine's cooling system; or the oil of the engine's lubricating system.

The intercooler has four control modes designated by the symbols $\mathbf{0}^*_E$, $\mathbf{0}^*_S$, 2*, and 3*. In mode $\mathbf{0}^*_E$ the intercooler is in its minimum-pressure-maintenance mode while the engine is not running.

In mode $\mathbf{0}^*_S$ the intercooler is in its combined minimum-pressure-maintenance and fast-response-preparation mode. In mode $\mathbf{0}^*_S$, heat from the engine's exhaust gases is used, while the engine's supercharger is not running, to ensure the current value of $T_I^i$ stays close to a preselected desired value $T_{ID}^i$ above the air's ambient temperature. This, among other advantages, allows minimum-pressure maintenance to be achieved with less inert-gas mass in the intercooler's principal configuration than that which would be required to achieve minimum-pressure maintenance at ambient temperature. And this, in turn, allows the intercooler to reach, if required, its design maximum heat-transfer capacity (under prevailing conditions) faster after the engine's supercharger starts running. During mode $\mathbf{0}^*_S$ the engine's exhaust gases are circulated at a rate controlled by exhaust-gas damper **567*i*, around exhaust-gas circuit 566*i*-666*i*-667*i*-568*i*, where exhaust-gas inlet 566***i* is upstream from exhaust-gas return 568*i* with respect to the direction of flow of exhaust gas in pipe 565. Engine exhaust gas circulated in the last-cited circuit releases heat, while in exhaust-gas circuit segment 666*i*-667*i*, to liquid refrigerant in separator 42*i*. (Fins may be used in that segment to augment the heat-transfer rate to liquid refrigerant in separator 42*i*.) In mode $0^*_S$ separator 42*i* performs the function of a pool evaporator and evaporator 561*i* performs the function of a condenser.

In mode 2* the intercooler is in its combined gas-controlled heat-release and self-regulation mode. And, in mode 3*, the intercooler is in its combined fan-controlled heat-release and self-regulation mode.

Figure 62A:
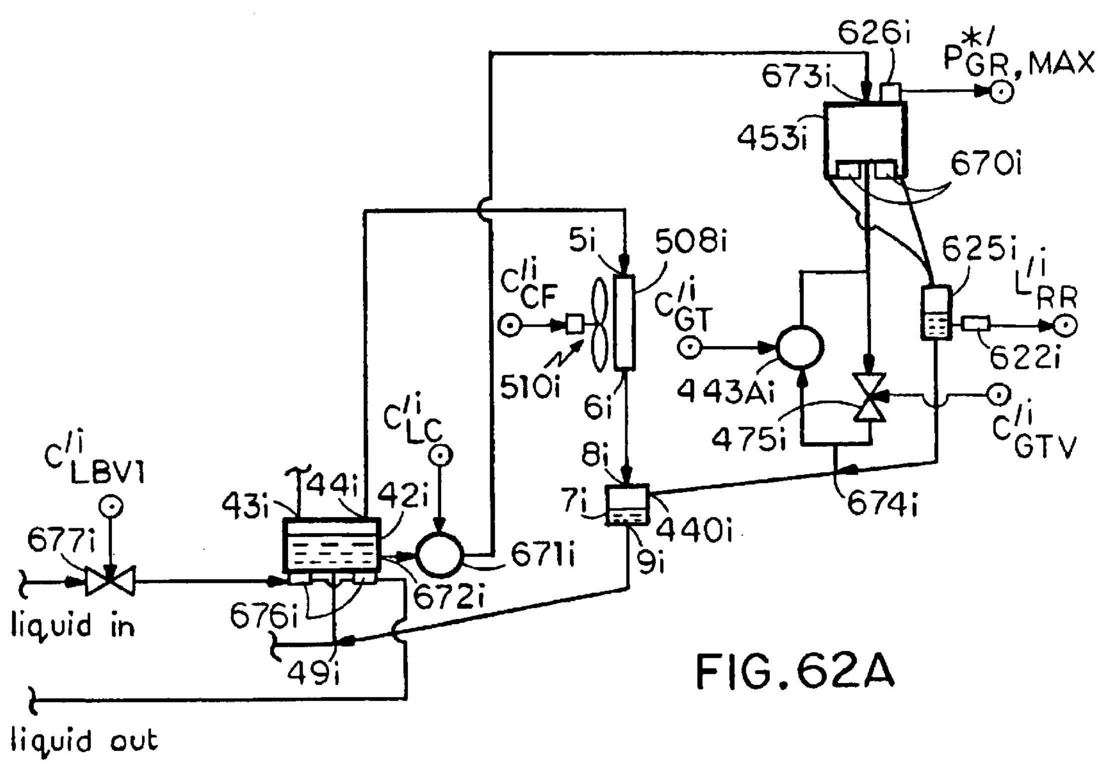

The system-controllable elements in FIG. 62are four-way slide-type refrigerant-flow reversing valve 660*i*, DR-pump proportional recirculation valve 663*i*, GT pump 443Ai, GT valve 475*i*, condenser fan 510*i*, and exhaust-gas damper 567*i*; and are controlled, by respectively signals $C'^{i}_{RRV}$. $C'^{i}_{DRV1}$, $C'^{i}_{GT}$, $C'^{i}_{GTV}$, $C'^{i}_{CF}$, and $C'^{i}_{GD}$, as follows:

In mode $0^*_E$, (1) valve 660*i* is in position 2, namely valve 660*i* would cause refrigerant to flow from port 662*i* to port 661*i* if DR pump were running and valve 663*i* were not wide open; (2) valve 663*i* is in a preselected position; (3) fan 510*i* does not run; (4) damper 567*i* is in a preselected position; and (5) pump 443Ai and valve 475*i* are controlled by the system's MPMCU so that $p^{*i}_R$ tends to $p^{*oi}_{RD}$.

In mode $0^*_S$, the system's CCU ensures (1) valve 660*i* is in position 2; (2) valve 663*i* is controlled so that $L^i_D$ tends to its desired level $L^i_{DD}$; (3) pump 443Ai and valve 475*i* are controlled so that $p^{*i}_R$ tends to $p^{*oi}_{RD}$; (4) fan 510*i* does not run; and (5) damper 567*i* is controlled so that $T^i_I$ tends to $T^i_{ID}$.

In mode 2*, the system's CCU ensures (1) valve 660*i* is in position 1, namely valve 660*i* causes refrigerant to flow from port 661*i* to port 662*i*; (2) valve 663*i* is closed; (3) pump 443Ai and valve 475*i* are controlled so that $T^i_I$ tends to $T^i_{ID}$; (4) fan 510*i* does not run; and (5) damper 567*i* is closed.

In mode 3*, the system's CCU ensures (1) valve 660*i* is in position 1; (2) valve 663*i* is closed; (3) pump 443Ai and valve 475*i* are controlled so that $p^{*i}_{GR}$ stays close to $p^{*i}_{GR,MAX}$; (4) fan 510*i* is controlled so that $T^i_I$ tends to $T^i_{ID}$; and (5) damper 567*i* is closed.

The transition rules between the last-cited five control modes are:

| | | |
|---|---|---|
| (a) | $0^*_E$ to $0^*_S$ | : engine starts running and supercharger does not start running |
| (b) | $0^*_E$ to $2^*$ | : engine and supercharger start running |
| (c) | $0^*_E$ to $3^*$ | : no transition |
| (d) | $0^*_S$ to $2^*$ | : supercharger starts running (while engine is running) |
| (e) | $0^*_S$ to $3^*$ | : no transition |
| (f) | $2^*$ to $3^*$ | : $p_{GR}^{*i} = p_{GR,MAX}^{*i}$ and $T_I^i > T_{ID}^i + \Delta T_{I1}^i$, where $\Delta T_I^i > 0$ |
| (g) | $0^*_S$, $2^*$ or $3^*$ to $0^*_E$ | : no transition |
| (h) | $2^*$ to $0^*_S$ | : supercharger stops running |
| (i) | $3^*$ to $0^*_S$ | : no transition |
| (j) | $3^*$ to $2^*$ | : $T_I^i < T_{ID}^i - \Delta T_{I2}^i$, where $\Delta T_{I2}^i > 0$ |

I note that where mode 1* is required because the refrigerant employed is a group H refrigerant, merely adding means for circulating the refrigerant in a way similar to the way shown in FIG. 61 would often not be sufficient. The reason for this is that in FIG. 61, condensate-type refrigerant-vapor trap 446 is assumed to prevent most of the refrigerant vapor entering reservoir 453; and that anyhow, should condensed refrigerant-vapor accumulate in reservoir 453, it is drained out of reservoir 453 through valve 477. Neither of those means are provided in FIG. 62. Consequently, in the case of a group H refrigerant, refrigerant vapor will freeze in the IG configuration. To prevent either of the last-cited two events occurring, means must be provided for circulating refrigerant through the IG configuration. An example of a circuit for doing this is shown in FIG. 62A where in mode 1* (1) intercooler liquid-circulating (LC) pump 671*i* is used to circulate liquid refrigerant around circuit 672*i*-673*i*-674*i*-440*i*-9*i*-49*i*-672*i*; where (2) valve 475*i* is controlled by the liquid level in vessel 625; and where (3) pump 443Ai, used to offset the loss of inert gas in reservoir 453*i* through valve 475*i*, is controlled so that $p^{*i}_R$ tends to $p^{*oi}_{RD}$. The transition rule from mode $0^*_S$ to mode 1* is: engine stops running; and the transition rule from mode 1* to mode $0^*_E$ is: clock stops running.

I would add that, except for an electrical heat source, an engine's exhaust gas is usually the heat source in an automotive vehicle whose temperature rises fastest when the engine is cold. However, where a greater delay is permissible in supplying heat to an intercooler in mode $0^*_S$ or in mode $0_S$, as applicable, the engine's coolant or the engine's lubricating oil can be used to supply heat to an intercooler's refrigerant during either of the two last-cited modes.

FIG. 62A shows an example of the particular case where the refrigerant of an intercooler using a type C combination is heated with a liquid which may be the engine's coolant, or the engine's lubricating oil. Numeral 676*i* designates the passages of a heat exchanger which could be an integral part of separator 42*i*. Intercooler liquid-blocking valve 677*i*, controlled by signal $C'^{i}_{LBV1}$, is used to prevent the hot liquid passing through passages 676*i* except when the intercooler is in mode $0^*_S$.

C. A Second Fast-response Intercooler

Applications where the three conditions recited in the third minor paragraph of section V,F,1 are satisfied, are examples of applications where refrigerant vapor exiting an evaporator can be allowed to be dry, and where in particular superheat-control techniques can be used to control the CR pump of type A and type C combinations having group 1, or group IV, principal configurations. The last-cited techniques are described in detail in section V,B,3,b,ii of my pending U.S. patent application Ser. No. 400,738, filed 30 Aug. 1989. In this section V,G,3,c I describe a particular way of implementing those techniques in the case of a type C combination having the R&IG configuration shown in FIG. 62B. However, it should be clear from my teachings so far in this DESCRIPTION that the superheat-control techniques described in section V,B,3,b,ii of the last-cited application, and the particular way of implementing those control techniques described in this section V,G,3,c, can also be used with type A combinations having a group I or a group IV principal configuration.

Figure 62B:
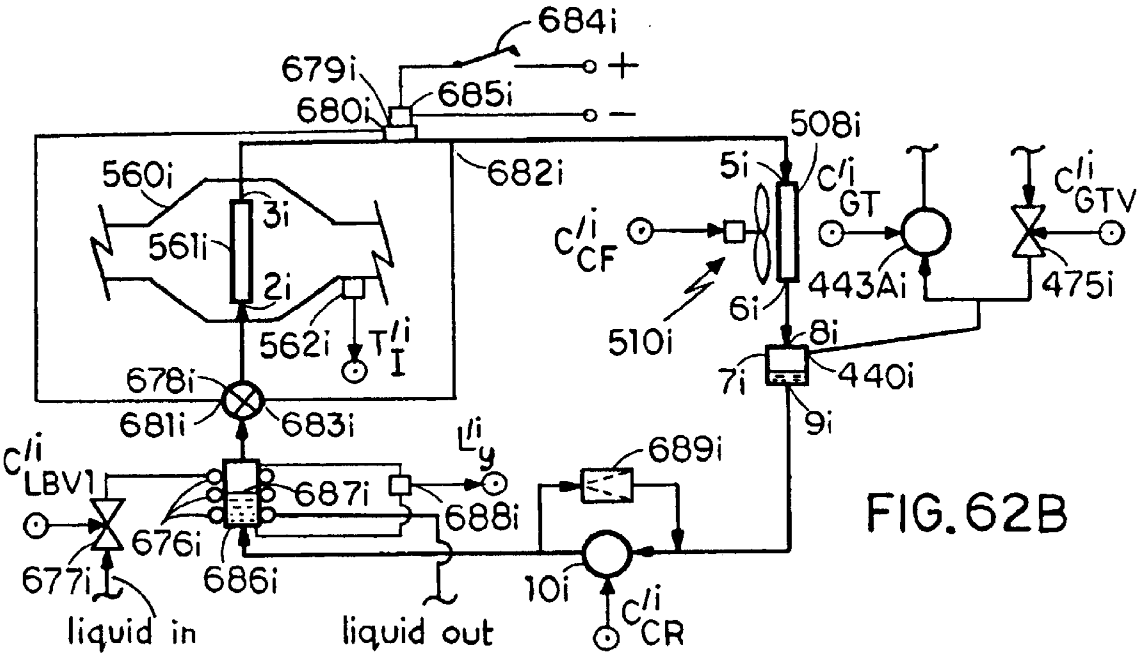

The particular way of implementing superheat-control techniques shown in FIG. 62B is appropriate where the amount of refrigerant-vapor superheat exiting an evaporator is required not to exceed a few degrees Celsius. It uses proportional throttling-valve 678*i*, often also referred to as an expansion valve, controlled so as to maintain the amount of superheat close to a small preselected value under steady-state operating conditions. In the particular case shown in FIG. 62B, valve 678*i* is a thermostatic expansion valve controlled by thermostatic element (bulb) 679*i* connected to valve 678*i* through fluid line 680*i*-681*i*. (An alternative to a thermostatic expansion valve and thermostatic element is an electric expansion valve and thermistor.) Refrigerant line 682*i*-683*i* is a pressure equalization line which is not always necessary.

The system having the R&IG configuration shown in FIG. 62B, hereinafter referred to in this major paragraph as 'the system', employs an azeotropic-like refrigerant, and has the same control modes as the system described in section V,G,3,b, namely has control modes $\mathbf{0}^*_E$, $\mathbf{0}^*_S$, 2*, and 3*. The system-controllable elements, which are controlled by the system's CCU (not shown), are CR pump 10*i* having a constant capacity; GT pump 443Ai; GT valve 475*i*; condenser fan 510*i*; blocking valve 677*i*; and switch 684*i* for controlling the electric current flowing through heating element 685*i*. During mode $\mathbf{0}^*_S$ vessel 686*i* performs the function of a pool evaporator and evaporator 561*i* performs the function of a condenser. (The refrigerant passages of evaporator 561*i* (not shown), valve 678*i*, and of the refrigerant lines between vessel 686*i*, valve 678*i*, and evaporator 561*i*, are sized for sewer flow in mode $\mathbf{0}^*_S$.)

In mode $\mathbf{0}^*_E$, pump 10*i* and fan 510*i* do not run, valve 677*i* is closed, and switch 684*i* is open; and the system's MPMCU (not shown) controls pump 443Ai and valve 475*i* so that $p^{*}{}_R^{i}$ tends to $p^{*}{}_R^{oi}$.

In mode $\mathbf{0}^*_S$, the system's CCU (not shown) ensures (1) pump 10*i* is controlled (on-off) so that the liquid-refrigerant level $L_y^i$ of liquid-vapor interface surface 687*i* in vessel 686*i* stays within an upper limit $L_{y,MAX}^i$ and a lower limit $L_{y,MIN}^i$ with the help of signal $L'^{i}_{y}$ generated by three-step liquid-level transducer 688*i*; (2) pump 443Ai and valve 475*i* are controlled so that $p^{*}{}_R^{i}$, tends to $p^{*}{}_{RD}^{oi}$; (3) fan 510*i* does not run; (4) valve 677*i* is controlled so that $T_I^i$ tends to $T_{ID}^i$; and (5) switch 684*i* is closed. (The heat supplied by heating element 685*i* to thermostatic element 679*i*, while switch 684*i* is closed, causes valve 678*i* to stay wide open and to allow refrigerant vapor to enter evaporator 1*i* where it is condensed and returned by sewer flow to vessel 686*i*.)

In mode 2*, the system's CCU ensures (1) pump 10*i* runs; (2) pump 443Ai and valve 475*i* are controlled so that $T_I^i$ tends to $T_{ID}^i$; (3) fan 510*i* does not run; (4) valve 677*i* is open; and (5) switch 684*i* is open.

In mode 3*, the system's CCU ensures (1) pump 10*i* runs; (2) pump 443Ai and valve 475*i* are controlled so that $p^{*}{}_{GR}^{i}$ tends to $p^{*}{}_{GR,MAX}^{i}$; (3) fan 510*i* is controlled so that $T_I^i$ tends to $T_{ID}^i$; (4) valve 677*i* is open; and (5) switch 684*i* is open.

Pressure regulator 689*i* ensures pump 10*i* delivers liquid refrigerant to valve 678*i* at a preselected refrigerant pressure.

d. Alternative Intercoolers

In view of the extensive descriptions and discussions already given in this DESCRIPTION of the operation of piston-engine intercooling systems using type A combinations, and of the operation of piston-engine intercooling systems using type C combinations, it should be apparent, to those skilled in the art, how they could operate intercoolers using other principal configurations disclosed in this DESCRIPTION and other inert-gas configurations disclosed in this DESCRIPTION.

It should, in particular, also be apparent that an intercooler with a type C combination can, where desirable, also use shutter-controlled heat release, in addition to gas-controlled heat release, during its fast-response preparation mode to minimize the rate at which the intercooler condenser releases heat during the last-cited mode.

4. Cooling Systems with a Water-cooled Condenser a. General Remarks

A first principal difference, in piston-engine cooling applications, between type C combinations having a water-cooled condenser and type C combinations having an air-cooled condenser, is that the former combinations can use water-controlled heat release whereas the latter combinations obviously cannot use water-controlled heat-release. Water-controlled heat release is usually adequate by itself for achieving heat-release control and therefore refrigerant-controlled heat release is usually not needed.

A second principal difference is usually the same as the second principal difference stated in the second minor paragraph of section V,F,4,a.

b. Refrigerant-circuit Configuration, Control System, and Operating Method

Figure 63:
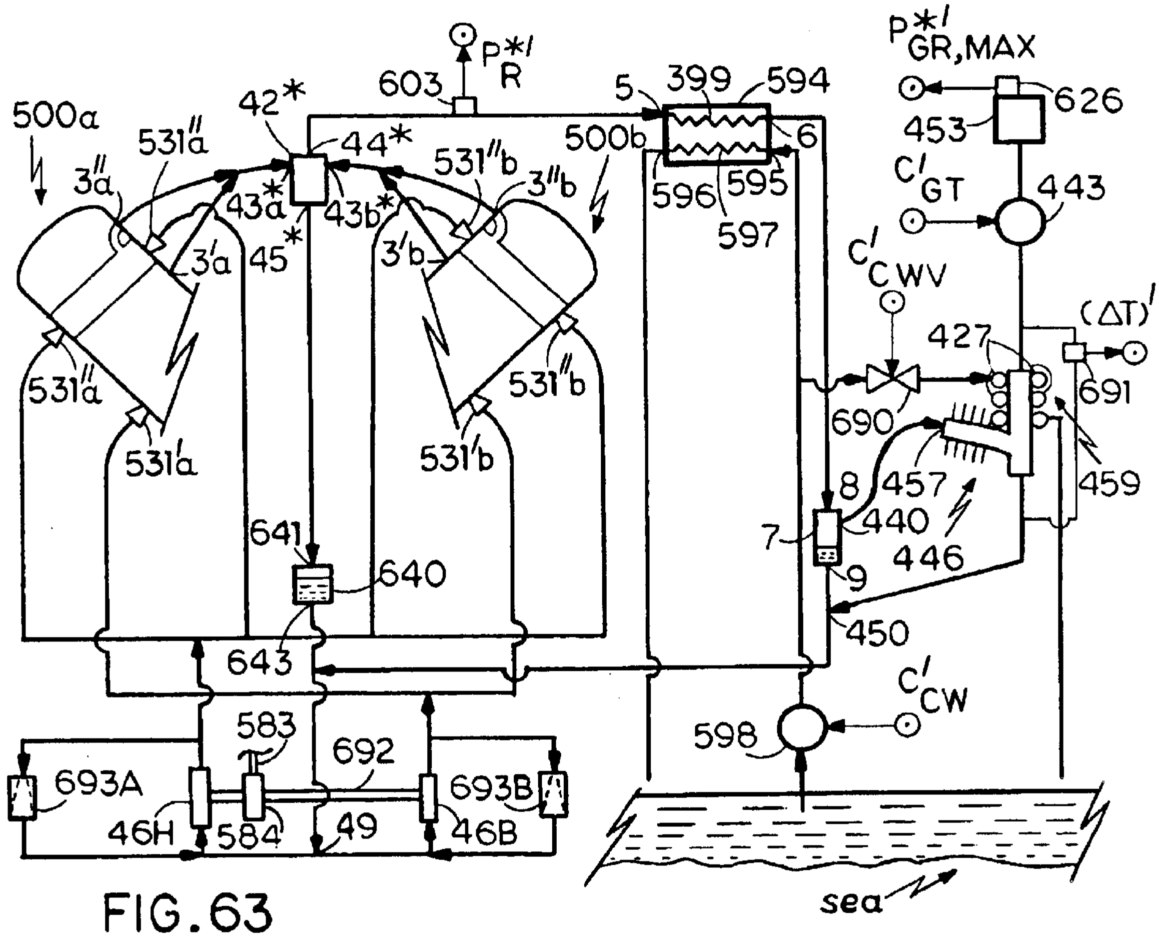

The R&IG configuration shown in FIG. 63 has a class $III^{*}{}_{FN}^{oo}$ principal configuration, and a class $IV_G$, inert-gas configuration having bidirectional GT pump 443 and refrigerant-vapor trap 446. FIG. 63 shows the particular case where GT pump 443 is not designed to pump wet vapor and where accessory condensers 456 and 459 are respectively air-cooled and water-cooled condensers. Condenser 459 is cooled by treated sea water (treatment plant not shown) supplied by cold-water pump 598 through proportional, bidirectional (two-way) bleed-off, cold-water valve 690. Valve 690 is controlled to ensure essentially no refrigerant vapor enters inlet 444 of pump 443. To this end the system, hereinafter referred to in this section V,G,4,b as 'the system', having the R&IG configuration shown in FIG. 63, a CCU (not shown), and an MPMCU (not shown), includes means for detecting the presence of refrigerant vapor in the inert-gas passages of accessory condenser 459. This refrigerant-vapor detecting means may be a transducer with a probe which can distinguish between the refrigerant vapor employed and the inert gas employed. FIG. 63 shows the particular case where the refrigerant vapor and the inert gas have substantially different electrical conductivities, and where differential-temperature transducer 691 generates a signal $(\Delta T)'$ providing a measure of the temperature difference $\Delta T$ between the temperature of the fluid entering condenser 459 and exiting condenser 459. Then, assuming for example that the electrical conductivity of the refrigerant vapor is high, and that the conductivity of the inert gas is low, the value of $\Delta T$ provides an indication of the mass of refrigerant vapor in condenser 459.

The DR pump of the principal configuration shown in FIG. 63 has two component DR pumps designated by symbols 46H and 46B mounted on common shaft 692. (Pumps 46H and 46B could be driven by a belt. In this case, the sizes of their pulleys could be different and they could be driven at different speeds.) The pressure at which pump 46H delivers liquid refrigerant to the set by 531'*b*, is controlled by pressure regulator 693A; and the pressure at which pump 46B delivers liquid refrigerant to the set of one or more injectors designated by 531"*a*, and to the set of one or more injectors designated by 531"*b*, is controlled by pressure regulator 693B. (If the preselected pressures at which pumps 46A and 46B supply refrigerant are equal, a single common pressure regulator can be used for both those pumps.) The LR injectors shown in FIG. 63 are controlled like fuel injectors by signals $C'_{RI1}$ and $C'_{RI2}$ (see FIG. 63A). Liquid refrigerant exiting the injection nozzles can, for example, be controlled (1) by injection-pulse duration and/or (2) by injection-pulse rate. They could additionally be controlled by changing the flow rate during injection pulses, as in the case of the fuel-injection system used in Volkswagen's Futura concept car. (This can be done, for example, by LR injectors similar to the Stanadyne injection nozzles mentioned in the paper by Herbert Schäpertöns et al, 'VW's Gasoline Direct Injection (GDI) Research Engine', SAE No. 910054, see pages 3 and 4 and FIGS. 7 and 8, except that the LR injection nozzles would be designed to deliver liquid refrigerant at a pressure of only a few bar, typically at an absolute pressure between 2 and 4 bar, instead of at a pressure of 450 bar.)

I would mention that the coolant flow rate entering a component evaporator need not be controlled by the injector, and may be continuous instead of being pulsed. This is particularly true in the case of cylinder-block component evaporators where pulsed injection is often unnecessary and the coolant flow rate entering a component evaporator through an LR injector—if one is used—is controlled, as in continuous fuel-injection systems, remotely through a coolant-metering device. A technique for preselecting the time-average flow rate delivered by LR injection nozzles as a function of operating conditions is discussed in section V,H,3.

The cooling system having the refrigerant-circuit configuration shown in FIG. 63 employs water as its refrigerant and has three control modes designated by the symbols $\mathbf{0}^*_0$, $\mathbf{2}^*_0$, and 3*, where control mode $\mathbf{2}^*_0$ corresponds to control mode $\mathbf{0}_0$ in section V,F,4.

In mode $\mathbf{0}^*_0$, the system, by definition, controls none of the R&IG configuration's controllable elements.

In mode $\mathbf{2}^*_0$, (1) injectors 531'*a* and 531'*b* are controlled so that, in effect, the quality $q'_{EV}$ of refrigerant vapor exiting at 3'*a* and 3'*b* stays within a first pair of preselected limits, and injectors 531"*a* and 531"*b* are controlled so that the quality $q''_{EV}$ of refrigerant vapor exiting at 3"*a* and 3"*b* stays within a second pair of preselected limits; (2) pump 443 is controlled so that $p^*_R$ tends to $p^*_{RD}$; (3) pump 598 does not run, and (4) valve 690 is in a preselected position. (Air-cooled condenser 456 is assumed to be capable of removing by itself refrigerant vapor entering at 457 while the system is in mode $\mathbf{2}^*_0$, and therefore pump 598 is not running.)

In mode 3*, (1) injectors 531'*a* and 531'*b*, and injectors 531"*a* and 531"*b*, are controlled in a way similar to the way they are controlled in mode $\mathbf{2}^*_0$, except that the preselected limits may be different; (2) pump 443 is controlled so that the value of $p^*_{GR}$ stays close to $p^*_{GR,MAX}$; (3) pump 598 is controlled so that $p^*_R$ tends to $p^*_{RD}$; and (4) valve 690 is controlled so that the value of ΔT stays above a preselected value indicating the absence of refrigerant vapor in condenser 459.

The transition rules between the foregoing three modes are:

| | | |
|---|---|---|
| (a) | $0^*_O$ to $2^*_O$ | : engine starts running and $T_W \geqq T_{WD,1}$ |
| (b) | $0^*_O$ to $3^*$ | : no transition |
| (c) | $2^*_O$ to $3^*$ | : $p^*_{GR} = p^*_{GR,MAX}$ and $T_W > T_{WD} + \Delta T_{W1}$ |
| (d) | $2^*_O$ to $0^*_O$ | : $T_W < T_{WD,2}$ |
| (e) | $3^*$ to $0^*_O$ or to $1^*$ | : no transition |
| (f) | $3^*$ to $2^*_O$ | : $T_W < T_{WD} - \Delta T_{W3}$ |

The positive quantities of $\Delta T_{W1}$, $\Delta T_{W2}$, and $\Delta T_{W3}$, need not necessarily be different.

c. Other Refrigerant & Inert-gas Configurations and Control Systems

All the classes of principal configurations, and all the types of IG configurations, described or listed in section V,G,2,b can also be used with R&IG configurations having a water-cooled condenser.

5. Cabin Heating

Cabin heating with type C combinations can, where desired, be achieved either by single-phase heat transfer or by two-phase heat transfer. Techniques for cabin heating, in the case of a type C combination using single-phase heat transfer, have already been discussed in section V,G,2 where SC pump 63*h*, of the cabin-heating circuits shown in FIGS. 57 and 61, was used in control mode 1*. I therefore discuss in this section V,G,5 only techniques for cabin heating using two-phase heat transfer.

Examples of the last-cited techniques were given in section V,F,2,g for the case of type combinations. The techniques used in the case of type C combinations are similar. Suitable locations in type C combinations for tapping off refrigerant vapor for cabin-heating two-phase heat-transfer circuits include a suitable point of their evaporator or a suitable point of their refrigerant-vapor transfer means including, as applicable, their separator or their separating assembly.

Figure 63A:
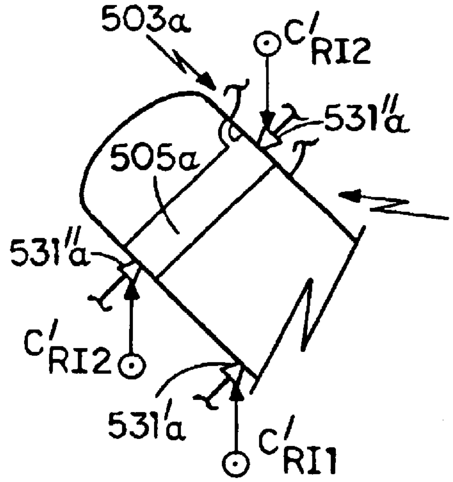
Figure 63B:
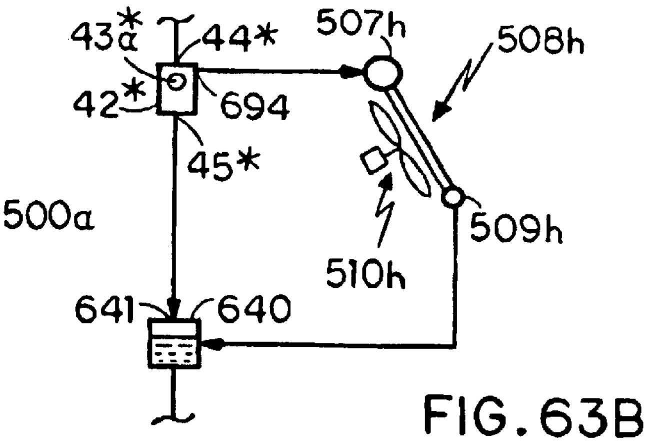
Figure 63C:
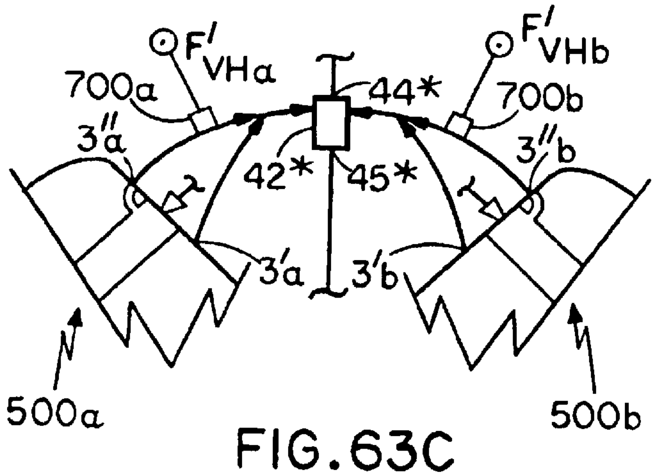

The cabin-heating circuit shown in FIG. 63B illustrates the case where refrigerant-vapor enters the cabin-heating circuit at point 694 of separating assembly 42*h*. Liquid header 509*h* is assumed located high enough above dual-return receiver 640 for natural circulation to occur and no heating-circuit refrigerant pump to be required.

H. Control Techniques for Cooling Piston Engines Common to Type A and to Type C Combinations 1. Preliminary Remarks So far I have, for specificity, described control methods for embodiments of the invention in the context of either a type A or a type C combination. In this section V,H, I discuss techniques common to both the two last-cited combinations.

For brevity, where I do not wish to distinguish between $p_R$ and $p^*_R$, I shall in this section V,H refer to either $p_R$ or to $p^*_R$ as $P_R''$. Also for brevity, where I do not wish to distinguish between (control) modes 2 and 2*, between (control) modes $\mathbf{2}_0$ and $\mathbf{2}^*_0$, or between (control) modes 3 and 3*, I shall refer to either of the first two modes as mode 2", to either of the second two modes as mode $\mathbf{2}_0$", and to either of the third two modes as mode 3".

2. Preselection of Desired Refrigerant Pressure

I stated earlier in this DESCRIPTION that the preselected desired value $p^*_{RD}$ of the refrigerant pressure $p_R$ may be fixed, but may also change in a pre-prescribed way as a function of one or more preselected parameters. These include one or more parameters characterizing the current state of an engine and/or the current state of an engine's environment. Useful parameters characterizing the current state of the engine include (1) fuel mass-flow rate $\dot{m}_F$ or almost equivalently fuel volumetric-flow rate $F_F$; (2) intake-air mass-flow rate $\dot{m}_I$; (3) engine (rotational) speed $\omega_E$; (4) knocking intensity $k_E$; (5) intake-air temperature $T_I$; (6) intake-air pressure $p_I$; (7) throttle position $\theta_T$; and (8) the derivatives of the quantities cited under (1) to (7). And useful parameters characterizing the state of the engine's environment include (9) ambient-air pressure $p_A$; (10) ambient-air temperature $T_A$; (11) local solar radiation intensity $T_S$; (12) ambient-air relative humidity $H_A$; and (13) the derivatives of the quantities cited under (9) to (12). I note that measures of certain parameters characterizing the state of an engine can be indirect measures. For example, a suitable measure of $\dot{m}_F$, in the case of an engine with pulse-width controlled fuel injection, is the pulse width of the injection-control signal; and a suitable measure of $\omega_E$, in the case of a spark-ignition engine, is the rate of the firing signal. I also note that, in the case of an unsupercharged and unthrottled engine, $p_A$ and $T_A$ may be sufficiently accurate measures of $p_I$ and $T_I$ and vice versa.

The preferred pre-prescribed way for varying $P_{RD}''$ as a function of one or more of the foregoing characterizing parameters depends greatly on the particular engine being cooled. A preferred pre-prescribed way, while the engine's cooling system is in mode 2", in mode $\mathbf{2}_0$", or in mode 3", would include, in the case of an engine with a knocking-intensity sensor, (a) varying $p_{RD}''$ as a preselected function of one or more preselected parameters that include $\dot{m}_F$ while engine knocking is undetectable; and (b) discontinuing varying the value of $p_{RD}''$ according to that pre-prescribed way whenever engine knocking is detectable.

In embodiments of the invention where the current value of $T_W$ is not used to control a cooling system of the invention, a preferred pre-prescribed way usually would increase the value of $p_{RD}''$ with decreasing $\dot{m}m_F$, and usually would decrease the value of $p_{RD}''$ with increasing $\dot{m}_F$. But if engine knocking becomes detectable, the value of $p_{RD}''$ would be decreased below that determined by the preselected function until knocking is no longer detectable—provided that this did not cause $p_R''$ to fall below its minimum-permissible value $p_{R,MIN}''$.

The chosen pre-prescribed way for varying $p_{RD}''$ as a function of preselected characterizing parameters is stored in a cooling system's CCU.

The minimum-permissible value of $p_R^U$, with most existing engines, is currently (1991) usually governed, when the current value of $p_R^U$ is lower than the current value of $p_A$, by the maximum value of $|p_A-p_R''|$ for which an airtight two-phase cooling system is affordable (although it may in future be governed by other considerations). Because the value of $p_A$ decreases when altitude increases, the value of $p_{R,MIN}''$ also decreases when altitude increases. The minimum value of $p_{R,MIN}''$ at any altitude, can be determined by measuring $p_R''$ and $p_A$ and requiring $p_{R,MIN}''$ to satisfy, when $p_R''$ is lower than $p_A$, the relation $$|p_A-p_{R,MIN}''|\leqq\Delta_{MAX,1}p, \quad (21)$$

where $\Delta_{MAX,1}p$ is the maximum value of the amount by which $p_R''$ is allowed to fall below the current value of the ambient atmospheric pressure $p_A$. The maximum-permissible value $p_{R,MAX}''$ of $p_R''$, when $p_R''$ is higher than $p_A$, is governed either by the maximum-permissible value of $\overline{T}_{RS,E}$ under specified engine and environmental conditions, where $\overline{T}_{RS,E}$ is the refrigerant's mean saturated-vapor temperature in the evaporator, or is merely governed by the maximum-permissible value of $\Delta_{MAX,2}p$, where $\Delta_{MAX,2}p$ is the maximum value of the amount by which $p_R''$ is allowed to rise above the current value of $p_A$ Where a piston-engine cooling system's refrigerant and airtight-configuration design have been selected so that $\Delta_{MAX,2}p$ is not exceeded, for the highest values of $T_{RS}$ at only low altitudes (say at altitudes up to 500 meters), the maximum value of $p_{R,MAX}''$ and the corresponding value or values of $T_{RS}$ must be limited at higher altitudes so that the relation $$|p_{R,MAX}''-p_A|\leqq\Delta_{MAX,2}p \quad (22)$$

is still satisfied at those higher altitudes. The maximum value of $p_{R,MAX}''$, at any altitude, can be determined by measuring $p_R''$ and $p_A$ and requiring $p_{R,MAX}''$ to satisfy, when $p_R''$ is higher than $p_A$, relation (22).

The invention includes providing means not only for measuring the current values of $p_R''$ and $p_A$ with two proportional absolute-pressure transducers, or of the current value of the difference $(p_R''-p_A)$ with one proportional differential-pressure transducer; but also for (a) storing in a piston-engine cooling system's CCU the values $\Delta_{MAX,1}p$ and $\Delta_{MAX,2}p$, and relations (21) and (22), of (b) computing in the system's CCU, from the information under (a), the current values of $p_{R,MIN}''$ and $p_{R,MAX}''$, and (c) constraining the control signals transmitted from the system's CCU to the system's airtight configuration so that the current value of $p_R''$ does not fall below $p_{R,MIN}''$ and does not rise above $p_{R,MAX}''$.

3. Preselection of Desired Cylinder-wall Temperature

I note that, in general, the principal purpose for varying $p_{RD}''$ in a pre-prescribed way as a function of one or more parameters characterizing an engine's state is to achieve, at one or more of n preselected locations, a desired preselected (time-averaged) engine-wall temperature $T_{WD}$ which may be fixed, but which is usually changed in a pre-prescribed way as a function of one or more preselected characterizing parameters. However, achieving a desired value $T_{WD}$ of $T_W$ by controlling $p_R''$ is a very inaccurate process, particularly in the case of engines whose speed and torque vary over a wide range of values. The reason for this is that $(T_W-T_{RS})$, where $T_{RS}$ is the current value of the refrigerant saturated-vapor temperature corresponding to $p_R''$, can be inferred, particularly during transients, only approximately from parameters characterizing the engine's state even in the case of azeotropic-like refrigerants. It follows that, where practicable, it would be desirable to measure $T_W$ at a critical point of each of the engine's one or more cylinder heads and to control $p_R''$, while a piston-engine cooling system is in modes 2'', 2$_0$'', or 3'', so that $T_W$, the average current value of the engine-wall temperatures at each of those critical points, tends to $T_{WD}$. The invention, where practicable and affordable, comprises means for obtaining a measure of $T_W$ which includes using one or more proportional temperature transducers to generate signals $T'_{W1}$ to $T'_{Wn}$ providing a measure of wall temperatures at the n points where they are located. Examples of suitable points in engines with two exhaust valves per cylinder are the exhaust-valve bridges. Thermistors or thermocouples, with properly protected wiring in refrigerant passages 505, could be used as the sensors of the temperature transducers used to generate signals $T'_{W1}$ to $T'_{Wn}$. Critical points are usually the points of an engine where the heat flux is highest. Where locating transducers at the last-cited points is impracticable or too expensive, the proportional temperature transducers cited earlier in this minor paragraph can be located at points in an engine's structure in the general neighborhood of the highest heat flux points, and the temperatures at the critical points can be estimated by the CCU of an engine-cooling system of the invention from the temperatures of the points where the proportional temperature transducers are located. Also, where it is too expensive to obtain measures of the temperatures at or near the combustion-chamber walls of each cylinder of a multicylinder engine, the number of proportional transducers used may be smaller than the number of cylinders of that engine.

The current value of $T_W$ is obtained by the CCU of a system of the invention by taking $T_W$ equal to $$\sum_{j=1}^{n} T_{wj}/n,$$

and by using one or more controllable elements to make $T_W$ tend to $T_{WD}$ in control modes 2'', 2$_0$'', or 3''. An example of such a control method was given in section V,G,2,b for the case of a type C combination with an NP evaporator.

4. Engine-driven Pumps a. Preliminary Remarks

In the case where a system of the invention is used to cool a device generating mechanical power, namely to cool a motor, the most cost-effective means of driving a pump of the system is often to drive it by that device. This statement is true in particular where the mechanical-power generating device or motor is an internal-combustion engine or an electric motor, and applies to all the pumps of a system of the invention, including refrigerant pumps, inert-gas pumps, air-transfer pumps, hydraulic pumps, hot-fluid pumps, and cold-fluid pumps.

b. Principal-configuration Refrigerant Pumps

In general the cooling load of a variable-speed engine, or of a nominally constant-speed engine, is not only a function of the engine's speed $\omega_E$, but is also a function of one or more characterizing parameters such as the other characterizing parameters mentioned in section V,H,2. It is therefore usually—albeit not always—highly desirable that an engine-driven refrigerant pump be provided with means for changing its effective capacity, at a given engine speed. These means include a proportional bidirectional (two-way) refrigerant valve controlled by a modulated analog signal, or by a modulated pulsed signal. A pulsed signal can be modulated by varying one or more of the following three quantities: pulse width, pulse amplitude, and pulse rate (or synonymously pulse frequency). The refrigerant valve used to change the effective capacity of an engine-driven refrigerant pump may be a valve in series with the pump or a valve in parallel with the pump. In the former case, the valve is used as a throttling valve to modulate the flow rate through the pump. And, in the latter case, the valve may be used only as a recirculation valve in a circuit used exclusively as the pump's recirculation circuit; or the valve may also be used to control the flow rate of the fluid through the valve while the pump is inactive. (A pump recirculation circuit may be an integral part of the pump).

A typical method of sizing an engine-driven pump in the case of a variable-speed engine is (a) to determine the cooling load $\dot{Q}_C$ as a function of $\omega_E$ at $\dot{m}_{F,MAX}$, or at $\theta_{T,MAX}$ (where applicable), under the highest heat-generating conditions and the highest design values of $T_A$, $I_S$, and $H_A$; and (b) to choose (1) the ratio $\omega_R/\omega_E$ (where $\omega_R$ is the refrigerant pump's rotational speed and $\omega_E$ is the engine's rotational speed), and (2) the refrigerant pump's inherent capacity at a given refrigerant-pump speed, so that the refrigerant pump's inherent capacity, or equivalently the refrigerant pump's effective capacity with, as applicable, no throttling, or no recirculation, is large enough to induce the preselected liquid-refrigerant mass-flow rate at all engine speeds under the design conditions cited under (a) in this sentence.

The CCU of the system to which the refrigerant pump belongs supplies a signal to, as applicable, the throttling valve or the recirculation valve, employed to adjust the refrigerant pump's effective capacity so that the preselected liquid-refrigerant mass-flow rate is delivered to a preselected component of the principal configuration. The refrigerant pump's effective capacity is controlled, for example, so that (1), in the case of a CR pump, the current value of $L_P$, $L_R$, or $L_D$, as applicable, tends to its preselected value $L_{PD}$, $L_{RD}$, or $L_{DD}$; (2), in the case of an EO pump controlled by $L_S$, the current value of $L_S$ tends to $L_{SD}$; and (3), in the case of an EO pump not controlled by $L_S$, or a DR pump, the current value of the overfeed ratio stays in effect between upper and lower preselected limits, or causes the current value of $T_W$ to tend to $T_{WD}$ or the current value of $p_R''$ to tend to $p_{RD}''$.

c. Ancillary-configuration, Inert-gas-configuration, Hot-fluid, and Cold-fluid Engine-driven Pumps The effective capacity of the pumps cited in the immediately-preceding heading can be adjusted by using techniques similar to those used with principal-configuration refrigerant pumps. Additionally, the effective capacity of those pumps can, where they pump a gas, also be adjusted by a throttling valve upstream from the pump.

5. Evaporator Refrigerant Flow-rate Control a. Preliminary Remarks

The proper control of the mass-flow rate $\dot{m}_E$ flowing through a unitary evaporator, or the mass-flow rate $\dot{m}_{Ej}$ flowing through component evaporator j of a split evaporator, is of crucial importance in most systems of the invention.

I distinguish between 'non-overflow P evaporators' on the one hand, and NP evaporators and 'overflow P evaporators' on the other hand. (For definitions of the two terms in quotation marks see the last minor paragraph of section V,B,10.) The purpose of controlling $\dot{m}_E$ and $\dot{m}_{Ej}$ in the case of non-overflow P evaporators is to maintain the level of interface surface 123 (see for example FIGS. 43 and 57) close to a preselected level. The techniques for achieving the last-cited purpose have been discussed in section V,F,2,a and need no elaboration. The purpose of controlling $\dot{m}_E$ or $\dot{m}_{Ej}$ in the case of NP evaporators and overflow P evaporators is to control overfeed. Overfeed control techniques of the invention devised for controlling $\dot{m}_E$ and $\dot{m}_{Ej}$ have been discussed in section V,F,2,b but, in contrast to the liquid-level control techniques discussed in section V,F,2,a, need elaboration and are discussed further in sections V,H,5,b, V,H,5,d, and V,H,8.

b. Evaporator-overfeed Control

Evaporator-overfeed control techniques, where employed, are used in piston-engine intercooling applications, and in general in cooling and heating systems having the characteristics recited in the third minor paragraph of section V,F,1, merely to obtain, at a given instant, a mean refrigerant heat-transfer coefficient higher than that achieved with an evaporator-overfeed ratio equal to zero. By contrast, evaporator overfeed-control techniques are used in piston-engine cooling systems, and in general in cooling and heating systems having the characteristics recited in the second minor paragraph of section V,F,1, to ensure their feasibility. I next elaborate, for specificity, on the last-cited control techniques in the context of piston-engine cooling systems. But those techniques apply mutatis mutandis to all cooling and heating applications where evaporator-overfeed control is desirable.

NP evaporator (or component NP evaporator) overfeed control is used in piston-engine cooling systems, as mentioned in the first major paragraph of section V,F,2,b,ii, to ensure, with all refrigerants, that no hot spots occur; and also to ensure, with non-azeotropic refrigerants, that the concentrations of their components in an NP evaporator are sufficiently uniform spatially to prevent an unacceptably-large rise in the refrigerant's saturated-vapor temperature $T_{RS}$ as it flows through a unitary evaporator, or through each of the component evaporators of a split evaporator. NP evaporator overfeed can also be used, where required, to increase the mass of refrigerant in an NP evaporator, and thereby cause (see discussion in section V,F,2,d) the value of $(T_{RS,EA}-T_{RS,O})$ to be small enough for it to be acceptable.

Correct evaporator overfeed requires achieving, as applicable, one or more of the three purposes recited in the immediately-preceding minor paragraph without using undesirably-high evaporator-overfeed ratios, particularly at high engine cooling loads; where, by definition, an engine's cooling load is the rate $\dot{Q}_C$ at which heat generated by the engine must be removed by the engine's two-phase heat-transfer cooling system; and does not include the rate at which heat is removed from the engine by other means including (1) the rate at which heat is removed by cooler ambient air by convection, or to cooler material things surrounding the engine by radiation, and (2) the rate at which heat is removed by the engine's lubricating system where the lubricating system's oil is not cooled by the engine's two-phase heat-transfer system. Evaporator-overfeed ratios are undesirably high when they exceed the ratios required to achieve, as applicable, one or more of the foregoing three purposes and, as a result, cause (1) a larger or more expensive separator, condenser, and/or condenser fan, to be used, or (2) the condenser fan to run more often or at a higher rate.

The preselected evaporator-overfeed ratio $r_{EO,D}$ for achieving the applicable purposes of interest for a given engine can be obtained from tests on that engine. The value of $r_{EO,D}$, under steady-state conditions, may be fixed, or may change as a function of one or more parameters characterizing the state of the engine; for example the preselected value of $r_{EO,D}$ may increase with $\dot{m}_F$ and vice versa.

The EO-pump mass-flow rate $\dot{m}_{EO,D}$ required to achieve $r_{EO,D}$ is given by $$\dot{m}_{EO,D}=r_{EO,D}\cdot\dot{m}_\theta \qquad (23)$$

where $\dot{m}_\theta$ is the refrigerant evaporation rate in an NP evaporator; and the DR-pump mass-flow rate $\dot{m}_{DR}$ required to achieve $r_{EO,D}$ is given by $$\dot{m}_{DR,D}=(1+r_{EO,D})\cdot\dot{m}_\theta. \qquad (24)$$

The current value of $\dot{m}_\theta$ can be obtained, with negligible time delays, from the signal $F'_V$ generated by a refrigerant-vapor flow-rate transducer located in an airtight configuration's refrigerant-vapor transfer means as shown, for example in FIG. 49, and by computing the value of the refrigerant-vapor mass-flow rate $\dot{m}_V$ corresponding to $F'_V$; or by measuring $\dot{m}_V$, where the refrigerant vapor is essentially dry, directly with a mass-flow rate transducer, such as transducers having a hot-wire sensor similar to that used in Bosch fuel-injection systems. The current rate of $\dot{m}_\theta$, under steady-state conditions, can sometimes be obtained less expensively by obtaining a measure of the value of the refrigerant condensate mass-flow rate $\dot{m}_C$. In the latter case, techniques must be used to ensure $q_{EV}$ does not fall below $q_{EV,MAX}$ during transients. One technique for dealing with transients is mentioned in the last minor paragraph of the second major paragraph of section V,F,2,b,iii, and another technique for dealing with transients is mentioned in the immediately-following major paragraph.

The current value of $\dot{m}_\theta$, where the amount of refrigerant subcooling and superheating is negligible, can also be obtained quite accurately by assuming $\dot{m}_\theta$ is equal to $\dot{Q}_C/h_{lg}$, where $h_{lg}$ is the latent heat of evaporation of the refrigerant. This is often the case with internal-combustion engine-cooling systems because, in those systems, the amount of refrigerant subcooling is usually negligible and the amount of refrigerant superheating is zero. Where the amount of refrigerant subcooling of the refrigerant condensate mass-flow rate $\dot{m}_C$is significant but refrigerant superheating is negligible, $\dot{m}_\theta$ can be estimated quite accurately by using $$\dot{m}_\theta(\dot{Q}_C-c_{pl}m\dot{m}_C\Delta_{Sb}T)/h_{lg} \qquad (25)$$

where $c_{pl}$ is the specific heat of liquid refrigerant and $\Delta_{Sb}T$ is the amount by which refrigerant condensate is subcooled. The value of $h_{lg}$ as a function of $p_R$ can, in the case of an azeotropic-like refrigerant, be determined from published tables; and, in the case of a non-azeotropic refrigerant, from published tables and from the estimated concentrations of the refrigerant's components in the NP evaporator.

The current value of $\dot{Q}_C$ under transient conditions as well as under steady-state conditions, could in principle be predicted by determining during tests the functional dependence of $\dot{Q}_C$ on a subset of applicable and non-redundant parameters selected from a set of characterizing parameters including $T_W$ and $\dot{T}_W$, and the parameters listed under (1) to (13) in section V,H,2. The number of characterizing parameters employed in estimating $\dot{Q}_C$ depends on the desired accuracy.

In practice, determining the functional dependence of $\dot{Q}_C$ on parameters characterizing the state of an internal combustion engine during transients is often impracticable. Consequently, the invention envisages determining the functional dependence of $\dot{Q}_C$ on preselected characterizing parameters during tests conducted under steady-state conditions, and using rough empirical rules for ensuring $\dot{q}_{EV}$ does not exceed $\dot{q}_{EV,MAX}$ during transients. For example, the value of $\dot{m}_{EC}$, or of $\dot{M}_{DR}$, obtained by using values of $\dot{Q}_C$, determined during steady-state tests, could be increased during transients by $\Delta\dot{m}_{EC}$, or by $\Delta\dot{m}_{DR}$, where either of these quantities is proportional to the absolute value of one or more of the derivatives of relevant steady-state parameters. For example, $\Delta\dot{m}$EO or $\Delta\dot{m}_{DR}$ may be made proportional to the absolute value $|\dot{m}_F$ of $\dot{m}_F$, or where applicable the absolute value $|\dot{\theta}_T|$ of $\theta_T$, where the coefficient of proportionality is determined empirically. This would temporarily increase the value of $\dot{m}_{EO}$, or of $\dot{m}_{DR}$, above its last steady-state value when, as applicable, $\dot{m}_F$ or $Q_T$ is increased, and would temporarily maintain the current value of the last steady-state value of $\dot{m}_{EO}$ or of $\dot{m}_{DR}$ when, as applicable, $\dot{m}_F$ or $\theta_T$ is decreased. Thus, for example, where $\dot{m}_\theta$ is taken equal to $\dot{Q}_{C,SS}/h_{lg}$, and where $\dot{Q}_{C,SS}$ is the value of $\dot{Q}_C$ obtained from tests conducted under steady-state conditions, the expressions $$\dot{m}_{EO,D}=(r_{EO,D}\dot{Q}_{C,SS})/h_{lg}k_{C1}|\dot{m}_F| \text{ and } \dot{m}_{DR,D}=\{(1+r_{EO,D})\cdot\dot{Q}_{C,SS}/h_{lg}\}+k_{C2}|\dot{m}_F|, \qquad (26),(27)$$

where $k_{C1}$ and $k_{C2}$ are positive constants, can be used to offset cooling-system response lags to a sudden increase in fuel flow rate, and to offset engine thermal lags to a sudden decrease $\dot{m}_F$ in fuel flow rate. The same technique can be used to offset lags in the value of $\dot{m}_C$ with respect to the value of $\dot{m}_\theta$ where $\dot{m}_C$ is used instead of $\dot{Q}_{C,SS}$ in relations (26) and (27).

The relation used to control EO pump 27, or DR pump 46, is stored in the CCU of a system of the invention; the characterizing parameters used in that relation are obtained from transducer signals and supplied to the CCU; and a signal $C'_{EO}$, or signal $C'_{DR}$, is generated by the CCU which controls EO pump 27 or DR pump 46, so that $\dot{m}_{EO}$, or $\dot{m}_{DR}$, tend respectively to $\dot{m}_{EO,D}$ or to $\dot{m}_{DR,D}$.

Evaporator overfeed can further be used for a fourth purpose, namely to decrease the value of $(T_W\times T_{RS,E})$ in high heat-flux zones at high cooling loads. This allows the value of $T_{RS,E}$ to be increased, at high cooling loads, for a given maximum value of $T_W$ and a given heat flux, thereby allowing the size of an airtight configuration's condenser to be reduced for a given cold-fluid pump power. (The cold-fluid pump is usually a fan or a water pump.) Alternatively, this allows the value of $T_W$ to be decreased, at high cooling loads for a given value of $T_{RS,E}$ and a given cold-fluid pump power, thereby allowing the engine's volumetric efficiency to be increased at high cooling loads and at high engine power. I shall refer to the overfeed used to achieve the foregoing fourth purpose as 'excess overfeed' because it exceeds the amount of overfeed required to achieve, as applicable, one or more of the three purposes cited in the first minor paragraph of the second major paragraph of this section V,H,5,b; and is undesirably high in the sense the qualifier 'undesirably high' is used in the second minor paragraph of the second major paragraph of this section V,H,5,b. I distinguish between 'excess overfeed' and 'incorrect overfeed'. I use the latter term in the case where excess overfeed is not desired and the amount of evaporator overfeed is undesirably high.

In the case where an NP evaporator has several sets of component evaporators, and one of those sets has much higher heat-flux zones than the other one or more sets, excess overfeed is usually employed only with the set of component evaporators having the highest heat-flux zones and $T_W$, in the expression $(T_W-T_{RS,E})$, is the wall temperature of the most critical of those high heat-flux zones. In the particular case of a piston engine with non-interconnected cylinder-block and cylinder-head coolant passages, an NP evaporator could, for example, have two sets of component evaporators: a set of cylinder-block component NP evaporators and a set of cylinder-head component NP evaporators. In that particular case excess overfeed would usually be employed only with the latter set of component evaporators, and $T_W$ would be the average wall temperature of a set of critical heat-flux zones of that latter set of component evaporators. In the case of an engine with a single bank of cylinders, the set of cylinder-head component evaporators may consist of only one component evaporator.

Whereas correct overfeed applies to control modes 2" and 3", excess overfeed usually applies only to mode 3", but need usually not be employed continuously in mode 3". Consequently, mode 3" is in effect split into two control modes: mode $\mathbf{3}_C$" where correct overfeed is employed and mode $\mathbf{3}_E$" where excess overfeed is employed, and transition rules between those two modes must be formulated. Examples of transition rules between modes $\mathbf{3}_C$" and $\mathbf{3}_E$" are discussed next.

Assume for specificity that the system of the invention of interest has—like the system shown in FIG. 63—a set of cylinder-block component evaporators supplied collectively by liquid refrigerant at a mass-flow rate $\dot{m}_{EB}$ and a set of cylinder-head component evaporators supplied collectively by liquid refrigerant at a mass-flow rate $\dot{m}_{EH}$. Each set of component evaporators may consist of only two component evaporators, namely one for each bank of cylinders. Alternatively, the cylinder-block refrigerant passages, and/or the cylinder-head refrigerant passages, of each bank of cylinders may be compartmentalized, and thus the refrigerant passages of each cylinder block and/or each cylinder head may form several component evaporators. In the example considered in this major paragraph, all cylinder-block component evaporators are supplied, at a given instant of time, with liquid refrigerant at essentially the same mass-flow rate, and all cylinder-head component evaporators are also supplied, at any given instant of time, with liquid refrigerant at essentially the same mass-flow rate. Also, in the example considered in this major paragraph, excess overfeed is used only for the cylinder-head component evaporators.

Suitable transition rules between modes $\mathbf{3}_C$" and $\mathbf{3}_E$" include, in the case of the specific example being considered, rules which are in essence based on the current value of $\dot{Q}_{CH}$ where $\dot{Q}_{CH}$ is the total coolant load of all the cylinder-head component evaporators; namely, for instance, (a) mode $2^U$ or $2^U_O$ to $3^U$: $\mathring{Q}_{CH} > \mathring{Q}_{CH1}$ (b) mode $3^U$ to $2^U$ or $2^U_O$: $\mathring{Q}_{CH} < \mathring{Q}_{CH2}$, where $\dot{Q}_{CH1}$ and $\dot{Q}_{CH2}$ are preselected values of $\dot{Q}_{CH}$ and where $\dot{Q}_{CH2}<\dot{Q}_{CH1}$. Typical measures of $\dot{O}_{CH}$ include (1) the steady-state cylinder-head cooling load $(\dot{Q}_{C,SS})_H$ of all the cylinder-head component evaporators, which is computed by the CCU of a system of the invention in a way similar to that used in computing $\dot{Q}_{C,SS}$ (see immediately-preceding major paragraph); and (2) $\dot{m}_{VH}$, where $\dot{m}_{VH}$ is the total refrigerant-vapor mass-flow rate exiting all cylinder-head component evaporators, where the current value of $\dot{m}_{VH}$ can be derived by the CCU of a system of the invention from one or more refrigerant-vapor flow-rate transducers. For example, in the case of the airtight configuration shown in FIG. 63C, the current value of $\dot{m}$VHis derived from signals $F'_{VHa}$ and $F'_{VHb}$ generated by refrigerant-vapor from volumetric-flow rate transducers 700$a$ and 700$b$, respectively. Using two transducers allows the CCU of a system of the invention to check they indicate essentially equal flow rates before summing the volumetric-flow rates indicated to those signals and estimating the corresponding current value of $\dot{m}$VH. Alternatively a single refrigerant-vapor volumetric-flow rate transducer could be used and the mass-flow rate deduced from the signal generated by that transducer could be doubled by the CCU to obtain volumetric-flow rate $\dot{m}_{VH}$. (Mass-flow rate transducers can be used instead of volumetric-flow rate transducers to obtain accurate values of mass-flow rate where refrigerant vapor is dry.)

In the case where a measure of the current value of $T_W$ is supplied to the CCU of a system of the invention, a typical control technique in mode $\mathbf{3}_E$" is (1) to control one or more appropriate controllable elements of the system's principal configuration so that $\dot{m}$EHtends to $\dot{m}_{EH,MAX}$, where $\dot{m}_{EH,MAX}$ is the design maximum value of the liquid-refrigerant mass-flow rate $\dot{m}_{EH}$ supplied to all the one or more cylinder-head component evaporators; and (2) to control one or more appropriate controllable elements of the system's supplementary configuration so that the current value of $T_W$ tends to $T_{WD}$. In the last-cited typical control technique, the preselected value $T_{WD}$ of $T_W$ would be fixed where the purpose of excess overfeed is to reduce the size of the airtight configuration's condenser; and would decrease with increased cooling load where the purpose of excess overfeed is to increase volumetric efficiency at high cooling load. The current value of the cooling load $\dot{Q}_C$ can be estimated by the CCU from preselected characterizing parameters. Examples of techniques for obtaining an estimate of the current value of $\dot{O}_C$ were given earlier in this section V,H,5,b.

c. Evaporator Liquid-refrigerant Injection i. Preliminary Remarks

I mentioned in the second major paragraph of section V,F,2,c the use of nozzles to increase the velocity with which liquid refrigerant is supplied to an NP evaporator, and I have referred to those nozzles as liquid-refrigerant injection nozzles, or more briefly as LR injection nozzles.

I shall hereinafter, in this DESCRIPTION and in the CLAIMS, use the term 'evaporator liquid-refrigerant injector', or more briefly in this DESCRIPTION the term 'LR injector', to denote a device which supplies liquid refrigerant to an NP evaporator or to a mixed evaporator (see section V,H,7) through one or more orifices whose total cross-sectional area is smaller than the cross-sectional area of the inlet through which liquid refrigerant is supplied to the LR injector. The orifices of an LR injector may be merely apertures in the injector's walls, or may be the outlets of nozzles supplied with liquid refrigerant through those apertures. LR injectors can have walls of any shape; and may, in particular, have cross-sectional areas bounded only by a single external perimeter, or may have cross-sectional areas bounded by both an external and an internal perimeter. An example of an LR injector whose cross-sectional area normal to its axis is bounded by two perimeters is an injector whose cross-sectional area is an annulus between two concentric circles. I shall hereinafter refer to LR injectors supplied with refrigerant by a liquid-refrigerant header which is in essence parallel to an engine's crankshaft (axis) as 'transverse LR injectors' and to LR injectors supplied with refrigerant by a liquid-refrigerant header normal to an engine's crankshaft as 'longitudinal LR injectors'.

I distinguish between 'liquid-refrigerant local injectors', or more briefly 'LR local injectors' or just 'local injectors', and 'liquid-refrigerant distribution injectors', or more briefly 'LR distribution injectors' or just 'distribution injectors'. The local injectors have one orifice, or have several orifices, close to each other, say within one or two millimeters of each other. By contrast, the distribution injectors have several orifices distributed on the injectors' one or more surfaces over an area having at least one dimension which is a significant fraction of at least one of the, dimensions of the one or more refrigerant-passage internal surfaces of the unitary evaporator, or of the split-evaporator component evaporator, in which they are located. For example, in the case of an LR distribution injector located in the cylinder-head coolant passages of a small engine (say an engine with a displacement up to 10 liters), at least one dimension of a distribution injector is typically larger than ten millimeters; and in the case of an LR distribution injector located in the cylinder-head coolant passages of a large engine (say an engine with a displacement over 100 liters), at least one dimension of the distribution injector is typically larger than 25 millimeters. I also distinguish between (1) an LR local injector I name a 'region-injection injector', used primarily to inject liquid refrigerant in a localized region inside the refrigerant passages of the evaporator in which the region-injection injector is located, and (2) an LR local injector I name a 'surface-injection injector', used primarily to inject liquid refrigerant on, and to wet, a localized area of the internal surface of the one or more refrigerant passages of the evaporator in which the surface-injection injector is located. I further distinguish between (1) an LR distribution injector I name a 'region-distribution injector', used primarily to distribute liquid refrigerant over one or more regions inside the refrigerant passages of the evaporator in which the region-distribution injector is located; and (2) an LR distribution injector I name a 'surface-distribution injector', used primarily to distribute liquid refrigerant over, and to wet, one or more extended areas of the internal surface of the refrigerant passages of the evaporator in which the surface-distribution injector is located.

A surface-injection injector and a surface-distribution injector can be used merely to prevent the surface wetted by them becoming a hot spot by ensuring the film heat-transfer coefficient of that surface is approximately equal to the film heat-transfer coefficient it would have if it were immersed in liquid refrigerant where pool boiling prevails. Alternatively, a surface-injection injector, or a surface-distribution injector, may be used for 'evaporative spray cooling', or more briefly 'spray cooling', over a specified internal-surface area of an evaporator's refrigerant passages. In the case of a surface-distribution injector, the specified area may be only a small fraction of the internal-surface area of the evaporator's refrigerant passages over which the surface-distribution injector distributes liquid refrigerant; or the specified area may be equal to that internal-surface area.

I have used the term 'evaporative spray cooling' to denote techniques of liquid-refrigerant injection which achieve much higher heat-transfer coefficients than those achievable with pool boiling. Evaporative spray cooling, in the sense just defined, is discussed in a paper by Donald E. Tilton, J. H. Ambrose, and Louis C. Chow, 'Closed-System, High-Flux Evaporative Spray Cooling', 1989, SAE Technical Series 892316. The just-cited paper describes evaporative spray-cooling tests, with water at 100° C., in which the heat-transfer coefficients achieved were typically 1 $Mw/M^2$ with ($T_W$–$T_{RS}$) equal to about 6° C., and typically equal to 8 to 10 $Mw/m^2$ with ($T_W$–$T_{RS}$) equal to about 30° C. These results were obtained with orifices having a diameter between 0.51 mm and 0.76 mm; pressure differentials across the orifices of 1.4 to 7.5 bar; and distances of 1 cm, or of 1.5 cm, between the orifices and a test-surface area of about 1 $cm^2$ at right angles to the axis of those orifices. Spray cooling can also be used to displace refrigerant vapor at an evaporator-wall location which tends to trap refrigerant vapor and is blanketed by it, thereby causing hot spots.

ii. LR Distribution Injectors

The design, location, and number, of LR distribution injectors used for cooling (the walls of) the refrigerant passages of unitary NP evaporators, or of component evaporators of NP evaporators, depend on the particular device being cooled by the airtight configuration to which the unitary evaporator or the component evaporators belong; and often also depend on the part of the device being cooled by the airtight configuration. For example, in the case of a piston engine, the design, location, and number, of LR distribution injectors will depend not only on whether the engine is a spark-ignition engine, a direct-injection compression-ignition engine, or an indirect-injection compression-ignition engine; but will also depend on the detailed design of the particular part of each of the three general types of engine just cited; and on whether, in the case of surface-distribution injectors, spray cooling is to be achieved in addition to surface distribution. I next discuss five examples of LR distribution injectors.

Figure 64:
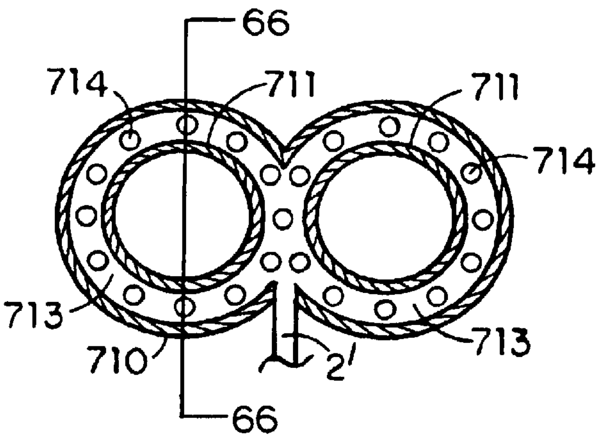
Figure 65:
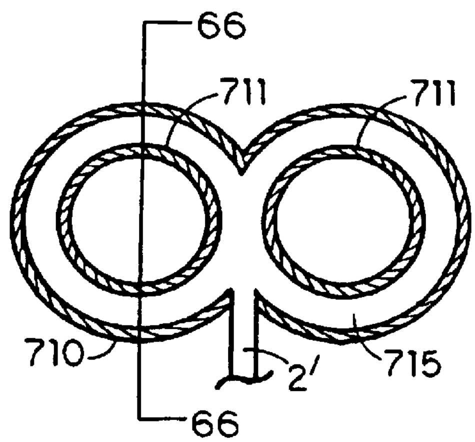
Figure 66:
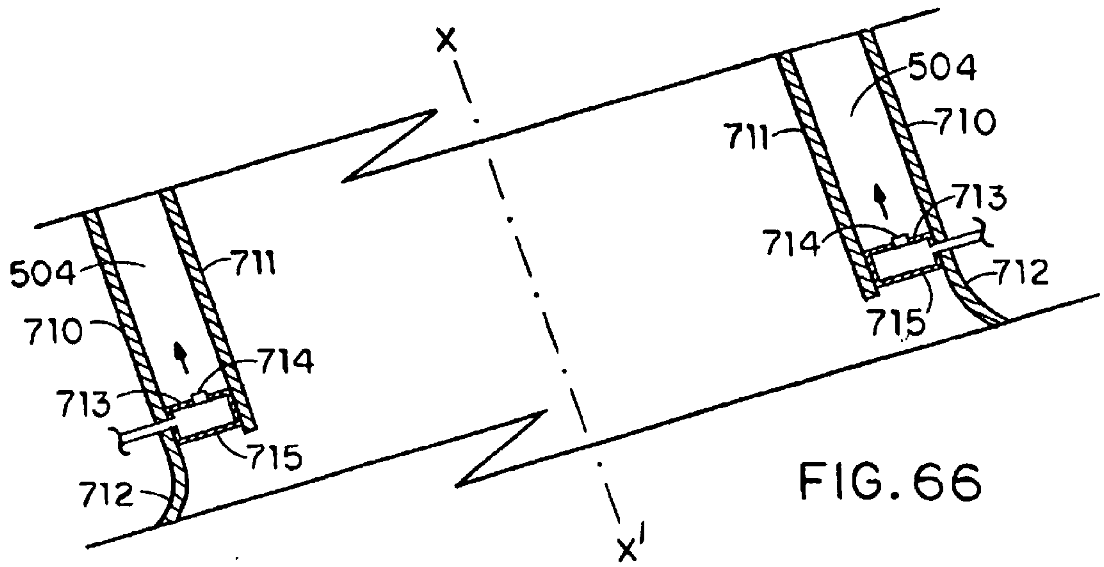

The first example uses a set of one or more region-distribution injectors merely to distribute liquid refrigerant around a piston-engine's cylinder liners. The set of one or more region-distribution injectors may be located at the crankcase end of the cylinder liners and have orifices through which exiting liquid-refrigerant jets point toward the cylinder head; or may be located at the cylinder-head end of the cylinder liners and have orifices through which exiting liquid-refrigerant jets point toward the crankcase. In the former case the cylinder-block liquid-refrigerant inlet 2' will be located at the crankcase end of the cylinder liners and, in the latter case, inlet 2' will be located at the cylinder-head end of the cylinder liners. In either case, inlet 2' will have no fewer ports than the number of distribution-injector subsets not fluidly interconnected. FIGS. 64, 65, and 66 illustrate the former case.

A plan view of the set of one or more region-distribution injectors mentioned in the immediately-preceding minor paragraph, in the case where a piston engine has two cylinders, and in the case where the set of one or more region-distribution injectors has only a single injector, is shown (1) in FIG. 64 in the case of the view obtained by looking along the cylinder liners towards the engine's crankcase, and (2) in FIG. 65 in the case of the view obtained by looking along the cylinder axes from the engine's crankcase toward the engine's cylinder head. FIG. 66 is cross-section 66—66 in FIGS. 64 and 65.

In FIGS. 64 to 66, numeral 710 designates the outer perimeter of the engine's cylinder block and numeral 711 designates the engine's cylinder liners; and in FIG. 66 numeral 712 designates a segment of the engine's crankcase. In FIGS. 64 and 66, numeral 713 indicates the region-distribution injector wall normal to the cylinder axes having orifices designated by numeral 714; in FIGS. 65 and 66, numeral 715 indicates the region-distribution injector wall normal to the cylinder axes having no orifices; and, in FIG. 66, XX' indicates the cylinder's axis which makes an angle $\phi$ (not shown) with the local vertical (not shown).

Figure 67:
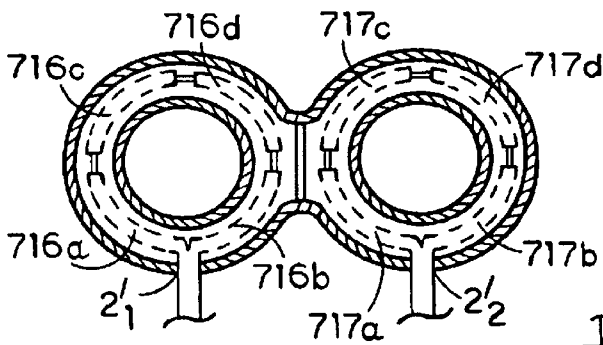

The plan view, corresponding to the plan view shown in FIG. 65, is shown in FIG. 67 for the case where (1) liquid-refrigerant inlet 2' has two inlet ports $2'_1$ and $2'_2$; (2) the set of region-distribution injectors has two subsets of non-fluidly interconnected injectors; and (3) each of the two last-cited subsets has a subset of four fluidly-interconnected injectors designated by numerals 716*a*, 716*b*, 716*c*, and 716*d*, and by numerals 717*a*, 717*b*, 717*c*, and 717*d*.

The invention includes the case where longitudinal ribs are used in the annular space between the cylinder liners and the cylinder-block outer perimeter to keep refrigerant vapor distributed evenly around the cylinder-liner perimeters even when the angle $\phi$ is not zero degrees. The last-cited ribs can be made of thermal y-conducting material in thermal contact with the liners, thereby also acting as fins used to increase the rate at which heat is transferred from the liners to the refrigerant in refrigerant passages 504.

Figure 68:
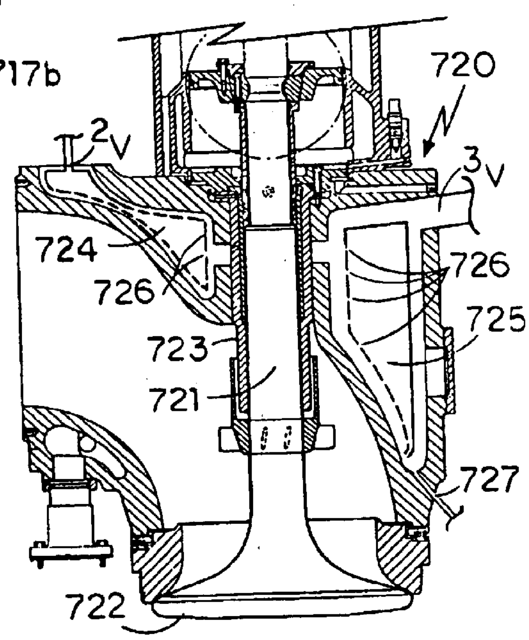

The second example, see FIG. 68, shows two cross-sections, in the same plane, of a set of surface-distribution injectors used to spray-cool housing 720 of valve stem 721 of exhaust valve 722 of a large piston-engine. The set of injectors could in principle consist of a single injector with a continuously-changing cross-section around the axis of valve guide 723. The set of injectors have on the left-hand side of valve stem 721 a cross-sectional area designated by numeral 724, and on the right-hand side of valve stem 721 a cross-sectional area designated by numeral 725. In the case where several injectors are used, they would be fluidly interconnected so that non-evaporated liquid refrigerant exiting injector orifices 726 exits at 727 (only a few orifices are designated by numeral 726). Liquid refrigerant enters the set of distribution injectors at $2_V$ and refrigerant vapor, generated by liquid refrigerant after exiting orifices 726, exits at $3_V$.

Figure 69:
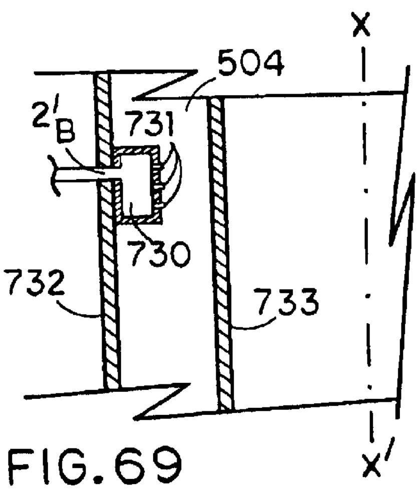

The third example uses a set of surface-distribution injectors which form an annulus inside the cylinder-block coolant passages near the cylinder head of a large piston engine. FIG. 69 shows a cross-section of refrigerant passages 504 on the left-hand side of cylinder axis XX'. Numeral $2'_B$ designates the liquid-refrigerant inlet of one or more surface-distribution injectors whose cross-sectional area in the plane of FIG. 69 is designated by numeral 730, and whose orifices in that plane are designated by 731. Numeral 732 designates a cross-section of a wall of the outer perimeter of the cylinder block in which the one or more surface-distribution injectors are located, and numeral 733 designates a cross-section of a wall of the cylinder liner.

The fourth and fifth examples use a set of one or more surface-distribution injectors to spray-cool the critical areas of the cylinder-head coolant passages of a piston engine, the remaining areas of the cylinder-head coolant passages being cooled by wet refrigerant vapor generated by jets, exiting the injectors' orifices, when they impinge on those critical areas. The location and orientation of surface-distribution injectors for the purpose just cited can be discussed only in the context of a specific cylinder-head design. In the particular case where the surface-distribution injectors have cylindrical cross-sections with a straight axis, their axes could be in one or more perpendicular, parallel, or oblique, planes with respect to the axes of a bank of cylinders.

Figure 70:
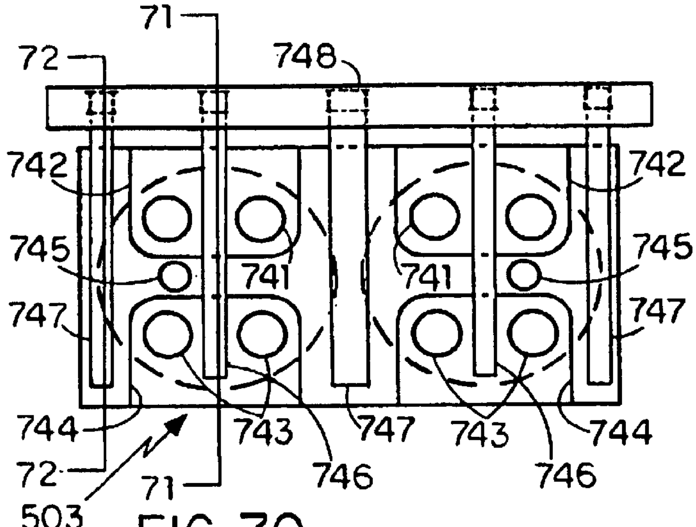
Figure 71:
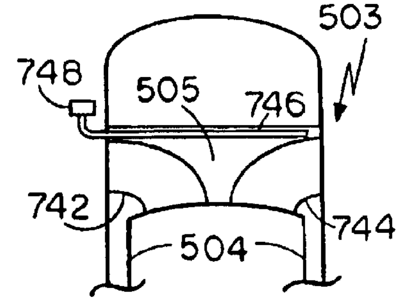
Figure 72:
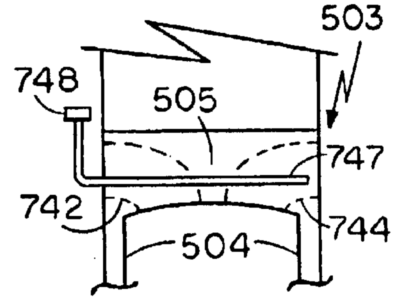

In the fourth example, the engine is a spark-ignition engine with two cylinders, two overhead camshafts (not shown), and four valves per cylinder; and the surface-distribution injectors are essentially horizontal and at right angles to the engine's crankshaft (not shown). FIG. 70 is a plan view of cylinder head 503 looking toward the cylinders from a level below the level of the springs of the engine's intake and exhaust valves. Numeral 741 designates the guides of the intake valves above intake ports 742; numeral 743 designates the guides of the exhaust valves above exhaust ports 744; numeral 745 designates spark plugs; numeral 746 designates surface-distribution injectors located between each pair of intake and exhaust-valve stems; numeral 747 designates surface-distribution injectors located on either side of each pair of intake and exhaust-valve stems; and numeral 748 designates the header which supplies liquid refrigerant to injectors 746 and 747. Injectors 746 are located at a higher level than injectors 747. FIG. 71 is cross-section 71—71 of cylinder head 503 and FIG. 72is cross-section 72—72 of cylinder head 503. I note that I have extended injectors 746 past the cylinder axes (not shown), and that I have to this end offset spark plugs 745 from those axes. However, I expect injectors 747, and wet refrigerant vapor, to be capable alone of cooling the air-intake side of the cylinder head. This would eliminate the need for extending injectors 746 past the cylinder axes, and for offsetting spark plugs 745 from those axes.

Figure 73:
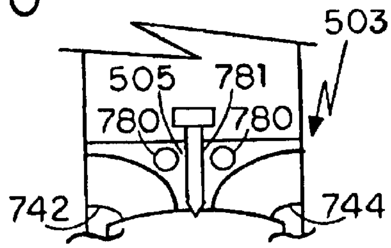

In the fifth example, see FIG. 73, the engine is a compression-ignition engine and numeral 780 designates the cross-sections of two surface-distribution injectors parallel to the engine's crankshaft. Numeral 781 designates a fuel injector; and numerals 742 and 744 designate, as in FIGS. 70 to 72, respectively, an intake port and an exhaust port.

iii. LR Pulsed Injection

A set of LR injectors, and particularly a set of (LR) surface-distribution injectors, used for cooling continuously the (walls of the) refrigerant passages of NP evaporators in general, and of NP evaporators used to cool piston engines in particular, often requires a much larger liquid-refrigerant mass-flow rate than that required for correct evaporator overfeed. (Correct overfeed in some applications may be zero.) The last non-parenthetical statement is especially true in the case of surface-distribution injectors used for spray cooling. The term 'cooling continuously', employed in that statement, is used to denote that the flow rate of (liquid-refrigerant) jets exiting the orifices of a set of LR injectors is continuous. I shall refer to the process of continuously cooling the (walls of the) refrigerant passages of an NP evaporator with LR injectors as 'liquid-refrigerant continuous injection', or more briefly 'LR continuous injection'. A set of LR injectors may be the set of one or more injectors inside a unitary evaporator, or inside a set of one or more component evaporators of a split evaporator.

LR continuous injection is often impracticable because it often requires unacceptably-large EO or DR pumps, and an unacceptably-large separating device. I have therefore devised techniques for implementing ‘liquid-refrigerant pulsed injection’, or more briefly ‘LR pulsed injection’, which relies on the thermal capacity of the refrigerant-passage walls of a unitary evaporator, or of a component evaporator of a split evaporator, to prevent the temperature of those walls differing during LR-injector jet pulses and LR-injector jet interpulse periods by an unacceptable amount.

LR pulsed injection with a pulse-train duty ratio of 0.1 should be practicable in most applications, and in particular in most piston-engine cooling applications; and a pulse-train duty ratio as small as 0.01 should be practicable in several applications. A duty ratio of 0.1, in the case of a small piston engine with a maximum speed of 100 revolutions per second, could for example be achieved at that speed with a pulse train having a pulse duration of 10 milliseconds and an interpulse duration of 90 milliseconds. Such a pulse train would require the parts of the engine cooled by jets with that pulse train to have a thermal capacity large enough for the changes in engine-wall temperature during the pulse period (100 milliseconds) to be small enough (say ±3° C.), at the highest heat-flux value, to be acceptable.

I note that in certain applications it may be desirable to use in the same evaporator, or in the same component evaporator, both LR continuous and LR pulsed injection. An example where both continuous and pulsed injection may be desirable is a cylinder-head component evaporator. For instance, pulsed injection, with a given interpulse period, may be acceptable for cooling the component evaporator's one or more cylinder-head combustion-chamber walls, but may not be acceptable for cooling other component-evaporator refrigerant-passage walls, such as the guides of the stems of exhaust-gas valves, because the temperature change, with that interpulse period, may be unacceptably high at the one or more refrigerant-side surfaces of those other walls.

I also note that in certain applications it might be desirable, practical, and affordable, to have different pulse trains for different cylinders of the same engine. The pulses of a pulse train, for each cylinder, would in the last-cited case be controlled to coincide approximately with the highest heat-flux periods at the gas-side surface of the combustion chamber of each cylinder. The information for synchronizing evaporator LR injection pulses with those highest heat-flux periods is available from an engine's management system.

To illustrate the advantages of LR pulsed injection I use, for specificity only, the example where (1) the walls of the refrigerant passages to be cooled are the cylinder-head coolant passages of a four-cylinder piston engine having a maximum total cooling load of 46.5 kw; (2) the maximum cooling load of the cylinder-head coolant passages is 0.7 of the total cooling load; (3) the higher heat-flux regions of the cylinder-head coolant passages are to be spray-cooled by surface-distribution injectors; (4) the refrigerant used as the engine's coolant is a 50% aqueous ethylene glycol solution; and (5) the refrigerant's pressure, in the cylinder-head coolant passages, is 1.013 bar at the maximum cooling load. The total condensate volumetric-flow rate in the example just given is typically 0.022 liters/sec and the corresponding cylinder-head liquid-refrigerant volumetric-flow rate is about 0.015 liters/sec.

I assume the quality $Q_{EV,H}$ of the refrigerant vapor exiting the cylinder-head evaporator or component evaporators must not exceed 0.2 to ensure the non-sprayed parts of the evaporator walls do not become hot spots. To achieve a quality $q_{EV,H}$ of 0.2, the overfeed ratio $r_{EOH}$ of those evaporators must be 4 which corresponds to a coolant-flow rate $\dot{m}_{EH}$ of 0.075 liters/sec. Each of the orifices used in the SAE paper cited earlier in this section V,H,5,c consume between 4 and 6.6 gph, namely between 0.0042 and 0.0069 liters/sec. It follows that the total number of those orifices in the cylinder-head evaporators, with an overfeed ratio of 4 and LR continuous injection, ranges between 18 (≈0.075÷0.0042) and 11 (≈0.075÷0.0069) orifices per cylinder head, namely is typically equal to 3 or 4 orifices per cylinder which is obviously too small a number to spray-cool all the surfaces subjected to high heat fluxes. Whereas the number of those orifices per cylinder, with an overfeed ratio of 4 and LR pulsed injection with a liquid-refrigerant duty ratio of 0.1, would typically be equal to 35. I note that an overfeed ratio of 4 would still only require a DR pump about one-twentieth the capacity of the circulation pump of a single-phase engine-cooling system with the same cooling capacity. I also note that a duty ratio of less than 0.1 should often be achievable.

The advantages of LR pulsed injection compared with LR continuous injection are not limited to smaller EO or DR pumps. The advantages of the former type of injection compared to the latter type of injection allows the use of a smaller separator, and also a lighter, less complex, and less expensive, separator. The reasons for the statement made in the immediately-preceding sentence are given next.

The value of $q_{EV,H}$ required to prevent hot spots occurring at a particular evaporator refrigerant-passage location, decreases—where spray cooling is not used—as the heat flux at that location increases. Usually, the heat fluxes at the internal surfaces of evaporator cylinder-head coolant passages vary, at the maximum cooling load, between a lower limit of between 0.2 and 0.3 Mw/m$^2$ and an upper limit of between 0.7 and 1.0 Mw/m$^2$.

Assume, for illustrative purposes only, that, with no spray cooling, locations (of those internal surfaces) with a heat flux of 0.4 Mw/m$^2$ require a value of $q_{EV,H}$ not exceeding 0.2 for them not to become hot spots, and that locations with the maximum heat flux, say 0.75 Mw/m$^2$, require a value of $q_{EV,H}$ not exceeding 0.05 for them not to become heat spots. And now assume that locations with a heat flux of over 0.4 Mw/m$^2$ are spray-cooled. It follows that spray cooling, with the assumptions made, increases the maximum permissible value of $q_{EV,H}$ from 0.05 to 0.2 thereby greatly reducing the size, complexity, and cost of a separator required to deliver, at the maximum cooling load, refrigerant vapor of a given quality (say a quality of 0.98).

6. Combinations with Overflow P Evaporator

Figure 74:
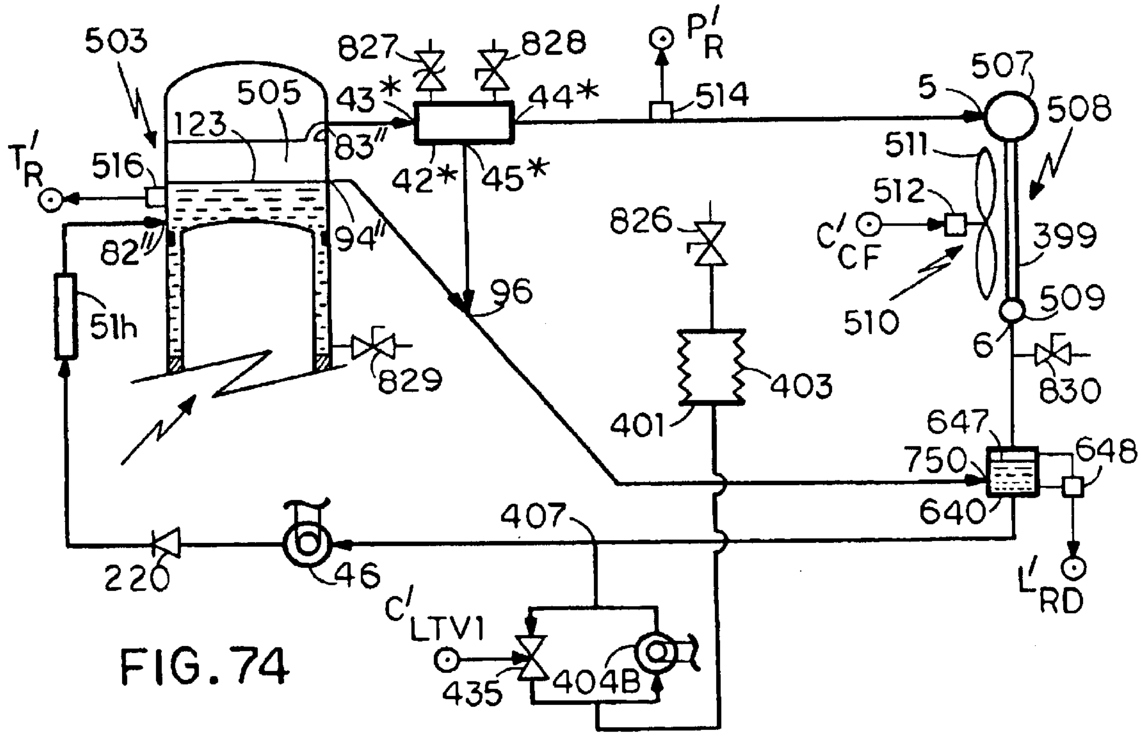

I choose as an example, see FIG. 74, an airtight configuration having, in essence, the principal configuration shown in FIG. 22 and a type $I_R$ ancillary configuration. I say ‘in essence’ because condensate receiver 7 has been turned into a dual-return receiver (designated by numeral 640) by supplying it with non-evaporated liquid refrigerant, in addition to condensed evaporated refrigerant, at point 750 located upstream from the receiver's outlet. The location of point 750 upstream from inlet-outlet port 407 ensures reservoir 401 is filled, after engine 500 shown in FIG. 74 has been started, with liquid refrigerant having a lower freezing-temperature component whose concentration is much higher than it would be if liquid refrigerant from outlet 45*, or from cylinder-head liquid-refrigerant overflow outlet 94", was returned to the principal configuration downstream from inlet-outlet port 407. This usually allows mixing-control mode 1 to be eliminated.

Engine 500 is an in-line engine which I assume, for specificity only, has 4 cylinders. The location in elevation of refrigerant inlet 82" (which may have one or more ports) assumes that (1) refrigerant passages 504 and 505 are fluidly interconnected, and that (2) refrigerant passages 504 are sized and configured to allow sewer flow to occur.

Subcooler 51_h_ is a part of a heating and cooling unit (not shown) which has one or more dampers for isolating—in known ways—subcooler 51_h_ from the cabin to which it supplies heat, and for preventing—whenever desired—ram air, or airflow induced by the heating and cooling unit's blower, flowing past the refrigerant passages (not shown) of subcooler 51_h_. (The heating and cooling unit may also include means which control the flow induced by that blower so that subcooler 51_h_ rejects heat to the ambient air. See, for example, U.S. Pat. No. 5,036,803 for the case where the engine-cooling system is a single-phase heat-transfer system.)

Engine 500 drives DR pump 46 and LT pump 404B. Whether liquid refrigerant flows from reservoir 401 toward port 407 or vice-versa depends on the size of the aperture of proportional bidirectional (two-way) LT valve 435 which is used in part as a recirculation-control valve for pump 404B. When valve 435 is fully open, the entire refrigerant configuration is at ambient atmospheric pressure minus the relatively insignificant pressure resulting from the force exerted by corrugated wall 403. Valve 435 is controlled in mode 2 so that $p_R$ tends to $p_{RD}$, and in mode 3 so that the level $L_{RD}$ of liquid-vapor interface surface 647 stays close to a preselected value $L_{RD,D}$. This can be achieved by using (1) a single proportional liquid-level transducer 113, as shown in FIG. 74, which—through the system's CCU (not shown)—controls valve 435 so that $L_R$ tends to $L_{RD}$; or (2) a single three-step liquid-level transducer, or two two-step liquid-level transducers, which help ensure $L_R$ stays between a preselected upper value $L_{R,MAX}$ and a preselected lower value $L_{R,MIN}$. Unidirectional valve 220 is needed, where pump 46 has a significant amount of slip, to prevent liquid refrigerant exiting inlet 82" when pump 46 stops running and engine 500 is hot enough to evaporate liquid refrigerant in refrigerant passages 505.

A system of the invention having the airtight configuration shown in FIG. 74 can be used with or without an MPMCU, and therefore usually has control modes 0, 2, and 3; or control modes $\mathbf{0}_0$, 2, and 3. However, where a variable-speed fan motor is not affordable, a constant-speed motor can be used instead. In this case, the system has no control mode 3; and control mode 2 is replaced by two control modes: a control mode $\mathbf{2}_A$(f) in which fan 510 does not run and control mode $\mathbf{2}_B$(f) in which fan 510 runs. In both of the two last-cited modes, valve 435 is controlled so that PR tends to $p_{RD}$. The transition rules between modes $\mathbf{2}_A$(f) and $\mathbf{2}_B$(f) are the same as those between modes 2 and 3. (I note that modes 2 and 3 could be used with a constant-speed motor where propeller 511 has controllable variable-pitch blades. I also note that modes $\mathbf{2}_A$(f) and $\mathbf{2}_B$(f) could also be used if fan 510 were driven by the engine being cooled instead of being driven by a constant-speed motor.)

Figure 74A:
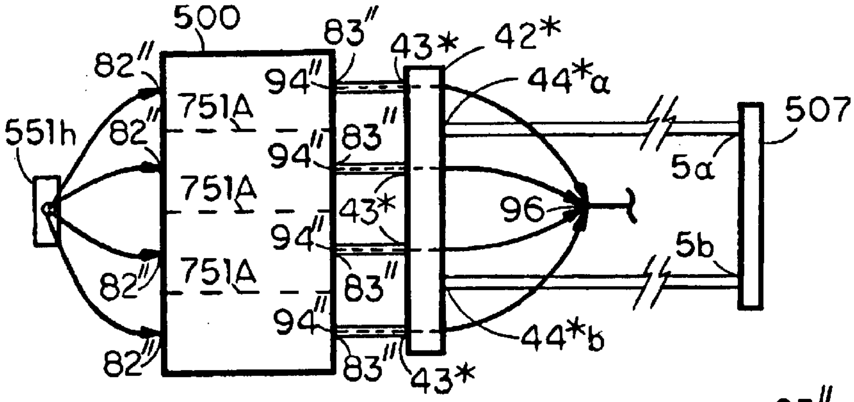
Figure 74B:
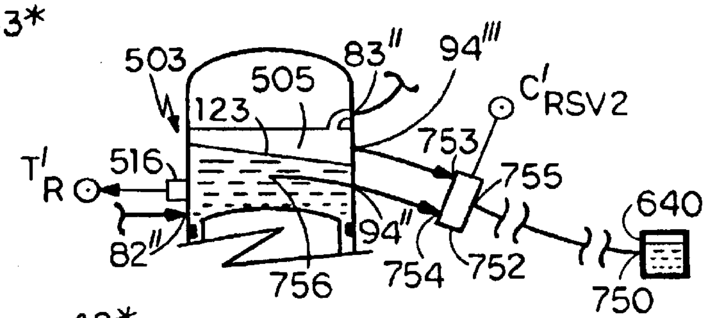

In applications where engine 500 in FIG. 74 is subjected to longitudinal engine tilts, or to longitudinal engine accelerations, which cause high heat-flux zones in the (cylinder-head) refrigerant passages 505 not to remain immersed in liquid refrigerant, those passages can be divided into two, or into four, non-fluidly-interconnected compartments—or into two, or into four, compartments separated by weirs—by for instance using respectively one or three sets of one or more transverse inserts, in the cylinder-head casting, perpendicular to the crankshaft of engine 500. A typical plan view of the liquid-refrigerant inlet and overflow manifolds, and of the refrigerant-vapor manifold, in the case where passages 505 are divided into four compartments by three sets of inserts 751A, is shown in FIG. 74A. The refrigerant-vapor transfer-means segment 44*-5 shown in FIG. 74A has two branches, designated by numerals 44*_a_-5_a_ and 44*_b_-5_b_, but could also have only one branch.

Where engine 500 in FIG. 74 is subjected to greater tilts at part load than at full load, cylinder-head outlet liquid-refrigerant overflow outlet 94'", see FIG. 74B, can be used in addition to liquid-refrigerant cylinder-head overflow outlet 94" (which corresponds to outlet 94 in FIG. 22). Outlet 94'" usually has the same number of ports as outlet 94". In FIG. 74B, the ports of outlet 94'" are connected to refrigerant-selector valve 752 by a second liquid-refrigerant overflow manifold represented by manifold segment 94111-753, and the ports of outlet 94" are connected to valve 752 by manifold segment 94"-754, where 753 and 754 are the inlet ports of valve 752 and where valve 752 also has an outlet port 755. FIG. 74B shows the particular case where overflow manifold segment 94"-96 shown in FIG. 74A extends into refrigerant passages 505 to point 756.

Figure 74C:
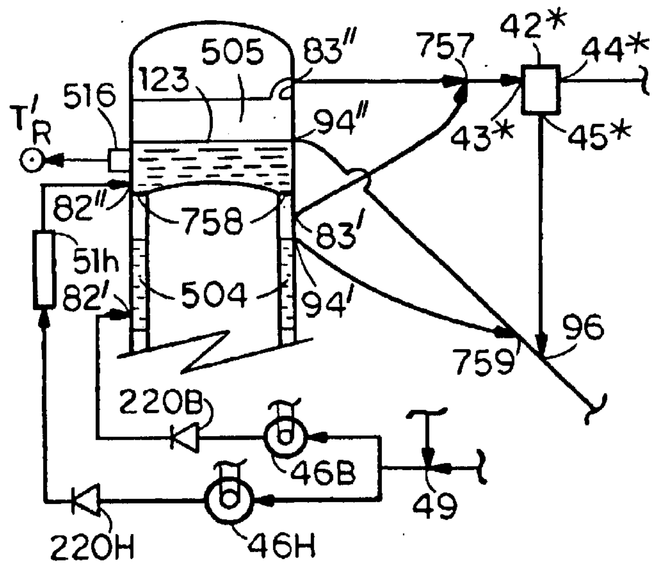
Figure 74D:
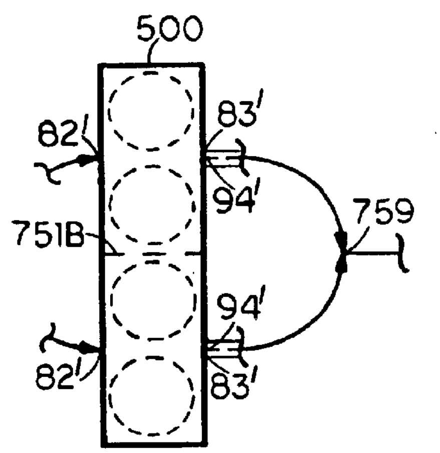

Valve 752 is controlled by signal $C'_{RSV2}$ so that when the transverse tilt $\theta_2$ of engine 500 becomes greater than a first preselected value, valve 752 connects port 753 to port 755; and so that, when the transverse tilt of engine 500 becomes smaller than a second preselected value less than the first preselected value, valve 752 connects port 754 to port 755. A measure of the current value of $\theta_2$ can be obtained from signal $\theta'_2$ generated, for example, by inclinometer 549 shown in FIG. 43K. The level $L_P$ of surface 123 shown in FIG. 74B occurs—while the principal configuration of the refrigerant configuration shown in FIG. 74B is active and either (1) valve 752 has just disconnected ports 754 and 755 and connected ports 753 and 755, and surface 123 is rising from the level of point 756 to the level of point 94'"; or (2) valve 752 has just disconnected ports 753 and 755 and connected ports 754 and 755, and surface 123 is falling from the level of point 94'" to the level of point 756.

Where desirable, manifold segment 94'"-753 can also be extended into refrigerant passages 505, and subcooler 51_h_ can, like subcooler 51 in FIG. 9, be located upstream from pump 46 (and of course downstream from dual-return receiver 640).

Where refrigerant passages 504 are not suitable for sewer flow, evaporator refrigerant inlet 82" in FIG. 74 can be relocated so that liquid refrigerant enters refrigerant passages 504 at 82' (not shown) instead of at 82". Where 82' is used instead of 82", it may be desirable to by-pass, see for example FIG. 57C, refrigerant vapor generated in refrigerant passages 504, around interconnecting ports 538.

Where such a by-pass is used, see refrigerant-circuit segment 83'-757 in FIG. 74C, interconnecting ports 538 may be replaced by partition 758 if liquid refrigerant is supplied, as shown in FIG. 74C, to both passages 504 and 505 at respectively inlets 82' and 82" (each of which may consist of one or more ports). Where ports 538 are eliminated, the evaporator in engine 500 in FIG. 47C may have one or more cylinder-block component evaporators, and one or more cylinder-head component evaporators, separated from each other by partition 758. Several cylinder-block component evaporators are formed where cylinder-block refrigerant passages 504 are compartmentalized by a first set of one or more dividers perpendicular to the crankshaft of engine 500; and several cylinder-head component separators are formed where cylinder-head refrigerant passages are compartmentalized by a second set of one or more dividers perpendicular to that crankshaft. FIG. 74D shows two cylinder-block component evaporators formed by using one set of dividers 751 B, and FIG. 74A shows four cylinder-head component evaporators formed by using three dividers 751A. (The dividers may be merely weirs.)

Cylinder-block component evaporators may be either overflow component evaporators having cylinder-block liquid-refrigerant overflow outlet 94', connected at point 759 to overflow refrigerant-circuit segment 94"-96-750, as shown in FIG. 74C, or may be component NP evaporators. In the latter case I shall refer to the evaporator in engine 500 as a 'hybrid evaporator'. In either case, pump 46 has component pumps 46B and 46H supplying liquid refrigerant to respectively inlets 82' and 82", as shown in FIG. 74C. Component pumps 46B and 46H may both, for example, be engine driven as shown in FIG. 74C.

Figure 74E:
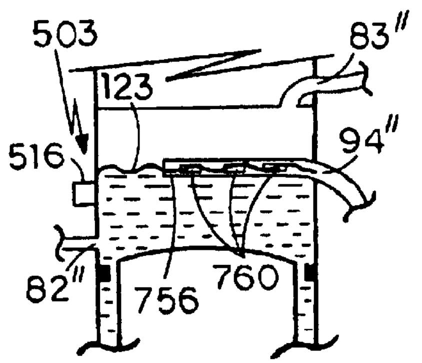

The extensions of overflow manifolds into refrigerant passages 505 may, see FIG. 74E, have their tip at point 756 closed, and horizontal apertures 760, on either side of extension 94"-756, to help maintain the mean level of liquid-vapor undulating interface surface 123 at a desired preselected level.

An overflow P evaporator can also obviously be used with an IG auxiliary configuration instead of an ancillary configuration.

Figure 74F:
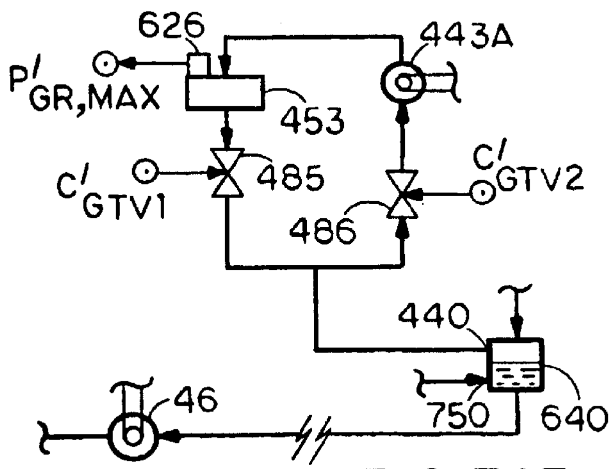

FIG. 74F, after changing 514 to 603 and $p'_R$ to $p^{*\prime}_R$, shows the particular case where the IG auxiliary configuration used is a type $IV_G$ configuration, and where GT pump 443A is driven by engine 500. The two GT valves shown in FIG. 74F are used so that $p^*_R$ tends to $p^*_{RD}$ in mode 2* and so that $p^*_{GR}$ stays close to $p^*_{GR,MAX}$ in mode 3*. One way of achieving the result recited in the immediately-preceding sentence is to use proportional GT valve 485 and on-off GT valve 486. Valve 485 is a normally-open valve controlled by signal $C'_{GTV1}$. Signal $C'_{GTV1}$ is an analog signal or a pulsed signal whose pulse duration and/or pulse frequency is varied, so that (1) in mode 2* the inert-gas flow through valve 485 is increased to achieve an increase in the current value of $p^*_R$, and vice versa; and so that (2) in mode 3* the inert-gas flow through valve 485 is decreased to achieve an increase in the value of $p^*_{GR}$ and vice versa. To this end, valve 486, which is normally closed, is controlled by signal $C'_{GTV2}$ so that valve 486 is closed whenever pump 443A is not running; and so that, whenever pump 443A is running, valve 486 is (1) in mode 2*, closed when no decrease in the current value of $p^*_R$ is desired, and open when a decrease in the current value of $p^*_R$ is desired; and (2) in mode 3*, closed when no increase in the current value of $p^*_{GR}$ is desired and open when an increase in the current value of $p^*_{GR}$ is desired. Where the rate at which a normal on-off valve opens and closes would cause undesirable transients if it were used to perform the function of valve 486, a special on-off control valve which opens and closes at a slower rate can be used to perform that function.

Where an IG configuration, instead of an ancillary configuration, is used with an overflow P evaporator, a mixing-control mode may be required. In this case an electric motor can be used to drive pump 46 in FIG. 74, or pump 46B in FIG. 74C, in (mixing) mode $\mathbf{1}^*_A$ or in (dry-up-prevention) mode $\mathbf{1}^*_B$. A way of driving pump 46 alternatively by an engine and an electric motor is described at the beginning of the seventh minor paragraph of the first major paragraph in section V,H,8. However, where a mode $\mathbf{1}^*_B$ is not required, I have devised techniques which often eliminate the need for a mixing mode. An example of such a technique in the case of a group H refrigerant is the bubble-lift technique shown in FIG. 74G. This technique uses in essence a two-port IG auxiliary configuration. The particular configuration shown in FIG. 74G eliminates the need for unidirectional valves 472 and 473 (see FIGS. 36A, 37A, 38B, 39A, and 40A.)

Figure 74G:
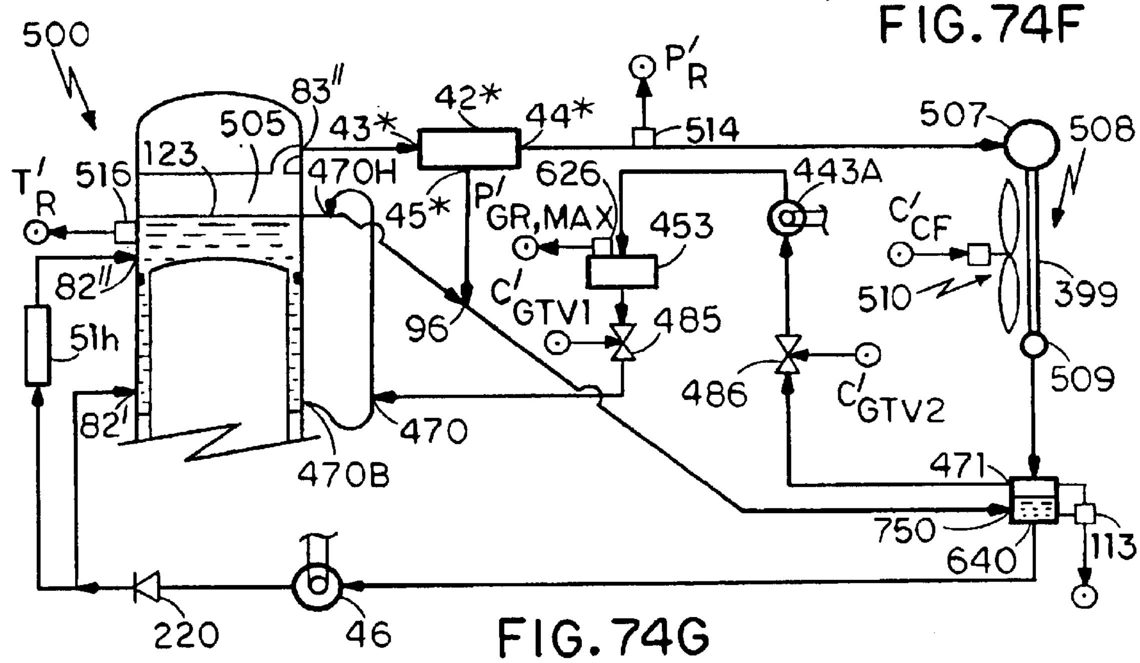

In mode 2*, whenever $p^*_R$ falls below $p^*_{RD}$, liquid refrigerant exits the refrigerant principal configuration at port 470B and enters the principal configuration at port 470H through bubble-lift R&IG-circuit segment 470B-470-470H supplied with inert gas at inert-gas inlet 470. (Inert gas exits the refrigerant principal configuration at outlet 471.) Inlet 470 is located high enough above the bottom of the U-tube shown in FIG. 74G so that most of the inert gas entering at inlet 470 flows into the refrigerant vapor-space above surface 123 through inlet 470H and not through ports 538 when the engine shown in FIG. 74G is running.

When the engine stops running, a software clock starts running for a preselected first time interval during which (normally-open) valve 485 is controlled by signal $C'_{LTV1}$ so that $p^*_R$ tends to $p^{*o}_{RD}$, where $p^{*o}_{RD}$ represents a range of preselected acceptable values which may be fixed or which may be a function of the ambient temperature $T_A$. When the clock stops running and the current value of $T_R$ falls below $T_{R,MIN}$, valve 485 is opened, the system's CCU is de-energized, and the system's control mode changes to mode $\mathbf{1}^*_{0A}$.

7. Mixed Evaporators a. Preliminary Remarks

In the case of piston engines, with intake ports and/or exhaust ports above the engines' combustion chambers, and with twin overhead camshafts, I shall distinguish between the lower deck and the upper deck of the engines' one or more cylinder heads. I make the last-cited distinction not only for four-stroke engines, but also for two-stroke engines having such ports and camshafts. An example of a two-stroke engine with either the intake ports or the exhaust ports above the engine's combustion chambers, and with twin overhead camshafts, is a uniflow scavenging two-stroke engine. (See for example Gordon P. Blair, 'Two-Stroke Engines', 1990, Society of Automotive Engineers, see page 14, FIG. 1.5.) I use the term 'cylinder-head lower deck', or more briefly 'lower deck', to denote the part of the cylinder head between the cylinder-head combustion-chamber wall and the bottom of the intake and/or exhaust-valve springs; and the term 'cylinder-head upper deck', or more briefly 'upper deck', to denote the part of the cylinder head above the bottom of the intake and/or exhaust-valve springs. The lower deck of a cylinder head, as defined herein, includes the intake ports where the intake ports are located in the engine's cylinder head, and/or includes the exhaust ports where the exhaust ports are located in the engine's cylinder head.

The P evaporators in general, and the overflow P evaporators in particular, described thus far in this DESCRIPTION usually require, in the case of several types of piston engines, a higher cylinder head than the cylinder head of an engine (of the same type) employing single-phase cooling. This is particularly true for engines with twin overhead camshafts. Whether and by how much the height of the one or more cylinder heads of the last-cited engines is greater where a cooling system of the invention with a P evaporator is used, instead of a single-phase cooling system, depends—for a given engine displacement—(1) on how large a portion of the external surfaces of the exhaust-valve stems and ports must be kept immersed in liquid refrigerant while the engines' one or more cylinder heads are hot; and (2) on whether the cylinder heads' upper deck can accomodate refrigerant-vapor outlet ports. I next elaborate on the statement made in the immediately-preceding sentence using as an example an in-line engine with twin overhead camshafts and cross-flow intake and exhaust ports.

FIG. 75 is a cross-section of the lower deck of a cylinder head in the plane of intake-valve stem 761 and of exhaust-valve stem 762. Stem 761 slides in guide 741 and is joined to intake valve 763; and stem 762 slides in guide 743 and is joined to exhaust valve 764. Wall 765 separates the cylinder head's lower and upper decks. It is often not a flat wall as shown in FIG. 75, particularly where stems 761 and 762 are not parallel to the cylinder axis ZZ'. FIG. 76 is the cross-section of the lower deck in a plane, parallel to the plane containing valve stems 761 and 762, located half-way between the axes of two adjacent combustion chambers. FIG. 76 shows only the part of the cross-section of the upper deck which contains refrigerant-vapor outlet port 767. FIGS. 75 and 76 show the usually unacceptable case where exhaust port 744 is not completely immersed in liquid refrigerant. I note that, even in the last-cited case, the available volume in the lower deck above interface surface 123 is small enough to result, at high cooling loads, in refrigerant-vapor velocities (above surface 123) high enough to induce unacceptably-high liquid-refrigerant entrainment and refrigerant-vapor pressure drops. I have therefore devised the evaporators disclosed in section V,H,7,b to mitigate, or even to eliminate, those adverse effects in in-line engines subjected to small tilts. Examples of small tilts, in the case of passenger-car engines, are the typical tilts occurring in passenger-car road-bound vehicles.

b. Description of Mixed Evaporators

One of the principal purposes of systems of the invention for cooling a piston engine of a vehicle is for those systems not to require the sizes of the cylinder-block and cylinder-head castings of the engine to be larger than the sizes of those castings if the engine were cooled by a single-phase cooling system. Whereas the last-cited purpose is usually achievable by systems of the invention having NP evaporators with LR injectors, it may often not be achievable by systems of the invention having cylinder-head component P evaporators even in the case of in-line engines subjected to small tilts. However, for certain applications an NP evaporator with LR injectors may be less cost effective than a third kind of evaporator I name 'mixed evaporator', or more briefly 'M evaporator', which combines certain features of P evaporators and NP evaporators. The applications for which M evaporators may be more cost effective than NP evaporators include cylinder-head component evaporators; and, in general, evaporators where (1) a high proportion of the internal surface of their refrigerant passages is subjected to heat fluxes high enough over a large-enough area to require the evaporator to have several surface-distribution injectors, and where (2) a substantial proportion of that area is located near the bottom of their refrigerant passages. The reason for M evaporators being sometimes more cost effective than NP evaporators, under the conditions recited in the immediately-preceding sentence, is that immersing certain high heat-flux surfaces in liquid refrigerant may be less expensive than using surface-distribution injectors to direct liquid-refrigerant jets onto those surfaces.

M evaporators are by definition 'evaporators which cool the walls of their refrigerant passages subjected to high heat fluxes in part by immersing those walls in liquid refrigerant and in part by liquid-refrigerant jets exiting LR injectors'. The refrigerant-passage walls of M evaporators subjected to low heat fluxes are cooled by refrigerant vapor which is usually wet. The boundary between high and low heat fluxes at evaporator-wall internal surfaces depends on many factors, including the kind of refrigerant used, the refrigerant's pressure, and the shape of an evaporator's refrigerant passages. But usually surfaces subjected to heat not exceeding 0.25 $Mw/m^2$ can be cooled by refrigerant vapor with reasonable velocities and vapor qualities provided those surfaces include no vapor-trapping locations; and surfaces subjected to heat fluxes exceeding 1 $Mw/m^2$ cannot usually be cooled by refrigerant vapor with reasonable velocities and qualities, particularly where those surfaces include vapor-trapping locations.

Liquid-refrigerant injection by the LR injectors of an M evaporator may be continuous or pulsed, and the LR injectors may be local injectors or LR distribution injectors. Also the LR injectors of an M evaporator can, like the LR injectors of an NP evaporator, be longitudinal injectors or transverse injectors.

FIG. 77 shows the particular case where the LR injectors are transverse LR distribution injectors. FIG. 77 shows cross-section AA of the cylinder head shown in FIG. 70 in the case of an M evaporator. Distribution injector 746 in FIG. 77 is used to inject liquid refrigerant onto one side of guides 741 and 743, onto the top of exhaust port 744, and where required onto the top of intake port 742. Injector 746 is supplied at point $2''_M$ with liquid refrigerant from header 748.

FIG. 78 is a lower-deck cross-section in the same plane as the plane of FIG. 76 for the particular case where the cylinder-head component-evaporator outlets are located on the exhaust-port side of a bank of cylinders with cross-flow intake and exhaust ports. In FIG. 78 numeral 768 designates the exhaust-manifold header, and dashed lines 744 show the outline of the cross-section of the exhaust port in the same plane as the plane of FIG. 76. FIG. 79 is the lower-deck cross-section in the same plane as the cross-section shown in FIG. 78 in the case where refrigerant-vapor outlet port 767 is located on the same side as intake-manifold header 769 instead as on the same side as exhaust-manifold header 768.

In a mixed evaporator the area of surface 123 may, as in FIG. 54, be limited by one or more weirs so that only a part of cylinder-head combustion-chamber wall 766 is immersed in liquid refrigerant. The weirs can also be used to mitigate the adverse effects of engine tilts arising from vehicle tilts, and the adverse effects of the accelerations of an engine's structure when the vehicle on which the structure is installed drives around a bend, accelerates, or decelerates. FIG. 80 shows a plan view of an example of weirs for a two-cylinder engine looking down from the upper deck toward the lower deck of cylinder head 503. The two cylinder bores are designated by numeral 771. Typical heights for weirs 599 lie between 10 mm and 20 mm in the particular case where the cylinder head of a piston engine has cylinder bores of 90 mm and distances between upper and lower decks ranging between 40 mm and 50 mm. Numeral 599A designates outer weirs which would usually be the only weirs required where the weirs are supplied with liquid refrigerant from cylinder-head component-evaporator inlets fluidly connected to the weirs, as shown for example in FIG. 54. Numeral 599B designates inner weirs, with perforations around their perimeter (not shown), which may be desirable where liquid refrigerant is supplied to the weirs by one or more liquid-refrigerant jets from a surface-injection injector, or from a surface-distribution injector. In the case where inner weirs are used, the one or more liquid-refrigerant jets would be directed toward the cylinder-head combustion-chamber surfaces enclosed by the inner weirs, and the cylinder-head combustion-chamber surfaces between a pair of inner and outer weirs would be supplied with liquid refrigerant through the inner weir's perforations and by liquid refrigerant flowing over the inner weir. (The inner weir need not have the same height as the outer weir and need not be perforated.) FIG. 81 is cross-section 81—81 of FIG. 80. FIG. 81 shows the particular case where refrigerant-vapor port 767 is located on the same side as the engine's intake ports and where weirs 599A and 599B have the shape shown in FIG. 80. No interface surface 123 is shown in FIG. 81 because no such surface exists at cross-section 81—81. In the case where a cylinder-head component evaporator is fluidly interconnected by ports 538 with a cylinder-block component evaporator, it may sometimes be desirable for the areas within weirs 599 to contain no interconnecting ports 538. Weirs 599 in FIG. 82 shows how weirs 599A, shown in FIG. 80, can be modified to accomplish the last-cited requirement.

M evaporators, like NP evaporators, can have transverse injectors or longitudinal injectors, with cross-sections having any shape, and moreover the shape of the cross-section of a particular injector may change as a function of its location along the injector's axis. Also, M evaporators, like P evaporators, can be overflow evaporators or non-overflow evaporators, where the term 'non-overflow evaporator' refers to an evaporator whose liquid-vapor interface-surface level $L_P$ is determined by a transducer which provides a measure of that level and where CR pump 10 is controlled so that the current value of $L_P$ tends to, or stays close to, a desired preselected value. I note however that, whereas the value of $L_P$ in an M evaporator with no weirs is determined by the height of the ports of liquid-refrigerant overflow outlet 94, the value of $L_P$ in an M evaporator with weirs is usually determined by the height of those weirs.

A cylinder-head non-overflow M evaporator with no interconnecting ports 538 must be supplied with a drain line for returning excess liquid refrigerant in the evaporator to the refrigerant-principal-circuit segment downstream from the refrigerant passages of the unitary condenser, or of a component condenser of the split condenser, used in the same principal configuration as the evaporator. The drain line, in the case of the M evaporator shown in FIGS. 80 and 81, would be connected to drain outlet 782 which may have one or more ports.

8. Remote Control of Liquid-refrigerant Pulsed Injection

Each of the injectors of LR-injector sets 531"*a* and 531"*b* in FIGS. 63 and 63A include—like fuel injectors used for multipoint port injection in spark-ignition engines—means for controlling the liquid jets exiting their orifices. I expect LR injectors having such means usually to be affordable at best only in large piston engines (say in engines with shaft powers of at least 2,000 kw). I have therefore devised techniques for controlling the flow of liquid exiting LR local injectors, or LR distribution injectors, remotely. These techniques can be used with LR injectors of airtight configurations employed for many applications, including for example cooling electronic equipment. Remote control of liquid flowing through the orifices of LR injectors can be used to modulate the flow continuously or discontinuously. In the latter case, the flow is modulated by varying one or more of the following three pulse-train parameters: pulse rate (or synonymously pulse frequency), pulse width, and pulse amplitude.

FIG. 83 illustrates the particular case where remotely-controlled LR pulsed injection is used to cool V engine 500 (designator 500 not shown) having cylinder banks 500*a* and 500*b* and having exhaust-manifold headers 768*a* and 768*b*. In FIG. 83, the liquid-refrigerant flow-rate through a set of cylinder-block LR injectors, designated by symbols 800'*a* and 800'*b*, is controlled remotely by injector flow-control valve 801B, and the liquid-refrigerant flow rate through a set of cylinder-head LR injectors, designated by symbols 800"*a* and 800"*b*, is controlled remotely by injector flow-control valve 801H. Injectors 800'*a* and 800'*b* may be local injectors or distribution injectors, and injectors 800"*a* and 800"*b* may also be local injectors or distribution injectors. In smaller engines, valves 801B and 801H will be valves controlled electrically and, in larger engines, valves 801B and 801H may alternatively be valves controlled pneumatically, hydraulically, or mechanically. Valves controlled electrically will usually be solenoid valves. Valve 801B has an inlet 802B and an outlet 803B, and valve 801H has an inlet 802H and an outlet 803H.

Condenser 508*h* is part of a cabin-heating and cooling unit (not shown) which has one or more dampers for isolating—in known ways—condenser 508*h* from the cabin to which it supplies heat, and for preventing—whenever desired—ram air, or airflow induced by the heating and cooling unit's blower, flowing past the refrigerant passages (not shown) of condenser 508*h*.

Liquid refrigerant generated in condenser refrigerant passages 399 of condenser 508, liquid refrigerant generated in the refrigerant passages of condenser 508*h*, and non-evaporated liquid refrigerant exiting component separators 42**a* and 42**b* respectively at 45**a* and 45**b*, is returned by gravity to condenser liquid header 509. This, in the case of a group H refrigerant, helps ensure the concentration of the refrigerant's component with the higher freezing temperature in header 509 is high enough for liquid refrigerant, trapped in header 509 while the principal configuration shown in FIG. 83 is inactive, not to freeze at low ambient-air temperatures. (The internal volume of the R&IG enclosure below the level of header 509 in FIG. 83 is made large enough to accomodate all liquid refrigerant in the enclosure below refrigerant outlet 6 of condenser 508 for the entire range of tilts for which the R&IG configuration is designed.) Returning liquid refrigerant by gravity to header 509 usually requires the use of thermostatic-type trap 804, having an inlet 805 and an outlet 806, to prevent liquid refrigerant, entering header 509 at 807, backing-up into refrigerant passages 399, and thereby to prevent the effectiveness of condenser 508 being reduced under operating conditions where this is undesirable. (Trap 804 is similar to thermostatic traps used in conventional steam-heating systems and may—like those thermostatic traps—have a bellows, or a diaphragm containing a small amount of a volatile liquid such as alcohol.)

In addition to liquid-refrigerant return paths 6*h*-808*a*-808*b*-805-806-807, 45**a*-808*a*-808*b*-805-806-807, and 45**b*-808*b*-805-806-807; drain lines 645*a*-809*a* and 645*a*-809*a* and 645*b*809*b* are used to ensure only a minimal amount of liquid refrigerant is trapped in refrigerant passages 504*a* and 504*b* when the principal configuration shown in FIG. 83 is inactive, and to return surplus liquid refrigerant to dual-return receiver 640—through condenser liquid-header 509—while that principal configuration is active. Drain outlets 645*a* and 645*b* may each have say two ports: one at each end of a cylinder bank. This reduces the amount of liquid refrigerant which can be trapped in the refrigerant passages 504 in certain cylinder-block coolant-passage configurations when engine 500 is tilted longitudinally. In the particular case where injectors 800'*a* and 800'*b* are region-distribution injectors similar to the distribution injector shown in FIGS. 64 to 67, points 645*a* and 645*b* would be located at a point above their upper surfaces 713*a* and 713*b* (not shown) corresponding to surface 713 in FIG. 66.

Refrigerant and inert-gas line 6-810 is a line with a large-enough cross-sectional area (1) to allow liquid refrigerant to be transferred from condenser refrigerant outlet 6 to dual-return receiver liquid-refrigerant inlet 810, and (2) to allow inert gas to be transferred from outlet 6 to inlet 810 and from inlet 810 to outlet 6.

DR pump 46 includes pulley-and-clutch 621 for driving the shaft of pump 46 by engine 500; and electric motor 814 for driving the shaft of pump 46 through electric-motor pulley 815 and belt 816. The clutch of pulley-and-clutch 621 is normally not engaged, and is engaged only while motor 814 drives the shaft of pump 46. (Driving the shaft of motor 814 by belt 816 while engine 500 is running is usually acceptable, and therefore usually no additional clutch is needed to isolate the shaft of electric motor 814 while engine 500 is driving the shaft of pump 46.) DR pump 46 supplies pressure regulator 817 with liquid refrigerant at inlet 818. Excess liquid refrigerant supplied to regulator 817 exits at 819 and is returned to dual-return receiver 640 at a second liquid-refrigerant inlet designated by numeral 811. Liquid refrigerant, supplied to refrigerant-control valves 801B and 801H at respectively 802B and 802H, exits regulator 817 at outlet 820 at a pressure $p_j$ whose current value is maintained, by pressure regulator 817, above the current value of the refrigerant pressure at inlet 818 by a desired preselected amount $(\Delta_{JR}p)_D$. The value of $(\Delta_{JR}p\ )_D$ is usually fixed. However, the invention includes using a pressure regulator which is controlled (see FIG. 83A) by signal $C'_{PR}$ which can change the current value of $\Delta_{JR}p$, thereby changing the amplitude of the liquid-refrigerant flow-rate pulses exiting valve 801B at 803B and exiting valve 801H at 803H. The flow rate induced by pump 46 can be much smaller (say ten times smaller) when driven by motor 814 instead of by engine 500; and the flow rate induced by pump 46, when driven by that engine, is expected to be much smaller (at least ten times smaller) than the flow rate induced by the circulation pump of a single-phase cooling system with the same cooling capacity. It follows that motor 814 is small and inexpensive, particularly since it is used only during a minute fraction of the running time of the last-cited engine during its operating life, and could therefore probably be a dc brush motor. Additionally, where (as in FIG. 83A) the value of $\Delta_{JR}p$ can be changed, the value of $\Delta_{JR}p$ required whilst pump 46 is driven by motor 814 instead of by engine 500 may be substantially smaller, thereby further decreasing the cost of motor 814.

Buffer 821 is used to store liquid during interpulse periods in variable-volume jet liquid-storage reservoir 822, and spring 823 (of buffer 821) is used to ensure liquid refrigerant is supplied (during jet pulses) to injectors 800'*a*, 800'*b*, 800"*a*, and 800"*b*, at a pressure close to $(p_R+\Delta_{JR}p)$, with the assistance of pressure-equalization line 849-850. Liquid refrigerant enters and exits reservoir 822 through inlet-outlet 824.

A system of the invention, having the R&IG configuration shown in FIG. 83, can have control modes $\mathbf{0}^*_{0A}$, $\mathbf{0}^*_{0B}$, $\mathbf{1}^*_A$, $\mathbf{1}^*_B$, 2*, and 3*, and the same transition rules as those recited under (a) to (r) in section V,G,2,b,iv. However, control mode $\mathbf{1}^*_A$; is usually not expected to be required, and therefore mode $\mathbf{1}^*_A$ and the transition rules related thereto can usually be deleted. The clutch of pulley-and-clutch 621 is engaged, and motor 814 runs, only in mode $\mathbf{0}^*_{0B}$. The remaining system-controlled elements—in the absence of means for controlling the value of $\Delta_{JR}p$ are controlled as described next.

In mode $\mathbf{0}^*_{0A}$, no system-controlled elements are controlled. In mode $^*_{0B}$, (1) valves 485 and 486 are controlled by signals $C'_{GTV1}$ and $C'_{GTV2}$ so that $p^*_R$ tends to $p^*_{RD}{}^o$ in for example the way described in the second minor paragraph of the seventh major paragraph of section V,H,6; (2) fan 510 does not run; (3) valve 801B is closed; and (4) valve 801H is controlled by signal $C'_{IH}$ so that the current value of $T_W$ rises as a preselected rate as a function of the current value of $T_W$.

In mode $\mathbf{1}^*_B$ (mode $\mathbf{1}^*_A$ is not used), (1) valves 485 and 486 are controlled so that $p^*_R$ tends to $p_{RD}{}^{o*}$; (2)fan 510 runs; (3) valve 801B is closed; and (4) valve 801H is controlled by signal $C'_{IH}$ so that the liquid-refrigerant (mean) flow-rate delivered by it is almost equal to the predetermined flow rate at which pump 46 can induce liquid-refrigerant flow while it is driven by electric motor 814.

In mode 2*, (1) valves 485 and 486 are controlled by signals $C'_{GTV1}$ and $C'_{GTV2}$ so that $T_W$ tends to $T_{WD}$ in for example the way described in the last-cited minor paragraph of section V,H,6, for making $p^*_R$ tend to $p^*_{RD}$; (2) fan 510 does not run; and (3) valves 801B and 801H are controlled by signals $C'_{IH}$ and $C'_{IB}$ in one of the ways described in section V,H,5,b for maintaining the current value of respectively the overfeed ratios $r_{EO,B}$ and $r_{EO,H}$ close to their desired preselected values. I note that, because of interconnecting ports 538*a* and 538*b*, the value of $r_{EO,B}$ affects the value of $r_{EO,H}$, but this should usually be only a second-order effect. If no ports 538*a* and 538*b* existed and refrigerant vapor outlets 3'*a* and 3'*b* were used (as for example in FIG. 63C), the values of $r_{EO,Ha}$ and $r_{EO,Hb}$ would be unaffected by the values of $r_{EO,Ba}$ and $r_{EO,Bb}$, where $r_{EO,Ha}$ and $r_{EO,Hb}$ are the overfeed ratios of the cylinder-head component evaporators, and where $r_{EO,Ba}$ and $r_{EO,Bb}$ are the overfeed ratios of the cylinder-block component evaporators.

In mode 3*, (1) valves 485 and 486 are control led by signals $C'_{GTV1}$ and $C'_{GTV2}$ so that $p^*_{GR}$ stays close to $P^*_{GR,MAX}$ in for example the way described in the last-cited minor paragraph of section V,H,6; (2) fan 510 is control led by signal $C'_{CF}$ so that $T_W$ tends to $T_{WD}$; and (3) valves 801B and 801H are controlled in the same way as in mode 2*.

Typical transitions are those recited in section V,G,2,b,iv (less the transition rules between mode $\mathbf{1}^*_A$ and modes $\mathbf{0}^*_{0A}$, $\mathbf{0}^*_{0B}$, $\mathbf{1}^*_B$, 2*, and 3*).

The invention includes, see FIG. 83B, using, instead of pump 46 shown in FIG. 83, a DR pump which includes engine-driven component pump 46C and non-engine-driven component pump 46D connected in parallel with pump 46C. Pump 46D may be driven by any means, except the engine being cooled, including an electric motor or an air motor. Pump 46D is controlled by signal $C'_{DRD}$ so that it runs only during mode $\mathbf{0}^*_{0B}$. Unidirectional valve 220A is not needed where pump 46C is a sufficiently low-slip pump for the reverse flow-rate through it to be negligible while pump 46D is running, and unidirectional valve 220B is not needed where pump 46D is a sufficiently low-slip pump for the reverse flow-rate through it to be negligible while pump 46C is running.

The invention also includes using, see FIG. 83C, two component DR pumps, pumps 46B and 46H, two buffers, buffers 821B and 821H, and two pressure regulators, regulators 817B and 817H, which supply injector flow-control valves 801B and 801H at respectively pressures $p_{JB}$ and $p_{JH}$, whose current values can be controlled independently with respect to the current value of $p_R$ at inlets 47B and 47H of respectively component DR pumps 46B and 46H. Pumps 46B and 46H are assumed to be driven by means (for example electric motors) which can, whenever required, drive pumps 46B and 46H while the engine having cylinder banks 500$a$ and 500$b$ is not running.

The invention further includes adding, as shown in FIG. 83D, subcooler 825 to the R&IG configuration shown in FIG. 83, thereby making it in essence a class $III_{FN}^{s'o}$ configuration, with a split condenser instead of a class $III_{FN}^{oo}$ configuration with a split condenser. (The component condensers of the split condenser are component condensers 508 and 508$h$.) The purpose of subcooler 825 is to assist (where required) trap 804 to operate correctly. (Subcooler 825 may merely be a finned tube.)

A perusal of the subgroup $II_{FF}$ principal configuration shown in FIG. 46A, and of the subgroup $III^*_{FN}$ principal configuration shown in FIG. 83, shows that principal configurations having an EO pump instead of a DR pump can also be used for LR injection, and in particular for LR pulsed injection. To this end, the refrigerant outlet of an EO pump would be connected to point 818 in FIG. 83, and point 819 in FIG. 83 would be connected to separator 21 instead of to dual receiver 640.

9. Separating Devices and Oil Heaters and Coolers

The location of a separating device depends, in the case of a piston engine, (1) on the location of the evaporator refrigerant-vapor outlet ports, which in turn depend on the type of piston-engine being cooled; (2) on the orientation of the engine with respect to the condenser, particularly where the condenser is an air-cooled condenser; and (3) on the location and shape of the available space for the separating device in the engine compartment. In the case where the engine has several banks of cylinders, each bank of cylinders may have its own component separating device which may be located at the side, at the end, or at the top, of a bank of cylinders. The first of the last-cited three locations is usually preferred with engines having—like most passenger-car engines envisioned by me—transverse refrigerant-vapor outlet ports. The second of the last-cited three locations is usually preferred only with certain engines, such as perhaps engines with a single overhead camshaft and uni-sided intake and exhaust ports, where a longitudinal vapor header is practicable. The third of the last-cited three locations is preferred with few engines and is unacceptable with any engine where, as in most passenger cars with in-line engines, no room is available above a bank of cylinders. (In the case of an engine having twin overhead camshafts, refrigerant vapor could be transferred to a separating device by narrow rectangular ducts between the two camshafts and between, as applicable, an engine's spark plugs or fuel injectors.)

Separating devices can have any shape and can use any known means for separating the liquid phase of a fluid from its vapor phase; and, in particular, any known means used in the steam-generating and refrigeration industries to accomplish the last-cited purpose.

I shall describe separating devices by using as examples separating assemblies. (Many separators can be derived from the separating assemblies described in this section V,H,9 merely by combining a separating assembly with a vessel, located below the assembly and fluidly interconnected with it, into a single unit.) I choose as examples of separating assemblies shapes which are unusual in the steam-heating and refrigeration industries, but which may be appropriate where (1) the engine has transverse refrigerant-vapor outlet ports, and where (2) the space available for a separating device is long—albeit possibly segmented in part—in a direction parallel to an engine's crankshaft (axis), and is short in a direction normal to the plane containing the engine's cylinder-bore axes.

Figure 84:
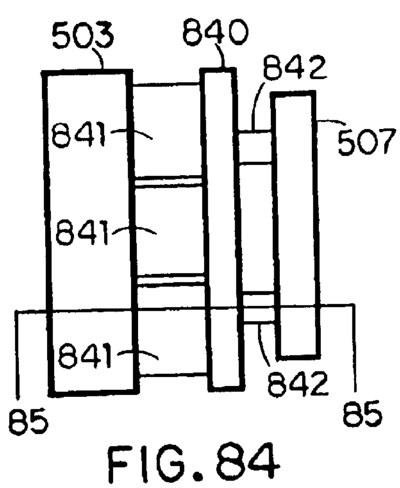
Figure 85:
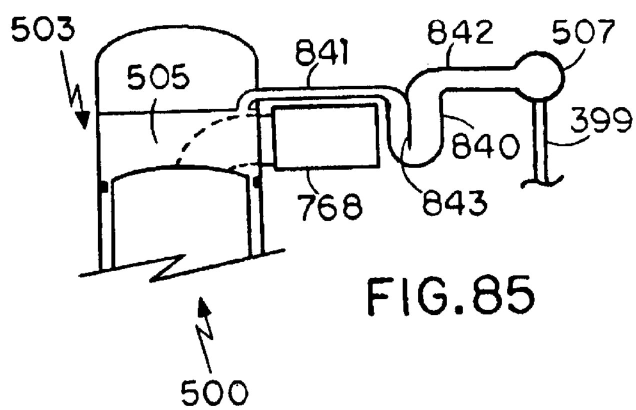
Figure 86:
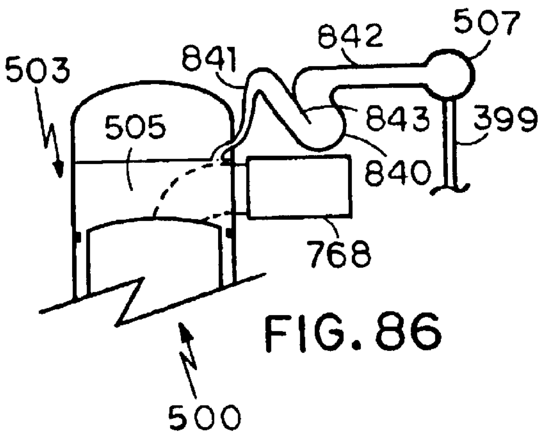

FIG. 84 shows a plan view of cylinder head 503, separating assembly 840, and vapor header 507 of an air-cooled condenser, in the case of a motor vehicle with a transversely-mounted piston engine. The numeral 840 is used to designate any separating assembly including separating assembly 21 and separating assembly 42*. Numeral 841 designates refrigerant-vapor lines through which refrigerant vapor exiting cylinder head 503 flows to assembly 840, and 842 designates refrigerant-vapor lines through which refrigerant vapor exiting assembly 840 flows to header 507. Refrigerant lines 841 are typically quasi-rectangular ducts whose dimension normal to the plane of FIG. 84 may be only 10 to 15 millimeters in the case of a 2-liter engine. FIG. 85 is cross-section 85—85 in FIG. 84 in a first case where assembly 840 is located at the side of exhaust-manifold header 768. Numeral 843 represents a baffle. FIG. 86 is a cross-section of a plan view similar to (but not the same as) FIG. 84 in a second case where assembly 840 is located above exhaust-manifold header 768. FIGS. 84 and 85 in essence apply, with one exception, to the case where cylinder head 503 is the cylinder head of an inclined bank of cylinders, as would usually be the case with a V engine. The exception is that refrigerant passages 842 and header 507 would have, with respect to cylinder head 503, a different orientation from that shown in FIGS. 85 and 86.

Figure 87:
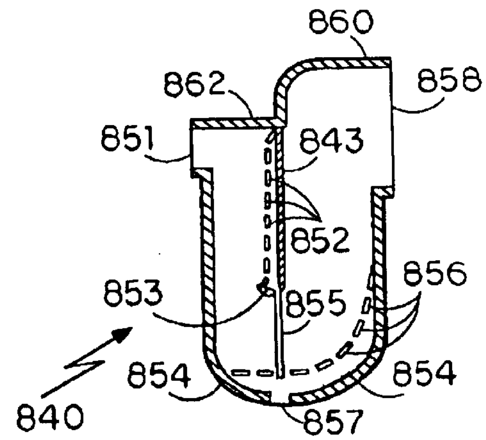

FIG. 87 shows the details of cross-section AA of separator 840 in FIG. 84. Refrigerant vapor enters separator 840 at inlet 851. Liquid refrigerant impinging on baffle 843 is trapped by wire-mesh 852 and minor trough 853, and conveyed to major trough 854 by one or more tubes 855. Residual liquid refrigerant impinging on trough 854 whilst refrigerant vapor is turning around minor trough 853 is captured by trough 854 and wire mesh 856. Liquid refrigerant in trough 854 exits assembly 840 through liquid outlet 857 having usually at least two ports: one at each end of trough 854. Refrigerant vapor, after turning around trough 853 exits assembly 840 at outlet 858.

Figure 87A:
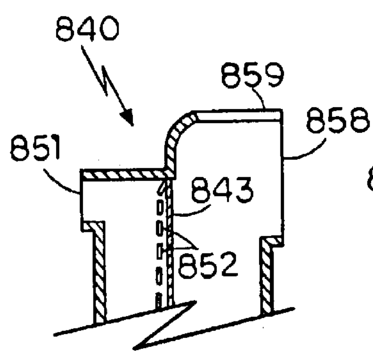

The invention includes, where desirable, means for heating an engine's (lubricating) oil with the refrigerant of an airtight configuration used to cool the engine; and in particular, means for heating the engine's oil with the refrigerant's vapor. An inexpensive way of doing this, in the case where a separating device having a separating assembly similar to that shown in FIG. 87 is used, would be to replace at least part of the separating assembly's wall downstream from outlet 857 (see FIG. 87A) with an oil-heating panel having several oil-heating passages through which engine oil flows, while the engine is warming up. The kind of panel I have in mind is similar to the panels used in the refrigeration industry as evaporators for cooling food and in the solar industry as solar collectors. (Such panels need not be flat.) FIG. 87A shows the particular case where oil-heating panel 859 replaces part of wall 860 between the top of baffle 843 and the top of outlet 858 in FIG. 87.

Figure 87B:
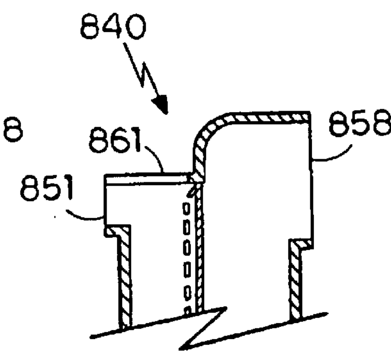

The invention also includes, where desirable and practicable, means for cooling an engine's (lubricating) oil with the refrigerant of an airtight configuration; and, in particular, for cooling the engine's oil with the refrigerant vapor of an airtight configuration. An inexpensive way of doing this, in the particular case where a separating device having a separating assembly similar to that shown in FIG. 87 is used, would be to replace at least part of a separating assembly's wall upstream from outlet 857, or to replace a baffle having at least one surface upstream from outlet 857, with an oil-cooling panel having several oil-cooling passages through which engine oil flows. FIG. 87B shows the particular case where oil-cooling panel 861 replaces wall 862 between the top of inlet 851 and the top of baffle 843 in FIG. 87. (Cooling an engine's oil with the refrigerant of an airtight configuration is obviously practicable only in applications where the oil is to be cooled to a temperature significantly above the saturated-vapor temperature of the refrigerant.)

Figure 88:
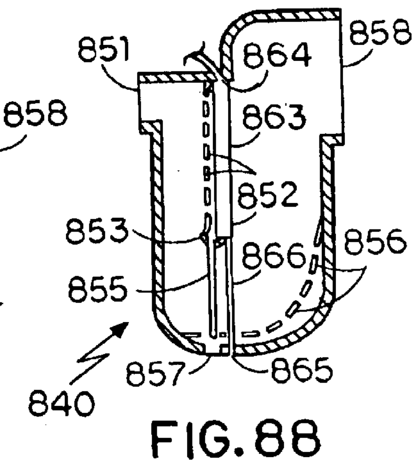

The invention further includes means for heating and cooling an engine's (lubricating) oil with the refrigerant of an airtight configuration by using the selfsame heat exchanger. FIG. 88 shows the particular case where the heat exchanger used for heating and cooling the engine's oil is a panel with oil passages used as a baffle. In FIG. 88, baffle 843 is replaced by panel 863 which can be used for heating the engine's oil while the engine is warming up and for cooling the engine's oil while the engine is hot. For example, oil entering assembly 840 at 864 and exiting the assembly at 865 after flowing through one or more tubes 866 (1) is heated, while the engine is warming up, primarily by refrigerant vapor condensing on the surface of panel 863 downstream from outlet 857, and (2) is cooled, while the engine is hot, primarily by liquid refrigerant evaporating on the surface of panel 863 upstream from outlet 857.

FIG. 89 shows diagrammatically a typical lubricating-oil heating and cooling circuit in the particular case where the same heat exchanger is used to heat and cool the engine's oil and where that heat exchanger is panel 863. Oil exiting sump 867 at 868 is induced to flow toward node 869 by oil pump 870. The flow of oil through panel 863 is controlled by proportional bidirectional valve 871 so that whenever practicable oil entering engine-block 872 at 873 has a preselected temperature which is varied in a pre-prescribed way as a function of preselected characterizing parameters. Oil is returned to sump 867 through several paths 874. On-off bidirectional valve 875 is used to prevent, whenever required, oil being supplied to panel 863.

Under certain operating conditions the current value of the quality $q_{EV}$ of the refrigerant vapor entering a separating assembly with a heat exchanger used to cool engine oil, or any other fluid, may be high enough to allow the heat exchanger to superheat refrigerant vapor exiting the separating assembly. To prevent this occurring, the invention includes means (1) for obtaining a measure of the temperature $T_{RV}$ of refrigerant vapor after it exits a separating device with an oil-cooling heat exchanger; (2) for obtaining a measure of the refrigerant saturated-vapor temperature $T_{RS}$ at a point upstream from the separating assembly; (3) for comparing the current values of $T_{RV}$ and $T_{RS}$; and (4) for increasing, whenever the current value of $T_{RV}$ exceeds the current value of $T_{RS}$, the rate at which liquid refrigerant is supplied to an evaporator (belonging to an airtight configuration having a separating device which includes an oil-cooling panel) above the rate at which liquid refrigerant would be supplied to the evaporator if the current value of $T_{RV}$ did not exceed the current value of $T_{RS}$. Acceptable measures of the value of $T_{R5}$ include (1) in the particular case of a P evaporator, or an M evaporator—where available—the temperature of the liquid refrigerant in the evaporator; and (2) in general the value of $T_{RS}$ computed from $p^*_R$ in the case of type A combinations, and from $p^*_R$ in type C combinations under conditions where $p^*_R$ is known to provide an acceptable measure of $p_R$. I next describe an example of the technique just outlined in b this minor paragraph in more detail using the R&IG configuration shown in FIG. 83D as an example.

In the case of (1) the R&IG configuration shown in FIG. 83D, (2) the control modes recited in section V,H,8, and (3) the transition rules cited in the selfsame section; the technique outlined in the immediately-following minor paragraph is used in modes 2* and 3*.

I assume for specificity only that the R&IG configuration shown in FIG. 83E is charged with a refrigerant consisting in essence, apart from inhibitors, of a 50% aqueous ethylene glycol solution, and the range of refrigerant pressures in modes 2* and 3* lies between 1 bar and 2 bar. With the two assumptions just recited, the value of the concentration of ethylene glycol in the refrigerant-vapor lines downstream from separating-assembly refrigerant-vapor outlets 44**a* and 44**b*, will lie in the range between 3% and 6% and can, if desired, be determined more accurately from available data as a function of the refrigerant-vapor pressure $p_R$ in the last-cited vapor lines. Because the value of $T_{RS}$ can be determined in the case of a non-azeotropic fluid from its pressure and the concentrations of its components, it follows that the current value of $T_{RS}$ at a given location can be computed from the current value of $p_R$ by the CCU (not shown) used with the R&IG configuration shown in FIG. 83D. Furthermore, in mode 3*, and most of the time in mode 2*, $p_R$ is equal to $p^*_R$. It follows that in mode 3*, and most of the time in mode 2*, the current value of $T_{RS}$ can be computed by that CCU from signal $p^{*\prime}_R$ provided by transducer 603. The value of $T_{RS}$ thus computed is compared by the CCU with the current value of $T_{RV}$ obtained from signal $T'_{RV}$ generated by temperature transducer 876. While the current value of $T_{RV}$ is equal to or exceeds the current value of $T_{RS}$ by an undetectable amount, signals $C'_{IB}$ and $C'_{IH}$, generated by the CCU, modulate the flow through the orifices of LR injectors 801B and 801H, respectively, so that the overfeed ratios $r_{EO,B}$ and $r_{EO,H}$ stay close to their desired preselected values. But, when the current value of the difference $(T_{RV}-T_{RS})$ becomes detectable, the CCU increases the current values of $r_{EO,B}$ and $r_{EO,H}$ so that they exceed, by a preselected amount in a pre-prescribed way, the last-cited preselected values, and continue to do so until the current value of $T_{RV}$ no longer exceeds the current value of $T_{RS}$ by a detectable amount.

10. Special Technique for Determining Liquid Level

A special technique for determining the level of liquid refrigerant in a refrigerant-circuit segment of an airtight configuration—and, in particular, in a receiver, separator, P evaporator, or M evaporator—is often preferable to alternative techniques for determining that level; and, in particular, to techniques employing float transducers.

The special technique mentioned in the immediately-preceding minor paragraph employs a differential-pressure transducer which in effect provides a measure of the weight of the column of liquid refrigerant present in a refrigerant-circuit segment beginning at a first point, hereinafter referred to in this section V,H,10 as 'the upper point', above the preselected highest level of the column, and ending at a second lower point, hereinafter referred to in this section V,H,10 as 'the lower point', at or below the preselected lowest level of the column. The last-cited measure can be obtained by two different methods. In the first of the two methods, the transducer's low-pressure port is connected to the upper point, the transducer's high-pressure port is connected to the lower point, and the refrigerant line connecting the transducer's low-pressure port to the upper point contains only refrigerant vapor. And, in the second of the two methods, the transducer's low-pressure port is connected to the lower point, the transducer's high-pressure port is connected to the upper point, and the last-cited refrigerant line contains only liquid refrigerant. With the former method, the transducer generates a signal representing a direct measure of the weight of the liquid column whose level is to be determined. And, with the latter method, the transducer generates a signal representing a measure of the absolute value of the difference between that weight and the weight of the liquid column in the refrigerant line connecting the high-pressure port to the upper point, thereby providing an indirect measure of the weight of the liquid column whose level is to be determined. Errors in determining this level, arising from changes in liquid-refrigerant density, can be corrected by measuring refrigerant pressure with an absolute-pressure transducer and adjusting, in the CCU, the measure provided by the liquid-level transducer. Errors arising from neglecting refrigerant-vapor weight can be corrected by iteration. And errors arising from changes in refrigerant-vapor density can—like errors in liquid-refrigerant density—be corrected by measuring refrigerant pressure. In most applications envisioned for airtight configurations, none of the last-cited three corrections is necessary.

I shall hereinafter refer to a differential-pressure transducer used as a liquid-level transducer as a 'differential-pressure liquid-level transducer', or more briefly as a 'PD liquid-level transducer'.

A PD liquid-level transducer using the first method described, in the immediately-preceding major paragraph, in this section V,H,10, can be employed to provide a measure of the level of any one of the many refrigerant liquid-vapor interface surfaces shown in the FIGURES of this DESCRIPTION provided (1) the transducer's low-pressure port is connected correctly to the pertinent refrigerant line at the upper point mentioned earlier in this section V,H,10; and provided (2) the refrigerant line connecting the low-pressure port to the upper point is heated sufficiently, while the principal configuration of the airtight configuration with which the transducer is associated is active, to ensure that line contains no liquid refrigerant.

Examples of the correct connection mentioned under (1) in the immediately-preceding minor paragraph are given in FIG. 57B; where numeral 832 designates a PD liquid-level transducer used to obtain a measure of $L_P$ and numeral 833 designates a PD liquid-level transducer used to obtain a measure of $L_S$; where numeral 834 designates the low-pressure port of a PD transducer and numeral 835 designates the high-pressure port of a PD transducer; and where numeral 836 designates the upper point and numeral 837 designates the lower point. The shapes of refrigerant lines 834-836 shown in FIG. 57B minimize the rate at which they need to be heated.

A PD liquid-level transducer using the second method described earlier in this section V,H,10 can be employed to provide a measure of the level of the refrigerant liquid-vapor interface surfaces shown in the FIGURES, only where (1) the transducer's high-pressure port is connected correctly to the pertinent refrigerant line at the upper point mentioned earlier in this section V,H,10; (2) the void fraction at the first point is substantially less than unity while the principal configuration of the airtight configuration with which the transducer is associated is active; and (3) the void fraction at the upper point is zero while the principal configuration is inactive. Examples of the correct connection mentioned under (1) in this minor paragraph are given in FIGS. 43M and 46H where numeral 838 designates a PD transducer providing a measure of $L_R$, The connections shown will usually ensure liquid refrigerant fills completely refrigerant line 835-836 while the principal configuration cited in the immediately-preceding sentence is active. In special cases where the last-cited connections do not ensure this, a well, such as well 838 in FIG. 57C, with where necessary baffles (not shown), can be used to accumulate liquid refrigerant, and thus ensure refrigerant line 835-836 is always filled completely with liquid refrigerant while the last-cited principal configuration is active. (Where the second method is used, the location of the upper point is limited in type C combinations to refrigerant-circuit segments which are filled with liquid refrigerant while the combinations' principal configuration is inactive.)

11. Charging Techniques for Airtight Configurations a. Preliminary Remarks

The one or more surfaces of a component of an airtight configuration intended to be in direct contact with the configuration's refrigerant and/or inert gas should usually be cleaned before the configuration is assembled. The cleaning method used depends on the one or more materials from which the last-cited one or more surfaces are made, and on the kind of refrigerant to which they will be exposed. In the case of certain metals such as aluminum and iron the invention envisions that the processes used to clean them may include steam-cleaning.

Air should be removed from the refrigerant enclosure of a refrigerant configuration before the refrigerant configuration is charged with refrigerant. Air should also be removed from the R&IG enclosure of a type C combination where the inert gas of the type C combination is initially not air. Any applicable known techniques may be used to remove the air from the two last-cited enclosures, including removing the air from them with a vacuum pump, or flushing the air out of them with an inert gas.

b. Type A Combinations

I choose the case where a type A combination is used to cool a piston engine. However, the outline of the typical technique described next also applies to type A combinations for most other applications.

For specificity, I discuss the last-cited technique in the context of the refrigerant configuration shown in FIG. 74 where numerals 826, 827, 828, 829, and 830, designate respectively an access (charging) valve, a pressure-relief valve, a first flush valve, a second flush valve, and a purge valve. Valve 828 is not needed where the air in a refrigerant configuration's enclosure is removed by a vacuum pump and not by flushing the air out of the enclosure. The techniques for removing air from an airtight configuration's enclosure with a vacuum pump, or by flushing it out with an inert gas or the vapor of the refrigerant with which it is to be charged, are well known, and are, for example, used in climate-control and refrigeration systems. I therefore shall not describe them in this DESCRIPTION. (Where air is removed by flushing, pressure-relief valve 827 can also be used to perform the function of a flush valve by providing it with, for example, manual means for opening it while a refrigerant configuration is being flushed.) Valves 827 and 828 are located in FIG. 74 on separating assembly 42 on the assumption the refrigerant space at the top of assembly 42 is the highest location of the configuration's refrigerant enclosure. I note that a second flush valve would often not be needed. For example flush valve 829 would not be needed in FIG. 74C.

Where air in the refrigerant configuration shown in FIG. 74 has been removed, by flushing with an inert gas, additional inert gas is inserted in the configuration until the pressure reaches a preselected test pressure. Typical values for the preselected test pressure lie between 2 and 3 bar (absolute) in the case where the refrigerant is an aqueous ethylene glycol solution. The preselected pressure is achieved by, for example, applying the necessary external force on reservoir 401.

After a successful pressure test, (1) liquid refrigerant is inserted at 828 and inert gas exits as 826 until liquid refrigerant starts exiting at 826, (2) whilst the internal volume of reservoir 401 is maintained at a first minimal preselected value (say equal to 10% of the reservoir's maximum internal volume), liquid refrigerant is inserted at 826 until liquid refrigerant exits at 828, and (3) engine 500 in FIG. 74 is started and run to purge residual inert gas inside the enclosure of the refrigerant configuration shown in FIG. 74. To this end, as soon as refrigerant vapor starts being generated (as indicated by a substantial increase in refrigerant pressure), valve 830 is cracked open and kept open until liquid refrigerant starts exiting at 830. After the engine has been stopped, the amount of liquid refrigerant inside the refrigerant configuration's enclosure is, whenever necessary, adjusted to ensure the amount of liquid refrigerant in the reservoir is no less than a second preselected minimal amount (say equal to 5% of the reservoir's maximum internal volume). Valve 435 is kept open, during flushing where used, and during all the operations recited above in this minor paragraph.

c. Type C Combinations with Complete Minimum-pressure Maintenance

To discuss charging techniques for type C combinations, I distinguish between the case where the inert gas used with a type C combination is air and the case where the inert gas used with a type C combination is not air. And, in the latter case, I distinguish between the case where the R&IG enclosure of a type C combination can be evacuated and the case where that enclosure cannot be evacuated.

In the case where the inert gas employed is air, I insert a preselected mass of refrigerant into the R&IG enclosure of a type C combination and allow displaced air in the R&IG enclosure to escape through an appropriately located flush valve. I then add air to, or remove air from, the R&IG enclosure until the total pressure inside the enclosure is equal to a predetermined charging value for the enclosure's current temperature. In cases where, at the ambient atmospheric temperature, the vapor pressure of the refrigerant employed is not substantially higher than the ambient atmospheric pressure, it may be desirable or even necessary either (1) to heat the refrigerant being inserted into the R&IG enclosure, or (2) to connect a vacuum pump to the last-cited flush valve and to use the pump to lower the total pressure inside the enclosure.

In the case where the inert gas employed is not air and the R&IG enclosure used can be evacuated, it is usually preferable to remove air from the R&IG configuration by evacuating it instead of flushing air out of it. In the case where an R&IG configuration is evacuated, a preselected mass of refrigerant is inserted into the R&IG enclosure after the enclosure has been evacuated, and then inert gas is added until the total pressure inside the enclosure is equal to a predetermined charging value for the enclosure's current temperature.

In the case where the inert gas employed is not air and the R&IG enclosure used cannot be evacuated, air is flushed out of the enclosure, with the inert gas to be employed, before inserting a preselected mass of refrigerant into the enclosure. Inert gas is then added to, or removed from, the R&IG enclosure until the total pressure inside the enclosure is equal to a predetermined value for the enclosure's current temperature.

In all of the foregoing three cases the R&IG enclosure is tested under pressure for leaks, with an appropriate gas, before refrigerant is inserted into the enclosure.

12. Orientation of Cylinders Cooled by Non-pool Evaporators

P evaporators and M evaporators severely limit the orientation of the cylinders of a piston engine cooled by them. This is true even where, at considerable additional cost, the level of the liquid-vapor refrigerant in each cylinder is controlled independently. (See, for example, U.S. Pat. No. 4,584,971 (Neitz et al) 29 Apr. 1986.) By contrast, NP evaporators in no way limit the orientation of those cylinders provided their refrigerant passages are configured appropriately and equipped with appropriately-located refrigerant inlet and refrigerant outlet ports.

Figure 90:
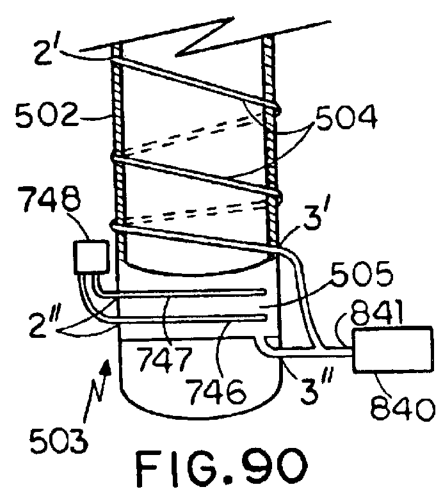

FIG. 90 shows the particular case where cylinder head 503 is below the cylinder block; where cylinder block 502 is cooled by refrigerant passages 504 forming a variable-pitch helix round a single cylinder, the pitch decreasing as it progresses from liquid inlet 2' to vapor outlet 3'; and where cylinder head 503 is cooled by LR injectors 746 and 747 supplied with liquid refrigerant by header 748. Refrigerant vapor generated in refrigerant passages 505 of cylinder head 503, exits at 3" and, like refrigerant vapor exiting at outlet 3', enters separating assembly 840 at 841.

Figure 91:
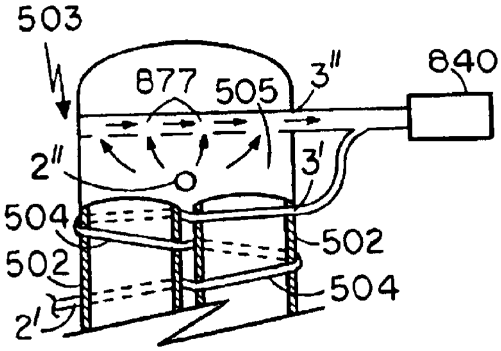

FIG. 91 shows the particular case where cylinder head 503 is above cylinder block 502; where cylinder block 502 is cooled by refrigerant passages 504 forming several variable-pitch helical-like curves which surround several cylinders; and where longitudinal refrigerant-vapor header 877 is used to remove refrigerant vapor from refrigerant passages 505. Liquid refrigerant enters at inlets 2' and 2" and refrigerant vapor exits at outlets 3' and 3".

Figure 93:
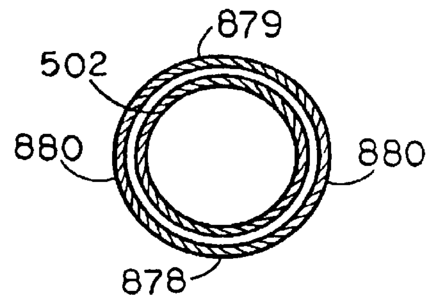
Figure 92:
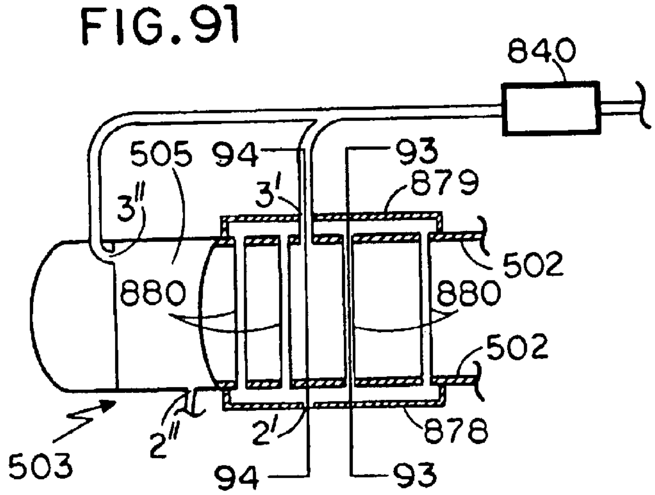
Figure 94:
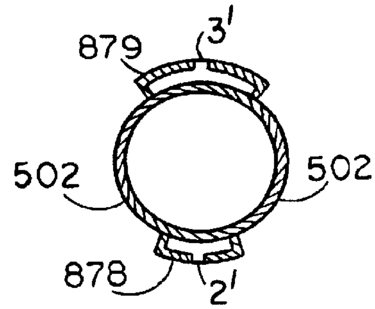

FIG. 92 shows the particular case of a piston engine with horizontally-opposed cylinders (only one cylinder shown) where the cylinder-block refrigerant passages form liquid-refrigerant header 878, refrigerant-vapor header 879, and interconnecting refrigerant passages 880 which are collectively the refrigerant passages of cylinder block 502. FIGS. 93 and 94 are cross-sections 93—93 and 94—94, respectively, in FIG. 92. There are no identifiable boundaries in the plane of FIG. 93, between headers 878 and 879 on the one hand and refrigerant passages 880 on the other hand.

I. Type A and Type C Combinations for Other Systems

1. Preliminary Remarks

I have so far discussed complete minimum-pressure maintenance, self regulation, and refrigerant-controlled heat release, or more briefly RC heat release, only in the context of (internal-combustion) piston-engine cooling and intercooling systems. Furthermore, I have restricted the piston-engine cooling and intercooling applications discussed to those where complete minimum-pressure maintenance and self regulation are always required, and where RC heat release is usually also required. However, from my teachings in sections V,F and V,G, it should be clear to those skilled in the art how type A, or type C, combinations can be used in piston-engine cooling and intercooling applications where only complete minimum-pressure maintenance and self regulation, or where only RC heat release and self regulation, are required.

2. Other Cooling and Intercooling Systems

It should be obvious, from the last-cited teachings, how a type A, or a type C, combination can be used to cool the stationary parts of motors, other than (internal-combustion) piston engines, such as internal-combustion rotary engines, gas turbines, and electric motors. It should also be obvious, from the last-cited teachings, how a type A, or a type C, combination can, where applicable, be used for intercooling motors other than piston-engines; for example for intercooling internal-combustion rotary engines or for intercooling gas turbines. It should further be obvious from those teachings how a type A, or a type C, combination can be used to cool electronic equipment such as computer chips, infrared arrays, and superconductors, and to cool the product of an industrial process. I therefore, in the examples given next in this section V,I,2, merely show typical interconnections between the principal configuration of an airtight configuration of the invention and several different kinds of devices other than piston engines.

FIG. 95 shows the particular case where the internal-combustion rotary engine being cooled is Wankel engine 884 having a stator containing two separate and distinct sets of coolant passages forming two component NP evaporators designated by the symbols 1A, and 1B, having respectively refrigerant inlets 2A, and 2B, and refrigerant outlets 3A, and 3B. Component NP evaporators 1A and 1B are a part of a type C combination having a class $III^{*}_{FN}{}^{oo}$ principal configuration and a type $I_G$ ancillary configuration. Component evaporators 1A and 1B are supplied with liquid refrigerant by respectively component DR pumps 46A and 46B. Where engine 884 is located in a heated building, the refrigerant employed would usually be water.

An electric motor, an electric generator, a computer, or another heat-generating equipment, is sometimes located in an enclosure into which air cannot enter to cool the heat-generating equipment. In such cases, a system of the invention with an air-cooled condenser can be used to cool that equipment; and, where the equipment is installed on an automotive vehicle including an electric motor driving the vehicle, ram air generated by the vehicle's motion can be used to assist in cooling the equipment. Where the automotive vehicle is a boat or a ship, a condenser cooled by (usually treated) sea water can often be employed instead of an air-cooled condenser.

FIG. 96 shows the particular case where an electric motor and generator set are located in acoustically-insulated enclosure 885, the set including electric motor 886 driving electric generator 887 through shaft 888. Coolant passages (not shown) in the stationary part of motor 886, and coolant passages (also not shown) in the stationary part of generator 887, are component evaporators of the R&IG configuration shown in FIG. 96, which has a class $III^{*}_{FN}{}^{oo}$ principal configuration and a type $I_G$ IG configuration. Liquid refrigerant enters the coolant passages of motor 886 and of generator 887 at 2A and 2B respectively; and refrigerant vapor exits the former coolant passages at 3A and the latter coolant passages at 3B. Condenser 508 is cooled by air flowing through duct 889.

FIG. 97 shows the particular case where LR distribution injectors 890, having nozzles 891, are used to spray-cool electronic components (not shown) mounted on electronic circuit-boards 892 in enclosure 893. (To avoid crowding FIG. 97 only 4 nozzles are designated by numeral 891 and electronic circuit-board interconnections are not shown.) Injectors 890 are supplied with liquid refrigerant through header 894. DR pump 46 supplies liquid refrigerant to header 894 at 895. Unidirectional GT pump 443A and bidirectional GT valve 475 are controlled so as to maintain the circuit boards 892 at a preselected temperature in mode 2*, and so as to keep $p^{*}_{GR}$ close to $p^{*}_{GR,MAX}$ in mode 3*. Non-evaporated liquid refrigerant accumulating in trough 896 is maintained at level 897 by overflow-return line 894-49-750. Fan 510 does not run in mode 2* and is controlled so as to maintain circuit boards 892 at the preselected temperature in mode 3*.

I note that the refrigerant employed depends on the temperature at which the components of circuit boards 892 are to be maintained. If those components include low-temperature superconductors, an appropriate refrigerant would be helium; if they include high-temperature superconductors, an appropriate refrigerant would be nitrogen; and if they include neither of the last-cited two superconductors, an appropriate refrigerant would often be a fluorinert coolant.

FIG. 98 shows the stationary part of the expander of a gas turbine being cooled to say c 800° C. by a first type A combination; and the compressed air, exiting at say 190° C. the first stage of the turbine's two-stage compressor, being intercooled to say 75° C. with a second type A combination. A type C combination can be used instead of a type A combination where freeze protection, in the sense described under (a) to (e) in section III,E, is not required.

Numeral 900 designates the gas turbine's expander, numeral 901 designates the turbine's first-stage compressor, and numeral 902 designates the turbine's second-stage compressor. Air exiting compressor 902 at 903 is supplied to expander 900 at 904 after being heated by combustor 905.

The cooling system employs a liquid metal as its refrigerant; includes a CCU (not shown); and has a class $III_{FN}$ principal configuration, and a type $II_R$ or a type $III_R$ ancillary configuration designated by the numeral 909. (A type $II_R$ or a type $III_R$ ancillary configuration is usually preferred where a type A combination employs a liquid metal as its refrigerant.) The refrigerant passages of an NP evaporator are formed inside the stator of expander 900. The NP evaporator has a refrigerant inlet designated by numeral 2 and a refrigerant outlet designated by numeral 3. Freeze protection where required is achieved in a way similar to that described in section V, I,3,c,ii.

The intercooling system includes a CCU (not shown), intercooler air-cooled condenser **508*i*, intercooler type 2 separator 42*i*, intercooler DR pump 46*i*, intercooler fan 510*i*, intercooler fixed-volume LR reservoir 424*i*, and intercooler LT pump 404*i*. The intercooling system also includes block 906*i* representing an assembly which includes, for example, intercooler intake-air section 560*i* and intercooler evaporator 561*i* shown for instance in FIGS. 52 and 62. In block 906*i*, intercooler evaporator refrigerant passages 102*i* correspond to the refrigerant passages (not shown in FIGS. 52 and 62) of evaporator 561*i*, and intercooler evaporator fluid passages 272*i* correspond to the air passages (also not shown in FIGS. 52 and 62) of evaporator 561*i*. Compressed air exiting compressor 901 at 907 is supplied to compressor 902 at 908 after being cooled while passing through fluid passages 2721**. Suitable refrigerants for the intercooling system include ethanol, methanol, and acetone.

3. Heating and Heat-recovery Systems a. Preliminary Remarks

I shall use a heating, or a heat-recovery system, to illustrate techniques of the invention for achieving (1) partial minimum-pressure maintenance in the case of a type A or a type C combination, and (2) freeze protection and refrigerant-controlled heat absorption, or more briefly RC heat absorption, in the case of a type A combination.

Heating and heat-recovery systems differ fundamentally from cooling systems only in that, in the case of the former systems, the thermal capacity of their principal heat sink is finite; whereas, in the case of the latter systems, the thermal capacity of their principal heat sink is quasi-infinite. It follows that the airtight configurations and control techniques disclosed in sections V,F to V,H can mutatis mutandis also be used, in heating and heat-recovery applications, to achieve complete minimum-pressure maintenance and self regulation with a type A, or with a type C, combination, and RC heat release with a type A combination. It also follows that my teachings given next in sections V,I,3,b to V,I,3,e can be used to achieve, in cooling and intercooling applications, partial minimum-pressure maintenance with a type A, or with a type C, combination, and RC heat absorption with a type A combination. I shall therefore not describe (1) complete minimum-pressure maintenance, self regulation, and RC heat release, in heating and heat-recovery systems; and (2) partial minimum-pressure maintenance, freeze protection, and RC heat absorption, in cooling and intercooling systems.

b. Type A Combinations with Partial Minimum-pressure Maintenance.

i. Preliminary Remarks

Type A combinations with a partial minimum-pressure-maintenance capability are, for example, particularly cost effective where (a) the total internal volume $V_{RVT}$ of their principal-configuration refrigerant-circuit segments containing refrigerant vapor in their self-regulation mode is large (say exceeds two liters), and where the internal volume $V_{RVP}$ of the parts of $V_{RVT}$ susceptible to air ingestion is much less than $V_{RVT}$; or where (b) the parts of their principal-configuration refrigerant-circuit segments susceptible to air ingestion are limited to segments completely filled with liquid refrigerant while type A combinations are in (1) their self-regulation mode, and while (2) they are inactive.

The example discussed in section V,I,3,b,ii belongs to the case cited under (b) in this minor paragraph.

ii. System for Generating Steam with Recovered Radiant Heat

The specific example chosen is a system—which I shall hereinafter refer to in this section V,I,3,b,ii, as 'the system'—for recovering radiant energy and for utilizing the recovered radiant energy to generate saturated steam in the temperature range between say 145° C. and 220° C. (Examples of radiant heat are solar radiant energy, and the radiant energy emitted by steel slabs and blooms in a steel-making plant.) But the partial minimum-pressure-maintenance technique discussed next would usually be affordable with any other system having non-airtight components in only principal-configuration refrigerant-circuit segments completely filled with liquid refrigerant while the system is active and is in its self-regulation mode, and while it is inactive. A similar technique may also be affordable with a system having non-airtight components in principal-configuration refrigerant-circuits filled only partially with liquid, or even containing no liquid, while the system is inactive—provided the total internal volume of those segments is small enough for the system's LR reservoir and LT pump to be affordable.

I assume the system is installed in a heated building, and that therefore a suitable refrigerant is water. (In the case where the radiant energy is solar radiant energy, the refrigerant passages of the system's solar collector, and the refrigerant lines associated with the solar collector, would be located and sloped so that no liquid refrigerant remained in them after the system is de-activated. (See U.S. Pat. No. 4,358,929 (Molivadas), 16 Nov. 1982.)

Typical water saturated-vapor temperatures for generating steam between 145° C. and 220° C. lie, at the design maximum heat-transfer rate, in the range between 175° C. and 250° C. Refrigerant circuits using water with saturated-vapor temperatures in the range between 175° C. and 250° C. usually have steel pipes with welded-steel joints, and therefore their piping should—with a large margin of safety—be immune to air ingestion, while inactive, at ambient temperatures found inside heated buildings. (The vapor pressure of water at 10° C. exceeds 0.01 bar.) However, the foregoing circuits may include the refrigerant passages of components such as refrigerant pumps or refrigerant valves which may, as in the example discussed next, be unavailable or unaffordable where required to be airtight while the system is inactive.

In FIG. 99, radiant-energy-heated evaporator 924 absorbs heat from a radiant source of heat, and the system's refrigerant transfers the recovered radiant heat to fluid passages 281 of steam-generating condenser 925. The system shown in FIG. 99 has a class $III_{FN}$ configuration and a type $III_R$ ancillary configuration.

The system's non-airtight components are DR pump 46, (liquid-refrigerant) flow-rate transducers 141 and 143, and service valves 926, 927, and 928. The refrigerant-circuit segment with the non-airtight components can be isolated, while the system is inactive, with (glandless) bidirectional liquid-isolating valve 929 and unidirectional liquid-isolating valves 930 and 931. The refrigerant principal circuit (of the principal configuration) also includes a refrigerant absolute-pressure transducer 932 which generates a signal $p_R^{is'}$ providing a measure of the refrigerant pressure $p_R^{is}$ in the liquid-refrigerant circuit segment isolated by valves 929, 930, and 931, while the system is inactive. DR pump 46 is controlled as a function of the flow rates $F_{DR}$ and $F_{EO}$ obtained (by the system's CCU) from signals $F'_{DR}$ and $F'_{EO}$, respectively, generated by flow-rate transducers 141 and 143 respectively. Techniques for controlling pump 46, as a function of $F_{DR}$ and $F_{EO}$, so that self-regulation conditions (A) to (D) are satisfied, have already been disclosed in this DESCRIPTION. The ancillary configuration includes (glandless) refrigerant-isolating valve 933. While the system is active, valve 929 is open, and valve 933 is closed. (Valve 933 isolates $L_R$ reservoir 401 from the high refrigerant operating pressures in the principal configuration, thereby allowing a less expensive reservoir to be used.)

Cold water enters fluid passages 281 after passing through three-way cold-water valve 304 having water inlet 935 and water outlets 936 and 937. Valve 304 is used to bypass cold water around fluid passages 281. Fuel-fired steam boiler 940 is used to supplement, as required, heat supplied by the system. (Boiler 940 may be a fire-tube or a water-tube boiler for the lower part of the range of saturated-vapor temperatures given in section V,I,3,b,ii, but would be a water-tube boiler for the upper part of the range of saturated-vapor temperatures given in the last-cited section.) Techniques similar to those described in section V,Q of my co-pending U.S. patent application Ser. No. 400,738, filed 30 Aug. 1989, can for example be used to ensure boiler 940 provides the supplementary heat necessary to ensure steam is supplied at the required mass-flow rate and pressure to the utilizing equipment or process (not shown) while the system is (1) supplying no heat, (2) supplying only preheated water, or (3) supplying steam at an inadequate temperature, or at an inadequate rate. (The interconnections shown in FIG. 99 between points 283, 314, 941, 942, and the location labelled 'steam out', are intended to be merely conceptual. For typical details see, for example, section V,Q of the DESCRIPTION of the last-cited co-pending U.S. patent application.)

For specificity, I first consider the case where evaporator refrigerant passages 102*a* to 102*f* are located low enough for them to contain liquid-refrigerant at start-up. In this case, the following start-up and shut-down procedures can be used. (Line LL' indicates the level of liquid-refrigerant in the principal configuration while it is inactive.)

When the radiant heat source is turned on, valve 929 is opened, valve 933 is closed, and pump 46 is started, as soon as the refrigerant pressure $p_R^{is}$ exceeds $p_{RD}^{is}$ by a first preselected positive amount, where $p_{RD}^{is}$ is the preselected desired value of $p_R^{is}$ while the system is inactive.

When the radiant heat source is turned off, pump 46 continues to run, valve 829 stays open, and valve 933 stays closed, while $p_R^{is}$ stays at or above $p_{RD}^{is}$ plus a second preselected positive amount smaller than the first preselected positive amount. When $p_R^{is}$ falls below $p_{RD}^{is}$ plus the second preselected positive amount, pump 46 stops running, valve 929 closes, and valve 933 opens. Thereafter, while the radiant source of heat stays turned off, air-transfer pump 420 is controlled so that (the value of) $p_R^{is}$ tends toward $p_{RD}^{is}$ Signals $F'_{DR}$, $F'_{EO}$, and $p_R^{is}$', generated by transducers 141, 143, and 932, respectively, are supplied to the system's CCU (not shown). And signals $C'_{DR}$, $C'_{LTV1}$, $C'_{LTV3}$, $C'_{AT}$, and $C'_{WB}$, used to control pump 46, valve 929, valve 933, pump 420, and valve 304, respectively, are generated by the system's CCU.

I note that, if valves 929, 930, and 931 were leakproof, reservoir 401 would be minute because it would in essence only need to accomodate differences, in liquid refrigerant volume in the isolated principal-configuration circuit segment, caused by changes in temperature within the temperature range of interest. In practice, however, valves 929, 930, and 931 may have a slow leakage rate which would have to be offset by liquid refrigerant stored in reservoir 401, and pump 420 would have to be controlled to maintain $p_R^{is}$ at the preselected value of $p_{RD}^{is}$.

Very similar techniques to those described in the immediately-preceding major paragraph can also be used where passages 102 contain no liquid refrigerant at start-up—provided the radiant heat-source intensity, during start-up, is low enough for passages 102 to be exposed to that intensity while they contain no liquid refrigerant. Where the condition just cited is not satisfied, additional means and control techniques are required to ensure evaporator 924 is not damaged.

c. Type A Combinations with Freeze Protection i. Preliminary Remarks

Freeze protection, in the sense described under (a) to (e) in section III,E, can be used without heating the LR reservoir of a type A combination where the thermal equilibrium temperature of the LR reservoir with its surroundings is always high enough to prevent the combination's refrigerant freezing. This is, for example, the case where the refrigerant is water and the LR reservoir is located in a heated building. However, certain important refrigerants such as liquid metals have freezing temperatures much higher than the space inside heated buildings. Where such refrigerants are used, the LR reservoir must be heated and insulated so that it is located in a space above the freezing temperature of the refrigerant. Examples of liquid-metal refrigerants are potassium, sodium, and lithium, which have respectively freezing temperatures of 63.7° C., 97.8° C., and 179° C. Such refrigerants are collectively thermodynamically-suitable fluids for (liquid-vapor) two-phase heat-transfer systems in roughly the saturated-vapor temperature range between 600° C. and 1700° C., and are therefore thermodynamically suitable for ultra-high-temperature heat-transfer applications such as, for example, the utilization of heat of waste gases, in the range between 900° C. and 1200° C., leaving soaking pits and reheating furnaces in steel plants; the utilization of heat collected by high-gain solar collectors, which currently operate at temperatures up to 1500° C.; and the utilization of the heat of gas-turbine exhaust gases (which often exceed 600° C.).

ii. System for Running a Gas Turbine with Heat from Waste Gases

The specific freeze-protection example discussed is a system for recovering heat from the waste gases of a reheating furnace in a steelmaking plant and for utilizing the recovered heat to run a gas turbine. The heat-recovery system shown in FIG. 100 has a class $III_{FN}^{ooo}$ configuration and a type $III_R$ ancillary configuration, and employs a liquid metal as its refrigerant.

In FIG. 100, waste gas exiting reheating furnace 910 at 911 passes through evaporator fluid passages 272 of waste-gas-heated NP evaporator 912 before being discharged into the earth's atmosphere. Heat, released by waste gas while it flows through passages 272, is absorbed by the recovery system's refrigerant while it flows through evaporator refrigerant passages 102. Refrigerant vapor, generated in passages 102, exits at 3 and—after flowing through type 2 separator 42—flows through condenser refrigerant passages 399 of compressed-air-cooled condenser 913. Refrigerant exiting passages 399 is supplied to mergence point or node 49, and is returned to evaporator refrigerant inlet 2 by DR pump 46 which, in the case of liquid-metal refrigerants is usually preferably a magneto-hydrodynamic pump.

Compressed air exits, at 914, single-stage turbine compressor 915 driven by gas-turbine expander 900 and enters condenser fluid passages 281 of condenser 913. Heat released by the heat-recovery system's refrigerant in passages 399 is absorbed by compressed air flowing through passages 281. Heated compressed air leaving passages 281 is supplied to inlet 904 of expander 900 after passing through combustor 905. Whenever gas turbine 917 is required to run while furnace 910 is not operating, or while its exhaust gas is not supplying heat at a high-enough rate to run turbine 917, combustor 905 is used respectively to provide the heat required, or to supplement the heat supplied by the heat-recovery system to the turbine's compressed air. (Means for controlling a supplementary source of heat are well known and therefore not shown.) I next discuss only freeze-protection techniques.

While the principal configuration of the heat-recovery system is active LT valve 933 is open.

When the principal configuration is deactivated, the heat-recovery system's CCU (not shown) applies a signal $C'_{LTV3}$ which opens valve 933, and a signal $C'_{AT}$ which causes air pump 420 to run until the internal volume $V_{LR}$ of reservoir 401 reaches its maximum value $V_{LR,MAX}$. The maximum value of $V_{LR,MAX}$ is chosen no smaller than the largest possible volume of the heat-recovery system's liquid refrigerant charge over the range of liquid refrigerant temperatures of interest. As soon as $V_{LR}$ is equal to $V_{LR,MAX}$, the heat-recovery system's CCU closes valve 918 to stop liquid refrigerant flowing back into the principal configuration through port 407.

Temperature transducer 919 is used to generate a signal $T'_{LR}$ which provides a measure of the refrigerant temperature $T_{LR}$ in the reservoir. The value of the temperature $T_{LR}$ is maintained by heating elements 920 above the refrigerant's freezing temperature. Numeral 921 designates insulation around cylinder 419. Elements 920 may be electrical heating elements, or may be passages through which flows a fluid having a higher temperature than the refrigerant's freezing temperature.

d. Type A Combinations with Refrigerant-controlled Heat Absorption i. Preliminary Remarks RC heat absorption is suitable for systems of the invention having a heat source whose temperature is lower than the maximum-permissible temperature of their refrigerant and of their evaporator refrigerant passages. Examples of such a heat source are (1) the coolant of an internal-combustion piston or rotary engine having a single-phase or two-phase cooling system; (2) the flue gas of a boiler; or (3) the heat-transfer fluid of a water boiler or of a steam boiler. Examples of the systems with the heat sources cited in the immediately-preceding sentence are subsystems for heating buildings and their water supplies, for heating ships and their water supplies, or for supplying heat to low-temperature industrial systems. Such subsystems would typically employ water as their refrigerant and be either (1) low-pressure subsystems operating at (absolute) pressures up to about 2 bar, or (2) subatmospheric-pressure subsystems operating at pressures up to about 0.9 bar. In the latter case, the subsystem's component condensers could have refrigerant passages formed by using the techniques described in the last minor paragraph of section V,b,15.

ii. System for Heating Compartmentalized Spaces in a Building or in a Ship

The system shown in FIG. 101 is one of several subsystems for heating spaces in buildings or ships. The subsystem shown in FIG. 101 is designated by the symbol (A), and therefore has designating numerals to which the symbol (A) has been added. Subsystem A has a class$III_{FN}^{oo}$ principal configuration and a type $I_R$ ancillary configuration. Each of these subsystems is connected in cascade with a single common heating system which may be either a single-phase, or a two-phase, heat-transfer system. In the case where the single common heating system is a two-phase heat-transfer system having an airtight configuration of the invention, and employing water as its refrigerant, the saturated-vapor temperature of its refrigerant would typically be between 100° C. and 135° C. if that system were a piston-engine cooling system; and would typically be between 125° C. and 150° C. if that system were a fossil-fuel heating system. The particular case where several subatmospheric-pressure building-heating subsystems are connected in cascade with a single high-pressure fossil-fuel building-heating system is described in detail in section V,J of my co-pending U.S. patent application Ser. No. 400,738, filed 30 Aug. 1989, for the case where the 2 subatmospheric-pressure building-heating subsystems have a principal configuration but no ancillary and no IG configuration. I therefore discuss next only how RC heat absorption can be achieved by adding an ancillary configuration to a principal configuration using subsystem (A) as an example.

In FIG. 101, component evaporator-condenser 230(A) is used to transfer heat from the high-pressure refrigerant, or more briefly the HP refrigerant, of a high-pressure two-phase heat-transfer system, or more briefly an HP system, to the subatmospheric-pressure refrigerant, or more briefly the SP refrigerant, of a subatmospheric-pressure subsystem, or more briefly an SP subsystem, designated by the symbol (A). In the alphanumeric symbols in FIG. 101, the numeral designates, as applicable, the component or the point designated by the same numeral in other FIGURES of the present specification. A typical saturated-vapor pressure for the HP refrigerant is 125° C. at the HP system's design maximum heat-transfer rate and a typical saturated-vapor temperature for the SP refrigerant is 90° C. at the SP subsystem's design maximum heat-transfer rate. SP subsystem (A) is one of several SP subsystems in cascade with the HP system. Condenser 237(A) of subsystem (A) has several air-cooled component condensers (not shown) connected in parallel as shown for example in FIG. 53 of my co-pending U.S. patent application Ser. No. 400,738, filed 30 Aug. 1989, where the component condensers are designated by the (alphanumeric) symbol 237A. Symbols 5(A) and 6(A) designate respectively the refrigerant inlet and the refrigerant outlet of condenser 237(A), and symbol 235(A) designates a drip valve (similar, for example, to the float and thermostatic traps used in conventional steam-heating systems). In FIG. 101, only the refrigerant configuration of subsystem (A) is shown. Subsystem (A) also includes a CCU (not shown) which receives signals $p'_R$(A) and $L'_D$(A) generated respectively by refrigerant absolute-pressure transducer 514(A) and liquid-level transducer 145(A), and which generates signals $C'_{LT}$(A) and $C'_{DR}$(A) which are used to control respectively bidirectional LT pump 404(A) and DR pump 46(A). I note that node 407(A) could have been located upstream from pump 46(A) instead of, as shown in FIG. 100, downstream from pump 46(A).

To achieve heat-absorption control (1) pump 404(A) is controlled by signal $C'_{LT}$(A) so that the current value of the level $L_D$(A) of liquid-vapor interface surface 521(A), derived from signal $L'_D$(A), tends to value $L_{DD}$(A) which may be a single preselected value, or a range of preselected values, within a preselected lower limit and a preselected upper limit; and (2) pump 46(A) is controlled by signal $C'_{DR}$(A) so that the current value of the refrigerant pressure $p_R$(A), derived from signal $p'_R$(A), tends to a desired preselected value which varies in a pre-prescribed way as a function of one or more parameters characterizing the environment of the building, or the ship, in which the refrigerant configuration shown in FIG. 101 is installed. The last-cited one or more characterizing parameters almost always include the outdoor temperature, and should often include not only solar radiant intensity but also the azimuth and elevation angles of the sun derived from, for example, a day and year 24-hour calendar clock. It also adjusts the maximum rate at which component condensers of condenser 237(A) release heat. The actual rate at which individual component condensers release heat within the limit set by the last-cited maximum rate is usually controlled by one or more thermostats in the heating zone served by subsystem (A). Where the last-cited heating zone is divided into compartments, the rate at which heat is released by the one or more component condensers of condenser (A) in that compartment is usually adjusted by a thermostat located in that selfsame compartment. This thermostat adjusts the last-cited heat-release rate by controlling (1) the air-flow rate through the component condensers in the compartment, (2) the refrigerant-vapor-flow rate through the component condensers in the compartment, or (3) both the fan (or blower) and the refrigerant-flow rate through those component condensers.

Whenever the rate at which condenser 237(A) releases heat changes because the value of $p_R$(A) is changed, or because of the actions caused by the thermostat in a compartment of the building, or of the ship in which that thermostat is located, the amount of liquid refrigerant in the component condensers in the compartment changes thereby changing the range of the amounts of liquid refrigerant in the principal configuration for which self regulation can be achieved. The refrigerant configuration and control techniques described in this major paragraph automatically maintain the amount of liquid refrigerant in the principal configuration, within the range for which self regulation can be achieved, by changing the amount of liquid refrigerant in variable-volume LR reservoir 401(A).

e. Type C Combinations with Partial Minimum-pressure Maintenance i. Preliminary Remarks Many fossil-fuel-fired industrial heating systems often have their non-airtight components—such as pumps with mechanical seals, and valves and gauges with glands—located only in the vicinity of their boiler. In such cases, a type C combination, employing a refrigerant whose pressure falls below ambient atmospheric pressure while the combination's principal configuration is inactive, needs only partial, and not complete, minimum-pressure maintenance. I next discuss a specific example of a type C combination with partial minimum-pressure maintenance.

ii. System for Supplying Heat to an Industrial Process

The specific example chosen is a low saturated-vapor temperature heating system employing a fuel-fired NP evaporator and used to provide heat to a low-temperature industrial process, say an electroplating process. The refrigerant employed is water and the system may be a low-pressure system or a subatmospheric-pressure system. (In the case of an electroplating plant, the system could be a subatmospheric-pressure system.)

In FIG. 102, numeral 950 designates a liquid-fuel-fired NP evaporator in which combustion gas exiting burners 180 is used to evaporate liquid refrigerant (namely water in its liquid phase in the application considered) in evaporator refrigerant passages 102 (not shown). Numeral 951 designates a set of one or more receptacles, in which condenser refrigerant passages 399 (not shown) are immersed in a liquid maintained at the selfsame quasi-uniform spatial temperature in the one or more receptacles. The liquid is used in an industrial process such as electroplating.

Assume the desired value $p^*_{RD}{}^{is}$ of $p_R{}^{is}$ is 0.75, as might be the case in a subatmospheric-pressure system operating typically at 0.85 bar. Then sufficient inert gas must be stored in fixed-volume IG reservoir 453 to ensure the pressure $p^*_R{}^{is}$ does not fall below 0.75 bar at the design minimum ambient temperature which is say 10° C. Let $V_{GR}$, the internal volume of reservoir 453, be one-twentieth of the volume $V_{GPP}$ of the principal configuration which must be filled with inert gas to achieve partial minimum-pressure maintenance. Then the system must be charged with a sufficient mass of inert gas to allow the volume $(V_{GR}+V_{GPP})$ to be maintained at a pressure of at least 0.75 bar at 10° C. Assume $V_{GR}$ is required not to exceed 5% of the value of $V_{GPP}$. Then, while the system's principal configuration is active and all the inert gas in the system is stored in reservoir 453, the pressure at 10° C. in the reservoir would be 0.75 bar times $$21\left(=\frac{1.05}{0.05}\right),$$

namely 15.75 bar. However while the system is operating at its design maximum temperature, t e temperature in reservoir 453 will be much higher even if the ambient temperature is only 10° C. Assume the maximum temperature which might at times be reached by $T_{GR}$ is 80° C. Then the pressure in reservoir 453 would increase from 15.75 bar to 15.75 bar times 1.25(=353/283), namely to 19.6 bar. Consequently, to meet the foregoing 5% requirement, reservoir 453 would have to be designed so that it can withstand a maximum pressure of about 20 bar. Thus, for example, a 2.5 liter reservoir capable of withstanding 20 bar would be large enough in the example discussed to store a sufficient mass of inert gas to maintain 50 liters of inert gas in the principal configuration at 0.75 bar.

The system, with the R&IG configuration shown in FIG. 102, hereinafter referred to as 'the system', has an active control mode during which (except during start-up and shut-down transients) (1) no significant amount of inert gas is contained in the R&IG configuration's principal configuration, and the current value of $p_R$ is essentially equal to the current value of $p^*_R$; (2) burners 180 are controlled so that the value of $p^*_R$, obtained from the signal $p^{*\prime}_R$ generated by proportional absolute-pressure transducer 603, tends to a preselected desired value $p_{RD}$ of $p_R$; and (3) CR pump 10 and EO pump 27 are controlled so that the quality $q_{EV}$ of refrigerant vapor exiting refrigerant passages 102 tends to a preselected desired value $q_{EV,D}$. Techniques for controlling pumps 10 and 27, while the system's principal configuration is active, have already been disclosed in this DESCRIPTION. I shall therefore limit my disclosure of the operation of the R&IG configuration shown in FIG. 102 (1) to the R&IG configuration's operation while its principal configuration is inactive, and (2) to transitions between the active and inactive states of the R&IG configuration's principal configuration.

Before start-up, bidirectional isolating-valve 952 is closed and bidirectional GT pump 443 is controlled so that $p^*_R$ tends to a preselected value $p^*_{RD}{}^{is}$ of $p^*_R$. The system is then, by definition, in its partial-minimum-pressure-maintenance mode.

At start-up, burners 180 are set to, say, their minimum delivery rate. Thereafter, as soon as the value of $p_R^*$ exceeds $p^*_{RD}{}^{is}$ by a first preselected value, burners 180, valve 952, and pump 443, are controlled by the system's CCU (not shown) in a pre-prescribed way so as to keep the value of $p^*_R$ within preselected limits. (The pre-prescribed way is application dependent.) As soon as the liquid level in condensate receiver 7 starts rising (because refrigerant is condensing), pumps 10 and 27 start running, and pump 443 continues running until the value of $p^*_{GR}$ reaches $p^*_{GR,MAX}$. Thereafter 443 is controlled so as to keep the current value of $p^*_{GR}$ close to $p^*_{GR,MAX}$, namely so as to keep the system in mode 3*. (The system has, except during transients, no other control mode while its principal configuration is active.)

To shut down, burners 180, valve 952, and pump 443, are controlled in a pre-prescribed way so as to maintain the value of $p^*_R$ within the pre-prescribed limits. As soon as the value of $p^*_R$ falls below a preselected value, valve 952 is closed. At this time, burners 180 are turned off if they have not already been turned off, and pump 443 is controlled so that $p^*_R$ tends to $p^*_{RD}{}^{is}$ ; namely the system returns to its partial-minimum-pressure-maintenance mode.

J. Type B Combinations

Type B combinations can—like type A combinations—be endowed, where applicable, with one or more of the eight properties named complete minimum-pressure maintenance, partial minimum-pressure maintenance, freeze protection, self regulation, refrigerant-controlled heat release, gas-control led heat release, refrigerant-control led heat absorption, and evaporator liquid-refrigerant injection; and are suitable for several heat-transfer applications.

Type B combinations are usually employed where (1) it is more cost-effective to achieve complete minimum-pressure maintenance, partial minimum-pressure maintenance, or refrigerant-controlled heat release, with an inert gas instead of with liquid refrigerant; and where (2) freeze protection in the sense described under (a) to (e) in section III,E is required.

Type B combinations have, in addition to a principal configuration, an ancillary configuration and an inert-gas configuration. Type B combinations can in principle have any class of principal configuration, or any type of specialized principal configuration, employed by type A, or by type C, combinations. Type B combinations can, in principal, also have any one of the type $I_R$ to type $VI_R$ configurations, and any one of the type $I_G$ to type $V_G$ configurations, described earlier in this DESCRIPTION. Operating methods which can be used with type B combinations should be obvious in view of the operating methods of type A and type C combinations disclosed earlier in this DESCRIPTION. The techniques for charging type C combinations described in section V,H,11,c can mutatis mutandis also be used with type B combinations.

FIG. 103 shows an example of a block diagram, without transducers and signals, of an airtight configuration of a type B combination. The airtight configuration shown in FIG. 103 has a class $VIII_{FN}^{ooo}$ principal configuration, a type $IV_R$ ancillary configuration, and a type $IV_G$ configuration. The combination shown in FIG. 103 has a hybrid split evaporator with two component evaporators: (1) overflow component P evaporator 81 having liquid-refrigerant inlet 82, liquid-refrigerant overflow outlet 94, interconnecting outlet 538A, and refrigerant-vapor outlet 83; and (2) NP evaporator 1 with liquid-refrigerant inlet 2, interconnecting inlet 538B, and refrigerant-vapor outlet 3. The combination shown in FIG. 103 also has a type 2 split separating assembly having component separating assemblies 42*A and 42*B; and further has a split DR pump having component pumps 46A and 46B. The combination further also has four-way, slide-type, refrigerant-flow reversing valve 660 and four way, slide-type, gas-flow reversing valve 955. Refrigerant vapor exiting separating assemblies 42*A and 42*B enter air-cooled condenser 508 at respectively ports 5A and 5B.

K. Elaboration on the Location of the Interconnections Between A Principal and IG or an IGP Configuration

1. Type C Combinations with Complete Minimum-pressure Maintenance a. Preliminary Remarks

Interconnections between a principal configuration and an IG or an IGP configuration of the same type C combination have so far only been shown for (1) a gas-cooled condenser, and in particular an air-cooled condenser, represented by a condenser having nominal y horizontal vapor and liquid headers; and for (2) a liquid-cooled condenser, and in particular a water-cooled condenser, represented by a block (black box) having inside it symbols 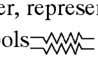
where one of those two symbols represents one or more refrigerant passages and where the other of those two symbols represents one or more fluid ways. (The modifier 'nominally horizontal' is used to indicate that the vapor and liquid headers are essentially horizontal while the platform on which they are located is horizontal.) Also, the location of the foregoing interconnections has been shown so far only for cases where a condenser is an entity which is separate and distinct from other components of a type C combination. In practice, a condenser—and particularly a gas-cooled condenser—of a type C combination is in certain important applications combined in a single physical structure with one or more other components of the combination.

Locating the foregoing interconnections correctly is essential in ensuring the optimal operation of an IG configuration. And the correct location of those interconnections can often not be shown without distinguishing between various kinds of condensers, and between various combinations of a particular kind of condenser with one or more other components of the type C combination to which the condenser belongs. I therefore in section V,K,1,b show the correct locations of the subject interconnections in several cases.

The location of port 440 of one-port IG or IGP configurations, and of port 471 of two-port IG or IGP configurations, is governed by the same considerations as those governing the location of air vents in non-airtight two-phase heat-transfer systems; and, in particular, in conventional steam heating systems. The selection of the subject location, together with the use of associated baffles, is discussed in detail in published documents; for example, in the three papers in the "Proceedings of the NATO Advanced Studies Institute on Thermal-Hydraulic Fundamentals and Design of Two-Phase Flow Heat Exchangers", July 6–17, published by Kluwer Academic Publishers, ISBN 90-247-3693-5. The foregoing three papers are titled "Condensation with Non-Condensables and in Multicomponent Mixtures", Michael K. Jensen; "Condensers and their Design", D. Butterworth; and "Numerical Methods for the Analysis of Flow and Heat Transfer in a Shell-and-Tube Heat Exchanger with Shell-Side Condensation", M Cumo.

I note that one of the reasons for using a two-port IG or IGP configuration, instead of a one-port IG or IGP configuration, is that the preferred location of port 440 for the purpose of removing inert gas from a principal configuration is unsuitable for the purpose of supplying inert gas to the principal configuration. I also note that cases exist where port 440, port 470, or port 471, may consist of several subports. One of those cases occurs where a distributed venting technique (discussed, for example, on pages 313 and 314 of the publication cited above in this section V,K,1,a) is used to remove inert gas from a principal configuration. That distributed venting technique is usually affordable only with shell-side condensation, or with tube-side condensation in condensers having only a few refrigerant passages.

In the examples given in section V,K,1,b, I show the location of port 471 of a two-port IG or IGP configuration. Where a one-port IG or IGP configuration is used, port 440 of the one-port configuration would be placed at the same location as port 471 of the two-port configuration.

Figure 36D:
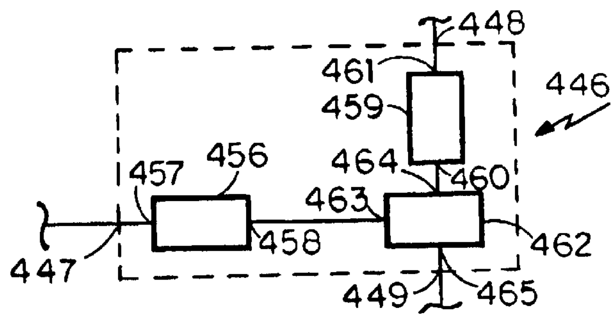
Figure 36E:
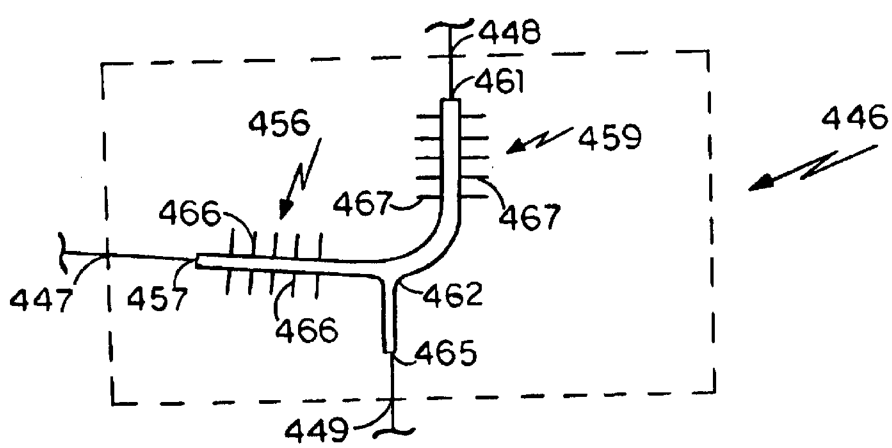
Figure 36F:
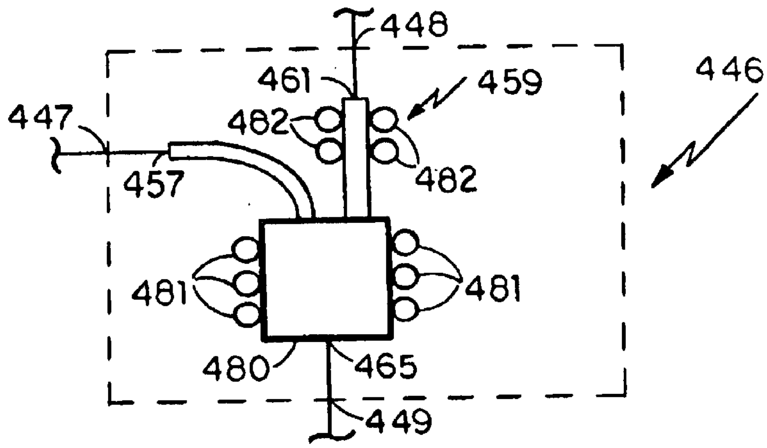

In, for example, FIGS. 36D and 36E, I show a condensate-type refrigerant-vapor trap consisting of diverter 462 and of component condensers 456 and 459, where the former component condenser is, like condensers 508 and 508h, a normal condenser, and where the latter component condenser is a reflux condenser. I shall hereinafter in this DESCRIPTION use the term 'trap' to denote a condensate-type refrigerant-vapor trap; the term 'normal condenser' to denote respectively a condenser or a normal component condenser having a refrigerant-vapor outlet separate and distinct from the condenser's liquid-refrigerant inlet; and the term 'reflux condenser' to denote respectively a condenser or a reflux component condenser having a common refrigerant-vapor inlet and refrigerant-vapor outlet.

In several FIGURES illustrating R&IG configurations, no trap has been shown to avoid cluttering those FIGURES. In practice a trap would be used with most R&IG or R&IGP configurations, and particularly with R&IG configurations having an IG configuration with a gas pump.

b. Examples of Interconnections

FIG. 105 shows the case where air-cooled condenser 508 is combined with receiver 7, where receiver 7 replaces liquid header 509, and where the trap consists essentially only of reflux component condenser 459. In the case where condenser 508 is installed on a vehicle subjected to tilts, condenser 459 is located preferably near the mid-point of receiver 7 with respect to the receiver's longest dimension. And in the case where the condenser of a heat pump, including a refrigeration or an air-conditioning system, is located upstream of condenser 508, with respect to the direction of airflow through condenser 508, condenser 459 would preferably be located in the plane of, or upstream from, the condenser of the heat pump system.

FIG. 105 also shows subcooler 18 combined into a single unit with condenser 508 and receiver 7. The elementary subcooler shown in FIG. 105 is appropriate where the CR pump, supplied with liquid refrigerant from subcooler refrigerant outlet 20, requires—like certain positive displacement pumps—only a small amount of subcooling, say 1° C. to 2° C., to prevent cavitation; or where the CR pump is located several meters below liquid-vapor interface surface 116. In the latter case even the elementary subcooler shown in FIG. 105 may not be required and may, where the condenser-receiver combination is installed on a platform subjected to tilts, be replaced by two refrigerant lines fluidly connecting receiver 7 to a single refrigerant line supplying a CR pump with liquid refrigerant.

FIG. 106 shows the case where condenser 508, dual-return receiver 640, and subcooler 51 are combined into a single unit. In the case of a dual-return receiver the amount of subcooling provided by subcooler 51 may have to be substantial under certain operating conditions—particularly where a high evaporator overfeed rate is used; where DR pump 46 is a centrifugal pump; or where the liquid refrigerant supplied to the evaporator of an R&IG, an R&IPG, or a refrigerant configuration is required to be high to increase the critical flux. On the other hand, the amount of subcooling provided by a large subcooler may be undesirably high under certain other operating conditions. It is in such cases desirable to provide liquid-refrigerant mixing valve 695, supplied with liquid refrigerant from dual receiver 640 and from outlet 53 of subcooler 51. Valve 695 can be used to adjust the amount of subcooling supplied to DR pump 46 and/or to the R&IG configuration's evaporator. This can be achieved, for example, by using refrigerant temperature transducer 516 and refrigerant temperature transducer 696 to generate respectively signals $T'_R$ and $T'_{RSb}$, and to control valve 695 so that the difference between the values of $T_R$ and $T_{RSb}$, derived respectively from $T'_R$ and $T'_{RSb}$, tends toward a desired value.

FIG. 106A shows the case where liquid refrigerant exiting separating assembly 42* at 45* flows through subcooler 697 before it enters dual-return receiver 640A. (The designator 640A is used to distinguish between a dual-return receiver supplied with non-evaporated refrigerant which has been subcooled and a dual-return receiver supplied by non-evaporated refrigerant which has not been subcooled.) Liquid refrigerant in dual-return receiver 640A exits at outlet 698.

FIG. 107 shows the case where condenser 508 is a reflux condenser which has been combined with separator-receiver 699 which performs the functions of a separator and dual-return receiver. Obviously subcooler 51 could be added to the combination shown in FIG. 107 in a way similar to the way in which subcooler 51 has been added to the combination of components 508 and 640 in FIG. 106. Designators 440*a*, 440*b*, 440*c*, and 440*d*, denote the apertures which collectively constitute port 440.

Air-cooled condensers with nominally horizontal headers may have inclined, or even horizontal, refrigerant passages. However, horizontal refrigerant passages should not be used in applications where those passages may be subjected to ambient temperatures at which liquid refrigerant in them may freeze. Where liquid refrigerant in air-cooled condenser refrigerant passages cannot freeze, air-cooled condensers with nominally vertical headers and horizontal refrigerant passages can be used as well as air-cooled condensers with nominally horizontal headers and refrigerant passages. Liquid refrigerant in condenser refrigerant passages may not freeze, even where their heat sink is very cold, for one of several reasons. For example, where a group H refrigerant (see section V,F,2,d) is employed, and the evaporator overfeed ratio is high, horizontal condenser refrigerant passages can often be employed. The reason for this is that, under the just-cited conditions, the concentration in those passages of the vapor of the refrigerant's component with the lowest freezing point will be nearly equal to the concentration of that component in its liquid phase.

Figure 108:
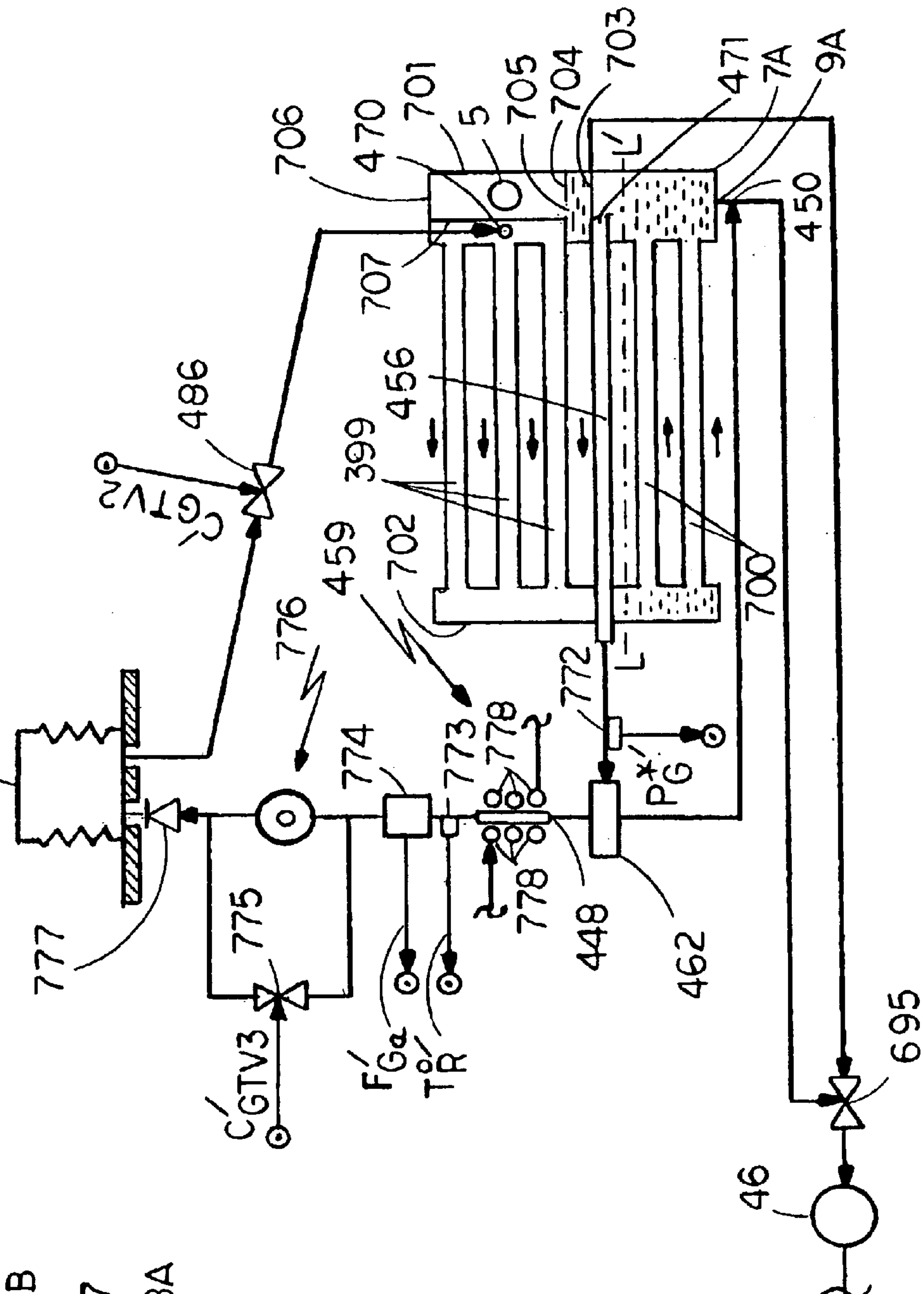
Figure 109:
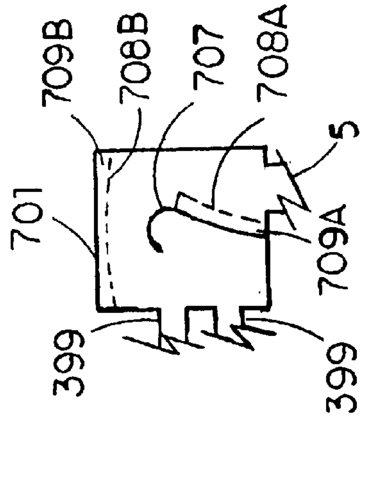

FIG. 108 shows an air-cooled condenser, combined with a separating assembly, a subcooler, and a receiver. The condenser has refrigerant passages 399, and the subcooler has refrigerant passages 700. Line LL' indicates the level of refrigerant condensate in headers 701 and 702. Numeral 703 designates the top of receiver 7A in header 701, and 9A designates the outlet from which subcooled liquid refrigerant exits receiver 7A. The space in header 701 above partition 704 performs the function of a vapor header and a separating assembly, supplied with refrigerant vapor through inlet 5. Partition 704 has apertures 705 which allow non-evaporated refrigerant to drain into the space in header 701 between receiver top 703 and partition 704. Liquid refrigerant accumulating in the last-cited space is supplied to mixing valve 695. The colder liquid refrigerant, exiting at outlet 9A, is also supplied to valve 695. This valve is controlled so as to supply DR pump 46, or the evaporator (not shown) supplied with liquid refrigerant by pump 46, with liquid refrigerant at a desired temperature. If controlling the amount by which liquid refrigerant entering the evaporator is subcooled were the governing consideration, and a subcooler, or a preheater, were located between pump 46 and the evaporator's liquid-refrigerant inlet, valve 695 would be located downstream from, as applicable, the subcooler or the preheater and upstream from the evaporator liquid-refrigerant inlet. FIG. 109shows a plan view of header 701 after removing top 706 of header 701. Refrigerant vapor entering at inlet 5 flows around nominally-vertical baffle 707 before entering passages 399. Baffle 707 and nominally-vertical wire meshes 708A and 708B (not shown in FIG. 108), extend between partition 705 and top 706. Liquid refrigerant entering spaces 709A and 709B between respectively wire mesh 708A and baffle 707, and between wire mesh 708B and wall 716 of header 701, drains out of spaces 709A and 709B through apertures 705 located in the two segments of partition 704 forming the bottom of spaces 709A and 709B.

Figure 63D:
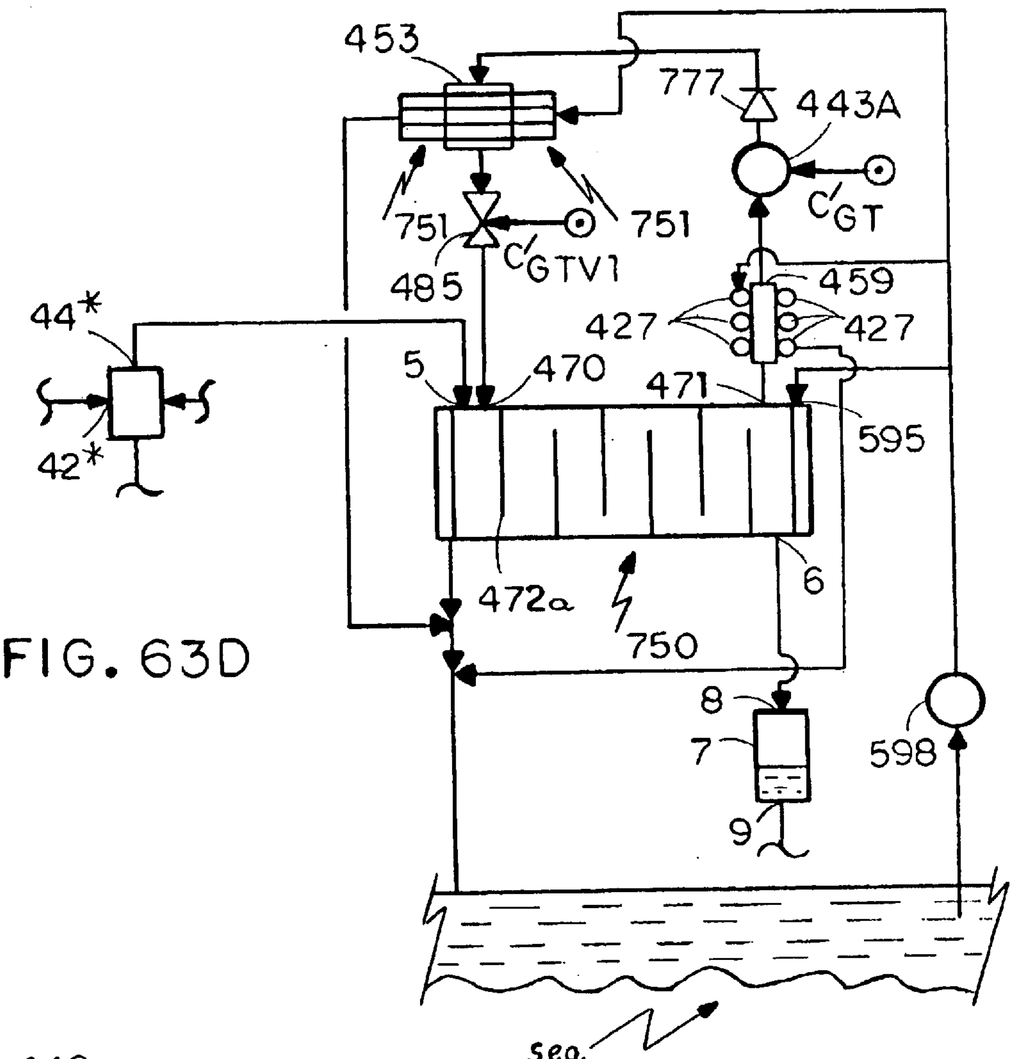

FIG. 63D shows the case where a two-port inert-gas configuration has port 471 located close to water inlet 595, and port 470 located close to refrigerant-vapor inlet 5; where the principal configuration's condenser is TEMA E-shell type shell-and-tube condenser 750 (tubes not shown); and where the fluid ways of condenser 750, coils 427 of reflux component condenser 459, and tube bundle 751 passing through IG reservoir 453, are supplied with water delivered by pump 598. (Means for removing liquid refrigerant generated by refrigerant vapor which may have entered reservoir 453 are described in section V,G,2,b,ii and shown in FIG. 61.) Alphanumeric symbol 752*a* designates one of the six baffles (of condenser 750) shown in FIG. 63D.

2. Type C Combinations with Partial Minimum-pressure Maintenance

In certain type C combinations with partial minimum-pressure maintenance, it may be desirable to provide an inert gas outlet in the part of the combination's principal configuration outside the configuration's isolated segment into which inert gas is inserted. The reason for this is that the valves used to isolate that isolated segment may leak and allow some inert gas to exit that segment. For example valve 952 in FIG. 102 may allow some inert gas to enter the condenser refrigerant passages (not shown) in receptacles 951. Consequently, after valve 952 is opened during start-up, inert gas may accumulate in receiver 7 and port 471A, see FIG. 102A, should be provided to remove inert gas present in receiver 7. Port 471A is connected to trap 46, and means (not shown) are provided for sensing the presence of inert gas in receiver 7 and for running gas pump 443, after valve 952 has been opened, while the partial pressure of the inert gas in receiver 7 exceeds a preselected upper limit.

L. Elaboration on Control Techniques for Type C Combinations

1. Preliminary Remarks

The control rules discussed in sections V,G and V,H, for the one or more controllable elements of an IG configuration, are as applicable $p^*_R$ tends to $p^{*}_{DR}{}^{o}$ or to $p^*_{RD}$; $p^*_{GR}$ stays close to $p^*_{GR3}$ or to $p_{GR,MAX}$; $T_W$ tends to $T_{WD}$; $p^{*}_{R}{}^{i}$ tends to $p^{*}_{RD}{}^{oi}$ or to $p^{*}_{RD}{}^{i}$; or $T_W{}^i$ tends to $T_{WD}{}^i$. Also, the transition rules discussed in sections V,G and V,H, from mode 2*, or from mode 2*$_0$, to mode 3* are one of the following six sets of rules:

$$p^*_{GR}=p^*_{GR,3} \text{ and } p^*_R>p^*_{RD}+\Delta p^*_{R1} \quad (28)$$

$$T^{*}_{RS}{}^{B}=T^{*}_{RS}{}^{\theta} \text{ and } p^*_R>p^*_{RD}+\Delta p^*_{R1} \quad (29)$$

$$V_{GR}=V_{GR,MAX} \text{ and } p^*_R>p^*_{RD}+\Delta p^*_{R1} \quad (30)$$

$$p^*_{GR}=p_{GR,MAX} \text{ and } p^*_R>p^*_{RD}+\Delta p^*_{R1} \quad (31)$$

$$p^*_{GR}=p_{GR,MAX} \text{ and } T_W>T_{WD}+\Delta T_{W1} \quad (32)$$

$$p^*_{GR}=p_{GR,MAX} \text{ and } T_I{}^i>T_{ID}{}^i+\Delta T_{I1} \quad (33)$$

However, the foregoing control and transition rules may in certain applications be inadequate and should either be supplemented with additional rules, or replaced by alternative rules. Supplementary and alternative rules are discussed in section V,L,2.

I use the term 'mixture purity' to denote the mole fraction $X_G$ of inert gas in an inert-gas. and refrigerant-vapor mixture. In the case of an ideal gas—such as nitrogen up to 10 bar and at or above temperatures of about 290K—we have $$x_G = \frac{p_G}{p_G^*} = \frac{p_G^* - p_R}{p_G^*} \quad (34)$$

where $p^*_G$ is the total pressure of the mixture inside the trap, assumed constant throughout the trap and equal to the total pressure $p^{*}_{R}{}^{o}$ of the mixture at, as applicable, port 440 or port 471; and where $p_G$ and $p_R$ are respectively the partial pressures of the inert gas and the refrigerant vapor in the mixture.

The maximum achievable mixture purity at the exit of a trap depends on the temperature of the one or more cold fluids used to remove heat from the mixture flowing through the trap. These cold fluids are usually the ambient air, and/or a cold-water supply or the sea. However, in some applications, the temperature of the naturally-available cold fluid or fluids may not be low enough to achieve the desired mixture purity at the trap's outlet. In such cases a refrigerated cold fluid may be used. For example, in the case of a trap belonging to an airtight configuration installed in a land vehicle, it may be desirable to use the ambient air as the trap's first component cold fluid, and to use the liquid phase of the refrigerant of the vehicle's air-conditioning system as the trap's second component cold fluid. Also, for example, in the case of an airtight configuration installed on the ground, it may be desirable to use water from the local water supply as the trap's first component cold fluid, and to use the liquid phase of the refrigerant of an air-conditioning system, or of a refrigeration system, as the trap's second component cold fluid. In either case the liquid refrigerant of the air-conditioning system, or of the refrigeration system, would be used to cool the mixture in the trap after it has been cooled by the first component cold fluid. I note that even in the former of the two last-cited examples the maximum cooling rate required to be provided by the second component cold fluid is typical y merely of the order of 100 watts where the maximum cooling rate of the airtight configuration is 50 kW.

To understand the importance of using a trap in certain applications, consider the case where (1) the refrigerant of an airtight configuration is water; (2) the temperature and the total pressure of the inert-gas and refrigerant-vapor mixture in the vicinity of, as applicable, port 440 or port 471 is 90° C.; and (3) the temperature of the mixture at the configuration's trap outlet is 45° C. Then, using relation (34), the mixture purity $x_G{}^\theta$ in the vicinity of port 440 or port 471 and at the trap's inlet is $$x_G^0 = \frac{1.0133 - 0.70182}{1.0133} = 0.31148$$

and the mixture purity $x_G^0$ at the trap's outlet is $$x_G^0 = \frac{1.0133 - 0.95935}{1.0133} = 0.90532;$$

namely the trap has increased the mixture purity from 0.31148 to 0.90532.

In airtight configurations having an IGP configuration or an IG configuration with no GT pump the increase in mixture purity achieved in the last-cited example by using a trap means that the internal volume of an IG reservoir required to accommodate a given mass of inert gas is reduced by a factor exceeding 2.9 (<0.90532/0.31148). I note that this reduction in volume could be achieved in principle by cooling the mixture in the IG reservoir instead of in a trap (as shown, for example, in FIG. 63D in the case of an IG configuration with a GT pump). However, the second of the two techniques recited in the immediately-preceding sentence is often considerably less cost effective than the former technique and moreover the second technique requires the IG reservoir to be located so that refrigerant vapor condensed in the IG reservoir can drain (by gravity) back into the refrigerant passages of the principal configuration with which the reservoir is fluidly connected.

In airtight configurations with an IG configuration having a bidirectional GT pump or a unidirectional GT pump causing the mixture to flow from the airtight configuration's refrigerant circuits toward the airtight configuration's IG reservoir, an increase in mixture purity by a factor of 2.9 increases the rate at which a GT pump with a given inherent capacity pumps inert gas by a factor of 2.9, thereby reducing the pump's required inherent capacity by a factor of 2.9. Also increasing mixture purity allows, for a given pump compression ratio, the pump to be cooled to a lower temperature without refrigerant vapor condensing in the pump.

2. Control Techniques for Complete Minimum-pressure Maintenance and GAS-Controlled Heat Release a. Discussion of Control and Transition Rules Any set of control rules, and any set of associated transition rules, must together ensure that the condition cited next is satisfied: the current value of the total pressure $p^*_R$ (in a principal configuration) just above the first (liquid-vapor) interface surface downstream, as applicable, from port 440 or from port 471 must be high enough, with respect to the current value of the refrigerant-vapor pressure $p_R$ at that interface surface, for 1o refrigerant-vapor bubbles to exit the surface; namely in symbols $$p^{*\theta}_R > p_R^\theta \text{ or equivalently } T^{*\theta}_{RS} > T_{RS}^\theta \quad (35)$$

where I have assumed that the current values of $p^{*\theta}_R$, $p_R^\theta$, $T^{*\theta}_{RS}$, and $T_{RS}^\theta$, in the vicinity of, as applicable, port 440 or port 471, provide a sufficiently accurate measure of the current values of respectively $p^*_R$, $p_R$, $T^*_{RS}$, and $T_{RS}$, at the first liquid-vapor interface surface downstream from port 440 or from port 471. Consequently, where condition (35) is not satisfied automatically by the control and transition rules given in sections V,G and V,H, the appropriate controllable element of the IG configuration used should preferably be controlled so that it is satisfied, at least under steady-state operating conditions. This last statement is true for all IG configurations, but is especially true for IG configurations having a gas pump.

The control modes where condition (35) may sometimes not be satisfied are most likely to be control modes 2*, 2*$_0$, and 3*. I therefore have devised alternative control rules for controlling the appropriate controllable element of an IG configuration in mode 2* or 2*$_0$, and alternative control rules for controlling that element during mode 3*.

The expression 'tends to' used in describing control rules in modes 2* and 2*$_0$, for the appropriate controllable elements of an IG configuration, can be expressed algebraically, as appropriate, by $$F_{GD}=K_{GP1}\,(p^*_R-p^*_{RD}) \text{ or } F_G=K_{GT}\,(T_W-T_{WD}), \quad (36), (37)$$

where $F_{GD}$ is the desired current value of volumetric flow rate $F_G$ of the inert-gas and refrigerant mixture entering an IG configuration; where $K_{GP1}$ and $K_{GT}$ are preselected quantities which may each have a fixed value, or a value which changes in a pre-prescribed way as a function of one or more preselected characterizing parameters other than those used in relation (43) given below; and where the superscript 'i' would be added to the symbols appearing in relation (37) in the case of an intercooler. The alternative rules in modes 2 and 2*$_0$ are identical to rules (36) and (37) while $$\Delta p^{*\theta}_R > \Delta p^{*\theta}_{R0} \text{ where } \Delta p^{*\theta}_R \equiv p^{*\theta}_R p_R^\theta \quad (38), (39)$$

and where $\Delta p^{*\theta}_{R0}$ is a small fixed preselected value of $\Delta p^{*\theta}_R$. However, when $$\Delta p^{*\theta}_R \leqq \Delta p^{*\theta}_{R0}, \quad (40)$$

the following two rules replace rules (36) and (37):

$$F_{GD}=K_{GP1}\,(p^*_R-p^*_{RD})\cdot K_M^\theta \text{ or } F_G=K_{GT}\,(T_W-T_{WD})\cdot K_M^\theta \quad (41), (42)$$

where $$K_M^0 = F_{G0} + (1 - F_{G0}) * \frac{\Delta p_R^{*0}}{\Delta p_{R0}^{*0}}, \quad (43)$$

where $F_{G0}$ is a preselected value of $F_G$ chosen small enough to ensure the value of $P_R^o$ does not exceed a preselected value. The quantity $F_{G0}$ may be a fixed finite positive value; may be zero; or may change in a pre-prescribed manner as a function of a preselected characterizing parameter, for example of the parameter $\Delta p^{*\theta}_R$, and/or of its derivative with respect to time.

The expression 'stays close to' used in describing control rules, for the appropriate controllable element of an IG configuration in mode 3*, can be expressed algebraically, as applicable, by $$F_{GD}=K_{GV1}\,(V_{GR,3}-V_{GR}),\ F_{GD}=K_{GV2}\,(V_{GR,MAX}-V_{GR}), \text{ or } F_{GD}=K_{GP2}\,(p_{GR,MAX}-p_{GR}), \quad (44), (45), (46)$$

when respectively $$(p_{GR,3}-p_{GR})>\Delta p_{GR,MAX},\ (V_{GR,MAX}-V_{GR})>\Delta V_{GR,MAX}, \quad (47a), (48a)$$

and $$(p_{GR,MAX}-p_{GR})>\Delta p_{GR,MAX}, \quad (49a)$$

where $K_{GV1}$, $K_{GV2}$, and $K_{GP2}$, are preselected quantities which may have a fixed value, or a value which varies in a pre-prescribed way; and by $$F_{GD}=0 \quad (50)$$

when respectively $$(p_{GR,3}-p_{GR})\leqq\Delta p_{GR,MAX};\ (V_{GR,MAX}-V_{GR})\leqq\Delta V_{GR,MAX}; \quad (47b), (48b)$$

and $$(p_{GR,MAX}-p_{GR})\leqq\Delta p_{GR,MAX}, \quad (49b)$$

where $\Delta p_{GR,MAX}$ and $\Delta V_{GR,MAX}$ are small positive quantities, and where the superscript 'i' would be added to the symbols appearing in relations (44) to (49a) in the case of an intercooler.

A first set of alternative control rules in mode 3* are identical to those expressed in relations (44) to (49a) except for adding, as appropriate, the multiplier $K_M^\theta$ or $K_M^\theta$ to relations (44) to (46). A second set of alternative control rules replaces relations (44) to (46) by control rule $$F_{GD}=K_M^\theta \quad (51)$$

when $$(p^{*\theta}_R-p_R^\theta)>\Delta p^{*\theta}_{R,MAX} \quad (52a)$$

and by control rule (50) when $$(p^{*\theta}_R-p_R^\theta)\leqq\Delta p^{*\theta}_R, \quad (52b)$$

where $\Delta p^{*\theta}_{R,MAX}$ is the maximum value of $(p^{*\theta}_R-p_R^\theta)$ for which the effectiveness of, as applicable, air-cooled condenser 508 or water-cooled condenser 594—or any other condenser of the principal F configuration of a system of the invention—is not degraded to an unacceptable degree by the presence of inert gas in its refrigerant passages.

A first set of alternative transition rules to those given in relations (28) to (33) is to merely delete the first condition in each of those relations. A second set of alternative transition rules is to replace the first condition in each of relations (28) to (33) by, as applicable, condition (52a) or (52b).

b. Implementation of Alternative and Supplementary Control and Transition Rules

The instrumentation of conditions (38) and (40), and of expression (43), can be implemented by using a proportional absolute-pressure transducer to obtain a measure of $p^*{}_R{}^{\theta}$ and a proportional temperature transducer to obtain a measure of $T_{RS}{}^{\theta}$. The value of $p_R{}^{\theta}$, corresponding to the value of $T_{RS}{}^{\theta}$, can be obtained from published tables or graphs where the refrigerant employed is an azeotropic-like fluid, and from published tables and a prediction of the concentrations of the components of the refrigerant-vapor—in the neighborhood of, as applicable, port 440 or port 471—in the case where the refrigerant employed is a non-azeotropic fluid. The last-cited concentrations can usually be predicted to a sufficiently high accuracy from (1) the concentrations of the components of the non-azeotropic refrigerant with which the airtight configuration has been charged; (2) the value of $p_R{}^{\theta}$; (3) the value of the evaporator overfeed $r_{EO}$; and (4) the fraction of $r_{EO}$ supplied to a point of the principal configuration's principal circuits upstream from the first refrigerant liquid-vapor interface surface downstream from port 440 or port 471. For example, where an airtight configuration has been charged with an aqueous ethylene glycol solution having a glycol concentration c, the mean value of the liquid glycol concentration $\bar{c}_E$ in the configuration's evaporator, while the principal configuration is active, can be determined as a function of the evaporation pressure; of $r_{EO}$; and, as applicable, of $r_M$ or $r_{MA}$ as defined in respectively relations (15) and (19). And, in turn, the glycol concentration $c^{\theta}$ in the inert-gas and refrigerant-vapor mixture in the vicinity of port 440 or port 471 can be determined as a function of $p^*{}_R{}^{\theta}$, usually assumed equal to the evaporation pressure; and as a function of $r_{EO}$ and of the fraction of $r_{EO}$ supplied to the refrigerant principal-configuration point cited earlier in the present minor paragraph under (4).

An example of the locations of a proportional absolute-pressure transducer providing a measure of $p^*{}_R{}^{\theta}$, and of a proportional temperature transducer providing a measure of $T_{RS}{}^{\theta}$, are the locations of respectively transducers 617 and 616 in FIG. 57A. (The temperature $T_R{}^{\theta}$ obtained from signal $T_R{}^{\theta'}$ is equal to $p^*{}_R{}^{\theta}$.) An alternative location for transducer 616 is shown in FIG. 106 where the probe of transducer 616 is immersed in refrigerant vapor instead of in liquid refrigerant.)

Sometimes it may be practical and preferable to obtain measures of the total pressure $p^*{}_G{}^{o}$ and of the partial refrigerant pressure $p_R{}^{0}$ at a trap's outlet. In this case I use, instead of conditions (38) and (40), respectively conditions $$\Delta p^*{}_G{}^o > \Delta p^*{}_{G0}{}^o \text{ and } \Delta p^*{}_R{}^o \leqq \Delta p_{R0}{}^o; \quad (53), (54)$$

and, instead of expression (43), the expression $$K_M^0 \equiv F_{G0} + (1 - F_{G0}) * \frac{\Delta p_G^{*0}}{\Delta p_{G0}^{*0}}, \quad (55)$$

where, by the assumption I made immediately following relation (34), $$\Delta p^*{}_G{}^o \equiv p_G{}^o - p_R{}^o = p^*{}_G - p_R{}^o, \quad (56)$$

and where $\Delta p^*{}_{G0}{}^o$ is the minimum permissible value of $\Delta p^*{}_G{}^o$. In FIG. 108, proportional absolute-pressure transducer 772 and proportional temperature transducer 773 generate respectively signals $p^{*\prime}{}_G$ and $T_R{}^{o'}$ which can be used to implement conditions (53) and (54), and expression (55). (Signal $T_R{}^{o'}$ gives a measure of the temperature $T_R{}^o$ at the outlet of reflux component condenser 459, $T_R{}^o$ is equal to $T_{RS}{}^o$, and $p_R{}^o$ can be deduced from $T_{RS}{}^o$.) To control the current value of $F_G$, I use a flow meter to measure the actual current value $F_{Ga}$ of $F_G$ and I control the appropriate controllable element so that $F_{Ga}$ tends to $F_{GD}$. In FIG. 108, flow meter 774 provides signal $F'_{Ga}$ which gives a measure of the actual current value of $F_G$.

Alternatively, I control the appropriate controllable element of an IG configuration so that the current value of $F_G$ tends to the predicted current value $F_{Gp}$ computed by the CCU (of a system of the invention) on the basis of stored information on the performance of that controllable element as a function of the values of appropriate characterizing parameters obtained from appropriate transducers. For example, in the case where the IG configuration is a type $I_G$ or a type $I_{VG}$ configuration and where the controllable element is a variable-speed, electrically-driven, gas pump, the pump's inherent capacity can be predicted as a function of the value of its speed; of the temperature and total pressure of the particular inert-gas and refrigerant-vapor mixture entering the pump; and of the gas pump's compression ratio. And in the case where the IG configuration is a type $I_G$, a type $II_G$, or a type $III_G$ configuration, the value $F_{Gp}$ can be derived from the rate of change of the volume of the configuration's variable-volume IG reservoir. (In principle, the performance of a controllable element depends, for a given inert gas and a given refrigerant, on the ratio of the partial pressure of the refrigerant vapor in the inert-gas and refrigerant-vapor mixture entering a gas pump and entering an IG reservoir; but that partial pressure is usually only a small fraction of the total pressure of the mixture entering the gas pump and the IG reservoir, and therefore the effect of the presence of the refrigerant vapor in the mixture can usually be neglected. If that effect cannot be neglected it can be taken into account.

In some applications it is not necessary to measure the actual current value of $F_G$, or to predict the current value of $F_G$, and to use a servo which controls the appropriate controllable element of an IG configuration so that the current value of $F_G$ tends either to $F_{Ga}$ or to $F_{Gp}$. Instead that controllable element is merely controlled so that the current value of $F_G$ tends to the expression given on the right-hand side of, as applicable, relation (41), (42), or (43). GT-pump recirculation valve 775 in FIG. 108 is thus controlled by signal $C'_{GTV3}$. (Valve 775 is a particular kind of GT valve.) The symbol designated by numeral 776 in FIG. 108 represents any GT pump not controlled by the A system, the particular GT pump shown in FIG. 108 being a unidirectional GT pump causing inert gas to flow toward an IG reservoir, and could therefore also have been designated by alphanumeric symbol 443A. Unidirectional GT valve 777 is used in the IG configuration shown in FIG. 108 primarily to reduce the power consumed by pump 776 while it is running and while the mass of inert gas in the reservoir is not being increased. And valve 777 is used in the IG configuration shown in FIG. 63D primarily to reduce the rate at which inert gas leaks back from reservoir 453 to condenser 450 while GT pump 443A is not running.

M. Elaboration on Liquid-refrigerant Injection

1. Cylinder-head and Cylinder-block Injection

FIG. 110 shows a conceptual plan view of the lower deck of cylinder head 503 having cross-flow intake and exhaust ports and a set of four longitudinal liquid-refrigerant injectors. Injectors 750 are located above intake ports 472 and exhaust ports 744, as shown for example in FIG. 73; injector 782 is located below intake ports 742; and injector 783 is located below exhaust ports 744. The orifices (not shown) of injectors 780 to 783 may be distributed spatially non-uniformly in the injectors' walls.

FIG. 111 shows a conceptual plan view of cylinder block 502 having outer perimeter 710 and perimeter injector 784. An example of a vertical cross-section of injector 784 is shown in FIG. 69 and is designated by numeral 730. Injector 784 is supplied by liquid refrigerant at 785. (The orifices of injector 784 are not shown.) Bolts 786 are used to hold together cylinder block 502 and cylinder head 503.

FIG. 112 shows the particular case where the injectors shown in FIGS. 110 and 111 are part of an airtight R&IGP configuration used to cool piston engine 500. The principal configuration shown in FIG. 112 is a class $III_{FN}^{ooo}$ configuration, and the IGP configuration shown in FIG. 112 has variable-volume IG reservoir 441 and a trap having reflux component-condenser 459. (A trap is used to minimize the size of reservoir 441.) The principal and IGP configurations are interconnected at ports 788*a* to 788*c* located in the shell of condenser 750. Injectors 780, and injectors 782 and 783, are supplied, through liquid-refrigerant distributor 789, with liquid refrigerant at a preselected pressure determined by two-port pressure regulator 790. IG reservoir 441, mounted on fixed structure 417, is subjected to the ambient atmospheric pressure, and spring 478, which may be either in compression or in tension, is used to ensure that inert gas in reservoir 441 is at a pressure which is lower than, or higher than, the ambient atmospheric pressure by a preselected amount.

2. Dry-up Prevention

Dry-up prevention mode $1^*_B$ is described in sections V,G,2,b,iv and V,H,8. In the former section electrically-driven SC pump 63*h* (see FIG. 61) is used to supply liquid refrigerant to evaporator refrigerant inlet 2" after the engine stops running. And, in the latter section, electric motor 816 (see FIG. 83) is used to drive pump 46 after the engine stops running; and this pump, in turn, is used to supply liquid refrigerant either solely to (evaporator refrigerant) inlet 800"*a*, or to both inlets 800"*a* and 800"*b*. Alternatively, in the case of the R&IG configuration shown in FIG. 83, liquid refrigerant stored in buffer 821 can be used to supply liquid refrigerant to inlet 800"*a* and/or to inlet 800'*a* after the engine stops running.

I next describe a dry-up prevention technique which uses inert gas, stored in the IG reservoir of an R&IG or an R&IGP configuration, to force a portion of the liquid refrigerant into the configuration's evaporator refrigerant passages after the one or more refrigerant pumps of the R&IG or of the R&IGP configuration stop running. The last-cited technique can be used with a P evaporator, and with an NP evaporator having no liquid-refrigerant injectors. However, I choose to describe that technique for the case where the evaporator is an NP evaporator with liquid-refrigerant injectors, and where the airtight configuration is the IG configuration shown in FIG. 112A. In FIG. 112A the IGP configuration shown in FIG. 112 has been replaced by an IG configuration having two controllable elements used collectively to control the transfer of inert gas between reservoir 441 and the principal configuration to which the IG configuration is connected. The two controllable elements are on-off two-way valves 791 and 792 controlled respectively by signals $C'_{CTV4}$ and $C'_{CTV5}$. While pump 46 runs, valve 791 is open and valve 792 is closed. When pump 46 stops running, valve 792 opens and valve 791 closes for a preselected time interval. When pump 46 starts running, valve 792 closes and valve 791—if it is closed—opens.

In the case where an R&IG configuration stores at times, in its IG reservoir, inert gas at a pressure too high to cause liquid refrigerant to exit the liquid-refrigerant injectors' orifices at a low-enough rate, means must be provided for preventing inert gas being supplied to distributor 789 until the pressure in the inert gas reservoir falls below a preselected upper limit. This means may, for example, include using transducer 605, having inlet 770, to generate a signal $p^{*'}_{GR}$ providing a measure of $p^*_{GR}$ and opening valve 792 and closing valve 791 only after the motor stops running and the current value of $p^*_{GR}$ falls below the preselected upper limit. The last-cited means may also include, as applicable, using or adding transducer 603 generating signal $p^{*'}_{GR}$ providing a measure of $p^*_R$, and opening valve 792 and closing valve 791 only after pump 46 stops running and the current value of $(p^*_{GR} p^*_R)$ falls below the preselected upper limit.

In certain cases, and particularly where an IG configuration has a GT pump used (in part) to store inert gas in the configuration's IG reservoir at a much higher pressure than the highest operating total pressure in the refrigerant circuits associated with the IG configuration, it may be desirable, or even necessary, to use, instead of on-off valve 792, a throttling valve, controlled by signal $C'_{GTV5}$, to control the pressure at which inert gas is supplied to distributor 789 in FIG. 112A 3. Spray Cooling I have in section V,H,5,c,i used the term 'evaporative spray cooling' to denote techniques of liquid-refrigerant injection which achieve much higher heat-transfer coefficients than those achievable with pool boiling. I now distinguish between (1) '(evaporative) continuous spray cooling' where the liquid-refrigerant jet, exiting the orifice of an LR injector, forms a continuous stream of liquid, and (2) '(evaporative) droplet spray cooling' where the liquid-refrigerant jet exiting that orifice forms a stream of separate and discrete droplets. Test results using continuous spray cooling are given, for example, in a paper by M. Mondegand and T. Inoue titled 'Critical Heat Flux in Saturated Forced-Convection Boiling on a Heated Disk, with Multiple Impinging Jets', ASME co Transactions, Vol. 113, August 1991. And test results using droplet spray cooling are discussed, for example, in the paper by Tilton, Ambrose, and Chow, cited in section V,H,5,a of this DESCRIPTION, and in the paper by S. G. Yao and K. J. Choi titled 'Heat Transfer Experiments of Mono-Dispersed Vertically Impacting Sprays'. Continuous spray cooling or droplet spray cooling can be used with 'LR continuous injection' or with 'LR pulsed injection'. (See section V,H,5,c,iii for a definition of the last two terms.) An important difference between droplet spray cooling and LR pulsed injection, where they are used together, is that the period of the waveform of the droplet generator is much shorter than the shortest pulse produced by the valve controlling pulsed injection. For example, the period of the waveform generated by the droplet generator employed by Yao and Choi in the last-cited paper has a period in the range between 1.00 and 0.33 msec, whereas the shortest pulse produced by the valve controlling pulsed injection in the same airtight configuration would usually not be less than 10 msec. The waveform generated by the droplet generator could have a much higher frequency, say up to 20 kHz, than the 3000 Hz frequency corresponding to the 0.33 msec period. (The appropriate frequency depends on the desired droplet size along the direction of the liquid jet and on the jet's velocity.) The shape of the waveform generated may be square, sinusoidal, or may have another shape; but the waveform would usually be approximately symmetrical about its mean value, and would have a large enough amplitude and a low enough mean value for no liquid refrigerant to exit an LR injector's orifice when the waveform assumes its minimum value. (In electrical terminology the pulse train generated by the droplet generator and the valve controlling the pulse train would be a pulse-modulated carrier with 100% modulation.)

Any known device can be used as a droplet generator, including a diaphragm whose motion is controlled by a piezoelectric or a magnetostrictive device. FIG. 112B shows in schematic form the particular case where the droplet generator is combined in a single unit with distributor 789 having a diaphragm 793 driven by piezoelectric transducer 794 whose nickel core 795 is driven by an alternating electrical current flowing through coil 796. The liquid-refrigerant inlet to distributor 789 is designated by 797 and the distributor's outlet, supplying injector 785, is designated by 798.

Liquid-refrigerant injection in general, and evaporative spray cooling in particular, are candidates for any application where the evaporator refrigerant passages of an airtight configuration, or of an evacuated configuration, experience high heat fluxes. For example, evaporators using evaporative spray cooling and water as the refrigerant would, for a given flame and combustion gas and for a given steam generation rate, be much smaller than conventional water-tube boilers because the critical heat flux of spray cooling is five to ten times higher than that of conventional forced-convection evaporative cooling. Where liquid-refrigerant injection is used instead of conventional water-tube boilers, at least a part of at least some of the boilers' water tubes would be replaced by an inner tube with orifices and an outer tube with no orifices. The inner tube is an LR injector and the space between the inner and outer tube constitutes an evaporator refrigerant passage. The inner and outer tubes need not have a common axis, and not need even be circular at low internal pressures. FIG. 113 shows the particular case where the two tubes are concentric and circular, where inner tube 943 is the injector and has orifices 944, and where outer tube 945 has no orifices. (Inner tube 943 need not in certain applications have orifices around its entire periphery. In fact the orifices may be distrubuted unevenly both along the inner tube's axis and around the inner tube's periphery.) An example where both tubes are straight along their entire length is shown in FIG. 114; and an example where outer tube is straight only at cross-sections where both tubes are present is shown in FIG. 115. For simplicity, only two sets of tubes are shown in FIGS. 114and 115. In FIG. 114, NP evaporator 1 has liquid-refrigerant-injector header 946 supplied with liquid refrigerant at inlet 2, and refrigerant-vapor header 947 supplying refrigerant vapor, usually to a separator, through outlet 3. In FIG. 115, numeral 21 designates a separator which also performs the function of a vapor header, and numeral 23 designates the vapor outlet of separator 21. The integral evaporator-separator combination shown in FIG. 115 is similar to the integral evaporator-separator combination shown in FIG. 24, except for the fact that (1) the combination shown in FIG. 115 has liquid-refrigerant injectors; and that (2) the evaporator refrigerant passages of the combination shown in FIG. 115 are supplied by liquid-refrigerant jets exiting injectors, and not by liquid refrigerant exiting liquid header 101 (in FIG. 24).

N. Elaboration on Charging Techniques

1. Type C Combinations with Complete Minimum-pressure Maintenance

In the first case of the three cases recited in section V,H,11,c, I distinguish between applications where (1) air inside an R&IG enclosure does not react chemically with the refrigerant inside the enclosure, or with the internal surfaces of the walls of the enclosure, and where (2) the oxygen in the air reacts with that refrigerant, or with those surfaces, and is depleted without causing a significantly adverse effect. (If oxygen were depleted while causing a significant adverse effect, air would not be an inert gas in the sense the term 'inert gas' is defined in definition 72 in section II,A,2.) In the applications cited under (2) in this minor paragraph, the predetermined charging value of the total pressure inside an R&IG enclosure is established by taking into account the reduction in total pressure at a given temperature, caused by depletion of the oxygen originally contained in the air inside the enclosure.

In the third case of the three cases recited in section V,H,11,c, I distinguish between applications where (1) a small fraction, say a few percent, of the mass of the non-condensable gas inside an R&IG enclosure, after the enclosure has been charged with refrigerant and inert gas, may be air; and where (2) it is desirable or essential to minimize the mass of air remaining inside the enclosure after it has been charged with refrigerant and inert gas. In the latter applications, the following flushing method steps may be used: (i) with, where applicable, all valve passages of the R&IG enclosure open, inert gas is inserted into the enclosure until the total pressure inside the enclosure reaches the maximum permissible value; (ii) inert gas and air inside the enclosure are allowed to diffuse throughout the enclosure until the inert gas and the air inside the enclosure form a quasi-homogeneous mixture; and (iii) the mixture is purged until its total pressure inside the enclosure is at, or slightly above, ambient atmospheric pressure. Steps (i) to (iii) are repeated until the mass of air, and in particular of oxygen, remaining inside the R&IG enclosure is less than or equal to a preselected upper limit. The technique or the method used to respectively measure or predict the mass of air remaining inside an R&IG enclosure depends on the inert gas used and on the design of the airtight configuration to which the enclosure belongs. Where applicable, permissible, and possible, the airtight configuration's refrigerant pumps and GT pumps are run during step (ii) to assist the diffusion process by forced convection. In the case of the R&IG configuration shown in FIG. 83B, inert gas and refrigerant are inserted through access valve 826, and gas inside the configuration is removed through pressure-relief and flush valve 831. (Additional flush valves may be required.) Pump 46D could be run during step (ii) if permissible, namely if the type of pump used for pump 46D would not be damaged by pumping a gas; but pump 443A obviously could not be run during step (ii) unless it were run by means not requiring the engine having cylinder banks 500*a* and 500*b* to be run.

An airtight configuration may be fixed to the ground and have essentially only one environment, or may be installed on a moving platform having changing environments. I shall refer to the effective temperature of an airtight system's current environment as the 'environmental temperature'. The term 'effective temperature' takes into account, in addition to ambient temperature, radiant energy absorbed by the airtight configuration and radiant energy released by the airtight configuration to remote, including celestial, bodies. The temperature of, as applicable, the refrigerant enclosure, or the R&IG enclosure, of an airtight configuration is equal to the environmental temperature when the enclosure is in thermal equilibrium with its current environment.

An airtight configuration of a type C combination can almost always achieve complete minimum-pressure maintenance, over the entire range of its environmental temperatures, if the (total) internal pressure throughout the airtight configuration's R&IG enclosure can be maintained at or above a preselected minimum-pressure-maintenance value when the enclosure's temperature is equal to the design lowest environmental temperature. An airtight configuration is usually not charged at the design lowest environmental temperature. I have therefore devised a method for determining the internal pressure at which the configuration should be charged for minimum-pressure maintenance to be achieved while keeping the value of that internal pressure as low as possible at the design highest environmental temperature. To this end I use the relation $$p_c^* = \frac{T_C}{T_0} * \frac{(V_T + \Delta_E V_T) - V_{L,C}}{V_T - V_{L,0}} * \frac{M_G}{M_G - \Delta M_G} * p_0^* \quad (57)$$

where $T_C$ and $T_0$ are respectively the value of the configuration's charging temperature and of the configuration's design lowest environmental temperature; where $V_{L,C}$ is the value of the liquid refrigerant volume at $T_C$; where $V_T$ is the total volume of the enclosure, assumed constant except for thermal expansion; where $V_{L,0}$ is the value of the volume $V_L$ of the liquid refrigerant in the enclosure at $T_0$; where $p^*_c$ and $p^*_0$ are the configuration's internal pressure at respectively $T_C$ and $T_0$; where $\Delta_E V_T$ is the increase in the value of $V_T$, caused by thermal expansion, as the enclosure's temperature increases from $T_0$ to $T_C$; where $M_G$ is the inert-gas mass with which the enclosure is charged (at $T_C$); and where $\Delta M_G$ is the mass of inert gas which comes out of solution as the temperature of the enclosure increases from $T_0$ to $T_C$. The value of $\Delta M_G$ can be obtained for a specific refrigerant, and a specific inert gas, as a function of temperature, total pressure, and concentration, from published tables. The definition of, and the sign preceding, $\Delta M_G$ in relation (57) assumes the refrigerant with which the airtight configuration is charged includes nitrogen in solution. If that refrigerant does not include nitrogen in solution, the definition of $\Delta M_G$ would be the mass of inert gas in solution at $T_0$, and the negative sign preceding $\Delta M_G$ would be replaced by a positive sign.

Relation (57) applies to an airtight configuration having a fixed-volume IG reservoir. It also applies to an airtight configuration having a variable-volume IG reservoir which is constrained so that its internal volume $V_{GR}$ has its minimum possible value $\Delta V_{GR,MIN}$ while the configuration is being charged, and while the configuration's enclosure is at $T_0$—provided $V_{T,0}$ includes $V_{GR,MIN}$. If a variable-volume IG reservoir of an airtight configuration is not thus constrained and the value of $V_T$ increases from $V_{T,0}$ at $T_0$ to $V_{T,C}$ at $T_C$, the second factor in relation (57) is replaced by the factor $$K_V = \frac{(V_{T,C} + \Delta_E V_T) - V_{L,C}}{V_{T,0} - V_{L,0}}. \quad (58)$$

2. Type C Combinations with Partial Minimum-pressure Maintenance

In the case of partial minimum-pressure maintenance, relation (57), or relation (58) with the second factor replaced by $K_v$, can in essence be used for the isolated part of the R&IG enclosure (of a type C combination) into which inert gas is inserted.

O. Elaboration on Gas Pumps

GT pumps may, depending on the application, be multi-stage compressors with or without intercooling, or may be single-stage compressors. In either case, the effective capacity of a GT pump may be non-zero for time intervals which are substantially shorter than the time intervals during which the effective capacity of a GT pump is zero.

The effective capacity of a GT pump may be zero either because it is not running, or because a valve is used to cause the pump's effective capacity to be zero while the pump is running. A GT pump, in a correctly designed circuit, consumes no power while it is not running; and consumes, while it is running with a given inherent capacity and a zero effective capacity, only a small fraction of the power the GT pump would consume at the same inherent capacity if its effective capacity were equal to its inherent capacity. An example of a correctly designed circuit in the latter case is shown in FIG. 108; where the effective capacity of pump 776 is controlled by a recirculation valve (valve 775), and where a unidirectional valve (valve 777) is used to isolate pump 776 from the pressure in reservoir 441 while the pump's effective capacity is zero.

In cases where the time intervals during which a GT pump has a non-zero effective capacity are short compared to the time intervals during which the pump has a zero effective capacity, it is often advantageous to place a cylinder of a GT pump in direct physical and thermal contact with an IG reservoir supplied with the inert-gas and refrigerant-vapor mixture exiting the pump. This last statement assumes the walls of the pump and the reservoir are made of thermally-conducting material. The specific advantages obtained by the last-cited direct contact—which inherently combines the thermal capacities of the cylinder and the reservoir—depend on several design parameters, including the relative magnitudes of the masses of the cylinder and the reservoir; and, in the case where the cylinder and the reservoir are air-cooled, on the relative magnitudes of the external surfaces (including extended surfaces) of the cylinder and the reservoir. Generally speaking, however, the foregoing specific advantages include reducing, at a given pump inlet pressure, the reservoir's internal pressure and the pump's compression ratio; and/or reducing the temperature of the inert-gas and refrigerant-vapor mixture exiting the pump. Furthermore, in cases where the pump is driven by a motor which runs even while the pump's effective capacity is zero, the foregoing specific advantages also include reducing the temperature of the pump while it runs with zero effective capacity. The achievable reduction in the last-cited temperature can be substantial in several cases, including in cases where the external surface of the reservoir is considerably larger than the external surface of the cylinder of the GT pump in direct physical and thermal contact with the reservoir.

To maximize the reduction in an IG reservoir's internal pressure achievable by placing a GT pump and an IG reservoir in direct physical and thermal contact, it is necessary to maximize the rate at which the inert-gas and refrigerant-vapor mixture, inside the reservoir, transfers heat by convection to the reservoir's walls. $T_0$ this end, I use known techniques for extending the internal surface of the reservoir's walls, and for increasing the rate at which the mixture circulates by natural convection inside the reservoir. The foregoing known techniques include using one or more low-pitch spirals, made of thermally-conducting material, inside and in direct physical and thermal contact with the inner surface of the reservoir's walls. The surface of the spirals extends the internal surface of the reservoir's walls, and the spirals are located and configured so that the velocity of the inert-gas and refrigerant-vapor mixture with respect to the internal surface of the reservoir's structure is higher than that velocity would have been in the absence of those spirals.

An example of a configuration where the cylinder of a GT pump is placed in direct physical and thermal contact with an IG reservoir is shown in FIG. 116 for the particular case of a single-cylinder GT pump. The particular configuration illustrated in FIG. 116shows a pump whose cylinder's outer surface is cylindrical, a cylindrical IG reservoir, and a fixed volume IG reservoir; but the three last-cited limitations are obviously not necessary for placing a cylinder of a GT pump in direct physical and thermal contact with an IG reservoir. (In the case of a variable-volume IG reservoir, the GT pump's cylinder would usually be in direct contact with only rigid parts of the IG reservoir's walls.) In FIG. 116, numeral 960 designates any GT pump, although the GT pump shown is driven by a motor (not shown) through pinion 961 and gear 962. Numeral 963 designates the GT pump's cylinder head, and numeral 964 designates the part of cylindrical head 963 in direct contact with walls 965 of IG reservoir 453. Numerals 966 and 967 designate respectively the inlet and outlet of pump 960, and numeral 968 designates the outlet of reservoir 453. Designators 623 and 624, shown also in FIG. 61, are defined in section V,G,2,b,ii.

P. Elaboration of Pressure-Equalization Lines

Pressure-equalization lines have been so far shown in this DESCRIPTION in FIGS. 1A, 3A, 4A, and 83, and have also been shown in FIGS. 1A, 1E, 1F, and 16A, of my now pending application Ser. No. 400,738, filed 30 Aug. 1989. But pressure-equalization lines have not been shown in all the FIGURES where they may be necessary, because the rules which determine whether they are necessary are the same as those for heat pumps, including refrigeration systems, whether they are necessary are the same as those for heat pumps, including refrigeration systems, and are therefore well known. For example, a pressure-equalization line between receiver 7 and dual-return receiver 640 in FIG. 61 will be necessary when the level of the liquid-vapor interface surface in receiver 7 is not high enough above the level of the liquid-vapor interface surface in receiver 640 for gravity to cause liquid refrigerant to flow from outlet 9 of receiver 7 to node 49. Liquid refrigerant may sometimes not flow from outlet 9 to node 49 because the refrigerant-vapor pressure in receiver 640 is higher than the refrigerant-vapor pressure in receiver 7. (The temperature of liquid refrigerant entering receiver 7 at 8 will always be—albeit sometimes only slightly—above the temperature of refrigerant vapor entering receiver 640 at 641, and this causes the refrigerant-vapor pressure in receiver 7 to be higher than the refrigerant-vapor pressure in receiver 640.)

Q. Refrigerant Diverting Valve

In certain special applications it may be desirable for an airtight configuration, or an evacuated configuration, to include a refrigerant diverting valve and a refrigerant line for by-passing refrigerant around the configuration's condenser. FIG. 117 shows the particular case where an airtight configuration has a class $I_F^S$ principal configuration and a IGP configuration; and where diverting valve 970 is used to control, at least in part, the rate at which condenser 4 releases heat, and mixing valve 695 controls, at least in part, the rate at which subcooler 18 releases heat. Diverting valve 970 or mixing valve 965 can be controlled by signals provided by a central control unit or by a sensing and actuating element which is an integral part of respectively valve 970 or valve 965.

R. Elaboration on Obtaining an Estimate of the Evaporation Rate

It is well know that the rate $\dot{Q}_{abs}$ at which the heat-transfer fluid of a prior-art 'heat-transfer system', as defined in section 1, absorbs heat from a combustion gas obtained by burning a fuel can be estimated from the fuel's mass-flow rate $\dot{m}_F$, or almost equivalently from the fuel's volumetric flow rate $F_F$. It is also well known that the accuracy of the estimate of $\dot{Q}_{abs}$ can be increased in heating systems, and in engine-cooling systems, by also using the air-fuel ratio $\dot{m}_F/\dot{m}_A$, where $\dot{m}_A$ is the mass-flow rate of the air used to burn the fuel. It is also well known (see for example 'Internal Combustion Engine Fundamentals' by John B. Heywood, McGraw 1988, section 12.7.2 and the references cited therein) that the accuracy of the subject estimate can be further increased in the case of engine-cooling systems by using the current value of additional parameters such as engine intake temperature and, as applicable, spark timing or fuel-injection timing.

I assert that the facts cited in the immediately-preceding minor paragraph apply also to airtight systems (of the invention) used for heating and/or cooling, and that the invention includes using those facts for estimating the rate at which airtight systems absorb heat from a combustion gas. I note that the last-cited rate can be used to estimate the resulting evaporation rate of an airtight system by using $$\dot{m}_\theta = (\dot{Q}_{abs} - c_{pi}\dot{m}_C\Delta_{Sb1}T - c_{pi}\dot{m}_E\Delta_{Sb2}T - c_{pg}\dot{m}_C\Delta_{Sb}T) \qquad (59)$$

where $\dot{Q}_{abs}$ is the rate at which heat is absorbed by the refrigerant from the combustion gas; where $\dot{m}_C$ and $\dot{m}_E$ are the mass-flow rates of the refrigerant through respectively the condenser and the evaporator refrigerant passages; where $\Delta_{Sb1}T$ and $\Delta_{Sb2}T$ are the amounts (expressed in degrees Celsius) by which respectively the flow rates $\dot{m}_C$ and $\dot{m}_E$ are subcooled; where $c_{pi}$ and $c_{pg}$ are the specific heats of the refrigerant in respectively its liquid and vapor phases; and where $\Delta_{Sh}T$ is the amount by which the flow rate $\dot{m}_C$ is superheated.

VI. INDUSTRIAL APPLICABILITY

For examples of industrial applicability see section III,C.

I claim:

1. A heat-transfer system, in a gravitational field, for absorbing heat from one or more heat sources, and for transferring the absorbed heat to one or more heat sinks, wherein the system includes an airtight configuration, and wherein none of the one or more heat sources is an electrical apparatus having windings electrically insulated even in part by an inert gas inside the airtight configuration; the airtight configuration having (1) a refrigerant principal configuration comprising:

(a) a refrigerant for absorbing heat from the one or more heat sources by—under at least some operating conditions—changing at least in part from a liquid to a vapor, and for releasing the absorbed heat to the one or more heat sinks by—under at least some operating conditions—changing at least in part from a vapor back into a liquid, none o f the one or more heat sources including an electrical apparatus having windings electrically insulated even in part by an inert gas inside the airtight configuration; the refrigerant having one or more saturated-vapor pressures for a given refrigerant temperature;

(b) one or more hot heat exchangers for transmitting heat from the one or more heat sources to the refrigerant, the one or more hot heat exchangers including an evaporator for transmitting heat from a first heat source of the one or more heat sources to the refrigerant and for—under at least some operating conditions—evaporating liquid refrigerant; the evaporator having one or more refrigerant passages wherein—under at least some operating conditions—at least a portion of liquid refrigerant entering the one or more evaporator refrigerant passages is evaporated;

(c) one or more cold heat exchangers for transmitting heat from the refrigerant to the one or more heat sinks, the one or more cold heat exchangers including a condenser for transmitting heat from the refrigerant to a first heat sink of the one or more heat sinks and for—under at least some operating conditions—condensing refrigerant vapor; the condenser having one or more condenser refrigerant passages wherein—under at least some operating conditions—refrigerant vapor is condensed, the highest pressure at which condensation occurs in the one or more condenser refrigerant passages, at an instant in time, not exceeding the lowest pressure at which evaporation occurs in the one or more evaporator refrigerant passages at the selfsame instant in time; and (d) one or more refrigerant circuits containing refrigerant partly in the liquid phase and partly in the vapor phase under at least some operating conditions, the one or more refrigerant circuits comprising a refrigerant principal circuit around which the refrigerant circulates, not excluding intermittently, while the principal configuration is active the refrigerant principal circuit including (i) the one or more evaporator refrigerant passages and the one or more condenser refrigerant passages, (ii) refrigerant-vapor transfer means for transferring refrigerant vapor from the one or more evaporator refrigerant passages to the one or more condenser refrigerant passages, and (iii) liquid-refrigerant principal transfer means for transferring liquid refrigerant from the one or more condenser refrigerant passages to the one or more evaporator refrigerant passages; and (2) supplementary-configuration means for ensuring the total pressure inside at least a part of the one or more refrigerant circuits of the principal configuration is maintained, for at least a part of the time during which the refrigerant principal configuration is inactive, at or above a preselected minimum pressure having a value higher than the lowest value of the refrigerant's one or more saturated-vapor pressures corresponding to the lowest temperature experienced by the refrigerant while the principal configuration is inactive; the supplementary-configuration means allowing said value to differ from the current value of the ambient atmospheric pressure, and the supplementary-configuration means comprising one or more controllable means.

2. A system, according to claim 1, wherein the one or more heat sources include a material substance remote from the one or more hot heat exchangers; and wherein the remote material substance emits thermal radiation intercepted by at least one of the system's one or more hot heat exchangers.

3. A system, according to claim 1, wherein each of the one or more hot heat exchangers has one or more refrigerant passages; wherein the one or more heat sources include a material substance contiguous, at least in part, to the one or more refrigerant passages of at least one of the one or more hot heat exchangers; and wherein heat is transmitted by one or more of the three modes of heat transfer known in the art as conduction heat transfer, convection heat transfer, and radiation heat transfer, from the contiguous material substance to the refrigerant in the one or more refrigerant passages of said at least one of the one or more hot heat exchangers.

4. A system, according to claim 3, wherein the contiguous material substance is a solid; and wherein the one or more refrigerant passages of said at least one of the one or more hot heat exchangers are embedded in the solid.

5. A system, according to claim 3, wherein the contiguous material substance, not excluding a salt, releases—under at least some operating Conditions—primarily latent heat; and wherein the one or more refrigerant passages of said at least one of the one or more heat exchangers are embedded or immersed in the contiguous material substance.

6. A system, according to claim 3, wherein the contiguous material substance, not excluding electrolytic cells, releases chemical energy.

7. A system, according to claim 3, wherein the contiguous material substance releases nuclear energy.

8. A system, according to claim 3, wherein the contiguous material substance includes the windings of an electric motor.

9. A system, according to claim 3, wherein the contiguous material substance includes the windings of an electric generator.

10. A system, according to claim 3, wherein the contiguous material substance includes the windings of an electric transformer.

11. A system, according to claim 3, wherein the contiguous material substance includes electronic circuits, not excluding infrared and photovoltaic arrays.

12. A system, according to claim 3, wherein the contiguous material substance is a hot fluid, not excluding a liquid metal such as lithium, and not excluding a non-azeotropic fluid; and wherein said at least one of the one or more hot heat exchangers has one or more fluid ways for absorbing heat from the hot fluid.

13. A system, according to claim 12, wherein the hot fluid is a waste gas, not excluding a flue gas and the exhaust gas of a gas turbine.

14. A system, according to claim 12, wherein the hot fluid is a gas generated by combustion of a fuel.

15. A system, according to claim 12, wherein the hot fluid is a gas generated by combustion of a fuel inside an internal combustion engine attached to a platform, the platform not excluding a vehicle; and wherein the one or more evaporator refrigerant passages are an integral part of a quasi-stationary part of the engine with respect to the platform.

16. A system, according to claim 15, wherein the engine is a rotary engine, not excluding a Wankel engine.

17. A system, according to claim 1, wherein the one or more heat sinks include a material substance remote from the one or more cold heat exchangers; and wherein the remote material substance intercepts thermal radiation emitted by at least one of the system's one or more cold heat exchangers.

18. A system, according to claim 1, wherein each of the one or more cold heat exchangers has one or more refrigerant passages; wherein the one or more heat sinks include a material substance contiguous, at least in part, to the one or more refrigerant passages of at least one of the one or more cold heat exchangers; and wherein heat is transmitted, by one or more of the three modes of heat transfer known in the art as conduction heat transfer, connection heat transfer, and radiation heat transfer, from the refrigerant in the one or more refrigerant passages of said at least one of the one or more cold heat exchangers to the contiguous material substance.

19. A heat-transfer system, in a gravitational field, for absorbing heat from one or more heat sources and for transferring the absorbed heat to one or more heat sinks; the system including an airtight refrigerant configuration having (1) a refrigerant principal configuration comprising:

(a) a refrigerant for absorbing heat from the one or more heat sources by—under at least some operating conditions—changing at least in part from a liquid to a vapor, and for releasing the absorbed heat to the one or more heat sinks by—under at least some operating conditions—charging at least in part from a vapor back into a liquid;

(b) one or more hot heat exchangers for transmitting heat from the one or more heat sources to the refrigerant, the one or more hot heat exchangers including an evaporator for transmitting heat from a first heat source of the one or more heat sources to the refrigerant and for—under at least some operating conditions—evaporating liquid refrigerant; the evaporator having one or more refrigerant passages wherein—under at least some operating conditions—at least a portion of liquid refrigerant entering the one or more evaporator refrigerant passages is evaporated;

(c) one or more cold heat exchangers for transmitting heat from the refrigerant to the one or more heat sinks, the one or more cold heat exchangers including a condenser for transmitting heat from the refrigerant to a first heat sink of the one or more heat sinks and for—under at least some operating conditions—condensing refrigerant vapor; the condenser having one or more condenser refrigerant passages wherein—under at least some operating conditions—refrigerant vapor is condensed, the highest pressure at which condensation occurs in the one or more condenser refrigerant passages, at an instant in time, not exceeding the lowest pressure at which evaporation occurs in the one or more evaporator refrigerant passages at the selfsame instant in time; and (d) one or more refrigerant circuits containing refrigerant partly in the liquid phase and partly in the vapor phase under at least some operating conditions, the one or more refrigerant circuits containing essentially no air while the principal configuration is active and while the principal configuration is inactive, said circuits comprising a refrigerant principal circuit around which the refrigerant circulates, not excluding intermittently, while the principal configuration is active; the refrigerant principal circuit including (i) the one or more evaporator refrigerant passages and the one or more condenser refrigerant passages, (ii) refrigerant-vapor transfer means for transferring refrigerant vapor from the one or more evaporator refrigerant passages to the one or more condenser refrigerant passages, and (iii) liquid-refrigerant principal transfer means for transferring liquid refrigerant from the one or more condenser refrigerant passages to the one or more evaporator refrigerant passages; and (2) a refrigerant ancillary configuration comprising (a) a liquid-refrigerant reservoir for storing liquid refrigerant outside the principal configuration's one or more refrigerant circuits;

(b) liquid-refrigerant ancillary transfer means for transferring liquid refrigerant from the reservoir to the principal configuration's one or more refrigerant circuits, and for transferring liquid refrigerant from the principal configuration's one or more refrigerant circuits to the reservoir, thereby changing the amount of liquid refrigerant in the principal configuration's one or more refrigerant circuits; and (c) one or more controllable means for controlling collectively the transfer of liquid refrigerant between the reservoir and the principal configuration's one or more refrigerant circuits.

20. A system, according to claim 19, wherein the refrigerant principal configuration also comprises means for fluidly isolating, while the refrigerant principal configuration is inactive, a first part of the one or more refrigerant circuits of the refrigerant principal configuration from a second part of said one or more refrigerant circuits; wherein the liquid-refrigerant ancillary transfer means is fluidly connected to said first part; wherein the liquid-refrigerant reservoir is a variable-volume reservoir; wherein said one or more controllable means fluidly connect said variable-volume reservoir to said first part for at least some of the time during which the refrigerant principal configuration is inactive, and fluidly isolate said variable-volume reservoir from said first part under at least some operating conditions; and wherein said isolating means fluidly isolates said first part from said second part for at least some of the time during which the refrigerant principal configuration is inactive, and fluidly connects said first part to said second part under at least some operating conditions.

21. A system, according to claim 20, wherein the one of more controllable means is a refrigerant valve.

22. A system, according to claim 20, wherein said first part is completely filled with liquid refrigerant immediately prior to the instant in time at which the refrigerant principal configuration becomes inactive.

23. A system, according to claim 20, wherein the refrigerant has one or more saturated-vapor pressures at a given refrigerant temperature; and wherein the total pressure inside said first part is maintained, for at least some of the time during which the refrigerant principal configuration is inactive, at or above a preselected minimum pressure having a value higher than the lowest value of the refrigerant's one or more saturated-vapor pressures corresponding to the lowest temperature experienced by the refrigerant while the refrigerant principal configuration is inactive.

24. A heat-transfer system, in a gravitational field, for absorbing heat from one or more heat sources, and for transferring the absorbed heat to one or more heat sinks, wherein the system includes an airtight refrigerant and inert-gas configuration, and wherein none of the one or more heat sources is an electrical apparatus having windings electrically insulated even in part by an inert gas inside the airtight refrigerant and inert-gas configuration; the airtight refrigerant and inert-gas configuration having (1) a refrigerant principal configuration comprising:

(a) a refrigerant for absorbing heat from the one or more heat sources by—under at least some operating conditions—changing at least in part from a liquid to a vapor, and for releasing the absorbed heat to the one or more heat sinks by—under at least some operating conditions—changing at least in part from a vapor back into a liquid, none of the one or more scat sources including an electrical apparatus having windings electrically insulated even in part by an inert gas inside the airtight configuration;

(b) one or more hot heat exchangers for transmitting heat from the one or more heat sources to the refrigerant, the one or more hot heat exchangers including an evaporator for transmitting heat from a first heat source of the one or more heat sources to the refrigerant and for—under at least some operating conditions—evaporating liquid refrigerant; the evaporator having one or more refrigerant passages wherein—under at least some operating conditions—at least a portion of liquid refrigerant entering the one or more evaporator refrigerant passages is evaporated;

(c) one or more cold heat exchangers for transmitting heat from the refrigerant to the one or more heat sinks, the one or more cold heat exchangers including a condenser for transmitting heat from the refrigerant to a first heat sink of the one or more heat sinks and for condensing refrigerant vapor; the condenser having one or more condenser refrigerant passages wherein—under at least some operating conditions—refrigerant vapor is condensed, the highest pressure at which condensation occurs in the one or more condenser refrigerant passages, at an instant in time, not exceeding the lowest pressure at which evaporation occurs in the one or more evaporator refrigerant passages at the selfsame instant in time; and (d) one or more refrigerant circuits containing refrigerant partly in the liquid phase and partly in the vapor phase under at least some operating conditions, the one or more refrigerant circuits comprising a refrigerant principal circuit around which the refrigerant circulates, not excluding intermittently, while the principal configuration is active; the refrigerant principal circuit including (i) the one or more evaporator refrigerant passages and the one or more condenser refrigerant passages, (ii) refrigerant-vapor transfer means for transferring refrigerant vapor from the one or more evaporator refrigerant passages to the one or more condenser refrigerant passages, and (iii) liquid-refrigerant principal transfer means for transferring liquid refrigerant from the one or more condenser refrigerant passages to the one or more evaporator refrigerant passages; and (2) an inert-gas configuration comprising (a) an inert gas;

(b) an inert-gas reservoir for storing inert gas outside the principal configuration's one or more refrigerant circuits;

(c) inert-gas transfer means for transferring the inert gas from the reservoir to the principal configuration's one or more refrigerant circuits, and for transferring the inert gas from the principal configuration's one or more refrigerant circuits to tho reservoir, thereby changing the mass of inert gas in the principal configuration's one, or more refrigerant circuits; and (d) one or more controllable means for controlling collectively the transfer of the inert gas between the reservoir and the principal configuration's one or more refrigerant circuits.

25. A system, according to claim 24, wherein the system also includes a refrigerant ancillary configuration comprising (a) a liquid-refrigerant reservoir for storing liquid refrigerant outside the principal configuration's one or more refrigerant circuits; and (b) liquid-refrigerant ancillary transfer means for transferring liquid refrigerant from the reservoir to the principal configuration's one or more refrigerant circuits, and for transferring liquid refrigerant from the principal configuration's one or more refrigerant circuits to the reservoir.

26. A system, according to claim 24 wherein the refrigerant principal configuration also comprises means for fluidly isolating, while the principal configuration is inactive, a first part of the one or more refrigerant circuits of the refrigerant principal configuration from a second part of said one or more refrigerant circuits; wherein the inert-gas transfer means is fluidly connected to said first part; and wherein said isolating means fluidly isolates said first part from said second part for at least some of the time during which the refrigerant principal configuration is inactive, and fluidly connects said first part to said second part under at least some operating conditions.

27. A system, according to claim 26, wherein the refrigerant has one or more saturated-vapor pressures at a given refrigerant temperature; and wherein the total pressure inside said first part is maintained, for at least some of the time during which the refrigerant principal configuration is inactive, at or above a preselected minimum pressure having a value higher than the lowest value of the refrigerant's one or more saturated-vapor pressures corresponding to the lowest temperature experienced by the refrigerant while the refrigerant principal configuration is inactive.

28. A heat-transfer system, in a gravitational field, for absorbing heat from one or more heat sources, and for transferring the absorbed heat to one or more heat sinks, wherein the system includes an airtight configuration, and wherein none of the one or more heat sources being either an electrical apparatus having windings electrically insulated even in part by an inert gas inside the airtight configuration; the system having (1) a refrigerant principal configuration comprising:

(a) a refrigerant for absorbing heat from the one or more heat sources by—under at least some operating conditions—changing at least in part from a liquid to a vapor, and for releasing the absorbed heat to the one or more heat sinks by—under at least some operating conditions—changing at least in part from a vapor back into a liquid, none of the one or more heat sources including an electrical apparatus having windings electrically insulated even in part by an inert gas inside the airtight configuration; the refrigerant having one or more saturated-vapor pressures for a given refrigerant temperature;

(b) one or more hot heat exchangers for transmitting heat from the one or more heat sources to the refrigerant, the one or more hot heat exchangers including an evaporator for transmitting heat from a first heat source of the one or more heat sources to the refrigerant and for—under at least some operating conditions—evaporating liquid refrigerant; the evaporator having one or more refrigerant passages wherein—under at least some operating conditions—at least a portion of liquid refrigerant entering the one or more evaporator refrigerant passages is evaporated;

(c) one or more cold heat exchangers for transmitting heat from the refrigerant to the one or more heat sinks, the one or more cold heat exchangers including a condenser for transmitting heat from the refrigerant to a first heat sink of the one or more heat sinks and for—under at least some operating conditions— condensing refrigerant vapor; the condenser having one or more condenser refrigerant passages wherein—under at least some operating conditions—refrigerant vapor is condensed, the highest pressure at which condensation occurs in the one or more condenser refrigerant passages, at an instant in time, not exceeding the lowest pressure at which evaporation occurs in the one or more evaporator refrigerant passages at the selfsame instant in time; and (d) one or more refrigerant circuits containing refrigerant partly in the liquid phase and partly in the vapor phase under at least some operating conditions, the one or more refrigerant circuits comprising a refrigerant principal circuit around which the refrigerant circulates, not excluding intermittently, while the principal configuration is active; the refrigerant principal circuit including (i) the one or more evaporator refrigerant passages and the one or more condenser refrigerant passages, (ii) refrigerant-vapor transfer means for transferring refrigerant vapor from the one or more evaporator refrigerant passages to the one or more condenser refrigerant passages, and (iii) liquid-refrigerant principal transfer means for transferring liquid refrigerant from the one or more condenser refrigerant passages to the one or more evaporator refrigerant passages;

(2) an inert-gas passive configuration comprising (a) an inert-gas;

(b) an inert-gas reservoir for storing inert gas outside the principal configuration; and (c) inert-gas passive transfer means for transferring the inert gas from the reservoir to the principal configuration, and for transferring the inert gas from the principal configuration to the reservoir;

the airtight configuration having an airtight refrigerant and inert-gas enclosure from which essentially all air is removed before the refrigerant and inert-gas enclosure is charged with refrigerant, and the inert gas with which the refrigerant and inert-gas enclosure is initially charged containing essentially no oxygen.

29. A system, according to claim 28, wherein the refrigerant principal configuration also comprises means for fluidly isolating, while the refrigerant principal configuration is inactive, a first part of the one or more refrigerant circuits of the refrigerant principal configuration from a second part of the one or more refrigerant circuits; wherein said first part is completely filled with liquid refrigerant immediately prior to the instant in time at which the principal configuration becomes inactive; and wherein said isolating means fluidly isolates said first part from said second part for at least some of the time during which the refrigerant principal configuration is inactive, and fluidly connects said first part to said second part under at least some operating conditions.

30. A system, according to claim 29, wherein the refrigerant has one or more saturated-vapor pressures at a given refrigerant temperature; and wherein the total pressure inside said first part is maintained, for at least some of the time during which the refrigerant principal configuration is inactive, at or above a preselected minimum pressure having a value higher than the lowest value of the refrigerant's one or more saturated-vapor pressures corresponding to the lowest temperature experienced by the refrigerant while the refrigerant principal configuration is inactive.

31. A heat-transfer system, in a gravitational field, for absorbing heat from one or more heat sources, and for transferring the absorbed heat to one or more heat sinks, wherein none of the one or more heat sources is an electrical apparatus having windings insulated at least in part by an inert gas inside the system; the system including an airtight configuration having a refrigerant principal configuration comprising:

(a) a refrigerant for absorbing heat from the one or more heat sources—under at least some operating conditions—at least in part by changing from a liquid to a vapor, and for releasing the absorbed heat to the one or more heat sinks at least in part by changing from a vapor back into a liquid, the refrigerant having—white the principal configuration is inactive and the enclosure of the airtight configuration is in thermal equilibrium with the environment of the airtight configuration—saturated-vapor pressures lower than the pressure of the ambient air of the airtight configuration, none of the one or more heat sources including an electrical apparatus having windings insulated at least in part by an inert gas inside the airtight configuration;

(b) one or more hot heat exchangers for transmitting heat from the one or more heat sources to the refrigerant, the one or more hot heat exchangers including an evaporator for transmitting heat from a first heat source of the one or more heat sources to the refrigerant and for—under at least some operating conditions—evaporating liquid refrigerant; the evaporator having one or more refrigerant passages wherein—under at least some operating conditions—at least a portion of liquid refrigerant entering the one or more evaporator refrigerant passages is evaporated, and also having one or more liquid-refrigerant injectors for increasing the velocity at which liquid refrigerant is supplied to the one or more evaporator refrigerant passages; a liquid-refrigerant injector of the one or more liquid-refrigerant injectors having an inlet through which liquid refrigerant enters the injector and one or more orifices through which liquid refrigerant exits the injector, the one or more orifices having a smaller total cross-sectional area than the cross-sectional area of the inlet of the injector.

(c) one or more cold heat exchangers for transmitting heat from the refrigerant to the one or more heat sinks, the one or more cold heat exchangers including a condenser for transmitting heat from the refrigerant to a first heat sink of the one or more heat sinks and for condensing refrigerant vapor; the condenser having one or more condenser refrigerant passages wherein—under at least some operating conditions—refrigerant vapor is condensed, the highest pressure at which condensation occurs in the one or more condenser refrigerant passages, at an instant in time, not exceeding the lowest pressure at which evaporation occurs in the one or more evaporator refrigerant passages at the selfsame instant in time; and (d) one or more airtight refrigerant circuits containing refrigerant partly in the liquid phase and partly in the vapor phase under at least some operating conditions, the one or more refrigerant circuits comprising a refrigerant principal circuit around which the refrigerant circulates, not excluding intermittently, while the principal configuration is active; the refrigerant principal circuit including (i) the one or more evaporator refrigerant passages and the one or more condenser refrigerant passages, (ii) refrigerant-vapor transfer means for transferring refrigerant vapor from the one or more evaporator refrigerant passages to the one or more condenser refrigerant passages, and (iii) liquid-refrigerant principal transfer means for transferring liquid refrigerant from the one or more condenser refrigerant passages to the one or more evaporator refrigerant passages.

32. A heat-transfer system, in a gravitational field, for absorbing heal from one or more heat sources, and for transferring the absorbed heat to one or more heat sinks, the system having (1) a refrigerant principal configuration comprising:

(a) a refrigerant for absorbing heat from the one or more heat sources—under at least some operating conditions—at least in part by changing from a liquid to a vapor, and for releasing the absorbed heat to the one or more heat sinks at least in part by changing from a vapor back into a liquid;

(b) one or more hot heat exchangers for transmitting heat from the one or more heat sources to the refrigerant, the one or more hot heat exchangers including an evaporator for transmitting heat from a first heat source of the one or more heat sources to the refrigerant and for—under at least some operating conditions—evaporating liquid refrigerant; the evaporator having one or more refrigerant passages wherein—under at least some operating conditions—at least a portion of liquid refrigerant entering the one or more evaporator refrigerant passages is evaporated;

(c) one or more cold heat exchangers for transmitting heat from the refrigerant to the one or more heat sinks, the one or more cold heat exchangers including a condenser for transmitting heat from the refrigerant to a first heat sink of the one or more heat sinks and for condensing refrigerant vapor; the condenser having one or more condenser refrigerant passages wherein—under at least some operating conditions—refrigerant vapor is condensed, the highest pressure at which condensation occurs in the one or more condenser refrigerant passages, at an instant in time, not exceeding the lowest pressure at which evaporation occurs in the one or more evaporator refrigerant passages at the selfsame instant in time; and (d) one or more airtight refrigerant circuits containing refrigerant usually partly in the liquid phase and partly in the vapor phase under at least some operating conditions, the one or more refrigerant circuits comprising a refrigerant principal circuit around which the refrigerant circulates, not excluding intermittently, while the principal configuration is active; the refrigerant principal circuit including (i) the one or more evaporator refrigerant passages and the one or more condenser refrigerant passages, (ii) refrigerant-vapor transfer means for transferring refrigerant vapor from the one or more evaporator refrigerant passages to the one or more condenser refrigerant passages, and (iii) liquid-refrigerant principal transfer means for transferring liquid refrigerant from the one or more condenser refrigerant passages to the one or more evaporator refrigerant passages;

the one or more airtight refrigerant circuits also containing non-condensable gas generated inside the one or more airtight refrigerant circuits, the non-condensable gas being mixed with refrigerant vapor; and (2) means for removing, at least in part, the non-condensable gas generated inside the one or more airtight refrigerant circuits, the non-condensable-gas removing means comprising (a) an airtight space fluidly connected to the one or more airtight refrigerant circuits so that non-condensable gas, mixed with refrigerant vapor, enters the airtight space;

(b) means for separating non-condensable gas and refrigerant vapor, entering the airtight space, primarily (i) by condensing a major portion of the refrigerant entering the airtight space, and (ii) by returning the thus generated refrigerant condensate to the one or more airtight refrigerant circuits; and (c) means for removing from the airtight space, and discharging into ambient air, non-condensable gas mixed with residual refrigerant vapor still present in the airtight space after non-condensable gas and refrigerant-vapor separation inside the airtight space.

33. A heat-transfer system, in a gravitational field, for absorbing heat from one or more heat sources and for transferring the absorbed heat to one or more heat sinks; the system having a refrigerant principal configuration comprising:

(a) a refrigerant for absorbing heat from the one or more heat sources by—under at least some operating conditions—changing at least in part from a liquid to a vapor, and for releasing the absorbed heat to the one or more heat sinks by—under at least some operating conditions—changing at least in part from a vapor back into a liquid;

(b) one or more hot heat exchangers for transmitting heat from the one or more heat sources to the refrigerant, the one or more hot heat exchangers including an evaporator for transmitting heat from a first heat source of the one or more heat sources to the refrigerant and for—under at least some operating conditions—evaporating liquid refrigerant; the evaporator having one or more refrigerant passages wherein—under at least some operating conditions—at least a portion of liquid refrigerant entering the one or more evaporator refrigerant passages is evaporated;

(c) one or more cold heat exchangers for transmitting heat from the refrigerant to the one or more heat sinks, the one or more cold heat exchangers including a condenser for transmitting heat from the refrigerant to a first heat sink of the one or more heat sinks and for—under at least some operating conditions—condensing refrigerant vapor; the condenser having one or more condenser refrigerant passages wherein—under at least some operating conditions—refrigerant vapor is condensed, the highest pressure at which condensation occurs in the one or more condenser refrigerant passages, at an instant in time, not exceeding the lowest pressure at which evaporation occurs in the one or more evaporator refrigerant passages at the selfsame instant in time;

(d) one or more airtight refrigerant circuits containing—under at least some operating conditions—refrigerant partly in the liquid phase and partly in the vapor phase while the refrigerant principal configuration is active and essentially no air while the refrigerant principal configuration is active and while the refrigerant principal configuration is inactive, the one or more airtight refrigerant circuits comprising a refrigerant principal circuit around which the refrigerant circulates, not excluding intermittently, while the refrigerant principal configuration is active; the refrigerant principal circuit including (1) the one or more evaporator refrigerant passage; and the one or more condenser refrigerant passages, (2) refrigerant-vapor transfer means for transferring refrigerant vapor from the one or more evaporator refrigerant passages to the one or more condenser refrigerant passages; and (3) liquid-refrigerant principal transfer means for transferring liquid refrigerant from the one or more condenser refrigerant passages to the one or more evaporator refrigerant passages;

(e) one or more refrigerant pumps having one or more refrigerant passages which are a part of the one or more airtight refrigerant circuits;

(f) means, including controllable means not excluding a diverting valve, for by-passing around the one or more condenser refrigerant passages refrigerant flowing in the refrigerant-vapor transfer means, and for transferring the by-passed refrigerant to a point of the liquid-refrigerant principal transfer means; and (g) means for ensuring—for a preselected range of refrigerant evaporation rates which includes at least two refrigerant evaporation rates differing significantly from each other—that each of the one or more refrigerant pumps has, while the evacuated configuration is active, an available net positive suction head high enough to prevent, under steady-state conditions, each of the one or more refrigerant pumps cavitating.

34. A heat-transfer system, in a gravitational field, for absorbing heat from one or more heat sources and for transferring the absorbed heat to one or more heat sinks; the system including a refrigerant principal configuration comprising:

(a) a refrigerant for absorbing heat from the one or more heat sources by—under at least some operating conditions—changing at least in part from a liquid to a vapor, and for releasing the absorbed heat to the one or more heat sinks by—under at least some operating conditions—changing at least in part from a vapor back into a liquid;

(b) one or more hot heat exchangers for transmitting heat from the one or more heat sources to the refrigerant, the one or more hot heat exchangers including an evaporator for transmitting heat from a first heat source of the one or more heat sources to the refrigerant and for—under at least some operating conditions—evaporating liquid refrigerant; the evaporator having one or more refrigerant passages wherein—under at least some operating conditions—at feast a portion of liquid refrigerant entering the one or more evaporator refrigerant passages is evaporated;

(c) one or more cold heat exchangers for transmitting heat from the refrigerant to the one or more heat sinks, the one or more cold heat exchangers including a condenser for transmitting heat from the refrigerant to a first heat sink of the one or more heat sinks and for—under at least some operating conditions—condensing refrigerant vapor; the condenser having one or more condenser refrigerant passages wherein—under at least some operating conditions—refrigerant vapor is condensed, the highest pressure at which condensation occurs in the one or more condenser refrigerant passages, at an instant in time, not exceeding the lowest pressure at which evaporation occurs in the one or more evaporator refrigerant passages at the selfsame instant in time;

(d) one or more airtight refrigerant circuits containing—under at least some operating conditions—refrigerant partly in the liquid phase and partly in the vapor phase while the refrigerant principal configuration is active and essentially no air while the refrigerant principal configuration is active and while the refrigerant principal configuration is inactive, the one or more airtight refrigerant circuits comprising a refrigerant principal circuit around which the refrigerant circulates, not excluding intermittently, while the refrigerant principal configuration is active; the refrigerant principal circuit including (1) the one or more evaporator refrigerant passages and the one or more condenser refrigerant passages, (2) refrigerant-vapor transfer means for transferring refrigerant vapor from the one or more evaporator refrigerant passages to the one or more condenser refrigerant passages; and (3) liquid-refrigerant principal transfer means for transferring liquid refrigerant from the one or more condenser refrigerant passages to the one or more evaporator refrigerant passages;

(e) one or more refrigerant pumps having one or more refrigerant passages which are a part of the one or more airtight refrigerant circuits;

(f) a subcooler having one or more refrigerant passages, the one or more subcooler refrigerant passages being a part of the liquid-refrigerant principal transfer means;

(g) means, including controllable means not excluding a mixing valve, for by-passing around the one or more subcooler refrigerant passages refrigerant flowing in the liquid-refrigerant principal transfer means segment between the one or more condenser refrigerant passages and the one or more subcooler refrigerant passages, and for transferring the by-passed refrigerant to a point of the liquid-refrigerant principal transfer means between the one or more subcooler refrigerant passages and the one or more evaporator refrigerant passages; and (h) means for ensuring—for a preselected range of refrigerant evaporation rates which includes at least two refrigerant evaporation rates differing significantly from each other—that each of the one or more refrigerant pumps has, while the evacuated configuration is active, an available net positive suction head high enough to prevent, under steady-state conditions, each of the one or more refrigerant pumps cavitating.

35. A heat-transfer system, in a gravitational field, for absorbing heat from one or more heat sources and for transferring the absorbed heat to one or more heat sinks; the system including an evacuated configuration comprising:

(a) a refrigerant for absorbing heat from the one or more heat sources by—under at least some operating conditions—changing at least in part from a liquid to a vapor, and for releasing the absorbed heat to the one or more heat sinks by—under at least some operating conditions—changing at least in part from a vapor back into a liquid;

(b) one or more hot heat exchangers for transmitting heat from the one or more heat sources to the refrigerant, the one or more hot heat exchangers including an evaporator for transmitting heat from a first heat source of the one or more heat sources to the refrigerant and for— under at least some operating conditions—evaporating liquid refrigerant; the evaporator hiving one or more refrigerant passages wherein—under at least some operating conditions—at least a portion of liquid refrigerant entering the one or more evaporator refrigerant passages is evaporated; the evaporator also having one or more liquid-refrigerant injectors for increasing the velocity at which liquid refrigerant is supplied to the one or more evaporator refrigerant passages; a liquid-refrigerant injector of the one or more liquid-refrigerant injectors having an inlet through which liquid refrigerant enters the injector and one or more orifices through which liquid refrigerant enters the injector, the one or more orifices having a smaller total cross-sectional area than the cross-sectional area of the inlet of the injector;

(c) one or more cold heat exchangers for transmitting heat from the refrigerant to the one or more heat sinks, the one or more cold heat exchangers including a condenser for transmitting heat from the refrigerant to a first heat sink of the one or more heat sinks and for—under at least some operating conditions—condensing refrigerant vapor; the condenser having one or more condenser refrigerant passages wherein—under at least some operating conditions—refrigerant vapor is condensed, the highest pressure at which condensation occurs in the one or more condenser refrigerant passages, at an instant in time, not exceeding the lowest pressure at which evaporation occurs in the one or more evaporator refrigerant passages at the selfsame instant in time;

(d) one or more evacuated refrigerant circuits containing—under at least some operating conditions—refrigerant partly in the liquid phase and partly in the vapor phase while the evacuated configuration is active and essentially no air while the evacuated configuration is active and while the evacuated configuration is inactive, the one or more evacuated refrigerant circuits comprising a refrigerant principal circuit around which the refrigerant circulates, not excluding intermittently, while the evacuated configuration is active; the refrigerant principal circuit including (1) the one or more evaporator refrigerant passages and the one or more condenser refrigerant passages, (2) refrigerant-vapor transfer means for transferring refrigerant vapor from the one or more evaporator refrigerant passages to the one or more condenser refrigerant passages; and (3) liquid-refrigerant principal transfer means for transferring liquid refrigerant from the one or more condenser refrigerant passages to the one or more evaporator refrigerant passages;

(e) one or more refrigerant pumps having one or more refrigerant passages which are a part of the one or more evacuated refrigerant circuits; and (f) means for ensuring—for a preselected range of refrigerant evaporation rates which includes at least two refrigerant evaporation rates differing significantly from each other—that each of the one or more refrigerant pumps has, while the evacuated configuration is active, an available net positive suction head high enough to prevent, under steady-state conditions, each of the one or more refrigerant pumps cavitating.

36. A heat-transfer system, in a gravitational field, for absorbing heat from one or more heat sources and for transferring the absorbed heat to one or more heat sinks; the system including an evacuated configuration comprising:

(a) a refrigerant for absorbing heat from the one or more heat sources by—under at least some operating conditions—changing at least in part from a liquid to a vapor, and for releasing the absorbed heat to the one or more heat sinks by—under at least some operating conditions—changing at least in part from a vapor back into a liquid;

(b) one or more hot heat exchangers for transmitting heat from the one or more heat sources to the refrigerant, the one or more hot heat exchangers including an evaporator for transmitting heat from a first heat source of the one or more heat sources to the refrigerant and for—under at least some operating conditions—evaporating liquid refrigerant; the evaporator having one or more refrigerant passages wherein—under at least some operating conditions—at least a portion of liquid refrigerant entering the one or more evaporator refrigerant passages is evaporated;

(c) one or more cold heat exchangers for transmitting heat from the refrigerant to the one or more heat sinks, the one or more cold heat exchangers including a condenser for transmitting heat from the refrigerant to a first heat sink of the one or more heat sinks and for—under at least some operating conditions—condensing refrigerant vapor; the condenser having one or more condenser refrigerant passages wherein—under at least some operating conditions—refrigerant vapor is condensed, the highest pressure at which condensation occurs in the one or more condenser refrigerant passages, at an instant in time, not exceeding the lowest pressure at which evaporation occurs in the one or more evaporator refrigerant passages at the selfsame instant in time;

(d) one or more evacuated refrigerant circuits containing—under at least some operating conditions—refrigerant partly in the liquid phase and partly in the vapor phase while the evacuated configuration is active and essentially no air while the evacuated configuration is active and while the evacuated configuration is inactive, the one or more evacuated refrigerant circuits comprising a refrigerant principal circuit around which the refrigerant circulates, not excluding intermittently, while the evacuated configuration is active; the refrigerant principal circuit including (1) the one or more evaporator refrigerant passages and the one or more condenser refrigerant passages, (2) refrigerant-vapor transfer means for transferring refrigerant vapor from the one or more evaporator refrigerant passages to the one or more condenser refrigerant passages; and (3) liquid-refrigerant principal transfer means for transferring liquid refrigerant from the one or more condenser refrigerant passages to the one or more evaporator refrigerant passages;

(e) one or more refrigerant pumps having one or more refrigerant passages which are a part of the one or more evacuated refrigerant circuits;

(f) means for removing, at least in part, non-condensable gas which may be generated inside the one or more evacuated refrigerant circuits, the non-condensable-gas removing means comprising (1) an evacuated space fluidly connected to the one or more evacuated refrigerant circuits so that non-condensable gas, mixed with refrigerant vapor, enters the evacuated space;

(2) means for separating non-condensable gas and refrigerant vapor, entering the evacuated space, primarily by (i) condensing a portion of the refrigerant vapor entering the evacuated space, and (ii) returning the thus generated refrigerant condensate to the one or more evacuated refrigerant circuits; and (3) means for removing from the evacuated space, and discharging into the evacuated configuration's surroundings, non-condensable gas mixed with residual refrigerant vapor still present in the evacuated space after non-condensable gas and refrigerant-vapor separation inside the evacuated space; and (g) means for ensuring—for a preselected range of refrigerant evaporation rates which includes at least two refrigerant evaporation rates differing significantly from each other—that each of the one or more refrigerant pumps has, while the evacuated configuration is active, an available net positive suction head high enough to prevent, under steady-state conditions, each of the one or more refrigerant pumps cavitating.

37. A heat-transfer system, in a gravitational field, for absorbing heat from one or more heat sources and for transferring the absorbed heat to one or more heat sinks; the system including an evacuated configuration comprising:

(a) a refrigerant for absorbing heat from the one or more heat sources by—under at least some operating conditions—changing at least in part from a liquid to a vapor, and for releasing the absorbed heat to the one or more heat sinks by—under at least some operating conditions—changing at least in part from a vapor back into a liquid;

(b) one or more hot heat exchangers for transmitting heat from the one or more heat sources to the refrigerant, the one or more hot heat exchangers including an evaporator for transmitting heat from a first heat source of the one or more heat sources to the refrigerant and for—under at least some operating conditions—evaporating liquid refrigerant; the evaporator having one or more refrigerant passages wherein—under at least some operating conditions—at least a portion of liquid refrigerant entering the one or more evaporator refrigerant passages is evaporated;

(c) one or more cold heat exchangers for transmitting heat from the refrigerant to the one or more heat sinks, the one or more cold heat exchangers including a condenser for transmitting heat from the refrigerant to a first heat sink of the one or more heat sinks and for—under at least some operating conditions—condensing refrigerant vapor the condenser having one or more condenser refrigerant passages wherein—under at least some operating conditions—refrigerant vapor is condensed, the highest pressure at which condensation occurs in the one or more condenser refrigerant passages, at an instant in time, not exceeding the lowest pressure at which evaporation occurs in the one or more evaporator refrigerant passages at the selfsame instant in time;

(d) one or more evacuated refrigerant circuits containing—under at least some operating conditions—refrigerant partly in the liquid phase and partly in the vapor phase while the evacuated configuration is active and essentially no air while the evacuated configuration is active and while the evacuated configuration is inactive, the one or more evacuated refrigerant circuits comprising a refrigerant principal circuit around which the refrigerant circulates, not excluding intermittently, while the evacuated configuration is active; the refrigerant principal circuit including (1) the one or more evaporator refrigerant passages and the one or more condenser refrigerant passages;

(2) refrigerant-vapor transfer means for transferring refrigerant vapor from the one or more evaporator refrigerant passages to the one or more condenser refrigerant passages; and (3) liquid-refrigerant principal transfer means for transferring liquid refrigerant from the one or more condenser refrigerant passages to the one or more evaporator refrigerant passages;

(e) one or more refrigerant pumps having one or more refrigerant passages which are a part of the one or more evacuated refrigerant circuits;

(f) a variable-volume reservoir for storing liquid refrigerant, the reservoir being fluidly connected to the one or more evacuated refrigerant circuits; and (h) means for ensuring—for a preselected range of refrigerant evaporation rates which includes at least two refrigerant evaporation rates differing significantly from each other—that each of the one or more refrigerant pumps has, while the evacuated configuration is active, an available net positive suction head high enough to prevent, under steady-state conditions, each of the one or more refrigerant pumps cavitating.

38. A system, according to claim 37, wherein the evacuated configuration also comprises means for fluidly isolating, while the evacuated (configuration is inactive, a first part of the one or more evacuated refrigerant circuits from a second pail of the one or more evacuated refrigerant circuits; wherein said variable-volume reservoir is fluidly connected to said first part; wherein said first part is completely filled with liquid refrigerant immediately prior to the instant in time at which the evacuated configuration becomes inactive; and wherein said isolating means fluidly isolates said first part from said second part for at least some of the time during which the evacuated configuration is inactive, and fluidly connects said first part to said second part under at least some operating conditions.

39. A system, according to claim 38, wherein the refrigerant has one or more saturated-vapor pressures at a given refrigerant temperature; and wherein the total pressure inside said first part is maintained, for at least some of the time during which the refrigerant principal configuration is inactive, at or above a preselected minimum pressure having a value higher than the lowest value of the refrigerant's one or more saturated-vapor pressures corresponding to the lowest temperature experienced by the refrigerant while the refrigerant principal configuration is inactive.

40. A heat-transfer system, in a gravitational field, for absorbing heat from one or more heat sources and for transferring the absorbed heat to one or more heat sinks; the system including an airtight refrigerant configuration having (1) a refrigerant principal configuration comprising:

(a) a refrigerant for absorbing heat from the one or more heat sources by—under at least some operating conditions—changing at least in part from a liquid to a vapor, and for releasing the absorbed heat to the one or more heat sinks by—under at least some operating conditions—changing at least in part from a vapor back into a liquid;

(b) one or more hot heat exchangers for transmitting heat from the one or more heat sources to the refrigerant, the one or more hot heat exchangers including an evaporator for transmitting heat from a first heat source of the one or more heat sources to the refrigerant and for—under at least some operating conditions—evaporating liquid refrigerant; the evaporator having one or more refrigerant passages wherein—under at least some operating conditions—at least a portion of liquid refrigerant entering the one or more evaporator refrigerant passages is evaporated;

(c) one or more cold heat exchangers for transmitting heat from the refrigerant to the one or more heat sinks, the one or more cold heat exchangers including a condenser for transmitting heat from the refrigerant to a first heat sink of the one or more heat sinks and for—under at least some operating conditions—condensing refrigerant vapor; the condenser having one or more condenser refrigerant passages wherein—under at least some operating conditions—refrigerant vapor is condensed, the highest pressure at which condensation occurs in the one or more condenser refrigerant passages, at an instant in time, not exceeding the lowest pressure at which evaporation occurs in the one or more evaporator refrigerant passages at the selfsame instant in time; and (d) one or more refrigerant circuits containing refrigerant partly in the liquid phase and partly in the vapor phase under at least some operating conditions, the one or more refrigerant circuits containing essentially no air while the principal configuration is active and while the principal configuration is inactive, said circuits comprising a refrigerant principal circuit around which the refrigerant circulates, not excluding intermittently, while the principal configuration is active; the refrigerant principal circuit including (i) the one or more evaporator refrigerant passages and the one or more condenser refrigerant passages, (ii) refrigerant-vapor transfer means for transferring refrigerant vapor from the one or more evaporator refrigerant passages to the one or more condenser refrigerant passages, and (iii) liquid-refrigerant principal transfer means for transferring liquid refrigerant from the one or more condenser refrigerant passages to the one or more evaporator refrigerant passages;

the refrigerant principal configuration also comprising means for fluidly isolating, while the refrigerant principal configuration is inactive, a first part of the one or more refrigerant circuits of the refrigerant principal configuration from a second part of said one or more refrigerant circuits; and wherein said isolating means fluidly isolates said first part from said second part for at least some of the time during which the refrigerant principal configuration is inactive, and fluidly connects said first part to said second part under at least some operating conditions;

the airtight refrigerant configuration also having (2) a refrigerant ancillary configuration comprising (a) a liquid-refrigerant variable-volume reservoir for storing liquid refrigerant outside the principal configuration's one or more refrigerant circuits;

(b) liquid-refrigerant transfer means for allowing the transfer of liquid refrigerant from the variable-volume reservoir to the first of said one or more refrigerant circuits, and for allowing the transfer of liquid refrigerant from the first of said one or more refrigerant circuits to the variable-volume reservoir.

41. A system, according to claim 40, wherein the first part of said one or more refrigerant circuits is completely filled with liquid refrigerant at the time at which the first part of said one or more refrigerant circuits is being isolated from the second part of said one or more refrigerant circuits.

42. A system, according to claim 40, wherein the refrigerant has one or more saturated-vapor pressures at a given refrigerant temperature; and wherein the total pressure inside the first part of said one or more refrigerant circuits is maintained, for at least some of the time during which the refrigerant principal configuration is inactive, at or above a preselected minimum pressure having a value higher than the lowest value of the refrigerant's one or more saturated-vapor pressures corresponding to the lowest temperature experienced by the refrigerant while the refrigerant principal configuration is inactive.

43. A heat-transfer system for absorbing heat from one or more heat sources, and for transferring the absorbed heat to one or more heat sinks, none of the one or more heat sources including an electrical apparatus having windings electrically insulated even in part by an inert gas inside the airtight configuration; the system including an airtight configuration having (1) a refrigerant principal configuration comprising:

(a) a refrigerant for absorbing heat from the one or more heat sources by—under at least some operating conditions—changing at least in part from a liquid to a vapor, and for releasing the absorbed heat to the one or more heat sinks by—under at least some operating conditions—changing at least in part from a vapor back into a liquid, none of the one or more heat sources including an electrical apparatus having windings electrically insulated even in part by an inert gas inside the airtight configuration;

(b) one or more hot heat exchangers for transmitting heat from the one or more heat sources to the refrigerant, the one or more hot heat exchangers including an evaporator for transmitting heat from a first heat source of the one or more heat sources to the refrigerant and for—under at least some operating conditions—evaporating liquid refrigerant; the evaporator having one or more refrigerant passages wherein—tinder at least some operating conditions—at least a portion of liquid refrigerant entering the one or more evaporator refrigerant passages is evaporated;

(c) one or more cold heat exchangers for transmitting heat from the refrigerant to the one or more heat sinks, the one or more cold heat exchangers including a condenser for transmitting heat from the refrigerant to a first heat sink of the one or more heat sinks and for—under at least some operating conditions—condensing refrigerant vapor; the condenser having one or more condenser refrigerant passages wherein—under at least some operating conditions—refrigerant vapor is condensed, the highest pressure at which condensation occurs in the one or more condenser refrigerant passages, at an instant in time, not exceeding the lowest pressure at which evaporation occurs in the one or more evaporator refrigerant passages at the selfsame instant in time;

(d) one or more refrigerant circuits containing refrigerant partly in the liquid phase and partly in the vapor phase under at least some operating conditions, the one or more refrigerant circuits comprising a refrigerant principal circuit around which the refrigerant circulates, not excluding intermittently, while the principal configuration is active; the refrigerant principal circuit including (i) the one or more evaporator refrigerant passages and the one or more condenser refrigerant passages, (ii) refrigerant-vapor transfer means for transferring refrigerant vapor from the one or more evaporator refrigerant passages to the one or more condenser refrigerant passages, and (iii) liquid-refrigerant principal transfer means for transferring liquid refrigerant from the one or more condenser refrigerant passages to the one or more evaporator refrigerant passages; and (e) means for fluidly isolating while the principal configuration is inactive, a first part of the one or more refrigerant circuits of the refrigerant principal configuration from a second part of said one or more refrigerant circuits; wherein said isolating means fluidly isolates said first pant from said second part for at least some of the time during which the refrigerant principal configuration is inactive, and fluidly connects said first part to said second part under at least some operating conditions; and (2) an inert-gas passive configuration comprising (a) an inert gas;

(b) an inert-gas reservoir for storing inert gas outside the principal configuration; and (c) inert-gas passive transfer means for transferring the inert gas from the reservoir to said first part, and for transferring the inert gas from said first part to the reservoir.

44. A system, according to claim 43, wherein the refrigerant has one or more saturated-vapor pressures at a given refrigerant temperature; and wherein the total pressure inside said first part is maintained for at least some of the time during which the refrigerant principal configuration is inactive, at or above a preselected minimum pressure having a value higher than line lowest value of the refrigerant's one or more saturated-vapor pressures corresponding to the lowest temperature experienced by the refrigerant while the refrigerant principal configuration is inactive.

* * * * *